US006523027B1

(12) United States Patent
Underwood

(10) Patent No.: US 6,523,027 B1
(45) Date of Patent: Feb. 18, 2003

(54) INTERFACING SERVERS IN A JAVA BASED E-COMMERCE ARCHITECTURE

(75) Inventor: Roy Aaron Underwood, Long Grove, IL (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/364,531

(22) Filed: Jul. 30, 1999

(51) Int. Cl.[7] ................................................ G06F 17/30

(52) U.S. Cl. .............................. 707/4; 707/10; 707/100

(58) Field of Search ................................ 707/4, 3, 2, 5, 707/6, 1, 8, 9, 10, 100, 102, 103; 709/205, 247, 250

(56) References Cited

U.S. PATENT DOCUMENTS 5,758,074 A * 5/1998 Marlin et al. ............... 709/250
6,112,228 A * 8/2000 Earl et al. ................... 709/205
6,185,625 B1 * 2/2001 Tso et al. ................... 709/247
6,199,068 B1 * 3/2001 Carpenter ................... 707/100
6,199,079 B1 * 3/2001 Gupta et al. ................ 707/507
6,230,160 B1 * 5/2001 Chan et al. ................. 707/103
6,266,666 B1 * 7/2001 Ireland et al. ................ 707/10

OTHER PUBLICATIONS

Betz M, "Active data Objects & ASP", Dr. Dobb's Journal, U.S. M&T Publ., May 1998, vol. 23, No. 5, pp. 88–91, 111–112.

Spitzer, "Tiers Without Tears", DBMS Online, Jan. 12, 1998, pp. 1–5.

Vinoski, "Corba: Integrating Diverse Applications Within Distributed Heterogeneous Environments", IEEE Communications Magazine, Feb. 1997, pp. 46–55.

* cited by examiner

*Primary Examiner*—Sanjiv Shah
(74) *Attorney, Agent, or Firm*—Daphne L. Burton; Oppenheimer Wolff & Donnelly, LLP

(57) ABSTRACT

A system, method and article of manufacture are provided for providing an interface between a first server and a second server with a proxy component situated therebetween. Initially, a request for a business object is identified by an application on the first server. The first server is then connected to the second server. Next, selection criteria from the first server is transmitted to the second server. In response to the selection criteria, the first server receives a first recordset and a second recordset from the second server. Business data is included in the first recordset and result codes are included in the second recordset. The first and second recordsets are mapped to the business object and the business object is sent to the application on the first server.

18 Claims, 111 Drawing Sheets

INTERFACING SERVERS IN A JAVA BASED E-COMMERCE ARCHITECTURE

FIELD OF THE INVENTION

The present invention relates to software framework designs and more particularly to a framework design which provides an interface between a first server and a second web and application server.

BACKGROUND OF THE INVENTION

An important use of computers is the transfer of information over a network. Currently, the largest computer network in existence is the Internet. The Internet is a worldwide interconnection of computer networks that communicate using a common protocol. Millions of computers, from low end personal computers to high-end super computers are coupled to the Internet.

The Internet grew out of work funded in the 1960s by the U.S. Defense Department's Advanced Research Projects Agency. For a long time, Internet was used by researchers in universities and national laboratories to share information. As the existence of the Internet became more widely known, many users outside of the academic/research community (e.g., employees of large corporations) started to use Internet to carry electronic mail.

In 1989, a new type of information system known as the World-Wide-Web ("the Web") was introduced to the Internet. Early development of the Web took place at CERN, the European Particle Physics Laboratory. The Web is a wide-area hypermedia information retrieval system aimed to give wide access to a large universe of documents. At that time, the Web was known to and used by the academic/research community only. There was no easily available tool which allows a technically untrained person to access the Web.

In 1993, researchers at the National Center for Supercomputing Applications (NCSA) released a Web browser called "Mosaic" that implemented a graphical user interface (GUI). Mosaic's graphical user interface was simple to learn yet powerful. The Mosaic browser allows a user to retrieve documents from the World-Wide-Web using simple point-and-click commands. Because the user does not have to be technically trained and the browser is pleasant to use, it has the potential of opening up the Internet to the masses.

The architecture of the Web follows a conventional client-server model. The terms "client" and "server" are used to refer to a computer's general role as a requester of data (the client) or provider of data (the server). Under the Web environment, Web browsers reside in clients and Web documents reside in servers. Web clients and Web servers communicate using a protocol called "HyperText Transfer Protocol" (HTTP). A browser opens a connection to a server and initiates a request for a document. The server delivers the requested document, typically in the form of a text document coded in a standard Hypertext Markup Language (HTML) format, and when the connection is closed in the above interaction, the server serves a passive role, i.e., it accepts commands from the client and cannot request the client to perform any action.

The communication model under the conventional Web environment provides a very limited level of interaction between clients and servers. In many systems, increasing the level of interaction between components in the systems often makes the systems more robust, but increasing the interaction increases the complexity of the interaction and typically slows the rate of the interaction. Thus, the conventional Web environment provides less complex, faster interactions because of the Web's level of interaction between clients and servers.

SUMMARY OF THE INVENTION

A system, method and article of manufacture provide an interface between a first server and a second server with a proxy component situated therebetween. Initially, a request for a business object is identified by an application on the first server. The first server is then connected to the second server. Next, selection criteria from the first server is transmitted to the second server. In response to the selection criteria, the first server receives a first recordset and a second recordset from the second server. Business data is included in the first recordset and result codes are included in the second recordset. The first and second recordsets are mapped to the business object and the business object is sent to the application on the first server.

In one embodiment of the present invention, the first and second recordsets may also be mapped to the business object using a utility conversion function. Additionally, the first and second recordsets may also be mapped to the business object using a utility conversion function. Optionally, the recordsets may be ActiveX data objects (ADO) recordsets.

In another embodiment of the present invention, the first server may also receive a third recordset from the second server in response to the selection criteria. This third recordset may include errors and references to an error table on the first server for allowing processing of the errors.

In a further embodiment of the present invention, changes to the proxy component may be prevented from affecting the application on the first server. Additionally, generation of a plurality of the proxy components by a user may be allowed.

BRIEF DESCRIPTION OF THE DRAWINGS

The invention will be better understood when consideration is given to the following detailed description thereof. Such description makes reference to the annexed drawings wherein:

FIG. 1.1 illustrates a flowchart for a codes table framework that maintains application consistency by referencing text phrases through a short codes framework according to an embodiment of the present invention;

FIG. 1.2 is a flowchart depicting a method for providing an interface between a first server and a second server with a proxy component situated therebetween;

FIG. 1.3 shows the execution architecture for components that make up the SAP Framework Execution Architecture according to an embodiment of the present invention;

FIG. 1.4 is a flowchart illustrating a method for sharing context objects among a plurality of components executed on a transaction server;

FIG. 8.1 is an illustration of the MTS runtime environment according to an embodiment of the present invention;

FIG. 9.1 illustrates the different layers in a Site Server framework architecture according to an embodiment of the present invention;

FIG. 15.1 illustrates a ReTA Event Handler framework that manages the informational, warning and error events that an application raises according to an embodiment of the present invention;

FIG. 16.1 illustrates a User framework which enables two approaches to maintaining user information according to an embodiment of the present invention;

FIG. 17.1 shows a SubActivity component using the Persistence framework to retrieve a Customer Object from the Database according to an embodiment of the present invention;

FIG. 18.1 illustrates a Session Flow Diagram—On Session Start according to an embodiment of the present invention;

FIG. 20.1 is an illustration showing the steps for generating a HTML page consisting of a form with a TextBox, a DropDown list and a PushButton according to an embodiment of the present invention;

FIG. 72.1 illustrates the application & architecture configuration for a typical ReTA Build environment according to an embodiment of the present invention;

FIG. 76.1 illustrates a framework associated with the change tracker according to an embodiment of the present invention;

FIG. 83.1 illustrates the Issue Tracker Main Screen according to an embodiment of the present invention;

FIG. 87.1 illustrates the end to end process associated with Performance Modeling according to an embodiment of the present invention;

FIG. 93.1 illustrates the PVCS Migration Flow according to an embodiment of the present invention;

Figure 103B:
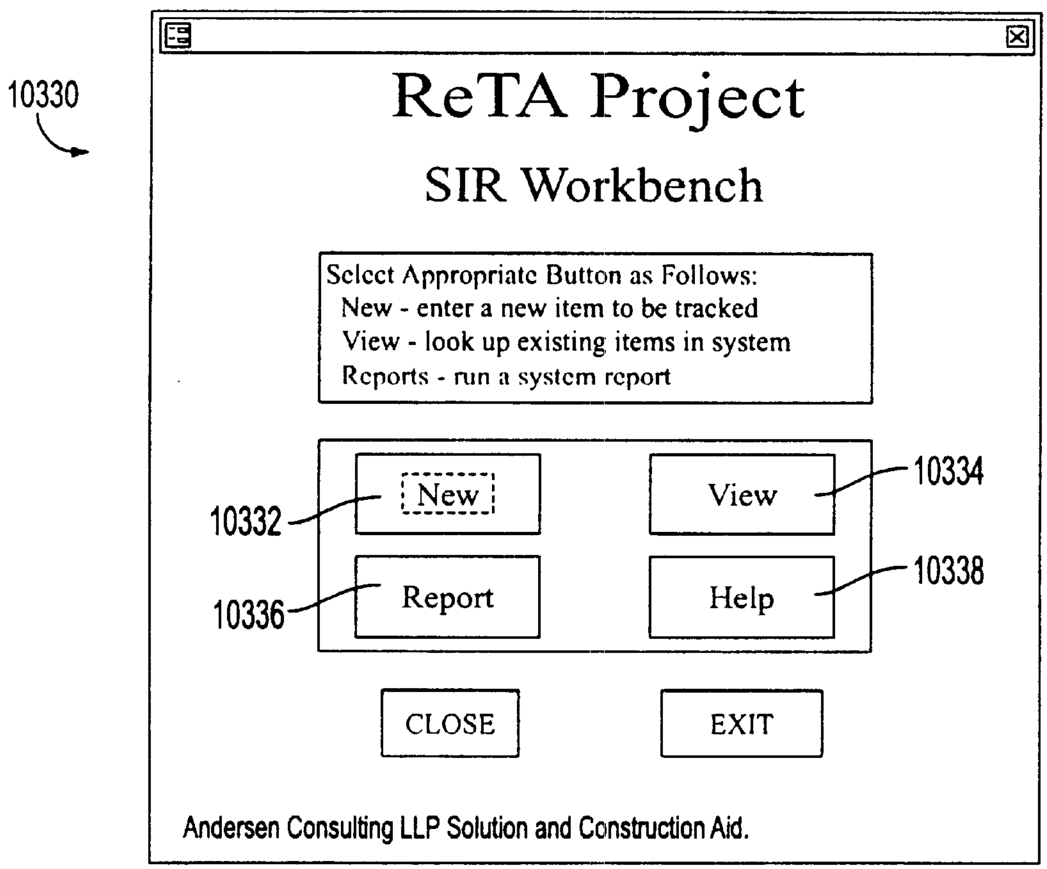
FIG. 103 is a flow chart illustrating a method for providing a system investigation report workbench.
Figure 103A:
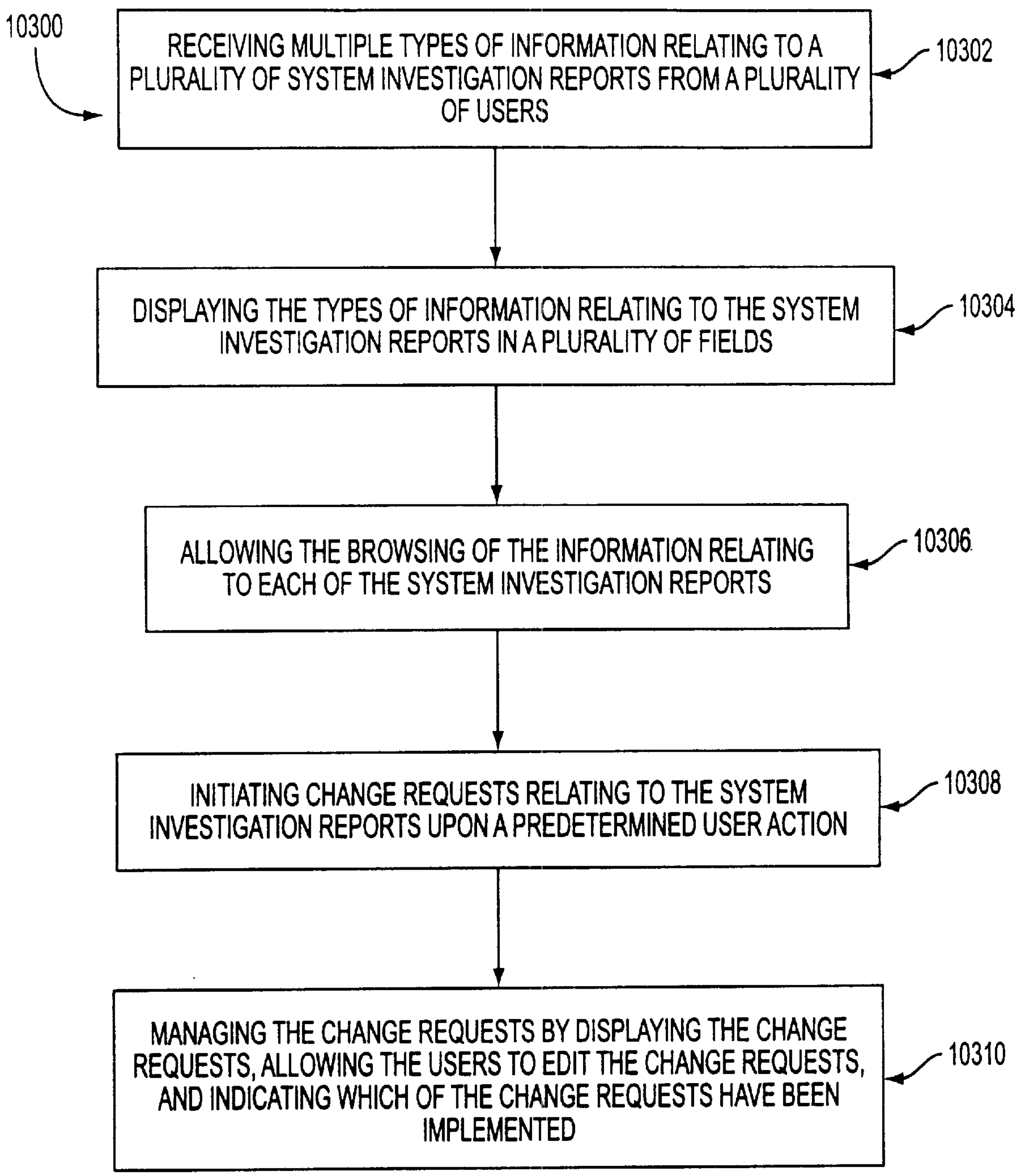
Figure 104:
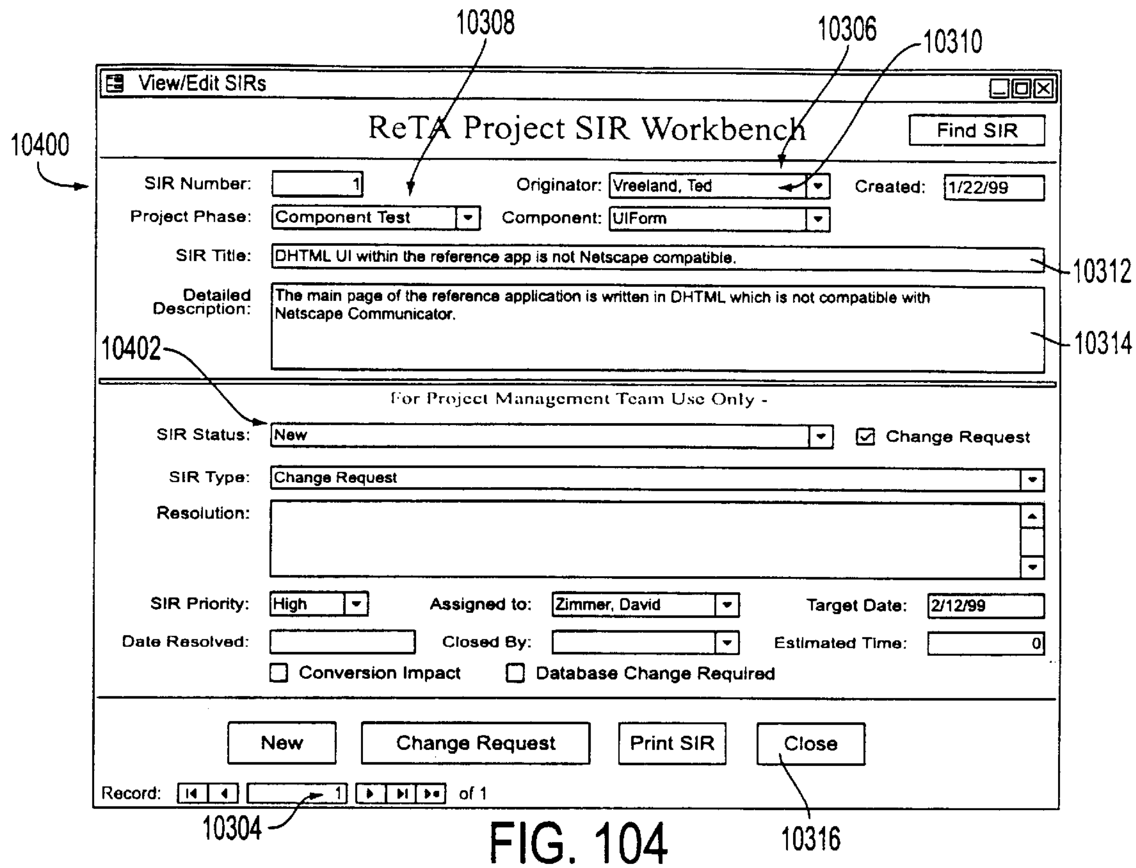
Figure 105:
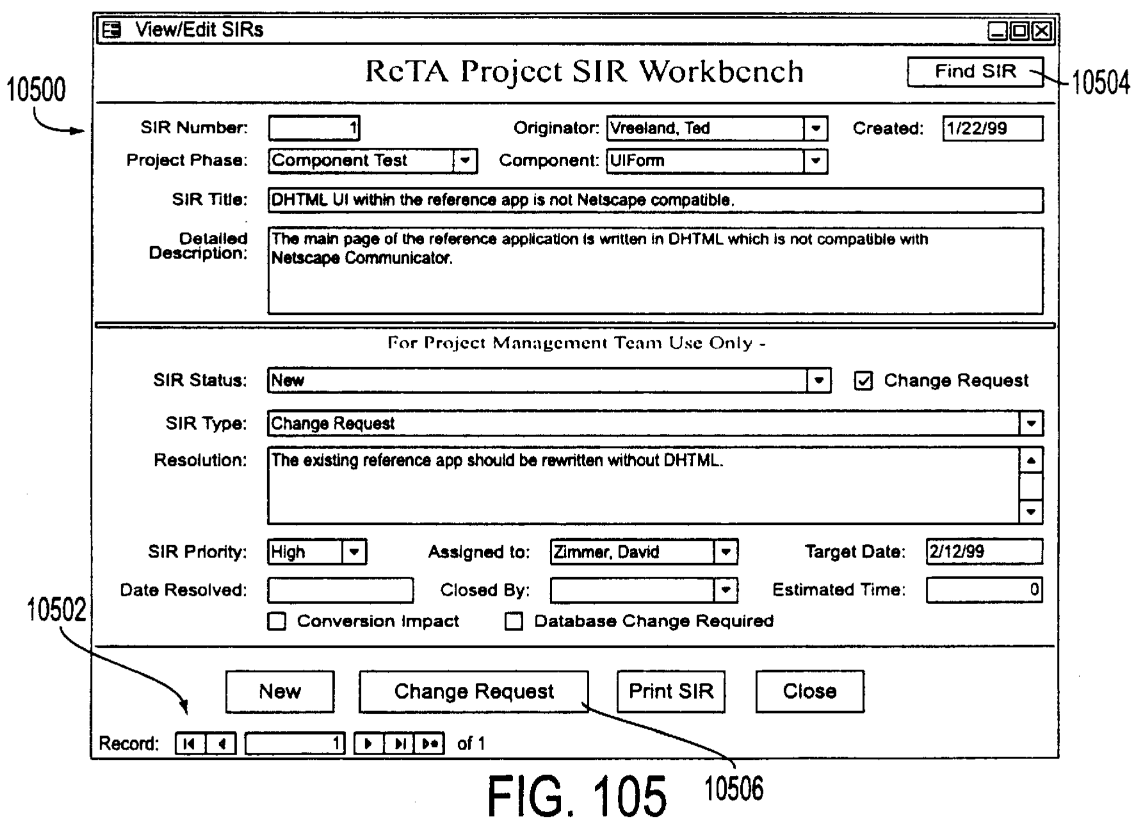
Figure 106:
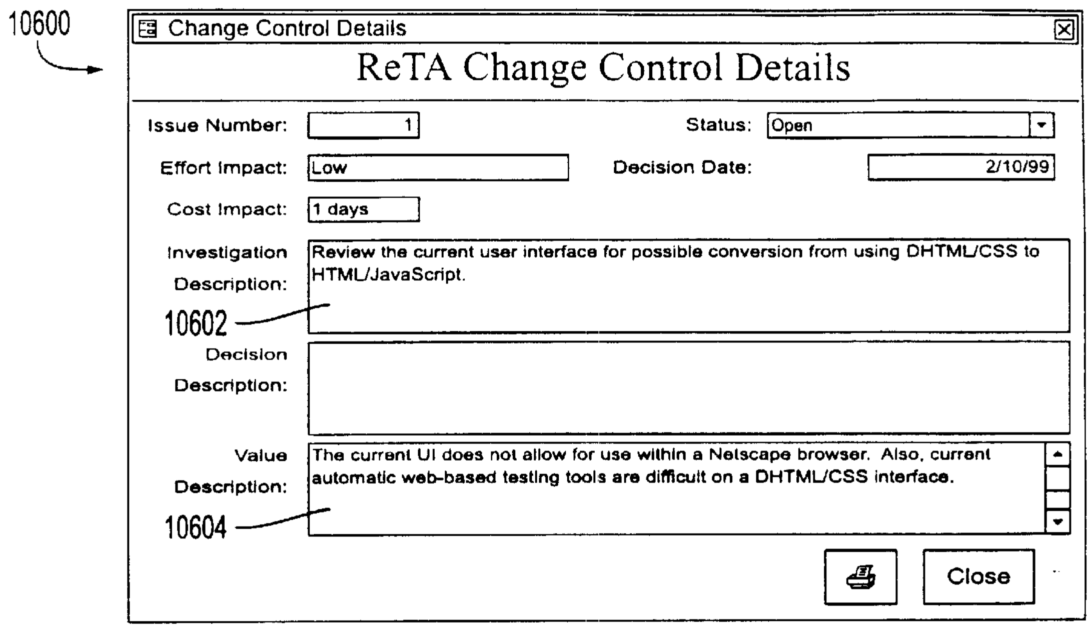
Figure 107:
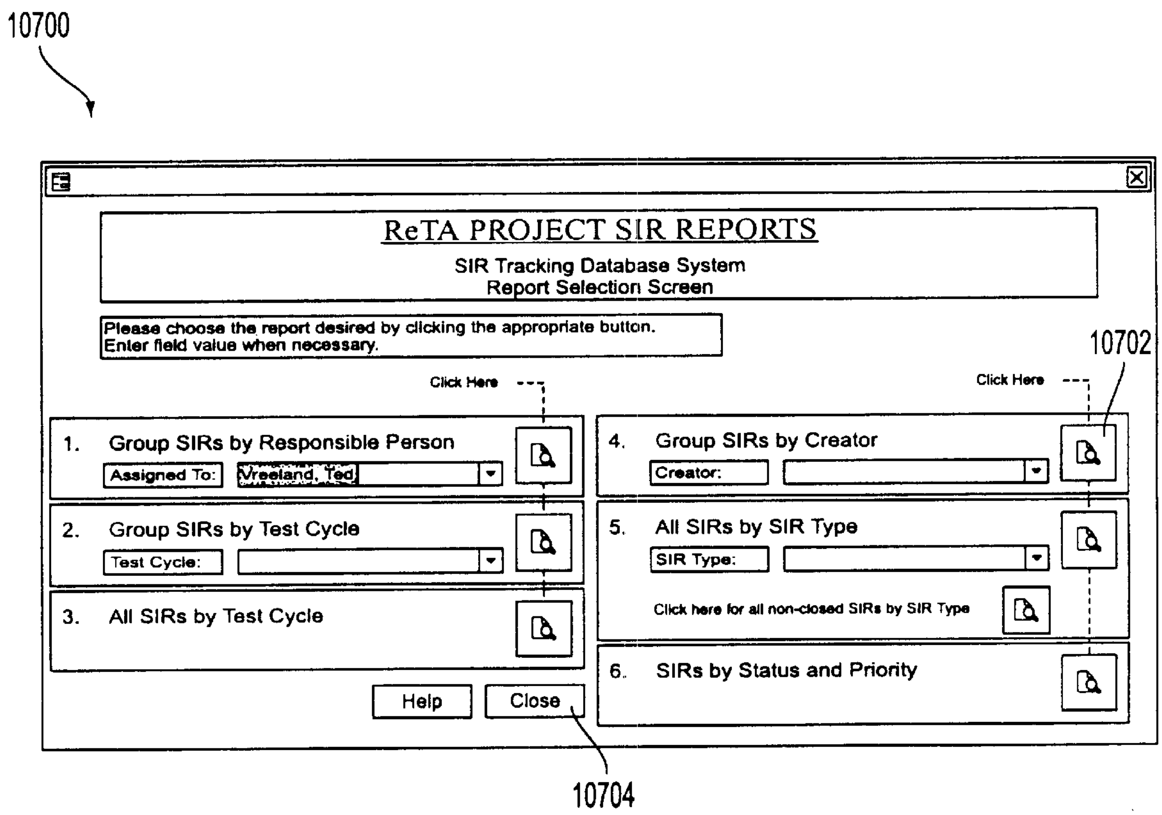
Figure 108:
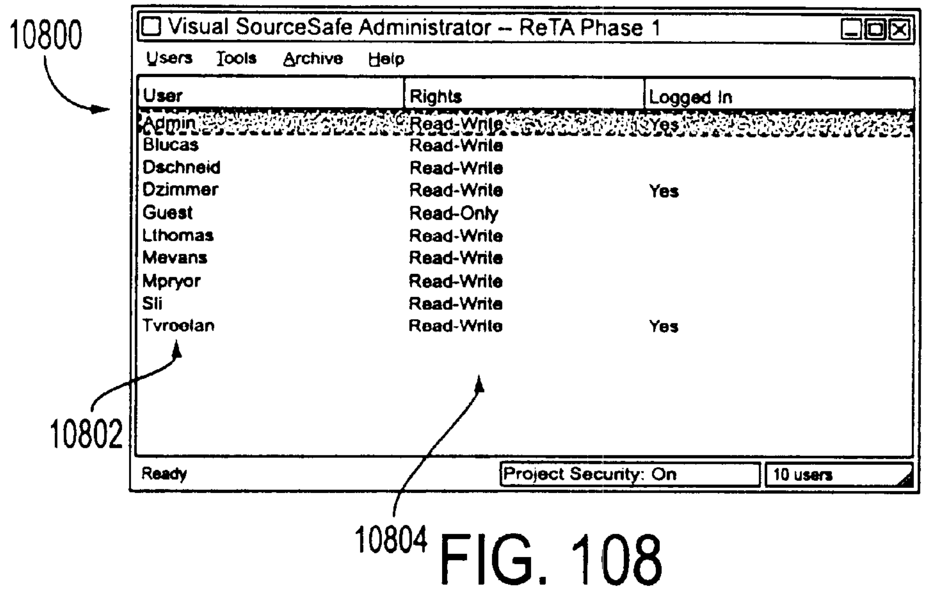
Figure 110:
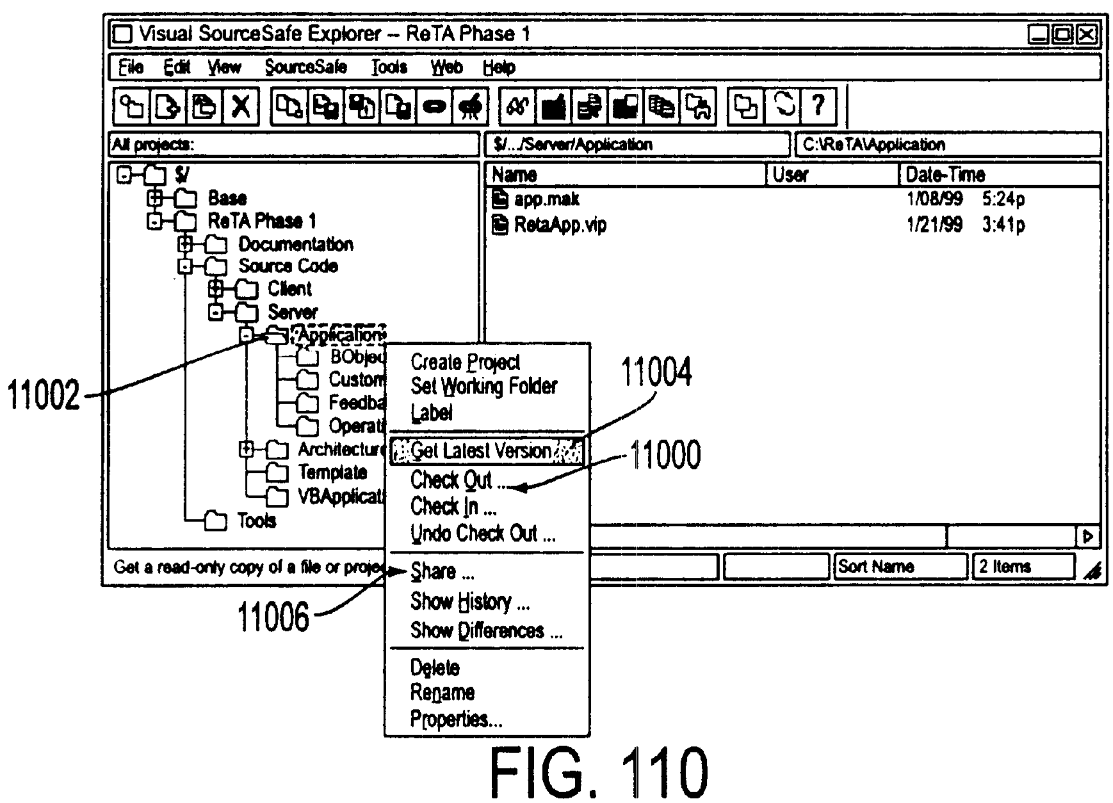
Figure 109A:
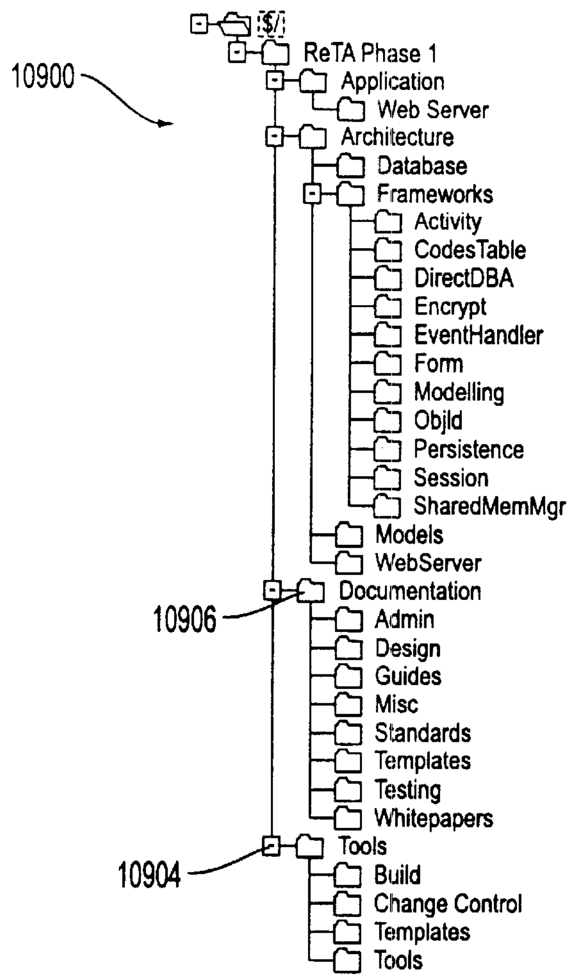
Figure 109B:
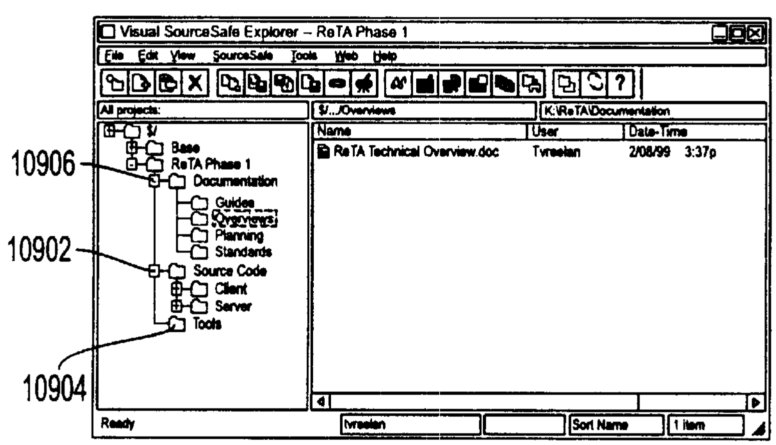
Figure 111:
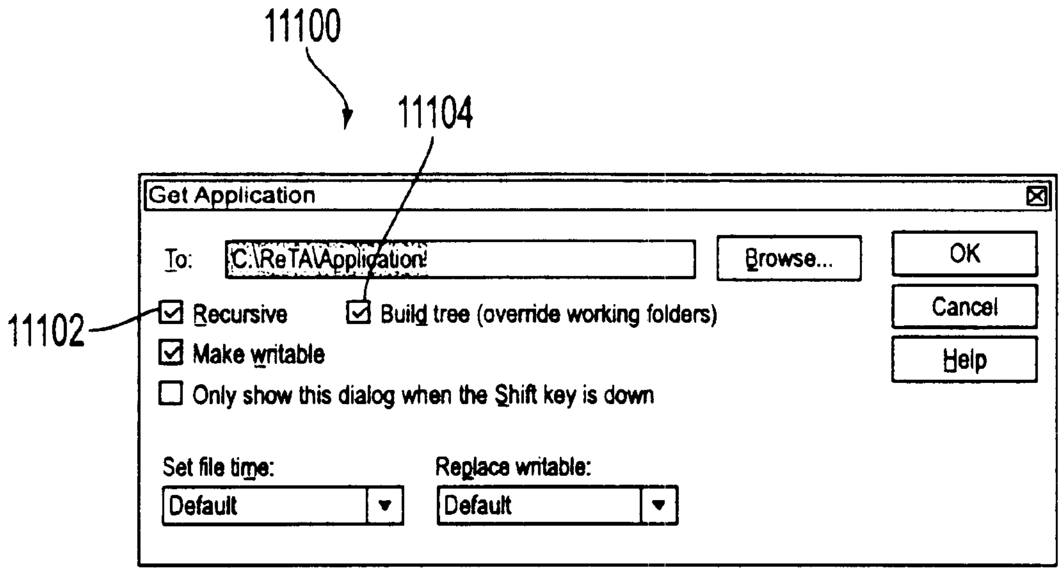
Figure 112:
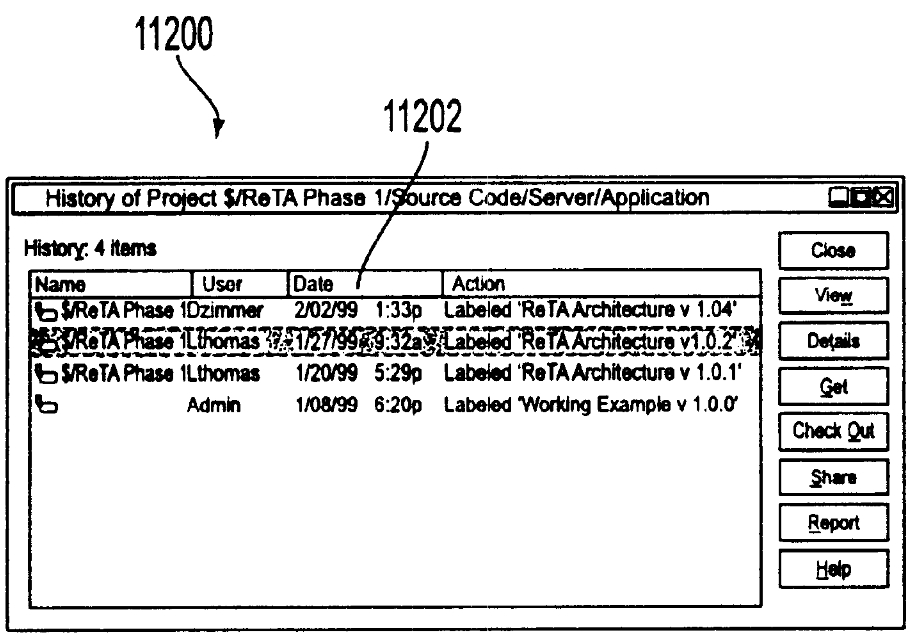
Figure 113:
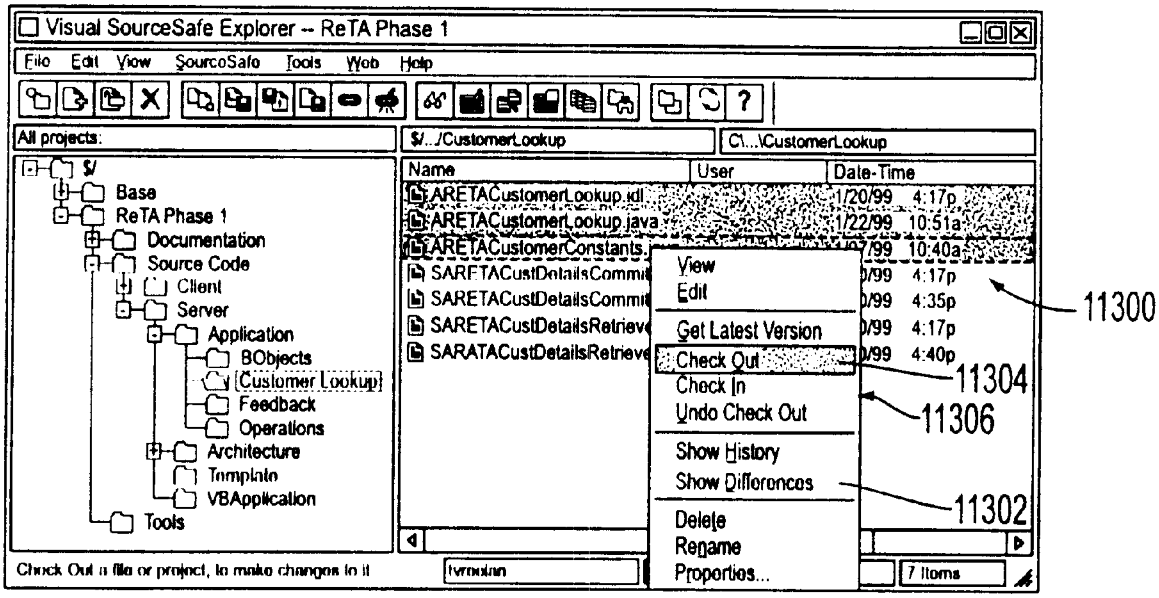
Figure 114:
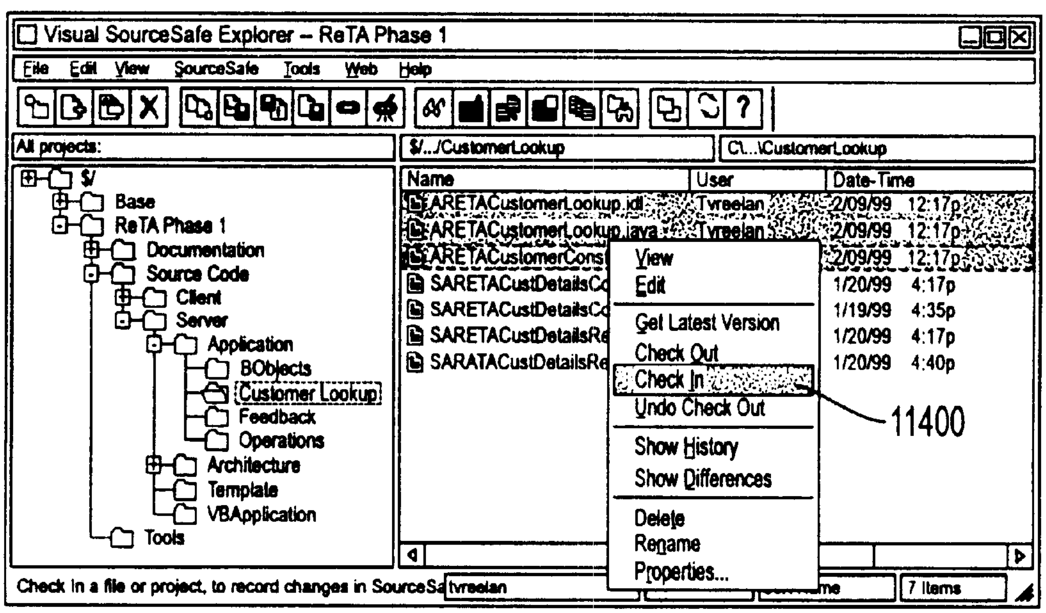
Figure 115:
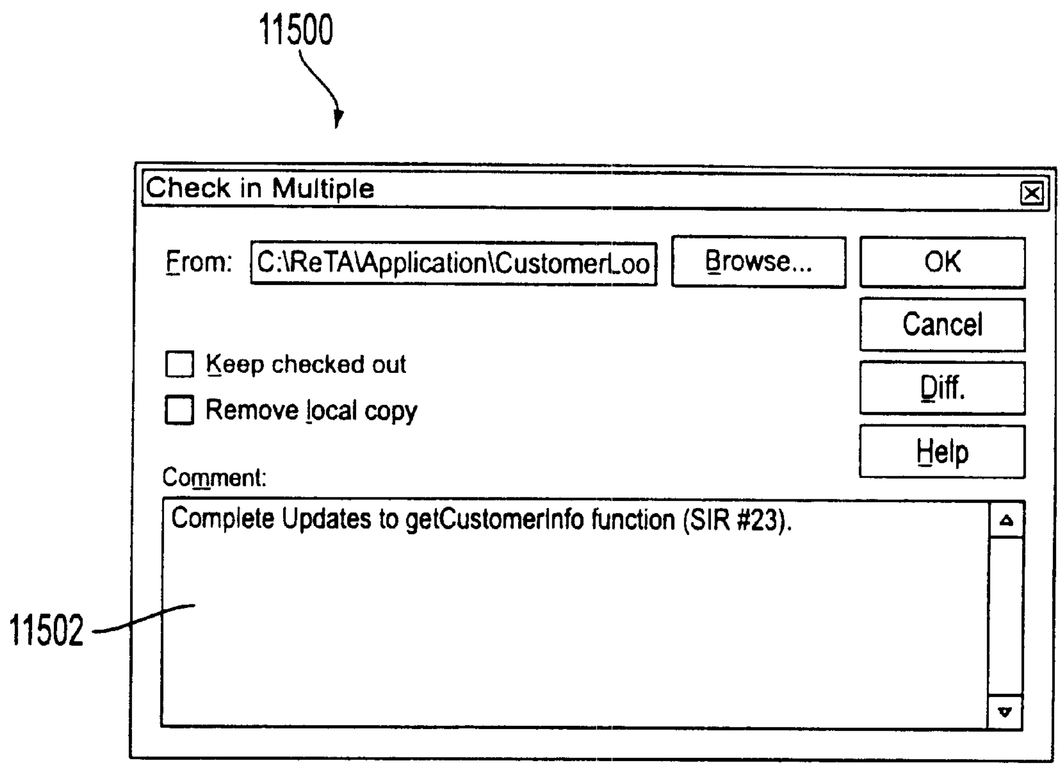
Figure 116:
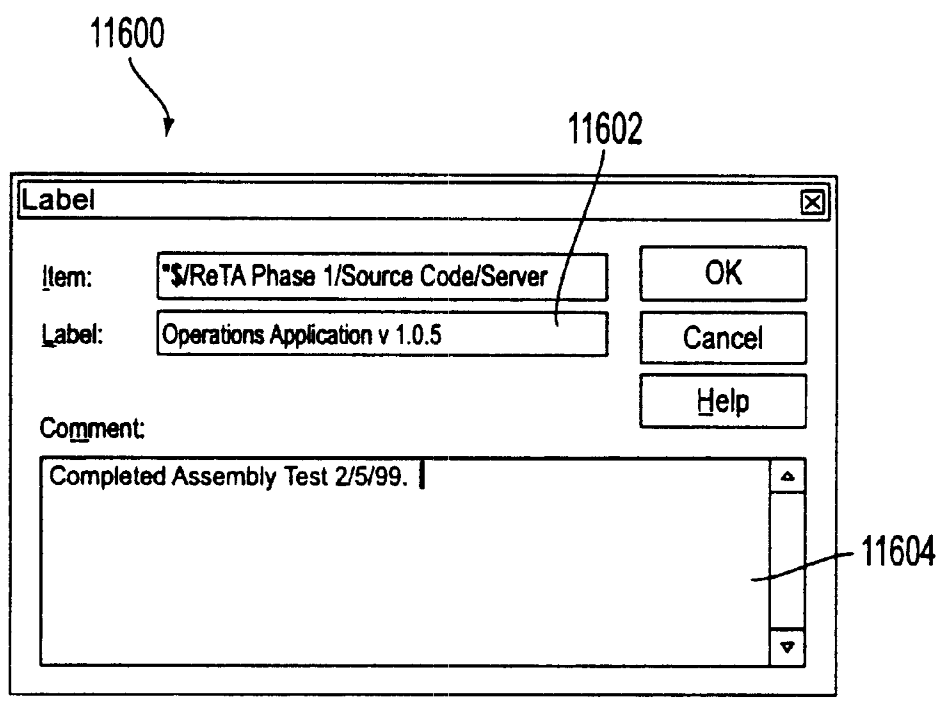
Figure 117:
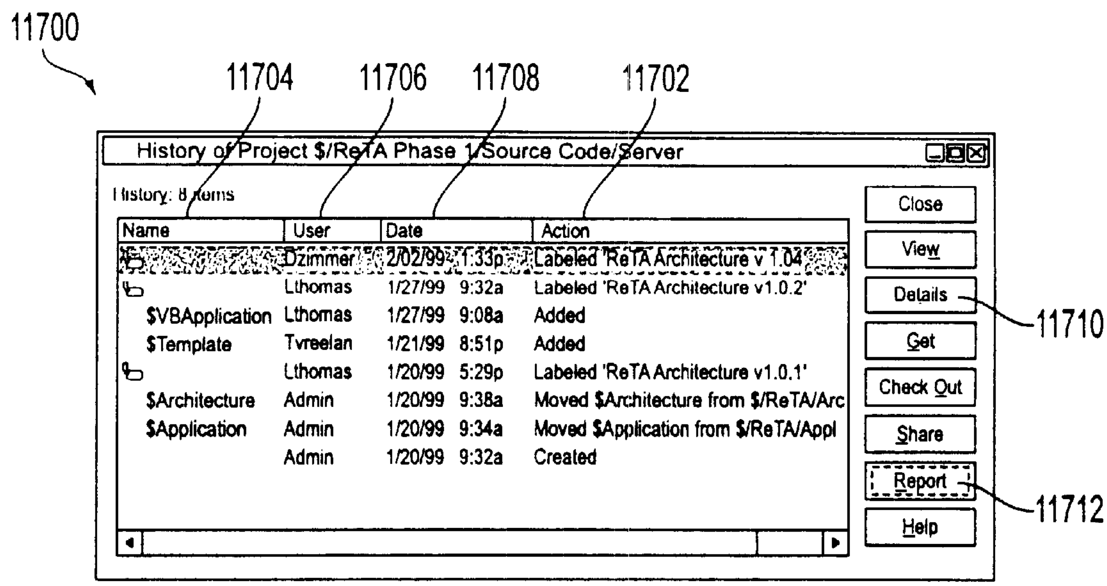
Figure 118:
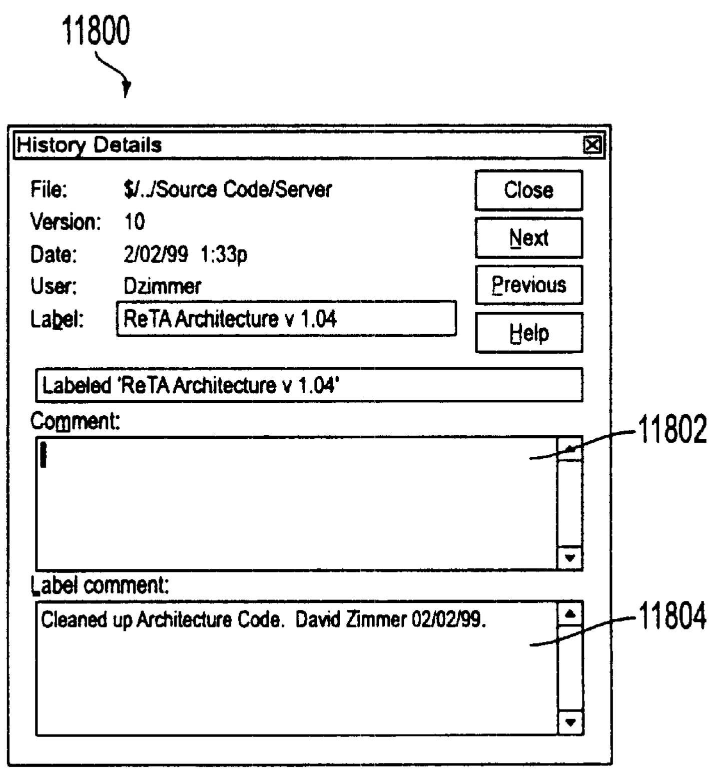
Figure 119:
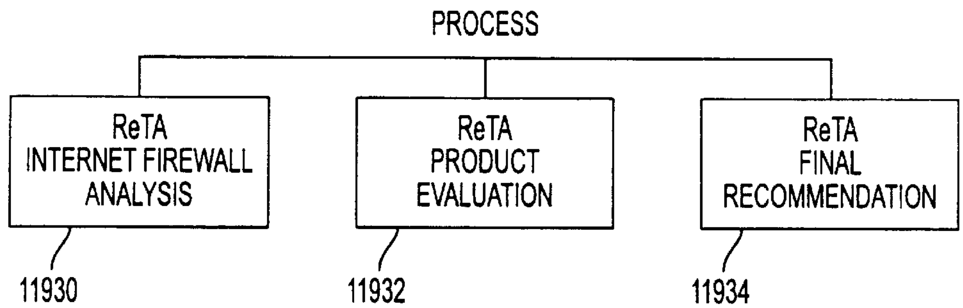
Figure 120:
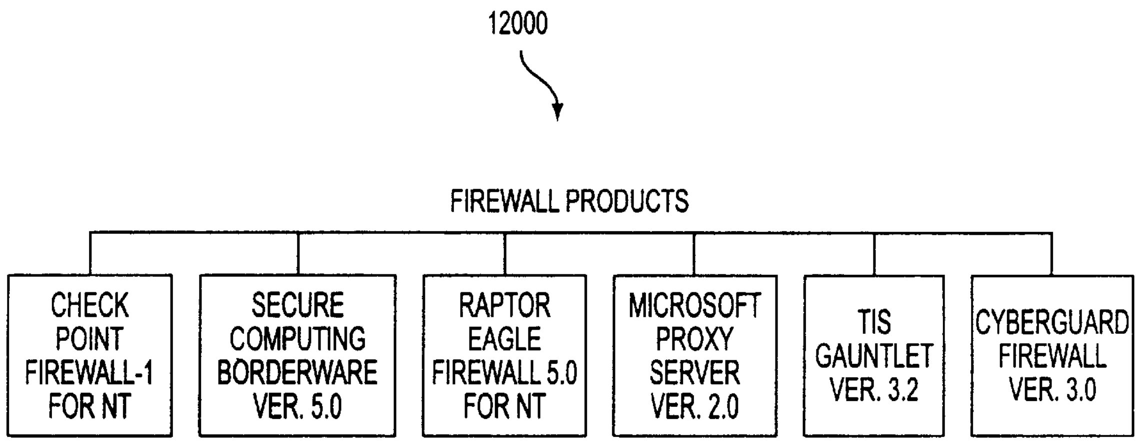
Figure 121:
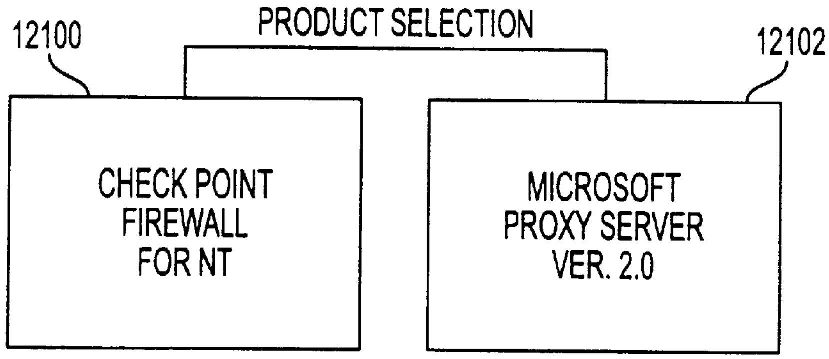
Figure 122:
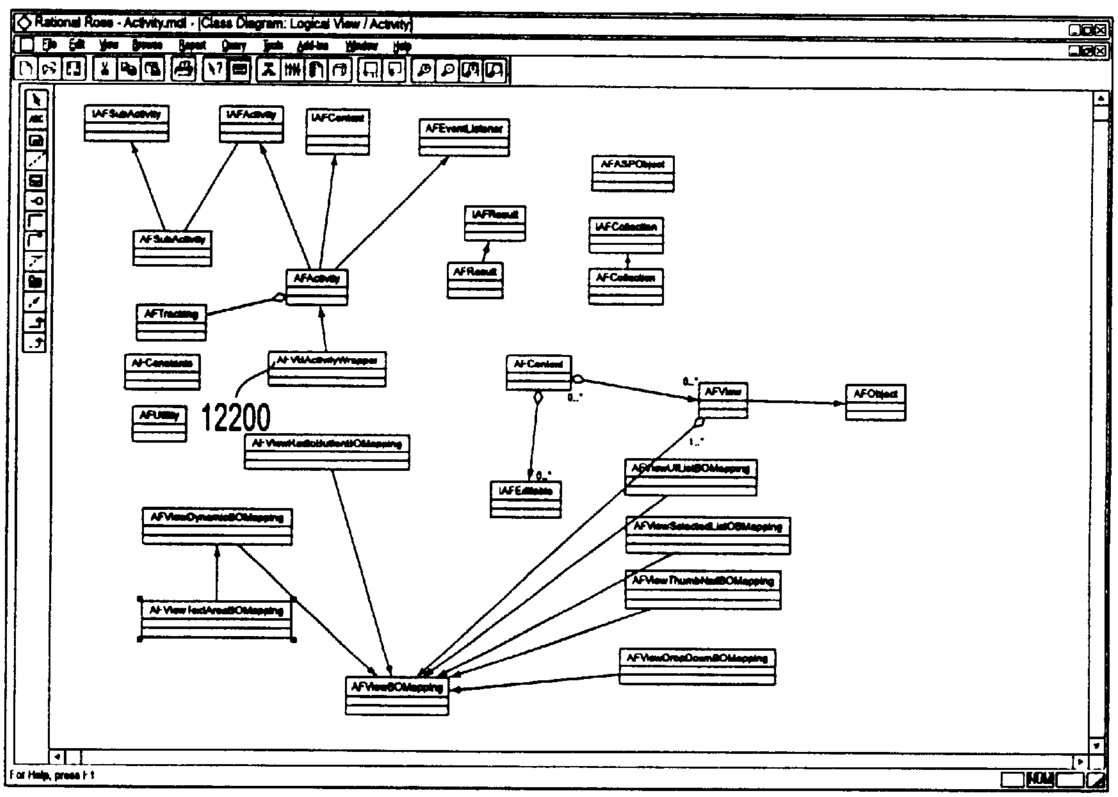
Figure 123:
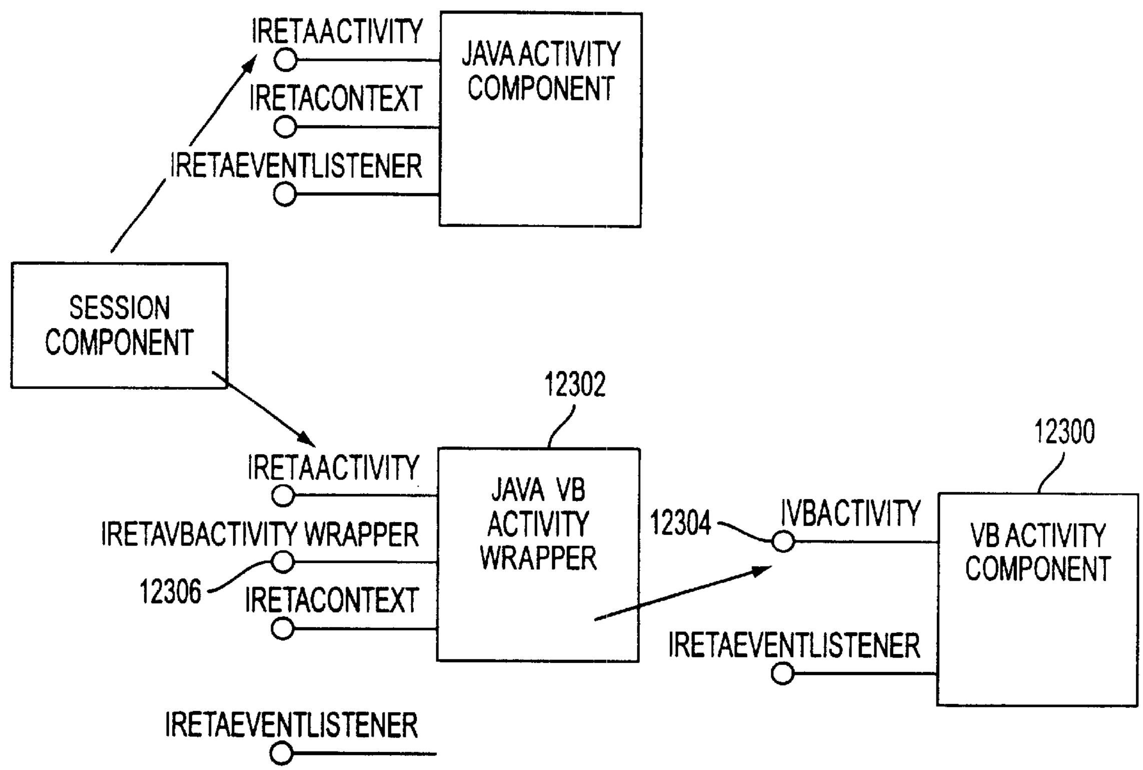
Figure 124A:
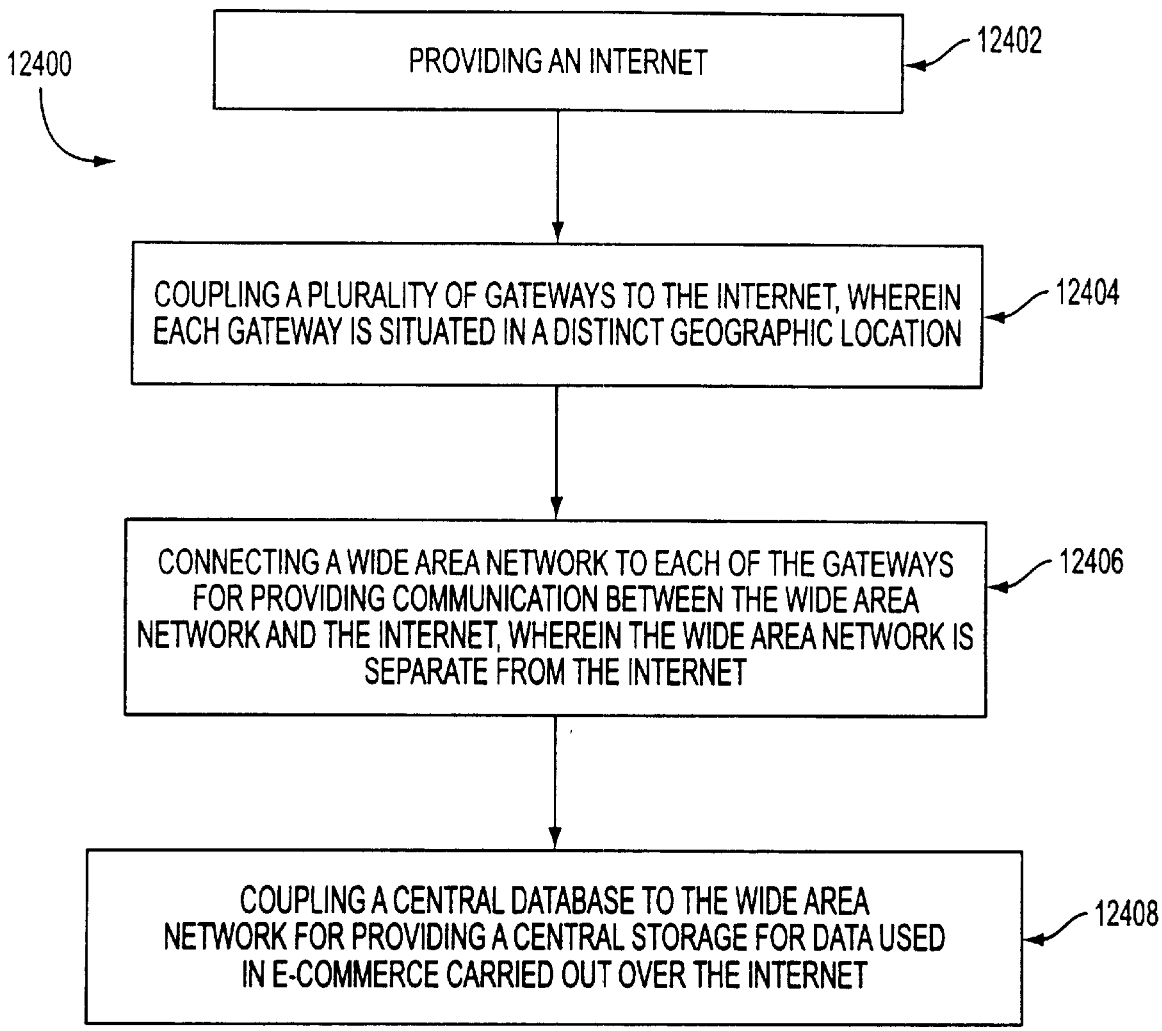
Figure 124B:
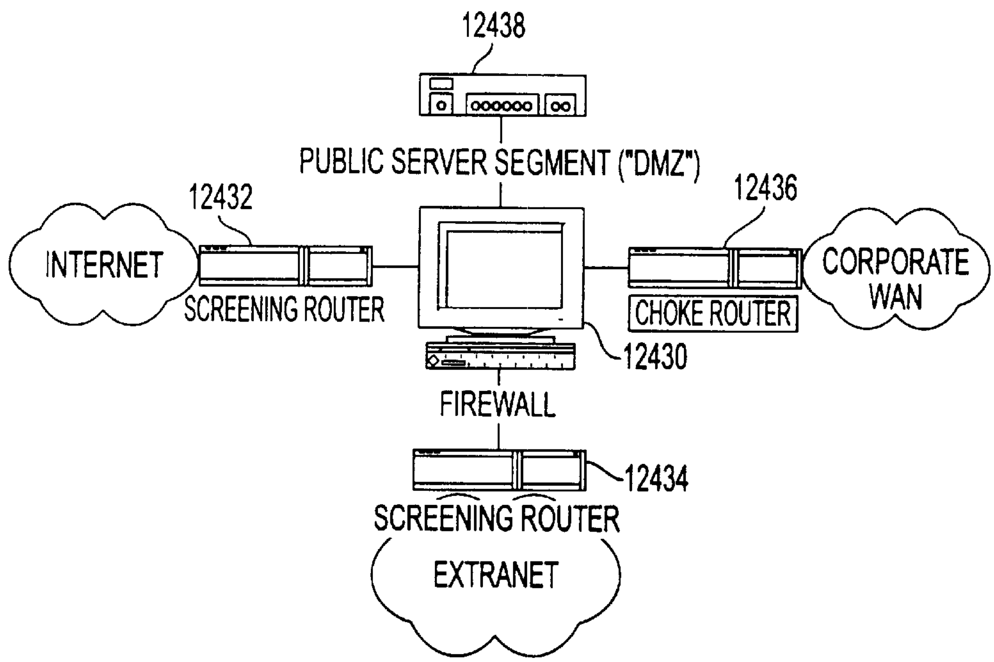
Figure 125:
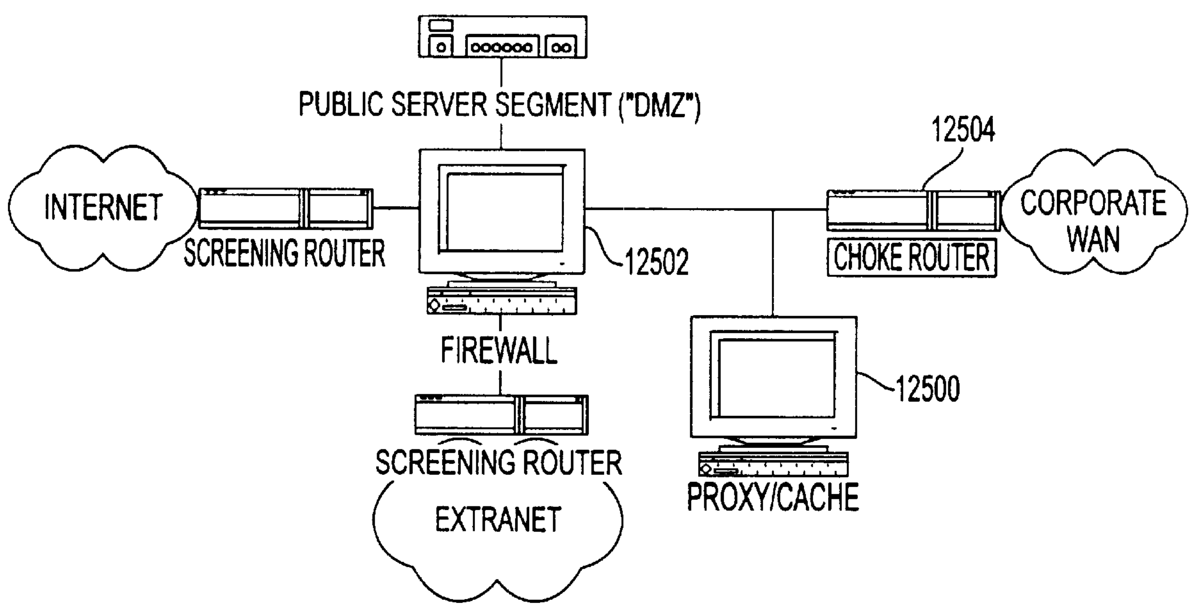
Figure 126:
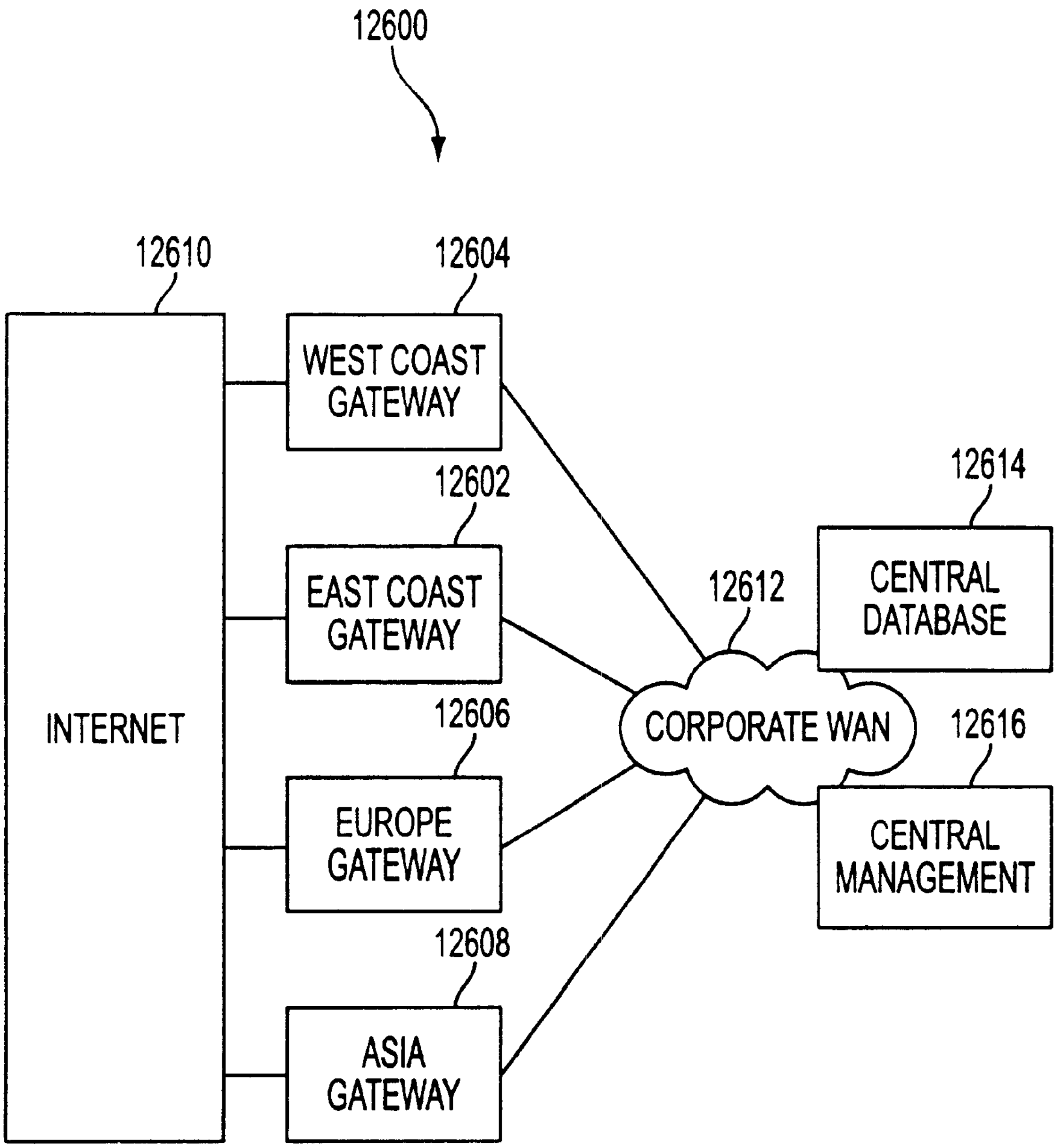
Figure 127:
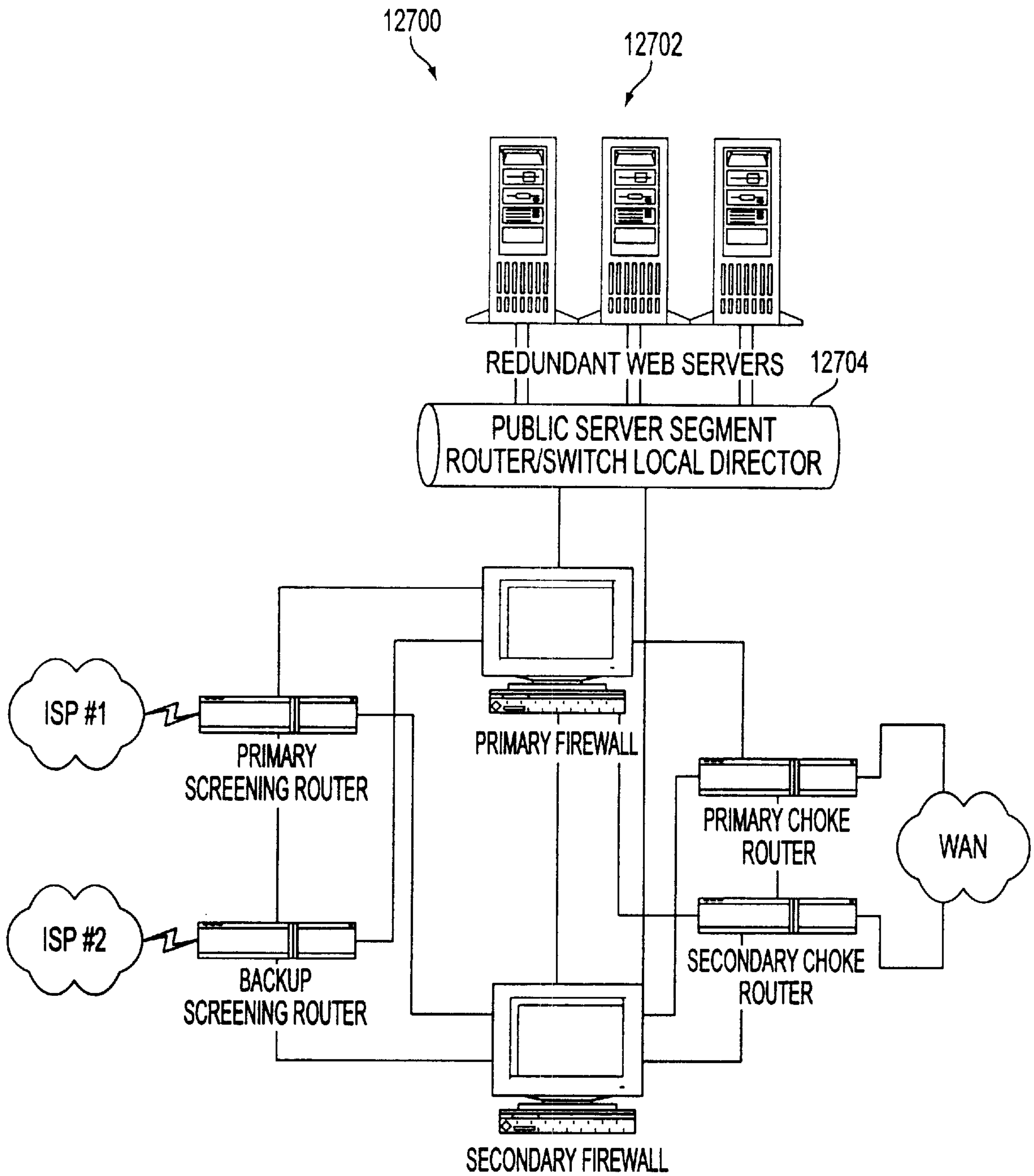
Figure 128:
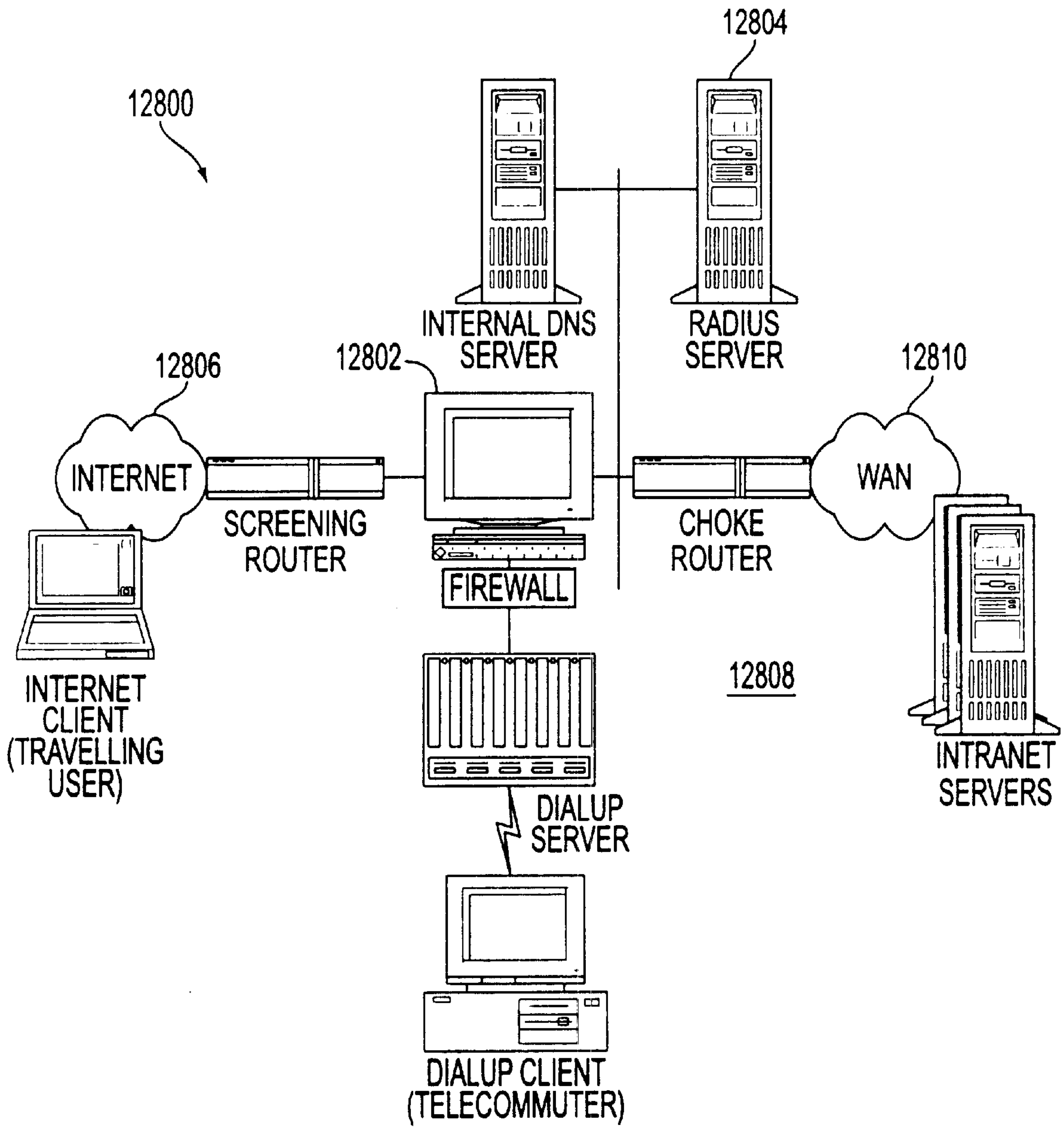
Figure 129:
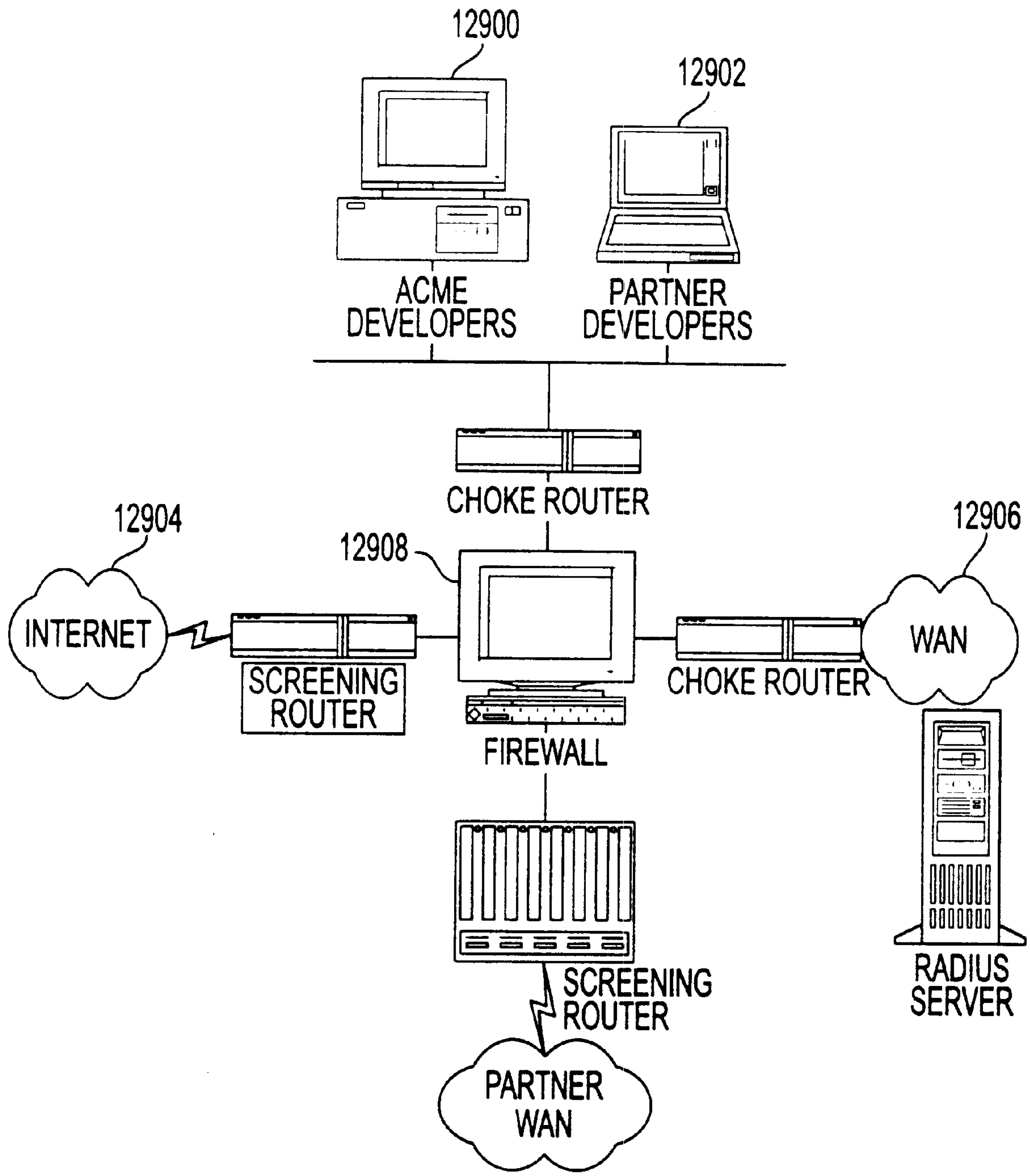
Figure 130:
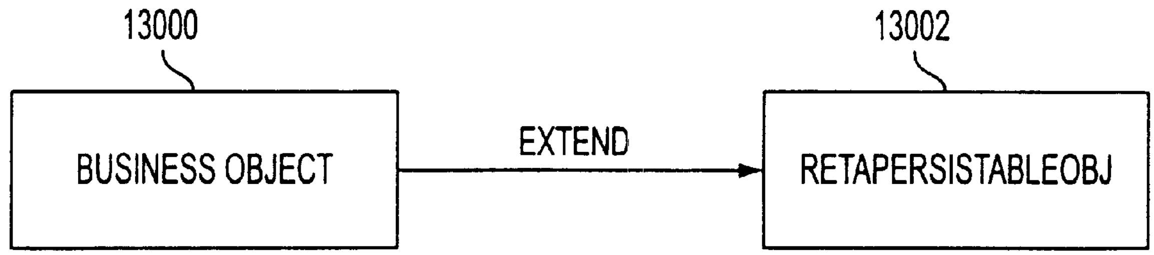
Figure 131:
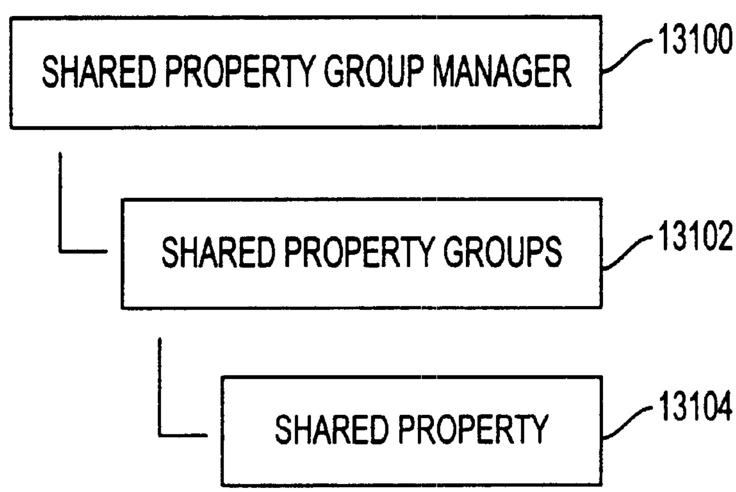
Figure 132A:
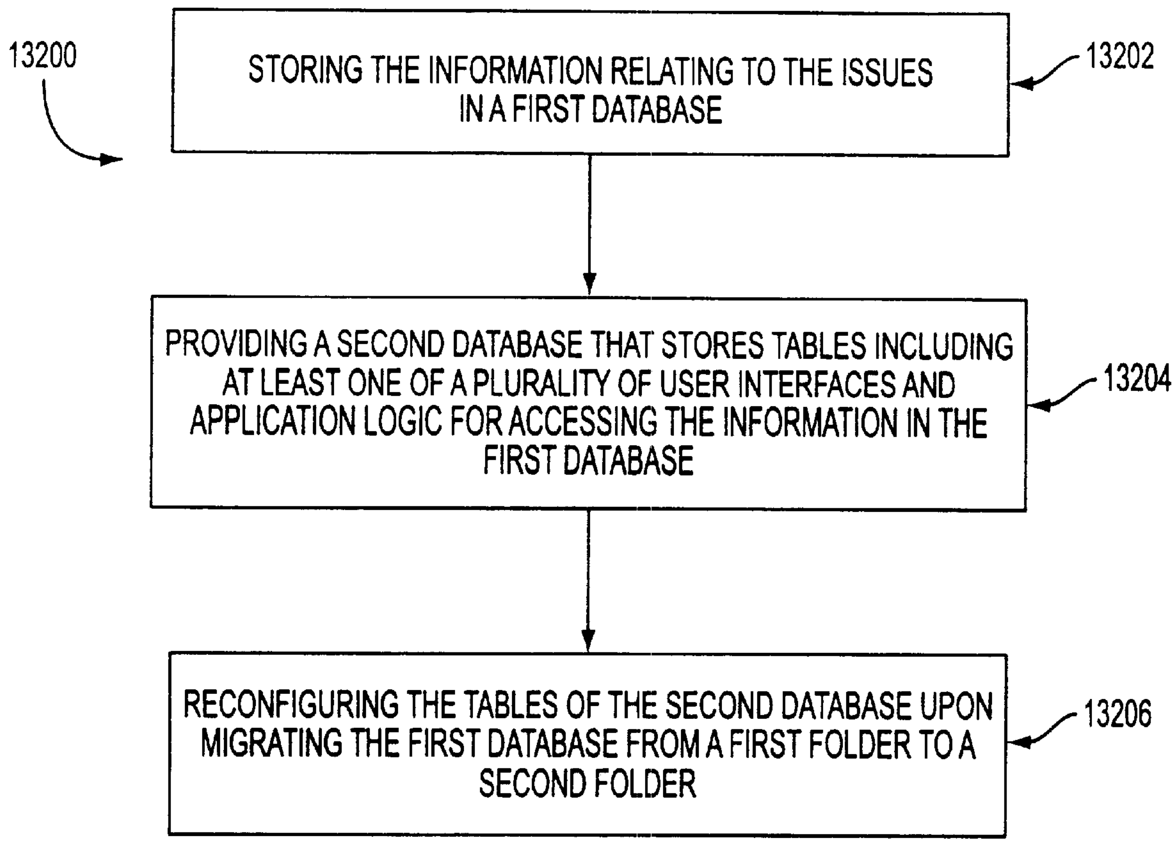
Figure 132B:
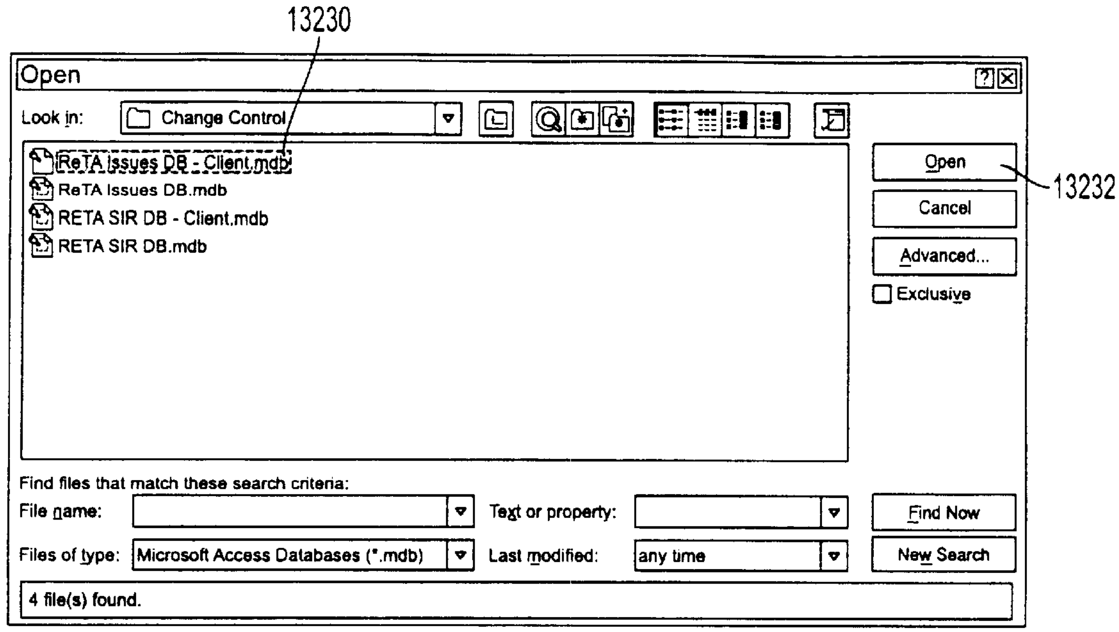
Figure 133:
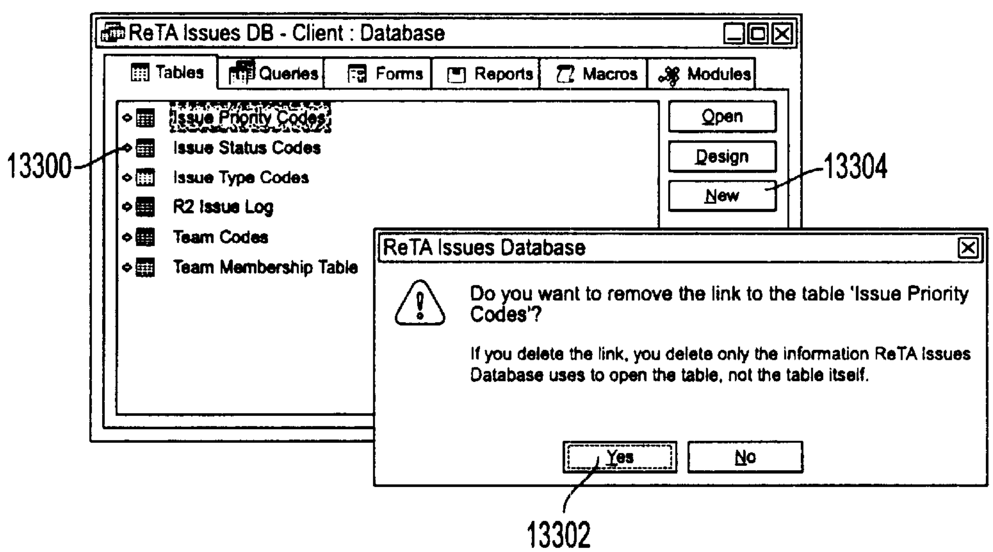
Figure 134:
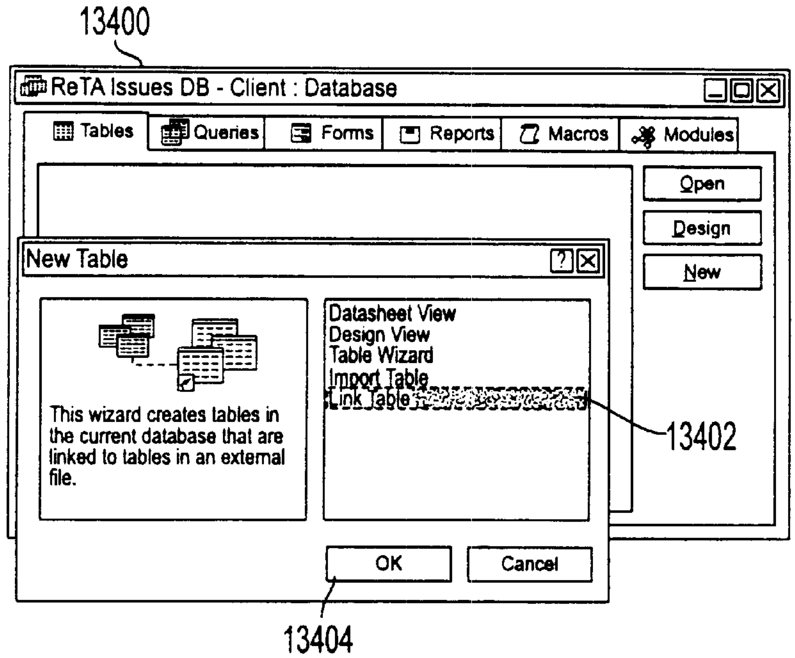
Figure 135:
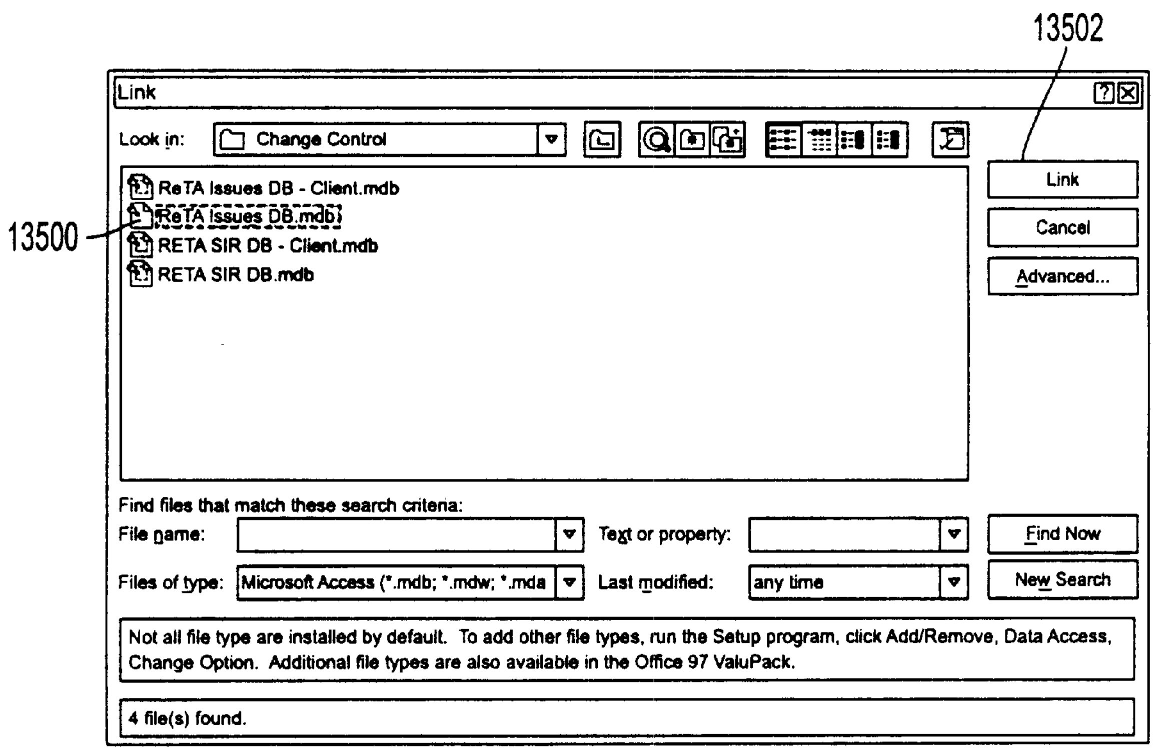
Figure 136:
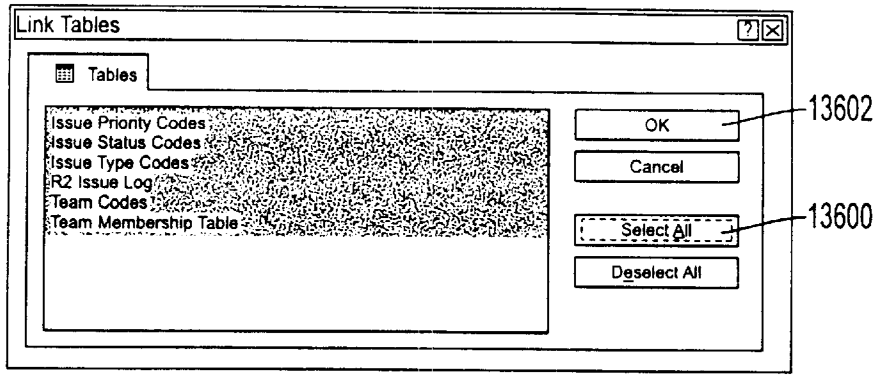
Figure 137:
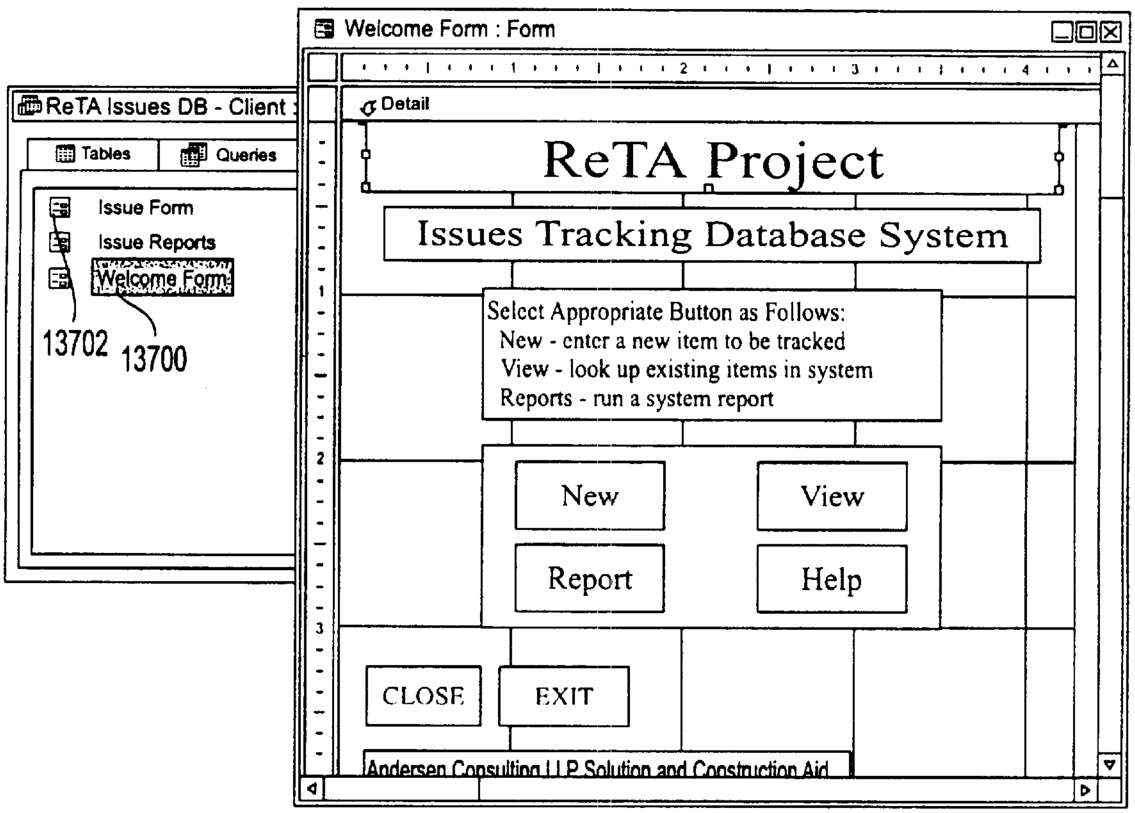
Figure 138:
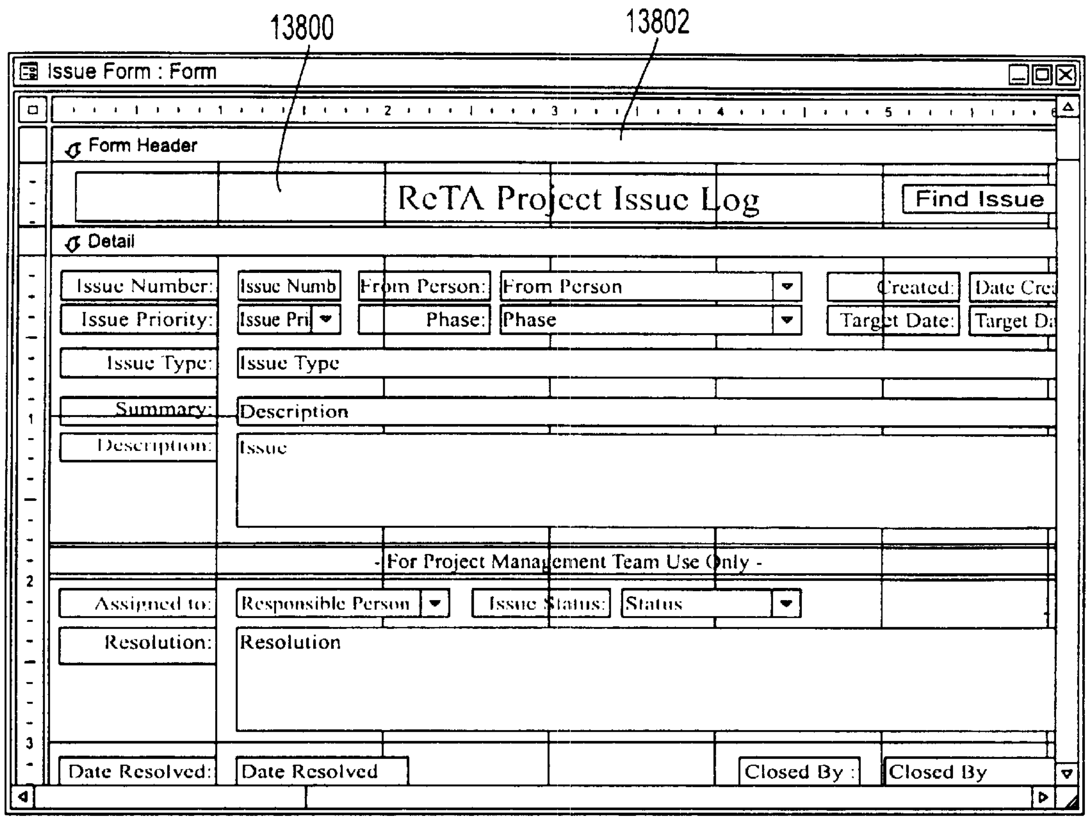
Figure 139:
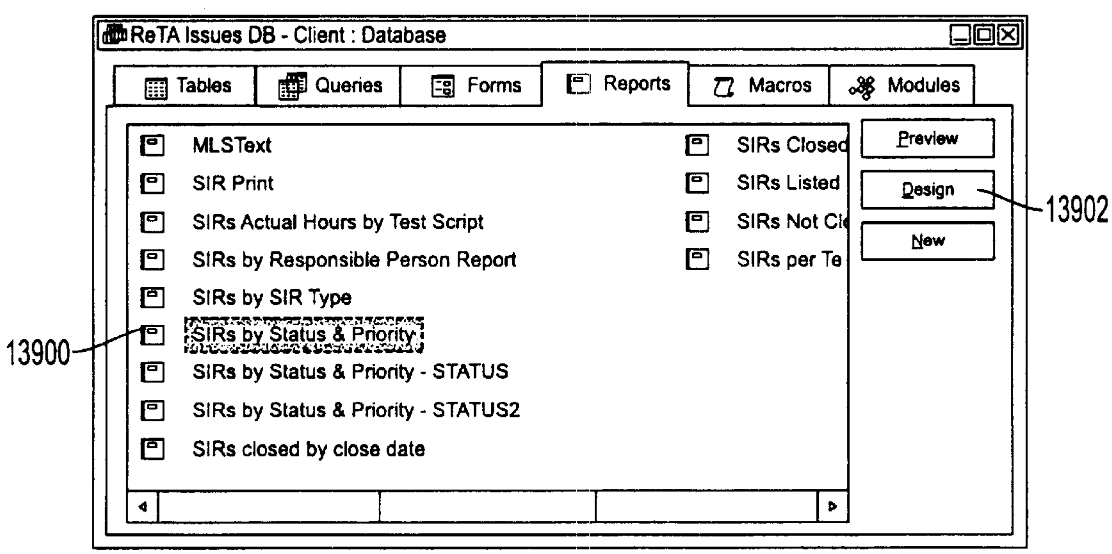
Figure 140:
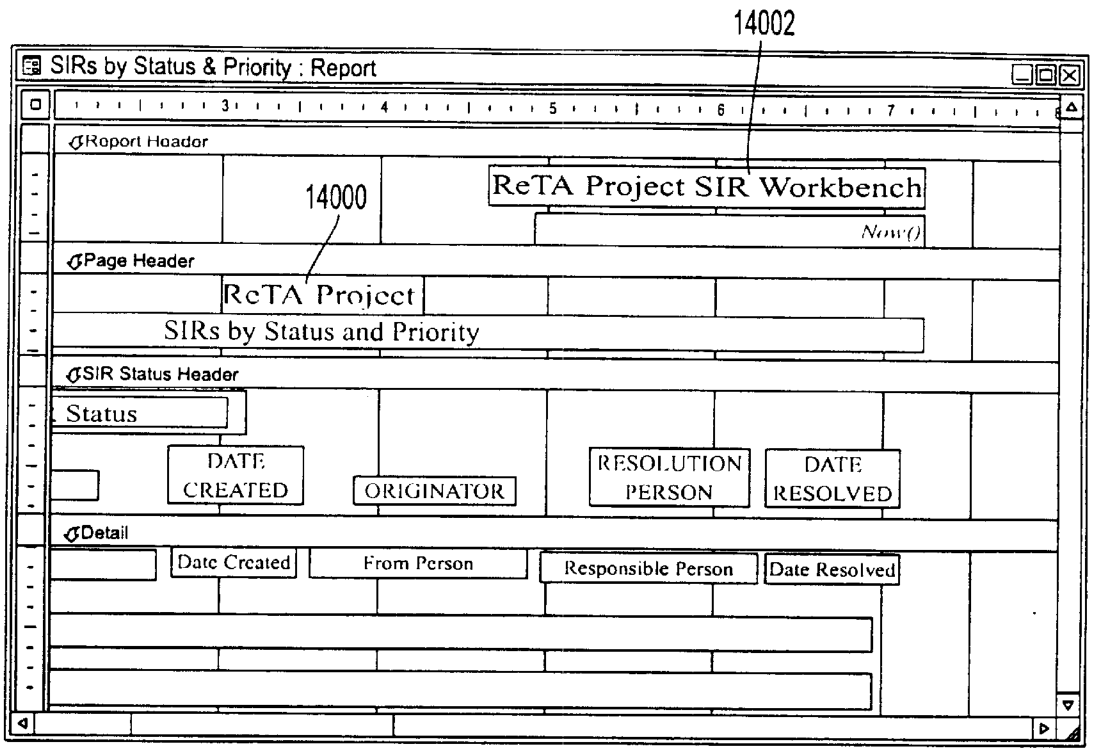
Figure 141:
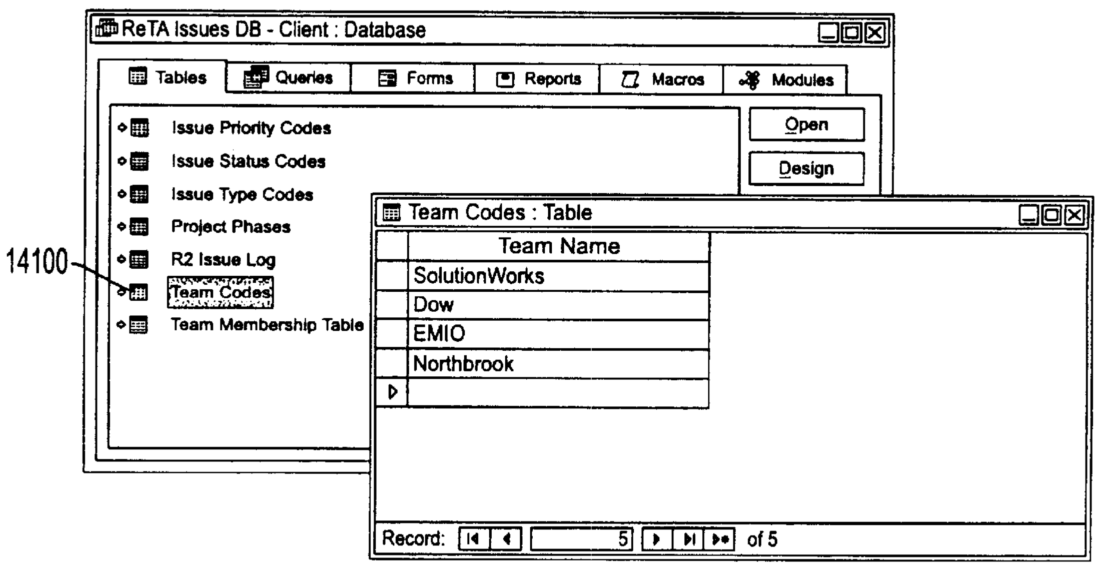
Figure 142:
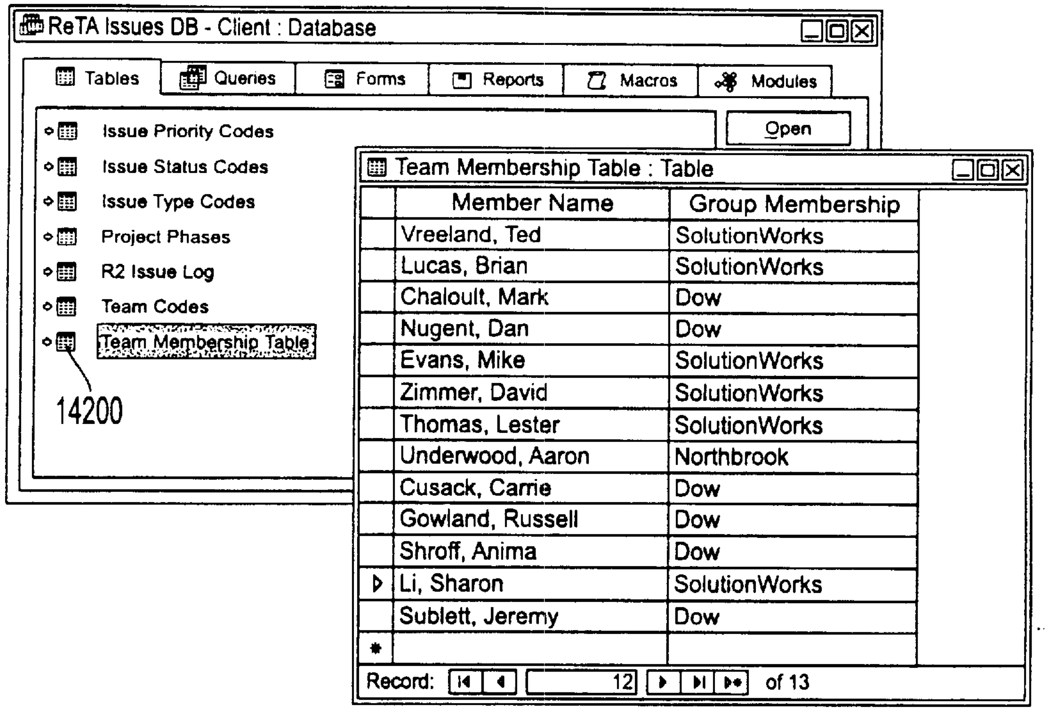
Figure 143:
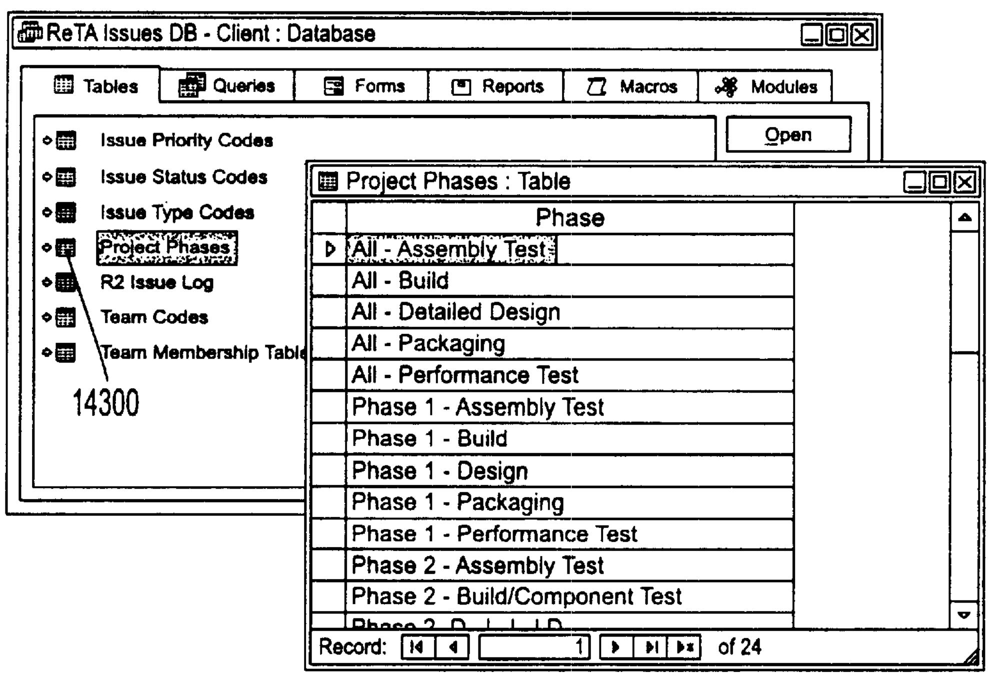
Figure 144:
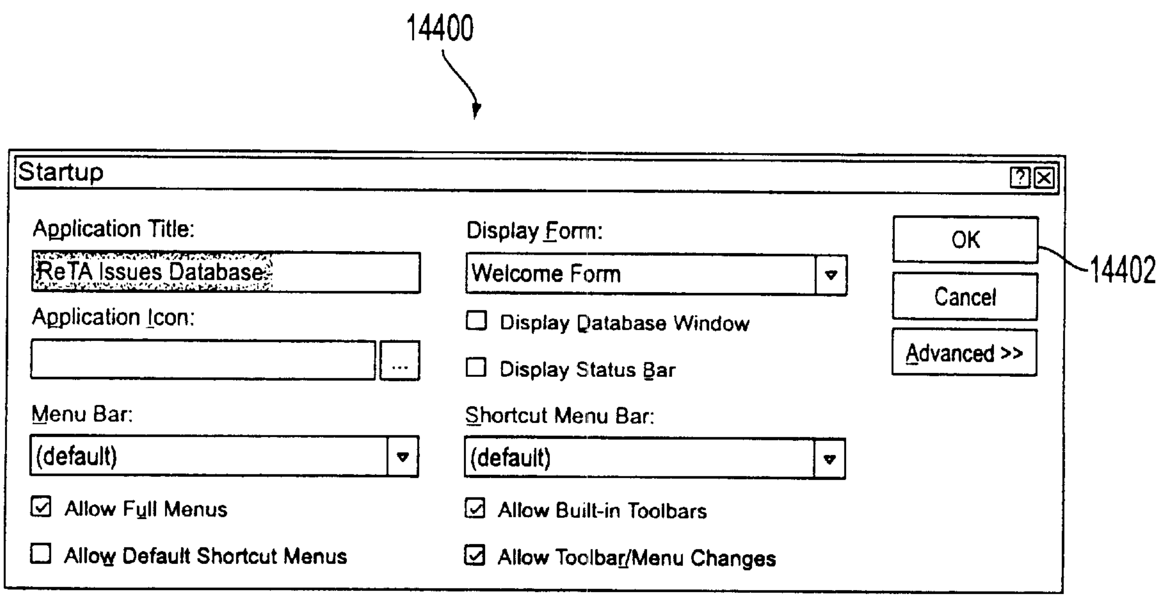
Figure 145A:
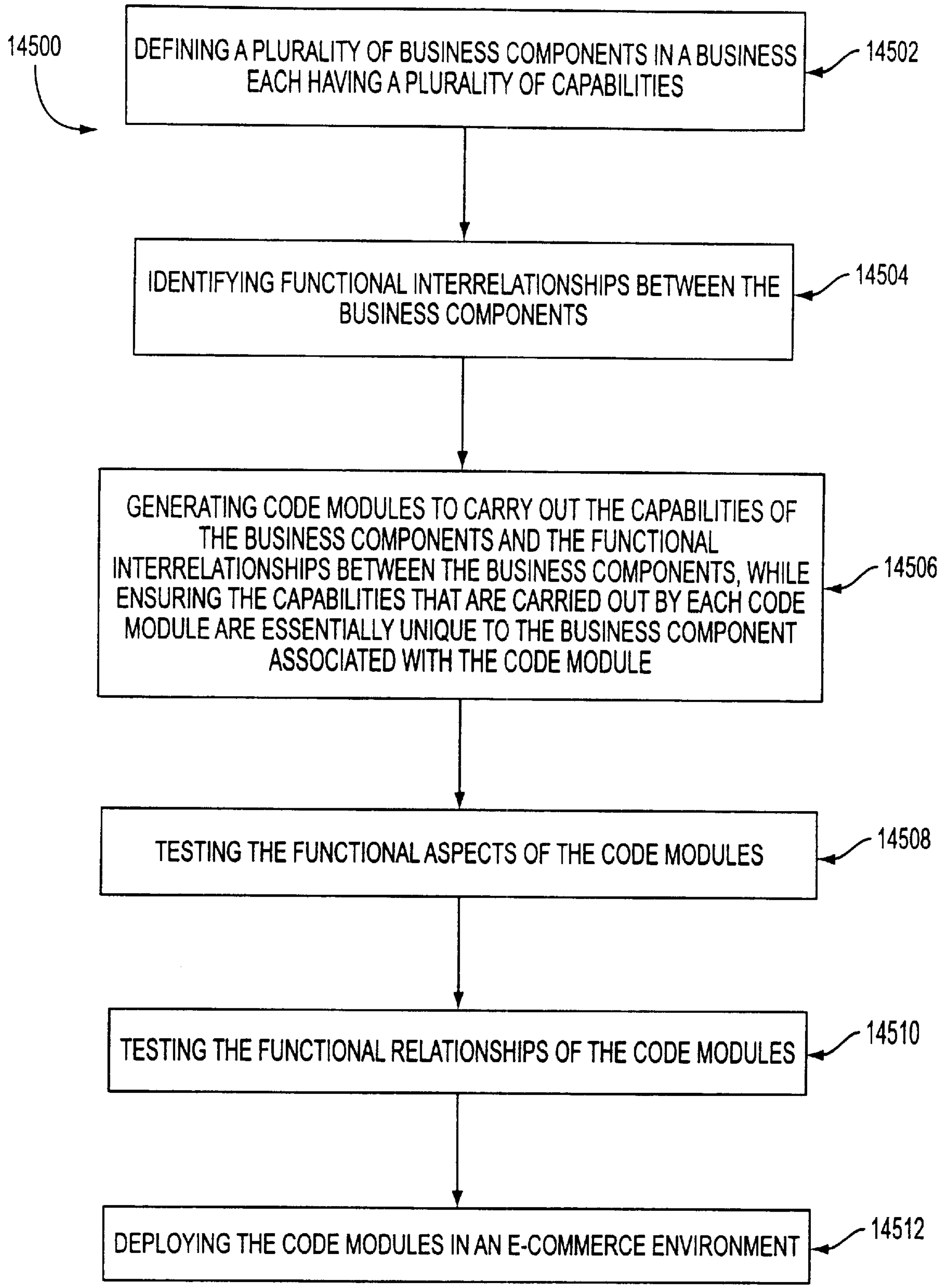
Figure 145B:
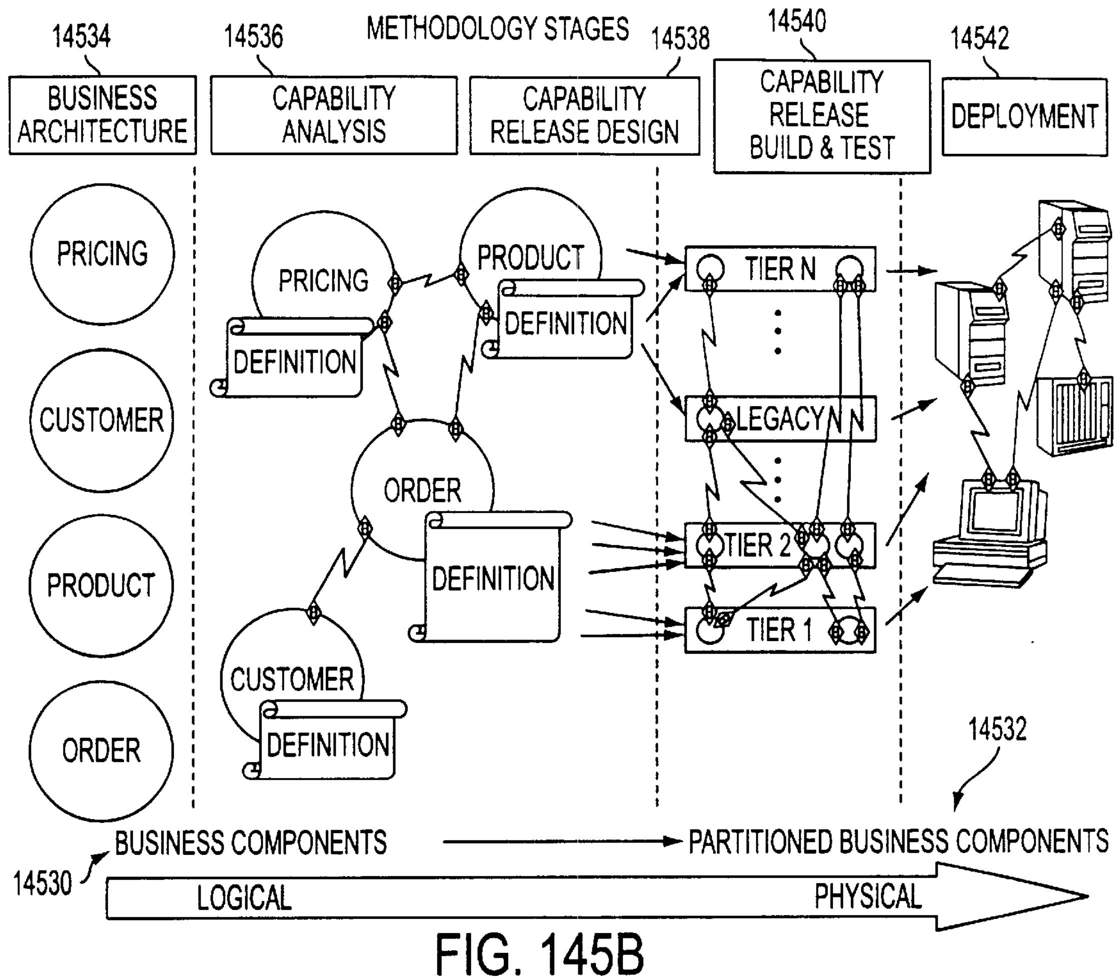
Figure 146:
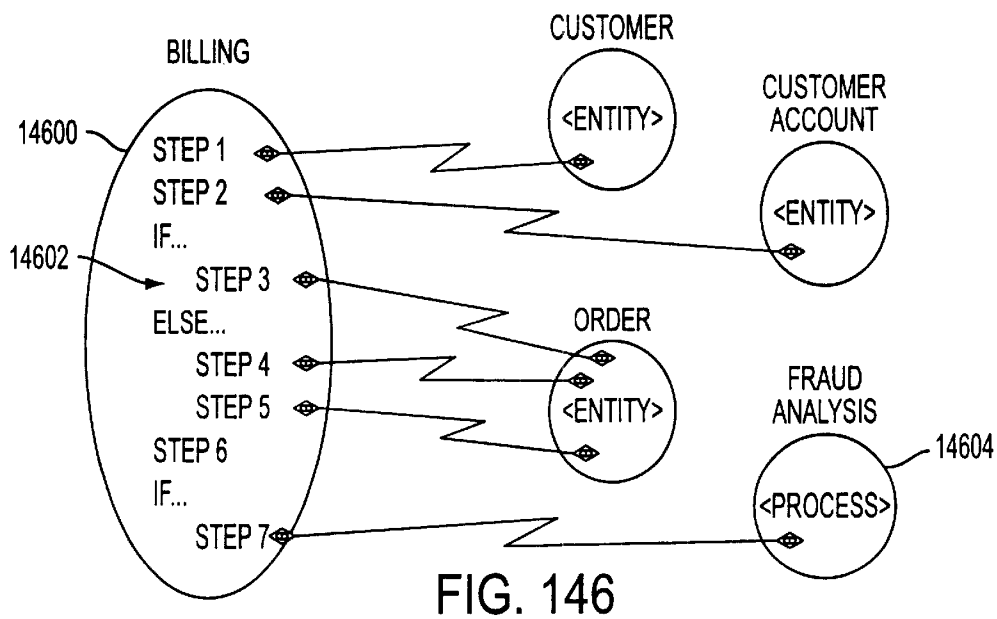
Figure 147:
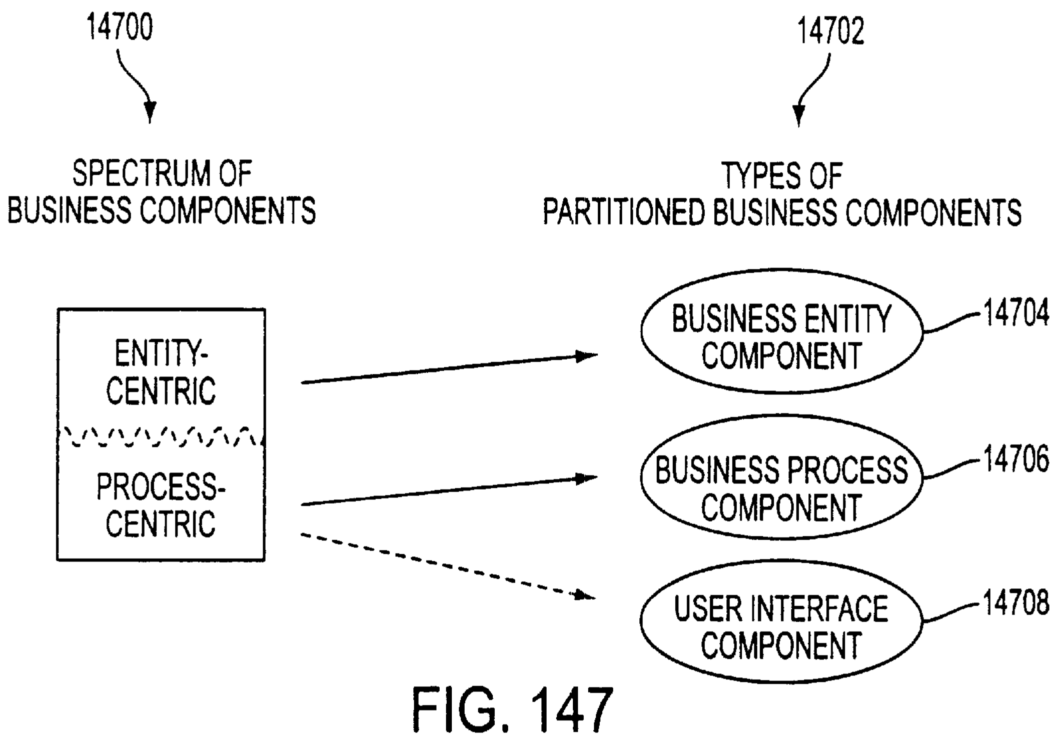
Figure 148:
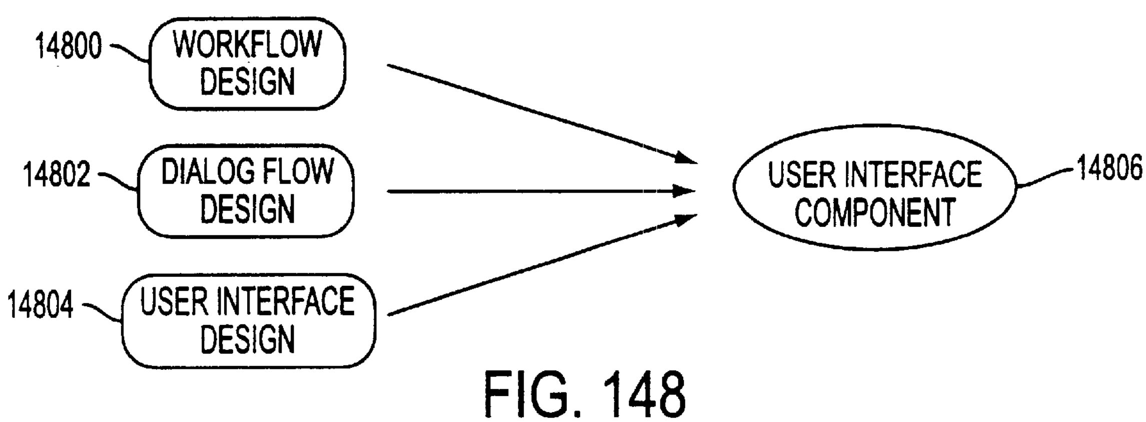
Figure 149:
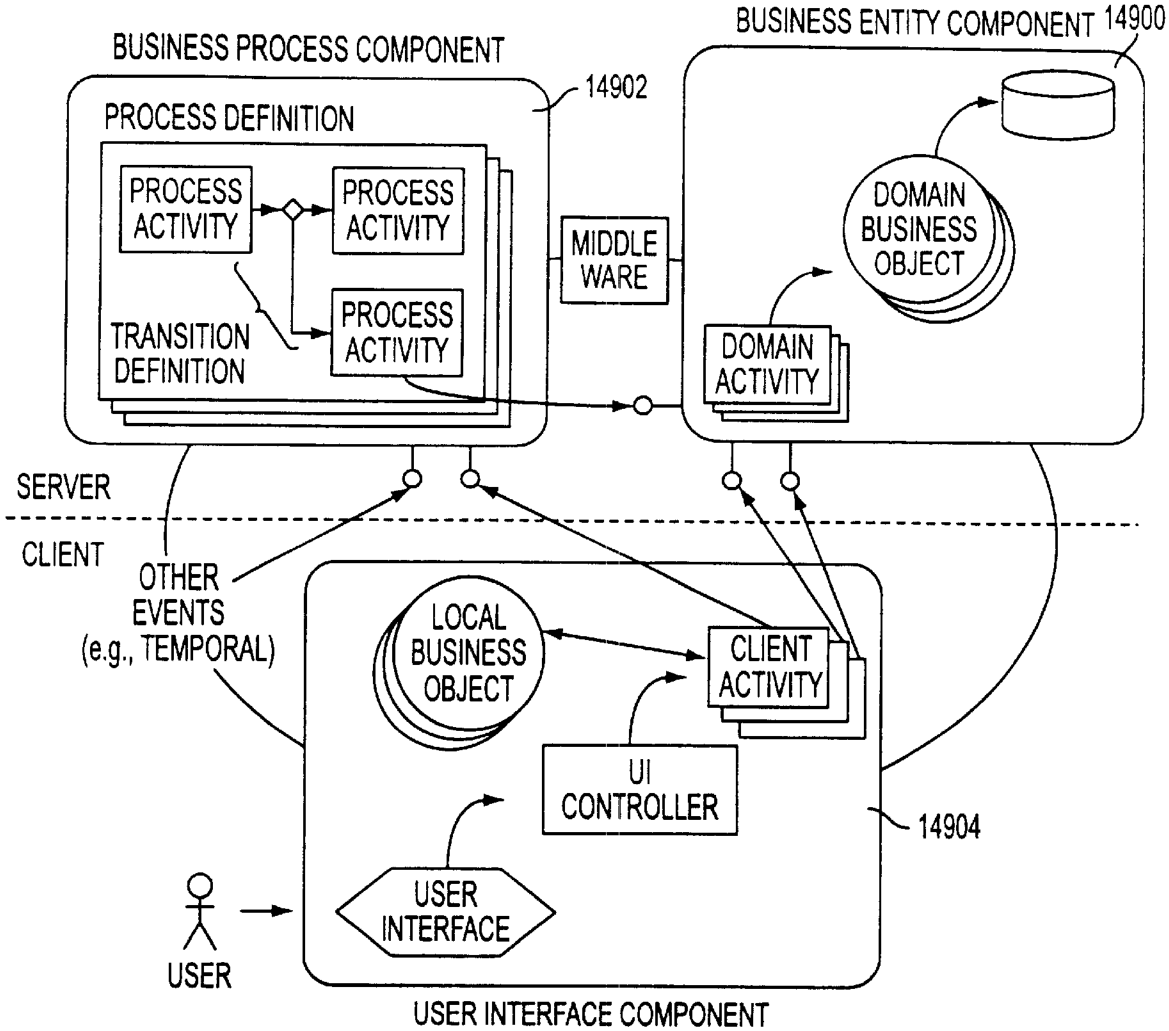
Figure 150:
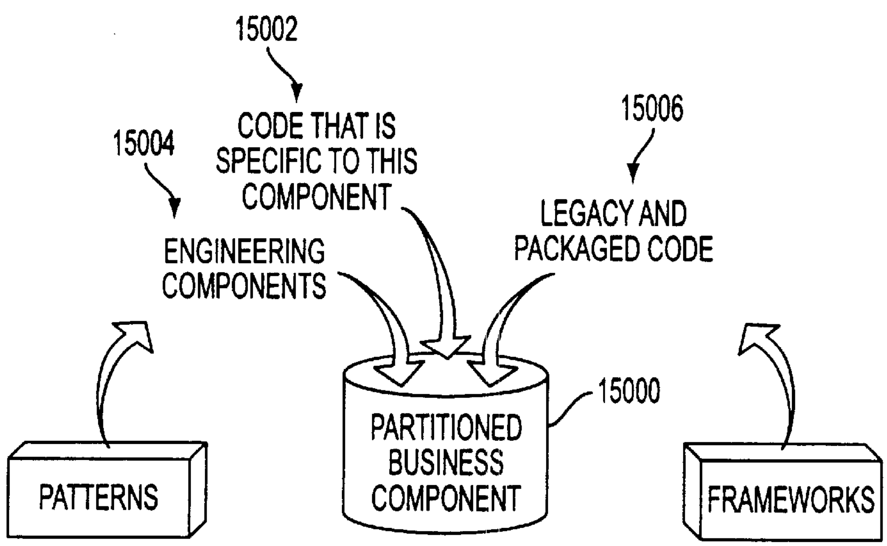
Figure 151:
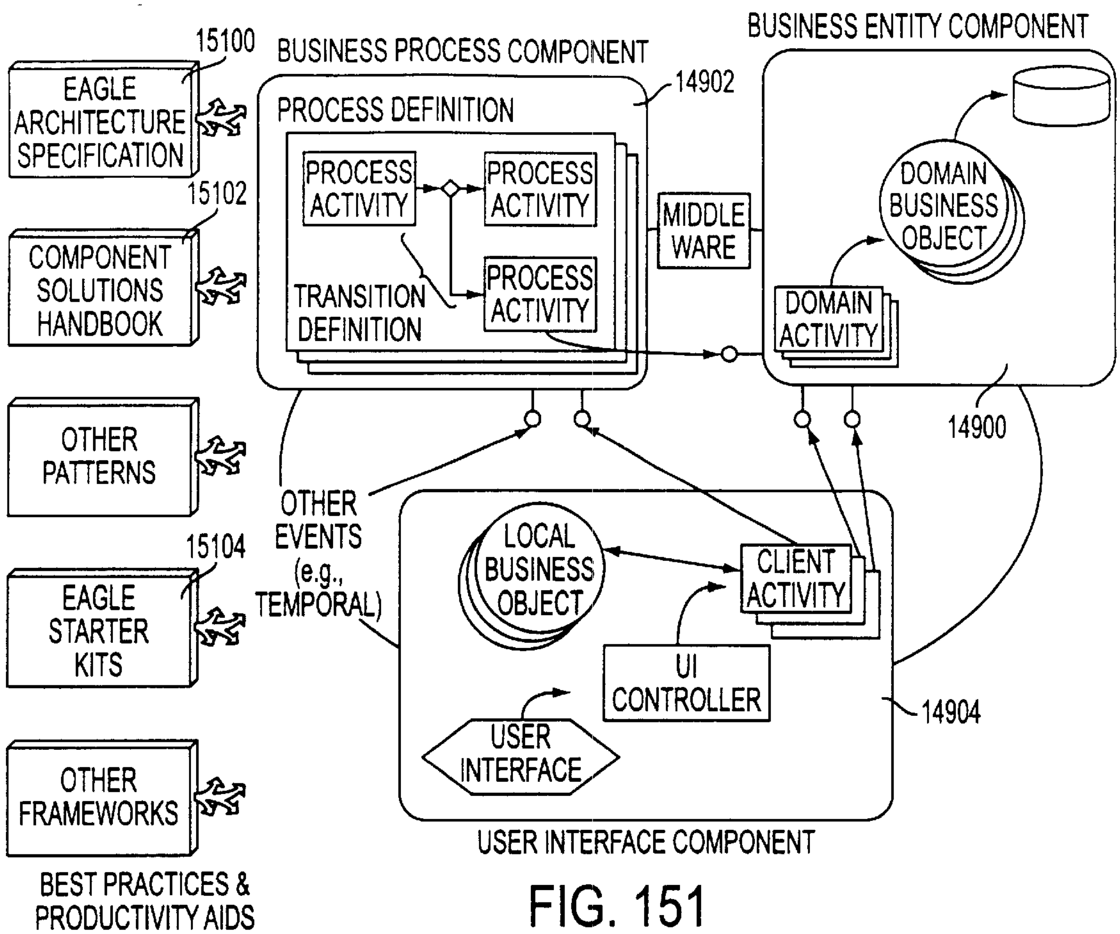
Figure 152:
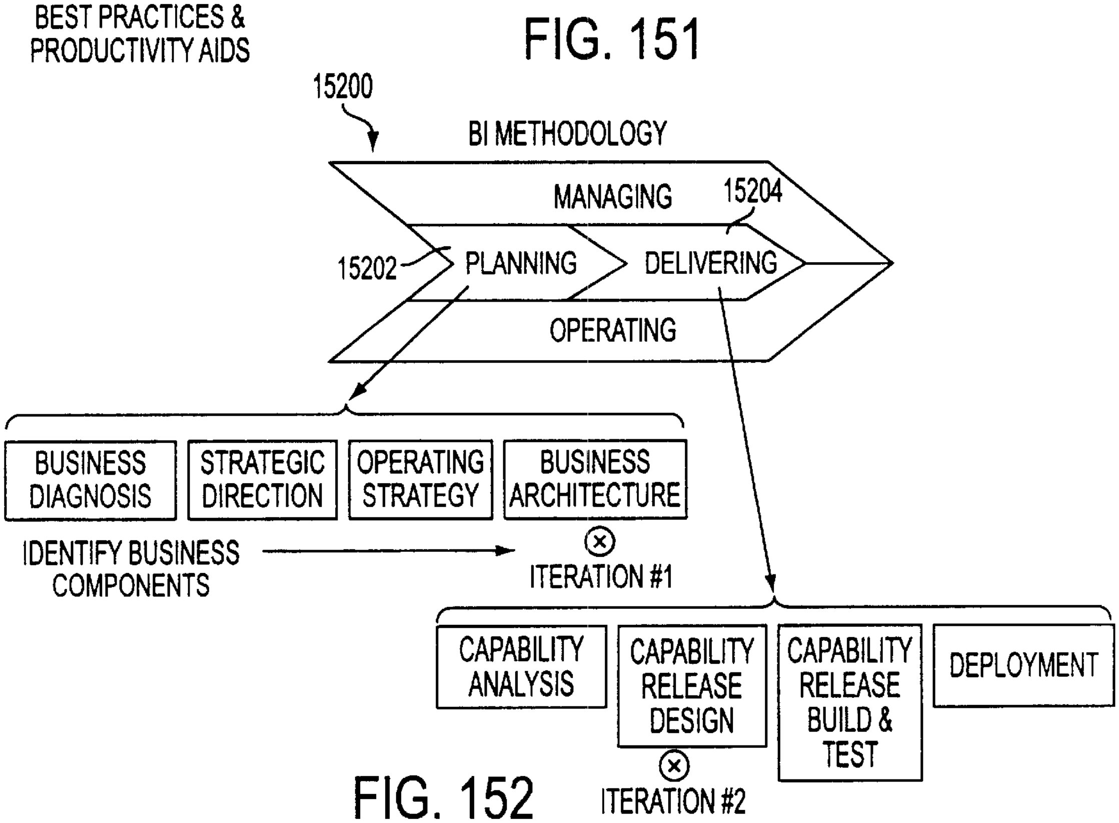
Figure 153:
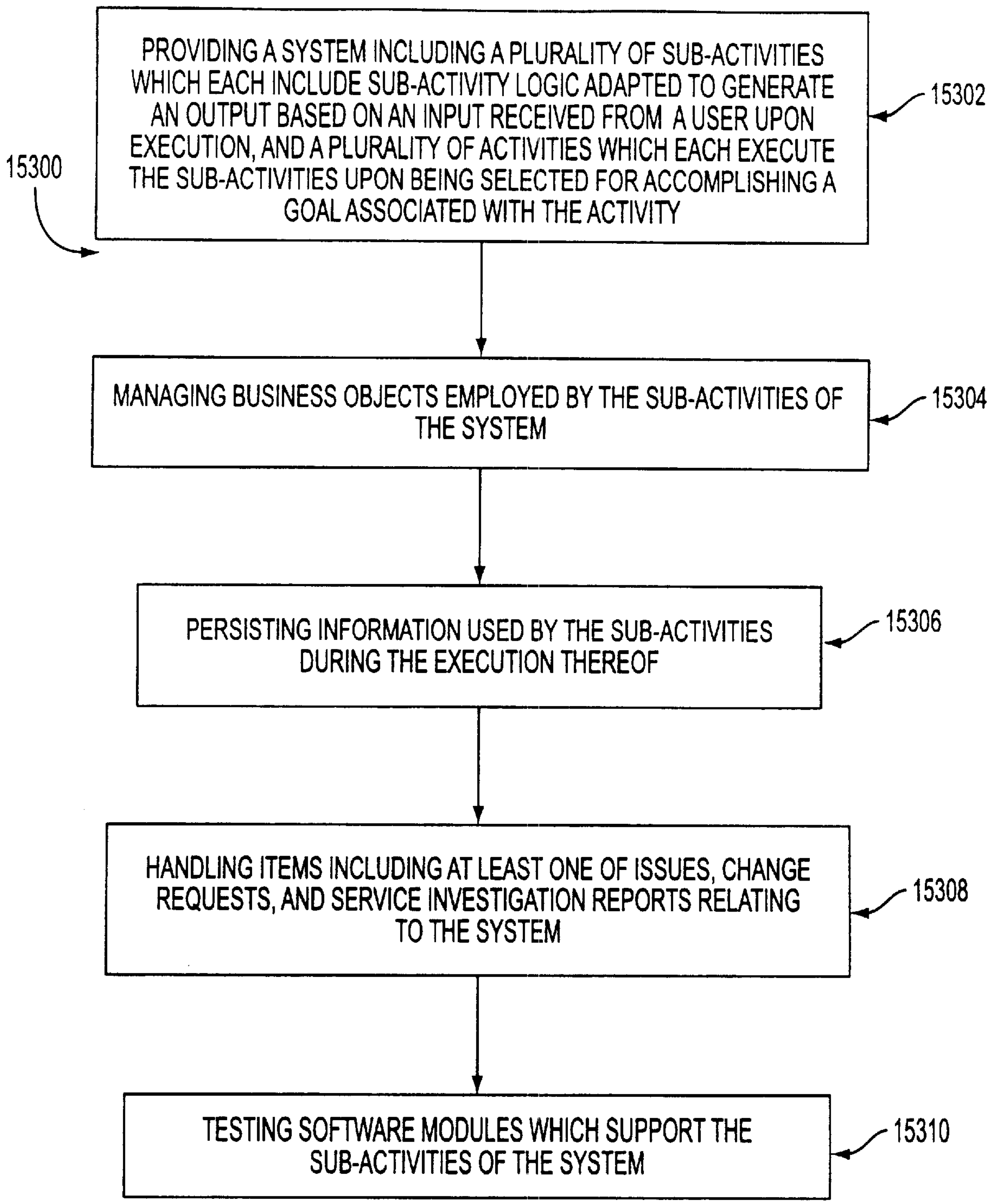
Figure 154:
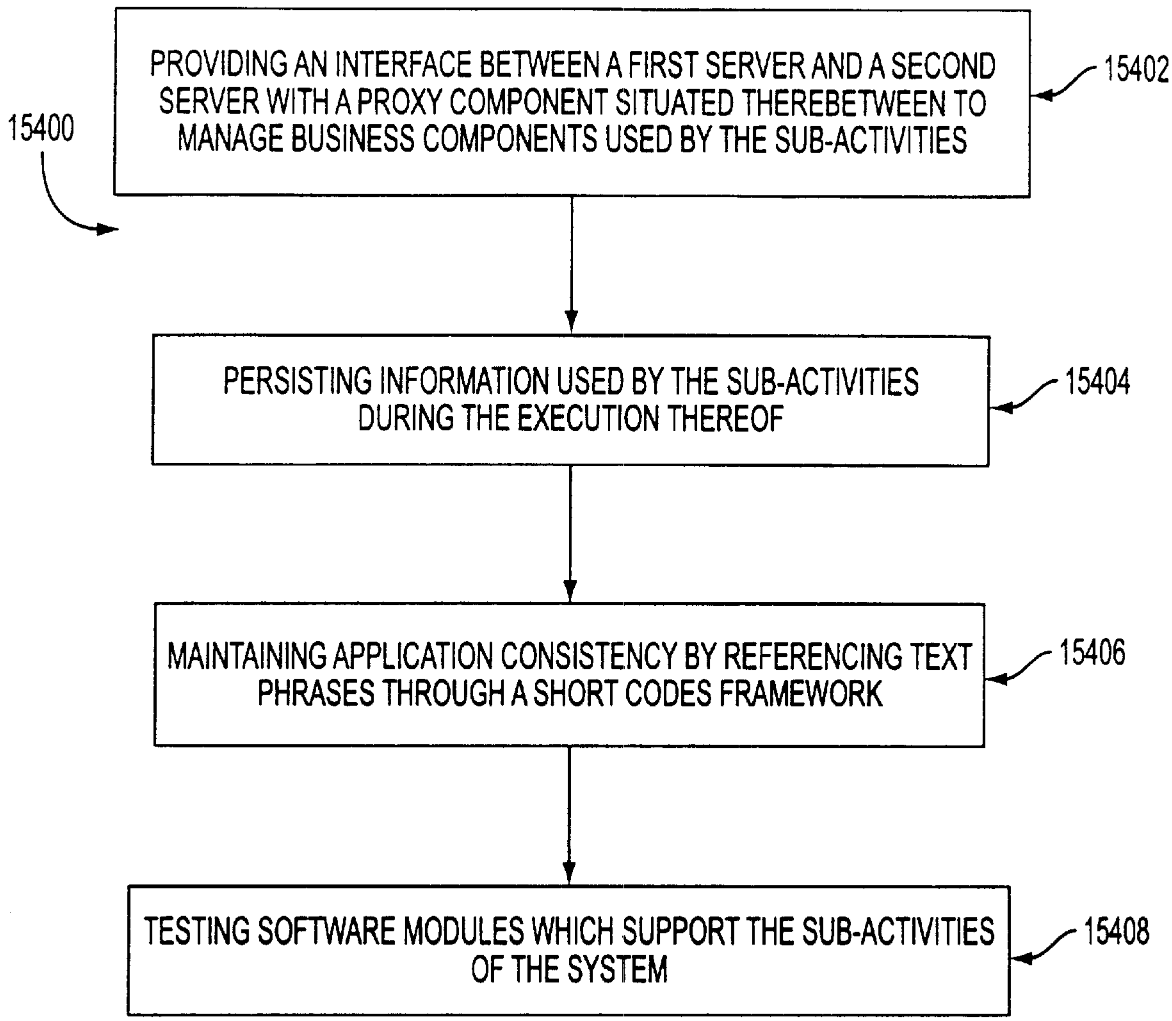
Figure 155:
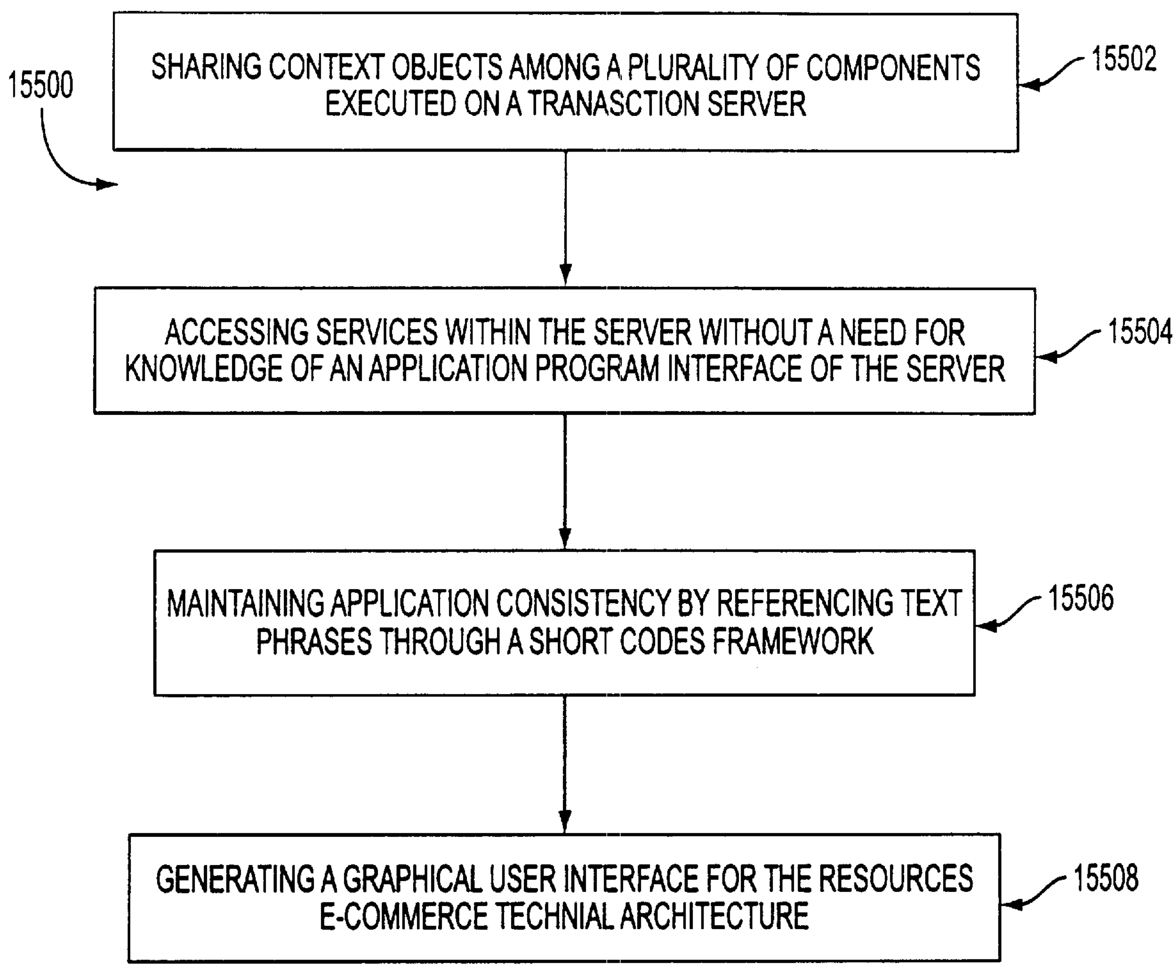
Figure 156:
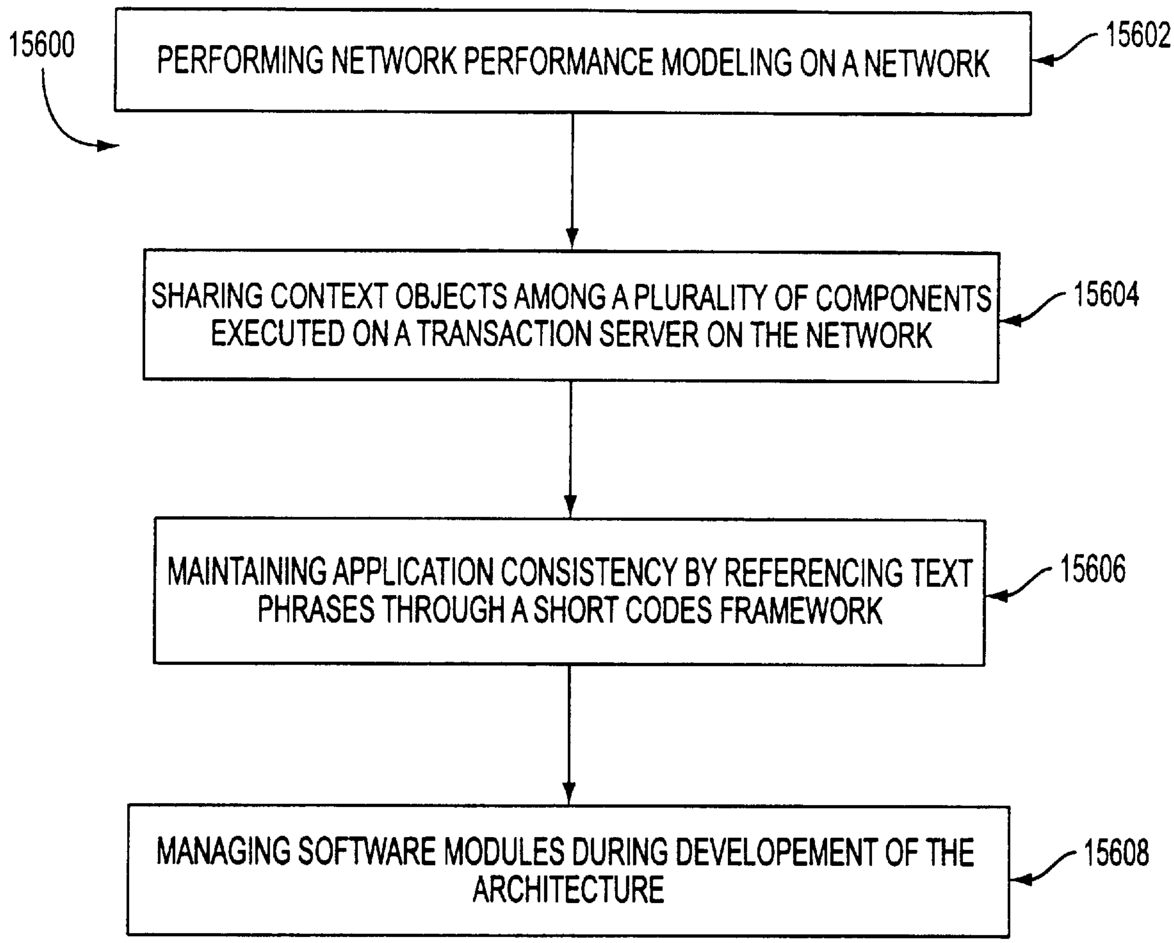
Figure 157:
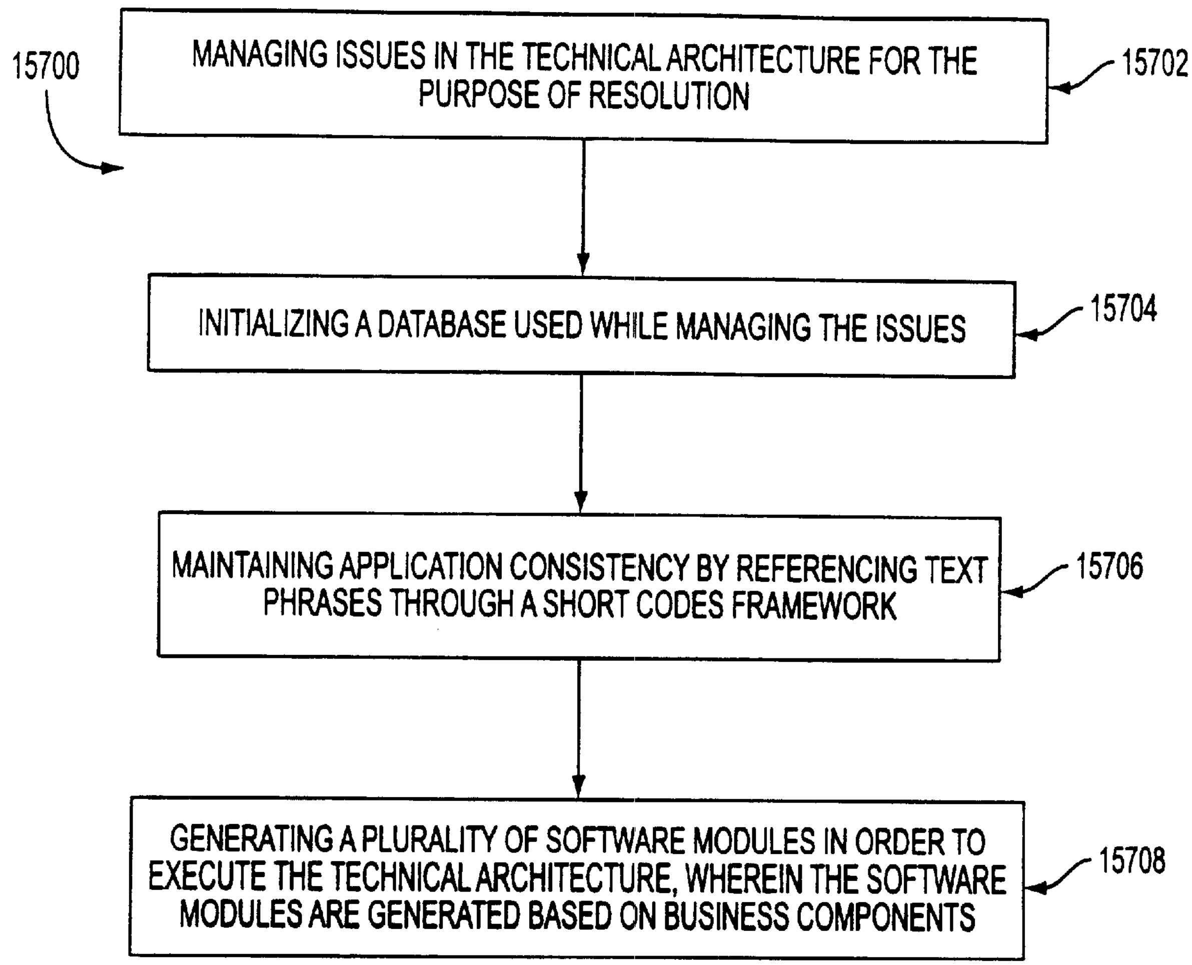

FIG. 103.1 illustrates a SIR Workbench Main Window screen which provides navigation buttons for adding new SIRs, viewing existing SIRs, viewing/printing existing reports and help according to an embodiment of the present invention;

FIG. 104 illustrates New SIR window displayed upon select the New button on the Main Window according to an embodiment of the present invention;

FIG. 105 illustrates a window for reviewing and modifying existing SIRs according to an embodiment of the present invention;

FIG. 106 illustrates the Change Control Details Window according to an embodiment of the present invention;

FIG. 107 illustrates a Report Selection Screen upon selection the Report button from the main menu according to an embodiment of the present invention;

FIG. 108 illustrates a graphic display of SourceSafe Administrator according to an embodiment of the present invention;

FIG. 109 illustrates a configuration of a project tree within Visual SourceSafe Explorer according to an embodiment of the present invention;

FIG. 109.1 illustrates a dialog box of the projection tree in FIG. 109 designed to allow developers to quickly located and retrieve desired projects and/or files according to an embodiment of the present invention;

FIG. 110 illustrates a graphic display when the user gets the latest of the server-side application code from VSS according to an embodiment of the present invention;

FIG. 111 illustrates a window that appears where selection the Recursive checkbox permits copying of any sub-projects according to an embodiment of the present invention;

FIG. 112 illustrates a History window displayed upon selection of View History menu item according to an embodiment of the present invention;

FIG. 113 illustrates the VSS Explorer reflecting the status of the checked out files for other developers to see at a point where one can open the local project or files and make any desired changes according-to an embodiment of the present invention;

FIG. 114 illustrates Check In from within the VSS Explorer according to an embodiment of the present invention;

FIG. 115 illustrates the prompting for Check In details according to an embodiment of the present invention;

FIG. 116 illustrates a label creation dialog box according to an embodiment of the present invention;

FIG. 117 illustrates a History of Project dialog box according to an embodiment of the present invention;

FIG. 118 illustrates a History Details dialog according to an embodiment of the present invention;

FIG. 119 illustrates the end to end evaluation process of an Internet firewall for ReTA according to an embodiment of the present invention;

FIG. 120 is a chart of Firewall Products according to an embodiment of the present invention;

FIG. 121 depicts the two firewall vendors selected for the product evaluation stage according to an embodiment of the present invention;

FIG. 122 is a diagram of the Activity Framework classes with the VBActivityWrapper according to an embodiment of the present invention;

FIG. 123 illustrates the relationships IVB Activity interface according to an embodiment of the present invention;

FIG. 124 is a flow chart depicting a method for providing a global internetworking gateway architecture in an e-commerce environment;

FIG. 124.1 illustrates a simple high level internetworking gateway architecture according to an embodiment of the present invention;

FIG. 125 illustrates an Internetworking Gateway with a Specialized Proxy/Cache Server according to an embodiment of the present invention;

FIG. 126 illustrates a high level global internetworking gateway architecture according to an embodiment of the present invention;

FIG. 127 shows an illustrative West Coast internetworking gateway architecture according to an embodiment of the present invention;

FIG. 128 shows a Remote Access Internetworking Gateway architecture according to an embodiment of the present invention;

FIG. 129 illustrates an Internetworking Gateway with Partner collaboration on Internet Development according to an embodiment of the present invention;

FIG. 130 illustrates a persistable business object extending Persistence. RetaPersistableObj. According to an embodiment of the present invention;

FIG. 131 illustrates layers of a shared property group manager according to an embodiment of the present invention;

FIG. 132 is a flow chart depicting a method for initializing a database used with an issue tracker;

FIG. 132.1 illustrates configuring of an issue tracker tool for normal operation according to an embodiment of the present invention;

FIG. 133 illustrates a dialog box prompting to confirm the removal of linked tables within a database;

FIG. 134 illustrates a New Table' dialog window being displayed upon selection of a 'New' button in order to insert a new table according to an embodiment of the present invention;

FIG. 135 illustrates a prompting by Access for selecting tables to link according to an embodiment of the present invention;

FIG. 136 illustrates a dialog box indicating linked tables according to an embodiment of the present invention;

FIG. 137 illustrates a 'Welcome Form' window according to an embodiment of the present invention;

FIG. 138 illustrates a 'Issue Form' window according to an embodiment of the present invention;

FIG. 139 illustrates a window which permits modification of the available reports within the Issue tool according to an embodiment of the present invention;

FIG. 140 illustrates a window displayed permitting modification of desired report elements to the new project name according to an embodiment of the present invention;

FIG. 141 illustrates a Team Code Table window which allows adding and deleting of project locations according to an embodiment of the present invention;

FIG. 142 illustrates a Team Membership Table window which allows adding and deleting of team members according to an embodiment of the present invention;

FIG. 143 illustrates a Project Phases Table window which allows changing of project phases according to an embodiment of the present invention;

FIG. 144 illustrates a Startup window which allows changing of the title of a database according to an embodiment of the present invention;

FIG. 145 is a flowchart depicting a method for generating software based on business components;

FIG. 145.1 illustrates a relationship between business components and partitioned business components according to an embodiment of the present invention;

FIG. 146 illustrates how a Billing Business Component may create an invoice according to an embodiment of the present invention;

FIG. 147 illustrates the relationship between the spectrum of Business Components and the types of Partitioned Business Components according to an embodiment of the present invention;

FIG. 148 illustrates the flow of workflow, dialog flow, and/or user interface designs to a User Interface Component according to an embodiment of the present invention;

FIG. 149 is a diagram of the Eagle Application Model which illustrates how the different types of Partitioned Business Components may interact with each other according to an embodiment of the present invention;

FIG. 150 illustrates what makes up a Partitioned Business Component according to an embodiment of the present invention;

FIG. 151 illustrates the role of patterns and frameworks according to an embodiment of the present invention;

FIG. 152 illustrates a Business Component Identifying Methodology according to an embodiment of the present invention;

FIG. 153 is a flow chart depicting an exemplary embodiment of a resources e-commerce technical architecture;

FIG. 154 is a flow chart illustrating a second exemplary embodiment of a method for maintaining data in an e-commerce based technical architecture;

FIG. 155 is a flow chart illustrating an exemplary embodiment of a method for providing a resources e-commerce technical architecture;

FIG. 156 illustrates another exemplary embodiment of a method for providing a resources e-commerce technical architecture; and FIG. 157 illustrates an additional exemplary embodiment of a method for providing a resources e-commerce technical architecture.

DETAILED DESCRIPTION OF THE INVENTION

The Resources eCommerce Technology Architecture (ReTA) is a solution that allows the use of packaged components to be integrated into a client based eCommerce solution. Before the present invention, the Resources architecture offerings provided services that supported the construction, execution and operation of very large custom built solutions. In the last few years, client needs have shifted towards requirements for solutions that continually integrate well with third party applications (i.e., data warehouse and portion of the present description management systems). Previous engagements have proven that it is difficult to integrate these applications into a new solution. As application vendors continue to produce new releases that incorporate technical advancements, it is even more difficult to ensure that these integrated applications continue to work with a given solution.

The ReTA approach to constructing, executing and operating a solution emphasizes the ability to change solution components with minimal impact on the solution as a whole. From this approach, ReTA views third party applications as another component in the overall solution. ReTA is component based, which means the engagement can choose to take only the pieces it needs to meet its specific business requirements. ReTA is especially suited to building small applications, implementing tools and packages, integrating applications and web enabling applications.

ReTA leverages the best capabilities from established market leaders such as Microsoft, SAP and Oracle. In addition, ReTA leverages some of the Resources prior efforts to integrate solutions. The present invention is an assembly of these best capabilities that helps to ensure a holistic delivered solution.

In short, the benefits ReTA provides to the Resources practice and clients arc:

- Save engagement teams the redundant effort of repeatedly evaluating the same technology.
- Help engagement teams avoid the risk of combining solution components that may be difficult to get to work together.
- Make it cost effective and low risk to apply upgrades to each of the solution products without negatively affecting the other solution components.

Show the clients a solution to a real challenge that cannot be offered by SAP, Microsoft, IBM, Oracle or many technology startups involved in eCommerce work.

Focus the Resources architecture offering on common technology choices that coexist nicely.

In accordance with at least one embodiment of the present invention, a system is provided for affording various features which support a resources eCommerce Technical Architecture. The present invention may be enabled using a hardware implementation such as that illustrated in FIG. 1. Further, various functional and user interface features of one embodiment of the present invention may be enabled using software programming, i.e. object oriented programming (OOP).

Hardware Overview

A representative hardware environment of a preferred embodiment of the present invention is depicted in FIG. 1, which illustrates a typical hardware configuration of a workstation having a central processing unit 110, such as a microprocessor, and a number of other units interconnected via a system bus 112. The workstation shown in FIG. 1 includes Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system.

Software Overview

Object oriented programming (OOP) has become increasingly used to develop complex applications. As OOP moves toward the mainstream of software design and development, various software solutions require adaptation to make use of the benefits of OOP. A need exists for the principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each other's capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston en engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with them (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, the logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increase in the speed of its development.

Programming languages are beginning to fully support the OOP principles, such as encapsulation, inheritance, polymorphism; and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other.

Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making all these things work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain: It typically includes objects that provide default behavior (e.g., for menus and windows), and programmers use it by inheriting some of that default behavior and overriding other behavior so that the framework calls application code at the appropriate times. There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and a company. HTTP or other protocols could be readily substituted for HTML without undue experimentation. Information on these products is available in T. Berners-Lee, D. Connoly, " RFC 1866: Hypertext Markup Language -2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, which are fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Various aspects of ReTA will now be set forth under separate headings:

Codes Table Framework

With reference to FIG. 1.1, a codes table framework 140 is provided for maintaining application consistency by referencing text phrases through a short codes framework. First, in operation 142, a table of codes each having a text phrase associated therewith is provided. Such table of codes is stored on a local storage medium. Next, in operation 144, the table of codes is accessed on the local storage medium. One of the text phrases is subsequently retrieved by selecting a corresponding one of the codes of the table, as indicated in operation 146. During operation, modification of the text phrases associated with each of the codes of the table is permitted. See operation 148.

The modification may be carried out during a business logic execution. Further, various services may be provided such as retrieving a single one of the text phrases, retrieving all of the text phrases in response to a single command, updating a single code and text phrase combination, updating all of the code and text phrase combinations, naming the table, adding a new code and text phrase combination, removing one of the code and text phrase combinations, and/or adding another table.

Further, a name of the table may be stored upon retrieval of the text phrase. Further, a total number of code and text phrase combinations in the table may be determined and stored. In the case where a plurality of tables are provided, any number of the tables may be removed during operation. Additional information will be now be discussed relative to the various foregoing operations.

This portion of the present description details the ReTA Codes Table framework design from the perspective of the application developer. The purpose of a codes table is to maintain application consistency by referencing text phrases (to be displayed to the end user) through short codes. The code and text phrase (decode) are stored in a standard table format. The codes table component stores this table locally on the web server, thus reducing the overhead of accessing the database each time the application needs to translate a code.

Description

The role of this framework is to store frequently used code/decode sets on the web server and provide services that enable the application developer to retrieve the decode(s) associated with code(s). In addition, the framework provides services to enable the developer to modify the contents of the locally stored codes table during business logic execution.

Services

The Codes Table Framework provides the following services:

| Service | Detail |
|---|---|
| Retrieve from Codes Table | Retrieve single decode value<br>Retrieve all decode values |
| Maintain Codes Table | Update single Code/Decode<br>Update all Codes/Decodes<br>Set Table Name<br>Add new Code/Decode<br>Remove Code/Decode<br>Add Table<br>Remove Table |

Components

The Codes Table Framework consist of the following COM objects:

| Component | Service |
|---|---|
| AFRetrieval | Retrieve decode(s) from the codes table. |
| AFMaintenance | Maintain the codes table. |

These components are described in detailed in the following sub-sections.

AFRetrieval

The AFRetrieval component enables the application developer to load the specified codes table into local memory (for faster access) and retrieve the requested decode (s).

Methods

The IAFRetrieval interface defines the access to the AFRetrieval component. This interface supports the following methods:

| Method | Description |
|---|---|
| setTableName | Retrieve the requested codes table into local memory and store the table name for subsequent retrieval requests (instead of retrieving from MTS shared memory). |
| getDecode | Search through the currently identified local codes table and return the 'decode' associated with the 'code'. Refer to setTableName method. |
| getNumRows | Return the number of code/decode pairs contained in the currently identified local codes table. Refer to setTableName method. |
| getCodesTable | Return all the codes and decodes for the specified codes table. |

AFMaintenance

The AFMaintenance component maintains the specified local codes table.

Methods

The IAFMaintenance interface defines the access to the AFMaintenance component. This interface supports the following methods:

| Method | Definition |
|---|---|
| setTableName | Store the name of local codes table to be accessed for subsequent maintenance requests. |
| setCodeDecode | Dynamically add a code/decode pair to the currently identified local codes table. Refer to setTableName method. |
| Add | Replace all code/decode pairs of currently identified local codes table with the passed in code/decode pairs. Refer to setTableName method. |
| Append | Append the passed in code/decode pairs to the currently identified local codes table. Refer to setTableName method. |
| setCodeDecodeByTable | Return fully populated codes table directly from the database. |
| delCodeDecode | Remove specified code/decode pair from currently identified local codes table. Refer to setTableName method. |
| DelCodesTable | Remove the currently identified local codes table from local memory. Refer to setTableName method. |

SAP Framework Design

FIG. 1.2 illustrates a method 150 for providing an interface between a first server and a second server with a proxy component situated therebetween. Initially, in operation 152, a request for a business object is identified by an application on the first server. The first server is connected to the second server in operation 153. In operation 154, selection criteria from the first server is transmitted to the second server. In response to the selection criteria, the first server receives a first recordset and a second recordset from the second server in operation 155. Business data is included in the first recordset and result codes are included in the second recordset. The first and second recordsets are mapped to the business object in operation 156 and, in operation 157, the business object is sent to the application on the first server.

The first and second recordsets may also be mapped to the business object using a utility conversion function. Additionally, the first and second recordsets may also be mapped to the business object using a utility conversion function. Optionally, the recordsets may be ActiveX data objects (ADO) recordsets.

The first server may also receive a third recordset from the second server in response to the selection criteria. This third recordset may include errors and references to an error table on the first server for allowing processing of the errors.

In a further embodiment of the present invention, changes to the proxy component may be prevented from affecting the application on the first server. Additionally, generation of a plurality of the proxy components by a user may be allowed. The following material provides a more detailed description of the above-described method.

This portion of the present description details the ReTA SAP framework design from the perspective of the application developer. The role of this framework is to provide designs and templates that describe how to integrate an Internet application with a SAP server. Unlike the other ReTA frameworks, this does not provide any code components for connecting to SAP, but uses the SAP/DCOM component connector created jointly by Microsoft and SAP.

This portion of the present description provides a framework for the design of the architecture using the SAP DCOM connector components to integrate with SAP.

The DCOM Component Connector provides interoperability between R/3 objects and COM objects across a heterogeneous network through well-defined business interfaces. It provides the development tools for connecting with SAP to standard SAP BAPI's (Business Application Programmer Interface) as well as custom developed or modified BAPI's. The DCOM component connector can connect to SAP on Windows NT or UNIX. The Application server needs to be R/3 Version 2.1 or higher or R/2 with 50D.

The ReTA SAP framework uses an adapter layer design that places a wrapper around the DCOM component connector. The adapter layer improves developer productivity by managing some of the lower level tasks, and improves the flexibility of the final solution.

The remainder of this portion of the present description describes the Execution and Development Architectures for the SAP framework.

SAP Framework Execution Architecture

The DCOM Component connector uses COM proxy components that map to SAP Business Objects. There is one proxy component for each SAP business object. The SAP business objects can contain both the standard BAPI's (Business Application Programmer Interface) as well as custom developed or modified BAPI's. The SAP/DCOM component generation wizard connects to SAP, examines the SAP business object, and generates a proxy component with the same interface. The SAP/DCOM connector component can connect to SAP on Windows NT or UNIX. FIG. 1.3 shows the execution architecture for components that make up the SAP Framework Execution Architecture 160.

Referring again to FIG. 1.3, the different layers in the SAP framework architecture are shown. The SAP/DCOM connector generated components 162 provide the actual connection to SAP 164. These components are generated from the SAP Business Application Programmer Interface (BAPI) 166,168. The BAPI's are either the standard SAP BAPI's, custom created BAPI's or Remote Function Calls.

The ReTA framework uses an Adapter layer to provide a thin wrapper on the SAP/DCOM connector components. The adapter layer provides the following benefits:

- It insulates the application from changes in the SAP/DCOM connector components.
- It provides utility functions for mapping the SAP/DCOM connector data types to the types required by the application.
- It maps the SAP return error codes to the format required by the application.

The SAP/DCOM connector generated components use ADO (ActiveX Data Objects) recordsets to pass data to SAP. The adapter layer components map from these recordsets to the Business Objects or Business Data format used by the application. If a given method returns business data from SAP then this is in the form of an ADO recordset. If a method updates information in SAP then one must pass in an ADO recordset with all the data. To initialize this ADO recordset one calls a separate standard interface method of the proxy component. SAP returns business errors by returning a separate ADO recordset that references an error table.

The ReTA framework's adapter layer maps the ADO recordsets that the DCOM connector uses to the business objects or data objects used by the application. The adapter layer also maps the error table recordset returned by SAP to the error handling mechanism used by the application.

SAP Framework Development Architecture

SAP/DCOM Component Connector Generation

The SAP/DCOM connector portion of the present description gives a detailed description of how to generate a COM proxy component for a given SAP BAPI. The steps for creating a proxy component are:

Using the DCOM Component Connector browser based tool, create a destination entry for the SAP Application server.

Use the DCOM Connector wizard to connect to this destination.

Browse through the available SAP Business Objects on the remote SAP system.

Select a business object and click Generate Component DLL.

The DCOM Component connector may then generate C++ and LDL files, compile these files to create the proxy component and install this component in MTS.

SAP Adapter Component Design

This portion of the description describes the responsibility of the SAP adapter components and gives a template for a component.

The SAP Adapter components are responsible for:

Insulating the application from changes in the SAP BAPI.

Receiving business data from SAP

Updating business data in SAP

Mapping to/from the SAP returned data types

Mapping the SAP error return codes to the error handling mechanism used by the application.

There is a one to one mapping between the SAP Adapter components and the generated SAP/DCOM connector components.

SAP Adapter Component Template

This template gives an example of an SAP connector component with one method to receive business data and one method to send business data. It describes how to convert to/from the data types required by the SAP Connector component and how to manage the SAP return error codes.

Function GetSAPData(<in>selectionCriteria, <out>businessObject):integer

Create instance of the corresponding SAP connector component

Call corresponding SAP method passing in selectionCriteria.SAP may return an ADO Recordset with the business data and a second ADO Recordset with the Result codes.

Call an error utility function that maps the error return codes onto the applications error handling system.

Map the return recordset onto the businessObject (possibly using utility conversion function). Return the business object to the caller of the function.

Function SetSAPData(<in>businessObject):integer

Create instance of the corresponding SAP connector component

Call the SAP connector standard method DimAS to retrieve the recordset that may be populated from the businessObject.

Populate the recordset from the businessObject (possibly using utility conversion function).

Cal the corresponding SAP method passing in the recordset.

Call the error utility function that maps the error return codes onto the applications error handling system.

Gives an example of an adapter component that demonstrates retrieving and updating SAP data and handling th e SAP error codes.

MTS Framework Design

FIG. 1.4 illustrates a method for sharing context objects among a plurality of components executed on a transaction server. In operation 170, a first component is executed on a transaction server. A context object is then generated for the first component in operation 172 to control a scope of the execution of the first component. In operation 174, a call made by the first component is identified to execute a second component. The context object of the first component is utilized for controlling the scope of the execution of the second component in operation 176. Optionally, the first and second components may be service order item components.

The first component may be an activity component and the second component may be a business component. As an option, a plurality of activity components may be provided. As another option, a call made by the activity component may also be identified to execute a second business component with the context object of the activity component utilized for controlling the scope of the execution of the second business component. As a further option, a call made by the activity component may be identified to execute an error logging component with an additional context object separate from the context object of the activity component being utilized for controlling the scope of the execution of the error logging component. The following material provides a more detailed description of the above-described method.

This portion of the present description details the ReTA approach to performing "logical unit of work" database operations in the context of transactions. Applications developed with ReTA implement transactions through Microsoft Transaction Server (MTS). Within the MTS transaction context, ReTA applications group business components into transactions. The application developer designs each business component to define whether its actions should be performed within a transaction.

In addition, this portion of the present description details the MTS framework features and their implications on ReTA application design.

MTS Transactions: Application Design Implementation

Description

There are two main tasks the developer performs to design applications that use MTS to support transactions:

Code the application component to be MTS aware.

Use MTS services to group database operations into transactions.

Design MTS Aware Components

Figure 1A:
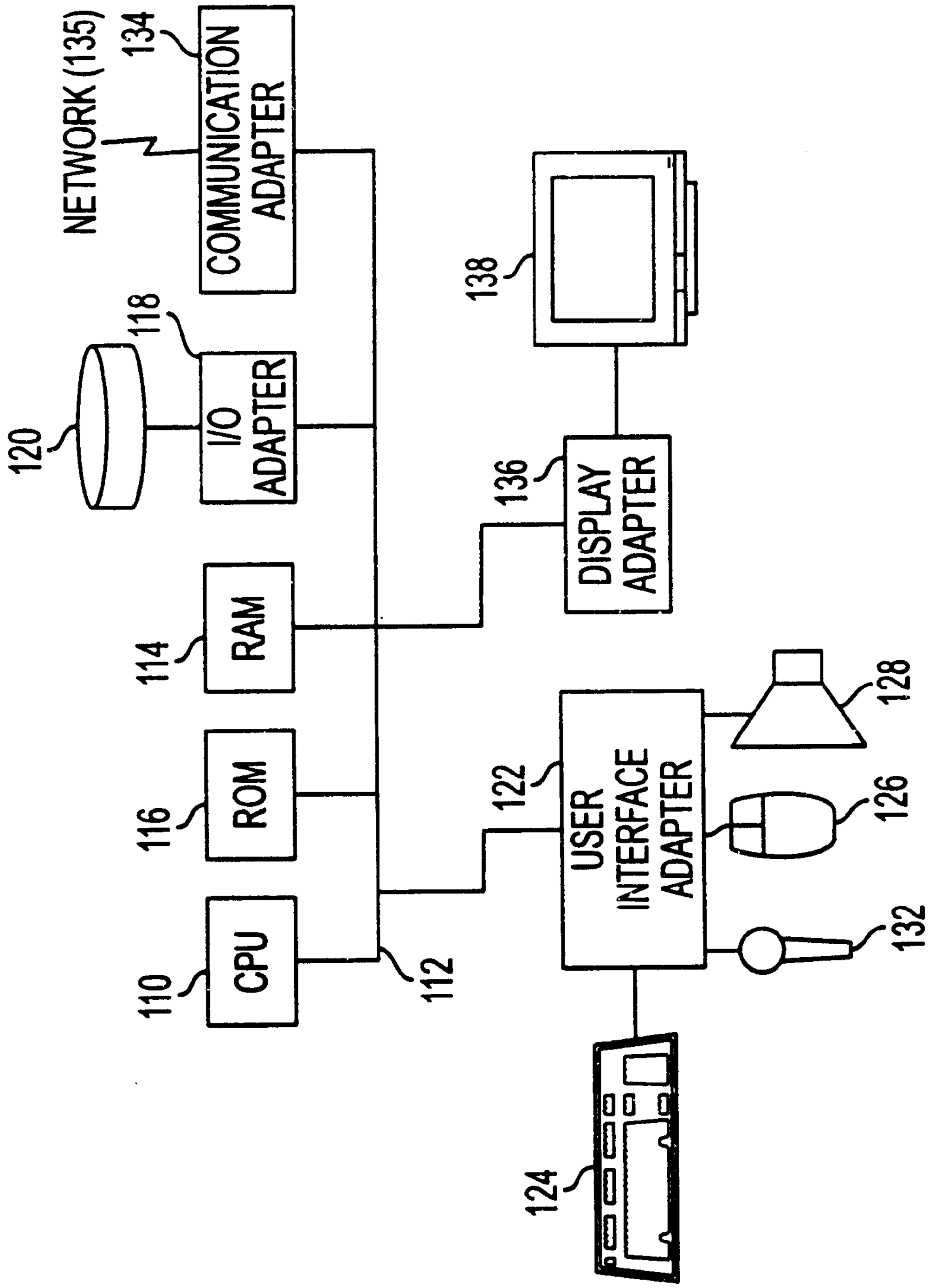
FIG. 1 illustrates an exemplary hardware implementation of one embodiment of the present invention.
Figure 1B:
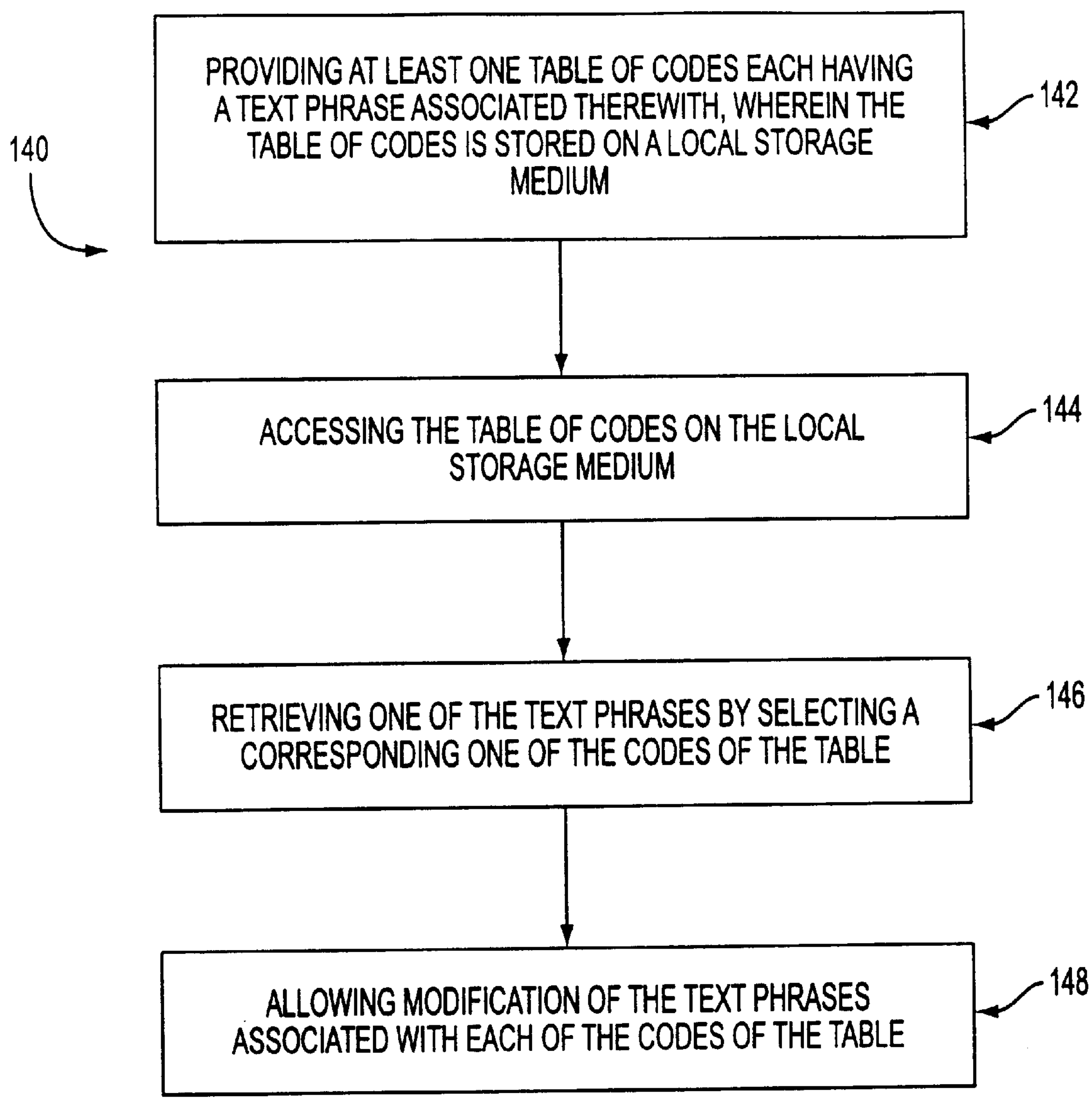
Figure 1C:
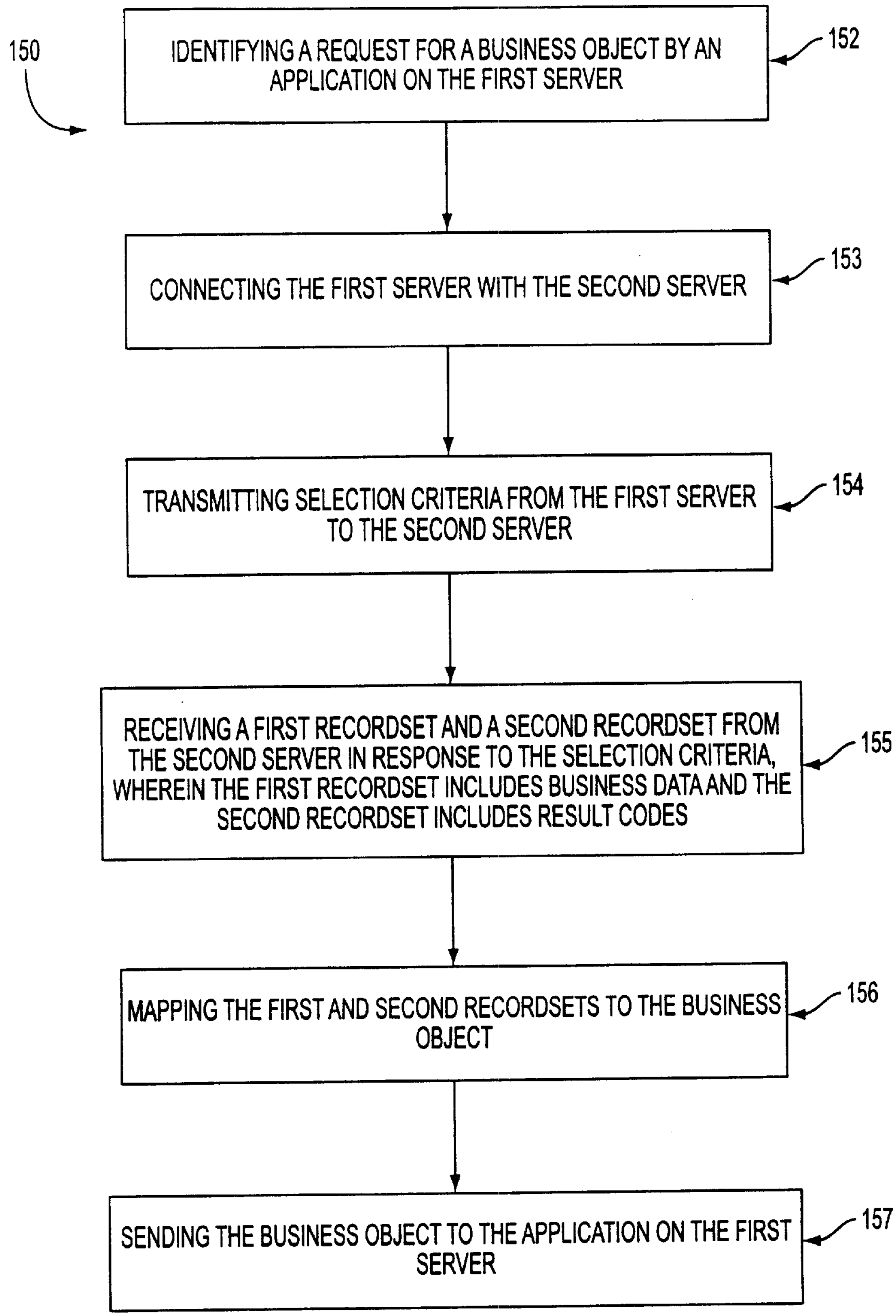
Figure 1D:
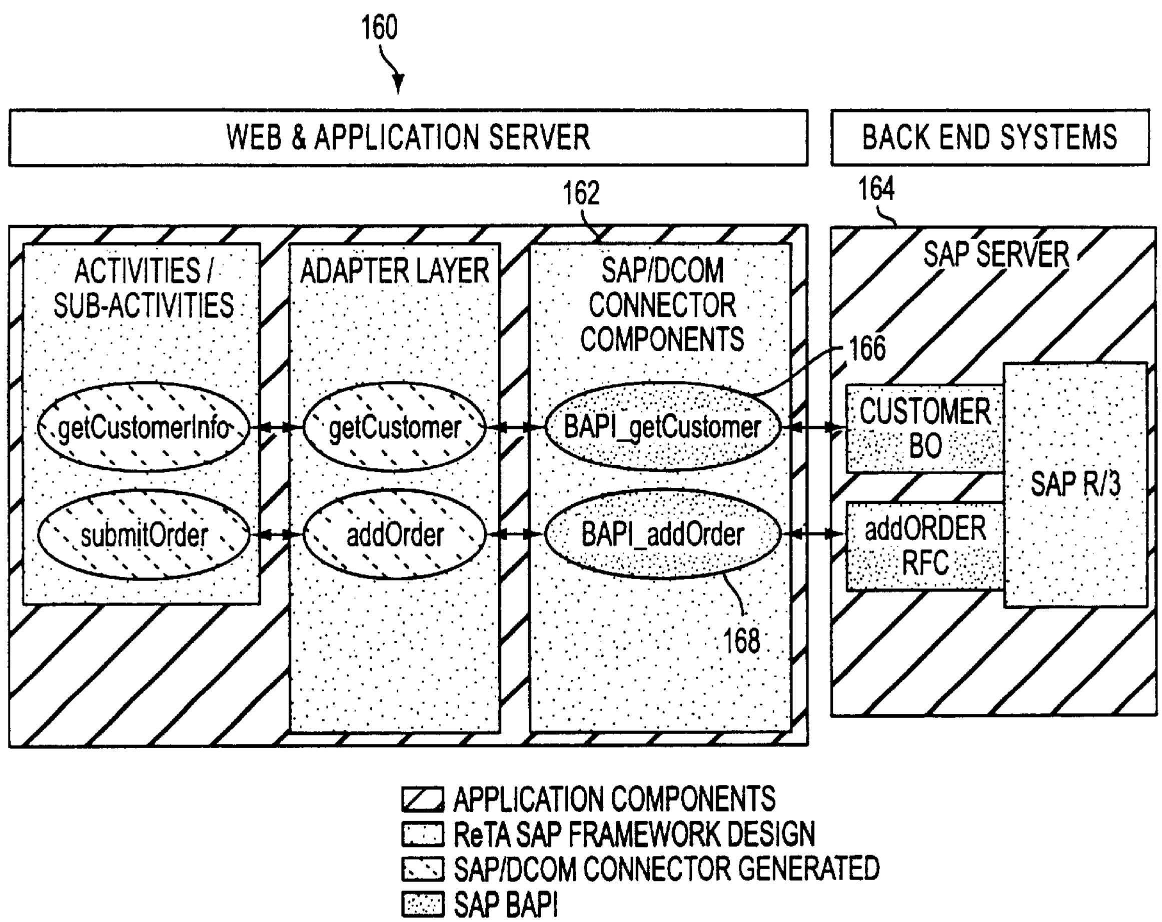
Figure 1E:
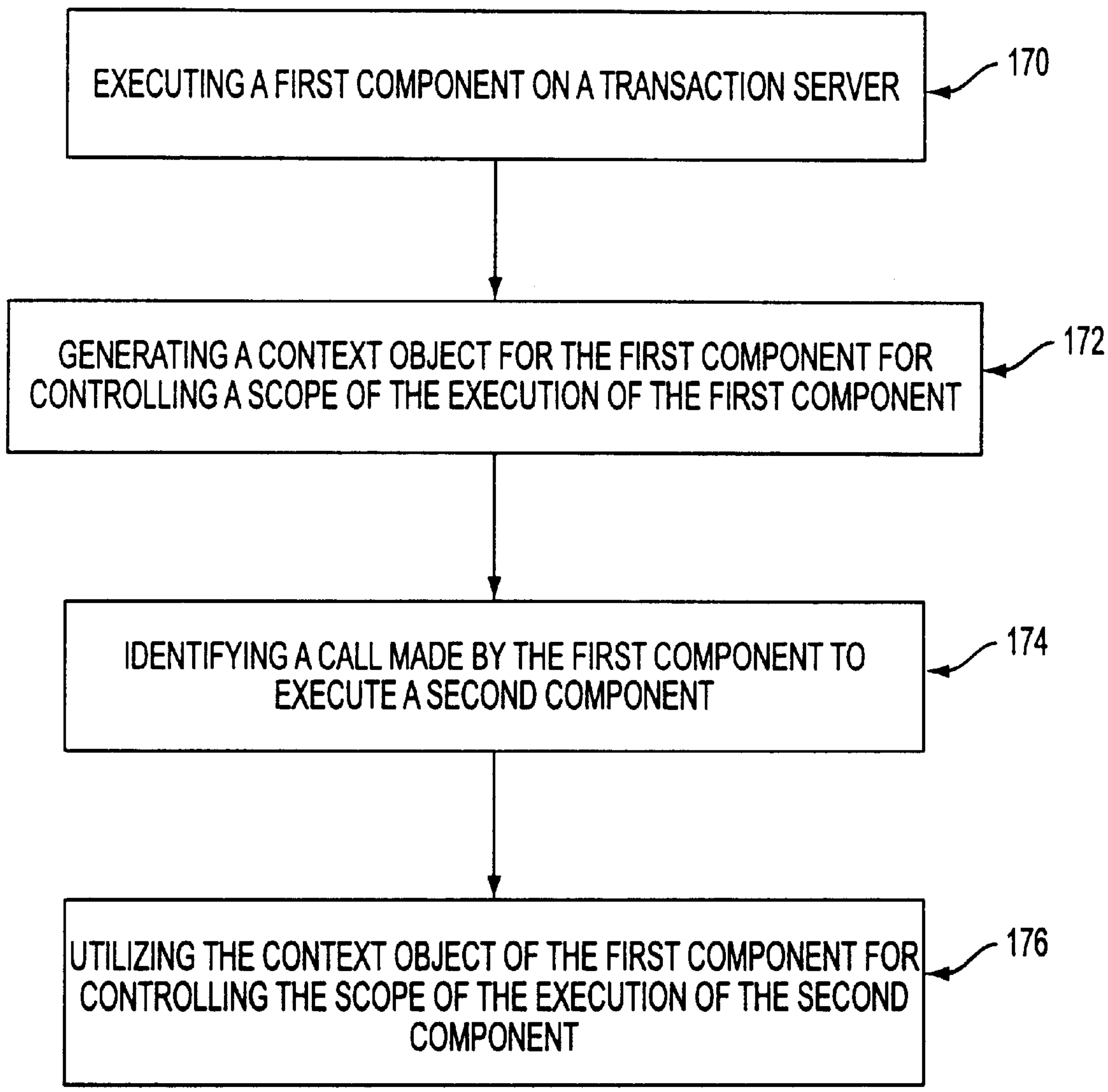
Figure 2:
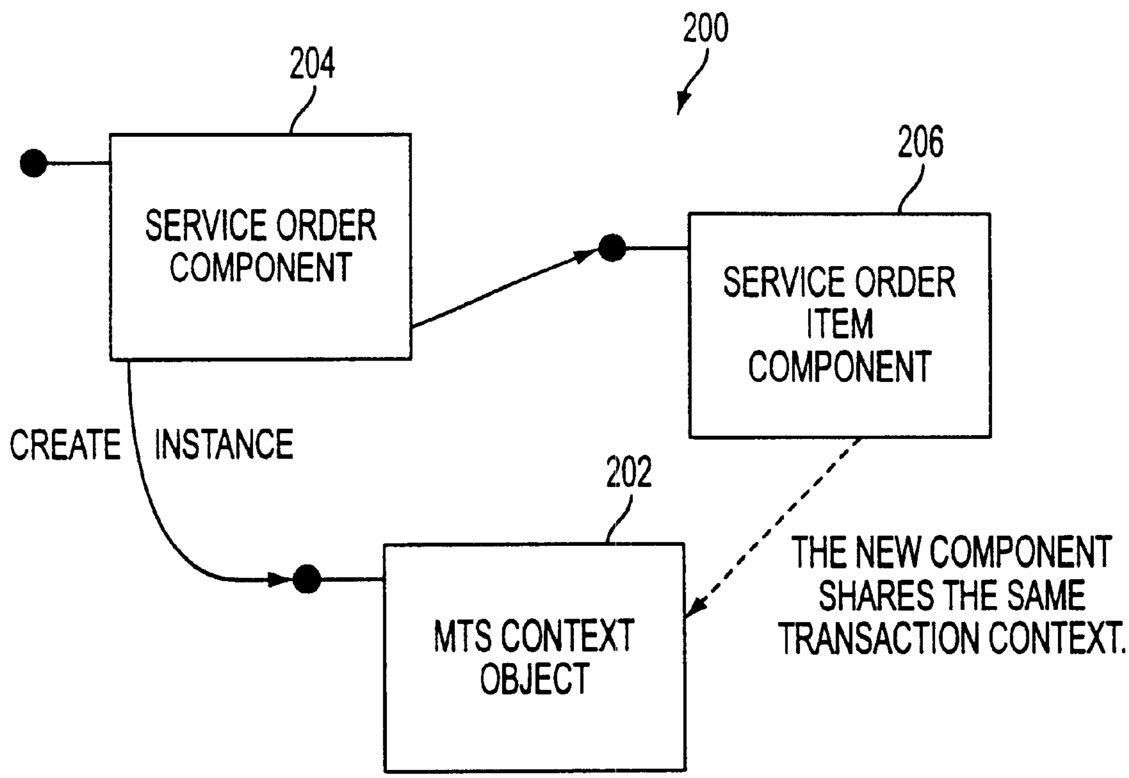
FIG. 2 illustrates the create component instances method according to an embodiment of the present invention.

FIG. 2 illustrates a create component instances method 200. MTS controls the scope of transactions by using transaction context objects. Each transaction server component has an associated MTS context object 202, which controls the transaction context. If a component 204 needs to create instances of other components 206 during its processing, it uses the CreateInstance method of the MTS context object to create the new object. Calling this method ensures that the new component has an associated MTS context object 202 with the correct transaction scope.

Group Database Operations into MTS Transactions

The following portions of the present description include three database operations grouping scenarios that a ReTA application developer can implement through MTS.

Compose Work from Multiple Components in the Same Transaction

Figure 3:
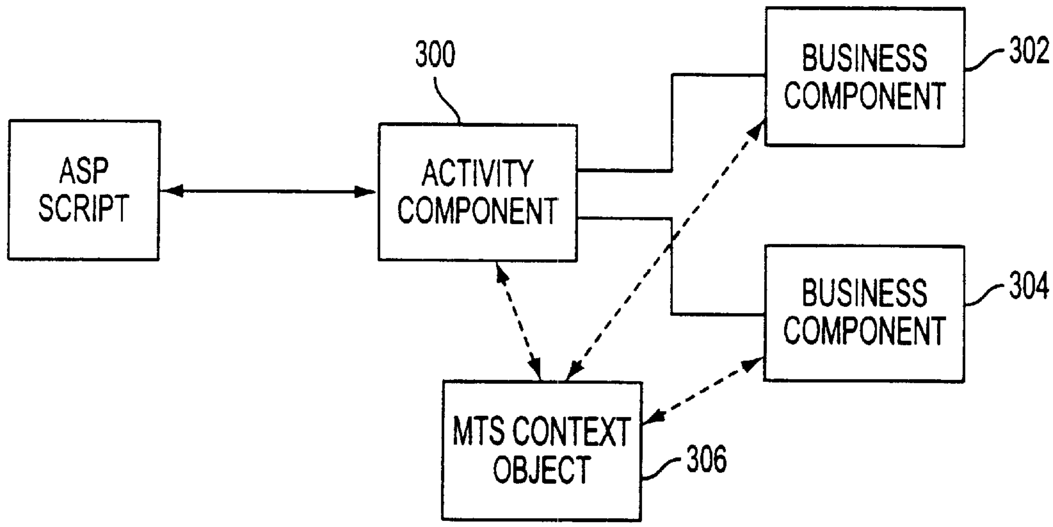
FIG. 3 illustrates multiple components in the same transaction context according to an embodiment of the present invention.

As illustrated in FIG. 3, in this scenario, the developer composes the work of a business activity 300 into a single transaction. Activity 300 uses business objects in components 302 and 304 to compete its work. Any database operations generated by either of these business components are completed in the context of a single transaction. To achieve this functionality, the developer uses the default transaction context scope that MTS provides. The developer sets the transaction attribute of the Activity component to Requires a transaction and the attribute of the business components to either Requires a transaction or Supports transactions. When the activity component initializes, MTS creates a corresponding context object 306. Subsequently, when the activity component initializes the business components, these business components share the same context object and are therefore committed in the same transaction.

When the Activity completes and the reference to the activity component is removed, the transaction is committed. If any of the database calls, fails or any of the components decides to abort the transaction, the transaction is aborted and all the database actions performed are rolled back.

Force a Component's Database Operations to Use a Separate Transaction

Figure 4:
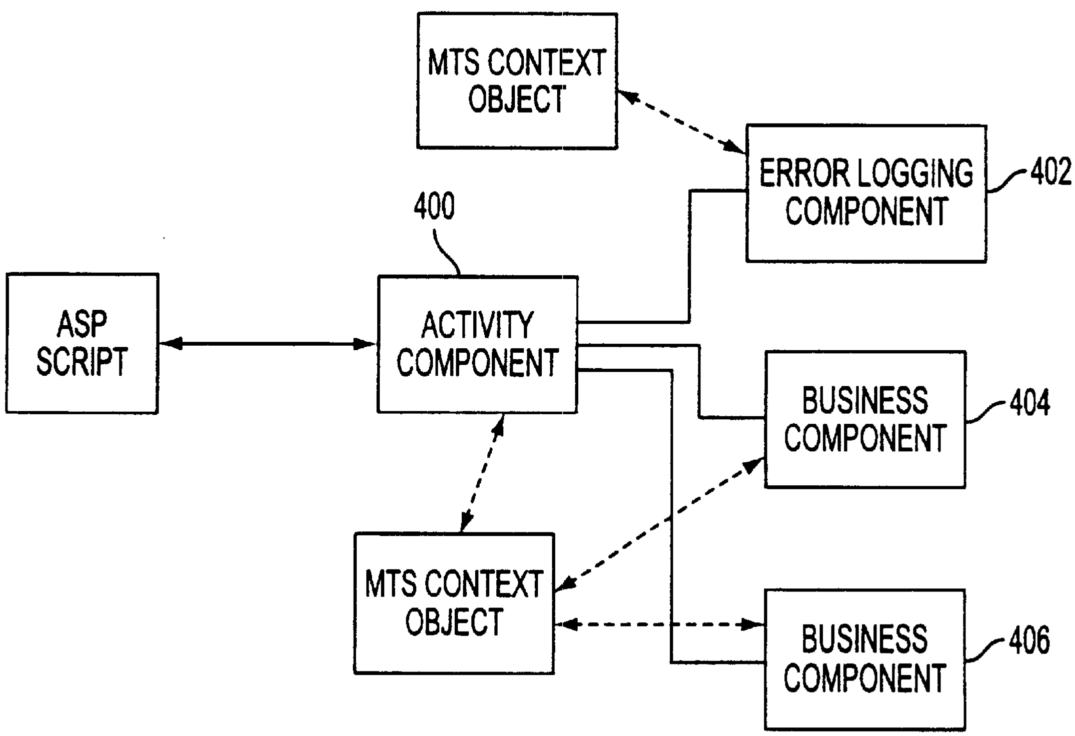
FIG. 4 illustrates the forcing of a component's database operations to use a separate transaction according to an embodiment of the present invention.

In this scenario, as illustrated in FIG. 4, the developer creates a component whose database operations are always carried out in a separate transaction. For example, an error logging component 402 should not use the transaction context of the component generating the error. This could cause the error logged to the database to be rolled back if an error occurs in a separate database operation. This scenario has an activity component 400, two business components 404,406 and an error logging component 402. If an error occurs in the activity, then an error message is sent to the error logging component (which logs the error in a database). The transaction of the activity is rolled back, however, the transaction of the error logging component is committed to the database.

In this scenario, the developer uses the default behavior of MTS. The error logging component is registered as Requires a new transaction. When the activity component initializes the error logging component, MTS creates a new transaction context for the component. If an error occurs in the activity, the database operations for the activity is rolled back, but any database operations that the error component generates is committed.

Compose Work from Multiple Activities in the Same Transaction

Figure 5:
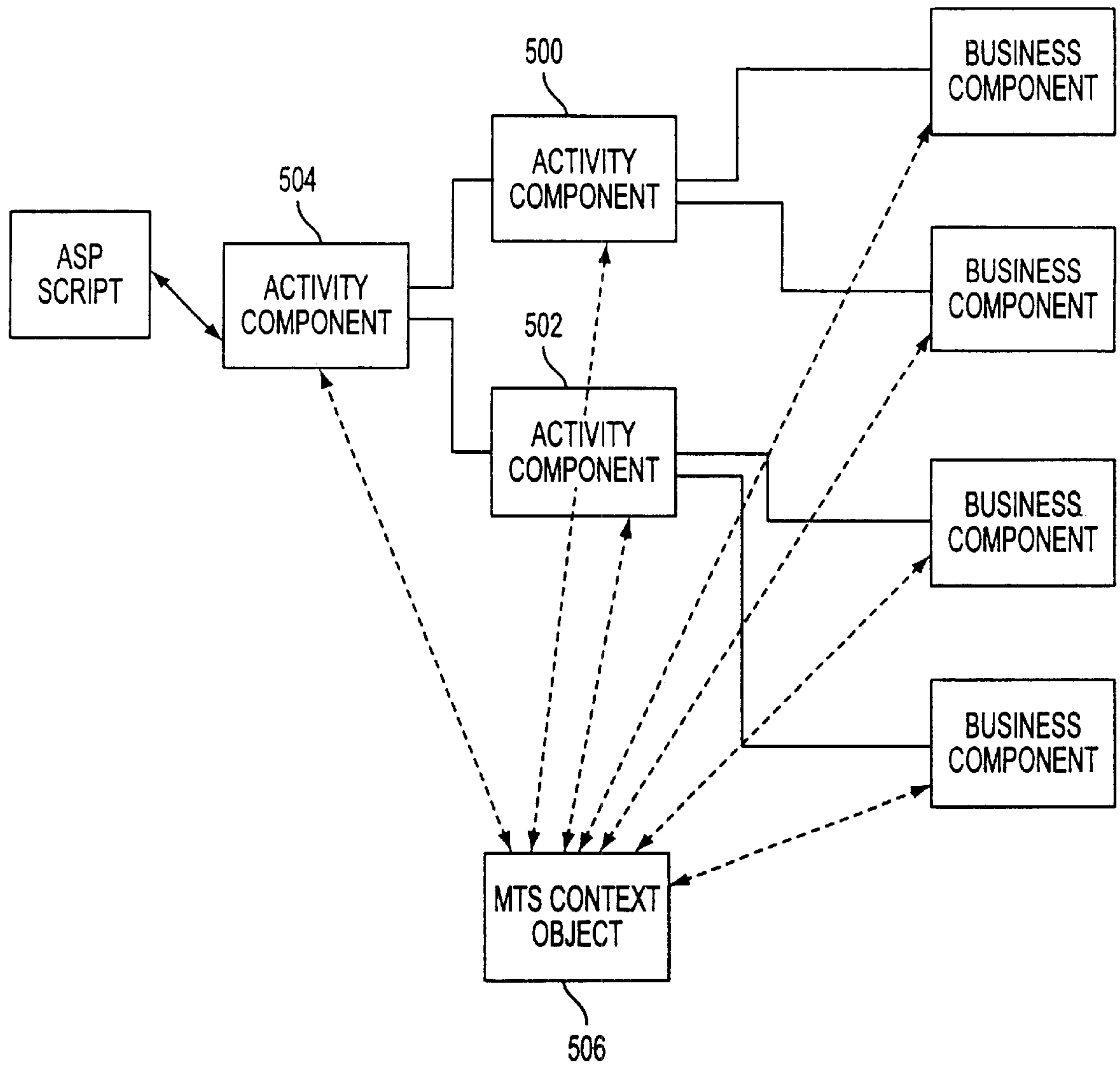
FIG. 5 illustrates the compose work form multiple activities in the same transaction according to an embodiment of the present invention.

With reference to FIG. 5 (which illustrates the compose work form multiple activities in the same transaction), in this scenario, the developer creates two separate activities 500, 502 whose work sometimes need to be composed into a single transaction. To achieve this functionality using MTS, the developer creates a third activity component 504 that calls the other two activities. The third activity component is registered as Requires a transaction. When this component initializes, MTS creates a new transaction context. When the activity 504 initializes the other two activities 500,502, they share the same transaction context 506 (and any objects they create also have the ability to share the transaction context).

MTS Features: Application Design Implications

Description

Note: A FinancialWorks Knowledge Exchange (kX) posting (Optimizing Performance) provided most of the content for this portion of the description.

This portion of the description provides insight on the following MTS features:

Connection Pooling
Stateless/Stateful objects
Package threading
Transactions
Just in Time activation
Object creation
Parameter Passing.

Connection Pooling

MTS and ODBC provide connection pooling. MTS/ODBC associates a connection pool with a specific user account. Therefore, it is important that all data access components have a pre-defined account to use when requesting database connections. In addition, connections are pooled only within the same process This implies that every MTS package may have a pool of connections, as each MTS package runs in its own process.

Note that the ODBC connections are pooled, not the ADO connections. When the application code closes the ADO connection, the corresponding ODBC connection stays in the pool until a configurable timeout expires (cptimeout). The configurable timeout key is in the registry under "Hkey_Local_Machine\Software\ODBC\ODBCINST.INI\<driver name>\cptimeout" (with a default value of 60 seconds). Connection pooling can be turned off by setting this value to 0. In effect, connection pooling keeps more connections open with the database but saves the (expensive) overhead of re-creating the connection every time.

Note: Connection pooling is a feature of the ODBC resource manager. MTS automates the configuration of the ODBC resource to enable connection pooling.

Implications on Application Design

Create accounts for account packages. Group components under the appropriate credentials and packages. The Database server is a resource bottleneck. To improve performance, ensure high bandwidth connections exist between application and database servers.

Connection pooling provides performance improvement especially in the case where connections are used and released frequently such as Internet application.

Stateful and Stateless Objects

MTS supports the concept of a stateful object. However, the object must satisfy the following conditions:

1) The object can not be transactional.

2) Even if it is marked as non-transactional, it cannot participate in a transaction (i.e. cannot be called from a transactional object or call a transactional object). The reason is that MTS implements an activity concept. In the activity concept, all objects participating in a transaction (or LUW) are logically "grouped" together. Upon the completion of that transaction, SetComplete is called and all objects in that activity are freed. Thus, no object in the transaction holds context (state) on transaction completion.

3) To enable a stateful object to participate in a transaction, partition the object into two parts: Stateful and Transactional. The Stateful part lives outside MTS and uses the TransactionContext object to manage manually (making explicit calls to start, commit and/or abort) the transaction inside MTS. To maintain transactional integrity, use the TransactionContext (as opposed to the ObjectContext) to create MTS objects. Therefore, the TransactionContext is passed inside MTS for later use of any MTS object instantiation. On the server, the code looks like the following: Set MtsObject=MtxTransactionContext.CreateInstance ("progid")

Implication on Application Design

In general, be deliberate with MTS and state. When working with MTS components, it is recommended to keep the context(state) on the client and have the server components be service driven. These components are instantiated to provide a service and then are freed.

Package Threading

Every time a package receives a method call, MTS creates a new thread to service the request. At the time of writing this portion of the present description, MTS packages have a maximum limit of 100 threads per package. If the number of the incoming concurrent calls exceeds 100, MTS serializes all excess calls. Project testing (a FinancialWorks project) proved that performance degraded significantly after reaching the 100 concurrent threads mark.

Implication on Application Design

Due to this limitation, package the application DLLs in a way to minimize thread contention. For future releases of MTS, Microsoft claims the limit for concurrent calls may increase to 1000.

Activities

MTS defines an activity as set of objects acting on behalf of a client's request. Every MTS object belongs to one activity. The activity ID is recorded in the context of the object. The objects in an activity consist of the object created by a base client and any subsequent object created by it and all of its descendants. Objects in an activity can be distributed across several processes (and machines).

Whenever a base client creates an MTS object, a new activity is created. When a MTS object is created from an existing context, the new object becomes part of the same activity. The object's context inherits the activity identifier of the creating context.

Implication on Application Design

Activities define a single logical thread of execution. When a base client calls into an activity, all subsequent requests from other clients are blocked until control is returned to the original caller.

Automatic Transaction Control

MTS initiates a transaction when a method on a transactional component is called. MTS records the transaction ID in the component's object context. This transaction ID is passed to other MTS components' context objects requiring participation in the same transaction.

MTS operates with an optimistic assumption that the transaction is going to succeed. If the component never calls SetAbort, SetComplete, DisableCommit, or EnableCommit, the transaction commits when the client releases its last reference to the MTS component.

If the component calls SetComplete, the transaction commits as soon as the method call returns to the client. When the component calls SetAbort the transaction aborts as soon as the method call returns to the client.

If the component calls DisableCommit, the transaction aborts when the client releases its last reference to the component. If the component calls EnableCommit, the transaction commits when the client releases its last reference to the component.

Implications on Application Design

When designing the transaction timeout, consider the potential for slow system and network response times. The application design should avoid long running transactions and attempt to break them into smaller ones.

Note.

There is no explicit Commit method. If no objects have aborted the transaction by calling SetAbort or disabled commitment by calling DisableCommit, MTS may automatically commit the transaction when the client releases its object references.

Manual Transaction Control

Transactions can also be manually controlled from a base client by using the transaction context to start and commit/abort a transaction. This is particularly useful in the case where a stateful base client activates an MTS-managed transactional object to carry out a distributed transaction. In order to achieve that, MTS uses the Transaction Context created by the base client.

Just-In-Time Activation

For every business object created, MTS intercepts the call and creates a sibling object called the Object Context. It is the object context that may manage the transaction and the business object activation/deactivation.

One of the interface methods on the context object is SetComplete. When SetComplete is called, the transaction (if any) is signaled as ready to be committed and the instance of the business object is destroyed releasing all resources used by it. The next time the client issues a method call, MTS creates a new instance of the business object and delegates the call to it (this is assuming that the client did not release its original reference to the MTS-supplied context wrapper). In the MTS world, this is known as JIT activation.

The following method call trace illustrates JIT activation:

The client application starts, and the client requests an instance of the CustomerInterface of the Customer component.

Set objlCustomer=CreateObject("CustomerComponent. CustomerInterface").

COM searches the Running Object Table to determine whether an instance of the component is active on the client.

If not, COM searches the Registry for the information describing CustomerInterface and invokes the creation of the interface.

Figure 6:
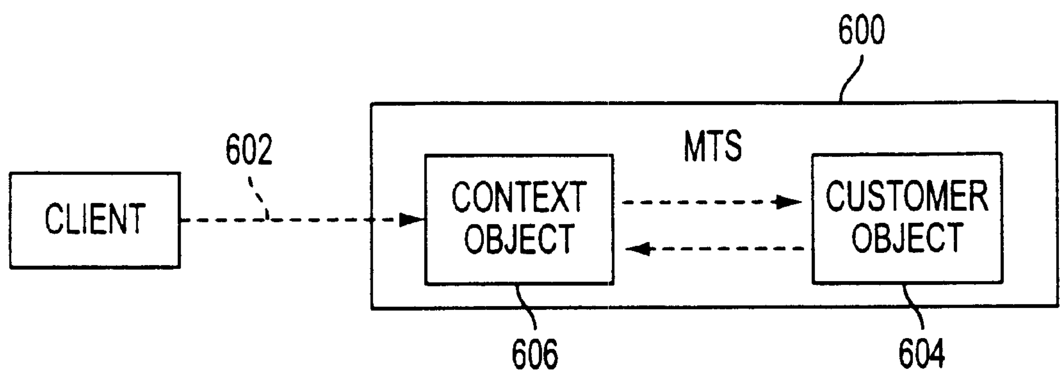
FIG. 6 illustrates JIT activation where MTS intercepts the Customer creation request, starts a process for the Customer package containing Customer component, creates the ContextObject and returns a reference to the client according to an embodiment of the present invention.

MTS 600 intercepts the Customer creation request 602, starts a process for the Customer package containing Customer component 604, creates the ContextObject 606 and returns a reference to the client. See FIG. 6.

The client application requests an operation on the CustomerInterface.

MTS invokes the operation and commits the transaction (if any) by calling SetComplete.

Figure 7:
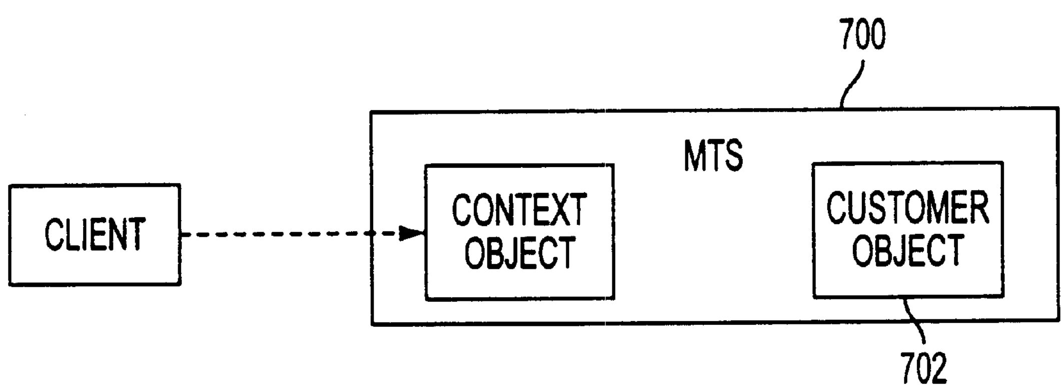
FIG. 7 illustrates JIT activation when the customer object has been deactivated (the customer object is grayed out) according to an embodiment of the present invention.

MTS 700 deactivates the component, freeing the thread, the memory and returns the result to the client. FIG. 7 shows that the customer object 702 has been deactivated (the customer object is grayed out).

To take advantage of JIT activation, the clients do not release the reference to the MTS-supplied context wrapper (the client code does not set objlCustomer=null). When the client requests a new operation, the Context wrapper creates a new instance of the Customer component and delegates the incoming call to it. By keeping the reference to the context wrapper, MTS does not need to recreate the object.

Implications on Application Design

To take advantage of JIT activation, client applications acquire references to the server components as early as possible an uses them as needed. It would be ideal to obtain references at application startup, but this has the drawback of not being reliable. If for some reason the references were lost, this may result in run time errors.

Object Creation: New vs. CreateObject vs. CreateInstance

This portion of the description describes the appropriate usage of the different types of object creation methods.

New

The keyword "New" creates an object with private instantiation property. It is used with early binding.

CreateObject

Normally used with late binding and used to create objects with public instantiation property. If other MTS object are instantiated using CreateObject (on the server), they run the risk of running in the wrong context. CreateObject can be used from the client to instantiate any MTS object.

CreateInstance

It is the interface method of the context object used to instantiate other MTS objects. This is the only way to guarantee the newly created object participates in the same current transaction. When MTS instantiates a transaction, it records the transaction ID in the component's object context. This transaction ID is passed to other MTS components only when CreateInstance is used to create these objects.

Implication on Application Design

When CreateObject is used, Java/VB uses COM to create an instance of the object. If the Object is registered in MTS, MTS loads the DLL and creates a new instance passing back a MTS-managed handle to the object. The object gets a new MTS context.

When New is used in Java/VB, the action depends on where the object being created lives. If it is in a different DLL, COM is used and the mechanism is the same as CreateObject. If it is in the same DLL Java/VB creates the instance internally and may not create a new MTS-managed object, whereas CreateObject may. Private classes can only be created using New since they are not exposed to COM.

When one MTS object creates another MTS object, the new object gets a new context. If CreateObject (or New for an object in a different DLL) is used, the contexts are independent of each other. If a transaction is involved, the new context manages a completely different transaction from the original. If CreateInstance is used, the new object's context shares the same transaction as the invoking one.

Using New is only a problem in the following scenario. The application contains one DLL that contains more than one MTS-managed class. The application wants an instance of one of these classes to create an instance of the other (in separate contexts). New may not do this, whereas CreateObject and CreateInstance may. However, CreateInstance is required if they are to run under the same transaction.

Parameter Passing

If Visual Basic is the language of choice, make sure to pass parameters by value (as the default in VB is by reference). This may help reduce network trips and hence improves performance.

If one is passing the collection object in MTS, make sure to use the Microsoft provided wrapper collection object. The standard VB collection object is known to cause errors when running under MTS. It is better to use al variant array instead of collection to pass information around. It is more robust and performs better.

As parameters, MTS registered business objects are passed by reference as they use standard marshalling When working with MTS objects, ensure that object references are exchanged through the return from an object creation interface such ITransactionContext.CreateInstance or IObjectContext.CreateInstance. This allows MTS to manage context switches and Object lifetime.

Data Access and Locking Policy

Database Locking should be in place to ensure the integrity of the database in a multi-user environment. Locking prevents the common problem of lost updates from multiple users updating the same record. The optimistic approach of record locking is based on the assumption that it is rarely the case for multiple users to read and update the same records concurrently. Such a situation is treated as exceptional processing rather than normal. Optimistic locking does not place any locks at read time; locks are actually placed at update time. A time stamp mechanism should be provided to ensure that at update or delete times the record has not changed since the last time it is read. It is recommended to use optimistic locking with ADO and MTS to improve performance. If the data access mechanism uses ADO disconnected RecordSets, then the only possible locking policy is optimistic.

Implication on Application Design

If one is using optimistic locking and ADO, it is recommended that one uses disconnected recordsets to marshal data. Project experience (FinancialWorks project) shows that the application should avoid using the ADO RecordSet.GetRows method, as it significantly slows performance.

Data Marshaling

Use disconnected Recordsets. This may ensure high performance result when marshaling data across a network. Client applications have to reference an ADOR.Recrodset, which is a lighter version of the ADODB.Recordset designed specifically for client's use. With disconnected Recordsets only optimistic locking can be employed.

If the marshalling of data from client to server is done by collection, beware to use the wrapper collection provided on the MTS site. MTS may not work correctly when passing the VB standard collection object. It is known to cause runtime errors.

Activity Framework Design

Figure 8A:
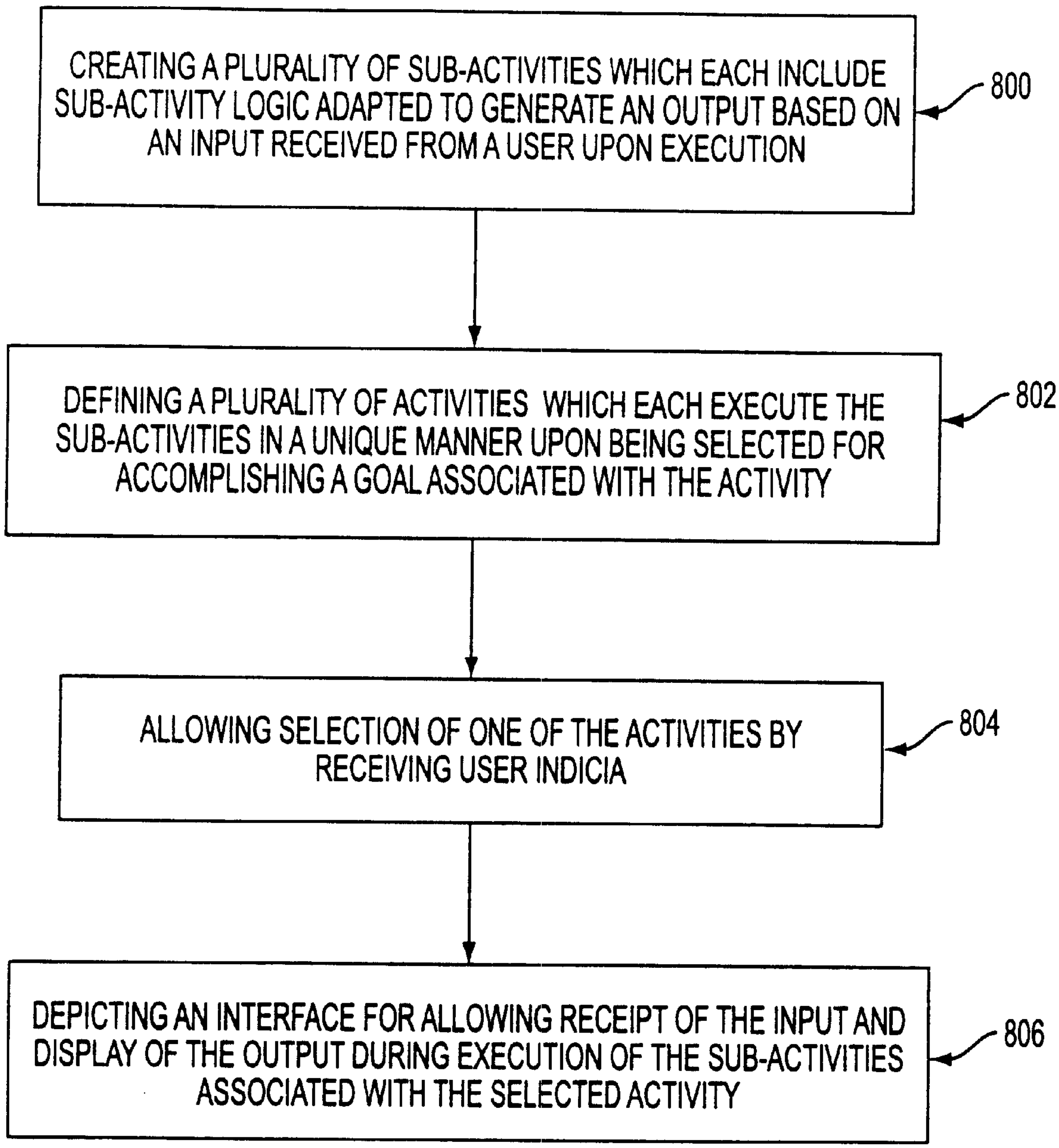
FIG. 8 is a flowchart depicting a method for providing an activity framework.
Figure 8B:
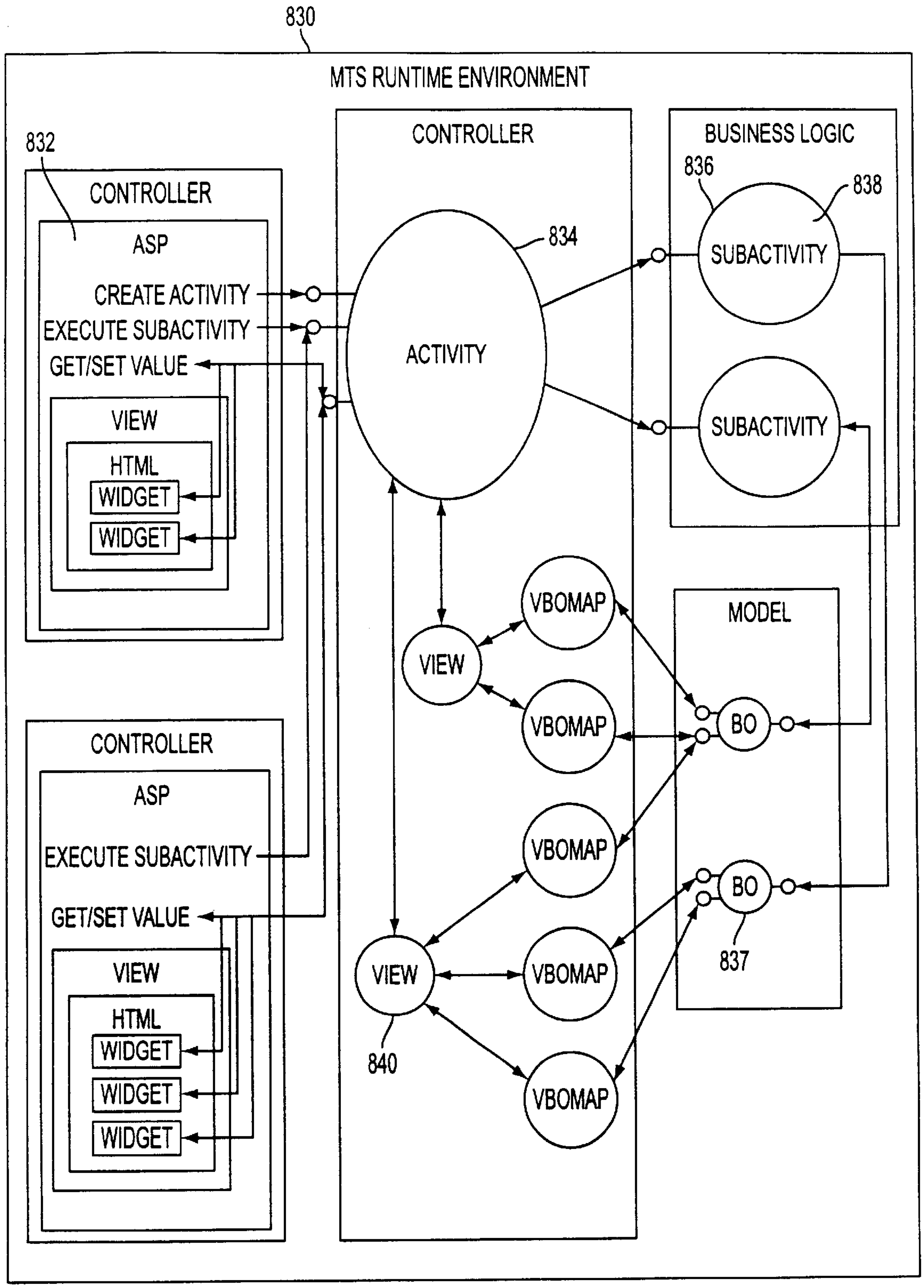

FIG. 8 illustrates a method for providing an activity framework. First, in operation 800 a plurality of sub-activities are created which each include sub-activity logic adapted to generate an output based on an input received from a user upon execution. In operation 802, a plurality of activities are defined, each of which execute the sub-activities in a unique manner upon being selected for accomplishing a goal associated with the activity. Selection of one of the activities is allowed in operation 804 by receiving user indicia. In operation 806, an interface is depicted for allowing receipt of the input and display of the output during execution of the sub-activities associated with the selected activity.

The sub-activity logic may be adapted for verifying that all required input has been received prior to generating the output. Access to the input received from the user by each of the sub-activities of the activities may also be allowed.

Optionally, the activity may include creating a service order. Further, the sub-activities each may additionally include at least one business component.

The interface may include a plurality of displays that are each displayed during t he execution of a corresponding one of the sub-activities. The following material provides a more detailed description of the above-described method.

This portion of the present description detail s the ReTA Activity framework design from the perspective of the application developer. The primary role of this framework is to provide services that support the "model view controller" (MVC) design pattern. In this pattern, the application implements a "separation of concern" among the user interface (view), logical unit of work (controller) and business components (model). Separating the user interface from the business logic increases reuse of the interface and the business component. In this design pattern, different types of interfaces can reuse the same model and the same interface can view different models. Another goal of separating presentation and storage responsibilities is to reduce the impact of chance. For example, changing t he user interface design should only impact the user interface components and not the business logic. Through modeling the "separation of concern" pattern, the ReTA Activity framework increases application maintainability and flexibility. It also encourages "best practice" coding standards.

Activity Framework

Description

See FIG. 8.1, which illustrates the MTS runtime environment 830. The ReTA Activity framework distributes the application development responsibilities as follows:

Web page (Active Server Page) (View/Controller) The application's web page logic 832 starts the activity 834, executes the sub-activity and creates the user interfaces. No business logic is contained directly in the web page code. The application developer leverages the ReTA Session, ReTA Activity and the ReTA UI frameworks from the web page code.

Activity Components (Controller) The application's activity logic implements the business process logic (functional control logic) 836. Activities support high-level processes that are not the responsibility of any individual business components. This includes high-level steps related to a user's "logical unit of work" or business function. Thus, activities enable multiple web pages to implement a "logical unit of work". An example of an activity implementing a "logical unit of work" with multiple web pages is "Create Service Order". In this example activity, the user selects a service to order on the first page, enters the customer information on the second page, reviews and submits the order on the third page and receives an order confirmation on the fourth page.

Business Components. (Model) Business components 837 implement the application's business entity logic. These components represent individual business entities (such as customer or account). Each entity encapsulates its own data and behavior acting on that data. Note: The Activity implements business logic that spans multiple business components.

The ReTA Activity framework consists of the following three main components:

Activity

An activity 834 encompasses a combination of web pages, which fulfill a business function. The activity has the following responsibilities:

Provide a "logical unit of work" context to all sub-activities within the activity. The Activity framework uses Microsoft Transaction Server (MTS) transactions to implement the "logical unit of work" concept. On the completion of a transaction (whether successful or abort), MTS ensures that each sub-activity may be in a consistent state (either completed or rolled back).

Check that requested information and conditions are fulfilled before executing logic.

Maintain information shared between the pages of the activity.

Create, trigger and manage sub-activities.

Check page access authorization, when browsing through activity pages.

Release all maintained information when closed.

Execute post-conditions when closed. Examples of post conditions are releasing resources tied up for the activity or removing pessimistic locks on tables.

Commit or abort all opened sub-activities.

The activity (by itself) does not contain any business logic. Sub-activities (and their associated business components) provide the business logic. Thus, the activity maintains a context and provides a "logical unit of work" for a specific business functionality.

Sub-activity

A sub-activity 838 executes a sub-part of the overall activity business logic. The sub-activity represents the smallest grained business logic. For example in a "Create Service Order" activity, one sub-activity retrieves all the service types information to display on the first web page. A sub-activity has the following responsibilities:

Check pre-conditions. Ensure requested information and conditions are fulfilled before executing business logic.

Execute business logic

Execute post-conditions.

View

A view 840 defines the mapping between a user interface and business components containing the values to display. The view has the following responsibilities:

Unplugging the user interface from the business component values.

Automatically and transparent to the developer, capture all the values entered by the user and update the related business components.

Display the business component values attached to the user interface.

Trigger a sub-activity when capturing values.

Note: The Activity component maintains a separate view for each web page defined to be part of the activity.

Note:

The ReTA Activity framework fully supports business activity components written in Java or Visual Basic. In addition, the Activity framework provides partial support for business activity components written C++. For C++ components, the application developer must implement the services provided by the Activity utility classes AFView and AFViewBOMapping.

Services

The Activity Framework provides the following services:

| Service | Detail |
|---|---|
| Logical unit of work | Microsoft Transaction Server transaction principles |
| Maintain context | Business Component context<br>User Interface context - List boxes<br>Sub-Activity context |
| Security | Page access authorization - Activity scope |
| Validation | Pre-conditions - Activity level check<br>Post-conditions - Activity level check |
| Sub-Activity -Smallest gained business logic | Pre-conditions - Sub-Activity level check<br>Execute business logic<br>Post-conditions - Sub-Activity level check |
| View - Mapping between a user interface and business components | Unplug user interface from business component<br>Capture user entry and update business component<br>Display value attached to business component |
| Visual Basic support | Wrapper to support Activities written in Visual Basic |

Components and Classes

The Activity Framework implements these services through the following COM and Class objects:

| | Service |
|---|---|
| Component | |
| AFActivity | Implements "logical unit of work". Manages collection of Sub-Activities and Views. |
| AFSubActivity | Implements a sub-part of the overall activity business logic. |
| AFCollection | General purpose Collection component. |
| AFVBActivityWrapper | Enables Activity Components written in Visual Basic. |
| Class | |
| AFView<br>AFVBView | For a specific Active Server Page, defines the mapping between a collection of user interface entry fields and the business component instances containing the values to display. Note: Multiple views can exist for a single ASP. For example, a separate view can be defined for each form on a page. |
| AFViewBOMapping<br>AFVBViewBOMapping | Defines the mapping between a user interface entry field and the business component instances containing the value to display. |
| AFViewRadioButtonBOMapping<br>AFVBViewRadioButtonBOMapping | Defines the mapping between a user interface radio button field and the business component instances containing the value to display. |
| AFViewDynamicBoMapping<br>AFVBViewDynamicBOMapping | Defines the mapping between a dynamically created user interface entry field and the business component instances containing the value to display. |
| AFViewTextAreaBOMapping<br>AFVBViewTextAreaBOMapping | Defines the mapping between a user interface multi-line entry field and the business component instances containing the value to display. |
| AFViewDropDownDOMapping<br>AFVBViewDropDownBOMapping | Defines the mapping between a user interface drop down combo box field and the business component instances containing the value to display. |
| AFViewUIListBOMapping<br>AFVBViewUIListBOMapping | Defines the mapping between a user interface Selected List Box field and the business components containing the values to display. |
| AFViewThumbNailBOMapping<br>AFVBViewThumbNailBOMapping | Defines the mapping between a user interface ThumbNail (iconic pushbutton) field and the business components containing the values to display. |

These components and classes are described in detailed in the following sub-portions of the description.

AFActivity

The AFActivity component provides the structure for implementing business logic, state management among web pages, management of views and sub-activities, and transactional support for carrying out a "logical unit of work". The application developer creates an activity component for each specific business activity by extending the AFActivity component.

The activity component shares the services provided within the Activity framework allowing the application developer to concentrate on the business logic. Application business logic is organized into three separate areas within an activity: pre-conditions, execution, and post conditions.

Methods

The IAFActivity, IAFContext and IAFEventListener interfaces define the access to the AFActivity component. These interfaces support the following methods:

| Method | Description |
|---|---|
| AFActivity | |
| Start | Start the activity. The application developer calls this method from the ASP page. |
| Stop | Release the activity and all its associated instances. Calls the commit method. The application developer calls this method from the last ASP page for the business activity. |
| Abort | Gracefully abort the activity. Abort associated sub-activities. Remove all references to sub-activities, business components and stateful UI components. |
| Commit | Declare that the current activity and all its sub-activities have completed their work and should be deactivated when the currently executing method returns to the client. This method may call the setComplete method of MTS. (See MTS portion of the present description for more information) |
| RetrieveUIInstance | Retrieve a User Interface component instance from the UI context of the activity. |
| AddToUIContext | Add a User Interface component to the UI context of the activity. |
| ExecuteSubActivity | Execute the sub-activity related to the current page for the Activity. Call the sub-activity precondition, execute and postcondition methods. |
| IsPartOfActivity | If the ASP name passed as a parameter is part of the activity, return true. This method calls the AFTrackingManager component of the ReTA Session framework in order to get the result. |
| CheckPageAuthorization | Ask the tracking object related to the activity to check the page authorization (uses the AFTrackingManager component of the ReTA Session framework). If the user is allowed to access this page, set the current page of the activity with the page as parameter. |
| UIFieldValue | Return the business component value that is mapped to the specified UI field (uses the Activity framework View service). |
| GetName | Return the activity name. |
| GetFrameName | Return the name of the frame where to display the encountered events. |
| GetPageParameter | Return a string containing all parameters to send to the next page. This string contains the names of all UI fields of the page and the JavaScript code needed to retrieve their values. Called by the ReTA UI framework component AFScriptGenerator. |
| GetStartPage | Return the starting page of the activity. |
| getNextPage | Return the next page for the current activity, based on the current activity page saved in the AFTracking object of the activity and on the action passed as parameter. |
| getCurrentPage | Return the current page. |
| retrieveBOInstance | Return requested business component from the activity business context. |
| AddObject | Add a business object (held by the activity's "business object content" object). |
| GetObject | Return the instance of the requested business object (held by the activity's "business object context" object). |
| RemoveObject | Remove the instance of the requested business object (held by the activity's "business object context" object). |
| ContainsKey | If the "label" of the requested business object exists (held by the activity's "business object context" object), return true. |
| GetKeys | Return all business object "labels" (held by the activity's "business object context" object). |
| receiveEvent | Method called by the ReTA Session during an ASP start page event to enable the architecture to capture user entry from previous web page. The ReTA Session component holds references to all registered listeners (Activity components). |
| AFEventListener | |
| getId | Reference to the listener object. One listener object is associated with each registered Activity component. |

Abstract Methods

The application developer implements the following abstract methods in the business activity component:

| Method | Description |
|---|---|
| CreateSubActivity | Create a Sub-Activity. |
| Name | Return the Activity name. |
| Precondition | Pre-conditions required before executing the Activity. |
| Postcondition | Post-conditions required after executing the Activity. |
| RequestedObjects | Return the list of the requested business components. |
| Views | Return all the views for the activity. |
| StartPage | Return the Activity start page. |

AFSubActivity

The AFSubActivity component implements a sub-part of the overall activity business logic. The application developer creates a sub-activity component for each sub-part of a specific business activity by extended the AFSubActivity component As with activities, the sub-activity workflow sequence is pre-condition, execution and post-condition.

Note:

There may be zero or more sub-activities on an ASP Page.

Methods

The IAFSubActivity interface defines the access to the AFSubActivity component. This interface supports the following methods:

| Method | Description |
|---|---|
| precondition | Pre-conditions required before executing the sub-Activity. |
| execute | Execute the small grained business process logic. |
| postcondition | Post-conditions required after executing the sub-Activity. |
| commit | Declare that the current sub-activity has completed its work and should be deactivated when the currently executing method returns to the client. This method may call the setComplete method of MTS. |
| checkRequestedObjects | Check that the business components requested for the sub-activity are present in the Activity context. The requested components are defined by the application developer through implementing the sub-activity abstract requestedObject method. |

-continued

| Method | Description |
|---|---|
| initialize | Store the requested component names (as defined by the application developer). Store the passed in activity component reference. Store the sub-activity name. |
| getName | Return the sub-activity name. |
| getActivity | Return the reference to the activity component associated to the sub-activity. |

Abstract Methods

The application developer implements the following abstract methods in the business sub-activity component:

| Method | Description |
|---|---|
| precondition | Pre-conditions required before executing the sub-Activity. |
| execute | Execute small grained business process logic. |
| postcondition | Post-conditions required after executing the sub-Activity. |
| requestedObjects | Return the requested business components for the sub-activity. |

AFCollection

The AFCollection component is a general purpose collection component. The collection component can be used to store and retrieve a collection of COM components, integers or strings.

Methods

The IAFCollection interface defines the access to the AFCollection component. This interface supports the following methods:

| Method | Description |
|---|---|
| size | Number of elements in the collection component. |
| addElement | Add an element to the collection component. |
| elementAt | Return the element at the requested index. |
| addString | Add a string element to the collection component. |
| stringAt | Return the string element at the requested index. |
| addInt | Add an integer element to the collection component. |
| inAt | Return the integer element at the requested index. |
| isInt | If collection component is storing integers, return true. |
| IsString | If collection component is storing strings, return true. |
| Reset | Remove all the elements from the collection component. |

AFVBActivityWrapper

The AFVBActivityWrapper component enables the application developer to add Activities that are written in Visual Basic.

Methods

The IAFActivity, IAFContext, IAFEventListener and IAFVBActivityWrapper interfaces define the access to the AFVBActivityWrapper component. These interfaces support the following methods:

| Method | Description |
|---|---|
| AFVBActivityWrapper | |
| AddVBActivity | Store the VB activity name, the starting page for the activity and the reference to the application developer's VBActivity component to the AFVBActivityWrapper component. |
| getPageParameter | Return a string containing all parameters to send to the next page. This string contains the names of all UI fields of the page and the JavaScript code needed to retrieve their values. Due to non-support of class inheritance by the VB language, the VB application developer must implement the getPageParameter logic supplied by superclass AFActivity for Java applications. The VB developer copies the required logic from the VB Activity shell code file. |
| receiveEvent | Method called by the ReTA Session during an ASP start page event to enable the architecture to capture user entry from previous web page. The ReTA Session component holds references to all registered listeners (Activity components). Due to non-support of class inheritance by the VB language, the VB application developer must implement the receiveEvent logic supplied by superclass AFActivity for Java applications. The VB developer copies the required logic from the VB Activity shell code file. |
| Start | Start the activity. The application developer calls this method from the ASP page. |
| uIFieldValue | Return the business component value that is mapped to the specified UI field. Due to non-support of class inheritance by the VB language, the VB application developer must implement the uIFieldValue logic supplied by superclass AFActivity for Java applications. The VB developer copies the required logic from the VB Activity shell code file. |
| AFActivity | |
| Stop | Release the activity and all its associated instances. Calls the commit method. The application developer calls this method from the last ASP page for the business activity. |
| abort | Gracefully abort the activity. Abort associated sub-activities. Remove all references to sub-activities, business components and stateful UI components. |
| commit | Declare that the current activity and all its sub-activities have completed their work and should be deactivated when the currently executing method returns to the client. This method may call the setComplete method of MTS. (See MTS portion of the present description for more information) |
| retrieveUIInstance | Retrieve a User Interface component instance from the UI User interface component |
| addToUIContext | Add a User Interface component to the UI context of the activity. |
| executeSubActivity | Execute the sub-activity related to the current page for the Activity. Call the sub-activity precondition, execute and postcondition methods. |
| isPartOfActivity | If the ASP name passed as a parameter is part of the activity, return true. This method calls the AFTrackingManager component of the ReTA Session framework in order to get the result. |
| checkPageAuthorization | Ask the tracking object related to the activity to check the page authorization (uses the AFTrackingManager component of the ReTA Session framework). If the user is allowed to access this page, set the current page of the activity with the page passed as parameter. |
| getName | Return the activity name. |
| getFrameName | Return the name of the frame where to display the encountered events. |
| getStartPage | Return the starting page of the activity. |
| getNextPage | Return the next page for the current activity, based on the current activity page saved in the AFTracking object of the activity and on the action passed as parameter. |
| getCurrentPage | Return the current page. |

-continued

| Method | Description |
|---|---|
| retrieveBOInstance | Return requested business component from the activity business context. |
| AddObject | Add a business object (held by the activity's "business object context" object). |
| GetObject | Return the instance of the requested business object (held by the activity's "business object context" object). |
| RemoveObject | Remove the instance of the requested business object (held by the activity's "business object context" object). |
| ContainsKey | If the "label" of the requested business object exists (held by the activity's "business object context" object), return true. |
| GetKeys | Return all business object "labels" (held by the activity's "business object context" object). |
| AFEventListener | |
| GetId | Reference to the listener object. One listener object is associated with each registered Activity component. |

IAFVBActivity Interface Methods

The application developer implements the following interface methods in the VB business activity component:

| Method | Description |
|---|---|
| CreateSubActivity | Create a Sub-Activity. |
| getRequestedObjects | Copy the requested objects for the activity from the Session context to the activity context. |
| GetUIFieldValue | Call getValueForUIField method of AFVBView class to implement logic. The VB developer copies this required logic from the VB Activity shell code file. |
| capture | Call capture method of AFVBView class to implement logic. The VB developer copies this required logic from the VB Activity shell code file |
| getPageParameter | Call getParameter method of AFVBView class to implement logic. The VB developer copies this required logic from the VB Activity shell code file |
| Precondition | Pre-conditions required before executing the Activity. |
| Postcondition | Post-conditions required after executing the Activity. |

AFView (AFVBView)

The AFView class provides a mapping between a User Interface and a set of Business Components (the view maps one web page form to one or more business components). When the user requests the next web page, the previous web page values are passed along with the URL request. Upon starting the next web page, the Session framework invokes the receiveEvent method on the appropriate Activity component. The Activity component uses the View class to record, into the appropriate business component, the data entered by the user at the previous web page. Also, the View class obtains the current user interface field values for the next web page as requested by the application developer through ASP scripting logic.

Note:

Multiple views can exist for a single ASP. Since a view contains a collection of mapped field, one view can be defined for each form of an ASP.

Methods

The following AFView class methods are important for the application developer to understand:

| Method | Description |
|---|---|
| AFView<br>AFVBView | Create a new AFView instance for the ASP page passed as parameter. The application developer calls this method from the implemented views method of the business activity component. |
| GetValueForUIField | Return the value for the UI field mapped to an instance of a business component contained in the activity context. If the business component instance is not part of the activity, then return the default value for the UI field. From the ASP page, the application developer calls this method to initialize the UI field values before submitting the web page back to the client machine. Note: for VB activities, this method is called by the VB business activity component |
| AddBoMapping | Add a "UI field to business component attribute mapping" object to the view. The application developer calls this method from the implemented views method of the business activity component. |
| GetParameter | Return a string containing all parameters defined for this view to send to the next page. This string contains the names of all UI fields for this view of the page and the JavaScript code needed to retrieve their values. Called by the getPageParameter method of the AFActivity component. Note: for VB activities, this method is called by the VB business activity component. |
| Capture | Based on the parameters passed to the current Active Server Page, update the business components containing the values entered by the user from the previous page. The Activity framework implements this logic for the application developer. Note: for VB activities, this method is called by the VB business activity component |

AFViewBOMapping (AFVBViewBOMapping)

The AFViewBOMapping component defines the mapping between a user interface entry field and the business component instances containing the value to display.

This class gets/sets an UI field value by getting/setting the business component instance contained in the activity context. Each mapped business component instance should implement the IAFEditable interface. This interface provides the setValue and getvalue methods used to set and get values of the business component instance.

Methods

The following AFViewBOMapping class methods are important for the application developer to understand:

| Method | Description |
|---|---|
| AFViewBOMapping<br>AFVBViewBOMapping | Create a new AFViewBOMapping instance defining a UI field to business component attribute mapping for an ASP page (parameters passed by the application developer). The application developer calls this method from the implemented views method of the business activity component. |
| getParameter | Return a string containing the parameters defined for this "UI field to business component mapping" to send to the next page. This string contains the name of the UI field mapped to the business component attribute for this view of |

-continued

| Method | Description |
|---|---|
| | the page and the JavaScript code needed to retrieve its value. Called by the getParameter method of the AFView component. The Activity framework implements this logic for the application developer. |
| capture | Based on the parameter passed to the current Active Server Page, update the business components containing the value entered by the user from the previous page for the mapped UI field. The Activity framework implements this logic for the application developer. |

AFViewRadioButtonBOMapping (AFVBViewRadioButtonBOMapping)

The AFViewRadioButtonBOMapping component defines the mapping between a user interface radio button field and the business component instances containing the value to display. This class gets/sets an UI field value by getting/setting the business component instance contained in the activity context. Each mapped business component instance should implement the IAFEditable interface. This interface provides the setValue and getvalue methods used to set and get values of the business component instance.

Methods

The following AFViewRadioButtonBOMapping class methods are important for the application developer to understand:

| Method | Description |
|---|---|
| AFViewRadioButtonBOMapping AFVBViewRadioButtonBOMapping | Create a new AFViewRadioButtonBOMapping instance defining a UI field to business component attribute mapping for an ASP page (parameters passed by the application. developer). The application developer calls this method from the implemented views method of the business activity component. |
| getParameter | Return a string containing the parameters defined for this "UI field to business component mapping" to send to the next page. This string contains the name of the UI field mapped to the business component attribute for this view of the page and the JavaScript code needed to retrieve its value. Called by the getParameter method of the AFView component. The Activity framework implements this logic for the application developer. |
| capture | Based on the parameter passed to the current Active Server Page, update the business components containing the value entered by the user from the previous page for the mapped UI field. The Activity framework implements this logic for the application developer. |

AFViewDynamicBOMapping (AFVBViewDynamicBOMapping)

The AFViewDynamicBOMapping component defines the mapping between a dynamically created user interface field and the business component instances containing the value to display. This class gets/sets an UI field value by getting/setting the business component instance contained in the activity context. Each mapped business component instance should implement the IAFEditable interface. This interface provides the setValue and getValue methods used to set and get values of the business component instance.

Methods

The following AFViewDynamicBOMapping class methods are important for the application developer to understand:

| Method | Description |
|---|---|
| AFViewDynamicBOMapping AFVBViewDynamicBOMapping | Create a new AFViewDynamicBOMapping instance defining a UI field to business component attribute mapping for an ASP page (parameters passed by the application developer). The application developer calls this method from the implemented views method of the business activity component. |
| getParameter | Return a string containing the parameters defined for this "UI field to business component mapping" to send to the next page. This string contains the name of the UI field mapped to the business component attribute for this view of the page and the JavaScript code needed to retrieve its value. Called by the getParameter method of the AFView component. The Activity framework implements this logic for the application developer. |
| capture | Based on the parameter passed to the current Active Server Page, update the business components containing the value entered by the user from the previous page for the mapped UI field. The Activity framework implements this logic for the application developer. |

AFViewTextAreaBOMapping (AFVBViewTextAreaBOMapping)

The AFViewTextAreaBOMapping component defines the mapping between a user interface multi-line entry field and the business component instances containing the value to display. This class gets/sets an UI field value by getting/setting the business component instance contained in the activity context. Each mapped business component instance should implement the IAFEditable interface. This interface provides the setValue and getvalue methods used to set and get values of the business component instance.

Methods

The following AFViewTextAreaBOMapping class methods are important for the application developer to understand:

| Method | Description |
| --- | --- |
| AFViewTextAreaBOMapping AFVBViewTextAreaBOMapping | Create a new AFViewTextAreaBOMapping instance defining a UI field to business component attribute mapping for an ASP page (parameters passed by the application developer). The application developer calls this method from the implemented views method of the business activity component. |
| getParameter | Return a string containing the parameters defined for this "UI field to business component mapping" to send to the next page. This string contains the name of the UI field mapped to the business component attribute for this view of the page and the JavaScript code needed to retrieve its value. Called by the getParameter method of the AFView component. The Activity framework implements this logic for the application developer. |
| capture | Based on the parameter passed to the current Active Server Page, update the business components containing the value entered by the user from the previous page for the mapped UI field. The Activity framework implements this logic for the application developer. |

AFViewDropDownBOMapping (AFVBViewDropDownBOMapping)

The AFViewDropDownBOMapping component defines the mapping between a user interface drop down field and the business component instances containing the value to display. This class gets/sets an UI field value by getting/setting the business component instance contained in the activity context. Each mapped business component instance should implement the IAFEditable interface. This interface provides the setValue and getValue methods used to set and get values of the business component instance.

Methods

The following AFViewDropDownBOMapping class methods are important for the application developer to understand:

| Method | Description |
| --- | --- |
| AFViewDropDownBOMapping AFVBViewDropDownBOMapping | Create a new AFViewDropDownBOMapping instance defining a UI field to business component attribute mapping for an ASP page (parameters passed by the application developer). The application developer calls this method from the implemented views method of the business activity component. |
| GetParameter | Return a string containing the parameters defined for this "UI field to business component mapping" to send to the next page. This string contains the name of the UI field mapped to the business component attribute for this view of the page and the JavaScript code needed to retrieve its value. Called by the getParameter method of the AFView component. The Activity framework implements this logic for the application developer. |
| Capture | Based on the parameter passed to the current Active Server Page, update the business components containing the value entered by the user from the previous page for the mapped UI field. The Activity framework implements this logic for the application developer. |

AFViewUIListBOMapping (AFVBView UIListBOMapping)

The AFViewUIListBOMapping component defines the mapping between a user interface Selected List field and the AFCollection component instance containing the values to display. This class gets/sets an UI field value by getting/setting the AFCollection component instance contained in the activity context.

Methods

The following AFViewSelectedListBOMapping class methods are important for the application developer to understand:

| Method | Description |
| --- | --- |
| AFViewUIListBOMapping AFVBViewUIListBOMapping | Create a new AFViewUIListBOMapping instance defining the selected list box field name (and optionally, the name of a sub-activity to execute on the "capture" method invocation) for an ASP page (parameters passed by the application developer). The application developer calls this method from the implemented views method of the business activity component. |
| GetParameter | Return a string containing the parameters defined for this mapping to send to the next page. This string contains the name of the selected list box field and the JavaScript code needed to retrieve its value. Called by the getParameter method of the AFView component. The Activity framework implements this logic for the application developer. |
| Capture | Based on the parameter passed to the current Active Server Page, update the AFCollection component containing the values entered by the user from the previous page for the selected list box field. The Activity framework implements this logic for the application developer. |

AFViewThumbNailBOMapping (AFVBViewThumbNailBOMapping)

The AFViewThumbNailBOMapping component defines the mapping between a user interface ThumbNail (iconic pushbutton) field and the business component instances containing the value to display. This class gets/sets an UI field value by getting/setting the business component instance contained in the activity context. Each mapped business component instance should implement the IAFEditable interface. This interface provides the setvalue and getvalue methods used to set and get values of the business component instance.

Methods

The following AFViewThumbNailBoMapping class methods are important for the application developer to understand:

| Method | Description |
|---|---|
| AFViewThumbNailBOMapping<br>AFVBViewThumbNailBOMapping | Create a new AFViewThumbNailBOMapping instance defining the selected list box field name (and optionally, the name of a sub-activity to execute on the "capture" method invocation) for an ASP page (parameters passed by the application developer). The application developer calls this method from the implemented views method of the business activity component. |
| GetParameter | Return a string containing the parameters defined for this mapping to send to the next page. This string contains the name of the selected list box field and the JavaScript code needed to retrieve its value. Called by the getParameter method of the AFView component. The Activity framework implements this logic for the application developer. |
| capture | Based on the parameter passed to the current Active Server Page, update the business components containing the value entered by the user from the previous page for the mapped UI field. The Activity framework implements this logic for the application developer. |

Site Server Framework Design

Figure 9A:
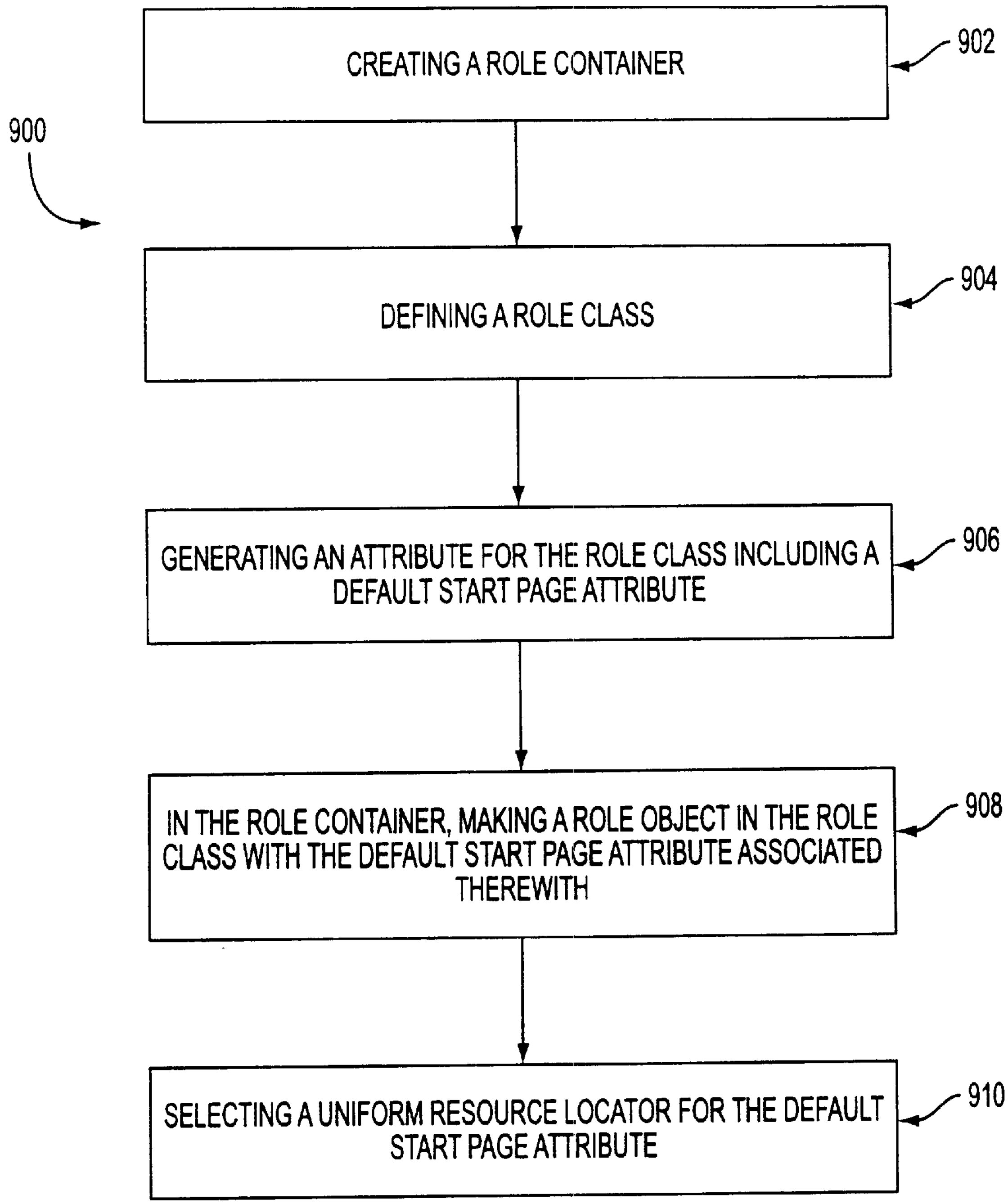
FIG. 9 is a flowchart illustrating a method for accessing services within a server without a need for knowledge of an application program interface of the server.
Figure 9B:
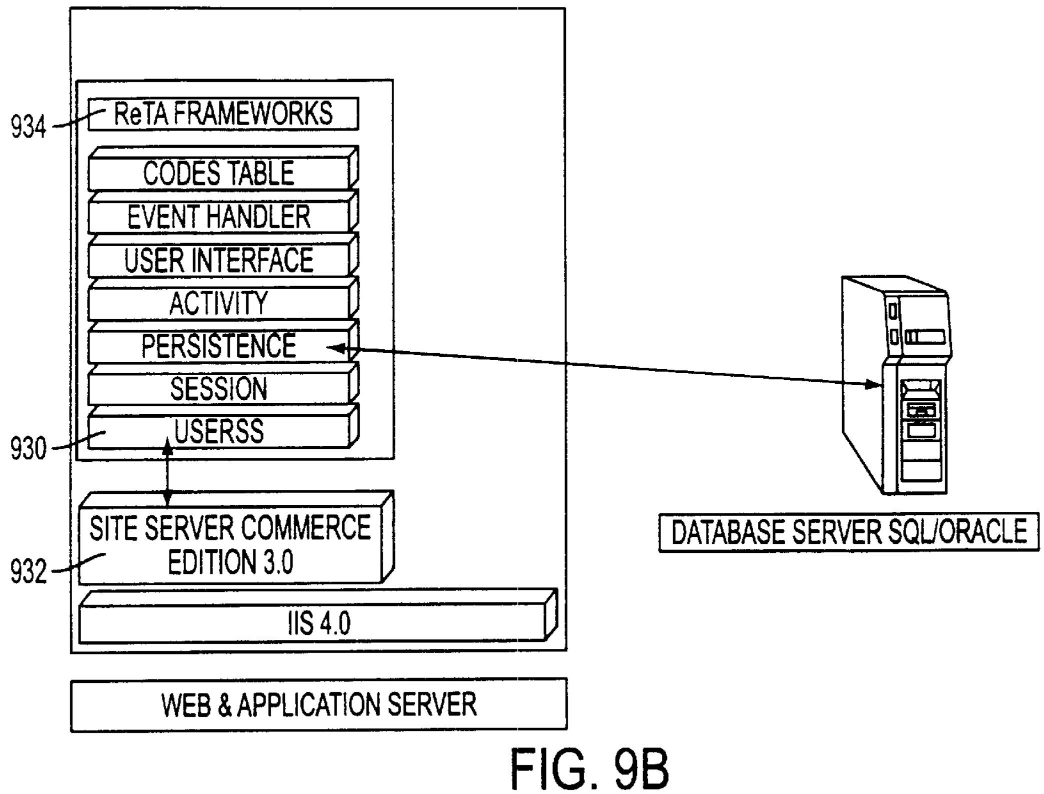

FIG. 9 illustrates a method 900 for accessing services within a server without a need for knowledge of an application program interface of the server. A role container is first created in operation 902. In operation 904, a role class is defined and in operation 906 an attribute for the role class is generated which includes a default start page attribute. In the role container, a role object is made in the role class with the default start page attribute associated therewith in operation 908. A uniform resource locator is selected in operation 910 for the default start page attribute.

A plurality of attributes may be generated for the role container. Further, these attributes may include a default start page attribute, a user name attribute, a user identifier attribute, and/or a role name attribute.

A user may be assigned to the role object. Optionally, a plurality of role objects may be made in the role class with each role object having a unique default start page associated therewith. As another option, an operator role object and a customer role object may be made as well. The following material provides a more detailed description of the above-described method.

This portion of the present description details the ReTA Site Server framework design from the perspective of the application developer. The role of this framework is to provide components that allow one to integrate the ReTA custom frameworks with Site Server. This provides a user component connecting to Site Server, but does not require knowledge of the Site Server API itself to integrate with Site Server.

Site Server Framework Execution Architecture

To connect to Site Server a COM component (UserSS) is used to make calls to Site Server's API. The ReTA UserSS component allows the developer to access Site Server's Personalization and Membership Services without any knowledge of Site Server's API.

FIG. 9.1 illustrates Site Server Framework Architecture. This figure shows the different layers in the Site Server framework architecture. The UserSS COM component 930 connects to Site Server 932. The UserSS component uses Site Server's Personalization and Membership; UserSS also performs security as well on a Commerce Site. The ReTA framework 934 uses the UserSS layer to provide access to Site Server. The UserSS layer provides the following benefits:

It insulates the application developer from Site Server's API.

It provides functionality for using Site Server's Personalization and Membership Services.

Site Server Framework Development Architecture

UserSS Interface Methods

The UserSS component interfaces with the SiteServer personalization and membership services. This component uses,SiteServer to handle the user security, role and preferences.

Methods

The IAFUser, IAFUserPreferences, and IAFUserRole interfaces define the access to the AFUserSS component. These interfaces support the following methods:

| Method | Description |
|---|---|
| Init | This method initializes the UserSS Component. |
| GetUserID | This method returns a string value representing the user id. SiteServer's API is used to obtain this value. |
| GetUserName | This method returns a string value representing the user's name SiteServer's API is used to obtain this value. |
| GetRealName | This method returns a string value representing the user's real name. SiteServer's API is used to obtain this value. |
| GetPref | This method takes as input a preference label and returns a string value representing the user's preference value. SiteServer's API is used to obtain this value. |
| SetPref | This method accepts two parameters (String thePrefLabel, String thePrefValue). The preference is set that matches the "thePrefLabel" passed in. |
| GetRoleID | This method returns the current users Role id. |
| GetRoleName | This method returns the current user's role name. |
| GetRolePref | This method takes as input a preference label returns the current user's role preference value. |
| SetRolePref | This method sets the current user's role preference |

Site Server Personalization and Membership/ Directory Membership Manager

This portion of the description describes the required settings in Site Server Commerce Edition used by the ReTA frameworks. This portion of the description also describes the steps involved in creating the required settings.

ReTA Required Settings

The Membership Directory Manager is used to manage administration and access control for Membership Directory objects, including users and groups, and schema objects. The Membership Directory stores objects used by all Site Server features.

Figure 10:
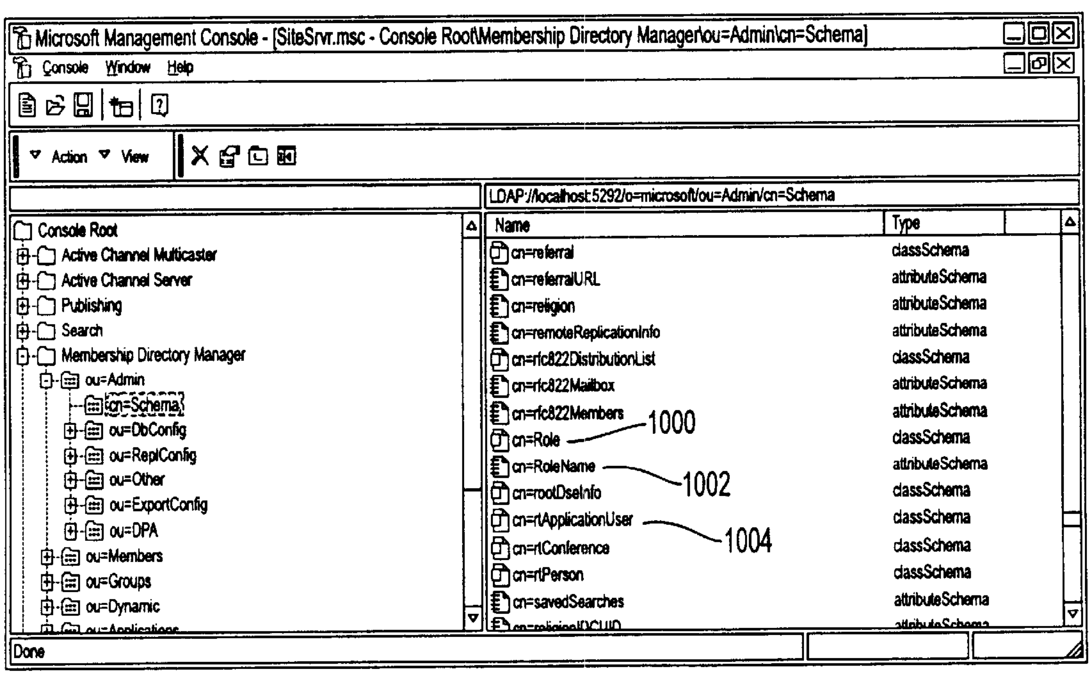
FIG. 10 illustrates schema attributes and classes, with class "Role" and attribute "RoleName" shown.

The ReTA UserSS framework requires schema objects to be created. The schema objects required by the ReTA Frameworks are: Roles container 1000, RoleName attribute 1002, username attribute 1004, webUserId attribute, and a Role class. FIG. 10 illustrates schema attributes and classes, with class "Role" and attribute "RoleName" shown.

Required Container, Class, and Attribute Setup Instructions

Users may have different roles within the system. In Site Server ReTA takes advantage of this by creating a Container "Roles" that contains different "Roles" or different objects of the class "Role". These "Roles" have attributes such as a default start page. Therefore different "Roles" (different objects of the class "Role") such as "Operator" or "Customer" may both have a default start page attribute that may point to different URL's.

The Site Server portion of the present description details how to setup a Container, Class, and Attributes. The following lists the steps involved to setup the required attributes for the ReTA Frameworks to integrate with Site Server.

Using the Site Server Console, Right Click on the Membership Directory Manager Folder Select New-Container, then type in Roles for the Container name.

Figure 11:
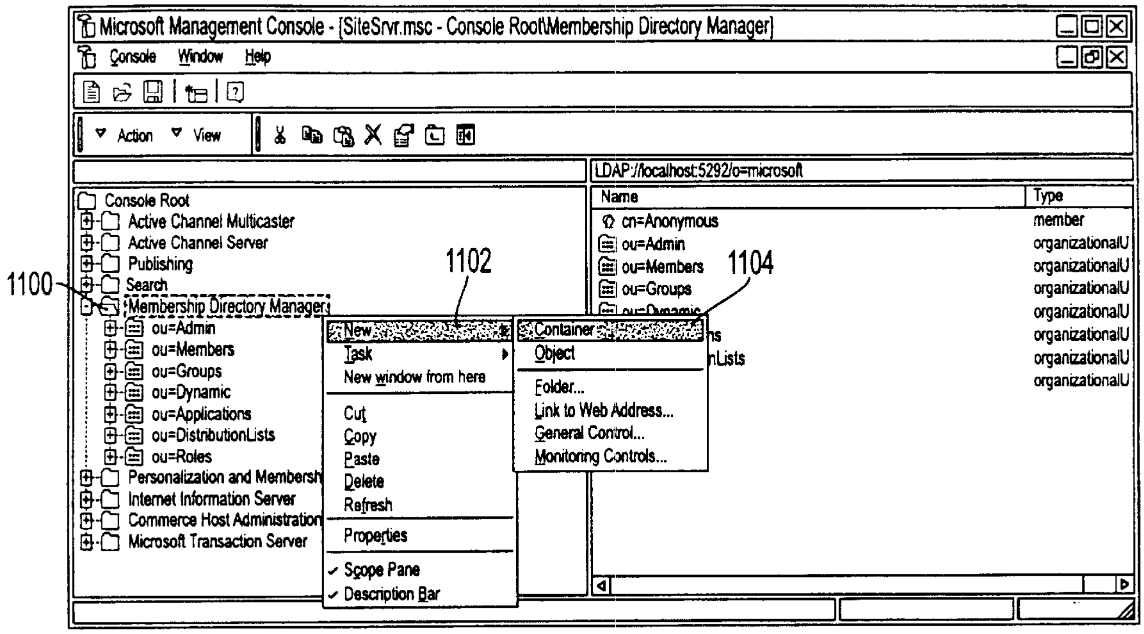
FIG. 11 illustrates the creating of Container "Roles" according to an embodiment of the present invention.

FIG. 11 illustrates the creating of Container "Roles". Right click on Membership Directory Manager 1100 and select New 1102-Container 1104. After creating the Container "Roles", create the attribute "DefaultStartPage", "username", webUserId", and "RoleName" in the Schema. To create these attributes expand the Admin Container under the Membership Directory Manager.

Figure 12:
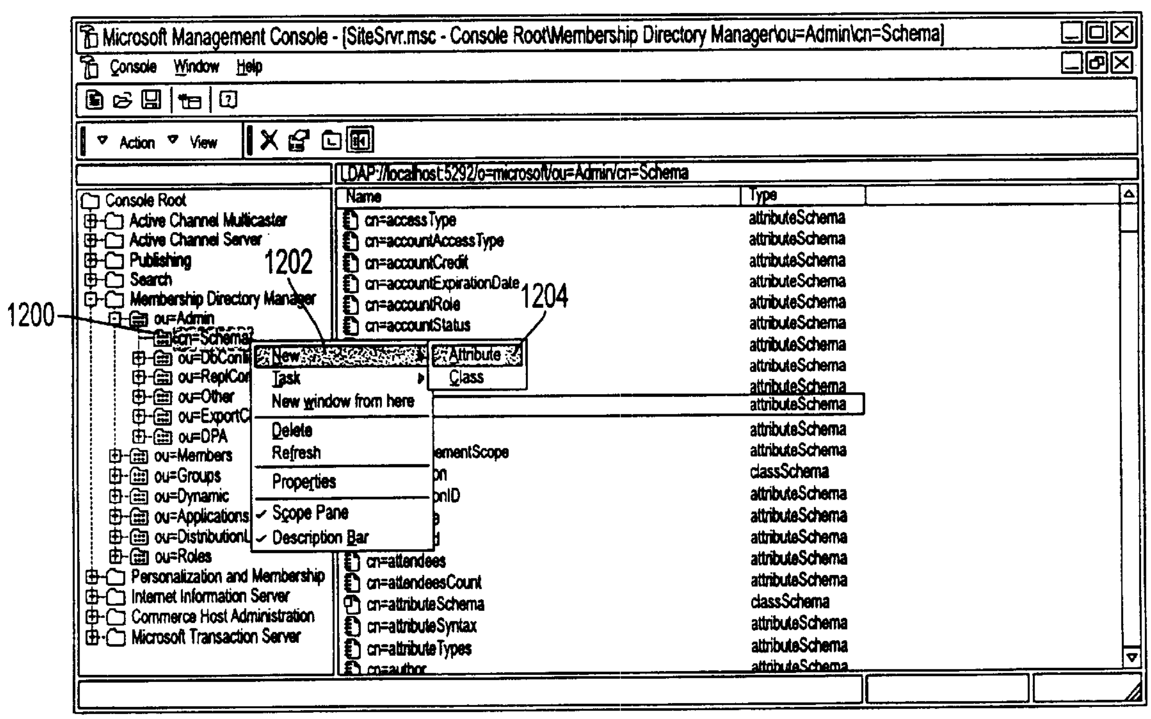
FIG. 12 is an illustration of a graphic display at a point where a user has right-clicked on the Schema folder and selected New—Attribute according to an embodiment of the present invention.

Right click on the Schema folder 1200 and select New 1202-Attribute 1204 (See FIG. 12)

Define the class "Role" the same way by right clicking on Schema and selecting New-Class.

Select the "common-name" as a required attribute, also select the "DefaultStartPage" as an attribute but do not make it required.

Create the Roles for our Application, "Operator" and "Customer".

Figure 13:
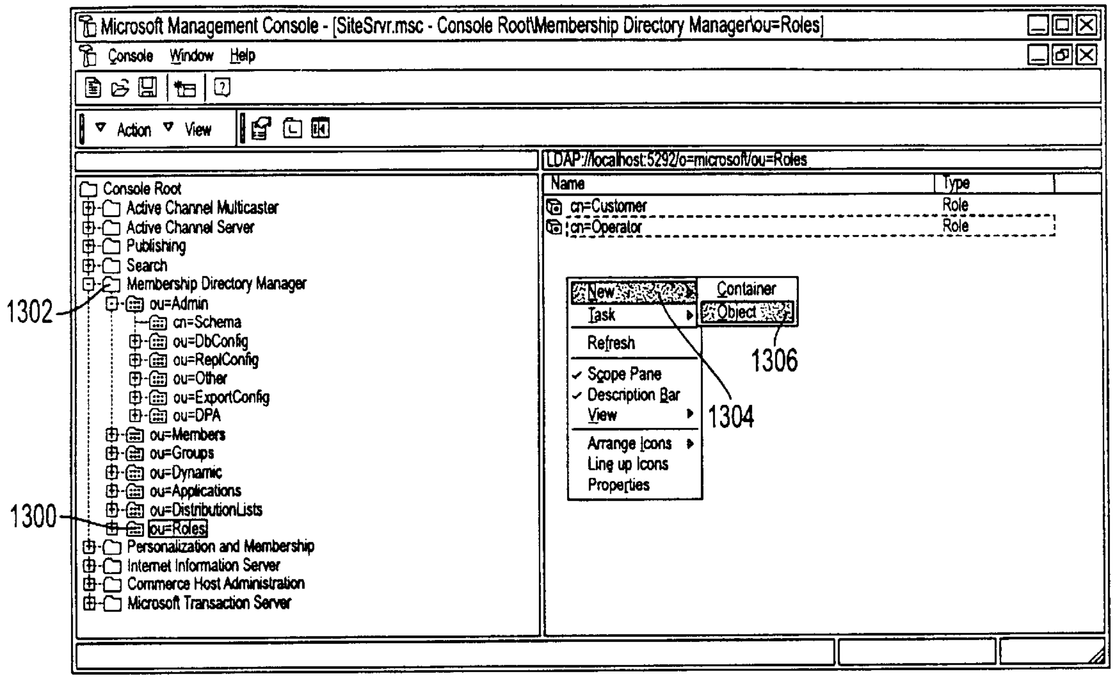
FIG. 13 illustrates the adding of different Roles according to an embodiment of the present invention.

See FIG. 13, which illustrates the adding of different Roles. Right click the Roles Container 1300 under the Membership Directory Manager folder 1302. Select New 1304-Object 1306, select "Role" for the class of object to create, type the name of the object i.e. "Operator", add the attribute "DefaultStartPage" by clicking Add Attribute button and enter the URL.

Figure 14:
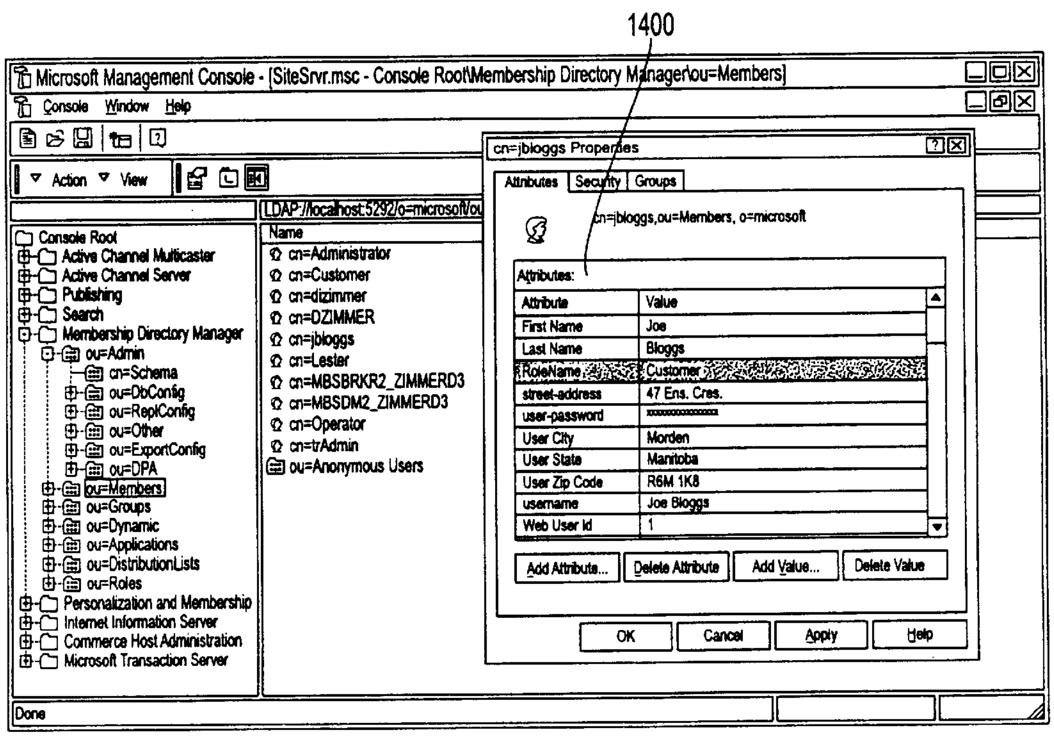
FIG. 14 illustrates an example of the graphic display showing the attributes of member "Joe Bloggs" according to an embodiment of the present invention.

Once these have been created, a member of the system can be assigned to a "Role" and the ReTA Framework required attributes can be added to the user. FIG. 14 illustrates an example showing the attributes 1400 of member "Joe Bloggs" (Note RoleName).

Event Handler Framework Design

Figure 15A:
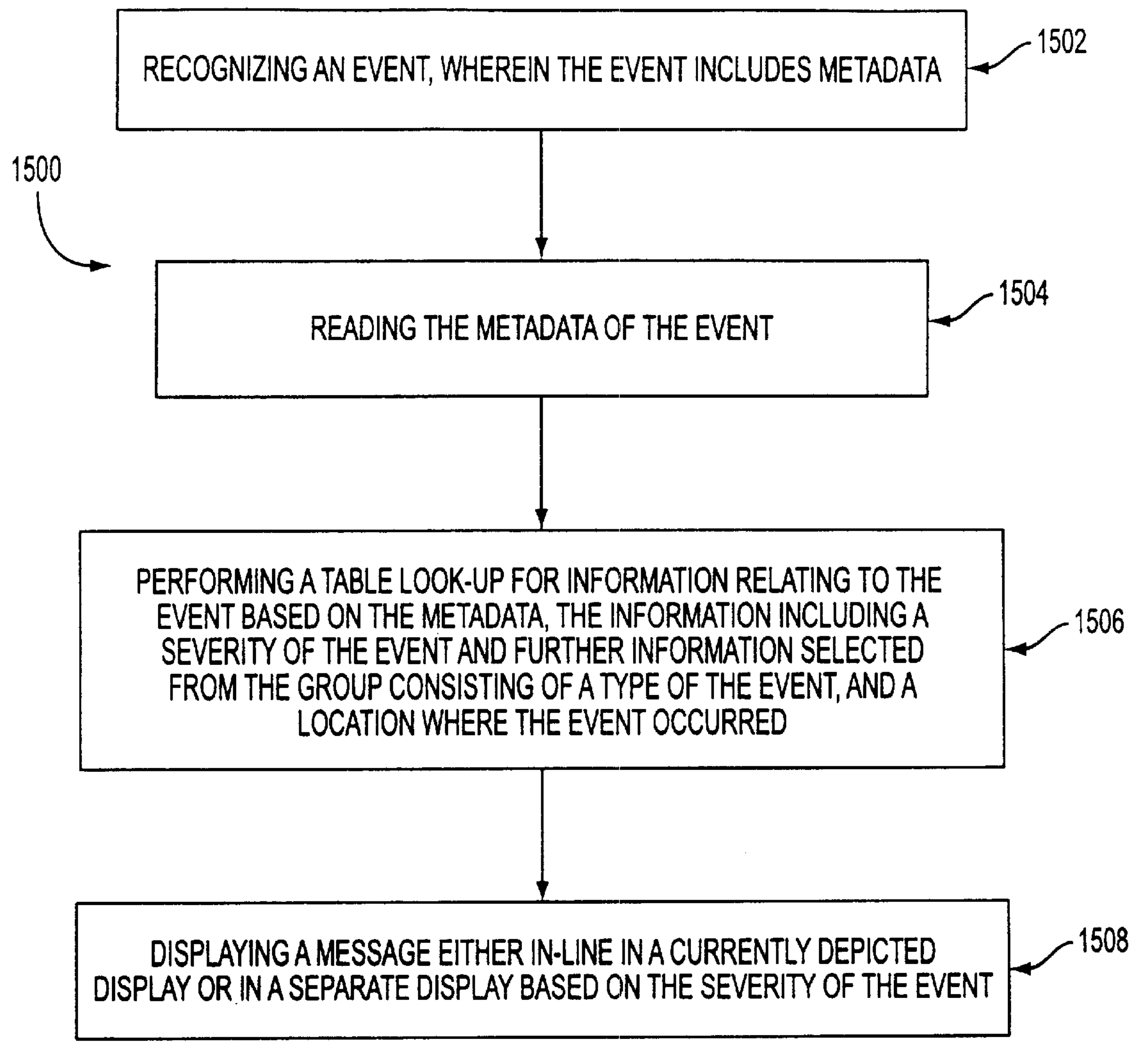
FIG. 15 is a flowchart that illustrates a method for handling events in a system.
Figure 15B:
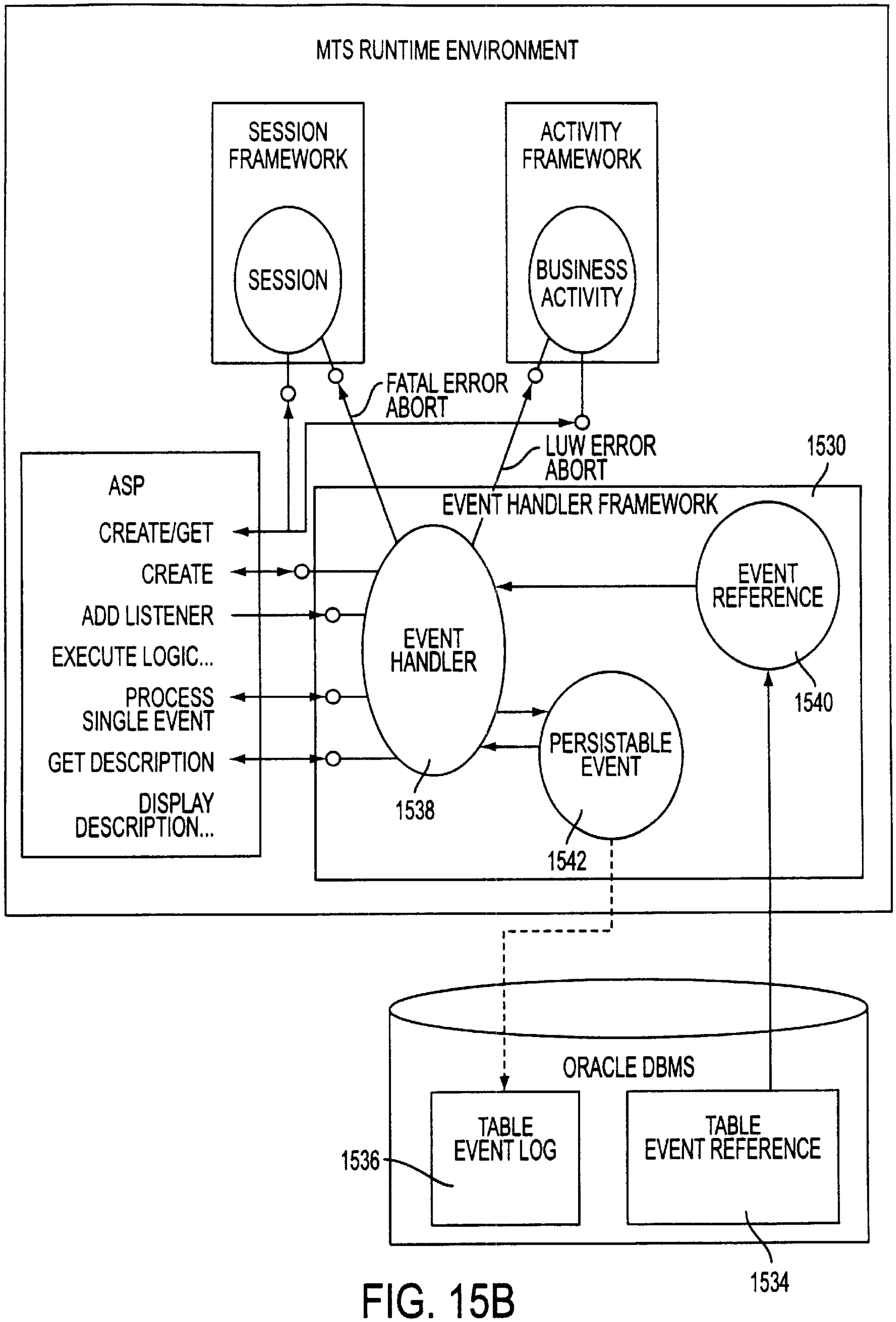

FIG. 15 illustrates a method 1500 for handling events in a system. In operation 1502, an event which includes metadata is recognized. Next, in operation 1504, the metadata of the event is read and, in operation 1506 a table look-up is performed for information relating to the event based on the metadata. The information includes a severity of the event and further information such as a type of the event, and a location where the event occurred. In operation 1508, a message is displayed either in-line in a currently depicted display or in a separate display based on the severity of the event.

Optionally, the event may additionally be indicated to components of the system other than the component in which the event occurred. The type of the event may be a database error, an architecture error, a security error, and/or an application error. Further the location of the event may be at least one of a method and an object where the event occurred. Also, the information may further relate to a code associated with the event.

The message may include the information relating to the event. In additionally, the message may also include a time during which the event occurred. Further, the message may include a string altered based on a user profile. The following material provides a more detailed description of the above-described method.

This portion of the present description details the ReTA Event Handler framework design from the perspective of the application developer. The role of this framework is to provide services to manage the informational, warning and error events that an application may raise. These services include:

Presenting the user with an understandable event explanation.

Informing other Components when errors happen (for example to restore transactional data to a consistent state) using a Publish/Subscribe mechanism.

Logging informational, warning and error event messages.

The Event Handler uses an Event Reference meta-data database table to maintain information about the types of events in an application and the policy for dealing with them. This gives a flexible approach and the event messages, the severity and other policies for the events can be changed during operations.

Phase 2—Event Handler Enhancements For phase 2, Event Handler consists of the following enhancements:

The Event Handler framework is componentized. It no longer maintains references to any of the other framework components. Internally, the Event Handler continues to use the persistence light framework to log events to the database.

As in phase 1, it can be used as a Session level component. As an enhancement for phase 2, the Event Handler framework can be used as a stateless page level component. This means that a new instance of the component is created at the beginning of each ASP page and is released at the end of each page.

The Event Handler framework no longer requires Event Collection components as parameters to implement event handling, which only allowed handling events at the page level. In phase 2, the new method "processSingleEvent" takes the parameters of a single event as its input, which enables handling events at the occurrence of the event.

As in phase 1, The Event Handler can format error descriptions in HTML. As an enhancement for phase 2, the Event Handler can return the error message as a string and enables the application to implement client specific formatting (HTML or other).

The process event method no longer calls the ASP redirect method. Instead, it returns the severity level code. On return, the application logic determines whether to redirect to the error page or display the error in-line in the current page.

The Translator is no longer a separate component. Instead, it is a Java class inside the Event Handler component.

Event Handler Framework

Description

With reference to FIG. 15.1, the ReTA Event Handler Framework 1530 manages the informational, warning and error events that an application raises. The following describes the ReTA event handling sequence:

1) The event(s) occurs

When an event occurs the following event information is recorded:

event type (defined in database Event Reference table), for example:

database error security error architecture error application error event location:

method and object name where the event occurred event code (sub-type):

SQL error code, application error code—mapped to a unique description in the database architecture error code—mapped to a unique description in the database event context:

Any relevant information about when the event occurred stored in a tagged name value pair format. Eg. [OrderNumber=1] [Description="Repeat Order"]

If the event occurs within a Java class inside a COM object, use the Java exception mechanism by throwing an AFEventException. If the exception occurs elsewhere, call the add method on the Event Collection passing the event information.

Each method defining a COM component interface captures these event exceptions and either adds them to an Event Collection component or directly calls a method on the Event Handler component.

Events are processed from the ASP page by calling the process method of the Event Handler. Events can also processed from the point where the event occurred by calling the "processSingleEvent" method of the Event Handler.

2) The Event Handler processes the event(s):

For each event, set the user id and current page

For each event, retrieve the event severity from the event handler's "translator" class. This class caches in memory all event descriptions and severity levels retrieved from the event reference database table.

Add the events to the Event Handler context.

Implement the persistence policy on the events—events are logged in a batch.

Return the severity of the most severe event to the caller. The caller is responsible for either redirecting to the error page or displaying the event in-line in the Current Page.

3) Display the event:

Use the Event Handler component to generate the error message. This message can contain context information describing when the event was created.

Create the HTML formatting and display the event message.

The Error Message is either displayed in-line in the current page or in a separate error page.

4) The Event Handler generates error display message:

Get the event with the highest severity level from its event context.

If the most severe event is "fatal", display the user description associated with the event. Broadcast a SESSION_ABORT message using the Publish/Subscribe mechanism. Any component that is interested in these events must implement the IAFEventListener interface and register with the Event Broadcaster component as interested. To do this they call the addListener method of the Event Handler component.

If the most severe event is "logical unit of work", display the user description associated with the event. Broadcast an ACTIVITY_ABORT message using the Publish/Subscribe mechanism.

If the most severe event is "warning", display the user description associated with the event.

Note: The user event descriptions are retrieved from the database either on session start or on demand and are cached by the Translator class. When generating the event description page, this description is requested from the Translator. Event descriptions can have embedded context parameters.

When generating the event description page, the event handler replaces these parameters with their values specified when creating the event.

Database Tables

The Event Handler uses two database tables: The T_AF_EventReference 1534 is a static table that describes the Event meta-data, giving the policies for each event type. The policies include:

The message that is displayed to the user. These messages can contain data from the Context that is included when the event is generated.

The severity of the event. The severity can be Information, Warning, Error and Fatal.

Whether to persist the event in the database event log.

The T_AF_EventLog 1536 contains the log of the events that occurred. The following information is logged:

Event type and Code

The location where the event occurred. I.e. ASP, Object name and Method Name.

The user that raised the event.

The datestamp.

The context information giving other information about what caused the event.

Services

The Event Handler Framework provides the following services:

| Service | Detail |
|---|---|
| Register event | Create event |
| | Maintain event reference |
| Process event | Information |
| | Warning |
| | Logical Unit of Work |
| | Fatal |
| Display events | Translate event |
| | Inform user |
| Persist event | Log event to database |

Components and Classes

The Event Handler Framework implements these services through the following COM and Class objects:

| | Service |
|---|---|
| Component | |
| AFEventHandler | Handle events generated by the system |
| AFEventCollection | Contains a collection of events (AFEventException) |
| AFResult | Defines the result returned by a method execution. |
| Class | |
| AFEventException | Contains single event information. |
| AFEventReference | Contains event reference information from database table T_AF_EventReference |
| AFTranslator | Returns event reference information based on the event type and event code. Note: multi-language translation functionality not implemented |
| AFPersistableEvent | This is the persistable class containing the information for a single event. It is sub-class of the Persistence PersistableObj class. The persistance mechanism can insert, delete, select and update objects of this class in the database. This class persists event information the T_AF_EventLog table. |

These components and classes are described in detailed in the following sub-portions of the description.

AFEventHandler

The AFEventHandler component 1538 handles the events generated by the system. Depending on the severity level, the event handler may redirect the user to another ASP page and may abort the activity or session. The event handler also determines whether and when to log an event.

Methods

The LAFEventHandler interface defines the access to the AFEventHandler component. This interface supports the following methods:

| Method | Description |
|---|---|
| PersistAllEvents | Persist all the events stored by the event handler to the database. |
| ProcessSingleEvent | Gather associated event information. Call the add method to persist the events in the event log. Return the event severity to the caller. This method is called either from the ASP page or from a Java class where the Event was trapped. |
| Process | Examine the events and gather associated event information. Call the add method to persist the events in the event log. Return the event severity of the most severe event to the caller. The application developer calls this method from an ASP page to check the events generated during the scripting logic execution. |
| Generate | Return generated HTML which describes the severity of the error, gives the target URL (depending on the severity - previous page, activity start page or home page) and an error log. The Event Handler page calls this method. |
| Initialize | The application developer can invoke this method to load all event descriptions in memory (normally used to speed access during user session). |
| GetErrorDescription | Return error message as a string, which describes the severity of the error. This allows the application to determine the HTML formatting used to display an error |
| HasFatalError | If the event handler contains at least one fatal error, returns true. |

AFEventCollection

The AFEventCollection component contains a collection of events.

Methods

The IAFEventCollection interface defines the access to the AFEventCollection component. This interface supports the following methods:

| Method | Description |
|---|---|
| SpecifySubActivity | Attach the sub-activity to all events contained in the event collection. |
| GetSubActivity | Return the sub-activity attached to all events contained in the event collection. |
| Add | Add an event to the event collection. |
| Get | Return the requested event. |
| NumberOfEvents | Return the number of events in the collection. |
| Clear | Clear all the events from the collection |

AFResult

The AFResult component defines the result return by a method execution.

Methods

The IAFResult interface defines the access to the AFResult component. This interface supports the following methods:

| Method | Description |
|---|---|
| GetResult | Return the result. |
| AddResult | Add a result. |
| AddResultString | Add the result as a string. |
| GetResultString | Return the result as a string. |

AFTranslator

The AFTranslator class returns event reference information (based on the event type and event code.

Methods

The AFTranslator class has the following methods:

| Method | Description |
|---|---|
| GetEventTranslation | Return the description for this event. |
| GetEventSeverity | Return the severity level for this event. |
| GetEventPersist | Return flag that defines whether to persist this event. |
| GetUserDescription | Return the user description for this event. This description is displayed to the user. |
| GetDescription | Return the description for this event. This description is user by the technical support team to analyze error. |
| Start | Initialize component. |

AFEventException

The AFEventException class contains the event exception information and is added to the AFEventCollection component for processing by the AFEventHandler component.

Methods

The following AFEventException class methods are important for the application developer to understand:

| Method | Description |
|---|---|
| AFEventException | Create the event exception class and populate it with<br>event type:<br>database error<br>Java error<br>security error<br>architecture error<br>application error<br>event location:<br>method and object name where the event occurred<br>event code (sub-type):<br>SQL error code,<br>Application error code - mapped to a unique description in the database<br>Architecture error code - mapped to a unique description in the database<br>event context:<br>value of specific object |
| AddToCollection | Add the current event to an event collection. |

AFEventReference

The AFEventReference component 1540 contains the event reference information that is defined by the application through database table T_AF_EventReference. The architecture reads the event reference data into memory on session start.

T_AF_Even Reference

| Column Name | Description |
|---|---|
| Id | Unique id |
| Type | The event type |
| Code | The event code |
| SeverityLevel | The event severity level:<br>1: Information<br>2: Warning<br>3: Abort the activity<br>4: Fatal, close the session |
| Persist | 1: if the event should be persisted in the event log.<br>0: if the event should not be persisted |
| Description | Event description showed to the operator |
| UserDescription | Event description shown to the user. This description can contain contextual information, which is specified by adding tag like [ParameterName] in the description. These tags are replaced by the event framework when displaying the event to the user. |
| Language | Language of the description. This may be used by the multi-language framework when developed. At this time, set to 'English'. |
| Context | Event context default value. |

AFPersistableEvent

The AFPersistableEvent 1542 contains the event information captured during the application execution that is persisted to the database table T_AF_EVENTLOG.

T_AF_EVENTLOG

| Column Name | Description |
|---|---|
| Id | Unique id |
| Type | The event type |
| Code | The event code |
| SeverityLevel | The event severity level:<br>1: Information<br>2: Warning<br>3: Abort the activity<br>4: Fatal, close the session |
| SubActivityLevel | Name of Sub Activity where event occurred. |
| MethodName | Name of class method where event occurred. |
| ObjectName | Name of class where event occurred. |
| ASP | Name of ASP page where event occurred. |
| Context | Event context default value. |
| UserID | ID of user logged in when event occurred. |
| LastUpdate | |

User Framework Design

Figure 16A:
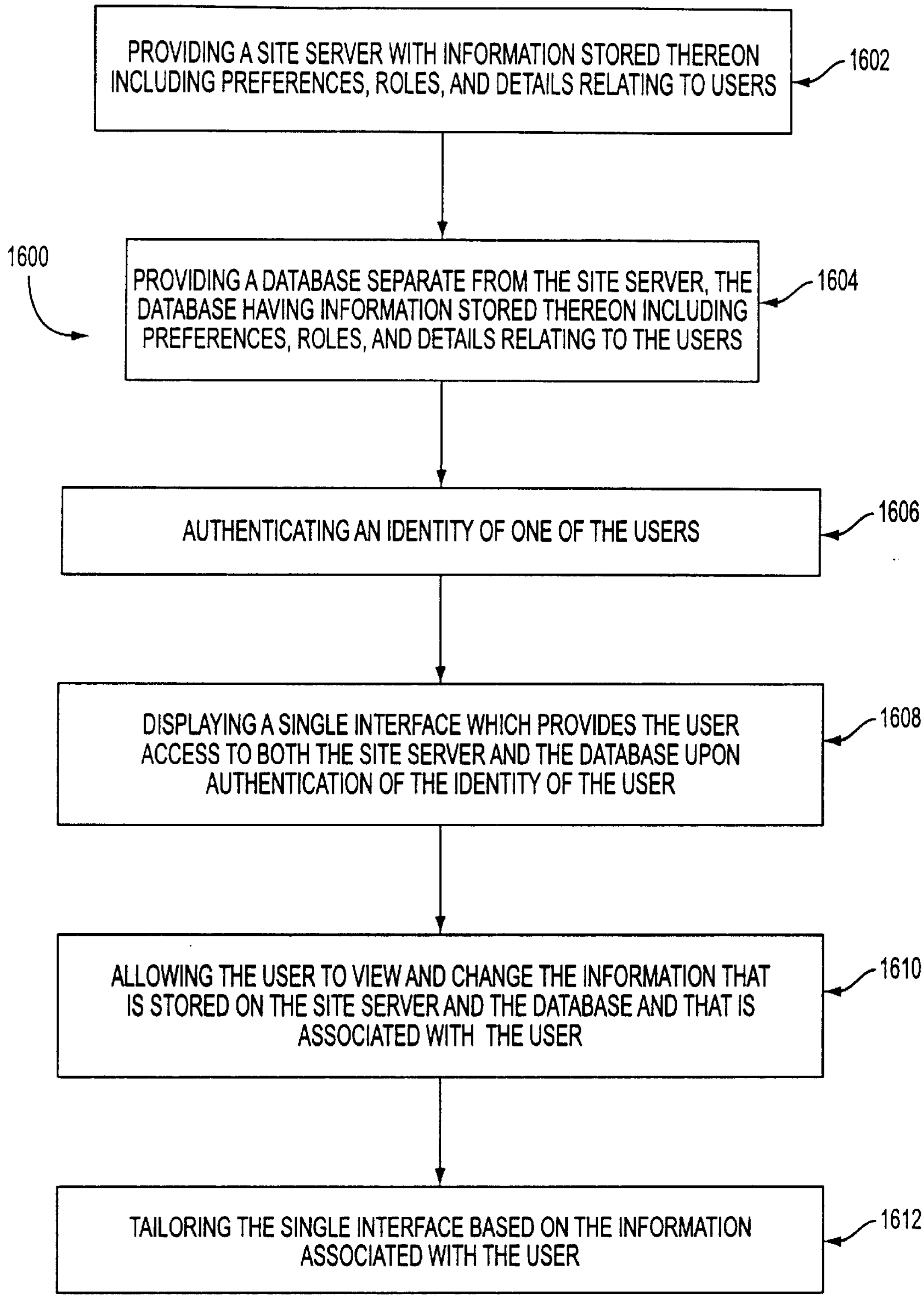
FIG. 16 is a flowchart depicting a method for managing user information.
Figure 16B:
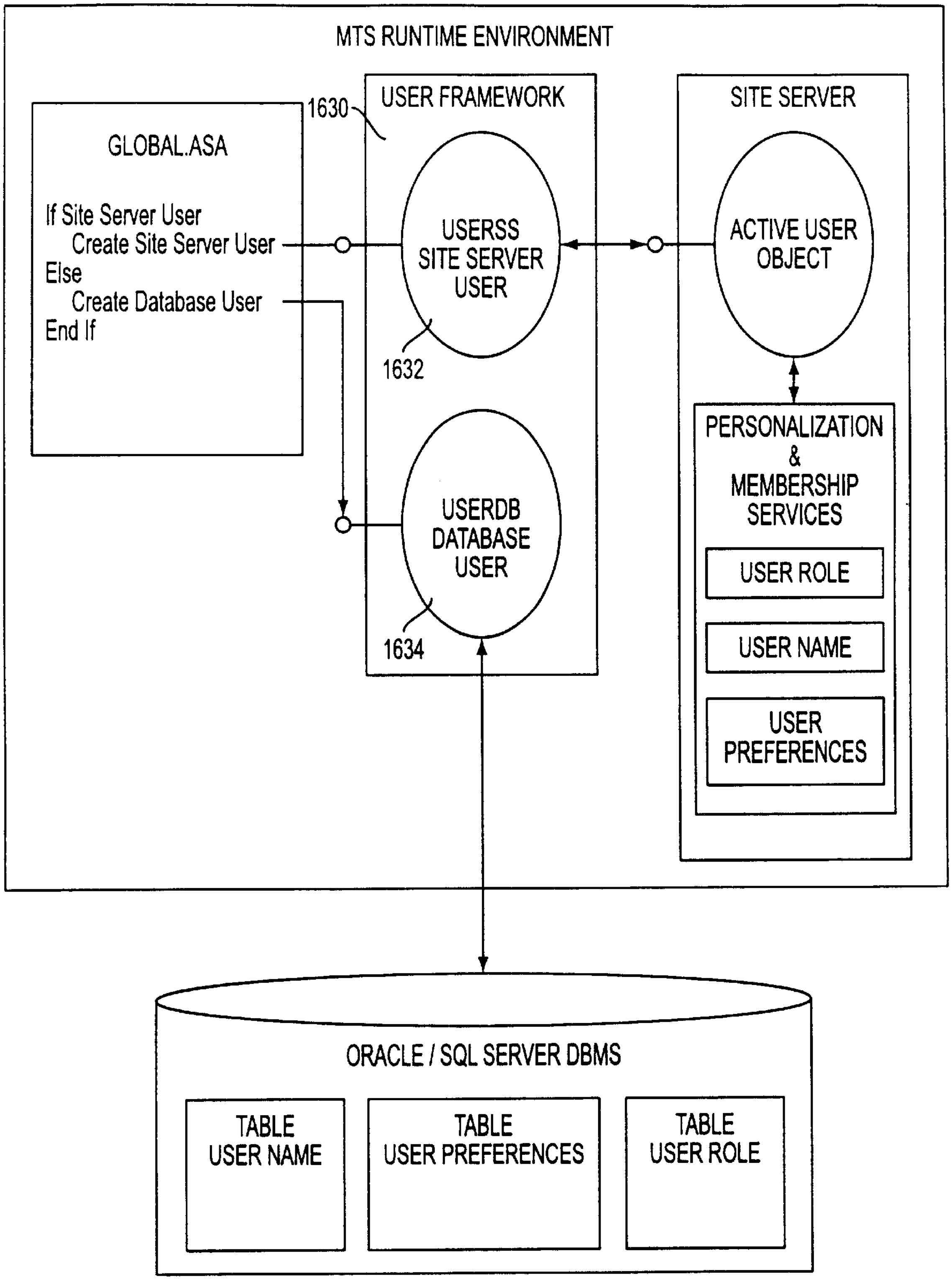

FIG. 16 depicts a method 1600 for managing user information. A site server is provided in operation 1602. The side server has information stored on it including preferences, roles, and details relating to users. A database separate from the site server is provided in operation 1604. The database has information stored thereon including preferences, roles, and details relating to the users. In operation 1606, an identity of one of the users is authenticated. A single interface is displayed in operation 1608, which provides the user access to both the site server and the database upon authentication of the identity of the user. In operation 1610, the user is allowed to view and change the information that is stored on the site server and the database and that is associated with the user. The single interface is tailored in operation 1612 based on the information associated with the user.

The identity of the user may be authenticated by verifying a user name and a password, a secure sockets layer (SSL) certificate, and/or a log-in form. Further, the preferences relating to the users may include a currency in which monetary values are displayed and a language in which text is displayed. Also, the roles relating to the users may include a customer, a manager, and an employee. Additionally, the details of the users may include a user name and a legal name. The following material provides a more detailed description of the above-described method.

This portion of the present description details the ReTA User framework design from the perspective of the application developer. The primary role of this framework is to provide services that allow the application developer to maintain user preferences, roles and security.

In regards to security, the User framework provides User Authentication services through any of the standard Internet Information Server security methods:

Username/Password sent in clear text.

SSL Certificates

Windows NT Challenge/Response (Intranet only)

HTML Forms login (Site Server version only)

Once the user has been authenticated, the User framework provides services for accessing:

User information—NT username, Real Name.

User Preference information—For example Language, Currency (These are configurable)

User Role information (e.g. Customer, Manager, Employee)

User Role Preference information

There are two implementations of the User Component: One is database driven and the other interfaces with Site Server Personalization and Membership directory.

User Framework

Description

With reference to FIG. 16.1, the User framework 1630 enables two approaches to maintaining user information. The framework supports two approaches by exposing a single set of interfaces that can be used by either of the two user framework components. With the AFUserSS component 1632, the framework interfaces with the Microsoft Site Server products Personalization and Membership Directory. For this user component, SiteServer holds and manages user information. With the AFUserDB component 1634, the framework interfaces with database tables. For this user component, database tables define the user information.

Services

The User Framework provides the following services:

| Service | Detail |
|---|---|
| User Information Maintenance | User Role<br>User RoleName<br>User Preferences<br>User Role Preferences<br>User Id<br>User Name<br>User RealName. |

Components

The User Framework implements these services through the following COM objects:

| Component | Service |
|---|---|
| AFUserDB | User information maintained through the following database tables.<br>T_AF_USERNAME,<br>T_AF_USERPREFERENCES<br>T_AF_USERROLES |
| AFUserSS | User information maintained through SiteServer. |

These components are described in detailed in the following sub-portions of the description.

AFUserDB

The AFUserDB component holds the user role, preferences and details retrieved from the database. When created the user component retrieves the user NT login name, user details and constructs the user preference and user role objects.

Methods

The IAFUser, IAFUserPreferences and IAFUserRole interfaces define the access to the AFUserDB component. These interfaces support the following methods:

| Method | Description |
|---|---|
| Init | This method retrieves the user's NT name, user details from the database, constructs the preference object and constructs user's role object. |
| GetUserID | Returns the user id. |
| GetUserName | Returns the user's NT account name. |
| GetRealName | Returns the user's real name. |
| GetPref | Returns user's preference based on label passed to this method. |
| SetPref | This method sets the user's preference to the 2nd parameter passed in. |
| GetRoleID | Returns the user's role ID. |
| GetRoleName | Returns the user's role name. |
| GetRolePref | Returns role preference. |
| SetRolePref | This method sets the current user's role preference |

AFUserSS

The UserSS component interfaces with the SiteServer personalization and membership services. This component uses SiteServer to handle the user security, role and preferences.

Methods

The IAFUser, IAFUserPreferences, and IAFUserRole interfaces define the access to the AFUserSS component. These interfaces support the following methods:

| Method | Description |
|---|---|
| Init | This method returns a zero integer. It is here for compatibility with the UserDB component. |
| GetUserID | This method returns a string value representing the user id SiteServer's API is used to obtain this value. |
| GetUserName | This method returns a string value representing the user's name. SiteServer's API is used to obtain this value. |
| GetRealName | This method returns a string value representing the user's real name. SiteServer's API is used to obtain this value. |

-continued

| Method | Description |
|---|---|
| GetPref | This method returns a string value representing the user's preference. SiteServer's API is used to obtain this value. |
| SetPref | This method accepts two parameters (String thePrefLabel, String thePrefValue). The preference is set that matches the "thePrefLabel" passed in. |
| GetRoleID | This method returns the current user id. |
| GetRoleName | This method returns the current user's role name. |
| GetRolePref | This method returns the current user's role preference. |
| SetRolePref | This method sets the current user's role preference |

Persistence Framework Design

Figure 17A:
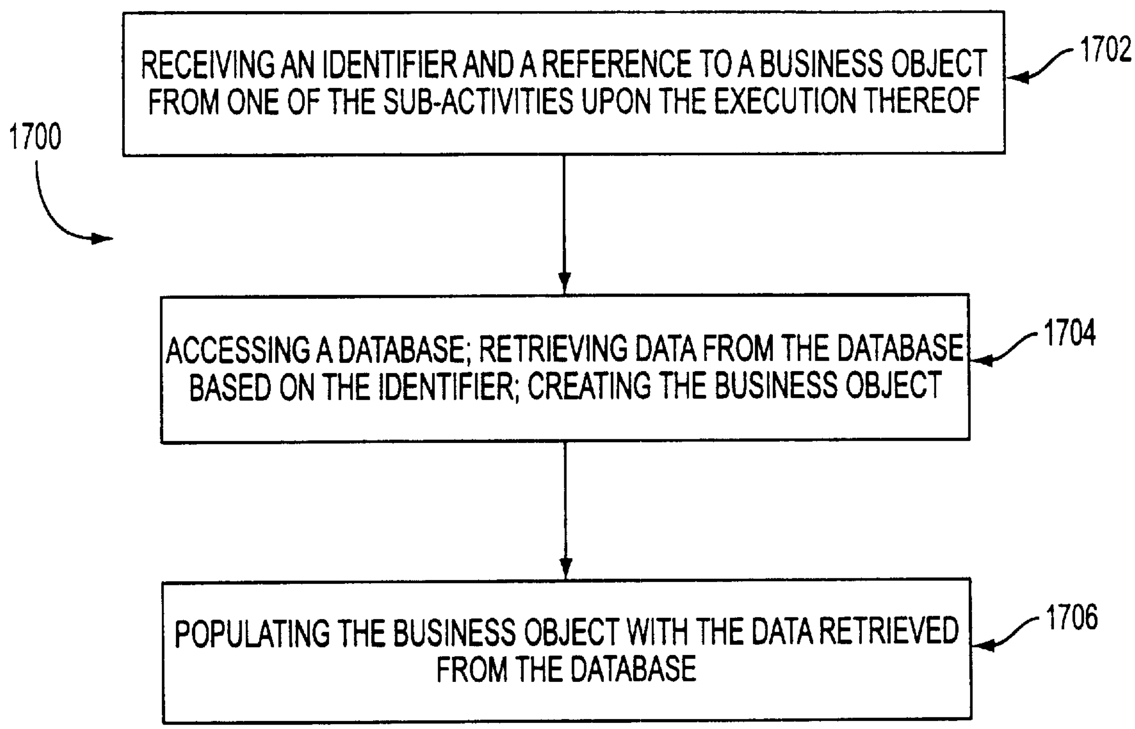
FIG. 17 is a flowchart that illustrates a method for managing business objects in a system that includes a plurality of sub-activities which each include sub-activity logic adapted to generate an output based on an input received from a user upon execution, and a plurality of activities which each execute the sub-activities in a unique manner upon being selected for accomplishing a goal associated with the activity.
Figure 17B:
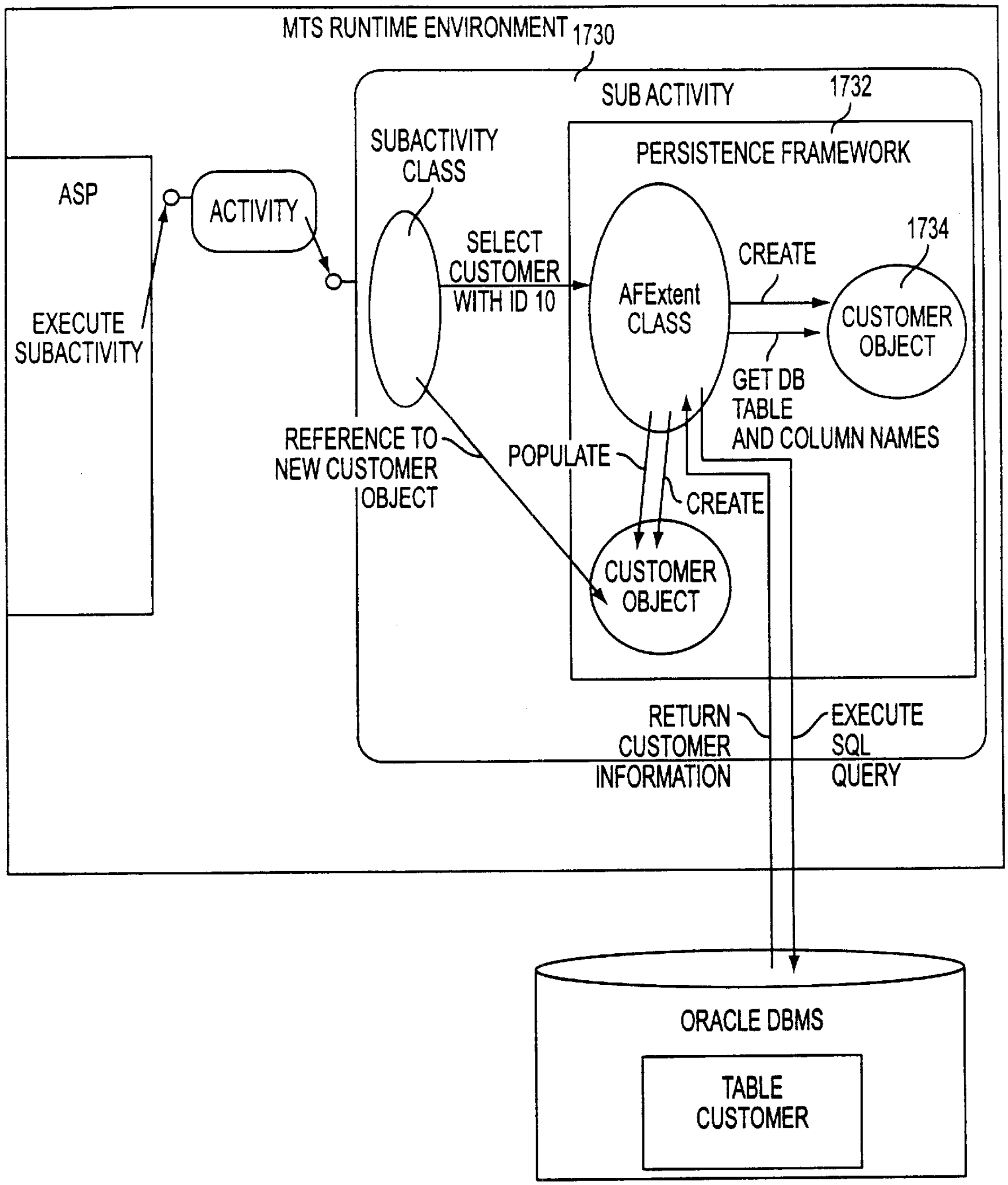

FIG. 17 illustrates a method 1700 for managing business objects in a system that includes a plurality of sub-activities which each include sub-activity logic adapted to generate an output based on an input received from a user upon execution, and a plurality of activities which each execute the sub-activities in a unique manner upon being selected for accomplishing a goal associated with the activity. First, in operation 1702, an identifier and a reference to a business object are received from one of the sub-activities upon the execution thereof. In operation 1704, a database is accessed and data from the database is retrieved based on the identifier. The business object is created and populated with the data retrieved from the database in operation 1706.

The data may be stored on the database in tables. Further, the created business object may replace an existing business object. Additionally, the identifier may identify a customer and the business object may be a customer object. Also, a business object referenced by one of the sub-activities may be removed upon the execution thereof.

The business object may be a Visual Basic business object. In another aspect of the present invention, the business object may be a Java business object. The following material provides a more detailed description of the above-described method.

This portion of the present description details the ReTA Persistence framework design from the perspective of the application developer. The role of this framework is to provide services that interact with application database(s) to create, retrieve, update and delete business objects.

Persistence Framework

Description

The ReTA Persistence framework provides a transparent and flexible mapping of the business object attributes to relational database tables. To implement this "business object to database table" mapping, the framework is tightly integrated with all business objects. The framework exposes abstract methods that the application developer implements in the business objects. In contrast with the other ReTA frameworks, the Persistence framework is not implemented as a separate component. The Persistence framework is a set of local language classes available in Java or Visual Basic. FIG. 17.1 shows a SubActivity component 1730 using the Persistence framework 1732 to retrieve a Customer Object 1734 from the Database.

Services

The Persistence Framework provides the, following services:

| Service | Detail |
|---|---|
| Database Connection | Uncouple database connection from application |
| Database mapping | Map an object to a database table |
| Object query | Trigger queries on objects<br>Easily iterate through the results |
| Record locking | Optimistic locking |
| Encryption | Encode Database User Name and Password<br>Note: Encoding implemented only once (as part of system set up).<br>Decode Database User Name and Password<br>Note: Used by persistence framework during all database accesses. |

Classes

The Persistence Framework implements these services through the following Java or Visual Basic Classes:

| | Service |
|---|---|
| Java Class | |
| AFPLPersistableObj | This is the superclass of all Java Persistable Objects in the application. Application developers create a subclass for each Business Object and implement all the abstract methods that this class defines. |
| AFPLExtent | Provides the mapping between the business object and its associated database table and manages the database connection. |
| Visual Basic Class | |
| VBPersistObj | This is the interface class that all Persistable VB must implement. Application developers create a subclass for each Business Object and implement all the methods that this class defines. |
| VBExtent | Provides the mapping between the business object and its associated database table and manages the database connection. |

These classes are described in detailed in the following sub-portions of the description.

AFPLPersistableObj

The AFPLPersistableObj abstract class contains methods called by the application developer objects to manage attribute values common to all persistable business objects (user id and last update timestamp). In addition, the AFPLPersistableObj class represents the superclass of a persisted object. In order to persist a business class; the application developer extends AFPLPersistableObj and implements the AFPLPersistableObj abstract methods.

The AFPLPersistableObj defines the following methods:

| Method | Description |
|---|---|
| addColumnNames | Return the column names common to all persistable business objects (user id and last update timestamp). The application developer invokes this method from the constructor method of a business object. |
| addPersistedAttributes | Return attributes common to all persistable business objects (user id and last update timestamp). The application developer invokes this method from the getPersistedAttributes method of a business object. |

-continued

| Method | Description |
|---|---|
| isEqual | Abstract method that all Business Objects must implement. If the passed in attribute is one of the attributes common to all persistable business objects (user id and last update timestamp), compare the passed in value to the currently held attribute value. The application developer should also invoke the superclass isEqual. |
| newFrom | Abstract method that all Business Objects must implement. Populate the Business Object using the result set passed as an attribute. The application developer should also invoke the superclass newFrom method to populate the UserId and lastUpdate attributes. |
| attributeGet | Abstract method that all Business Objects must implement. Return the value of the attribute passed as parameter |
| attributeSet | Abstract method that all Business Objects must implement. Set the value of the attribute passed as parameter |
| setUserId | Set the user id value |
| getUserId | Return the user id value |
| setTimeStamp | Set the last update timestamp value |
| getTimeStamp | Return the last update timestamp value. |
| setUserIdTimeStamptoObj | Adds the last update timestamp value and user id to the passed in persistable business object. The application developer invokes this method from the setUserIdTimeStamptoObj method of a business object. |
| getColumnNames | Return the database table column names. |
| getPersistedAttributes | Return all the attributes to persist. The application developer invokes the addPersistedAttribute method of the super class to add user id and last update timestamp attributes. |
| getKeyNames | Return the primary key field name. |
| getKeyValues | Return all the primary key values. |
| getKeyAttributeVector | Return vector of all key attributes. |
| getKeyAttributes | Return the array of all key attributes. |
| getTableName | Return the name of the database table associated with this business object. |
| columnList | Returns a comma-separated list of all columns corresponding with this class. |
| attributesForInsert | Returns a comma separated list of attribute values for SQL insert command. |
| attributesForUpdate | Returns a comma separated list of attribute name = attribute value pairs for SQL update command. |
| conditionForUpdateRemove | Returns the 'where' clause for SQL update or remove command (both are equal). |

AFPLExtent

The AFPLExtent class provides the mapping between the business object and its associated database table. In addition, the AFPLExtent class represents the domain defined by the visible part of the database table for the specified user. This class holds the passed in database URL, username and password used during the access to the database. Lastly, the AFPLExtent class manages the database connection.

Methods

The AFPLExtent class implements the following methods used by the application developer from business factory objects:

| Method | Description |
|---|---|
| Select | Return all business objects matching the search criteria. |
| Update | Update all business objects matching the search criteria |
| Delete | Remove all business objects matching the specified criteria |
| Insert | Insert new business object(s) |

VBPersistObj

The VBPersistObj interface class contains methods that need to be implemented on every VB Business Object.

The application developer implements the following methods from their business object:

| Method | Description |
|---|---|
| newFrom | Create a new instance of that class using the resultset passed as parameter |
| Getvalue | Returns the value for the attribute passed as parameter. |
| SetValue | Sets the value for the attribute passed as parameter. |
| GetColumns | Return the database table column names. |
| GetTableName | Return the Table Name where this class is stored in the database. |
| AttributesForInsert | Returns a comma separated list of attribute values for SQL insert command. |
| attributesForUpdate | Returns a comma separated list of attribute name = attribute value pairs for SQL update command. |
| conditionForUpdateRemove | Returns the 'where' clause for SQL update or remove command (both are equal). |

VBExtent

The VBExtent class provides the mapping between the business object and its associated database table. In addition, the VBExtent class represents the domain defined by the visible part of the database table for the specified user. This class holds the passed in database URL, username and password used during the access to the database. Lastly, the VBExtent class manages the database connection.

Methods

The VBExtent class implements the following methods used by the application developer from business factory objects:

| Method | Description |
|---|---|
| Select | Return all business objects matching the search criteria. |
| Update | Update all business objects matching the search criteria. |
| Delete | Remove all business objects matching the specified criteria |
| Insert | Insert new business object(s) |

Session Framework Design

Figure 18A:
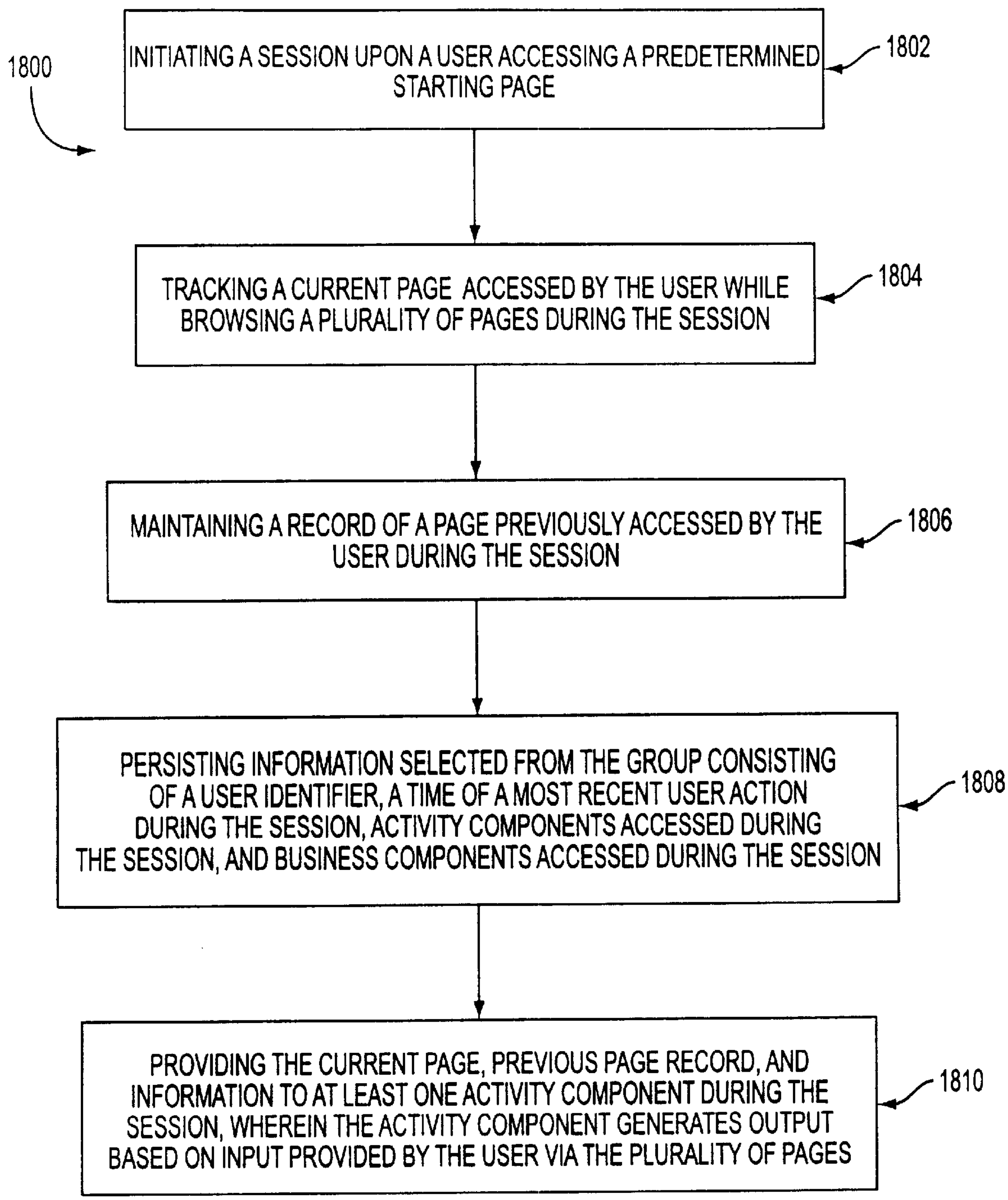
FIG. 18 is a flow chart depicting a method for persisting information during a user session.
Figure 18B:
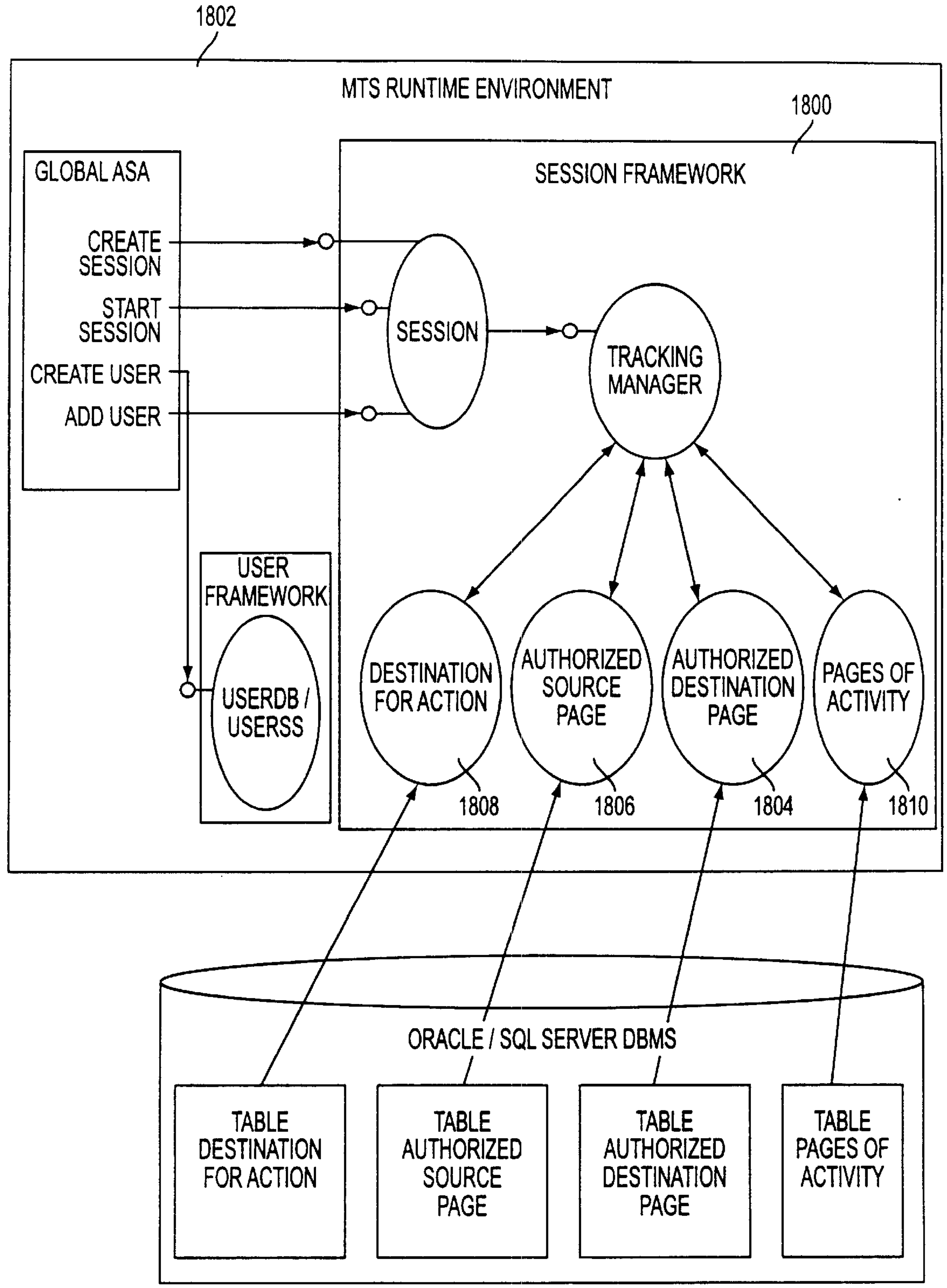

FIG. 18 illustrates a method 1800 for persisting information during a user session. First, in operation 1802, a session is initiated upon a user accessing a predetermined starting page. A current page accessed by the user is then tracked in operation 1804 while browsing a plurality of pages during the session. In operation 1806, a record is maintained of a page previously accessed by the user during the session. Information is persisted in operation 1808. This information is selected from a group of items such as user identifier, a time of a most recent user action during the session, activity components accessed during the session, and business components accessed during the session. During the session, the current page, previous page record, and information are provided to at least one activity component in operation 1810. Also in operation 1810, the activity component generates output based on input provided by the user via the plurality of pages.

In one embodiment of the present invention, the activity components to which the current page, previous page record, and information arc provided may be selectively determined. In addition, the activity component may be provided an indication as to whether the user is permitted to access each of the pages. In such a case, the activity component may also be provided the indication as to whether the user is permitted to access each of the pages based on the previous page record.

In another embodiment of the present invention, the information may also include the user identifier. In such an embodiment, user preferences may be looked up based on the user identifier with the information including the user preferences. Also, in order to identify the persisted information, references to activity components, business components, a user component, a tracking manager component, a system preference component, and an event handler component may be employed. The following material provides a more detailed description of the above-described method.

This portion of the present description details the ReTA Session framework design from the perspective of the application developer. The primary role of this framework is to provide services to handle the stateless nature of Internet. By default, the Internet does not provide services for maintaining information between pages. Without these services, it would not be possible to implement most eCommerce functionality. For example, session level state is necessary to implement eCommerce functionality where a customer can select products on multiple product description pages and then submit a complete product order request from a confirm order page. The ReTA Session framework leverages the Internet Information Server/Active Server Page (IIS/ASP) session object, which is automatically created when a user who has no open JIS sessions requests a Web page.

Session Framework

Description

Figure 19:
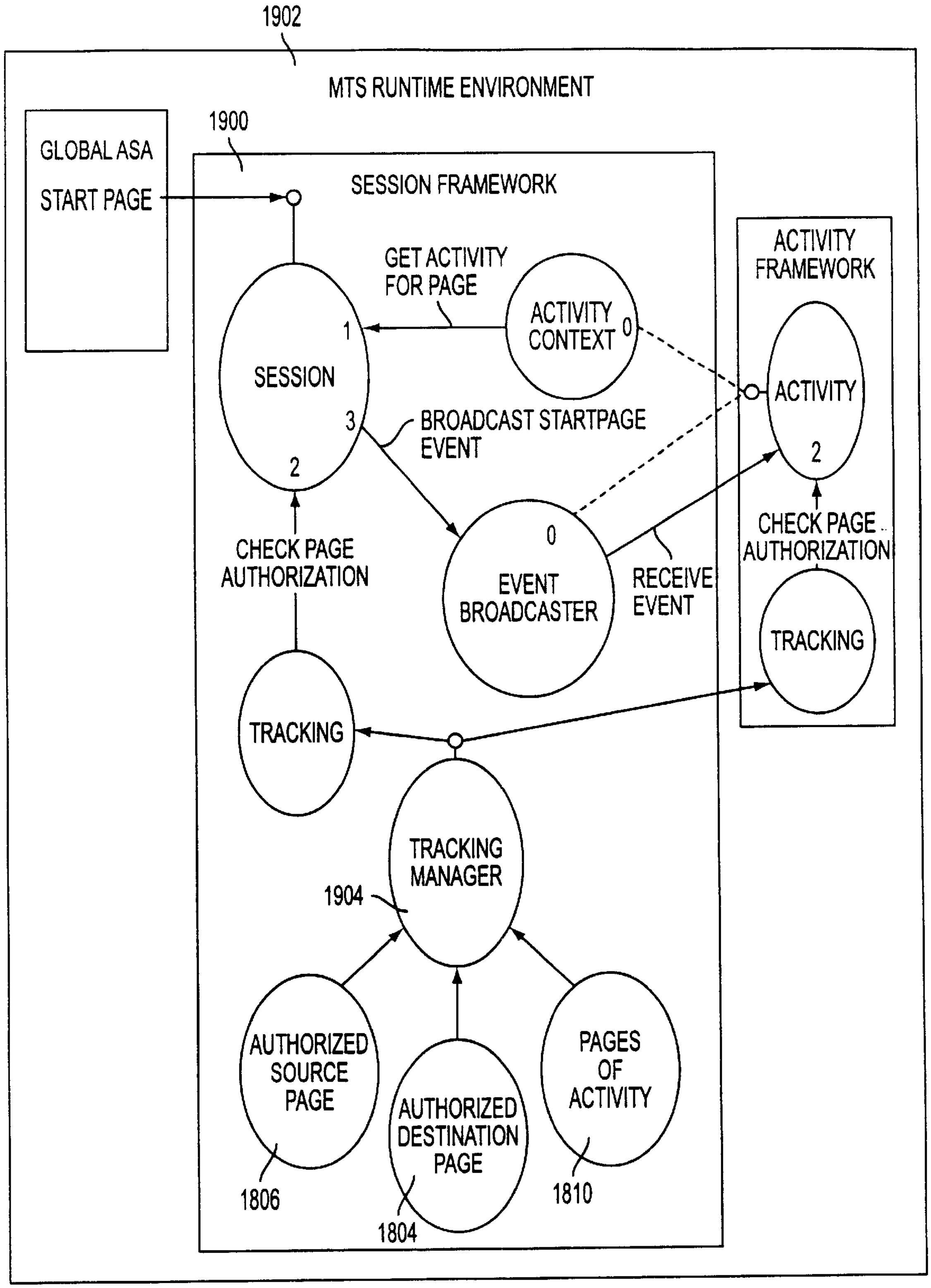
FIG. 19 illustrates a Session Flow Diagram—On Start ASP Page according to an embodiment of the present invention.

FIG. 18.1 illustrates a Session Flow Diagram—On Session Start. As shown, a Session framework 1830 operates in the MTS Runtime Environment 1832. FIG. 19 illustrates a Session Flow Diagram—On Start ASP Page. Again, the Session framework 1900 operates in the MTS Runtime Environment 1902. The ReTA Session framework provides services required throughout a user session. The user creates the Session framework at log on and removes the Session framework at log off. During the lifetime of the user session, application and architecture components require certain data to persist. This framework provides services to store and retrieve all information needed for a particular user session. This information may persist throughout the user session. The Session framework also provides services to uniquely identify the user and enforce access rights.

The user information that the Session framework persists, in memory, between Active Server Page requests includes:

User id
  Identifies session user

Last page
  Last page accessed by the session user.

Current page
  Current page accessed by the session user.

Last connection time:
  Session user's last connection time.

Current activity.
  Activity currently being executed by the session user (refer to activity framework design)

Activity Components
  All activity components accessed during user session

Business Components
  All business components accessed during user session required by multiple activity components.

Note:

This framework uses the Active Server Page's Session Object. Thus, the framework only works with browsers that accept cookies. For other browsers (or if cookies are disabled), a new ASP Session Object may start for each web page.

Services

The Session Framework provides the following services:

| Service | Detail |
|---|---|
| Security | User identification<br>Page access authorization - Session scope<br>Automatic abort - timeout |
| Customized information delivery | Customized user interface<br>Customized application access |
| Manage user session | Inform user on session status<br>Abort session |
| Flow control | Page to open on action<br>Pages of activity |
| Maintain context | Activity Component context<br>Business Component context - shared among activities |
| Message Broadcast | Register listener<br>Broadcast Message to registered listeners |
| Encryption | Encode Database User Name and Password<br>Note: Encoding implemented only once (as part of system set up).<br>Decode Database User Name and Password<br>Note: Used by session framework during all database accesses. |

Components

The Session Framework implements these services through the following COM objects:

| Component | Service |
|---|---|
| AFSession | Manages current user session |
| AFSystemPreferences | Contains System Preferences from database table T_AF_SYSTEMPREFERENCES |
| AFTrackingManager | Contains security and flow control info from data- |

-continued

| Component | Service |
|---|---|
| | base tables T_AF_PAGESOFACTIVITY, T_AF_AUTHDESTINATIONPAGE T_AF_AUTHSOURCEPAGE T_AF_DESTINATIONFORACTION |
| AFBrowserInfo | Contains current user's web browser information |

These components are described in detailed in the following sub-portions of the description.

AFSession

The AFSession component maintains the user's session state information. To maintain the state information, this component holds references to activity components (logical units of work—application flow logic), business components (business logic required across activity components), user component (user information), tracking manager component (web page access security and web page flow control information), system preference component (system preference information) and event handler component (event handler) created during the user's session.

From the application developer's perspective, the state maintenance work performed by the AFSession component is transparent. The application developer leverages the session services through populating the database tables with the client specific information.

Methods

The IAFSession, IAFEventBroadcaster and IAFContext interfaces define the access to the AFSession component. These interfaces support the following methods:

| Method | Description |
|---|---|
| AFSession | |
| Start | Start session - Called by ASP (global.asa Session_OnStart). |
| Stop | Stop session - Called by ASP (global.asa Session_OnStop). |
| StartPage | This method is called by ASP script logic at the start of each page. It is used to broadcast a pageStart event to all the listeners (activity components) that have registered as interested in pageStart events. It also stores this page as the current page and moves the existing current page into the last page (information held by the session's "tracking" object). |
| StopPage | This method is called by ASP script logic at the end of each page. It is used to broadcast a pageEnd event to all the listeners (activity components) that have registered as interested in pageEnd events. |
| Abort | This method is called when the session is to be aborted. This method calls the abort method on all activity components known to session (held by the session's "activity context" object). |
| SetCurrentPage | Sets the current Active Server Page (held by the session's "tracking" object). |
| GetCurrentPage | Returns the current Active Server Page (held in the session's "tracking" object). |
| GetLastPage | Returns the last Active Server Page accessed in the session (held in the session's "tracking" object). |
| SetSessionId | Update the sessionId attribute. |
| GetSessionId | Returns the current session Id. |
| SetCurrentActivity | Sets the current activity Page (held in the session's "tracking" object). |

-continued

| Method | Description |
|---|---|
| GetCurrentActivity | Returns the instance of the current activity (held in the session's "tracking" object). |
| GetActivity | Returns the instance of the requested activity (held by the session's "activity context" object). |
| IsActivityInContext | Ask session if it has a reference to the requested activity (held by the session's "activity context" object). If found, returns true, else returns false. |
| AddActivity | Add the requested activity (references held by the session's "activity context " object). Set the requested activity to the current activity (held in the session's "tracking" object). |
| RemoveActivity | Remove the current activity (held by the session's "activity context" object). |
| GetNextPage | Returns the next web page to access for the current activity (information held by the "tracking manager" component). |
| GetAFUser | Returns the "user" component (information associated with the current logged in user). |
| SetAFUser | Sets the user for the current session. Returns an integer indicating success or failure. |
| GetTrackingManager | Returns the "tracking manager" component. |
| GetEventHandler | Returns the "event handler" component. |
| GetSystemPreference | Returns the "system preference " component. |
| AddObject | Add a business object (held by the session's "business object context " object). |
| GetObject | Returns the instance of the requested business object (held by the session's "business object context" object). |
| RemoveObject | Remove the instance of the requested business object (held by the session's "business object context" object). |
| ContainsKey | Returns true if the "label" of the requested business object exists (held by the session's "business object context" object). |
| GetKeys | Returns all business object "labels" (held by the session's "business object context" object). |
| AFEventBroadcaster | |
| AddListener | Add the requested listener (activity component) to list of interested listeners. If an activity is interested in a StartPage event (i.e., needs to capture user modified data from the previous web page), this method is called by ASP script logic at the start of the page. |
| RemoveListener | Remove the requested listener (activity component) from list of interested listeners. |
| BroadcastEvent | Invoke the receiveEvent method on all registered listeners (activity components). Refer to activity framework design for the automated user data capture functionality. |

AFSystemPreferences

The AFSystemPreferences component contains system preferences (held during the session). This component uses the ReTA persistence framework to read the system preferences from the database ("system preferences" table).

Methods

The IAFSystemPreferences interface defines the access to the AFSystemPreferences component. This interface supports the following methods:

| Method | Description |
|---|---|
| start | Reads and stores "system preference" data from "system preferences" table. |
| GetRootAsp | Returns the application's ASP root location (as defined in from "system preferences" table). |

AFTrackingManager

The AFTrackingManager component provides page sequence security, dialogue flow and activity flow functionality for the session framework.

Page Sequence Security

The page sequence security is defined in the following tables:

Table "Authorized Destination Page" 1834:

Define for each page, the pages that are allowed to be accessed. If no authorized destination pages are defined, the page is authorized to access any page.

| Column name | Description |
|---|---|
| Id | Unique id |
| CurrentPage | Name of the current page |
| DestinationPage | Page which is authorized to be access |

Table "Authorized Source Page" 1836.

Define for each page, the pages that are allowed to access it. If no authorized source pages are defined, the page is authorized to be accessed by any page.

| Column name | Description |
|---|---|
| Id | Unique id |
| CurrentPage | Name of the current page |
| SourcePage | Page authorized to access the current page |

Dialogue flow

The dialogue flow is defined in the following table:

Table "Destination For Action" 1838:

Define the action flow between the web pages (i.e., which ASP is open when a specified push button is clicked during a specified activity).

| Column Name | Description |
|---|---|
| Id | Unique id |
| CurrentPage | Name of the current page |
| Action | Name of the UI widget, which triggers the action. |
| Activity | Name of the activity where the event is triggered |
| DestinationPage | Name of the page to open |

Activity flow

The activity flow is defined in the following table:

Table "Page Of Activity" 1840:

Define the automated activity switching when the user jumps from one web page to another.

| Column name | Description |
|---|---|
| Id | Unique id |
| Activity | Name of the activity |
| Page | Name of the page belonging to the activity |

Methods

The IAFTrackingManager interface 1904 defines the access to the AFTrackingManager component. This interface supports the following methods:

| Method | Description |
|---|---|
| CheckAuthorizedSourcePage | Determines if the previous page is in the list of allowable sources for this page (as defined in "Authorized Source Page" table). If access is allowed, returns true. Else, returns false. |
| CheckAuthorizedDestinationPage | Determines if this page is in the list of allowable destinations for the previous page (as defined in "Authorized Destination Page" table). If access is allowed, returns true. Else, returns false. |
| GetDestination | Returns destination page for requested action, activity, and source page (as defined Destination For Action" table). |
| IsPartOfActivity | Determines if this page is part of requested activity (as defined in "Page Of Activity" table). If page is part of activity, returns true. Else, returns false. |
| Start | Reads and stores the Authorized Destination Page, Authorized Source Page, Destination For Action and Page Of Activity tables. |

AFBrowserInfo

The AFBrowserInfo component contains the user's browser information.

Methods

The IAFBrowserInfo and IAFEditable interfaces define the access to the AFBrowserInfo component. These interfaces support the following methods:

| Method | Description |
|---|---|
| GetBrowserName | Returns the name of the browser that the user is currently running. |
| GetBrowserVersion | Returns the version of the browser that the user is currently running. |
| IsPluginSupported | Note: not implemented |
| IsCustomPluginSupported | Note: not implemented |
| IsMimeSupported | Note: not implemented |
| SetValues | Sets the requested attribute's value. |
| GetValue | Returns the requested attribute's value. |

User Interface Framework Design

Figure 20:
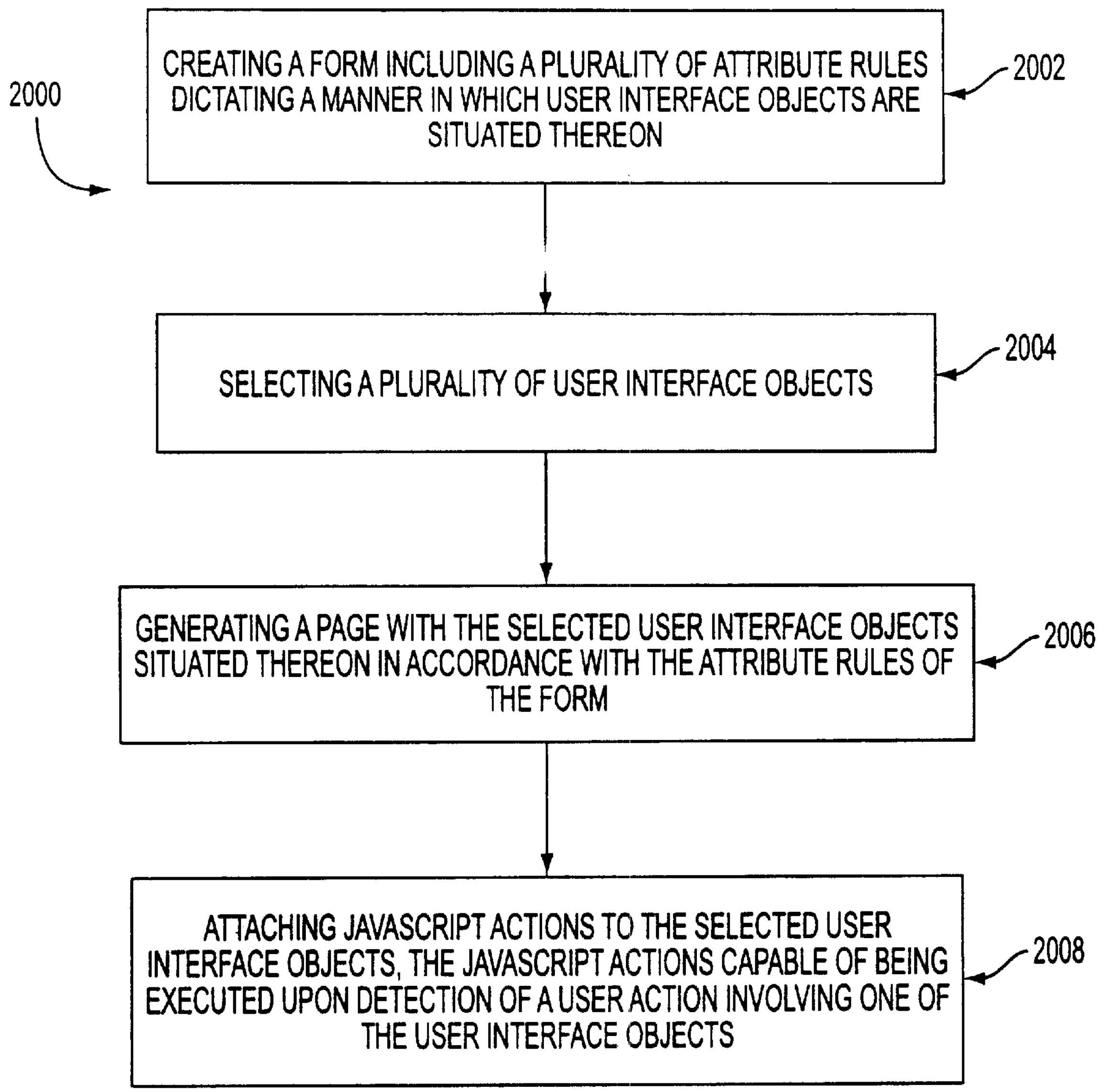
FIG. 20 is a flow chart illustrating a method for generating a graphical user interface.
Figure 20B:
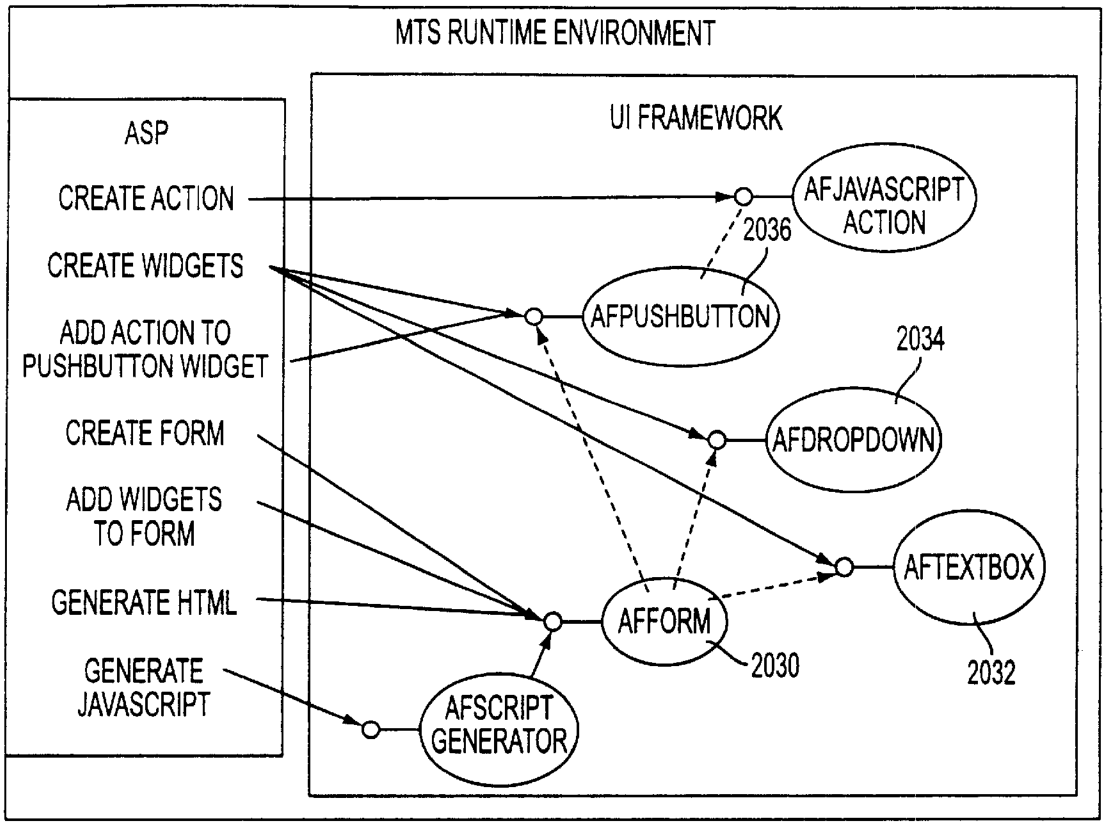

FIG. 20 illustrates a method 2000 for generating a graphical user interface. A form is initially created in operation 2002. The form includes a plurality of attribute rules dictating a manner in which user interface objects are situated thereon. In operation 2004, a plurality of user interface objects are selected. A page is generated in operation 2006 with the selected user interface objects situated on the page in accordance with the attribute rules of the form. JavaScript actions are attached to the selected user interface objects in operation 2008. The JavaScript actions are capable of being executed upon detection of a user action involving one of the user interface objects.

The user interface objects may include one or more of the following: a push button, a text box, a text area, a radio button, a check box, a drop down, a blank item, a user interface list, and a static table. The user action may include at least one of clicking on one of the user interface objects, changing text in one of the interface objects, exiting a text box of one of the interface objects. Further, the user action involving one of the user interface objects may cause a predetermined event. Optionally, the page may be an HTML page. The following material provides a more detailed description of the above-described method.

This portion of the present description details the ReTA User Interface (UI) framework design from the perspective of the application developer. The role of this framework is to provide services that generate the HTML code for UI widgets and attach Javascript actions to UI widgets. The UI framework exposes these services through a set of Component Object Model (COM) objects. The application developer uses these UI COM objects and their services through scripting logic added to the application's Active ServerPages (ASP).

User Interface Framework

The User Interface framework provides components for generating HTML. An HTML page is generated from a combination of the various UI Components. FIG. 20.1 shows the steps for generating a HTML page consisting of a form 2030 with a TextBox 2032, a DropDown list 2034 and a PushButton 2036.

The User Interface Framework provides the following services:

| Service | Detail |
|---|---|
| Generate UI Items | Form |
| | Push Button |
| | Text Box (single-line entry field) |
| | Text Area (multi-line entry field) |
| | Radio Button group |
| | Check Box |
| | Drop Down List Box |
| | Blank Item |
| | Static Table |
| | Single-Select List Box |
| Generate UI actions | JavaScript - action shell |
| | JavaScript - data type validation |
| | JavaScript - data range validation |
| | JavaScript - automatic navigation action |
| Generate Page Format | Cascading Style Sheet |
| | Form (grid layout for form elements) |

The User Interface Framework implements these services through the following COM objects:

| Component | Generates |
|---|---|
| AFForm | Form containing the widgets |
| AFPushButton | Push button widget |
| AFTextBox | Single-line entry text box widget |
| AFTextArea | Multi-line entry text box widget |
| AFRadioButton | Radio button widget |
| AFCheckBox | Check box widget |
| AFDropDown | Combo box widget |
| AFBlankItem | Blank item widget (used for spacing.) |
| AFUIList | Single-Select List Box widget - 1E4 Only |
| AFStaticTable | Static Table widget |
| AFHardCodedASPAction | Javascript function - Move to next page |
| LAFJScriptAction | HTML - attach Javascript function to a form element |
| AFScriptGenerator | Javascript tag and functions |
| AFStyleSheet | Cascading style sheet (CSS) |

These components are described in detail in the following sub-portions of the description.

AFForm

The AFForm component is used in conjunction with form element widgets to build complex user interfaces. Initially, the application creates an instance of the form component and sets its attributes. Following this activity, the application creates instances of the associated form element widgets and adds them to the form using the form's add method. As another service, the form component provides methods to help align all associated form element widgets properly on the page.

Methods

The IAFForm interface defines the access to the AFForm component. This interface supports the following methods, which the developer uses to create a form.

| Method | Description |
|---|---|
| Int left( ) | Align the form left |
| Int right( ) | Align the form right |
| Int center( ) | Align the form centrally |
| Int caption(String) | Sets the caption that may appear at the top of the form. |
| Int name(String) | Set the HTML name of the form. This option is required by some of the items which can be added to the form and should always be set |
| Int value(String) | Set the HTML value of the form. |
| Int border(int) | Sets the width of the border around the form |
| Int size( ) | Returns the number of form element widgets added to form. |
| String sendLocation(int, eventcollection) | Value of the Location object attached to the members of this form. |
| Int form_width(int) | Sets the width of the form in UI elements. For example if set to 2 a form 2 elements wide would be created. A third element added to the form would be placed on a new line. |
| Int cell_width(int) | Sets the HTML Cell padding value for the form. A larger number may increase the spacing between the form elements. |
| Int lockTableWidth(int) | Locks the width of the form to the input value in percentage valid ranges (0–100%). Use this option to set the amount of screen width the form may occupy. |
| Int Add(Widget Object, eventcollection) | Add a widget object to this form. Widgets are created separately. |
| String generate(eventcollection) | Generates the HTML code for the Form. The return value is the output HTML and should be printed to the screen. |

AFPushButton

The AFPushbutton component can only be used in conjunction with a AFForm component (the form's generate method iterates through the generate method for all form element widgets to build the necessary HTML code). An action object can be attached to a AFPushButton component. (Refer to AFHardCodedASPAction and AFJScriptAction for details).

Methods

The IAFPushbutton and IAFUIActionItem interfaces define the access to the AFPushbutton component. These interfaces support the following methods, which the developer uses to create a push button form element.

| Method | Description |
| --- | --- |
| Int left( ) | Align the button left. |
| Int right( ) | Align the button right |
| Int center( ) | Align the button centrally |
| Int caption(String) | Set the text that may appear on the button. The button may stretch its size to fit this text |
| Int name(String) | Set the name of the button. |
| Int setIsResetButton( ) | Set the button to be the default HTML reset button. When this method is called, clicking on the button causes the values of all HTML form elements in the form to which this button belongs to be reset to their values when the page was initially loaded. |

-continued

| Method | Description |
| --- | --- |
| Int setIsNotResetButton( ) | Resets the above method. The button returns to being a normal Widget item. |
| Int addAction(Action) | Adds an action to the button. |

AFTextBox

The AFTextBox component can only be used in conjunction with a AFForm component (the form's generate method iterates through the generate method for all form element widgets to build the necessary HTML code). An action object can be attached to a AFTextBox component. (Refer to AFHardCodedASPAction and AFJScriptAction for details).

Methods

The IAFTextBox and IAFUIActionItem interfaces define the access to the AFTextBox component. These interfaces support the following methods, which the developer uses to create a Text Box form element.

| Method | Description |
| --- | --- |
| Int left( ) | Align the textbox to the left |
| Int right( ) | Align the textbox to the right |
| Int center( ) | Align the textbox to the center |
| Int caption(String) | Set the caption to appear next to the text box. |
| Int name(String) | Set the HTML name of the text box |
| Int max_length(int) | Set the maximum length of text in the box |
| Int size(int) | Set the visible size of the text box |
| Int default_text(String) | Set the default text in the text box |
| Int dataValidation(type, range, lower bound, upper bound) | Adds data validation to the onBlur event of the text box.<br>Data Type validation includes:<br>Numeric - DV_TYPE_ISNUMERIC,<br>Alpha - DV_TYPE_ISAPLHA, or<br>Date - DV_TYPE_ISDATE.<br>None - DV_NONE<br>Range validation* includes all 8 permutations - <less than> through <(less than equal) and (greater than equal)>.<br>DV_RANGE_LESSTHAN,<br>DV_RANGE_LESSTHANEQUAL,<br>DV_RANGE_GREATERTHAN,<br>DV_RANGE_GREATERTHANEQUAL,<br>DV_RANGE_LESSTHAN_GREATERTHAN,<br>DV_RANGE_LESSTHANEQUAL_GREATERTHAN,<br>DV_RANGE_LESSTHAN_GREATERTHANEQUAL,<br>DV_RANGE_LESSTHANEQUAL_GREATERTHANEQUAL<br>*Note: Range validation only occurs for "Numeric" data type. |
| Int setTextBoxIndicator(int) | This method sets a private member variable to an integer value, this value indicates if the textbox may be the only textbox on the form that is to be generated. |
| Int addAction(Action) | Adds an action to the onChange event of the text box. |

AFTextArea

The AFTextArea component can only be used in conjunction with a AFForm component (the form's generate method iterates through the generate method for all form element widgets to build the necessary HTML code). An action object can be attached to a AFTextArea component. (Refer to AFHardCodedASPAction and AFJScriptAction for details).

Methods

The IAFTextArea and IAFUIActionItem interfaces define the access to the AFTextArea component. These interfaces support the following methods, which the developer uses to create a Text Area form element.

| Method | Description |
|---|---|
| Int left( ) | Align the text area left |
| Int right( ) | Align the text area right |
| Int center( ) | Align the text area to the center |
| Int caption(String) | Set the caption to appear next to the text area |
| Int name(String) | Set the HTML name of the textArea. |
| Int formName(String) | The name of the HTML form on which the textarea is to be placed. This is a required method and the textarea may not function correctly without this value being set. |
| Int setRows(int) | Set the number of rows which the text Area may display to the user |
| Int setColumns(int) | Set the number of columns, which the text Area may display, to the user. |
| Int dataValidation(type, range, lower bound, upper bound) | Adds data validation to the onBlur event of the text box. Data Type validation includes: Numeric - DV_TYPE_ISNUMERIC, Alpha - DV_TYPE_ISAPLHA, or Date - DV_TYPE_ISDATE. None - DV_NONE Range validation* includes all 8 permutations - <less than> through < (less than equal) and (greater than equal)>. DV_RANGE_LESSTHAN, DV_RANGE_LESSTHANEQUAL, DV_RANGE_GREATERTHAN, DV_RANGE_GREATERTHANEQUAL, DV_RANGE_LESSTHAN_GREATERTHAN, DV_RANGE_LESSTHANEQUAL_GREATERTHAN, DV_RANGE_LESSTHAN_GREATERTHANEQUAL, DV_RANGE_LESSTHANEQUAL_GREATERTHANEQUAL *Note: Range validation only occurs for "Numeric" data type. |
| Int setFormName(String) | Set the name of the form onto which the textArea object is being added. This method is mandatory for the correct functioning of the method. |
| Int setMaximumSize(int) | Set the maximum size of text, which can be entered into the text area. When this value is exceeded, a pop up window may warn the user that they have exceeded the maximum size and that their entry may be truncated to the maximum value (which is set here). The default value is 500. |
| Int addAction(action) | Add an action to the textarea. |

AFRadioButton

The AFRadioButton component can only be used in conjunction with a AFForm component (the form,'s generate method iterates through the generate method for all form element widgets to build the necessary HTML code). An action object can be attached to a AFRadioButton component. (Refer to AFHardCodedASPAction and AFJScriptAction for details).

Radio buttons are used in groups. Because of the complexity of the client side script required in conjunction with the radio button component, the application developer must call the generateRadioButtonScript( ) method on the AFScriptgenerator object on the page wherever radio buttons are used. This method takes as inputs:

The name of the form object to which the radio button has been added.

The name of the radio button group within the form

The default value the radio button group may pass to the page view if nothing is selected by the user.

The return value from this method is the generated HTML and Javascript which is written to the client browser within the <HEAD></HEAD>tag of the page.

Methods

The IAFRadioButton and IAFUIActionItem interfaces define the access to the AFRadioButton component. These interfaces support the following methods, which the developer uses to create a Radio Button form element.

| Method | Description |
|---|---|
| Int left( ) | Align the radio button left |
| Int right( ) | Align the radio button right |
| Int center( ) | Align the radio button to the center |
| Int caption(String) | Set the caption to appear next to the radio button |
| Int name(String) | Set the HTML name of the radio button |
| Int deselect( ) | Deselect the radio button. |
| Int select( ) | Select the radio button. (highlights button) |
| Int setFormName(String) | Sets the name of the form onto which the radio button is being added. This is a mandatory method in order for the component to function correctly. |
| Int setGroupNumber(int) | Set the number within the group which this radio button is assigned |

-continued

| Method | Description |
|---|---|
| Int getGroupNumber( ) | Returns the group number of the Radio Button |
| Int addAction(action) | Add an action to the radio button. |

AFCheckBox

The AFCheckBox component can only be used in conjunction with a AFForm component (the form's generate method iterates through the generate method for all form element widgets to build the necessary HTML code). An action object can be attached to a AFCheckBox component. (Refer to AFHardCodedASPAction and AFJScriptAction for details).

Methods

The IAFCheckBox and IAFUIActionitem interfaces define the access to the AFCheckBox component. These interfaces support the following methods, which the developer uses to create a Check Box form element.

| Method | Description |
|---|---|
| Int left( ) | Align the checkbox to the left |
| Int right( ) | Align the checkbox to the right |
| Int center( ) | Align the checkbox to the center |
| Int caption(String) | Sets the HTML caption value of the object. The text may be displayed next to the checkbox object. |
| Int name(String) | Sets the HTML name of the checkbox |
| Int select( ) | Mark as checked the checkbox when generating it |
| Int deselect( ) | Mark as not checked the checkbox when generating it. |
| Int value(String) | Sets the HTML value of the checkbox |
| Int addAction(action) | Add an action to the checkbox. |

AFDropDown

The AFDropDown component can only be used in conjunction with a AFForm component (the form's generate method iterates through the generate method for all form element widgets to build the necessary HTML code). An action object can be attached to a AFDropDown component. (Refer to AFHardCodedASPAction and AFJScriptAction for details).

Methods

The IAFDropDown and IAFUIActionItem interfaces define the access to the AFDropDown component. These interfaces support the following methods, which the developer uses to create a Combo Box form element.

| Method | Description |
|---|---|
| Int left( ) | Align the Combo Box to the left |
| Int right( ) | Align the Combo Box to the right |
| Int center( ) | Align the Combo Box to the center |
| Int caption(String) | Set the HTML caption of the object. |
| Int name(String) | Set the HTML attribute of the object. |
| Int addData(String) | Add a row of data to the Combo Box. |
| Int formName(String) | Set the name of the form onto which the Combo Box component has been added. |
| Int selected(int) | Set the index of the data item on the Combo Box, which may be selected. |
| Int addAction(action) | Add an action to the Combo Box. |
| Int setCodesTable(String) | Populate dropdown box with a Codes Table value |

AFBlankItem

The AFBlankItem component can only be used in conjunction with a AFForm component (the form's generate method iterates through the generate method for all form element widgets to build the necessary HTML code).

Methods

The IAFBlankItem interface defines the access to the AFBlankItem component. This interface supports the following methods, which the developer uses to create a blank item form element.

| Method | Description |
|---|---|
| int left( ) | Align the blank item to the left |
| int right( ) | Align the blank item to the right |
| int center( ) | Align the blank item to the center |
| int setWidths(int, int) | Set the widths of the blank item in percentage (%) |
| int setValues(String, String) | Set the values of the blank item. The first String sets the text to appear in the first cell and the second String sets the text to appear in the second. |
| int setColors(int, int) | Sets the color of the elements of the blank item. The two integer values represent the color of the first and second cells. Valid Values are 0 and 1. The default color is white. Passing a value of 1 into either parameter causes the blank item cell to be displayed in the default highlighted color. |

AFUIList

The AFUIList component creates a sophisticated DHTML based single-select list box form widget. The list box widget consists of a fixed headings row and a scrollable set of data rows. The list box widget supports data entry through data row level associated check boxes and text boxes. In addition, action objects can be attached to the list box and are generated in the same way as described for other form components. (Refer to AFHardCodedASPAction and AFJScriptAction for details).

The list box widget refreshes itself by passing (as parameters) the selected item and the state of all check boxes and all text boxes. The AFUIList view captures the values and updates the state of the list box to reflect the user choice.

Note:

The sophisticated functionality provided by this widget requires DHTML support. As of this portion of the present descriptions release date (Phase 2), only Internet Explorer 4.0 provides the necessary DHTML services. Therefore, this component is not cross-browser compatible.

Methods

The IAFUIList interface defines the access to the AFUIList component. This interface supports the following methods, which the developer uses to create a single select list box.

| Method | Description |
|---|---|
| Int left( ) | Align the list box to the left |
| Int right( ) | Align the list box to the right |
| Int center( ) | Align the list box to the center |
| Int setChecked( ) | Set indicated Selected List row as "checked" |
| Int setUnChecked( ) | Set indicated Selected List row as "unchecked" |
| Int setSelected( ) | Set indicated Selected List row as "highlighted" |
| Int getSelectedRow( ) | Return the currently selected list box row number. |
| Int getSelectedRowObjID( ) | Return the object id of the currently selected box row. |
| String getObjIdForRow( ) | Capture the Object id for a given list box row (used by the view mechanism). |
| int getRowForImageReference( ) | Retrieve the list box row number, which corresponds to an image reference. |
| Int getCheckBoxStatus( ) | Get Check Box status of requested list box row. |
| Int setTextBoxValue( ) | Set text box value for requested list box row with passed in String value. |
| String getTextBoxValue( ) | Get text box value for requested list box row. |
| Int setName( ) | Set list box name. |
| Int getName( ) | Get list box name. |
| Int getNumberOfRows( ) | Get the total number of list box rows. |
| Int addDataRowTokenized( ) | Add a row to the list box. |
| Int addDataRow( ) | Add a row to the list box. |
| Int setBorderWidth( ) | Set border width. |
| Int setValuesTokenized( ) | Set the default values of the list box: BorderWidth, cellPadding, Click Trigger Flag and Double Click Trigger Flag. |
| Int setValues( ) | Set the default values of the list box: BorderWidth, cellPadding, Click Trigger Flag and Double Click Trigger Flag. |
| Int reset( ) | Clear all list box data rows. |
| String generate( ) | Generate the DHTML for the list box data rows (bottom frame). |
| String generateSingleClickAction( ) | Return the results of the single click action, which was attached to the list box. If no action is attached, return a blank string. |
| String generateDoubleClickAction( ) | Return the results of the double click action, which was attached to the list box. If no action is attached, return a blank string. |
| String generateScripts( ) | Generate the scripts required to handle the selected list. This method is executed on the parent frame that the list box is embedded. |
| Int addClickAction( ) | Add a click action to the list box. |
| Int addDoubleClickAction( ) | Add a double click action to the list box. |

AFThumbNailContainer

The AFThumbNailContainer component generates a set of thumbnail images. The thumbnails are used as iconic pushbuttons. The application developer defines the single click and double click action destinations in the ASP page by coding the JavaScript functions referenced by the AFThumbNailContainer "generate" method.

Methods

The IAFThumbNailContainer interface defines the access to the AFThumbNailContainer component. This interface supports the following methods, which the developer uses to create a Thumbnail container.

| Method | Description |
|---|---|
| Int setSelected( ) | Set indicated Thumbnail item as "highlighted" |
| String getSelectedThumbNailObjectID( ) | Return the selected object id. If no item is selected, return an empty string. |
| String generate( ) | Generate the HTML code for the thumbnails. |
| Int addItem( ) | Add thumbnail image to container. |
| Int setAttributes( ) | Define the border width, the input path to the thumbnail images and identify the selected item. |

AFStaticTable

The static table component creates a standard HTML table with the parameters set by the developer through scripting logic added to application's ASP.

Methods

The IAFStaticTable interface defines the access to the AFStaticTable component. This interface supports the following methods, which the developer uses to create a static HTML table.

| Method | Description |
|---|---|
| int addDataElement (String, int) | Adds a data element to the static table. The integer value passed as the second parameter specifies the color to be applied to this cell of the table. 0 indicates that it should be white, 1 indicates the default highlighted color, 2 indicates the default AF Blue color, 3 indicates a gray color. |
| Int SetRowLength(int) | Set the number of data elements before an end of row is generated. |
| Int GetRowLength( ) | Returns the number of data elements in the table. |
| int setBorderWidth(int) | Set the width of the border, which may appear around the table. Valid values are 0 through 10. Default is 0. |
| Int getBorderWidth( ) | Returns the current border setting for the static table. |
| Int SetCellPadding (int) | Sets the HTML cell padding value that may be applied to the form. This creates space around the data in the table. Valid values are 0 through 100. Default is 0. |
| Int getCellPadding( ) | Get the current cell padding value for the static table. |
| Int SetTableName(String) | Sets the HTML name attribute on the table object. |
| String GetTableName( ) | Returns the HTML name attribute on the table object. |
| String Generate( ) | Returns the generated HTML for the static table. |
| SetFontOffSet(int) | Sets the size of the font to be used on the static table. Valid values are −5 through +5. Default is 0. |

AFHardCodedASPAction

The AFHardCodedASPAction component adds a user defined automatic navigation action to a UI component. The UI components that support this service include AFPushButton, AFTextBox, AFTextArea, AFRadioButton, AFCheckBox, AFDropDown and AFSelectedList. Attaching the navigation action to a UI item may automatically direct the user to the next page. The next page is identified by the flow control service of the session framework. This means that the developer does not have to specify the page to open. This service also ensures that all changes made to the open pages are capture before opening a new one. The navigation action is triggered when the user causes a defined event on the object. Defined events include clicking on a link or button and changing the text or exiting a text box. The Javascript events are onClick and OnChange.

The page that represents the target of the action must be entered into the database. The action logic may look to see which activity it belongs to and then look in the database to determine what page to show to the user. An example database entry in the T__AF__FWDestinationforaction table is:

T__AF__FWDestinationforaction

| Id | CurrentPage | Action | Activity | Destination Page |
|---|---|---|---|---|
| 100 | //ASP/SampApp/ Samp.asp | Next | Order | //ASP/SampApp/ SampNext.asp |

• The id field must be a unique number,
• The current page is the page on which the action is being triggered.
• The Action is the name of the UI item which is triggering the action,
• The Activity is the activity in which the action is taking place.
• The Destination Page is the page to which the user should be redirected as the outcome of the action.

Methods

The IAFAction and IAFHardCodedASPAction interface defines the access to the AFHardCodedASPAction component. These interfaces support the following methods, which the developer uses to create a navigational action.

| Method | Description |
|---|---|
| Int CreateSameFrame( ) | The target of the action may be on the same frame as that from which the action is triggered. |
| Int CreateOnNewWindow(String) | The target of the action may be on a new instance of the web browser. |
| Int CreateParentFrame(String) | The target of the action may be on the parent frame of the frame, which triggered the action. |
| Int generate(String) | Create HTML to call Javascript function ("String value") when the action is triggered. |
| InitializeLocation( ) | Used to track frame location during action. |

AFJScriptAction

The AFJscriptAction component adds a user defined action to a UI Component. The UI components that support this service include AFPushButton, AFTextBox, AFTextArea, AFRadioButton, AFCheckBox, AFDropDown and AFSelectedList. Attaching a Javascript action to a UI item may call a Javascript function when the action is triggered. Note: The application developer creates the called Javascript function on the correct application's ASP. The Javascript action is triggered when the user causes a defined event on the object. Defined events include clicking on a link or button and changing the text or exiting a text box. The Javascript events are onClick and onChange.

Methods

The IAFAction interface defines the access to the AFJscriptAction component. This interface supports the following methods, which the developer uses to create an action.

| Method | Description |
|---|---|
| Int generate(String) | Create HTML to call Javascript function ("String value") when the action is triggered. |
| Int JScript(String) | Create HTML to call Javascript function ("String value") when the action is triggered. |

AFScriptGenerator

The AFScriptGenerator component creates the Javascript functions needed by the actions.

Methods

The IAFScriptGenerator interface defines the access to the AFScriptGenerator component. This interface supports the following methods, which the developer uses to generate the appropriate Javascript functions.

| Method | Description |
|---|---|
| Int generate(eventcollection) | Generate the Javascript function block. |
| Int generateSelectedListScript(listener, eventcollection) | Generate the Javascript function block for a selected list box. |
| Int generateAutoSave(eventcollection) | Generate the Javascript function block for autosave. |
| Int generateRadioButtonScript(listener, listener, listener) | Generate the Javascript function block for radio button group. |
| Int generateAutoCapture(eventcollection) | Generate the Javascript function block for auto capture. |

AFStyleSheet

The AFStyleSheet Component creates the Cascading Style Sheet text for the application.

Methods

The I AFStyleSheet interface defines the access to the AFStyleSheet component. This interface supports the following method, which the developer uses to generate the appropriate Cascading Style Sheet text.

| Method | Description |
|---|---|
| String getStyleSheet( ) | Generate the Cascading Style Sheet text. |

Development Architecture Design

Figure 21C:
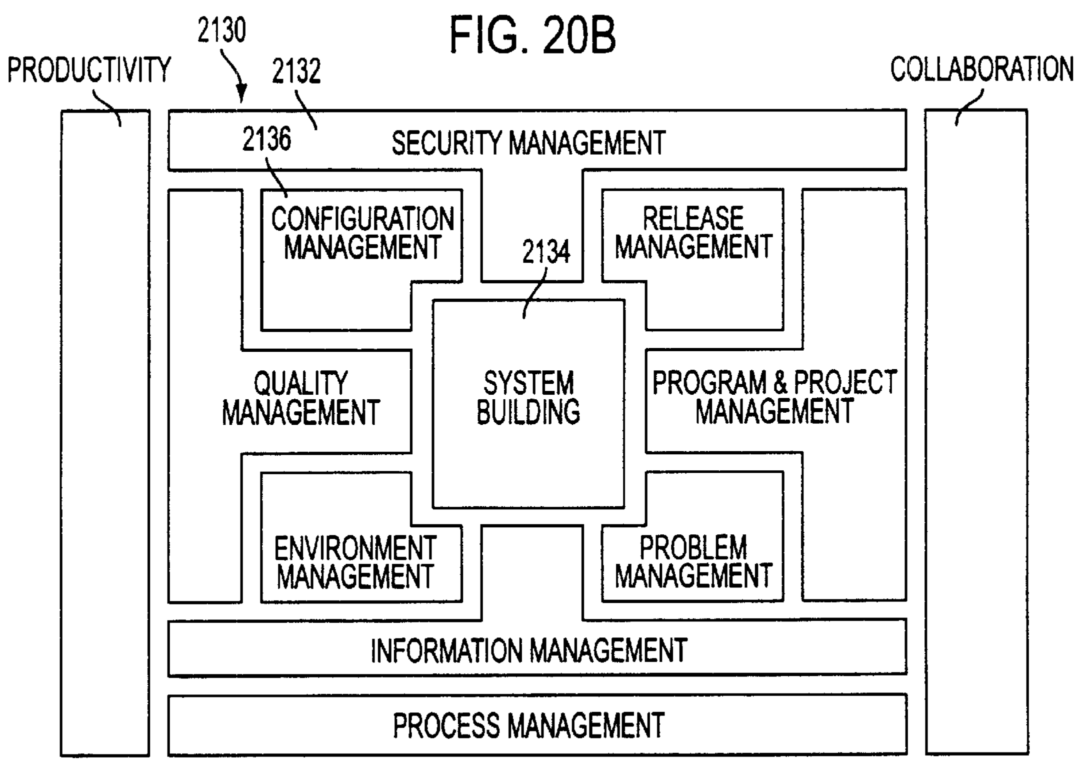
FIG. 21 is a flow chart depicting a method for software configuration management FIG. 21.1 is an illustration of an IDEA framework on which the ReTA Development Architecture Design is based according to an embodiment of the present invention.
Figure 21A:
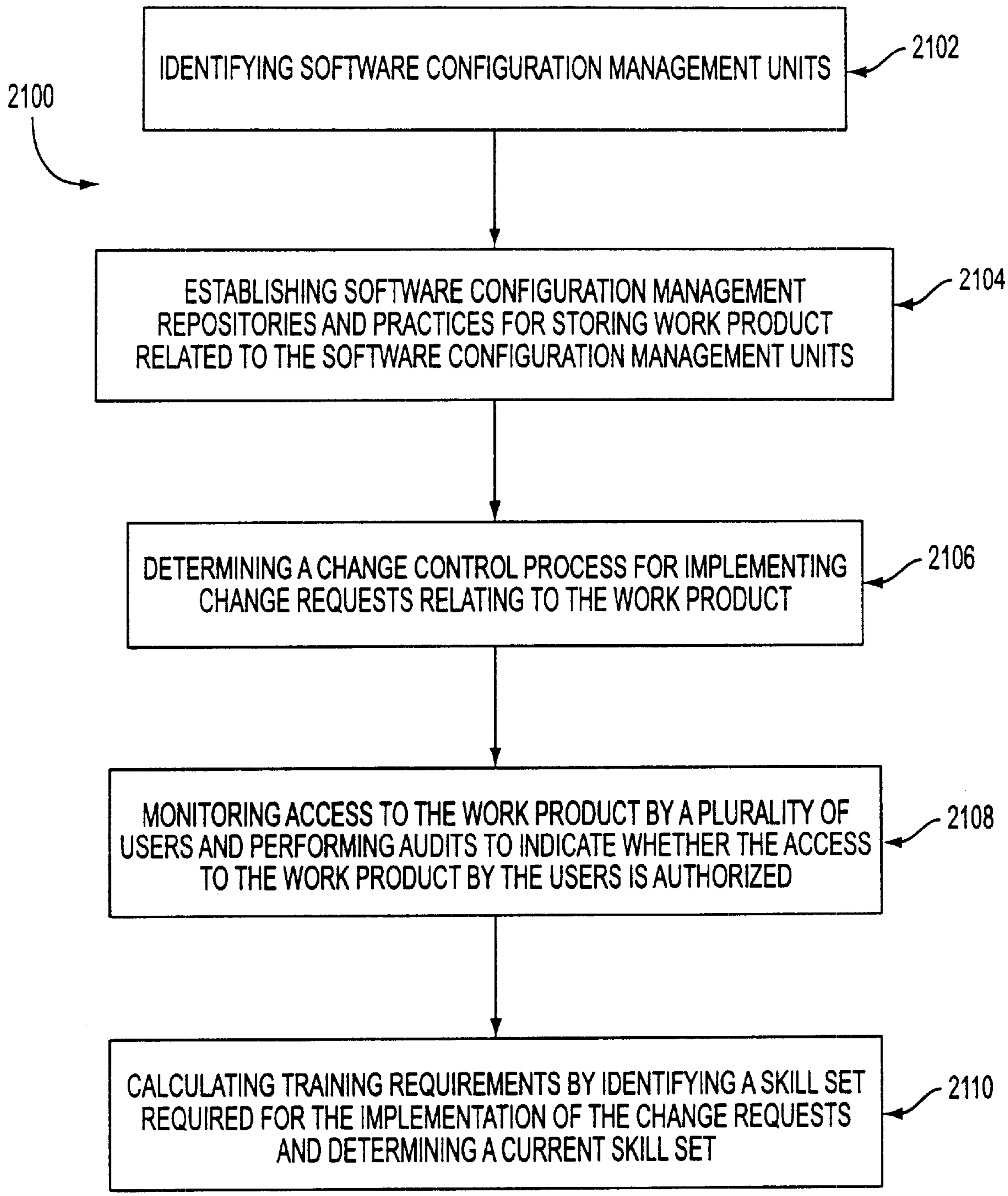

FIG. 21 illustrates a method 2100 for software configuration management. First, in operation 2102, software configuration management units are identified. In operation 2104, software configuration management repositories and practices are established for storing work product related to the software configuration management units. A change control process is determined in operation 2106 for implementing change requests relating to the work product. Access to the work product is monitored in operation 2108 by a plurality of users and audits are performed to indicate whether the access to the work product by the users is authorized. Further, training requirements are calculated in operation 2110 by identifying a skill set required for the implementation of the change requests and determining a current skill set.

As an option, the software configuration management units may be identified based on configuration types, project baselines, and/or naming standards. The software configuration management units may also have characteristics including a name, a modification log, and a release affiliation. Further, the software configuration management practices may include backing up the repositories.

The change control process may include identifying users authorized to implement the change requests, defining criteria for implementing the change requests, allowing evaluation of the change requests by the users based on the criteria, and monitoring the implementation of the change request. The present invention may also optionally include the creation of a training schedule to fulfill the training requirements. The following material provides a more detailed description of the above-described method.

The ReTA Development Architecture Design includes a set of sub-components that represent all design aspects of the development architecture. The Development Architecture Design Deliverable is used to validate design of the development architecture against the requirements. After it is validated, it may be used as a basis for build and test of the architecture.

Development Architecture Component Design

Purpose

The ReTA Development Architecture Component Design is based on the IDEA framework 2130. See FIG. 21.1. IDEA provides a development environment framework and associated guidelines that reduce the effort and costs involved with designing, implementing, and maintaining an integrated development environment. IDEA takes a holistic approach to the development environment by addressing all three Business Integration components: organization, processes, and tools. In order to accomplish this, several subcomponents 2132 are provided around a central system building 2134.

The purpose of the development environment is to support the tasks involved in the analysis, design, construction, and maintenance of business systems, as well as the associated management processes. It is important to note that the environment should adequately support all the development tasks, not just the code/compile/test/debug cycle.

Configuration Management

The purpose of Software Configuration Management (SCM) 2106 is to establish and maintain the integrity of the components of an application throughout the project's life cycle.

This Includes

- Comprehensively assessing and evaluating changes to a system after requirements have been agreed upon and commitments established.
- Ensuring that approved changes are communicated, updated, verified and implemented properly.
- Coordinate the project's day-to-day activities and avoid conflicting actions by controlling access to code and repositories.

Figure 22:
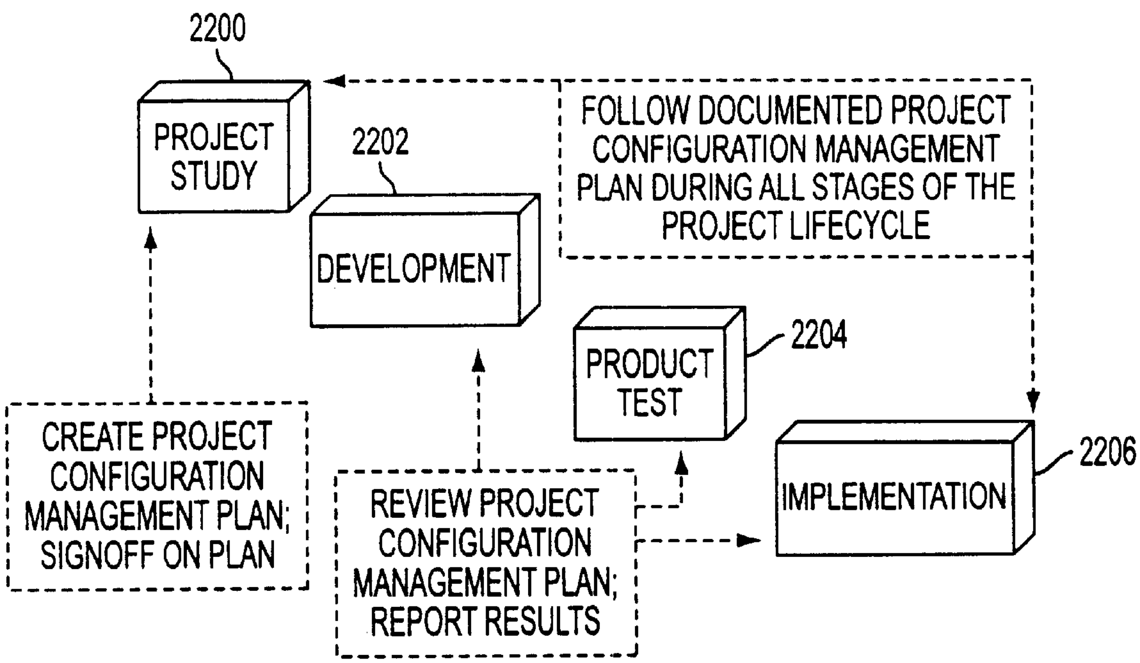
FIG. 22 illustrates the Configuration Management Life Cycle according to an embodiment of the present invention.

The project manager is responsible for the completion of the Project Configuration Management Plan during Design—with the help of the project team. This may:

- Clarify roles/responsibilities for migrations so that they are understood early in the project lifecycle. See FIG. 22, which illustrates the Configuration Management Life Cycle. First, a project study 2200 is created. Development and testing stages 2202,2204 follow the study. Finally, the implementation stage is reached 2206.
- Increase visibility of non-application components (e.g. database, architecture) in Configuration Management to improve quality of delivered products. Many times these are the components that are missed during implementations.

The ReTA SCM Policy portion of the description can assist engagement executives in creating a project configuration management plan.

The following table provides a list of the active participants within the change control process. A person may have more than one role or responsibility depending on the size of the technical effort. Also note that the responsibilities are described here at a high level and are not intended to be all-inclusive. Most of the roles are would already exist on an engagement. However, there is one new role that is critical to the CM process, the Source Code Librarian.

| Title | Description & Responsibilities |
|---|---|
| Technical Manager | Typically an IS department head with responsibility for the purchase and/or support of hardware and software. In configuration management, this role is more software oriented. Other responsibilities include:<br>Assign development and support staff to projects.<br>Review (accept/reject) technical approach proposed for projects.<br>Monitor development and support budgets and personnel - status of projects. |
| Network System Administrator | This individual is responsible for the installation, maintenance and support of the Unix and Windows NT servers including operating system, file systems, and applications. Other responsibilities include:<br>Operating system installation, patch updates, migrations and compatibility with other applications.<br>Installation and support of proper backup/restore systems.<br>Installation and support of other peripherals required for installed (or to be installed) applications.<br>Proper portion of the present description of hardware configuration and setup.<br>Maintenance of Windows Domain users and Groups as well as other security issues. |
| Database Administrator | The DBA is responsible for proper creation and maintenance of production and system test databases. The integrity of the database, as well as recovery using backup/restore and logging, are priorities for the DBA. Other responsibilities include:<br>Assist developers in maintaining development databases by automating backup/recovery, applying changes to database schema, etc.<br>Provide support for tuning, sizing and locating database objects within allocated database space.<br>Applying change requests to databases.<br>Ideally maintain entity relationship diagrams for databases.<br>Maintenance of database users and other database-related security issues |
| Source Code Librarian | Individual responsible for development and maintenance of source code control tools, training materials, and storage areas. The Source Code Librarian is also responsible for the integrity of the source code environment. Additionally:<br>Establishes source code directories for new projects.<br>Provides reports on source code environment status and |

-continued

| Title | Description & Responsibilities |
|---|---|
| | usage per project.<br>Provides assistance/information as needed regarding objects to check out for system test.<br>Assists production operations in building/moving all applications into production. |
| Business Analyst | Individual or individuals responsible for managing the detailed design, programming, and unit testing of application software. Other responsibilities include:<br>Developing/reviewing detailed designs.<br>Developing/reviewing unit test plans, data, scripts, and output.<br>Managing application developers. |
| Application Developer | Individual or individuals responsible for making changes to source code defined by management. This person typically:<br>Checks source code out of the source code environment.<br>Modifies code per user requirements or other development portion of the present description.<br>Unit tests modifications in the development environment.<br>Checks modified code back into source code environment in preparation for system test. |
| System Tester Integration Tester | This person or team is directly responsible for system testing or integration testing of an application prior to implementing in production. This may also take the form of performance testing. Typically, a system or integration test person or team may be responsible for:<br>Following production operation procedures for installing a new application in the appropriate test environment.<br>Develop and execute a test plan to properly exercise new application including new, modified, and unmodified functionality.<br>Reporting results of test. |
| Vendor | For the purposes of this portion of the present description, a vendor is defined as an organization from which software has been purchased for use by the clients systems. Alternatively, a vendor may distribute final installable media in the form of tape or CD with upgrades or new release of application. A vendor may:<br>Make modifications to application code at vendor offices or within the engagement development environment.<br>Provide necessary information to Source Code Librarian to store new code.<br>Assist Source Code Librarian in transferring modifications to the engagement system test environment.<br>Participate in system test (or performance test). |

Change Control

Description

Change requests as a consequence of changing requirements and changes requested due to nonconformity (or defects), either in the application software, or in the system software must be analyzed, authorized, scheduled, staffed, and tracked in a defined way. What, why, when, and who made a change must be tracked from the point of analysis to the reintroduction of the defective or changed component at the appropriate stage. Change control therefore governs what software component is changed, version controlled, and when it is re-migrated to a given development stage.

Configuration Management becomes more complex in a component-based development environment as the system is broken down to a greater level of granularity. For this reason, change control processes need to be clearly determined and communicated across the entire engagement team.

Tool Recommendation

ReTA Change Tracking Database

The Change Tracking Database is a Microsoft Access tool. It provides basic functionality of entering, modifying and reporting of system change requests encountered throughout the entire project life cycle.

Issues Tracking Database

The Issues Tracking Database is a Microsoft Access tool that is ideal for small to medium sized projects. It provides basic functionality of entering, modifying and reporting of project issues encountered throughout the entire project life cycle.

Procedures/Standards

Figure 23:
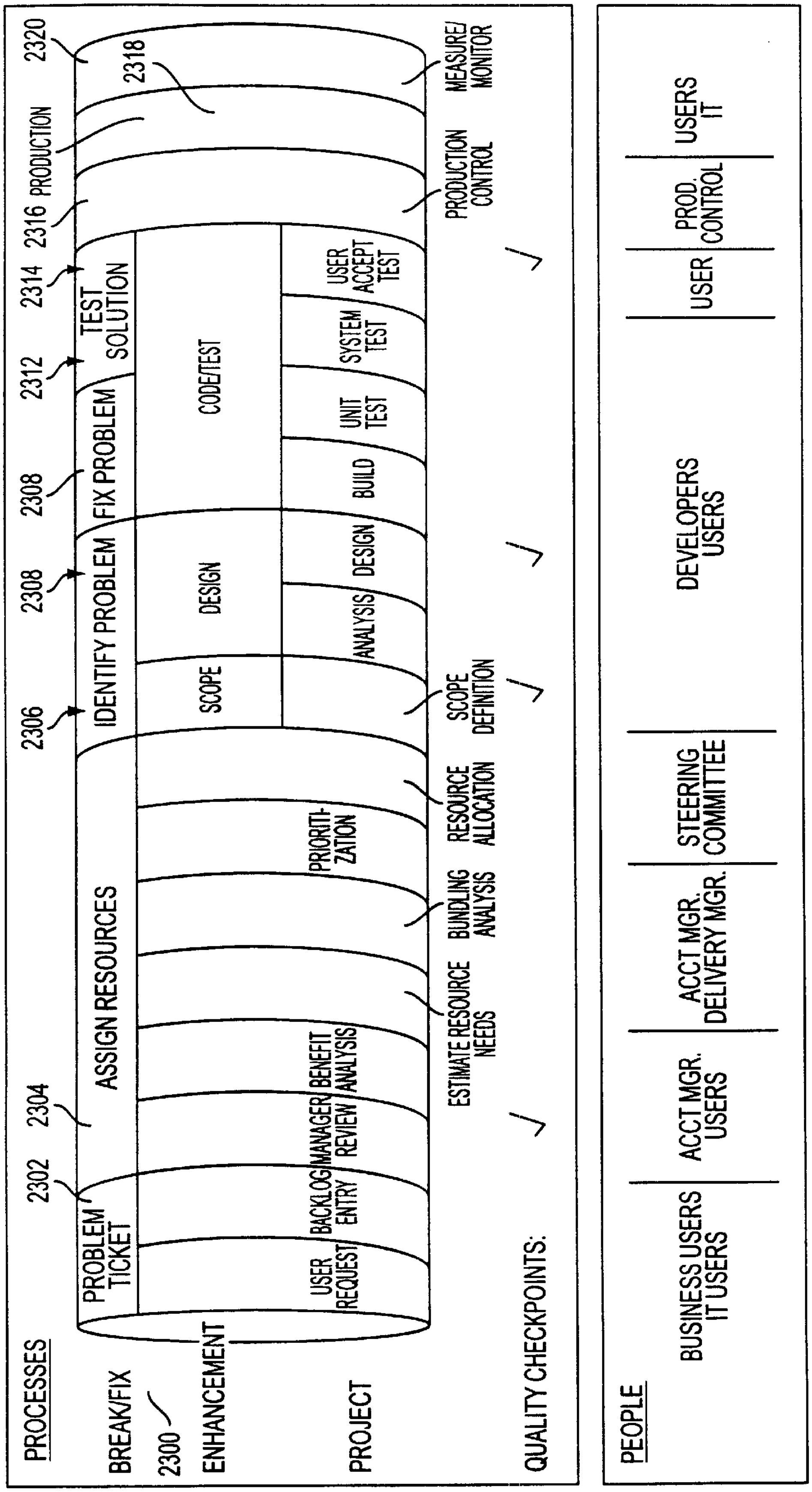
FIG. 23 illustrates the change control 'pipeline' and each phase within the pipeline according to an embodiment of the present invention.

FIG. 23 illustrates the change control 'pipeline' 2300 and each phase within the pipeline. The Change Control process can be divided into many different phases. They include:

Log Change Request

The first phase 2302 of the change control process is to log a change request. Regardless of who initiates a change request and how the change request enters into the engagement work-in-progress pipeline each change request should be logged Change Tracking tool. IT personnel who log change requests should record as much information as possible.

Change Control Committee Review

During the second phase 2304, the Change Control Committee (CCC) meets regularly to review the change requests that have been logged to the Change Tracking tool in the past week. The committee also discusses the status of the changes scheduled for migration during the weekly migration windows, reviews the changes already moved to production, and sets the Staging Date for change requests. Before each weekly meeting, the Change Control Committee facilitator may generate the following reports:

Report of the change requests that have been logged to the Change Tracking tool in the past week Implementation Report that list all changes scheduled to be implemented During the meeting the CCC may:

Review the new change requests

Discuss the cross-functional impacts

Verify that the target implementation date is realistic

Set the Staging Date

Update the status of the change requests scheduled to be implemented that week during one of the change windows Evaluate the quality metrics of the:changes that have been migrated to production and discuss any lessons learned

Statement of Work/Scope Definition Portion of the Present Description

During the third phase 2306, depending on the Change Category (Project, Enhancement, or Emergency), a Statement of Work or simple Scope Definition portion of the present description may or may not be required. These portions of the present descriptions both serve to define what the change request entails, and record what is agreed to by the change requester and IT.

The Statement of Work, which is currently in use sometimes in FTP, is a detailed portion of the present description that describes the work that may be done for the change request. The Scope Definition portion of the present description is a simple portion of the present description of the scope of the change. It can be an email message, a faxed letter, or a brief Microsoft Word portion of the present description. The following table shows what is required:

| Change Category | Statement of Work | Scope Definition Portion of the present description |
|---|---|---|
| Project | Required | Not required |
| Enhancement | Not Required | Required |
| Emergency | Not Required | Not Required |

Once the developer starts working on the Statement of Work or Scope Definition portion of the present description, the developer should set the status of the change request in the Change Tracking tool to "Assigned".

The Statement of Work/Scope Definition portion of the present description is sent to the change requester for sign-off. The sign-off needs to be checked-off on the Migration Checklist in the Change Tracking Tool in order to migrate the change to production. This sign-off serves as a quality checkpoint that the work on the change request may meet the business needs of the change requester.

Analysis & Design

This phase 2308 is required only for project change requests. For example, the developer may create technical analysis and design specifications portion of the present descriptions. Other impacted groups may create a technical impact statement.

Code & Unit Test

In this phase 2310, the developer codes the change request and unit tests the code changes to ensure that it works as designed and that it meets the business needs. The developer should set the status of the change request in the Change Tracking tool to "Development".

After the change has been coded and unit tested, the developer should fill in the Resolution field for the change request within the Change Tracking Database. The developer should also fill in the approximate number of hours it took to complete the change request in the Actual Hours field.

System Test

This phase 2312 is required for all project change requests and some enhancements. In this phase, the developer tests the change to ensure that the system's functionality works as designed. Furthermore, this test also ensures that the code change did not adversely affect other areas of the current system. This may entail running some pre-defined System Test scripts. For certain change requests, it is important to test the code change against a large volume of data. This may check if the change may handle all the data in the production environment. For any change requests which may impact interfaces both in and out of the target application, it is necessary to test that all the interfaces still work correctly. This may prevent a change request from adversely impacting other systems.

The developer should set the status of the change request in the Change Tracking tool to "Testing".

User Acceptance Test

In this phase 2314, the most appropriate person, whether it is the requester or a user who may be directly affected by the change, may assume the role of the test administrator. The administrator tests the change request to ensure that it meets the original business need. In some cases, the developer may actually run the test plans that the test administrator creates, and the test administrator may validate the test results. Once the test administrator agrees that the change satisfies all the test criteria, the developer needs to check the user acceptance test sign-off box in the Change Tracking Tool.

The sign-off is needed to migrate the change to production. This sign-off serves as a final quality checkpoint that the work on the change request meets the business needs of the change requester.

Fill out Migration Form

In this phase, the developer goes through a final process before submitting the change request to be moved to production. The developer should move all objects associated with the change request from the testing environment to the staging area.

In order to move the change to production, the developer needs to complete the Migration Checklist form on the Change Tracking Tool and inform Production Control 2316 by the Staging Date. This form contains all the information about the objects that need to be moved from the staging area into the production environment. This form is a streamlined checklist of all the things that the developers must do in order for Production Services personnel to move the objects to production. Whenever a sign-off checkbox is checked or unchecked, the current user's ID and the current date may be captured by the Change Tracking tool.

The following Migration Checklist items are required for the different change categories:

| Checklist Item | Project | Enhancement | Emergency |
|---|---|---|---|
| Statement of Work | Required | Not Required | Not Required |
| Scope Definition | Not Required | Required | Not Required |
| User Acceptance Test | Required | Required | Not Required |
| Tech/Code Review | Required | Required | Not Required |
| Complete Portion of the present description | Required | Required | Not Required |
| Complete Components | Required | Required | Required |
| Submit Production Move | Required | Required | Required |
| Distribution Lists Requirements (TCPIP, Special Forms, Microfiche, Electronic Files) | Required | Required | Not Required |
| Identify Impacted Systems | Required | Required | Not Required |
| Capacity Planning | Required | Required | Not Required |
| Ready to Migrate | Required | Required | Required |

The Ready to Migrate checkbox is used to summarize that all the required sign-offs have been obtained and that the code is ready to be migrated to production. Finally, the developer should set the status of the change request in the Change Tracking tool to "Migrate".

Move to Production

Once Production Services personnel examines a completed Migration Checklist form, they may verify that all objects to be moved into production are in order, and that the change can be moved on the migration night in phase 2318. They may also ensure that all relevant items on the Migration Checklist have been completed. This check serves as the final quality checkpoint before the change goes into production.

Production Services personnel may move all project and enhancement change requests to the Production environment during prescheduled outages or immediately in the case of an emergency fix. Production Services may then informing all system users what changes have been moved into production.

Production Services personnel should set the status of each migrated change request in the Change Tracking tool to "Production". They should also set the Actual Implementation Date to the date the change was moved to production.

Measure/Monitor Change in Production

Business users and developers should continue to actively monitor the change requests after it is migrated to production during phase 2320. If no problems develop in production due to the change request, the Change Control Committee may confirm that the team leader of the change request should set the status of the change request in the Change Tracking tool to "Closed". If problems do develop in production, the status should be set to "Re-Open". The developer is then re-assigned to fix the change request.

If the change request in production caused other problems to jobs in production, and a new fix is needed, the change request is reopened once again. If the change request caused problems in other jobs that requires modification to the other jobs, then a new change request is created, and the source of the new request is tracked back to the old request.

The Change Tracking tool contains metrics to track the quality of the change request. The Change Control Committee may assign the Migration Metric and Production Metric values for each change request approximately 35 days after it was migrated into production. If problems occur during-the migration of the change request, the Change Control Committee may assign a "Fail" for the Migration Metric. The Problem Description should then be completed to explain why this problem occurred. The Lessons Learned should be filled with what lessons can be learned from the experience. If no problems occur, the Migration Metric may be assigned a "Pass".

If problems occur in production due to the change request, the Change Control Committee may assign a "Fail" for the Production Metric. The Problem Description and Lessons Learned fields should also be filled with the relevant information.

Below are the criteria for the Change Control Committee to use in deciding if a change request passed or failed the migration metric or the production metric. A change request may pass if it meets the following criteria.

Migration Metric Criteria

Flawless movement of all resources (Active Server Pages, MTS Components, Java Classes, Graphics, Data Model, etc.), from the staging environment to the production environment) is required. (I.e., resource movement must have no negative effects.)

During implementation activities there must be no unplanned, adverse effect on regularly scheduled batch or online processing, online availability feeds to other systems and reports.

Production Metric Criteria

Production online processing and production batch processing must not experience any release-related abends.

The production implementation may not cause problems, interruptions in service or failures in other areas within 35 days of the initial implementation date. Any release with is backed out due to quality or problems may fail this criterion.

The change must be delivered when planned. A postponement due to external reasons may not cause the change to fail this criterion. Postponements due to quality or readiness of code must be communicated to the Change Control Committee, project team, and customers at least 3 days prior to the scheduled implementation date.

Migration Control

Description

Migration Control tools control multiple versions of source code, data, and other items as they are changed, tested, and moved from one development environment into another, for example, from development to test and from test to production. The list below provides a list of the various environments and their specific purpose within the project lifecycle.

| Environment | Description |
|---|---|
| Build/ Component Test | This 'virtual' environment is configured to reside nearly entirely on an individual developer workstation. Web and application services are running locally for presentation and business logic. Architecture components are accessed via a mapped network drive. A shared RDBMS Server or a local, more lightweight version of the database can be used for database services. Different workstation configurations may exist for component or user interface developers. Both types of developers use a source code repository for check in/out of code during development. In the event that the required modifications affect both a user interface and server-side components, then both developers may share components and interfaces using drive mappings. As code changes are made a 'Unit' or Component test is performed to ensure that changes made in one area of the code do not have adverse affects on the rest of the component. When the build code is deemed fit for promotion, the source code is checked into the source code repository and the source code administrator is notified of the status. |
| Staging Test | This environment is used to verify and test packaged systems and components. This allows developers to verify the functionality and use of third party vendor applications during the Build/Unit Testing phase. |
| Assembly Test | This environment is a smaller testing environment used to ensure that end-to-end functionality of the system and to verify that changes made during any build efforts do not impact other areas of the system. A single developer lead (typically the Source Code Administrator) gets the latest version of the source code from the source code repository, performs a complete build, and executes a complete regression test of the system. When a point when the code is deemed stable and the system test environment is ready, the code residing on the integration server is checked back into the source code repository using a version label. Additionally, the binaries from the integration server are copied to the system test server for continued testing. |
| System Test | This environment, sometimes referred to as Product Test, is used for complete system technical and functional testing. Typically there are assigned project team members tasked with writing and executing system test scripts, logging errors as they are encountered and ensuring that the delivered application satisfies the functional requirements set by the client. From this point, system application and architecture binaries are promoted to the production environment. |
| Performance Test | This environment is used for conducting performance evaluations of the application and supporting architecture components. This environment should be configured to simulate the production system as closely as possible. Additionally, data and transactional volume should be configured to simulate the system under worst-case scenarios. |

-continued

| Environment | Description |
|---|---|
| | Performance testing tools should be utilized to simulate multiple users as well as monitor and report performance results. |
| Production | This environment consists of key hardware and software components to support the business operational systems. Typically, only applications and components that have been thoroughly tested for functional and technical accuracy are moved into this environment. |

With a ReTA/Microsoft-centric environment, a few key issues arise with respect to environment migration. These issues relate to the fact that the application is based on the use of Active Server Pages, Microsoft Transaction Server components and Java Classes.

Sequence of Events

To perform the code migration, certain steps should be followed to ensure that users that are currently in the application are not adversely affected. This can be accomplished by performing the migration in the following order: Using the Internet Information Server administration utility, monitor the site's number of active users. A count of zero indicates that no clients are currently hitting the site. Shut down the web listener to prevent additional users from connecting to the site.

Within the MTS Administration tool, shut down all server processes. This cleans up an components that may still be awaiting garbage collection from the Java Virtual Machine.

If the component interfaces have not been modified, it is possible to copy the new version of the Java Classes directly to the new environment. If the interfaces have been changed, the MTS administrator may need to delete and recreate the individual components within MTS.

Copy any new web server files (ASP, HTML, graphics, etc.) to the target directories on the web server. Restart the web listener to allow users access to the application.

Module Location

There are basically three types of modules that get migrated during a ReTA engagement. Web Server files, Application files and database objects.

Web Server modules include Active Server Pages (ASP), static HTML portion of the present descriptions, graphics or images and JavaScript files. The ASP and HTML portion of the present descriptions may have security restrictions placed on them from within Microsoft Internet Information Server (HS) and from the Windows NT Server. Security can be set to include individual user accounts, groups/roles, or no security.

Application Server—Two file types are migrated within application servers, COM Dynamic Link Library's and Java Classes. Both files are created during the application and architecture build processes. The COM DLL's require registration within MTS by inserting them into a MTS.Package. In the event that the Web and Application servers are two physically different machines, an export process is required between them to instruct the Web server where the business components physically reside. For more information on the registration and exporting processes refer to the MTS online help.

In the case of the Java Classes, they need to reside in a directory that is defined within the server's 'CLASSPATH' environment variable. For ReTA Phase 1 & 2 development and testing all runtime files were located with C:\ReTA. Therefore the following classpath environment variable was defined on each developer's workstation:

CLASSPATH=C :\WinNT\Java\Classes;C:\WinNT\Java\TrustLib;C:\ReTA\-Architecture;C:\ReTA\Application Database Server—These items include tables, views, sequences, triggers, stored procedures and functions, and user/schema information. These items are not necessarily particular to multi-tiered development. However, care should be taken to ensure that architecture tables and other objects are located separately from the application objects.

Security

Within the ReTA application model, security is enforced at the Web and Application Servers. In the case of Web server security, access to ASP and HTML files can be restricted using the Access Control List security provided by Windows NT. Security on these objects can be set at the group (role) or individual user levels.

A component within MTS utilizes role-based security to determine who may or may not have access to a specific COM component. A role is a symbolic name that defines a group of users for a package of components. Roles extend Windows NT security to allow a developer to build secured components in a distributed application.

Figure 24:
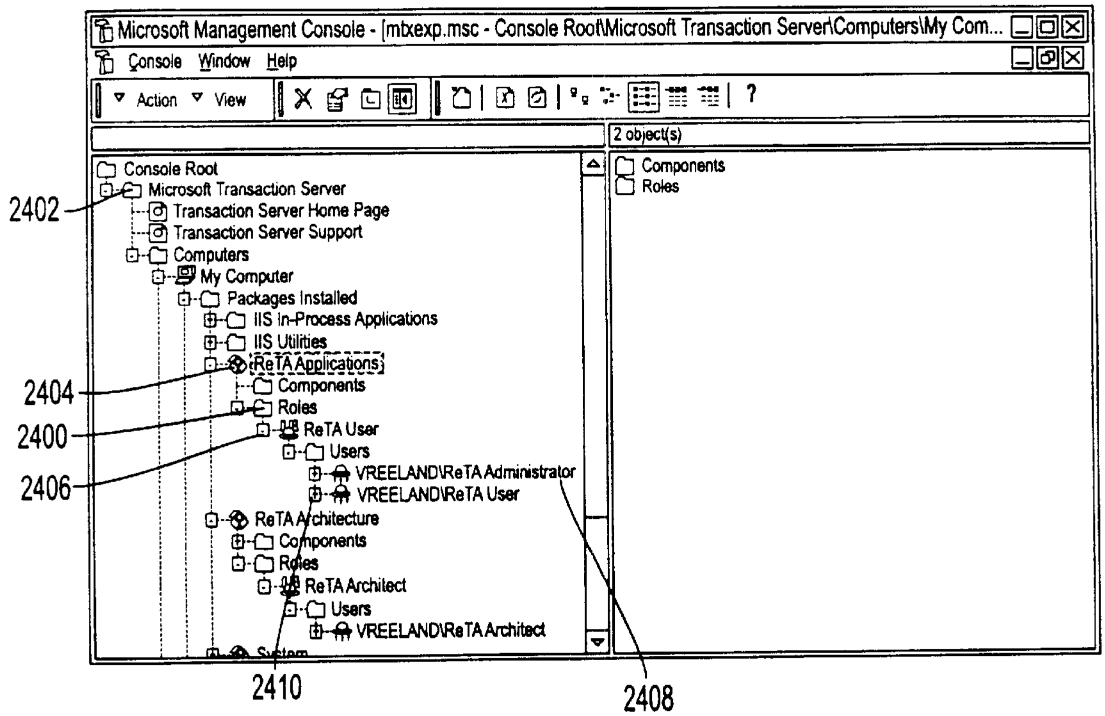
FIG. 24 depicts the application of Roles within the Microsoft Transaction Server (MTS) management console according to an embodiment of the present invention.

For example, FIG. 24 depicts the application of Roles 2400 within the Microsoft Transaction Server Management console 2402. The package labeled 'ReTA Applications' 2404 has a single role defined as being able to access it, 'ReTA User' 2406. Users that are members of the local 'ReTA Administrators' and 'ReTA User' Windows NT groups 2408,2410 are allowed to function in the ReTA User capacity defined for this package.

Due to the security options available at both the Web and Application server levels, care should be taken during code migration to ensure that security settings are consistent and applied correctly to ensure accurate execution.

MTS Transactions

Within MTS, every component has a transaction attribute that can be set by the MTS administrator to indicate what level of participation a component has within a transaction. Care must be taken during MTS component migrations to ensure that the correct transactional attributes are set within MTS.

The transaction attribute can have one of the following values:

Requires a transaction. This value indicates that the component's objects must execute within the scope of a transaction. When a new object is created, its object context inherits the transaction from the context of the client. If the client does not have a transaction, MTS automatically creates a new transaction for the object.

Requires a new transaction. This value indicates that the component's objects must execute within their own transactions. When a new object is created, MTS automatically creates a new transaction for the object, regardless of whether its client has a transaction.

Supports transactions. This value indicates that the component's objects can execute within the scope of their client's transactions. When a new object is created, its object context inherits the transaction from the context of the client. If the client does not have a transaction, the new context is also created without one.

Does not support transactions. This value indicates that the component's objects do not run within the scope of transactions. When a new object is created, its object context is created without a transaction, regardless of whether the client has a transaction.

Tool Recommendation

Many configuration management tools are available on the market today, some of which provide many features useful for code promotion and management.

During the ReTA Phase 1 engagement, Microsoft Visual SourceSafe was utilized for it's labeling and source code management capabilities. Additionally, the ReTA Change Tracker database could be utilized for source code migrations that required change management knowledge and approval. In the event that client requires the use of paper or email based migration control, the ReTA Migration Request template can be used.

Procedures/Standards

Processes

Figure 25:
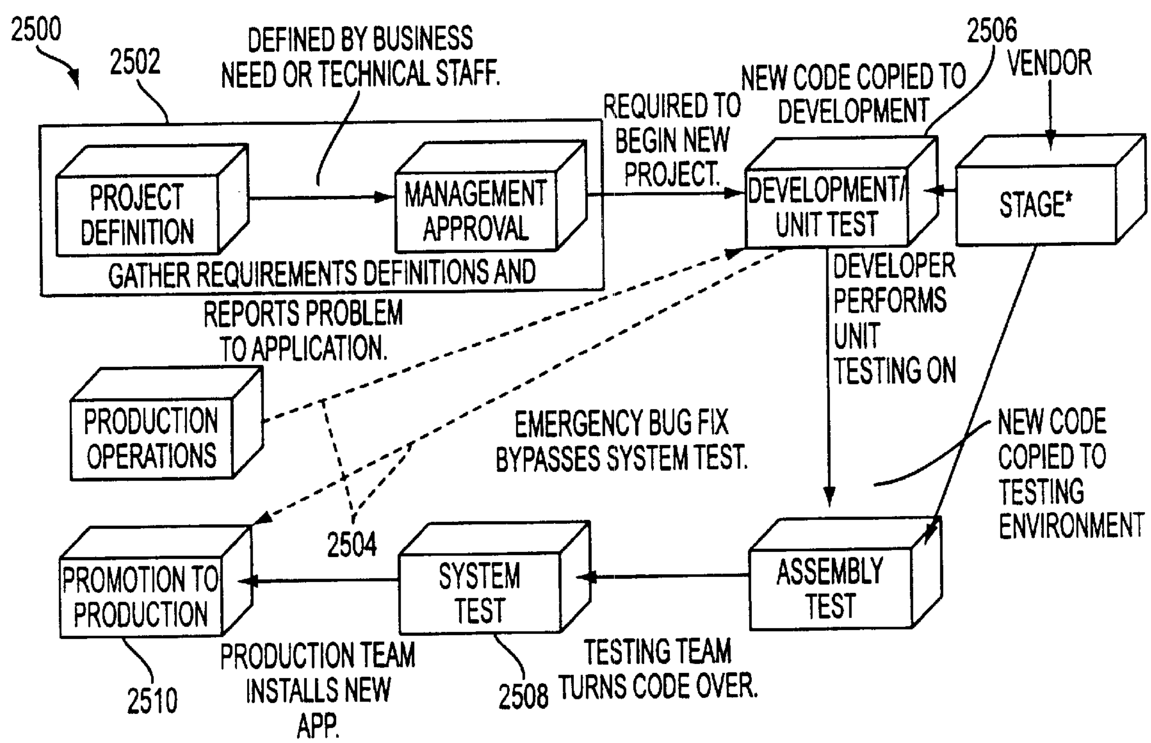
FIG. 25 illustrates an environment migration process that guides development within ReTA engagement environments according to an embodiment of the present invention.

The processes that guide development within ReTA engagement environments are represented in FIG. 25, which illustrates an environment migration process 2500. These processes include creating a new application 2502, modifying an existing application, and applying emergency bug fixes 2504. The solid lines represent stages required for new/modified application process. Dashed lines show the path for emergency bug fixes. Note: The term application used here is broadly applied to any managed module or component.

Processes are defined by stages shown as individual boxes. Through these stages, applications are eventually (or quickly in the case of emergency bug fixes) promoted to production. Stages provide for initiating, managing, securing and coordinating changes to applications.

The stages for the projects were developed in conjunction with representatives from each development team. It is important to note that the development stages represent the lifecycle of an application, not data. Within each development stage, there can be multiple data sets. For example, within the system test stage, an application team might wish to run several test cycles in parallel. In order to do that and keep the data consistent, a database for each cycle is required.

The CM process may ensure application modules are promoted through the development stages in a consistent manner. It is up to each application team to decide how to use each stage. For example, the application testing team may want four databases within the system test stage for different types of tests, whereas the assembly testing team may only want two.

* -Stage is used to consolidate and verify vendor changes. Depending on the change, it may be migrated to Development or System Test 2506,2508 directly. The order may be dictated by project requirements.

A very important tenet of the CM process is that an application modification can only be in one stage at any point in time. Consider the example of module1. Module1 starts out in development. When the development team indicates, the Source Code Librarian moves module1 into system test. As soon as that happens, no changes can be made to module 1. Only after module1 is promoted to production 2510 can modifications be made to the module (further enhancements, bug fixes, etc.). The purpose for this rule is to prevent the situation where one developer is modifying a module when that module needs to have a bug fix to continue testing. There is one exception to this rule, emergency fixes.

When the situation dictates an emergency fix, the module affected needs to be modified immediately. When this happens, the module in question should be fixed within the development stage. When the fix is made, the module may immediately be put back into production. However, the same change also needs to be applied/promoted to the module in system test stage. This may allow modules in system test to always be current with what is in production.

The CM process depends on change control records (CCR) for tracking changes to the system. A change control record is created for every new module or modification. The CCR is used to coordinate migrations and communicate status for each module in the system. One may see the use of the CCR throughout every process description. The CCR processing system may be automated through Notes.

Major tasks and responsibilities define each stage of a process and are covered in the pages that follow. These tasks and responsibilities are not intended to be a development methodology. Any references to deliverables and/or portion of the present descriptions is informational only and provided to help anchor an already existing development methodology. However, specific deliverables and portion of the present descriptions required for the change management process are required and may be highlighted.

Development/Unit Test

Figure 26:
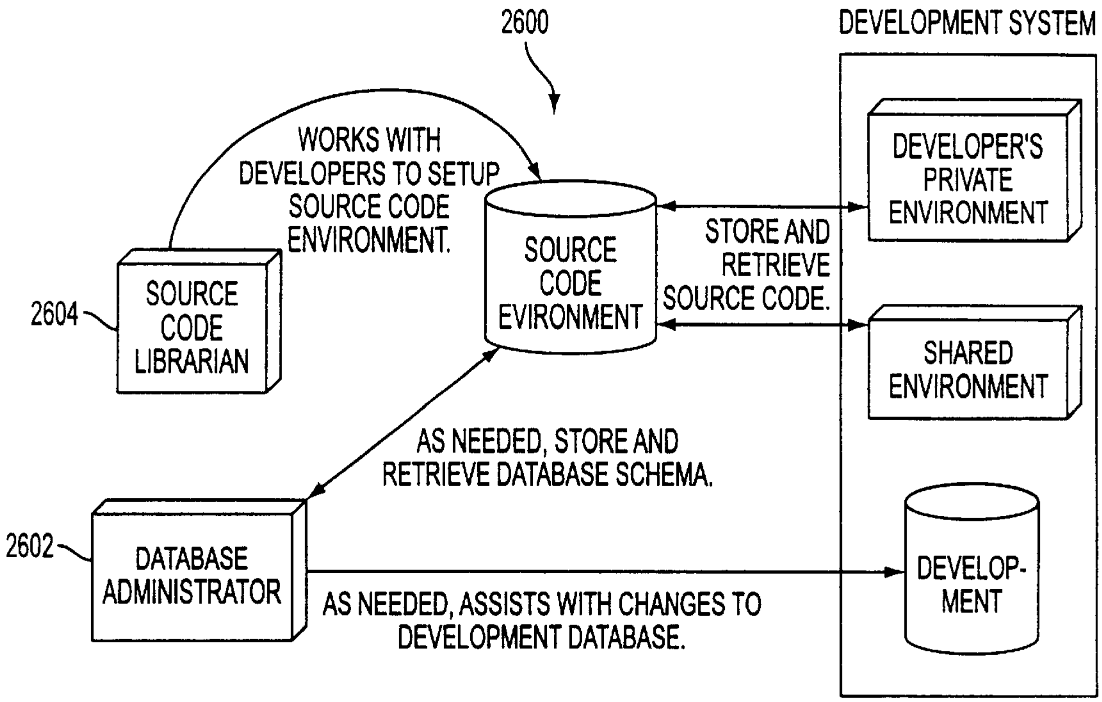
FIG. 26 is an illustration of a Development/Unit test for existing applications according to an embodiment of the present invention.

Development team checks required application source code out of source code control. See FIG. 26, which illustrates a Development/Unit test 2600 for existing applications. Note: In the event that this is a new application, the developer may use the appropriate template from source code control.

As needed, DBA 2602 checks required database source code out of source code control. Also as needed, DBA works with development team to approve and prepare modifications to development database. All work occurs on developer's workstation using local web and application server processes. Note: A shared web/application may be used for vendor staging.

Unit testing is ongoing during development. The development team checks modified application source code into source code control. The development team also fills in a change control record indicating which modules have changed. As needed, the DBA checks modified database source code into source code control. A source Code Librarian 2604 verifies/prepares necessary objects for building new applications. Unit test and development is completed. In some cases, a string test may be required. The system test team is notified, such as by e-mail.

Deliverables from this stage might include:

Modified or new application

Modified or new database objects

Unit test data and output

CM Deliverables from this stage include:

A change control record with developer information filled in.

Assembly Test

Figure 27:
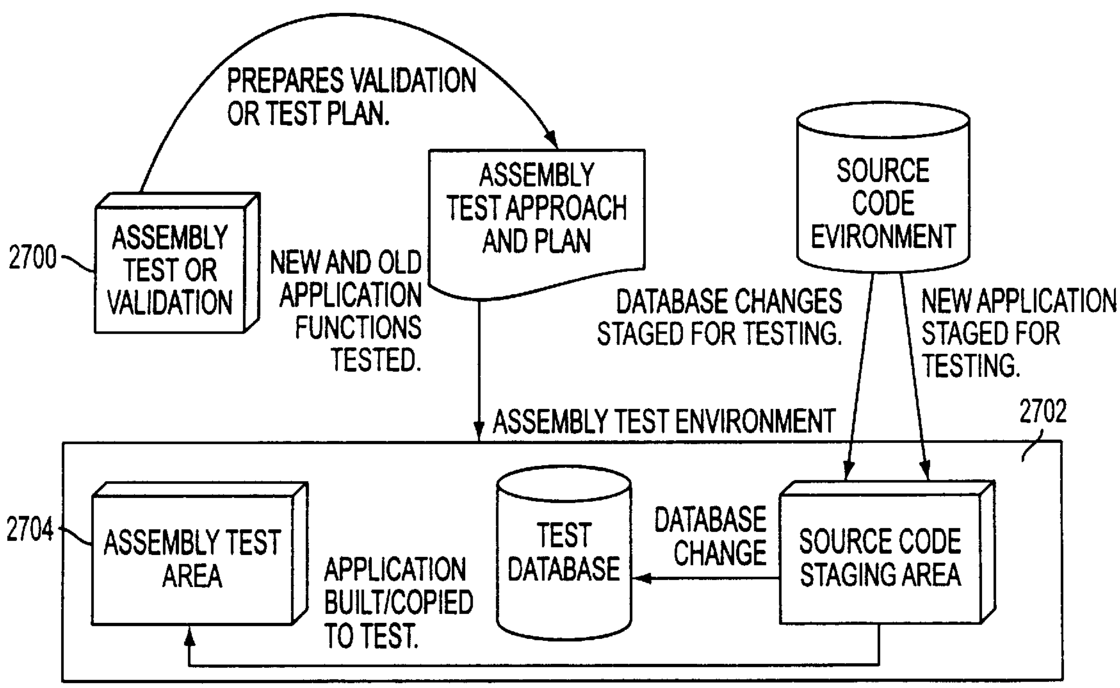
FIG. 27 illustrates an assembly test for existing applications according to an embodiment of the present invention.

With reference to FIG. 27, an assembly test team 2700 reviews user requirements and prepares validation or test plan. Database modifications are fetched from source code control and applied to an assembly test environment 2702. The Source Code Librarian fetches new application, builds it and copies it into assembly test environment 2704. Validation or test plan is executed pass/fail/deviation. The assembly test team signs change control portion of the present description.

Deliverables from this stage might include:

Completed validation or test plan with pass/fail/deviation information.

CM Deliverables from this stage include:

A change control record with assembly test information.

System Test

Figure 28:
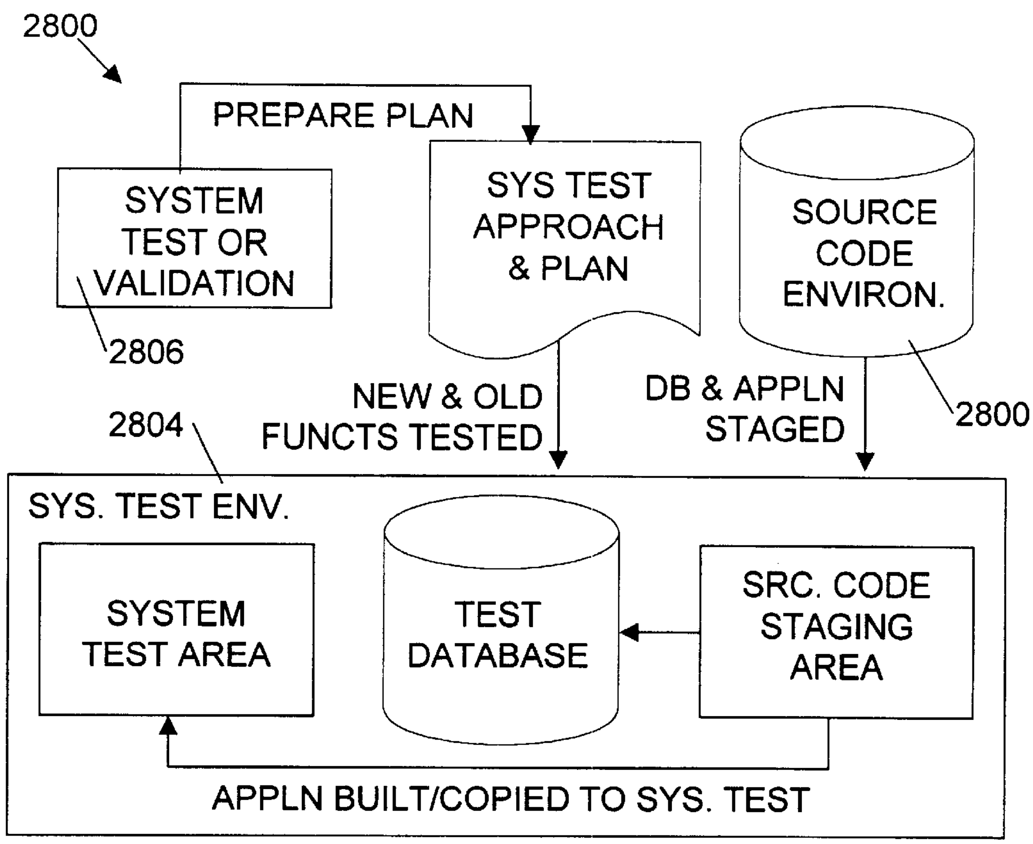
FIG. 28 illustrates a system test for existing applications according to an embodiment of the present invention.

System test team reviews user requirements and prepares validation or test plan. See FIG. 28, which illustrates a system test 2:800 for existing systems. Database modifications are fetched from source code control 2802 and applied to the system test environment 2804. The Source Code Librarian fetches the new application, builds it and copies it into the system test environment. A validation or test plan is executed pass/fail/deviation. The system test team 2806 signs the change control portion of the present description.

Deliverables from this stage might include:

Completed validation or test plan with pass/fail/deviation information.

CM Deliverables from this stage include:

A change control record with system test information.

Production

Figure 29:
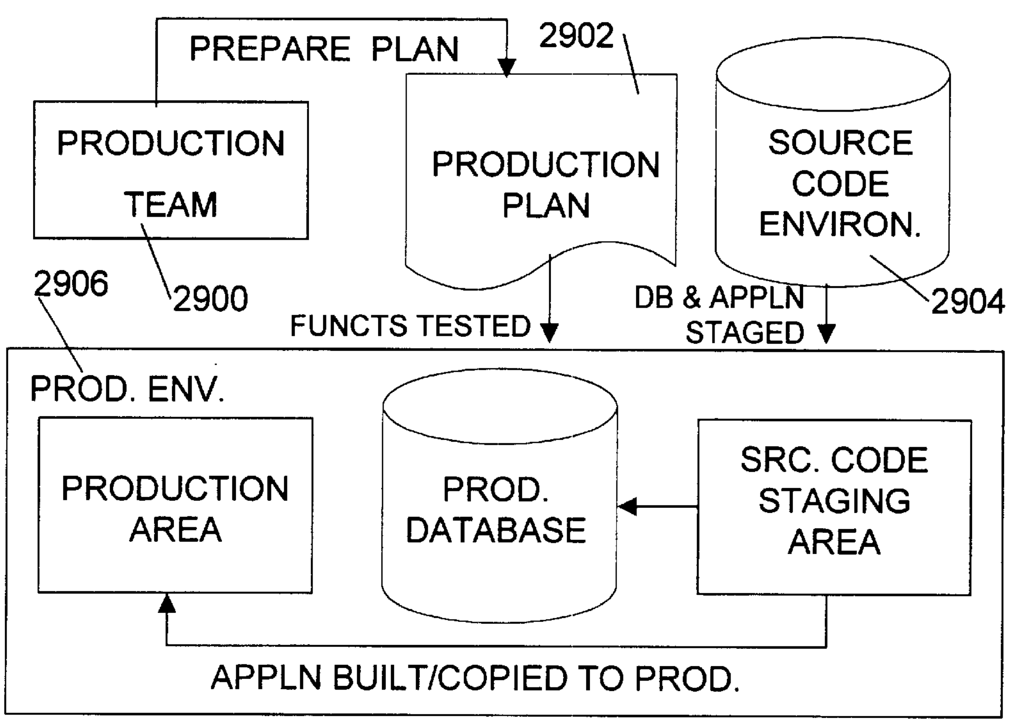
FIG. 29 is a flowchart for production of existing applications according to an embodiment of the present invention.

FIG. 29 is a flowchart for production of existing applications. The change control record is forwarded to the production operations team 2900 responsible for scheduling changes to production. A promotion to production is scheduled on the production plan 2902. Database modifications are fetched from source code control 2904 and applied to the production environment 2906.

The Source Code Librarian fetches the new application, builds it and copies it into the production environment. The controlled change-tracking portion of the present description is signed and filed. Electronic copies of all portion of the present descriptions and portion of the present description can optionally be stored in source code control or other portion of the present description storage system.

Deliverables from this stage might include:

Application promoted to production.

CM Deliverables from this stage include:

A complete change control record with production information.

Version Control

Description

Version Control tools control access to source code as it is developed and tested and allow multiple versions to be created, maintained, or retrieved. For maintenance management purposes, it is desirable to designate one individual team member to function as the source control administrator. Duties for the source control manager would include the administration of source control users and projects, scheduling and performing periodic backups and applying labels to specific versions of the code (for migration purposes).

Examples of architecture and application source code maintained within the version control process include:

| Location | Types |
|---|---|
| Web Server | Static HTML, Images, JavaScript<br>Active Server Pages (ASP)<br>Cascading Style Sheets (DHTML)<br>Architecture ASP Header Files |
| Application Server | Activities<br>Sub-Activities<br>Business Components (factories, supporting Business Objects)<br>Architecture Frameworks |
| Database Server | Database specifics (table, rollback segment and temporary space information)<br>Users, Roles<br>Tables, Indexes, Triggers<br>Procedures, Packages, Sequences |

Tool Recommendation

Many configuration management tools are available on the market today, some of which provide test data management functionality.

During the ReTA Phase 1 engagement, two different tools where utilized and evaluated: MicroSoft's Visual SourceSafe™ and Intersolve's PVCS Version Manager™. Both applications are relatively simple use and administer. Visual SourceSafe is preferred for small to medium sized engagements and PVCS Version Manager is preferred for large, enterprise-scale development efforts. For a complete description of the configuration and usage of the Microsoft Visual SourceSafe application as it was utilized on the ReTA Phase 1 engagement, refer to Source Control.

Visual SourceSafe

Figure 30:
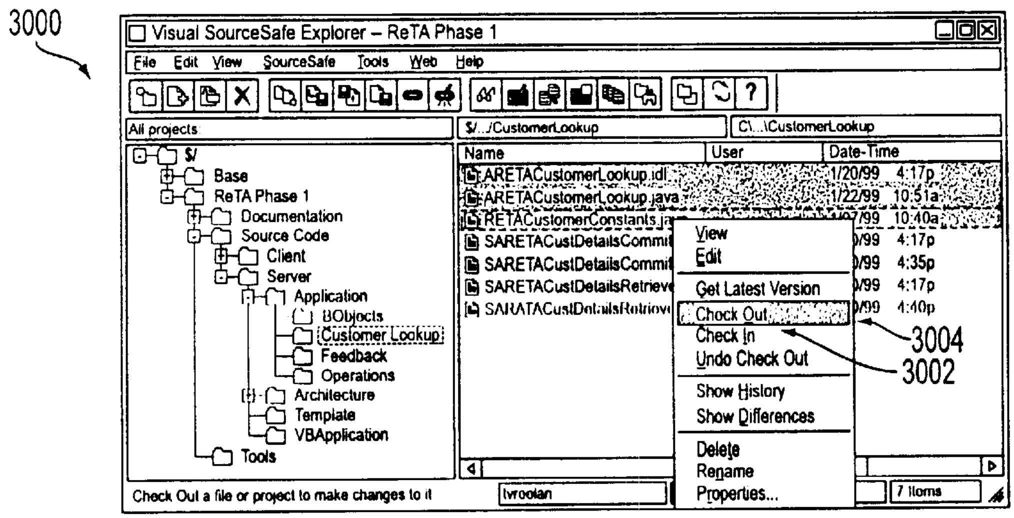
FIG. 30 illustrates a graphic display of Visual Source Safe according to an embodiment of the present invention.

Visual SourceSafe from Microsoft ships with the Visual Studio suite and as such is tightly integrated with the Visual Integrated Development Environments. See FIG. 30, which illustrates a frame 3000 of Visual Source Safe. Check in and check out functions 3002,3004 can be performed from with Visual Basic or Visual J++. Additionally, Rational Rose is also tightly integrated with SourceSafe.

Additionally, this product provides:

Easy to use drag-and-drop for file check in and check out

Historical reporting and impact analysis

User and project level security

Archive and restore functionality

Version 'Labeling' for source code migration

Support for web based applications

PVCS Version Manager

Figure 31:
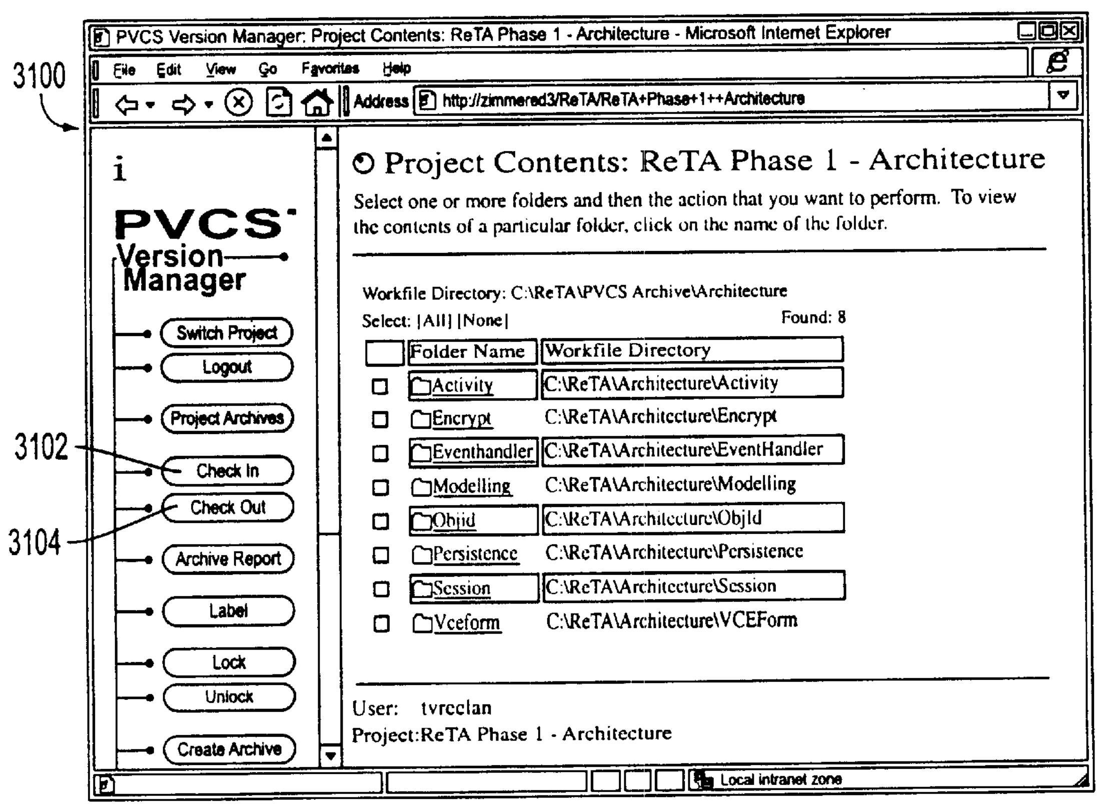
FIG. 31 illustrates a frame of PVCS Version Manager I-Net Client according to an embodiment of the present invention.

PVCS Version Manager from INTERSOLV is the industry standard for organizing, managing and protecting your enterprise software assets. Version Manager enables teams of any size, in any location, to coordinate concurrent development, with secure access and a complete audit trail. See FIG. 31, which illustrates a frame 3100 of PVCS Version Manager I-Net Client.

PVCS VM Server extends the power of Version Manager to teams enterprise-wide via the Internet and Intranets. An intuitive Web client lets users connect to a secure archive and work interactively, anywhere in the world, while sharing protected, centrally managed software.

Additional features include:

I-NET client is simple and easy to use. It supports developers in many locations, working on many platforms Organizes and references all project components graphically with a flexible, project-oriented approach Use easy drag-and-drop to check files in and out of the system with the check in and check out buttons 3102, 3104

Figure 32:
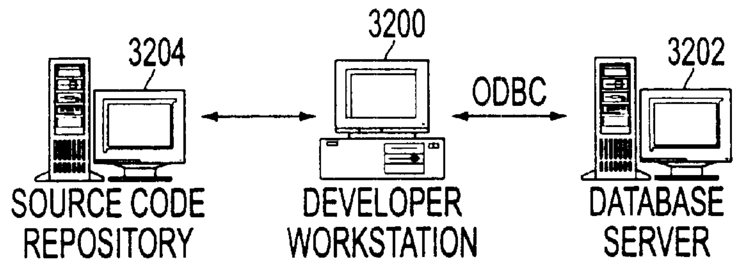
FIG. 32 is an illustration of a Build Source Control Model according to an embodiment of the present invention.

Graphically view project history and see file differences in side-by-side comparisons Branch and merge as needed, with automatic alerts of any conflicts Automate development processes with event triggers Set up projects quickly with online assistants for project configuration, security and customization Procedures/Standards Build & Integration FIG. 32 is an illustration of a Build Source Control Model. During the Build phase of a ReTA engagement, the workstation 3200 of each individual developer should be configured to function independently of other workstations and servers 3202 (except for the development database 3204). This[]process may require developers to first get an updated version of the application source files in addition to those files be checked out for modifications.

The benefits of this configuration are:

Individual development changes do not effect other developers

Easier debugging and testing

Different project team members may check out different versions and/or components of the application concurrently. Changes can then be merged later.

Assembly Test

Figure 33:
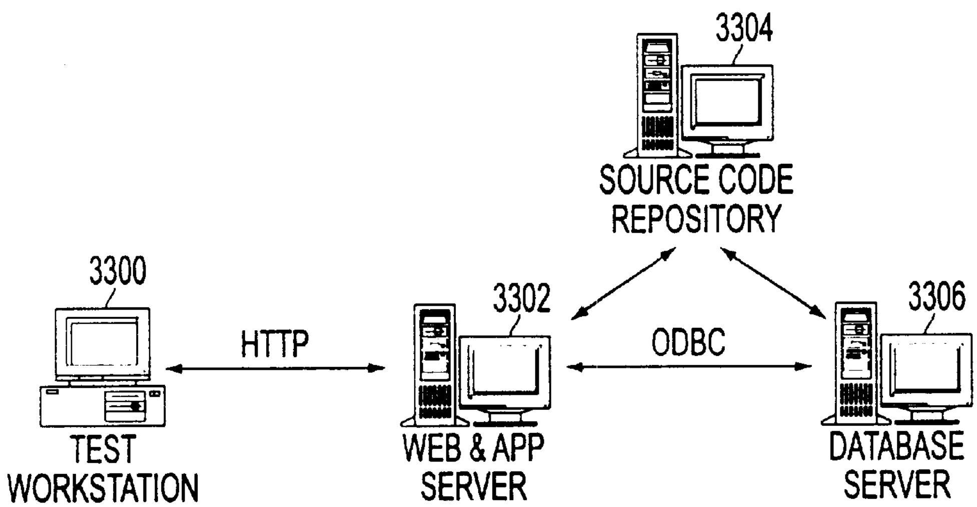
FIG. 33 illustrates an Assembly Test phase control mode according to an embodiment of the present invention.

FIG. 33 illustrates an Assembly Test phase control model. During the Assembly Test phase of a ReTA engagement, the Source Control Administrator may be responsible for the mass checkout and build of the entire application or architecture. Test workstations 3300 may access a web the app server 3302, which is connected to the source code repository 3304 and the database server 3306.

Figure 34:
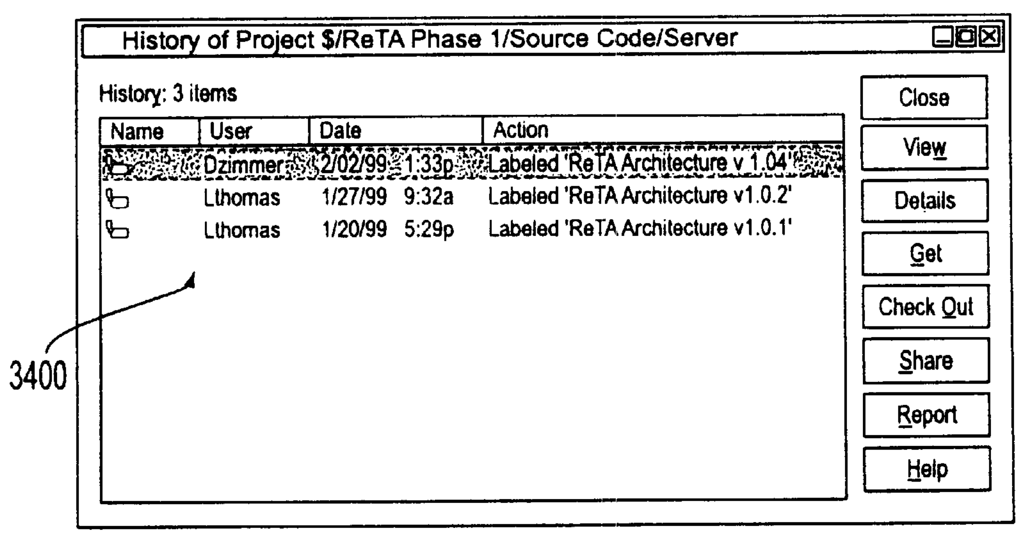
FIG. 34 illustrates a Microsoft Visual SourceSafe 'Labels' dialog box according to an embodiment of the present invention.

To aid in this process, the use of 'Labels' within the source code repository is employed to identify specific versions of files and projects. (See FIG. 34, which illustrates Microsoft Visual SourceSafe 'Labels' 3400). Labels allow for marking a specific set of files within the repository with a logical name and version. At a later point, it is possible to display the different labels and retrieve the desired version.

Environment Management

This portion of the description identifies the miscellaneous application and system-level services that do not deal with the human-computer interface, communication with other programs, or access to information. Environment Management Services identify each component used to perform the operating system services, system level services, application services, and run-time services.

Systems Management

In order to maintain an effective and secure infrastructure, System Management procedures are essential in the success of obtaining a stable environment. These systems require tools, utilities and processes that allow administrators to monitor running components and change their configuration. Systems Management involves all functions required for the day to day operation of the ReTA environment (e.g. event monitoring, failure control, monitoring, tape loading, etc.). Regardless of the changes taking place within the Net-Centric environment, Systems Management activities must take place in an on-going manner.

System Startup & Shutdown

A comprehensive development environment rapidly becomes sufficiently complex that the startup and shutdown of the environment must be managed carefully, and preferably automated. This is key to ensuring the integrity of the environment. Startup may involve the carefully sequenced initialization of networking software, databases, web servers and more. Similarly, shutdown involves saving configuration changes as needed and gracefully taking down running software in the correct sequence.

An Uninterrupted Power Supply (UPS) provides a server with power when the AC power fails or is marginal. The UPS may also shut the server down, in an orderly fashion, in the event of a power failure. The UPS may not shut down the server if the power failure is brief.

The Smart UPS 1400 should be configured with an interface to the server. The recommended interface is the serial port B (COM2) on most servers. PowerChute Plus 5.0 software from American Power Conversion is the recommended choice.

The basic purpose of PowerChute Plus is to safely shut down an operating system and server in the event of a power failure. To do this properly, PowerChute Plus needs the UPS to provide battery power to the system while PowerChute shuts down the system. This is where the correct sequencing of Events becomes important.

Clear and accessible portion of the present description of startup/shutdown procedures Automated startup/shutdown process that rarely requires manual intervention A product that has remote power on reset capabilities Backup and Restore The incremental value of the daily work performed on the development project is high. This investment must be protected from problems arising from hardware and software failure, and from erroneous user actions and catastrophes such as fires or floods. The repositories and other development information must therefore be backed up regularly. Backup and restore procedures and tools must be tested to ensure that system components can be recovered as anticipated. The large volumes of complex data generally require automation of backups and restores.

The advent of Netcentric technologies has introduced an increase in media content that requires storage. The environment may support a high volume of media files, which must be considered in the backup/restore plans. Storage capacity planning should allow for the typically increased size of these file types.

As the amount of storage may grow significantly over time on a large project, the hardware requirements may increase. Sufficient room for growth should be planned when selecting the tools and hardware. Switching tools and hardware can be problematic due to lack of upward compatibility (DDS-DLT, various tools etc.).

The time required for backups must also be considered. Usually the number of hours without development per day decreases over time and if backups can only be performed when no user is logged in, this might become a problem. It is generally the case that the project may benefit from buying the fastest and largest backup hardware/software it can afford.

Storage Management

ReTA may implement an automated tape management system that provides location/retention special handling, file integrity and data protection.

Archiving

Archiving can be particularly useful to safeguard information from previous versions or releases. More generally, it is used to create a copy of information that is less time-critical than the current environment at a given time. Archiving may be performed to a medium, which is different from the backup medium, and may involve other tools, which, for example, provide a higher compression ratio.

Performance Monitoring

Performance Management ensures that the required resources are available at all times throughout the distributed system to meet the agreed upon SLAs. This includes monitoring and management of end-to-end performance based on utilization, capacity, and overall performance statistics. If necessary, Performance Management can adjust the production environment to either enhance performance or rectify degraded performance.

Operating System

Windows NT may function as the ReTA Phase 1 Development Environment operating system, handling Environment System Services such as multi-tasking, paging, memory allocation, etc.

System Level Services

The Windows NT Domain Controller allows users and applications to perform system-level environment services such as a login/ logoff process for authentication to the operating system; enforced access control to system resources and executables; and access to the local or remote system's user or application profiles.

Application Services

The ReTA Phase 1 Frameworks may perform application Security Services, Error Handling/Logging Services, State Management Services and Help Services within the application.

State Management

State Management Services enable information to be passed or shared among windows and/or Web pages and/or across programs. In Netcentric environments, the HTTP protocol creates a potential need for implementing some form of Context Management Services (storing state information on the server). The HTTP protocol is a stateless protocol. Every connection is negotiated from scratch, not just at the page level but for every element on the page. The server does not maintain a session connection with the client nor save any information between client exchanges (i.e., web page submits or requests). Each HTTP exchange is a completely independent event. Therefore, information entered into one HTML form must be saved by the associated server application somewhere where it can be accessed by subsequent programs in a conversation Security Services ReTA implements Application Security through the ReTA Session and Activity frameworks. The Session framework provides "Session level Page access authorization", "User identification" and "session timeout" services. The Activity framework provides "Activity level Page access authorization".

Error Handling/Logging Services

Error Handling Services support the handling of fatal and non-fatal hardware and software errors for an application. An error handling architecture takes care of presenting the user with an understandable explanation of what has happened and coordinating with other services to ensure that transactions and data are restored to a consistent state.

Logging Services support the logging of informational, error, and warning messages. Logging Services record application and user activities in enough detail to satisfy any audit trail requirements or to assist the systems support team in recreating the sequence of events that led to an error.

Runtime Services

The ReTA Phase 1 Development Environment may use the Microsoft Transaction Server and the Microsoft Java Virtual Machine as a Run-Time Environment System Service. This affords a layer of abstraction between the applications and the underlying operating system.

Problem Management

Problem Management tools help track each system investigation request—from detection and portion of the present description to resolution (for example, Problem Tracking, Impact Analysis, Statistical Analysis). Several problem management software packages are available from a variety of vendors.

Tool Recommendation

SIR Workbench

The SIR Workbench is another Microsoft Access tool that was developed for small to medium sized projects. It provides basic functionality of entering, modifying and reporting of architecture and application problems encountered during the testing and release phases of the project life cycle.

Visual SourceSafe

Visual SourceSafe (VSS) from Microsoft ships with the Visual Studio suite and as such is tightly integrated with the Visual Integrated Development Environments. One of the features provided by VSS is the ability to search through the source code for given text strings. This is useful for performing impact analysis.

Security Management

Security Management tools provide the components that make up the security layer of the final system, and may provide required security controls to the development environment. While some of these tools may be considered as nothing more than security-specific Packaged Components. many are an integral part of the development environment toolset.

Database

Development Database security may be minimal. Database User IDs may be setup to grant user-level security. The engagement Database Administrator (DBA) may have a logon to allow for full permissions. Otherwise, a Developer ID may allow read/write access and a Core User ID may allow for read access only.

Network

A Windows NT Group created specifically for the engagement may protect the Development shared file folder and subsequent sub-folders (ex 'ReTAArch'). Project members individual network accounts may be added to the Domain Group ensuring access. Local network administrators may be responsible for the creation and maintenance of individual and group account information.

Application Server

The application server has two forms of security: Static security and dynamic (context dependent) security.

A Windows NT group may be created for each Role in the completed application (e.g. Customer, Manager). Microsoft Transaction Server's integrated Windows NT security allows the developer to determine the security rights for each component. The dynamic, context dependent security is implemented by the developer using the Event Handler framework for the logging and display of errors to the user.

Web Server

The web server has static security for each page and security to maintain control of the flow between pages. The static security uses the Windows NT group for each user role to restrict access to each page. For the flow control, the developer uses the Session framework to restrict the ordering of page requests. The allowed ordering of pages are entered into the Session database tables.

Systems Building

System Building tools comprise the core of the development architecture and are used to design, build, and test the system.

Analysis & Design

The BI Methodology has several application development routes that apply to different development scenarios. Routes currently exist in the methodology for custom and packaged application development. Component development is among several routes to be developed. Until the component development route is completed, component-based projects should be planned using a combination of BI Methodology and ODM task packages.

In general, BI Methodology should be used for all tasks that are independent of a specific technology. For example, tasks related to business modeling, user interface design, training development, package selection, and product testing should all be taken from BI Methodology rather than ODM. These technology-independent tasks typically occur early (business modeling, solution strategy, and requirements gathering) and late (product testing through deployment) in the project.

ODM content should be used for all tasks that are related to component and object development. In addition, ODM is the primary source for those tasks related to obtaining characteristics associated with component- and object-based development (such as flexibility and reuse). When using ODM task packages, take care to ensure that one consider how they link with the other elements of business integration (such as human performance).

Data Modeling

Description

Data Modeling tools provide a graphical depiction of the logical data requirements for the system. These tools usually support diagramming entities, relationships, and attributes of the business being modeled on an Entity-Relationship Diagram (ERD). Several techniques have evolved to support different methodologies (e.g., Chen, Gane & Sarson, and IDEF).

As systems are often built on top of legacy databases, some data modeling tools allow generation of an object model from the legacy database data model (DDL). By understanding the E-R diagram represented by the database, it is easier to create an efficient persistence framework, which isolates business components from a direct access to relational databases. Caution is required, however, as the resulting model is at best only partial, as an object model has dynamic aspects to it as well as static relationships, and may not correctly reflect the analysis performed in the problem domain.

When a component or object-based approach is used, data modeling is not performed. Rather, the object model represents both the data and the behavior associated with an object. In most systems, relational databases are used and the object model must be mapped to the data model. Standard mechanisms for mapping objects exist.

Tool Recommendation

Visual Studio

Figure 35:
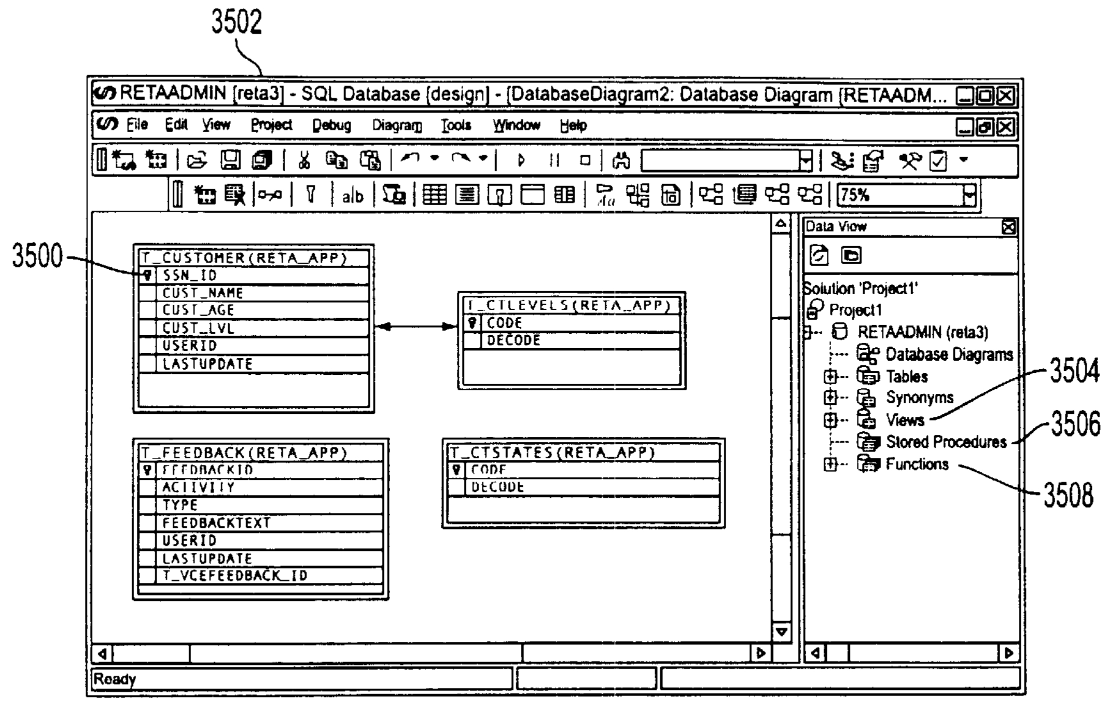
FIG. 35 illustrates a Database Diagram within Visual Studio according to an embodiment of the present invention.

Microsoft's Visual Studio 6.0 includes a database diagram tool that helps developers visualize structures of tables and relationships within a relational database. See FIG. 35, which illustrates a Database Diagram 3500 within Visual Studio 3502. Using this project within Visual Studio it is possible to, for example:

- Connect to existing Oracle 7.33+ or SQL Server 6.5+ databases.
- View, print and modify existing database objects including table attributes and properties, views 3504, columns, indexes, relationships, procedures 3506 and functions 3508.
- Create new database objects.
- Generate SQL scripts for schema creation and update.
- Version control schema information using Visual SourceSafe.

Visual Studio

Additionally, Rational Software's Rational Rose 98 provides Oracle8 data modeling functionality including schema analysis, SQL/DDL generation, reporting and editing. For a complete description of the product and its features visit the Rational Rose Website at www.rational.com.

Performance Modeling/Management

Description

The performance of a system must be analyzed as early as possible in the development process. Performance modeling tools support the analysis of performance over the network. A simple spreadsheet may be suitable in some well-known and understood environments, but dedicated performance modeling tools should be considered on any project with high transaction volumes or complex distributed architectures involving several platforms.

In the case of Internet-based applications, as the Internet is not a controlled environment, performance modeling is limited to those components within the domain of the controlled environment (i.e. up to the Internet Service Provider). However, in the case of intranet-based systems, where the environment is controlled from end-to-end, performance modeling may be performed across the entire system.

Performance modeling for components involves the analysis of the projected level of interaction between components and the level of network traffic generated by this interaction. It is important for performance reasons that communication between components is minimized, especially if these components are distributed.

Tool Recommendation

Visual Quantify
Tivoli
Sniffer Basic
Application Expert

Object Modeling

Description

An object model usually contains the following deliverables:

Class Diagram (1 per functional area or 1 per component)

Class Definition (1 per class)

Class Interaction or Sequence Diagram (1 or more per scenario/workflow)

Class State Transition Diagram (1 per Class with complex state)

Figure 36:
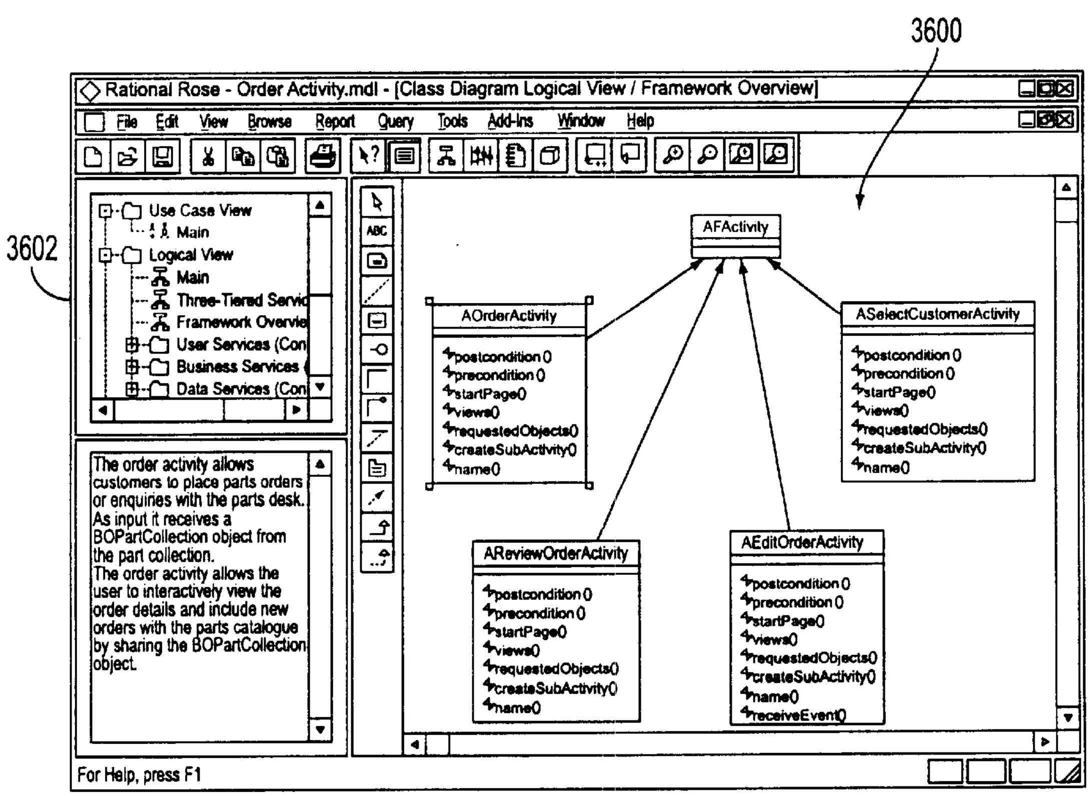
FIG. 36 illustrates Object Modeling within Rational Rose according to an embodiment of the present invention.

Tools such as MS Word, MS PowerPoint, ABC Flowchart (MicroGrafix), may be used to produce these deliverables. See FIG. 36 illustrating Object Modeling 3600 within Rational Rose 3602. Specific modeling tools do exist, however, and provide advantages such as cross referencing (for example, are all the methods used in the Interaction diagrams described in the class;definitions?), automatic propagation of changes to other diagrams, generation of reports, and generation of skeleton code. However, some tools have problems with:

Usability and stability

Single users or small numbers of concurrent users

Proprietary repositories (usually file-based, rather than DB-based)

Support of extensions/customizations

As well as providing the usual editing and graphical functionality, a good modeling tool should:

Interface with a repository (to support versioning)

Support multiple users

Generate code from the design

The industry standard to represent the object model is UML notation (adopted by OMG).

Tool Recommendation

Rational Rose 98
Visio 5.0
Visual Modeler 2.0 (Only valid for VB and VC++)

Component Modeling

Description

Component modeling can mean either designing components from scratch, or customizing and integrating packaged software. No specific component modeling tools exist, and current object modeling tools only provide limited support for components (e.g. for packaging related classes together). Class packages can be used to separate the object models for different components, with a separate class package(s) for the component model. This approach, however, is not enforced by current modeling tools, and requires project naming and structuring standards.

When component modeling is being performed using existing packaged software, some form of reverse engineering or importing is required from the modeling tool to capture the existing design.

During component design, the partitioned component model is designed, which defines physical interfaces and locations for components. It is important for performance reasons that communication between components is minimized, especially if they are distributed.

Tool Recommendation

Rational Rose 98
Visio 5.0
Visual Modeler 2.0 (Only valid for VB and VC++)

Application Logic Design

Description

Application Logic Design tools graphically depicts an application. These tools include application structure, module descriptions, and distribution of functions across client/server nodes.

A variety of tools and techniques can be used for Application Logic Design. Examples are structure charts, procedure diagrams (module action diagrams), and graphics packages to illustrate distribution of functions across client and server.

Application Logic Design functionality is also provided by a number of Integrated Development Environments (IDE).

With component-based development, Application Logic Design is performed through object and component modeling. The functionality is captured in use cases, scenarios, work flows and/or operations diagrams along with interaction diagrams/sequence diagrams. These are usually produced using MS Word, MS PowerPoint, ABC Flowcharter (Micrografix), or an object modeling tool.

Tool Recommendation

Rational Rose 98
Visio 5.0

Database Design

Description

Database design tools provide a graphical depiction of the database design for the system. They enable the developer to illustrate the tables, file structures, etc. that may be physically implemented from the logical data requirements. The tools also represent data elements, indexing, and foreign keys.

Many data design tools integrate data modeling, database design, and database construction. An integrated tool may typically generate the first-cut database design from the data model, and may generate the database definition from the database design.

With an object-based or component-based solution, the data-modeling task changes. In most cases, relational databases are still used, even where there are no dependencies on legacy systems. As there is an 'impedance mis-match' between an object model and a data model, a mapping activity must be undertaken. There are standard mechanisms for doing this. There are also tools on the market which allow the mapping of classes to relational tables, and which generate any necessary code to perform the database operations.

There is a tendency (especially when dealing with legacy systems) to treat data models and object models the same. It is important to recognize that at best, the data model represents only the static part of the object model and does not contain any of the transient or dynamic aspects. The physical data model may also change significantly (for DB optimization), further confusing the issue.

There can be performance problems with objects mapped to a relational database. In a worst case scenario, an object can be spread across many tables, with a single select/insert for each table, and as each object is loaded one by one, the performance becomes very poor. Some tools provide lazy initialization (only loading the parts as they are needed) and caching (minimizing DB hits).

The current trend seems to be for object-relational databases, with vendors such as Oracle adding object features to their core products. Although the support provided at the moment is limited, it is likely that in future versions Java or C++ classes may be able to interface directly.

Tool Recommendation

Rational Rose 98 (Only valid for Oracle 8)
ERwin

Presentation Design

Description

Presentation design tools provide a graphical depiction of the presentation layer of the application. Tools in this category include window editors, report editors, and dialog flow (navigation) editors. Window editors enable the developer to design the windows for the application using standard GUI components. Report editors enable the developer to design the report layout interactively. Placing literals and application data on the layout without specifying implementation details such as page breaks. The majority of these tools generate the associated application code required to display these components in the target system.

Using the dialog flow (navigation) editors, the developer graphically depicts the flow of the windows or screens. The Control-Action-Response (CAR) diagram is a commonly used technique for specifying the design of GUI windows.

The majority of Netcentric systems use Web browsers to provide a common cross-platform user interface. Presentation design for this type of environment therefore entails the generation of HTML pages, often with additional components (JavaScript, 3rd party ActiveX controls, Plug-ins) providing enhanced functionality or media content. Many tools are currently available for designing and creating web content, although HTML remains the common denominator, at the very least as a placeholder for the content.

In the case of systems published on the Internet, defining the target audience is less straightforward than in traditional systems, but equally important. Having a good understanding of the intended audience may be a big advantage when thinking about user interaction with the system, and therefore, the presentation layer of the system.

Within a ReTA based application, three types of web pages that are available include:

| Page Type | Description |
|---|---|
| Static HTML | This page consists of a single HTML file containing static text, formatting, scripts, anchor tags, and imbedded images. This type of portion of the present description is the most common as it can be created using an ASCII text editor such as Windows Notepad.<br>For designing web pages in a WYSIWYG format, Many popular editing tools are available including Microsoft FrontPage, Microsoft Visual InterDev, and HomeSite.<br>Design elements include:<br>Static HTML v3.2/v4.0 portion of the present descriptions<br>Graphics/Images<br>JavaScript (client and server) v1.2 |
| Active Server Page (Non UI Framework) | This type of web page is created dynamically at the web server and written to the requesting client. These pages are useful when dynamic data is required within the web page itself.<br>Microsoft FrontPage and Visual InterDev are popular ASP editors with Visual InterDev providing ASP debugging functionality as well. |
| Active Server Page (Using UI Framework) | This type of web page is also created dynamically at the web server and written to the requesting client, however, they make use of the ReTA User Interface Framework. |

Tool recommendation

Microsoft Visual Studio 6.0
Rational Rose 98
Visio 5.0
Visual Modeler 2.0 (Only valid for VB and VC++)

Packaged Component Integration

Description

Packaged components are generally thought of as third party applications or services that provide ready-made business logic that is customizable and reusable. Additionally, legacy applications can be included in these discussions when there is a desire to reuse portions of or an entire pre-existing application. One of the benefits of component-based systems is the ability to separate the component interfaces from their implementation. This simple feature can help enormously with access to both third party components and legacy applications. The concept of putting an object or component interface on a non-object piece of software is called 'wrapping.'

There are several arguments for putting a wrapper around an third party application or legacy system instead of custom building or replacing the functionality that they provide:

- The wrapped component may provide functionality that requires deep technical expertise or knowledge to develop. (e.g. hardware drivers, EDI applications)
- The provided functionality may only be temporary. With a wrapper in place, the underlying implementation may change without affecting the consuming application.
- The wrapped component can now be reused within additional applications without additional effort.
- Wrapping can take considerably less time and effort than building the third party component or legacy application over again. The more complex the application being wrapped, the greater the cost savings in time and effort.
- Within wrapped components, it is possible to consolidate several existing applications into a single new service.

(e.g. customer details from a ERP package as well as from the new system)

Procedures/Standards

Pure Component Integration

Component standards are maturing, particularly in eCommerce Applications. Although plug and play is not yet a reality, more application and ISV vendors are developing component based solutions for the eCommerce market place. Generally, this is the simplest form of integration if leading-edge eCommerce architectures are being deployed.

Care should be taken to allow for the migration from one vendor to another. To allow for this, the application developer should investigate encapsulating the component within an application wrapper.

Wrapped Component Integration

Many of today's vendors provide ActiveX or Java classes that provide a direct component interface into their application or services. Some vendors such as SAP expose component interfaces which can be accessed by ORBs e.g. Microsoft's DCOM connector. The underlying architecture however is not component-based. This is not a problem providing the package provides scalable and robust application execution.

Figure 37:
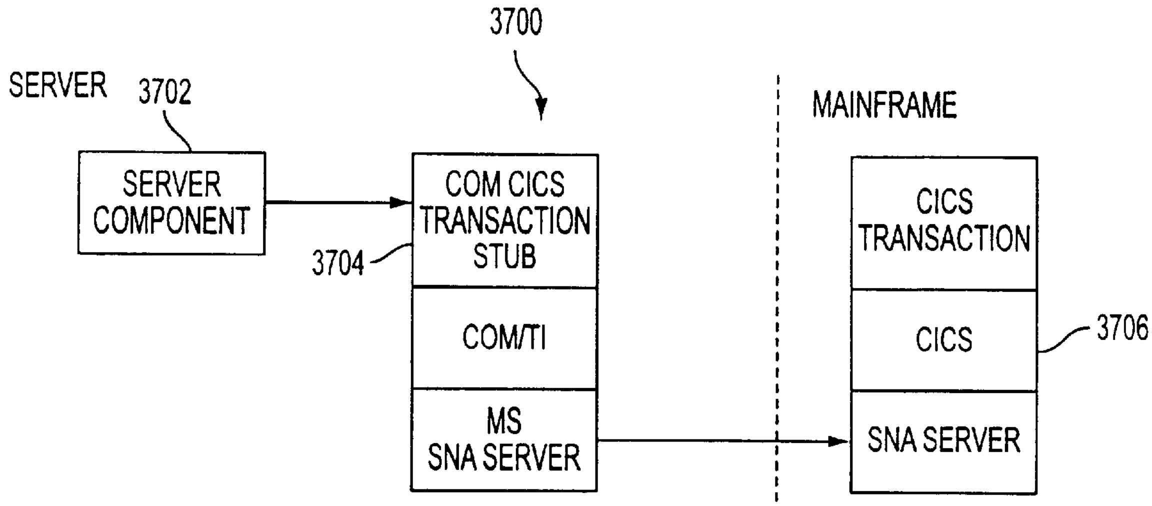
FIG. 37 illustrates directly calling a wrapped CICS component according to an embodiment of the present invention.

Another example is the use of Microsoft's COM Transaction Integrator 3700 and the Microsoft SNA Server for NT 3702. These products allow for the wrapping of CICS transactions in COM component stubs 3704 that can be invoked from MTS components. See FIG. 37, which illustrates directly calling a wrapped CICS component 3706.

Batch and Indirect Integration

Figure 38:
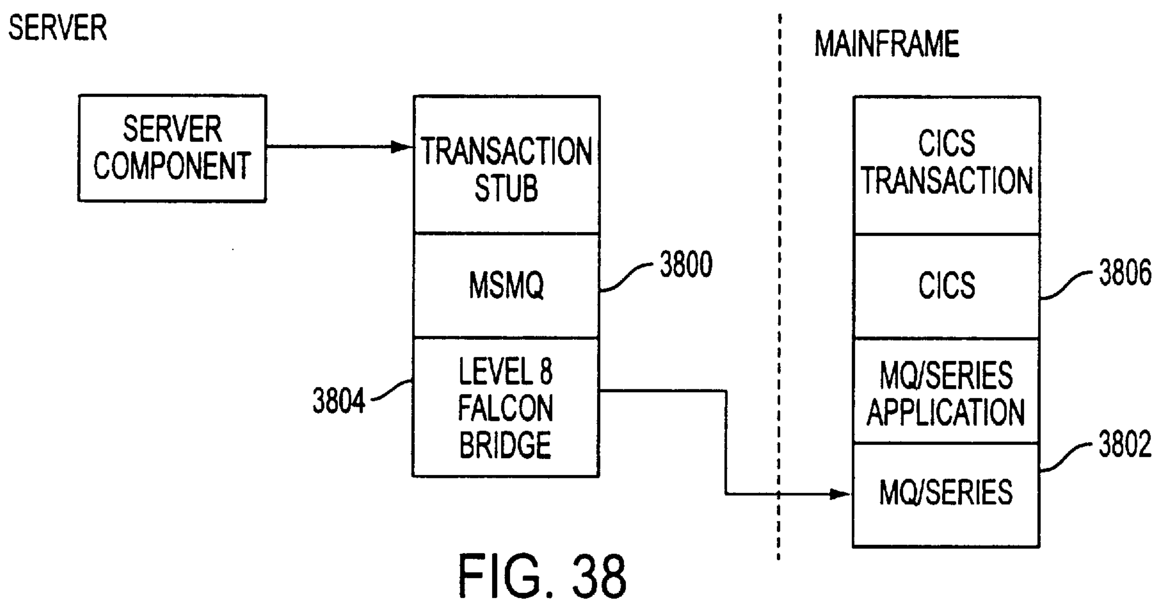
FIG. 38 illustrates indirectly calling a wrapped CICS component according to an embodiment of the present invention.

This process of integration relies on the use of Message Oriented Middleware (MOM) to provide asynchronous messaging to and from the packaged application. This can be accomplished using Microsoft's Message Queue (MSMQ) 3800, fBM's MQ/Series 3802 and Level 8's Falcon Bridge 3804 (to provide MSMQ to MQ/Series communication). See FIG. 38, which illustrates indirectly calling a wrapped CICS component 3806.

Data Integration

This is the most common form of integration but restrictive because it involves development of duplicated business logic, risks breaking application integrity and causes maintenance overheads.

Construction

Construction tools and processes are used to program or build the application: client and server source code, windows, reports, and database. ReTA based development should use a base set of naming and coding standards.

Tool Recommendation

Visual Studio 6.0
Rational Rose 98

Test

Testing applications (client/server or NetCentric) remains a complex task because of the large number of integrated components involved (i.e., multi-platform clients, multi-platform servers, multi-tiered applications, communications, distributed processing, and data). The large number of components result in a large number and variety of testing tools.

Test Data Management

Description

Members of the technology infrastructure and data architecture teams are often the ones who create and maintain the common test data. This requires full-time personnel, especially when a large number of test databases must be kept in synchronization. Many of the automated testing tools available on the market today provide test data management functionality.

At a minimum, vendor or custom applications and processes should be in place to perform the following:

Database Schema Export & Import

Individual or Bulk Table Deletion and Population

Data Refresh/Restore

Additional functionality may include data generation or conversion, versioning and validation.

Tool Recommendation

Many testing tools are available on the market today, some of which provide test data management functionality.

Procedures/Standards

The ReTA Component Test Workbook Plan-Prep provides the mechanism for maintaining component test data required during test execution. When creating the test data, all attempts should be made to make the test data reusable.

Test Data Manipulation

Description

There are a few avenues for the manipulation of test data. When considering this function during the component and assembly testing phases consider the following:

Create test data if the physical data model is stable.

Use the existing application if it can create valid data.

Convert production data if the Data Conversion Application and the production data are reliable.

Tool Recommendation

If possible, leverage any existing data manipulations that were included with the database suite. Many database vendors provide data management and manipulation applications with their database systems. Additionally, many development packages, including Microsoft Visual Studio™, provide database access and manipulation functionality.

For data generation, PLATINUM TESTBytes™ is a test data generation tool that connects to your database to create test data for your relational databases. With point-and-click action, one can specify the:type of data needed. TESTBytes automatically generates up to millions of rows of meaningful test data, eliminating days or weeks of time-consuming effort and reducing costs.

Procedures/Standards

For data conversion, the best approach is to:

If data is going to be shared with an existing application, attempts should be made to reuse test data from the legacy system.

- Use the existing data store capabilities to extract or massage the data into a format that is easily integrated into the new application.
- Create one-time extract and formatting applications to extract the legacy data, perform formatting and business operations, and import the newly modified data into the new data store.

The ReTA Component Test Workbook Plan-Prep provides the mechanism for maintaining component test data required during test execution. When creating the test data, all attempts should be made to make the test data reusable.

Test Planning

Description

The test planning function during a ReTA engagement provides an opportunity to define the approaches, tools, environments and process to test the application and its individual components for functional and technical validation. This process is typically assigned to someone with experience in application development using similar technologies as those to be used on the new system.

Tool Recommendation

The ReTA Component Test Workbook Plan-Prep provides the mechanism for maintaining and communicating component test information. Component test planning information such as component test cycles and component test conditions are included. Both worksheets are to be completed during the design phase by the designer.

Test Execution

Description

If testing environments have been created, application testing scenarios and scripts should be created to evaluate the application functions as designed. Actual results are compared against expected results portion of the present description with the test conditions. The use of automated testing tools is essential for fast, accurate regression and performance testing. Ensure the tool used for automated testing is easily configured. Also, ensure the scripts can be quickly updated to allow for user interface changes.

Tool Recommendation

Component Test Workbook

The ReTA Component Test Workbook Plan-Prep provides the mechanism for maintaining and communicating component test information. Component test planning information such as component test cycles and component test conditions are included. Both worksheets are to be completed during the design phase by the designer.

Automated Testing Tool

Figure 39:
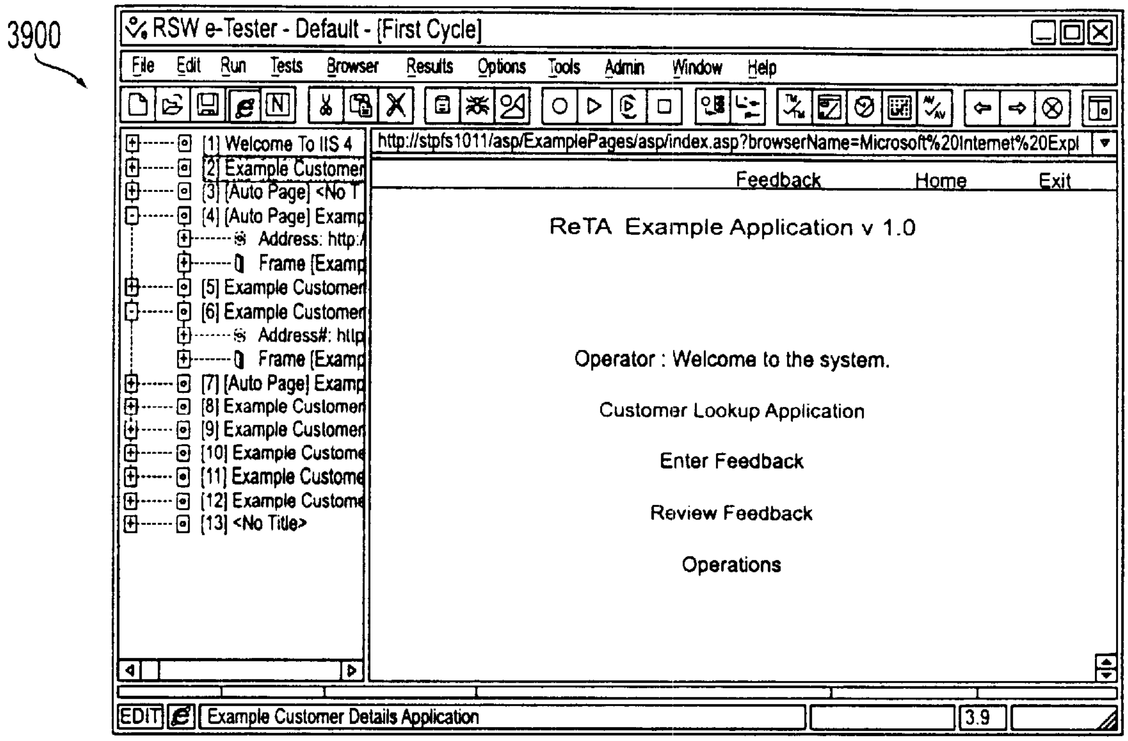
FIG. 39 illustrates RSW eTest Automated Testing Tool according to an embodiment of the present invention.

There are many automated, web-based testing tools on the market today. Many tools provide record and playback scripting functionality. See FIG. 39 which illustrates RSW eTest Automated Testing Tool 3900. Recommended features include:

- Auto record and playback of test scripts
- Data driven testing
- Easy test modification (many tools have proprietary scripting languages)
- Cross-browser support
- Multi-user simulation for load & performance testing
- Test summaries and reporting Procedures/Standards In addition to the test planning elements of the CT workbook, component test execution worksheets are also included: component test script, test data, and expected & actual results worksheets. These worksheets are to be completed by the developer during the build phase. These scripts may be used by the developer/tester to execute the individual component tests. In theory, since the steps of the component test are portion of the present description, any developer or tester should be able to execute the test by simply following the steps outlined in the test script.

Performance Management

Description

Performance Management tools support application performance testing. These tools monitor the real-time execution and performance of software. They help to maximize transactions and response time to the end user. They are also useful in identifying potential bottlenecks or processing anomalies.

Procedures/Standards

During the automated test execution process, the testing tool may automatically verify the current state of the system (i.e. actual results) against the expected state of the system (i.e. expected results) for each test case defined in the test script. Execution status may be reported through the reporting function of the toolset. In the case of performance or lead testing, the testing tool may provide a summary report including graphic illustrations describing the overall performance of the system.

Test Results Comparison

Description

Whether using automated or manual testing processes, after the completion of each testing cycle it should be clear as to what defects still exist within the system. By comparing actual results with expected results, the application tester and developer can quickly detect design and development errors within the system.

Tool Recommendation

The ReTA Component Test Plan-Prep Workbook provides the mechanism for maintaining expected and actual results. The Expected and Actual Results worksheet outlines the expected result for each condition and lists the actual result encountered during the test execution.

Procedures/Standards

During the automated test execution process, the testing tool may automatically verify the current state of the system (i.e. actual results) against the expected state of the system (i.e. expected results) for each test case defined in the test script. Execution status may be reported through the reporting function of the toolset.

Test Coverage Measurement

Description

Test Coverage Measurement tools are used to analyze which parts of each module are used during the test. Coverage analyzing tools are active during program operation and provide comprehensive information about how many times each logic path within the program is run. This Test Management and Quality Management tool ensures that all components of an application are tested, and its use is a vital and often overlooked component of the test process.

Tool Recommendation

Rational's Visual PureCoverage™ is an easy-to-use code-coverage analysis tool that automatically pinpoints areas of code that code that have and have not been exercised during testing. This greatly reduces the amount of time and effort required to test an entire application and its components, increases the effectiveness of testing efforts by providing insight into overall program execution, and helps ensure greater reliability for the entire program, not just part of it.

Procedures/Standards

Test coverage measurement ensures is used to ensure that the entire application or system is completely tested. A manual approach can be applied to ensure that every path of logic within the application is completely tested. To reduce the test preparation time, an automated testing tool that provides this functionality should be leveraged.

SIR Management

Description

SIR Management Tools help track each system investigation request from problem detection through portion of the present description resolution.

Tool Recommendation

SIR Management Tools help track each system investigation request from problem detection through portion of the present description resolution. During the testing phases of the engagement, it may be desirable to reuse the SIR tools and processes developed for and used for overall problem tracking SIR Workbench The SIR Workbench is a Microsoft Access based tool that has been used on various component and client/server engagements. It provides basic functionality of entering, modifying and reporting of architecture and application problems encountered during the testing phases of the project life cycle.

Procedures/Standards

For a full description of the tool and its use, refer to the SIR Workbench.

Development Architecture Physical Model

Purpose

The ReTA Development Architecture Physical Model portion of the description shows the actual components comprising the Development Architecture and their relative location and interfaces. Additionally, the model depicts the platforms on which the components may reside as well as the distribution across the environment. The components in the Physical Model may support a portion of a function or more <than one function from the functional model.

Physical Configuration

Figure 40:
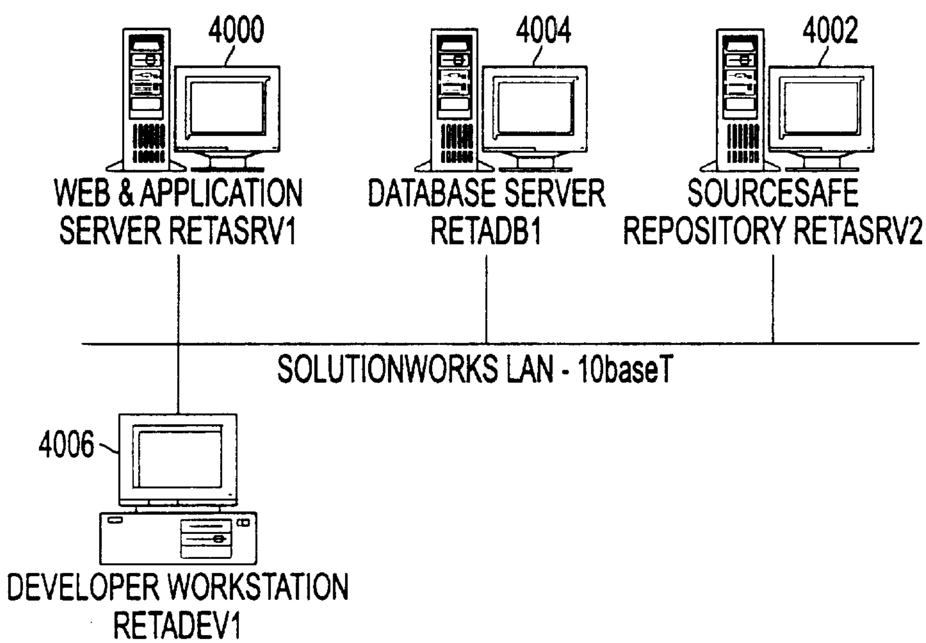
FIG. 40 is an illustration which describes the physical configuration necessary for ReTA development according to an embodiment of the present invention.

FIG. 40 is an illustration that describes the physical configuration necessary for ReTA development. The development environment was composed of the following hardware and software configurations:

| Name | CPU | RAM | Operating System | Software |
|---|---|---|---|---|
| RETASRV1 (4000) | P-300 | 128 MB | Windows NT Server 4.0 (SP4) | Microsoft Internet Information Server 4.0<br>Microsoft Transaction Server 2.0<br>Microsoft Visual SourceSafe Client 6.0<br>HP OmniBack II Client |
| RETASRV2 (4002) | P-166 | 60 MB | Windows NT Workstation 4.0 (SP4) | Microsoft Visual SourceSafe Server 6.0<br>HP OmniBack II Client |
| RETADB1 (4004) | P-300 | 128 MB | Windows NT Server 4.0 (SP4) | Oracle Enterprise Edition 8.04<br>HP OmniBack II Client |
| RETADEV1 (4006) | P-300 | 96 MB | Windows NT Workstation 4.0 (SP4) | Microsoft Transaction Server 2.0<br>Microsoft Personal Web Server 4.0<br>Microsoft Visual SourceSafe Client 6.0<br>Microsoft Visual J++ 6.0<br>Microsoft Visual C++ 6.0 - Tools Only<br>Microsoft Internet Explorer 4.01<br>Oracle 8 Client |

Build Model

Figure 41:
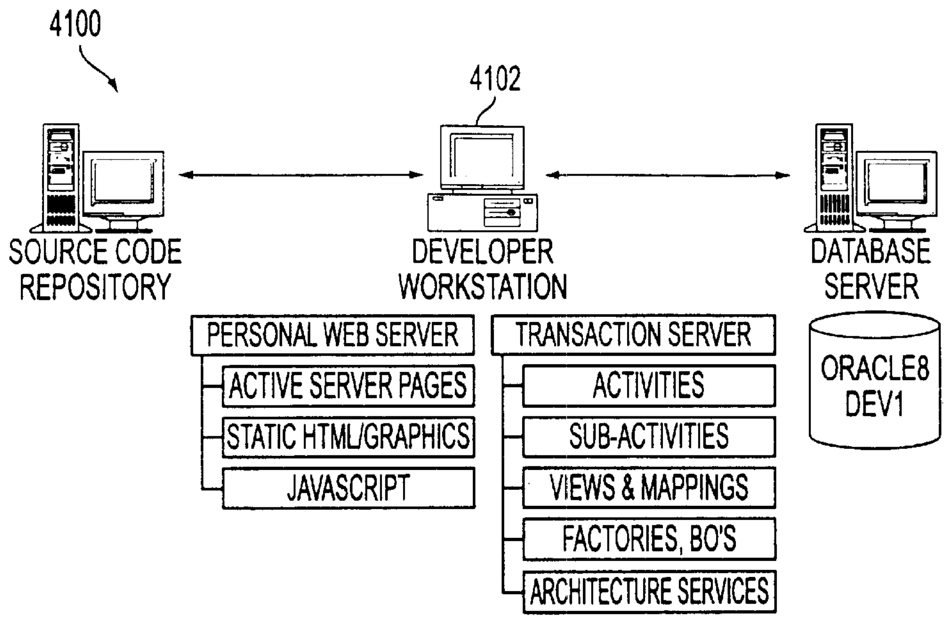
FIG. 41 illustrates the application & architecture configuration for a typical ReTA Build environment according to an embodiment of the present invention.

FIG. 41 illustrates the application & architecture configuration for a typical ReTA Build environment 4100. Each development workstation 4102 should be configured to provide systems management, configuration management and systems building support. In this model, all architecture and application components & services reside on the developer workstation. This allows the developer to design, build, debug and test independently of other developers.

Assembly Test Model

Figure 42:
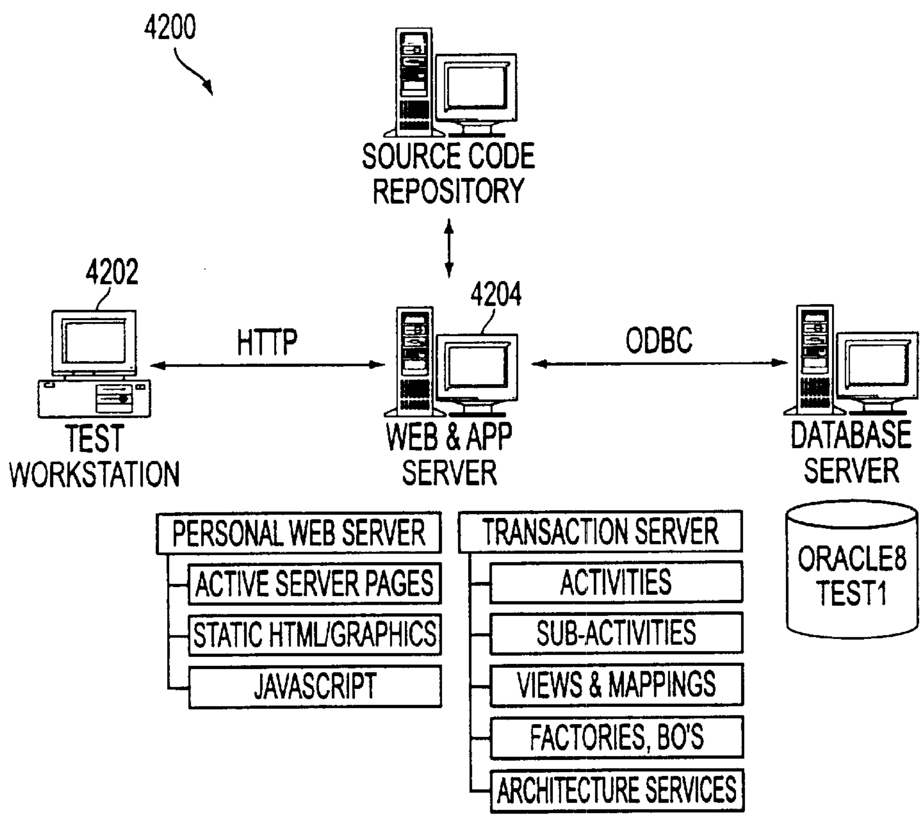
FIG. 42 illustrates the application & architecture configuration for a typical ReTA Build environment according to an embodiment of the present invention.

FIG. 42 illustrates the application & architecture configuration for a typical ReTA Build environment 4200. In this model, the testing workstation 4202 is configured to provide presentation services by way of an HTML 3.2 & JavaScript 1.2 compatible web browser. The web/application server 4204 is configured with the current assembly test versions of ReTA application and architecture components.

Security Management Architecture

Overview

The ReTA Security Management Architecture includes security issues, concerns and recommendations associated with Net-Centric Computing. The Security Management Architecture deliverable is used to illustrate the potential security implications. The ReTA Security Management Architecture portion of the present description is divided into three main portions in order to encompass security requirements for Development, Execution. and Operation Architecture.

Development Architecture Security Management

Figure 43:
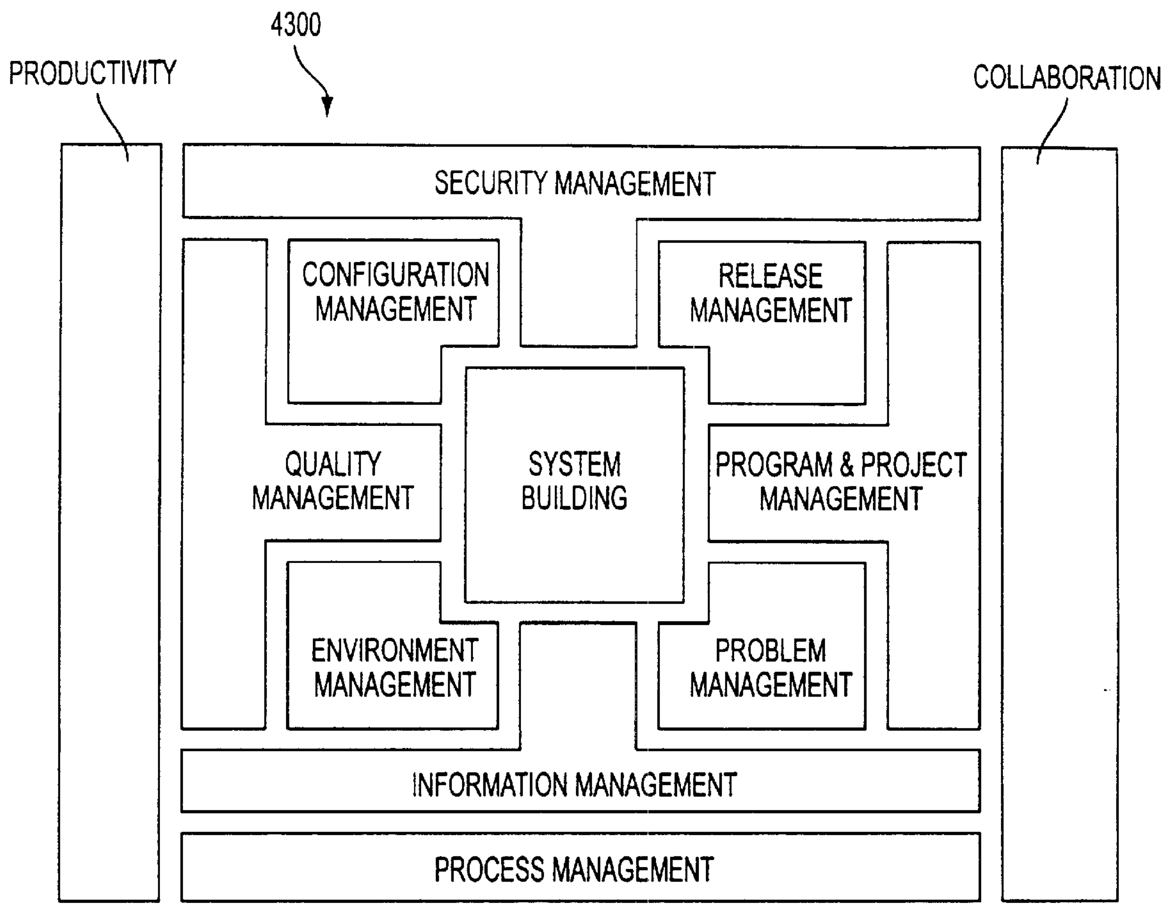
FIG. 43 illustrates an IDEA Framework with components in scope ReTA Phase 1 according to an embodiment of the present invention.

Preserving security of information as it travels across the Internet, or even your own intranet, has become increasingly complex. The Internet is a public resource accessible worldwide, and is built on a foundation of inherently insecure technologies. Information which is available across the Internet is becoming more and more sensitive as business continue to deploy to the Internet. Implementing effective security in our new Net Centric computing environments presents some challenges without a doubt, but not insurmountable ones. By designing security into your Net Centric solution, and implementing the appropriate application, infrastructure, and procedural controls, security can be appropriately aligned with business risk. See FIG. 43, which illustrates an IDEA Framework 4300 with components in scope ReTA Phase 1.

Everyone today is talking about Net Centric security. Keeping up with all of the security issues surrounding Net Centric technologies is more than a full time job, it has become a full time obsession. When designing a Net Centric solution, security is always at the forefront of everyone's mind, but what are the important things to consider? How do I know that I've addressed all the appropriate questions? How may my solution affect the security of my computing environment? How may that security impact my business? This paper may answer these questions, providing an overview of "things to consider" when designing a Net Centric solution. It may not attempt to provide detailed technical solutions, but it may navigate one to the right path to find that information.

Impacts

Security Impacts

There is no question that the trend toward Net Centric computing may impact the traditional computing environment. Systems are much more distributed, and applications are being used by a larger number of people to reach new objectives every day. Along with all of these changes come significant security impacts. So what is it about Net Centric computing that can lead to security problems?

First of all, the Internet is a public resource. Traditionally our computer systems were only used or accessible by a small audience which we knew and could control. Now our computer environment is linked to the Internet, which is accessible to virtually anyone who has the time and the money to invest. While most of these people have good intentions when it comes to using your resources, some have an evil purpose. Threats can come from many sources: teenage hackers, spies from other companies, even curious people who inadvertently cause damage. The public nature of the Internet also increases the ability of these malicious individuals to collaborate and recruit others, thus strengthening their cause. The Internet contains a wide variety of information that people are interested in, from public information resources to sensitive customer databases.

In addition to the very lure of interesting information on the Internet, there are vulnerabilities inherent to Internet technologies which can make that information more easily compromised. In fact, the original intent of the Internet was to share information, not to be used as a business tool. Security weaknesses are widespread and present in nearly all Internet related technologies. The very communication protocol used, TCP/IP, was designed with few provisions to protect the security of the data packet.

Of course, security problems weren't created with the Internet; many of our standalone computer systems have the same types of security exposures. However, the global nature of the Internet now transfers these insecure services rapidly around the world. Weaknesses that before could only have been exploited by a small number of users with access to the system, can now be exploited by virtually anyone. These breaches are also now publicized to the entire Internet community. For example, many high profile web pages have recently been attacked, including NASA, the Department of Justice, and the CIA. Although these attacks were limited to vandalizing their web pages, (as far as we know), the publicity generated from the attacks has raised questions about the security of their systems in general. Internet access not only made these attacks possible, it also publicized the attack around the world.

This rapid transfer of information raises an issue regarding the dynamic nature of today's environment. The Net Centric environment includes traditional long term users of systems, as well as one time users who require instant logons and immediate connections. Security may stand in the way of business objectives if it is not flexible and dynamic enough to adapt to ever-changing business and technology requirements. In addition, new threats and risks evolve quickly in the Net Centric environment, and security programs may become ineffective and obsolete if not reviewed and updated regularly.

The Internet also brings with it a whole new set of legal issues, and topping the list are potential privacy implications. Businesses can now track your every movement on the Internet, from your email and IP addresses, to each site you surfed to and which ad one clicked. Does this constitute an invasion of your privacy? One may have freely given other businesses sensitive information aboutonerself, such as one's credit card number or one's social security number. To what lengths must that business go to in order to protect that information? If and when that information is compromised, who is liable? What is the penalty for breaking into a computer to which one is not granted access? What if one just looks around and does not cause any damage? These questions are just beginning to be addressed as cases are introduced in court and legislation is passed in Congress. But we are a long way from finding all the answers.

All of these security concerns have been widely publicized in the media, to the extent that the public now perceives security as a major issue on the Internet. These concerns may have the effect of impeding the success of an Internet solution, or even delaying a business decision to deploy to the Internet. Even as new technology emerges to solve many Internet related security problems, public opinion, legitimate or not, may still impact the success of any Internet solution.

Application Impacts

There are obviously a myriad of security implications from the move towards Net Centric computing. The Internet, and the growth of local intranets, has made our computing environment look much different today than it did five years ago. So what does this mean? When designing a business solution in this new environment, security implications have to be considered at every step of the process. Application design presents a specific set of security related challenges.

Application Design

The underlying theme in application design, from a security perspective, is to design in security from the beginning. Talk to Information Security representatives, and even internal auditors early on, and get their approval for your design. This can save retrofitting costs in order to achieve an adequate level of security, and may also end up giving one a more secure solution by integrating security right into the design of the application.

Once one is considering security, what is the best way to design it into your application? Even the most pompous security expert should recognize that your primary goal is not to build an application with really good security, it is to build an application that achieves a specific business goal. The challenge is to integrate security into that business goal so that it may not impede efficiency. Often security is tacked on a the last minute and impedes performance in the application, such that users may bypass security if possible, and curse it if not possible.

The next step is to consider the basic parameters of your application and how security applies to each of them.

Who needs access to the application, i.e. what is your user group? Is it all Internet users or some authorized subset? Does one only have one type of user or are multiple levels of authorization required?

Where may your application may be accessed from, the Internet or your intranet? How much control do one has over the security of that location and PC?

What is the confidentiality of the information your application may be transmitting or accessing? What implications would there be if that information fell into the wrong hands?

Once these questions have been answered one can begin to choose the appropriate tools or mechanisms to provide an adequate level of protection.

When designing your application, consider implementing the minimum level of functionality and authority required to meet your business goal. This is often contradictory to basic instinct when designing a new solution, but consider the potential implications. If your application does not need to allow users to execute arbitrary operating system commands, don't let it. If your application does not need to run as root or supervisor, don't let it. Designing for minimum functionality may obviously be a tradeoff between business and security benefits, but in general, it is better meet the level of authority required, not exceed it.

Security Integration

When designing security into your application, remember that one may not have to re-invent the proverbial wheel. Most information security groups may have corporate security strategies with which one can integrate. For example, an enterprise wide authentication scheme may be in use, with which one can integrate for remote access. Or there may be a single sign-on product with which your application may need to be compatible. Even if there is not a corporate security strategy in place today, consider the direction that the company is moving toward, and provide for future integration if possible.

Auditing and Logging

Application auditing and logging is often overlooked because it is less than glamorous, but it does provide security administrators with a crucial tool for monitoring use of an application. Good logs should be searchable for known or suspected patterns of abuse, and should be protected from alteration. Logs can monitor a virtual myriad of data, including access times, user IDs, locations from where the application was accessed, actions the user performed, and whether or not those actions were successfully completed.

Web Browser Security

While web browsers may not be exactly part of your application design, they are intimately related to many of the design decisions one may make, such as the programming tools one uses and the format your user interfaces take. The application programming tools portion of the description, above, discussed some possible ways a Web browser can exploit application security flaws. There are also design anomalies within the Web browsers themselves which can be exploited. Microsoft has fixed many of these flaws in their newest release of Internet Explorer, but their older versions are still vulnerable. This type of problem demonstrates that when considering integration with the major commercial web browsers, it is important to monitor news releases for recent security flaws. One may want to consider requiring your users to use the latest, most secure version of their Web browser if possible.

Infrastructure Impacts

Today's Net Centric computing infrastructure requires a complex mix of operating systems, web servers, database servers, firewalls, management tools, routers, and underlying network components. Each different component of this infrastructure has specific security considerations which need to be addressed. These requirements are always growing and changing, as are the solutions which can be implemented. When designing this complex infrastructure, similar to designing an application, security should be considered early on in the process.

Operating System Security

It is crucial to choose an operating system (OS) which can provide adequate security; and once chosen it is just as important to configure that OS in a secure manner. Any OS must address the same basic security questions, such as restricting permissions for what each user can access, limiting what actions each user can perform, providing monitoring and logging of user access, and restricting what services are available. Windows NT is without exception.

NT has been publicly available for over three years now, and while security issues may have appeared, fresh out of the box NT is a very secure OS. But there are still steps to take to improve this security. Configure your OS securely from the start, implement tools where appropriate, and continue to monitor the bulletin boards and vendor announcements for problems as they come up.

Web Server Security

Many of the OS security guidelines apply to web servers as well. Regardless of your choice of web server, it is important to configure that server securely. The server should be set to run under an ID which is used only by that web server, and never as root. Directory permissions should be assigned according to a need to know philosophy, and your portion of the present description root (where published information is stored) should be different from your server root (where server binaries and configuration files are stored.)

In addition to these somewhat generic operating system security tips, there are several features which are specific to a web server which could create security exposures. In general, if one doesn't need a feature, don't turn it on; and if one does need a feature, make sure the potential security risks are understood. Server side includes allow HTML authors to place commands inside their portion of the present descriptions that cause output to be modified whenever that portion of the present description is accessed by a user. Hackers can take advantage of server side includes if they are able to place arbitrary HTML statements on your server and then execute them.

Legacy System Integration

In order to truly take advantage of the power of Net Centric computing, new technologies need to be mixed and integrated with existing systems. More sophisticated intranets and extranets often require on line transactions or database inquiries of legacy environments which may not have the level of granular control required for secure access. In some cases, it may be possible to mirror the information from an existing platform to a more securable web server or database. This may protect the integrity of your sensitive systems while still providing the access for your on-line transactions. If a mirror system is not possible, a thorough audit should be performed of the security of your legacy system, to ensure that one is providing access to only those resources which are allowed.

Network Security

Now one has chosen your access control mechanisms, configured your OS, and it's time to connect to your network. This action may strike fear into the heart of many network and system administrators, because this may create one more way network security can be compromised. Contrary to popular belief, it is possible to establish and maintain effective network security. The first step is to understand what all of your network components are, and how they are connected. By examining your network topology, one can determine where all of your access points are, and (hopefully) the way that access to them is controlled. If remote access directly into your network is required, the use of your modems must be appropriately restricted.

Don't rely on knowledge of the phone number or a single static password as effective security controls.

In addition to identifying one's access points, one should examine the path that one's traffic follows, and determine if that path is vulnerable to snooping and attack. One of the more infamous hacker gangs, the Masters of Deception, once infiltrated a major telecommunication provider's data network, and had access to the corporate secrets of hundreds of companies as information was sent across the lines. Even if your data is just traveling over internal links, a network management station could still be monitoring traffic, or a sniffer could illicitly be installed anywhere along the line. There are two major security controls that mitigate these risks: firewalls to restrict who can access your secure network, and encryption to protect your data as it's sent over an insecure network.

Firewalls

Firewalls are often thought of as THE answer to network security. There is a common misconception that purchasing and installing the "best" firewall available may automatically protect your network from the Internet. This is not necessarily true. In fact there are many factors to consider when choosing a firewall, and when placing and configuring that firewall in your environment. First of all, consider the type of network connection your are trying to protect. Firewalls are not only used to separate your intranet from the Internet, they can also be used to segregate a particularly sensitive or particularly insecure area of your intranet from the rest of your network. Depending on the services one wants to provide your users and what risk one is willing to accept, your choice of the "best" firewall implementation may change.

There are many different components of the firewall architecture to consider. Packet Filtering Systems selectively route packets between internal and external hosts by either the type of packet, the originating host address, or the target host address. Packet filtering is typically implemented on a specific type of router called a screening router.

Proxy Services are specialized applications or server programs that run on a firewall host, which take users' requests for Internet services (such as ftp and telnet) and forward them, as appropriate according to the site's security policy, to the actual services. The proxies provide replacement connections and act as gateways to the services. For this reason, proxies are sometimes known as Application Level Gateways.

A Bastion Host is typically a dual-homed gateway with one interface on the internal network and one on the external network. It can be used to run proxy services or perform stateful packet inspection. The bastion host typically acts as the main point of contact for incoming connections from the outside world, including email, ftp and telnet requests, and DNS queries about the site.

A Perimeter Network or DMZ refers to a small network between your internal network and the Internet which provides an extra layer of security. Any publicly available resources one provides, such as a Web server or an ftp server, may typically be located in the DMZ, and restricted from one's internal network by a firewall machine or bastion host.

There are many commercially available firewall products that provide some or all of these features. Which product or firewall configuration is right for one may depend on what one's network looks like, what one is trying to protect, and what your users require.

Event Monitoring

Before an incident can be responded to, it must first be detected. In the Net Centric environment, your firewall, routers, web servers, database servers, applications, and network management tools must be monitored to ensure they are working correctly and no violations have occurred. Monitoring packages can be configured to take different actions on a series of specified events, such as sending an email message if a log fills up, flashing an icon on a system. administrator's screen if someone's user ED is disabled, or paging a network administrator if a link to the ISP goes down. Once this initial notification takes place, there should be escalation procedures to decide whom to notify next. For example, if the link to the ISP goes down, how long does one wait before notifying one's manager? one's users? In addition, not all monitoring needs to be reactive. There are proactive monitoring tools available which can detect patterns of abuse or failure which may lead to larger problems, and can help one detect those problems before they affect your users.

Backup and Recovery

People kick over servers, accidentally delete files, and spill coffee on machines. For these reasons and a host of others, Net Centric resources must be backed up in a manner so that they can be recovered. This does not mean dumping a bunch of files onto data tapes and stacking them in a corner of the server room. An effective backup and recovery strategy should address how backups may be taken, the media on which they may be stored, the location where they may be stored, and the frequency with which they may be taken. Backups should also be periodically tested to make sure that they are recoverable, for example to make sure the backup tape drive is still working. When designing your backup strategy one should also consider the specific types of applications, databases, and hardware which are in use in your environment. For example an Oracle database may probably not be recoverable from a .tar file. In addition to software resources, consider what would happen if your router or your ISP link were to go down. It may be necessary to maintain a backup link to a secondary service provider in the event that your ISP goes down for an extended period of time.

Execution Architecture Security Management

Figure 44:
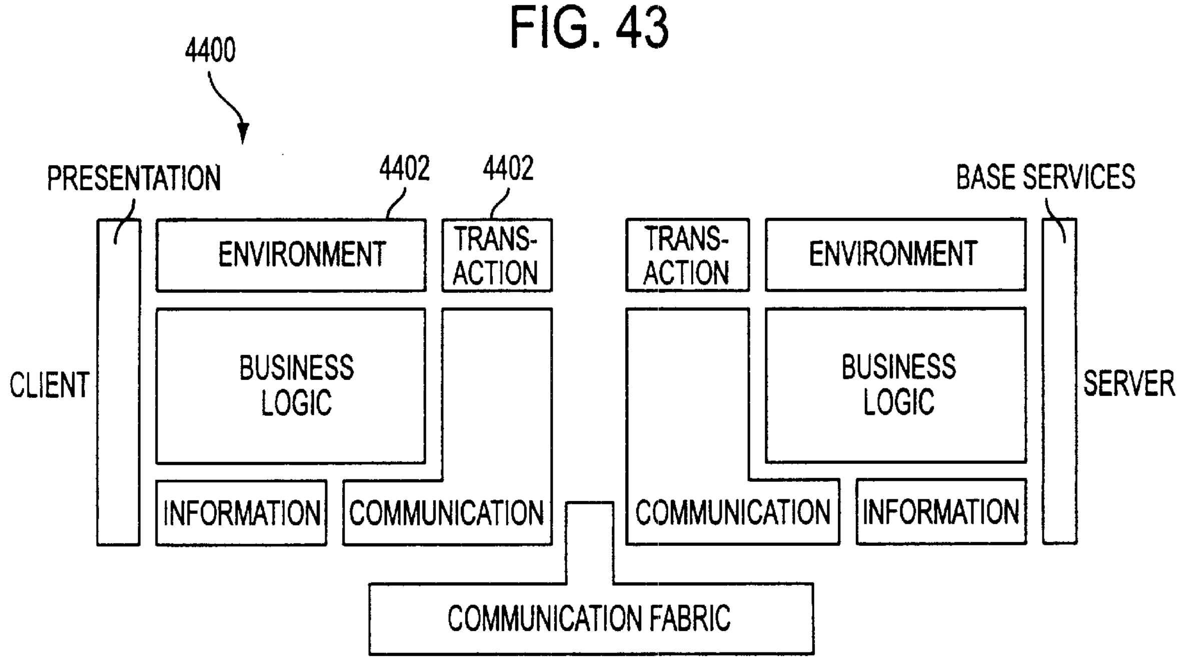
FIG. 44 illustrates a NCAF Framework with the shaded components in scope for Phase 1 according to an embodiment of the present invention.

The Execution Architecture Security focuses on Authorization, Encryption and Authentication in order to securely support applications and ensure data integrity throughout the life cycle of a single transaction. The ReTA Effort chose the Netcentric Architecture Framework (NCAF) to identify the appropriate components to focus on within the Execution Architecture. See FIG. 44 which illustrates a NCAF Framework 4400 with the shaded components 4402 in scope for Phase 1.

Authentication

Regardless of the operating system that one is using, access control is a major security concern. NT authenticate users by their knowledge of an ID and password that can be used multiple times however, all passwords are vulnerable in some manner. The advent of sniffing technologies allows passwords to be monitored and read over the network. Even if passwords are encrypted as they are sent, a keystroke capturing program could be installed at the client PC and used to capture passwords before they are encrypted. Perhaps advanced client side security can mitigate this threat as well, but even with the highest technology solution, a user could write his password down and stick it to the side of his PC, thereby defeating all of the technology just implemented.

The solution to this problem is some type of two factor authentication, meaning that users are authenticated with something they have, and something they know. The something they know"can still be a password, and the "something they have" can range from the high end being a one time password generator, to the low end being an ID file stored on the user's PC or on a disk. In choosing an appropriate solution, one should consider ease of management and ease of distribution, the required strength of the solution, and integration into your environment. There are several examples of technologies which can meet your requirements, including the use of one-time passwords, time based passwords, or challenge response schemes. Once chosen and implemented, a secure authentication mechanism can be incorporated with both your operating system and your application to remove the risks associated with static passwords. Some authorization options are depicted in this Authentication Matrix:

| Product | Description | Pros | Cons | Implementation | Vendors |
|---|---|---|---|---|---|
| Smartcards | The smart card is a plastic card having the size and shape of a credit card, and containing a microprocessor chip with both secure storage of public/private key data and cryptographic processing capabilities | Strong Authentication Login from various locations Scalability | Additional Hardware No Standard Slow Acceptance | 4–6 people weeks | WetStone Schumberger SmartCard Technologies |
| PKI | The system required to provide public-key encryption and digital signature services. The purpose of a public-key infrastructure is to manage keys and certificates. A PKI enables the use of encryption and digital signature services across a wide variety of applications. | Strong Authentication Enables the use of encryption and digital signature services across a wide variety of applications | Requires infrastructure to operate Certificate Management Services | 4–24 people weeks | GTE Cybertrust VeriSign Entrust |
| Hard Token | A hard token is a physical device that acts as "something a user has". The end-user then supplies "something the user knows", namely a personal identification number or PIN. The combination of the token and the PIN, along with the user's public username, provides strong two factor authentication of the user. | Strong Authentication Versatility Login from various locations | Increased Cost | 4–8 weeks depending on API config. | Enigma Logic Security Dynamics Vasco |
| Soft Token | A soft token is a software device that creates a unique one- | Provides a significantly higher level of | Users limited to log on from one computing | 3–6 weeks depending | Axent Defender Security |

-continued

| Product | Description | Pros | Cons | Implementation | Vendors |
|---|---|---|---|---|---|
| | time password that cannot be guessed, shared, or cracked. The end-user then supplies a personal identification number or PIN. The combination of the one-time password and the PIN, along with the user's public username, provides two factor authentication of the user. | security than the reusable password | location More easily compromised than hard token | on API config. | Dynamics |
| ID/ Password | A method of authenticating a user by which a user provides a unique identifier and a shared secret. | Easy implementation | Password Intensive | Native to Applet | |

Encryption

In Net Centric computing it is likely that eventually your data may pass through a network that is not secure, where your data can be snooped or even changed. In order to guarantee confidentiality over any insecure network, including the Internet, some type of encryption must be used. Encryption may ensure that data cannot be read by anyone other than the secure target server, and that the data being transferred has not been altered. Today there are so many different strategies for implementing encryption, it is often difficult to choose which scheme is most appropriate. The specific encryption strategy chosen may rely on a number of factors.

What information exactly needs to be encrypted? If one is running a smart store over the Internet, maybe one only needs to encrypt the single piece of data that has the customer's credit card information. If one is allowing their system administrators to dial into their network via the Internet, one may probably want to encrypt the whole session.

How many users are there? If one want to just encrypt data between a few users and one's system, a private or secret key encryption scheme may be appropriate. If one is in a multi-user environment one may probably want to consider public key encryption, and the key management strategies that go along with it.

What does one's computing environment look like? If your applications or operating systems provide native encryption, these may be the easiest and most secure to implement.

Based on your answers to these questions, there are a number on encryption solutions available for implementation. If one is running a Netscape web server, one may want to consider Secure Sockets Layer, or SSL, which provides data encryption, server authentication, message integrity, and optional client authentication for a TCP/IP connection. Another WWW security solution is Secure Hypertext Transfer Protocol (S-HTTP), which is a security-enhanced version of HTTP, developed by Enterprise Integration Technologies (EIT). S-HTTP supports end-to-end secure transactions by incorporating cryptographic enhancements to messaging at the application level. Pretty Good Privacy, or PGP, is a common encryption solution for electronic mail.

PGP may both authenticate the sender of the message, and encrypt the contents of the message through the use of a public key/private key pair. In electronic commerce solutions, the Secure Electronic Transactions (SET) specification which is being jointly developed by Visa and MasterCard may be considered. SET may require authentication of all parties involved with a credit card transaction through the use of digital signatures and certificates, and may use a separate encryption handshake in order to guarantee both confidentiality and integrity. Other encryption solutions include Point to Point Tunneling Protocol (PPTP), Private Communication Protocol (PCT), or the use of CryptoAPI. Some available encryption options are depicted in the following Encryption Matrix:

| Product | Description | Pros | Cons | Implementation | Vendors |
|---|---|---|---|---|---|
| Virtual Private Network | A secure, end-to-end connection is established through encryption in an application-independent channel. Encryption services can be computationally expensive and | Application-independent channel Best suited for static business relationships Does not require any additional software for enterprise users | High implementation cost Requires software for remote users | 1–4 people weeks. | Axent Raptor Firewall VPN and Power VPN Checkpoint VPN V-one SmartGate, |

-continued

| Product | Description | Pros | Cons | Implementation | Vendors |
|---|---|---|---|---|---|
| | degrade performance. Hardware based encryption services usually provide increased performance over software based encryption. | | | | |
| Protocol Specific VPN | A secure, end-to-end connection is established through encryption for a specific protocol. | Reduced cost over traditional VPN Reduced implementation time compared to traditional VPN | Application dependent channel | 2–8 people weeks | WorldTalk's WorldSecure |
| Hardware Encryption | Performs cryptographic processing features on a dedicated hardware device. | Increased security and performance over software encryption | Increased cost over software encryption | 1–3 people weeks | Atalla SignMaster Cylink CryptoServer Timestep PERMIT/Gate |
| Secure Sockets Layer | SSL is a security protocol that prevents eavesdropping, tampering, or message forgery over the Internet. | Open standard Low implementation cost Strong take-up in the U.S. vs. SET | Early implementations have security vulnerabilities | Native to web components) | |
| PKI | The system required to provide public-key encryption and digital signature services. The purpose of a public-key infrastructure is to manage keys and certificates. A PKI enables the use of encryption, digital signatures, and authentication services across a wide variety of applications. | Provides security infrastructure for multiple applications Provides authentication in addition to encryption | Expensive to implement Requires ongoing key management activities | 4–24 people week | GTE Cybertrust VeriSign Entrust |
| Symmetric Key Encryption Infrastructure | The system required to provide symmetric key encryption and authentication services. Similar to kerberos, this system may provide a central repository for encryption and authentication services across multiple applications and computing platforms. | Increased performance over public key encryption Toolkits can be used to integrate security technology into applications | Authentication is not tied uniquely to one individual Private information is stored in a central database native in applications limited to WIN95/NT | (solution not implemented) | TriStrata Portion of the present description Security System |

Authorization

When a user requests access to network resources, the Authorization service determines if the user has the appropriate permissions and either allows or disallows the access. (This occurs after the user has been properly authenticated.)

The following are examples of ways to implement Authorization services:

Network Operating Systems—Authorization services are bundled with all network operating systems in order to control user access to network resources.

Servers, Applications, and Databases—Authorization can occur locally on a server to limit access to specific system resources or files. Applications and databases can also authorize users for specific levels of access within their control. (This functionality is within the Environment Services grouping in the execution architecture.)

Firewall Services protect sensitive resources and information attached to an Intxxnet network from unauthorized access by enforcing an access control policy.

Recommendation

ReTA may utilize all Windows NT-based resources, including those accessed using a Web browser, are represented as objects that can be accessed only by authorized Windows NT-based users. Access may be controlled through an Access Control List (ACL).

Operations Architecture Security Management

The Operations Architecture is a combination of tools, support services, procedures, and controls required to keep a production system up and running efficiently. Unlike the Execution and Development Architectures, its primary users are the system administrators and the production support personnel.

Figure 45:
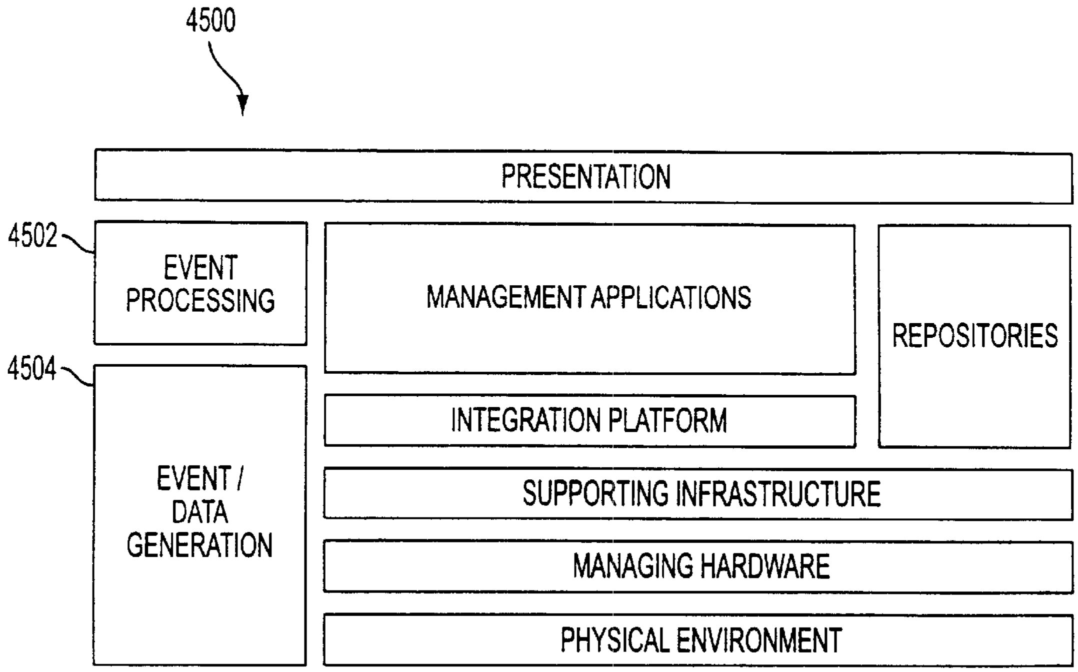
FIG. 45 illustrates a MODEnc Framework according to an embodiment of the present invention.

All components of the Operations Architecture are integral to the successful management of a distributed environment. Any processes, procedures, or tools developed or chosen as an operational management solution for a specific operational area must be able to integrate with any existing or planned process, procedure, tool solutions for other Operations Architecture areas. See FIG. 45 which illustrates a MODEnc Framework 4500 with an event processing component 4502 and an event and data generation component 4504.

Execution Architecture Design

Overview

The Netcentric Architecture Framework (NCAF) identifies the run-time services required by Netcentric applications. The ReTA design effort used this framework to define the ReTA Execution Architecture requirements. Taken in the NCAF context, this portion of the present description describes the ReTA Execution Architecture implementation (through custom and/or vendor components) of the required run-time services.

Figure 46:
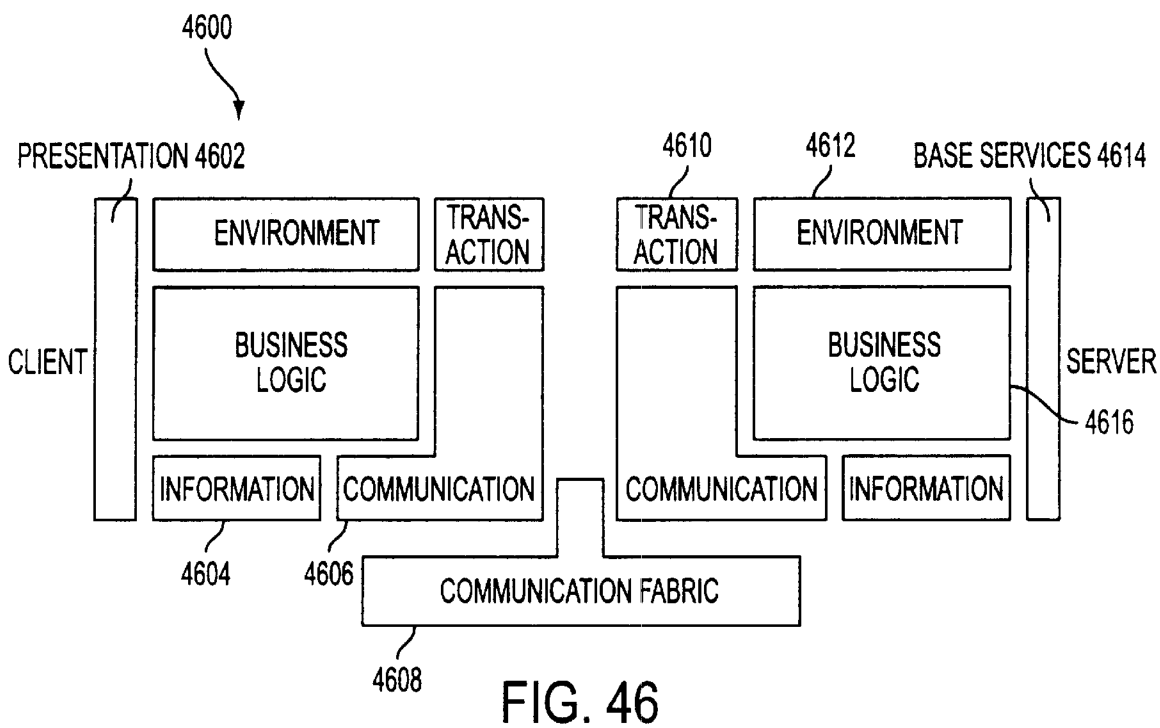
FIG. 46 illustrates a NCAF Framework according to an embodiment of the present invention.

The NCAF categorizes the runtime services into the following logical areas (see FIG. 46 which illustrates the NCAF Framework 4600):

- Presentation Services 4602
- Information Services 4604
- Communication Services 4606
- Communication Fabric Services 4608
- Transaction Services 4610
- Environment Services 4612
- Base Services 4614
- Business Logic 4616

Execution Architecture Component Design

Purpose

The Execution Architecture Component Design portion of the description describes the ReTA implementation of the NCAF defined run-time services. This portion of the description also maps the ReTA application architecture frameworks into the appropriate NCAF service component descriptions.

The ReTA Application Architecture comprises the following frameworks:

| Framework | Services |
|---|---|
| Session | Security |
| | User identification |
| | Page access authorization - Session scope |
| | Automatic abort - timeout |
| | Customized information delivery |
| | Customized user interface |
| | Customized application access |
| | Manage user session |
| | Inform user on session status |
| | Abort session |
| | Flow control |
| | Page to open on action |
| | Pages of activity |
| | Maintain context |
| | Activity context |
| | Business Object context - shared among activities |
| | Message Broadcast |
| | Register listener |
| | Broadcast Message to registered listeners |
| | Encryption |
| | Encode Database User Name and Password |
| | Decode Database User Name and Password |
| Activity | Provide a logical unit of work |
| | Microsoft Transaction Server transaction principles |
| | Maintain context |
| | Business Object context |
| | UI context - List boxes |
| | Sub-activity context |
| | Security |
| | Page access authorization - Activity scope |
| | Validation |
| | Pre-conditions |
| | Post-conditions |
| | Sub-Activity - Smallest grained business logic |
| | Execute business logic |
| | View - mapping between a user interface and a business object |
| | Capture user entry |
| | Display value entered |
| Persistence | Database Connection |
| | Uncouple database connection from application |
| | Database mapping |
| | Map an object to a database table |
| | Object query |
| | Trigger queries on objects |
| | Easily iterate through the results |
| | Record locking |
| | Optimistic locking |
| | Pessimistic locking |
| Event Handler | Register event |
| | Create event |
| | Maintain event reference |
| | Process event |
| | Information |
| | Warning |
| | Logical Unit of Work |
| | Fatal |
| | Display events |
| | Translate event |
| | Inform user |
| | Persist event |
| | Log event to database |
| User Interface | Generate UI Items |
| | Form |
| | Push Button |
| | Text Box (single-line entry field) |
| | Text Area (multi-line entry field) |
| | Radio Button group |
| | Check Box |
| | Drop Down List Box |
| | Blank Item |
| | Static Table |
| | Single-Select List Box |
| | Generate UI actions |

-continued

| Framework | Services |
| --- | --- |
| | JavaScript - action shell |
| | JavaScript - data type validation |
| | JavaScript - data range validation |
| | JavaScript - automatic navigation action |
| | Generate Page Format |
| | Cascading Style Sheet |
| | Form (grid layout for form elements) |
| Codes Table | Retrieve from Codes Table |
| | Retrieve single decode value |
| | Retrieve all decode values |
| | Maintain Codes Table |
| | Update single Code/Decode |
| | Update all Codes/Decodes |
| | Set Table Name |
| | Add new Code/Decode |
| | Remove Code/Decode |
| | Add Table |
| | Remove Table |

Base Services

Base Services provide server-based support for delivering applications to a wide variety of users over the Internet, intranet, and extranet.

Web Server Services

Description

Enables organizations to manage and publish information and deploy Netcentric applications over the Internet and Intranet environments. These services support the following: managing portion of the present descriptions in multiple formats, handling of client requests for HTML pages, processing server-side scripts, and caching web pages to improve performance.

ReTA implementation

ReTA implements web server services through Microsoft's Internet Information Server 4.0 (IIS). IIS provides the following services:

Process requests for static and dynamic web pages and graphics.

Implement appropriate security and authentication to public and private areas of a web site.

Execute application specific Active Server Pages.

Implement web activity tracking and reporting.

Implement application state and management capability.

ReTA uses the IIS Session object to hold references to architecture and application components during the user session.

Communication Services

Network services provided by the Communications Services layer are grouped into four major categories of functionality: Virtual Resource, Directory, Messaging, and Security services. The Virtual Resources Component is not implemented by ReTA Phase 1.

Directory Services

A full-featured Directory Service organizes, categorizes and names networked resources in order to provide a comprehensive picture of clients, servers, users, applications and other resources. The service typically includes a database of objects, representing all nodes and resources on a network. The database manages relationships between users and networks, network devices, network applications, and information on the network. The Directory service performs the following functions:

Stores information about network resources and users and tracks relationships

Organizes resource access information in order to aid resources in locating and accessing other resources throughout the network Provides location transparency, since resources are accessed through a directory rather than based on their physical location Converts between logical resource names and physical resource addresses Interacts with Security services such as authentication and authorization track identities and permissions Provides single network logon to file and print resources; can provide single network logon for network applications that are integrated with the Directory service Distributes directory information throughout the enterprise (for reliability and location-independent access)

Synchronizes multiple directory databases

Enables access to heterogeneous systems (integration of various network operating systems, platforms, etc.)

Domain Services

Description

A network domain is a set of network nodes under common control (i.e., common security and logins, unified addressing, coordinated management, etc.). Domain services manage these types of activities for the network nodes in a domain. Domain services may be limited in their ability to support heterogeneous systems and in the ability to scale to support the enterprise.

ReTA implementation

ReTA implements domain services through Microsoft's NT 4.0 Server.

Name Services

Description

The Name service creates a logical "pronounceable" name in place of a binary machine number. These services could be used by other communications services such as File Transfer, Message Services, and Terminal Services. A Name service can be implemented on its own, or as part of a full-featured Directory service.

ReTA implementation

ReTA implements name services through Microsoft's NT 4.0 Server.

Messaging Services (Core)

Broadly defined, Messaging services enable information or commands to be sent between two or more recipients. Recipients may be computers, people, or processes within a computer. Core Messaging services are categorized by the characteristics of the information being transferred:

File Transfer

RPC

Message-Oriented Middleware—Not in scope for ReTA Phase 1

Streaming—Not in scope for ReTA Phase 1

File Transfer

Description

File Transfer services enable the sending and receiving of files or other large blocks of data between two resources. In addition to basic file transport, features for security, guaranteed delivery, sending and tracking sets of files, and error logging may be needed if a more robust file transfer architecture is required.

ReTA implementation

ReTA implements file transfer services through Microsoft's Internet Information Server 4.0 (IIS) using the HyperText Transfer Protocol (HTTP). Within a Web-based environment, Web servers transfer HTML pages to clients using HTTP. HTTP can be thought of as a lightweight file transfer protocol optimized for transferring small files. HTTP reduces the inefficiencies of the FTP protocol. HTTP runs on top of TCP/IP and was developed specifically for the transmission of hypertext between client and server.

RPC (Remote Procedure Calls)

Description

RPCs (Remote Procedure Calls) are a type of protocol by which an application sends a request to a remote system to execute a designated procedure using the supplied arguments and return the result. RPCs emulate the function call mechanisms found in procedural languages. This means that control is passed from the main logic of a program to the called function, with control returning to the main program once the called function completes its task.

ReTA Implementation

ReTA implements RPC services through Microsoft's COM/DCOM mechanism and the Internet Information Server 4.0 (US) using HTTP.

Messaging Services (Specialized)

Specialized Messaging services extend the Core Messaging services to provide additional functionality, including:

Provides messaging among specialized systems by drawing upon basic messaging capabilities Defines specialized message layouts Defines specialized inter-system protocols.

Suggests ways in which messaging draws upon directory and security services in order to deliver a complete messaging environment Database Access Description Database Messaging services (also known as Database Access Middleware) provide connectivity for clients to access databases throughout the enterprise. Database messaging software draws upon basic inter-process messaging capabilities (e.g., RPCs) in order to support database connectivity.

ReTA Implementation

ReTA implements Database Messaging services through Microsoft's Open Database Connectivity (ODBC) mechanism. ReTA abstracts database connection from the application developer through the Microsoft Transaction Server (MTS) 2.0 connection pooling mechanism.

Object Messaging

Description

Object Messaging enables objects to transparently make requests of and receive responses from other objects located locally or remotely. Objects communicate through an Object Request Broker (ORB). An ORB enables client objects to access server objects either locally or remotely over a network and invoke operations (i.e. functions and methods) on them. ORBs typically provide interoperability between heterogeneous client and server environments: across languages and/or operating systems and/or network protocols.

ReTA Implementation

ReTA implements Object Messaging services through Microsoft's COM/DCOM mechanism.

Security Services

Communications Security services control access to network-attached resources. Combining network Security services with security services in other parts of the system architecture (e.g., application and database layers) results in robust security.

Authentication

Description

Authentication services verify network access requests by validating that users are who they claim to be. For secure systems, one or more authentication mechanisms can be used to validate authorized users and to verify to which functions and data they have access.

ReTa Implementation

ReTA implements Authentication services through Microsoft's NT 4.0 Server (and IIS).

Authorization

Description

Authorization services determine if users have appropriate permissions and either allows or disallows the access.

ReTa Implementation

ReTA implements Authorization services through Microsoft's NT 4.0 Server (and IIS). ReTA also supports application defined "required workflow sequence" web page access authorization through the ReTA Session framework.

Encryption

Description

Encryption services encrypt data prior to network transfer to prevent unauthorized interception. Encryption has two main components: the encryption algorithm, which is the series of steps that is performed to transform the original data; and the key, which is used by the algorithm in some way to encrypt the message. Typically, the algorithm is widely known, while the key is kept secret. There are several types of encryption in use today, including:

Secret key cryptography—uses one key (the secret key) both to encrypt the message on one side and to decrypt the message on the other side.

Public key cryptography—uses two keys, the public key and the private key. The public key and private key are mathematically related so that a message encrypted with the recipient's public key may be decrypted with the recipient's private key.

Therefore, the public key can be widely published, while the private key is kept secret.

ReTa Implementation

ReTA implements Encryption services through the Secure Sockets Layer (SSL) mechanism. ReTA also implements encryption for the User ID and User Password used by the ODBC mechanism through the ReTA Session framework.

Environment Services

Environment Services provide miscellaneous application and system level services that do not deal directly with managing the user-interface, communicating to other programs, or accessing data. Sub-components covered during the Phase 1 of ReTA include: Application Services, Component Framework, Operating System, Runtime Services, and System Services.

Application Services

Application Services are miscellaneous services which applications can use for common functions. These common functions can apply to one application or can be used across applications. They include: Application Security Services, Error Handling/Logging Services, State Management Services, Help Services, and Other Common Services.

Application Security

Description

Besides system level security such as logging into the network, there are additional security services associated with specific applications. These include:

User Access Services—set of common functions that limit application access to specific users within a company or external customers.

Data Access Services—set of common functions that limit access to specific data within an application to specific users or user types (e.g., secretary, manager).

Function Access Services—set of common functions that limit access to specific functions within an application to specific users or user types (e.g., secretary, manager).

ReTa Implementation

ReTA implements Application Security through the ReTA Session and Activity frameworks. The Session framework provides "Session level Page access authorization", "User identification" and "session timeout" services. The Activity framework provides "Activity level Page access authorization".

Codes Table Services

Description

Codes Table Services enable applications to utilize externally stored parameters and validation rules. For example, an application may be designed to retrieve the tax rate for the State of Illinois. When the user enters "Illinois" on the screen, the application first validates the user's entry by checking for its existence on the "State Tax Table", and then retrieves the tax rate for Illinois. Note that codes tables provide an additional degree of flexibility. If the tax rates changes, the data simply needs to be updated; no application logic needs to be modified.

ReTA Implementation

ReTA implements Codes Table Services through the ReTA Codes Table framework.

Error Handling/Logging

Description

Error Handling Services support the handling of fatal and non-fatal hardware and software errors for an application. An error handling architecture takes care of presenting the user with an understandable explanation of what has happened and coordinating with other services to ensure that transactions and data are restored to a consistent state.

Logging Services support the logging of informational, error, and warning messages. Logging Services record application and user activities in enough detail to satisfy any audit trail requirements or to assist the systems support team in recreating the sequence of events that led to an error.

ReTA Implementation

ReTA implements Error Handling/Logging Services through the ReTA Event Handler and Persistence frameworks.

Other Common Services

Description

Catchall category for additional reusable routines useful across a set of applications (e.g., Date Routines, Time Zone Conversions, Field Validation Routines).

ReTa Implementation

ReTA implements client side Field Validation Services through the ReTA UI framework.

State Management

Description

State Management Services enable information to be passed or shared among windows and/or Web pages and/or across programs. In Netcentric environments, the HTTP protocol creates a potential need for implementing some form of Context Management Services (storing state information on the server). The HTTP protocol is a stateless protocol. Every connection is negotiated from scratch, not just at the page level but for every element on the page. The server does not maintain a session connection with the client nor save any information between client exchanges (i.e., web page submits or requests). Each HTTP exchange is a completely independent event. Therefore, information entered into one HTML form must be saved by the associated server application somewhere where it can be accessed by subsequent programs in a conversation.

ReTA Implementation

ReTA implements State Management Services through Microsoft's IIS Session component and the ReTA Session, Activity and UI frameworks.

Component Framework

Description

Component Framework Services provide an infrastructure for building components so that they can communicate within an application and across applications, on the same machine or on multiple machines across a network, to work together. COM/DCOM and CORBA described in Communication Services are the two leading component industry standards. These standards define how components should be built and how they should communicate.

Object Request Broker (ORB) services, based on COM/DCOM and CORBA, focus on how components communicate. Component Framework Services, also based on CORBA and COMIDCOM, focus on how components should be built.

ReTA Implementation

ReTA implements Component Framework Services through the ReTA Activity framework.

Operating System

Description

Operating System Services are the underlying services such as multi-tasking, paging, memory allocation, etc., typically provided by today's modern operating systems. Where necessary, an additional layer or Application Programming Interface (API) may be provided to gain either operating system independence or a higher level of abstraction for application programmers.

ReTA Implementation

ReTA implements Operating System Services through the NT 4.0 operating system.

Runtime Services

Runtime services convert non-compiled computer languages into machine code during the execution of a program. They include: Language Interpreter Service and Virtual Machine Service.

Language Interpreter

Description

Language Interpreter Services decompose a 4th generation and/or a scripting languages into machine code (executable code) at runtime.

ReTA Implementation

ReTA implements Language Interpreter Services through NT server 4.0 and IIS 4.0.

Virtual Machine

Description

Typically, a Virtual Machine is implemented in software on top of an operating system, and is used to run applications. The Virtual Machine provides a layer of abstraction between the applications and the underlying operating system and is often used to support operating system independence.

ReTA Implementation

ReTA implements Virtual Machine Services through NT 4.0 Virtual Machine component.

System Services

Services which applications can use to perform system-level functions. These services include: System Security Services, Profile Management Services, Task and Memory Management Services, and Environment Verification Services.

Environment Verification

Description

Environment Verification Services ensure functionality by monitoring, identifying and validating environment integrity prior and during program execution. (e.g., free disk space, monitor resolution, correct version). These services are invoked when an application begins processing or when a component is called. Applications can use these services to verify that the correct versions of required Execution Architecture components and other application components are available.

Profile Management

Description

Profile Management Services are used to access and update local or remote system, user, or application profiles. User profiles, for example, can be used to store a variety of information such as the user's language and color preferences to basic job function information which may be used by Integrated Performance Support or Workflow Services.

ReTA Implementation

ReTA implements Profile Management Services through ReTA Session framework.

System Security

Description

System Security Services allow applications to interact with the operating system's native security mechanism. The basic services include the ability to login, logoff, authenticate to the operating system, and enforce access control to system resources and executables.

Task & Memory Management

Description

Task & Memory Management Services allow applications and/or other events to control individual computer tasks or processes, and manage memory. They provide services for scheduling, starting, stopping, and restarting both client and server tasks (e.g., software agents).

ReTa Implementation

ReTA implements Task & Memory Management Services through MTS 2.0.

Information Services

Information Services manage electronic data assets and enable applications to access and manipulate data stored locally or remotely in portion of the present descriptions or databases. They minimize an application's dependence on the physical storage and location within the network. Information Services can be grouped into two categories: Database Services, and Portion of the present description Services. Portion of the present description Services may not be covered during ReTA Phase 1.

Database Services

Database Services are responsible for providing access to a local or a remote database, maintaining integrity of the data within the database and supporting the ability to store data on either a single physical platform, or in some cases across multiple platforms. Database Services include: Access Services, Indexing Services and Security Services.

Access

Description

Access Services enable an application to retrieve data from a database as well as manipulate (insert, update, delete) data in a database. This can be done through the following:

Standards Based Structured Query Language (SQL) API

SQL Gateways

Distributed Relational Data Access (DRDA)

ReTa Implementation

ReTA implements Database Access Services through the ReTA Persistence framework, which utilizes the Standards Based SQL API approach through ODBC.

Indexing

Description

Indexing Services provide a mechanism for speeding up data retrieval. In relational databases one or more fields can be used to construct the index. So when a user searches for a specific record, rather than scanning the whole table sequentially the index is used to find the location of that record faster.

ReTa Implementation

ReTA implements Database Indexing Services through the Database Management System (either Oracle or SQL Server).

Security

Description

Security Services enforce access control to ensure that records are only visible or editable by authorized people for approved purposes. Most database management systems provide access control at the database, table, or row level as well as concurrency control.

ReTA Implementation

ReTA implements Database Security Services through the Database Management System (either Oracle or SQL Server).

Presentation Services

Presentation Services enable an application to manage the human-computer interface. This includes capturing user actions and generating resulting events, presenting data to the user, and assisting in the management of the dialog flow of processing. Typically, Presentation Services are only required by client workstations. Sub-components covered during the Phase 1 of ReTA include: Window System, Desktop Manager, Form, Web Browser, Report & Print, and Direct Manipulation.

Desktop Manager

Description

Desktop Manager emulates the idea of a physical desktop allowing one to place portion of the present descriptions on the desktop, launch applications by clicking on a graphical icon, or discard files by dragging them onto a picture of a waste basket.

ReTa Implementation

ReTA implements Desktop Manager Services through the NT 4.0 operating system.

Direct Manipulation

Description

Direct Manipulation Services enable applications to provide a direct manipulation interface (often called "drag & drop").

ReTa Implementation

ReTA implements Desktop Manager Services through the NT 4.0 operating system.

Form

Description

Form Services enable applications to use fields to display and collect data. Form Services provide support for: Display, Mapping Support, and Field Interaction Management.

ReTa Implementation

ReTA implements Form Services through the NT 4.0 operating system.

Report & Print

Description

Report and Print Services support the creation and on-screen previewing of paper or photographic portion of the present descriptions which contain screen data, application data, graphics or images.

ReTa Implementation

ReTA implements Report and Print Services through the NT 4.0 operating system.

Web Browser

Web Browser Services allow users to view and interact with applications and portion of the present descriptions made up of varying data types, such as text, graphics, and audio. These services also provide support for navigation within and across portion of the present descriptions no matter where they are located, through the use of links embedded into the portion of the present description content. Web Browser Services retain the link connection, i.e., portion of the present description physical location, and mask the complexities of that connection from the user. Web Browser services can be further subdivided into: Browser Extension, Form, and User Navigation.

Browser Extension

Description

Browser Extension Services provide support for executing different types of applications from within a Browser. These applications provide functionality that extend Browser capabilities. The key Browser Extensions are:

Plug-in—a plug-in is a software program that is specifically written to be executed within a browser for the purpose of providing additional functionality that is not natively supported by the browser, such as viewing and playing unique data or media types.

Helper Application/Viewer—is a software program that is launched from a browser for the purpose of providing additional functionality to the browser.

ActiveX control—is also a program that can be run within a browser, from an application independent of a browser, or on its own.

ReTa Implementation

ReTA supports Browser Extensions through Netscape Navigator and Internet Explorer.

Form

Description

Like Form Services outside the Web Browser, Form Services within the Web Browser enable applications to use fields to display and collect data. The only difference is the technology used to develop the Forms. The most common type of Forms within a browser are Hypertext Markup Language (HTML) Forms. The HTML standard includes tags for informing a compliant browser that the bracketed information is to be displayed as an editable field, a radio button, or other form-type control. Currently, HTML browsers support only the most rudimentary forms—basically providing the presentation and collection of data without validation or mapping support. When implementing Forms with HTML, additional services may be required such as client side scripting (e.g., VB Script, JavaScript).

ReTa Implementation

ReTA implements Form Services through the NT 4.0 operating system, Internet Explorer 4.0 and Netscape Navigator 4.0. ReTA supports creating the form objects and the JavaScripts used by the browsers with the ReTA UI framework.

User Navigation

Description

User Navigation Services within the Web Browser provide a user with a way to access or navigate between functions within or across applications. These User Navigation Services can be subdivided into three categories:

Hyperlink—the hyperlink mechanism is not constrained to a menu, but can be used anywhere within a page or portion of the present description to provide the user with navigation options.

Customized Menu—a menu bar with associated pull-down menus or context-sensitive pop-up menus.

Virtual Reality—A virtual reality or a virtual environment interface takes the idea of an image map to the next level by creating a 3-dimensional (3-D) environment for the user to walk around in.

ReTa Implementation

ReTA implements the Hyperlink functionality of web browser Navigation Services through the ReTA UI framework.

Window System

Description

Typically part of the operating system, the Window System Services provide the base functionality for creating and managing a graphical user interface (GUI)—detecting user actions, managing windows on the display, and displaying information in windows.

ReTa Implementation

ReTA implements Window System Services through the NT 4.0 operating system.

Transaction Services

A transaction is a unit of work that has the following (ACID) characteristics:

A transaction is atomic; if interrupted by failure, all effects are undone (rolled back).

A transaction produces consistent results; the effects of a transaction preserve invariant properties.

A transaction is isolated; its intermediate states are not visible to other transactions.

Transactions appear to execute serially, even if they are performed concurrently.

A transaction is durable; the effects of a completed transaction are persistent; they are never lost (except in a catastrophic failure).

A transaction can be terminated in one of two ways: the transaction is either committed or rolled back. When a transaction is committed, all changes made by the associated requests are made permanent. When a transaction is rolled back, all changes made by the associated requests are undone.

Transaction Services provide the transaction integrity mechanism for the application. This allows all data activities within a single business event to be grouped as a single, logical unit of work.

Transaction Monitor

Description

The Transaction Monitor Services are the primary interface through which applications invoke Transaction Services and receive status and error information. Transaction Monitor Services, in conjunction with Information Access and Communication Services provide for load balancing across processors or machines and location transparency for distributed transaction processing.

ReTa Implementation

ReTA implements Transaction Monitor Services through MTS 2.0. ReTA uses the Activity framework to define a transaction.

Resource Management

Description

A Resource Manager provides for concurrency control and integrity for a singular data resource (e.g., a database or a file system). Integrity is guaranteed by ensuring that an update is completed correctly and entirely or not at all. Resource Management Services use locking, commit, and rollback services, and are integrated with Transaction Management Services.

ReTa Implementation

ReTA implements Resource Manager Services through MTS 2.0.

Transaction Management

Description

Transaction Management Services coordinate transactions across one or more resource managers either on a single machine or multiple machines within the network. Transaction Management Services ensure that all resources for a transaction are updated, or in the case of an update failure on any one resource, all updates are rolled back.

ReTa Implementation

ReTA implements Transaction Management Services through Microsoft's Distributed Transaction Manager and MTS 2.0.

Transaction Partitioning

Description

Transaction Partitioning Services provide support for mapping a single logical transaction in an application into the required multiple physical transactions. For example, in a package or legacy rich environment, the single logical transaction of changing a customer address may require the partitioning and coordination of several physical transactions to multiple application systems or databases. Transaction Partitioning Services provide the application with a simple single transaction view.

ReTa Implementation

ReTA implements Transaction Partitioning Services through Microsoft's Distributed Transaction Manager and MTS 2.0.

Business Logic

The execution architecture services are all generalized services designed to support the applications Business Logic. Normally, how Business Logic is to be organized is not within the scope of the execution architecture. However, the ReTA Application Frameworks extend the services of the execution architecture to support the "Interface Controller Model" (ICM) pattern approach to packaging the Business Logic as components.

Business Logic is the core of any application, providing the expression of business rules and procedures (e.g., the steps and rules that govern how a sales order is fulfilled). As such, the Business Logic includes the control structure that specifies the flow for processing business events and user requests. In a ReTA application, the Application Frameworks define a structured approach to the concepts of Interface, Application Logic, and Data Abstraction.

Interface logic interprets and maps the actions of users into business logic processing activities. With the assistance of Presentation Services, Interface logic provides the linkage that allows users to control the flow of processing within the application. ReTA implements this service through the UI and Activity Frameworks.

Application Logic is the expression of business rules and procedures (e.g., the steps and rules that govern how a sales order is fulfilled). As such, the Application Logic includes the control structure that specifies the flow for processing for business events and user requests. The isolation of control logic facilitates change and adaptability of the application to changing business processing flows. ReTA implements this service through the Activity Framework.

Information Access Services isolate the Business Logic from the technical specifics of how information is stored (e.g., location transparency, RDBMS syntax, etc.). Data Abstraction provides the application with a more logical view of information, further insulating the application from physical information storage considerations. ReTA implements this service through the Persistence Framework.

The ReTA Application Frameworks provides services that encourage and support the thin-client model. Also, the Frameworks shield business logic developers from the details and complexity of architecture services (e.g., information services, component services) and other business logic.

Execution Architecture Physical Model

Purpose

The ReTA Execution Architecture Physical Model portion of the description shows the actual components comprising the Execution Architecture and their relative location and interfaces. Additionally, the model depicts the platforms on which the components may reside as well as the distribution across the environment. The components in the Physical Model may support a portion of a function or more than one function from the functional model.

Physical Configuration

The content for this portion of the description is defined in the Technology Infrastructure Procurement List portion of the present description.

Physical Model

Figure 47:
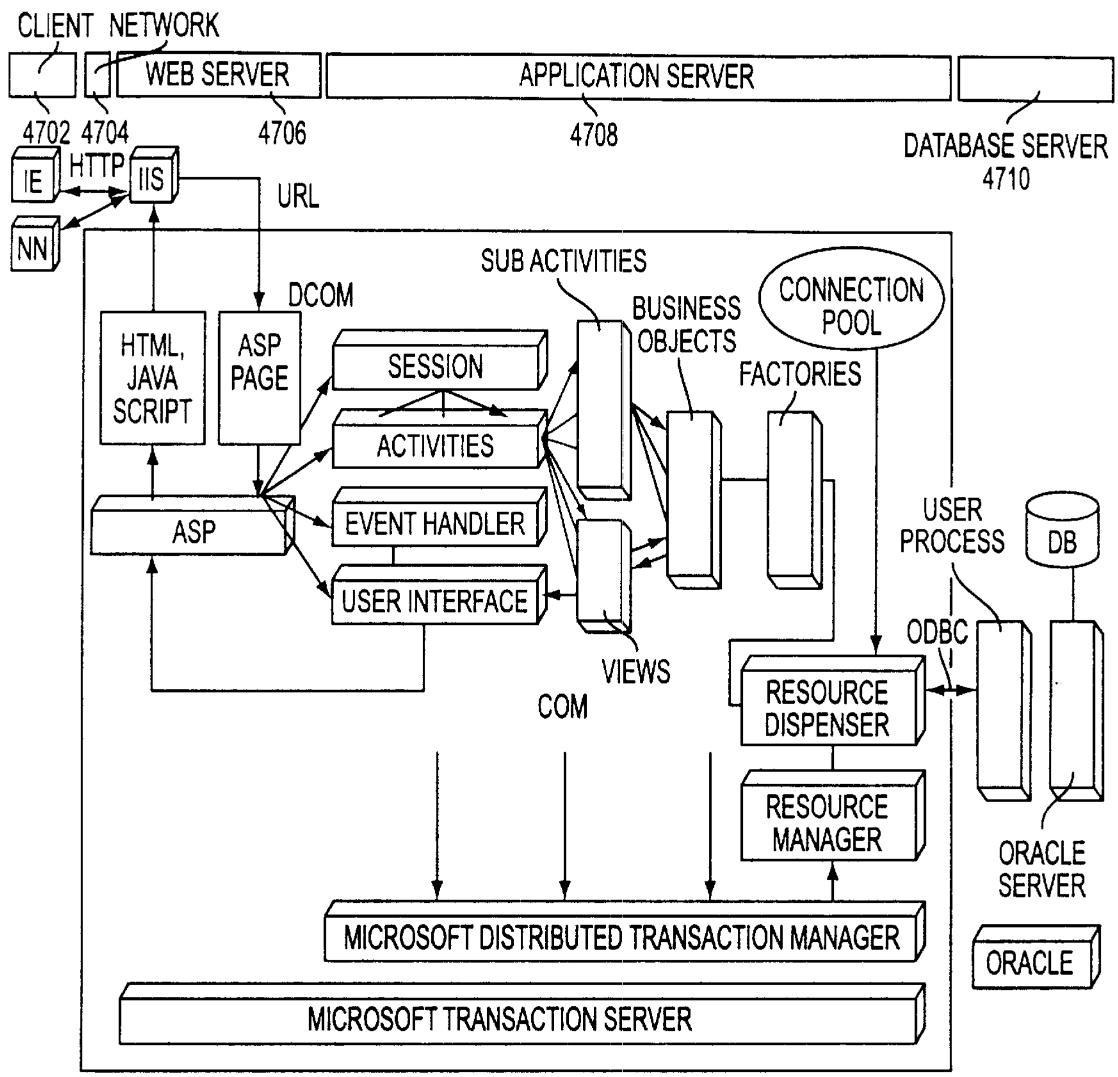
FIG. 47 illustrates the components that comprise the ReTA execution architecture and their physical location according to an embodiment of the present invention.

FIG. 47 illustrates the components that comprise the ReTA execution architecture 4700 and their physical location. In particular, the components are grouped through their association with the client 4702, network 4704, web server 4706, application server 4708, and database server 4710.

Operations Architecture Design

Overview

Figure 48:
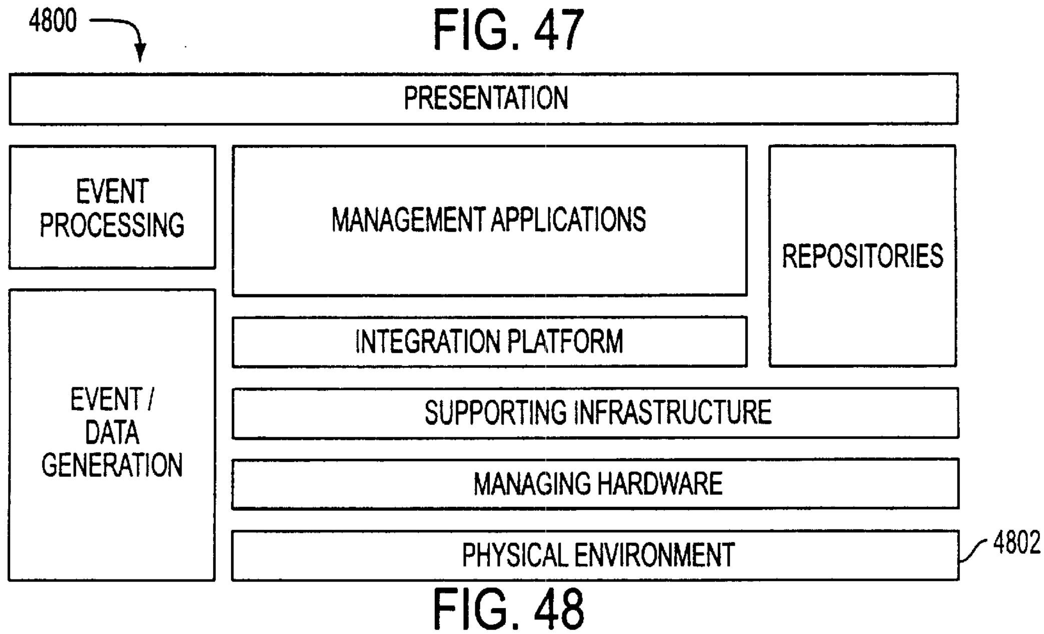
FIG. 48 illustrates a MODEnc Framework for Operations Architecture according to an embodiment of the present invention.

The Operations Architecture is a combination of tools, support services, procedures, and controls required to keep a production system up and running efficiently. Unlike the Execution and Development Architectures, its primary users are the system administrators and the production support personnel. With reference to FIG. 48, all components of the Operations Architecture 4800 are integral to the successful management of a distributed environment. Any processes, procedures, or tools developed or chosen as an operational management solution for a specific operational area must be able to integrate with any existing or planned process, procedure, tool solutions for other Operations Architecture areas.

Operations Architecture Component Design

Physical Environment 4802

Implementing—Initial Installation

Description

Initial Installation prepares the physical location for the rollout of a new site or service, pre-assembles the equipment (hardware and software) based on developed specifications, installs the equipment and tests that the equipment is fully functional prior to allowing the users to utilize the system in a production environment. Precise build procedures must be delivered early enough to drive Release Testing, Procurement, and rollout plans. For large multi site installations that require significant rollout of new hardware, optimization of the configuration tasks (hardware and software) can be achieved through the use of a central staging facility.

Planning Considerations

The deployment of the physical environment must be scheduled as early as possible, and detailed communication regarding the technology infrastructure deployment plan should be distributed regularly to key stakeholders.

Where a pilot implementation has taken place previously, or is in progress, the experiences from this activity need to be incorporated into the deployment plans. The purpose of a pilot implementation essentially is to minimize the risks of full implementation. Any experiences from the pilot should be identified and plans to avoid trouble, or accelerate progress, should be included within the deployment work plan.

Ensure that the organizational functions arc ready for the change. Functions of the organization may need to be ready for the technology infrastructure change before it is deployed. These functions include:

Help Desk

Support Systems

System Maintenance

Operations

The organizations supporting these functions need to understand how their support roles may change, and what new demands the technology infrastructure may place upon them. Ensuring that these areas are comfortable supporting the new infrastructure, and that they are able to troubleshoot problems is critical to the overall support and success of the business capability.

Event/Data Management

Figure 49:
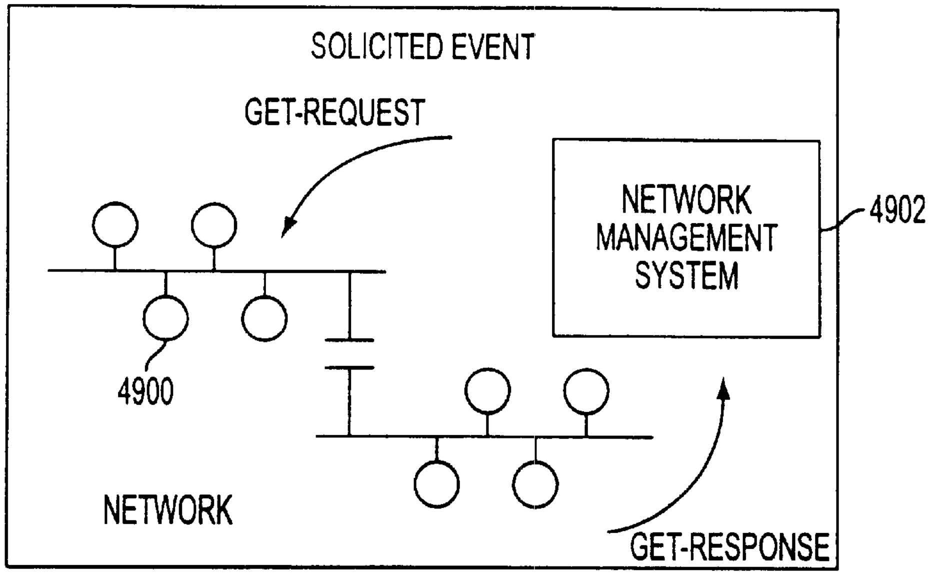
FIG. 49 is an illustrative representation of a solicited event resulting from the direct (synchronous) polling of a network component by a network management station according to an embodiment of the present invention.

Event/Data management is the process of receiving and classifying events. An event is a change in the state of a network component. There are two types of events—solicited and unsolicited. A solicited event results from the direct (synchronous) polling of a network component 4900 by a network management station 4902 as represented in FIG. 49.

Figure 50:
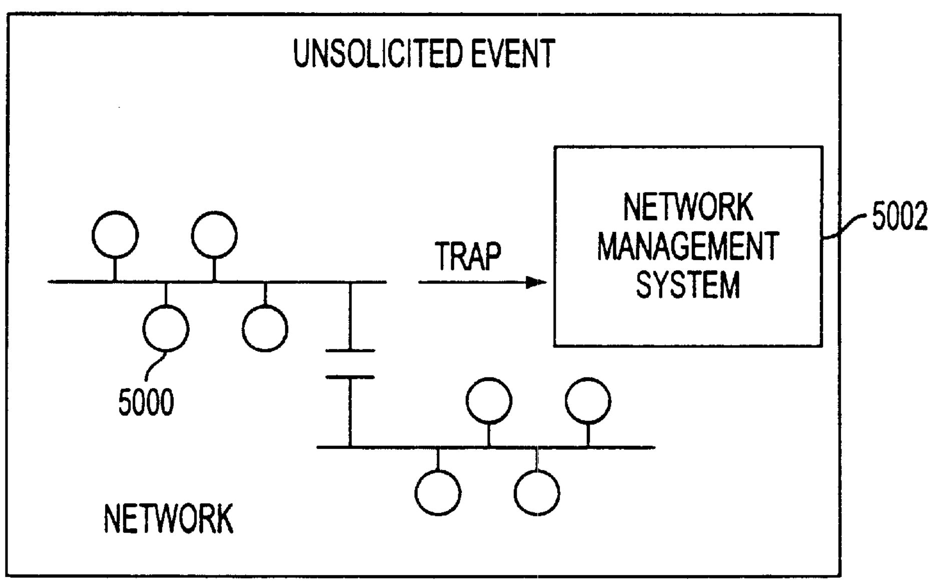
FIG. 50 is an illustrative representation of when an unsolicited event occurs when a network component sends (asynchronously) data to the network management station according to an embodiment of the present invention.

An unsolicited event occurs when a network component 5000 sends (asynchronously) data to the network management station 5002 as represented in FIG. 50.

Once the event is received, the management station classifies the event. If it is classified as a fault, it would then be passed to the fault management facility. Otherwise it is classified as a normal event and is logged for historical trending purposes.

Event Processing

Event processing manipulates the raw data obtained in the event/data generation layer into a more workable form. This layer performs functions such as event filtering, alert generation, event correlation, event collection and logging, and automated trouble ticket generation. Event processing routes the processed information on to either the presentation or management applications layers. Again it is important to consider the interface of the event processing component with the other components of the operational architecture.

Event Management in a Net-Centric Environment

The MODEnc project has further defined Net-Centric Computing as the standards and considerations involved with Internet/Intranet/Extranet environments.

Figure 51:
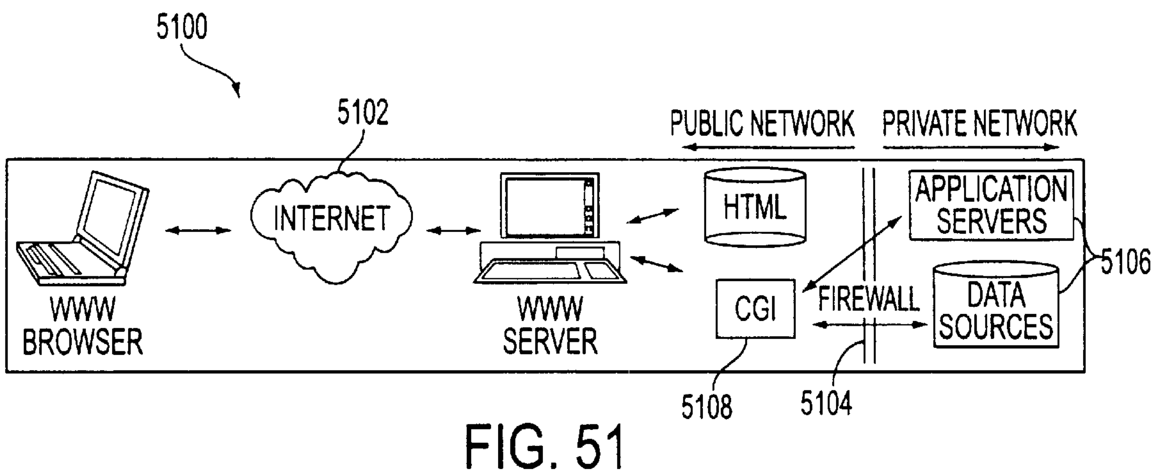
FIG. 51 illustrates event management in a net-centric environment according to an embodiment of the present invention.

When using the Internet-based net-centric model 5100, as shown, for example, in FIG. 51, Internet standards such as TCP/IP, HTML and CGI are used to publish, interact, and transact with data/content on the public Internet 5102. Typically, a firewall 5104 is implemented to secure a service provider's internal resources 5106 from the public Internet. A service provider locates Internet-based resources outside of the firewall and may provide controlled access from the web to internal information through mechanisms such as CGI 5108. Access to Internet resources may be through web browsers as depicted or via other mechanisms such as e-mail or ftp.

Figure 52:
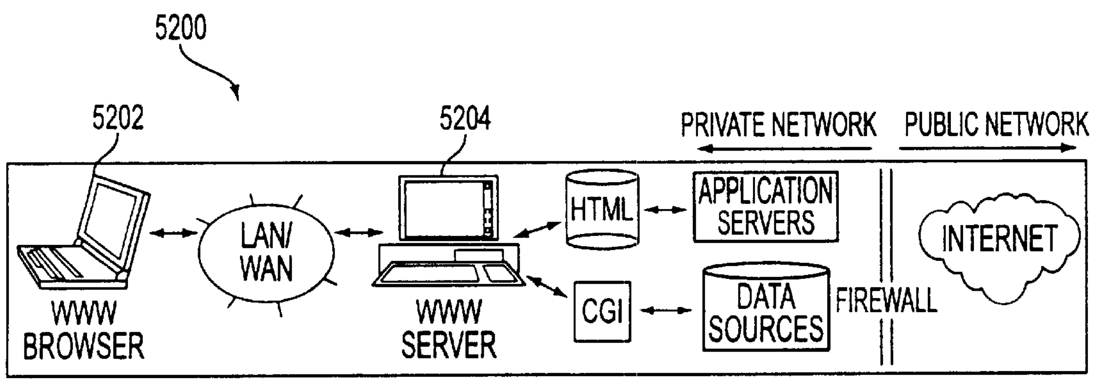
FIG. 52 illustrates event management in an Intranet-based net-centric model according to an embodiment of the present invention.

When using the Intranet-based net-centric model 5200 as illustrated in FIG. 52, Internet standards are used within the confines of a private network to implement publish-, interact-, and transact-based applications. Browsers 5202 are used to access HTML pages or other services located and controlled through internal web servers 5204.

Figure 53:
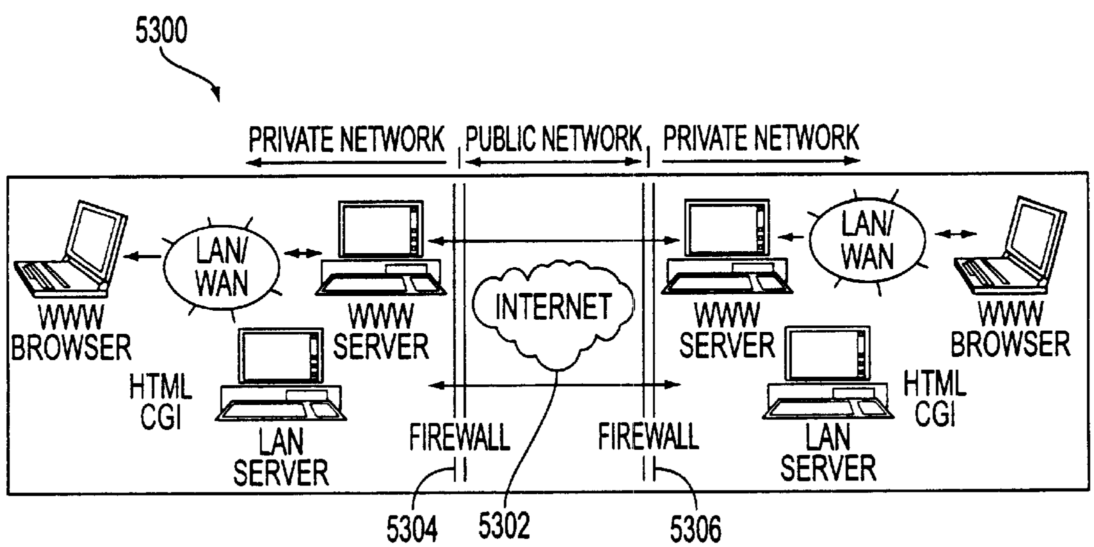
FIG. 53 illustrates event management when using an Extranet-based net-centric model according to an embodiment of the present invention.

When using the Extranet-based net-centric model 5300, as illustrated in FIG. 53 companies share computing resources by connecting over the Internet 5302 or Virtual Private Network (VPN). Each company typically shields its internal networks from the public Internet via firewalls 5304, 5306 and provides controlled access through the firewalls to its partner's resources.

When performing the Event Management function in a net-centric environment, the following factors should be considered:

Lack of event management on the Internet

New events

Integration with other system management tools

Centralized event polling issues

Intra-application events should be analyzed

SNMP difficulties in managing net-centric environments

Lack of Event Management on the Internet

[Internet, Extranet]

Net-centric service providers must consider that the Internet provides few event management services. Though a service provider's systems that reside outside the firewall may host SNMP and/or other event management agents, public Internet hosts currently may not provide event management data to a 3$^{rd}$ party service provider.

New Events

[Internet, Intranet, Extranet]

New event metrics such as metrics related to an Internet connection may be required to get an accurate overall picture of the net-centric environment health. The emerging thin client architecture may also require new event categories.

Integration with other System Management Tools

[Internet, Intranet, Extranet]

Events generated by net-centric management tools may need to integrate with other system management applications.

Centralized Event Polling Issues

[Internet, Intranet, Extranet]

Management of a net-centric environment relies more heavily on remote sites generating and queuing their own event management information. The reason for this is if there is a network failure, a centralized polling approach to event management may not be able to assess the health of nodes behind a broken network link. Remote nodes must generation their own events, queue them in case of failure, and resends the queued events upon reestablishment of network connections

Intra-application Events Should be Analyzed

[Internet, Intranet, Extranet]

Service Providers should monitor not only what pages/interfaces that users are accessing, but what they are doing within each page/interface to maximize the marketing value of usage data. This can also provide valuable input to application design teams in making application refinements.

SNMP in a Net-Centric Environment

[Internet, Intranet, Extranet]

Since SNMP traps may have to traverse multiple networks, and MIBs may need to send management information to multiple stakeholders, managing events across net-centric environments can be difficult. An Internet Service Provider (ISP) may have to consider clever filtering to ensure that the right traps get to the right users.

Presentation

The presentation component provides the interface between the manager(s) of the system and management data generated by the system. Data can be manipulated for various forms of output. By integrating the operational architecture it is possible to reduce the number of front-end interfaces required. Commonly, the presentation component uses a GUI front-end interface. This component is also responsible for real-time and historical report generation.

Management Applications

Management applications are those tools which are used to manage the system. Most of the MODE functions tie directly into this component. The management applications component ties in directly with the integration platform component as the management applications tools must comply with the standards set by the integration platform. Management applications receive data from the event/data generation, event processing, and repositories components and then send data to the presentation or repositories components. Management applications tools include capacity planning tools, performance management tools, license management tools, remote management tools, systems monitoring tools, scheduling tools, help desk tools, etc. Some Enterprise Management tools even poll the event/data generators for information but these options may impact network performance. Web Server management has been introduced as part of the management operations framework. As Corporate Internets and Extranets implement Web based software products to sell and advertise business services, corresponding administrative, security, event notification and performance requirements must be performed similarly for the companies web based system. The two critical path issues are security management and network management.

Security Management

Security Management controls both physical and logical security for a Net-Centric environment. Due to the nature of the environment, security may need to be managed either centrally, remotely or through a combination of the two methods.

Security Management also handles the logging of proper and illegal access, provides a way to audit security information, rectify security breaches and address unauthorized use of the system.

Network Management

Network & Systems Management Planning is responsible for the planning activities involved in running the day-to-day operations and maintenance of the production systems Capacity Planning Performance Planning

Repositories

Repositories contain all the management data generated or used during the management process. This includes historical data, capacity data, performance data, problem knowledge bases, asset databases, solution sets, and management information bases (MIBs). The repositories component interacts with the management applications, integration platform, supporting infrastructure, and presentation components. Again it is important to make sure that the other components of the operational architecture are compatible with the database tools.

Backup/Restore

Archiving

Integration Platform

The integration platform provides a common platform for the operational architecture. At the lowest level this means deciding on common standards, interfaces, massage formats, and file logging forms to be used with all the management tools. Products like Tivoli Management Environment, require the use of a separate integration platform component into which the management applications are connected. Many third party vendors insist that they provide solutions which incorporate the event/data generation, event processing, repositories, and presentation components of the MAP operational architecture. It must be noted however that some of these total solution providers may sell a proprietary based solution, at best, and/or may include customized Application Programming Interfaces (API) or Software Development Kit capabilities in order to completely integrate your non-proprietary network.

Lastly, some environments use a home grown integration platform. The choice of integration platforms depends upon its ability to integrate with the execution and development environments.

Supporting Infrastructure

The supporting infrastructure is the subset of operating systems, utilities, languages, and protocols used to support the management of the system. The supporting infrastructure is most often determined by the execution and development environments and the business applications on the system. It is necessary to ensure that the other components of the operational architecture are compatible with the existing supporting infrastructure.

Managing Hardware

Managing hardware is all hardware directly used to manage the environment. This includes all staging components. These components are devoted to systems management functions. Examples of managing hardware include management servers, management controllers, management consoles, probes, and sniffers. One significant component in the hardware monitoring arena is Firewall access control policy management. Firewalls are regularly used for network based security management. It is typically a system or group of systems that enforce access control between two or more networks and/or perform network data packet filtering. Usually packet filtering router hardware and application gateways are used to block unauthorized IP packets and enforce proxy defined user commands.

Management Tool Selection

It is important to note that there may be requirements which cannot be met by any tools. In this case, in-house development may be an alternative. This approach is likely to be more expensive, however, and more difficult to support the long term, and thus should usually be avoided if possible. Were possible, the tool with the best fit should be purchased, and customized to meet the necessary requirements. Some additional considerations are outlined below:

Central vs. Distributed Control

Platform Constraints

Integration with other Functions

Anticipated Volume of Data & Transaction Throughput

Number of Users for the Tool

Level of Support Required

Installation

Oracle Database Installation

Overview

Assumptions

This portion of the present description assumes:

That the target hardware configuration for the database server meets the specified requirements for the software being installed.

Embodiments mentioned within this portion of the present description may not be current as of the time of this reading. Care should be taken to ensure that the latest embodiments are used and that individual installation processes are reviewed to ensure that any changes are followed.

Individuals performing this installation have experience in relational database concepts, tools, administration and performance tuning.

Database Model

Users and Schemas

The following table provides a list of the user accounts, roles and schemas used during ReTA Phase 1 development.

| Account Name | Description |
|---|---|
| RETA_ARCH | Architecture Schema. This account contains various architecture-related objects (tables, sequences and procedures). |
| RETA_APPS | Application Schema. This account contains application-related objects (tables, sequences and procedures). |
| Reta_Admin | Administrator Role. This role provides administration privileges and rights to the administrator account. Rights include full access to the architecture and application schemas. |
| Reta_User | Application Role. This role provides rights and privileges to application accounts. Rights include full access to the application schema and insert on selected architecture tables. |
| RetaAdmin | Administrator id. This account is used for architecture and application maintenance. |
| RetaUser | Application id. This account is used to gain access to application specific database objects during application execution. |

Architecture Tables

Figure 54:
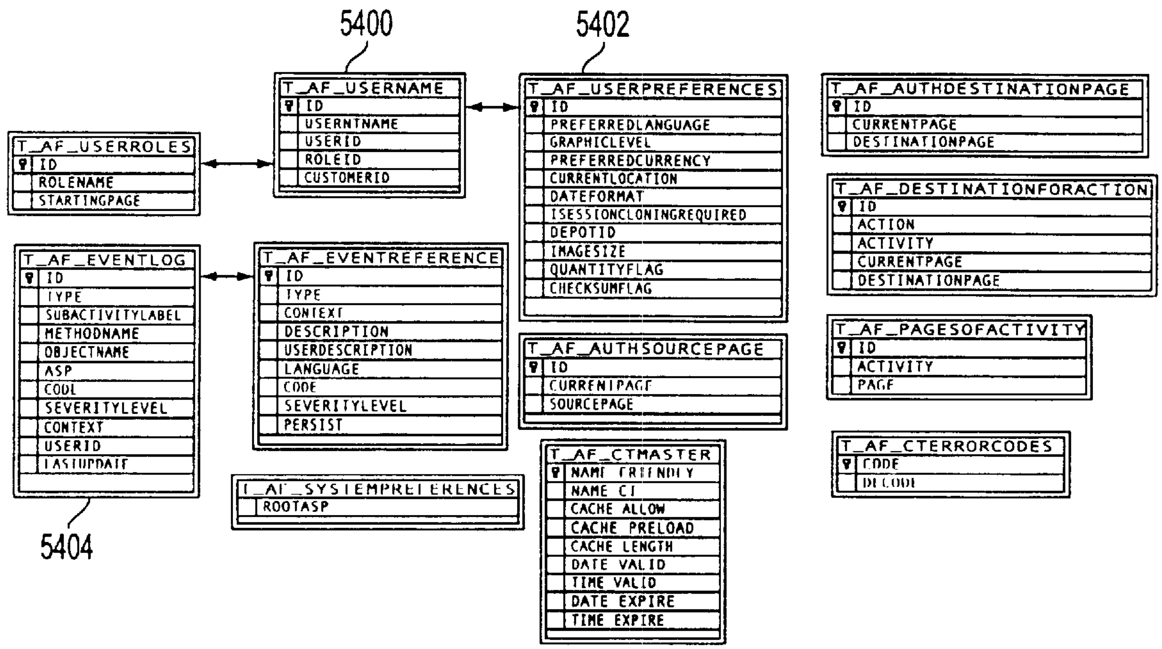
FIG. 54 illustrates the tables and relationships required for the ReTA Phase 1 Architecture Frameworks according to an embodiment of the present invention.

The ReTA Phase 1 Architecture Frameworks require the tables and relationships illustrated in FIG. 54. Among these tables are user identification tables 5400, user preference tables 5402, and event log tables 5404.

Application Tables

Figure 55:
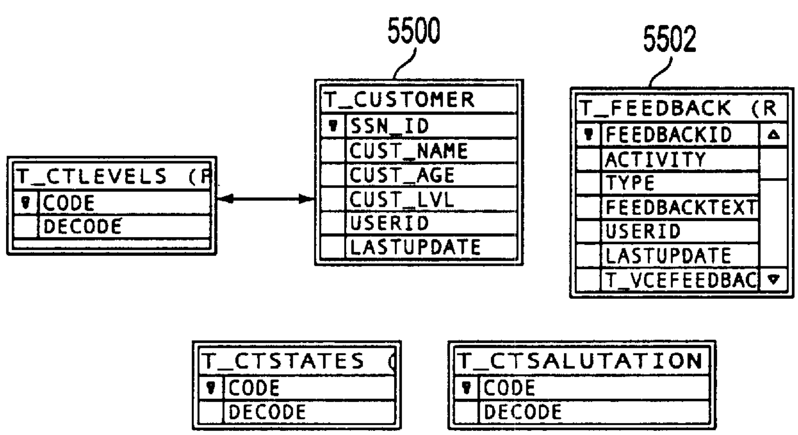
FIG. 55 illustrates tables and relationships required for the ReTA Phase 1 validation application according to an embodiment of the present invention.

FIG. 55 illustrates tables and relationships required for the ReTA Phase 1 validation application. Among these are customer information tables 5500 and feedback tables 5502.

Installation Process

Oracle Configuration

The following steps describe the process of installing and configuring a database for use during ReTA development and testing.

| Step | Step Description | Notes |
|---|---|---|
| 1 | Install "Oracle 8 Enterprise Edition" (Version 8.0.3.0.0 for Windows NT)<br>Run Setup on the installation CD.<br>Choose the installation language, then select OK.<br>Choose the Company name, and change the default install directory to C:\Oracle, then select OK.<br>Select Yes when asked whether to have the installation program make changes to the PATH variable<br>Choose to install Oracle 8 Enterprise Edition.<br>Select where the Oracle portion of the present description should be installed. The default is to leave it on the CD. | Though these steps describe the installation on a Windows NT platform, they are nearly identical to the installation process on the UNIX platform. |
| 2 | Create a directory for the application database.<br>Start the windows explorer<br>Select the directory where Oracle is installed (C:\Oracle) then the subdirectory Database<br>Create a new folder for the Database files.<br>Ex. "C:\Oracle\ReTA" | |
| 3 | At this point a full operating system backup should be made, and the backup set stored. In future, if the database server goes down, this backup may be used to quickly restore the server to a point where the Oracle Recovery Manager can take over and complete the backup. | |

-continued

| Step | Step Description | Notes |
|---|---|---|
| 4 | Add registry keys for the database. The key locations are HKEY_LOCAL_MACHINE\SOFTWARE\Oracle\.<br>Use the Start Menu to run the regedit application<br>Browse to the above key.<br>Right click on the entry ORACLE_SID and select Modify.<br>Set the key value to RETA (or the SID of the Database if this has been modified.<br>Create a new key, NLS_DATE_FORMAT, and set the value to "DD-MM-VV HH24:MM:SS" (include the quotation marks) | This key identifies the active database to Oracle on startup. |
| 5 | Perform the initial database creation.<br>Run the batch file Create ReTA Database.bat located in the Database\CreateDB subdirectory of the Architecture directory of the supplied media.<br>NOTE: The following batch files and database scripts may sometimes generate errors of the form "Table/View does not exist." This is because the scripts delete before trying to create objects - if the scripts are being run for the first time these objects may not exit and the errors may be generated. This is not a cause for concern. | This batch file is expects RETARUN.sql and RETAIRUN.sql to be located in the same directory. |
| 6 | Register your new databases with the TNS listener service to enable other computers on the network to see it.<br>Open the file listener.ora located in the Net80\admin directory of the Oracle directory.<br>Create entries identical to the ORCL entry at the end of the file, with the SIDs replaced by PROS, or the SID created in step 4.<br>Note: copy the entire code block - i.e. four lines of code.<br>The inserted code is the following:<br>(SID_DESC = ReTA Development Database)<br>(GLOBAL_DBNAME = <Your computer name here>)<br>(SID_NAME = <Your database SID here>) )<br>Stop and restart the service Oracle TNS Listener | This step enables Oracle8 Client communication with the data server. |
| 7 | Create local connections to the new database.<br>Use the start menu to run the program Oracle for Win NT/Net8 Easy Config.<br>Note: If one gets a Dr. Watson error on Java.exe, set the display to 256 colors.<br>Select Add New Service, and supply a service name e.g. "RETA1"<br>Select Bequeath (local database).<br>Select Next.<br>Enter the database SID used in the database creation script (RETA by default)<br>Select Test Service (Username: system; Password: Manager) and when the test is successful push Done<br>Select Next, then Finish. | This step provides access to the database from SQL*Plus, Oracle Navigator or other Oracle administrative tools. |

Application & Architecture Database Objects

The following steps describe the process of creating, user and schema accounts for use by the ReTA Phase 1 architecture and application services.

| Step | Description | Notes |
|---|---|---|
| 9 | Create the users and roles for the database. To run a database script, execute Oracle for WinNT\SQLPlus 8.0 from the start menu. A script is executed by typing '@' followed by the full path and name of the script. The scripts reside in the ReTA\Database\Create directory of the supplied media.<br>Run the script CreateRoles.sql<br>Run the script CreateUsers.sql | Connect as Username: system; Password: manager; Host String: RETA1 - or the name of the service created in step 5 |
| 10 | Create and populate the architecture objects within the RETA_ARCH account. The following scripts are in the ReTA\Database directory of the supplied media.<br>Connect as RETA_ARCH, i.e. type connect reta_arch/reta_arch@reta1 at the command prompt or within SQL*Plus<br>Run the script createArchTables.sql<br>Run the script GrantArchRights.sql<br>Run the script PopulateArchTables.sql | This step creates the architecture framework tables expected by the ReTA Phase 1 architecture services. |
| 11 | Create and populate the application objects within the RETA_APP account. The following scripts are in the Application\Database directory of the supplied media.<br>Connect as RETA_APP, i.e. type connect reta_app/reta_app@reta1 at the command prompt or within SQL*Plus<br>Run the script CreateAppTables.sql<br>Run the script GrantAppRights.sql<br>Run the script PopulateAppTables.sql | This step creates the tables necessary to run the ReTA Phase 1 validation application. |
| 12 | Create synonyms and sequences for the both the architecture and application account objects.<br>Connect as the ReTA database administrator, i.e. type connect RetaAdmin/RetaAdmin@reta1 at the command prompt or within SQL*Plus<br>Run the createArchSyn.sql script to create the architecture synonyms.<br>Run the createAppSyn.sql script to create the application synonyms.<br>Run the script CreateArchSeq.sql to create the sequences used by the event log and the feedback application. | This step creates public synonyms for use by other database accounts. |
| 13 | Modify the entries within the T_AF_USERNAME and T_AF_USERPREFERENCE tables with any new account information. | Ensure that a entry exists for each developer or tester. |
| 14 | It is recommended that at this point a full database export/backup be performed. | A clean database backup after install ensures that the database may be recovered from day one. |

Technology Infrastructure Procurement List

Purpose

This portion outlines the minimum required hardware and software specifications for Phase 1 & 2 of the Resources eCommerce Technical Architecture (ReTA) initiative. It should be noted that the actual configurations, tools and configurations may very depending on application and client requirements.

Environment Physical Components

Development Environment

Figure 56:
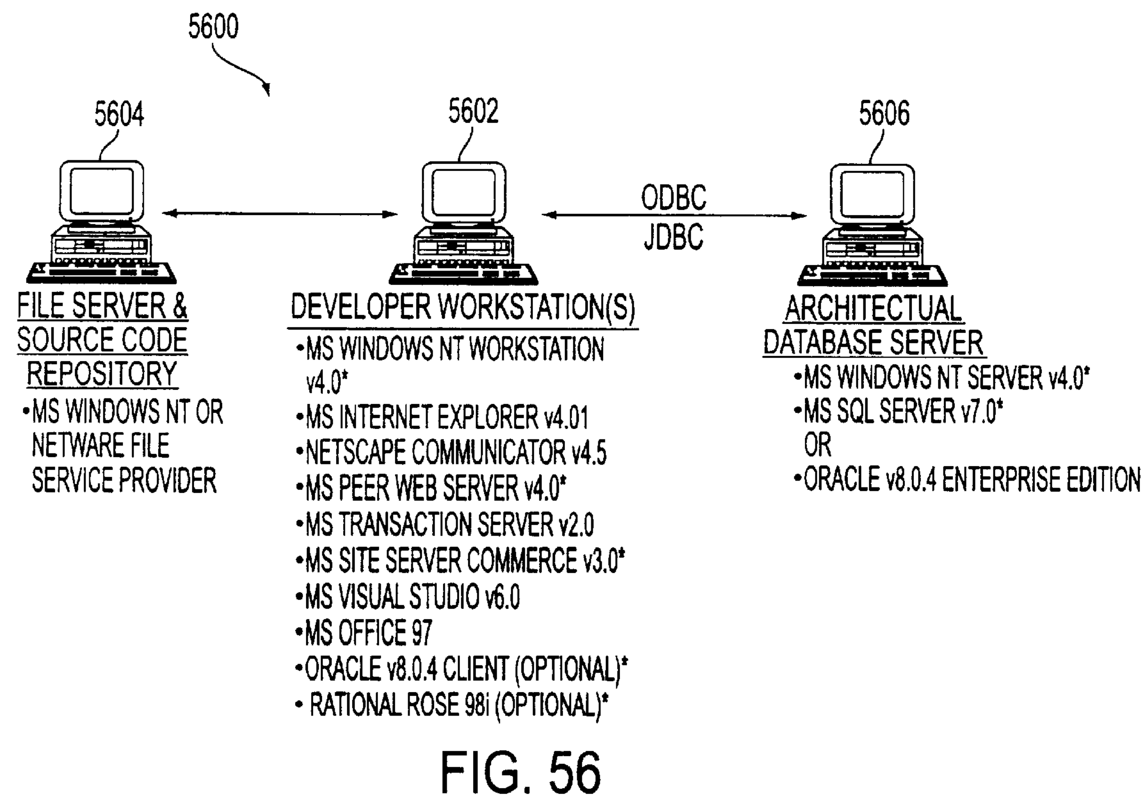
FIG. 56 illustrates the physical configuration of a possible ReTA-engagement development environment according to an embodiment of the present invention.

FIG. 56 illustrates the physical configuration of a possible ReTA-engagement development environment 5600. A developer workstation 5602 is connected to a file server 5604 and an architecture database 5606.

Assembly/Product/Performance Testing Environments

Figure 57:
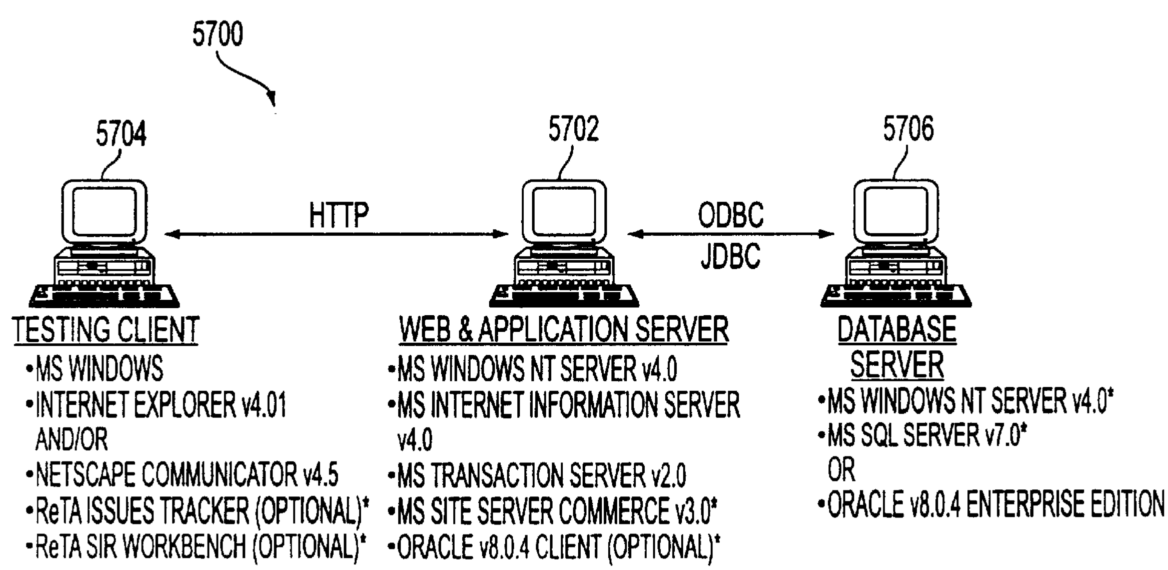
FIG. 57 illustrates the physical configuration of possible ReTA-based Assembly, Product and Performance testing environments according to an embodiment of the present invention.

FIG. 57 illustrates the physical configuration of possible ReTA-based Assembly, Product and Performance testing environments 5700. A web and application server 5702 is connected to a testing client 5704 and a database server 5706.

Production Environment

Because of the nature of netcentric applications, there are many possible physical configurations available for the production environment. The following illustrations provide views of two possible configurations. The main difference between the two is the separation of the web and application servers from one physical server into two separate physical boxes.

Figure 58:
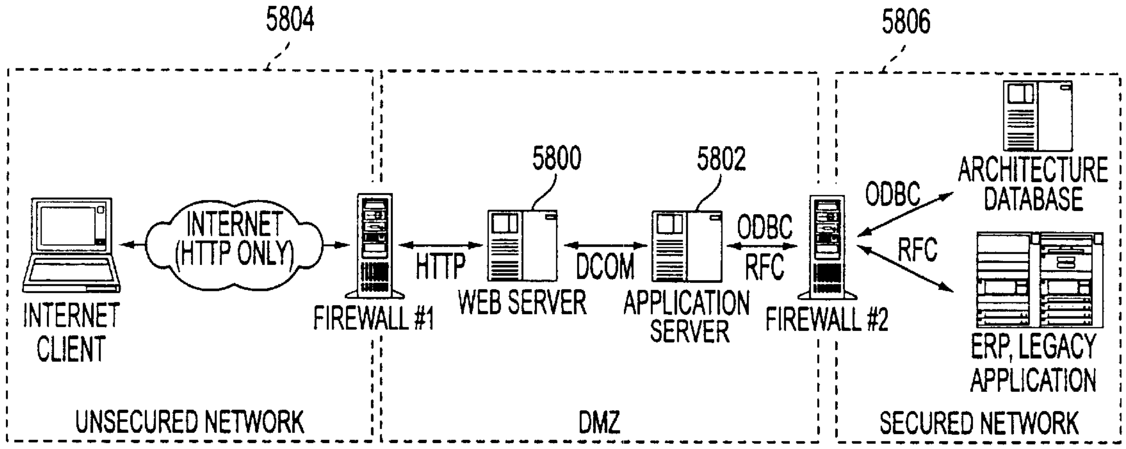
FIG. 58 illustrates Separate Web and Application Servers according to an embodiment of the present invention.
Figure 59:
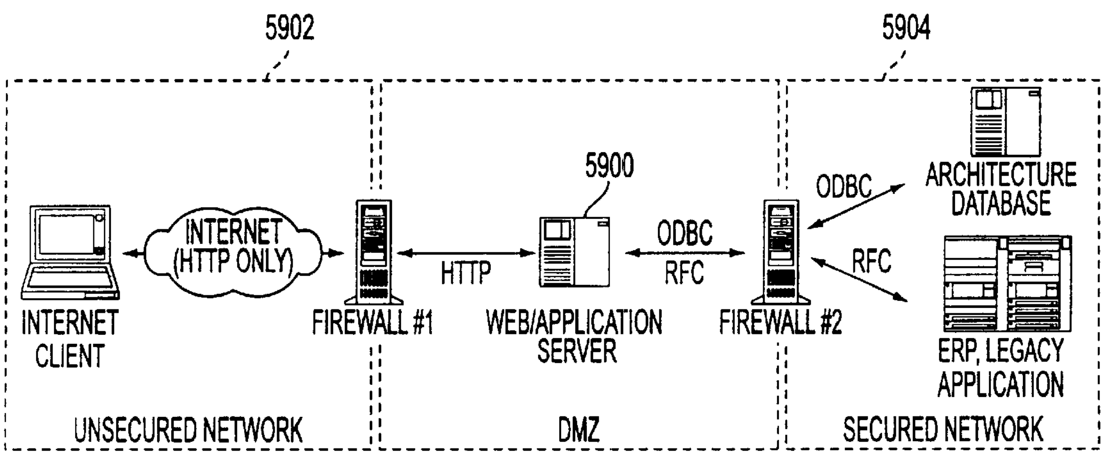
FIG. 59 illustrates a Single Web and Application Server according to an embodiment of the present invention.

Later phases may add additional components, such as search servers, transient data servers and batch servers. FIG. 58 illustrates Separate Web and Application Servers 5800, 5802 between an unsecured network 5804 and a secured network 5806. FIG. 59 illustrates a Single Web and Application Server 5900 between an unsecured network 5902 and a secured network 5904.

Development Environment Specifications

It is assumed that during the development phases of the engagement, developers may perform much of the application build and test on their individual machines. As such, each developer may have their own web client, web server and app server running on their machine. A shared database (s) may provide development and testing relational database services needed in support of the architecture frameworks.

| Name | Qty | Hardware | Software |
|---|---|---|---|
| Developer Workstations | 1 per developer | 300 MHz (Pentium II)<br>128 MB RAM<br>3 GB Hard Drive<br>CD-ROM Drive<br>17" Monitor | Microsoft Windows NT Workstation v4.0 (SP4)<br>Microsoft Internet Explorer v4.01<br>Netscape Communicator v4.5<br>Microsoft Peer Web Server v4.0<br>Microsoft Transaction Server v2.0<br>Microsoft Site Server Commerce Edition v3.0<br>Microsoft Visual Studio v6.0 (SP2)<br>Microsoft Office 97<br>Oracle 8.0.4 Client<br>Rational Rose 98i - Java Edition (optional) |
| File Server & Source Code Repository | 1 per project | Any platform supporting standard file server service provider.<br>1 GB Disk Space | Example:<br>Microsoft Windows NT Server<br>OR<br>Novell Netware |
| Architecture Database Server | 1 per project | 300 MHz (Pentium II)<br>128 MB RAM<br>8 GB Hard Drive<br>CD-ROM Drive<br>15" Monitor | Microsoft Windows NT Server v4.0 (SP4)<br>Microsoft SQL Server v7.0<br>And/or<br>Oracle8 Enterprise Edition for NT v8.0.4 |

Assembly, Product and Performance Testing Environment Specifications

The following table provides basic requirements for the hardware/software needed for the Assembly, Product and Performance testing phases of a ReTA engagement. The testing environment(s) should be configured to match as closely to that of the production system as possible.

Note that the specifications for each of these environments are the same. However, typical projects may want to establish separate environments to house each phase of testing to ensure contained and controlled results, and allow for parallel testing efforts.

** Note that the recommendations on hardware attributes are greatly effected by functionality and complexity of the application, and may need to be analyzed against specific client needs.

| Name | Qty | Hardware | Software |
|---|---|---|---|
| Testing Client | 1 per tester | 300 MHz (Pentium II)<br>128 MB RAM<br>3 GB Hard Drive<br>CD-ROM Drive<br>17" Monitor | Microsoft Windows (NT or Windows 95/98)<br>Microsoft Internet Explorer v4.0<br>AND/OR<br>Netscape Communicator v4.5<br>Microsoft Office 97 (optional)<br>Issue and Error Reporting/ Tracking Tools (optional) |
| Architecture Database | 1 + per environment | (4) 400 MHz Pentium II<br>2 GB RAM<br>8 GB Hard Drive<br>CD-ROM<br>15" Monitor | Microsoft Windows NT Server v4.0 (SP4)<br>Microsoft SQL Server v7.0<br>OR<br>Oracle8 Enterprise Edition for NT v8.0.4<br>Operational Utilities (optional) |
| Web/ Application Server | 1 + per environment | (4) 400 MHz Pentium II<br>2 GB RAM<br>8 GB Hard Drive<br>CD-ROM<br>15" Monitor | Microsoft Windows NT Server v4.0 (SP4)<br>Microsoft Internet Information Server v4.0<br>Microsoft Transaction Server v2.0<br>Microsoft Site Server Commerce Edition v3.0 (optional)<br>Oracle 8.0.4 Client<br>Operational Utilities(optional) |

Production Environment Specifications

The following table provides basic requirements for the hardware/software needed for a possible Production environment of a ReTA engagement.

** Note that the recommendations on hardware attributes are greatly effected by functionality and complexity of the application, and may need to be analyzed against specific client needs.

| Name | Qty | Hardware | Software |
|---|---|---|---|
| Application User | NA | *Browser Dependent | Microsoft Internet Explorer v4.01<br>OR<br>Netscape Communicator v4.5 |
| Architecture Database | 1 + per environment | (4) 400 MHz Pentium II<br>2 GB RAM<br>8 GB Hard Drive<br>CD-ROM<br>15" Monitor | Microsoft Windows NT Server v4.0 (SP4)<br>Microsoft SQL Server v7.0<br>OR<br>Oracle8 Enterprise Edition for NT v8.0.4<br>Operational Utilities (optional) |
| Web/ Application | 1 + per environment | (4) 400 MHz Pentium II<br>2 GB RAM | Microsoft Windows NT Server v4.0 (SP4)<br>Microsoft internet Information |

-continued

| Name | Qty | Hardware | Software |
|---|---|---|---|
| Server | | 8 GB Hard Drive<br>CD-ROM<br>15" Monitor | Server v4.0<br>Microsoft Transaction Server v2.0<br>Microsoft Site Server Commerce Edition v3.0 (optional)<br>Oracle 8.0.4 Client<br>Operational Utilities (optional) |
| Firewall | 1+ | 300 MHz (Pentium II)<br>128 MB RAM<br>2 GB Hard Drive<br>CD-ROM Drive<br>15" Monitor | Microsoft Windows NT Server v4.0 (SP4)<br>Firewall Software<br>Operational Utilities (optional) |

Site Server Installation

Overview

This portion of the present description describes installation procedures for Microsoft SiteServer 3.0 (Commerce Edition) and the relevant configuration required to create a ReTA eCommerce application.

Site Server Installation

The following portion of the description describes the pre-installation suggestions and the installation steps required for setup and configuring Site Server 3.0 Commerce Edition.

Pre-Installation Suggestions

Do not install Site Server on a Backup Domain Controller.

Do not install Exchange Server on a Site Server. Both products are resource intensive.

Do not install Proxy Server on a Site Server.

Do not install Site Server on a Clustered NT System (MSCS). One can install Site Server onto a Windows Load Balancing Service (WLBS).

Remove Content Analyzer from Visual Studio.

Only install Site Server on a NTFS Drive.

Disable or Remove all Anti Virus software during entire install process.

Do not change ANY setting in IIS before installing Site Server (On a clean/new install).

Have at least one gig free of disk space.

Verify that virtual memory is set to at least 128 MB during the install process.

Give your account administrative privileges on the local machine.

Installation Order for Site Server (This installation used with Oracle database).

Install Windows NT 4.0 Server or Windows NT Server 4.0 Enterprise Edition.

Install Windows NT Service Pack 3.

Install Internet Explorer 4.01 SP1 (choose standard install).

Install Windows NT Option Pack

Install Index Server and the SMTP Server components.

Make sure to configure MTS for local (not,remote) administration.

Install Visual Studio 97 or Visual Studio 6 <optional>—Do not install Visual Studio Analyzer Component.

Create a System DSN to point to the database that may contain the sample tables.

Install Site Server—Do not create new membership instances before installing Commerce Edition.

Install Site Server Commerce Edition (do not overwrite data in database during commerce server setup).

Select your DSN created earlier to create the sample database tables.

Install Visual Studio 97 SP3 Or Visual Studio 6 SP2 <if Visual Studio is installed >.

Install Windows Service Pack 4 (do not install MDAC if prompted, this may be done in the next step).

Install MDAC 2.0 SP1.

Add the MaxBlock registry setting for MDAC.

Install Site Server 3.0 SP2.

Site Server Configuration Information Using ReTA Frameworks

This portion of the description details the settings that must be in place to use Site Server's Personalization and Membership Services, along with instructions on how to setup a sample site to be used in conjunction with the ReTA Frameworks.

Site Server Commerce Settings

After installing Site Server Commerce Edition v3.0 start the Site Server Admin Console and perform the following tasks:

Expand the Personalization and Membership folder.

Expand the computer name—i.e. "ZIMMERD3".

Right click on the Commerce Membership Server (Membership Authentication) folder and select properties.

On the "Authentication Service" tab note the TCP Port number.

Figure 60:
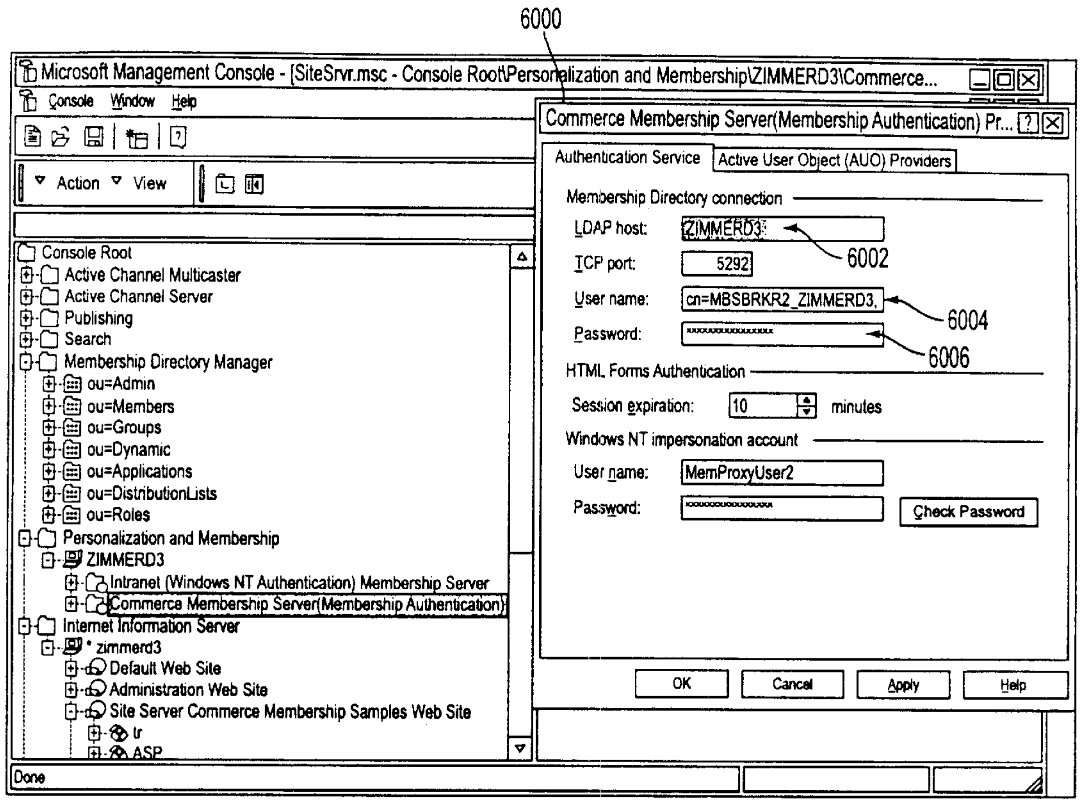
FIG. 60 illustrates a Commerce Membership Server [Membership Authentication] properties view according to an embodiment of the present invention.

FIG. 60 illustrates a Commerce Membership Server [Membership Authentication] properties view 6000 which receives the computer name 6002, user name 6004, and password 6006.

Right click on the Membership Directory. Manager 6100 and select properties.

Figure 61:
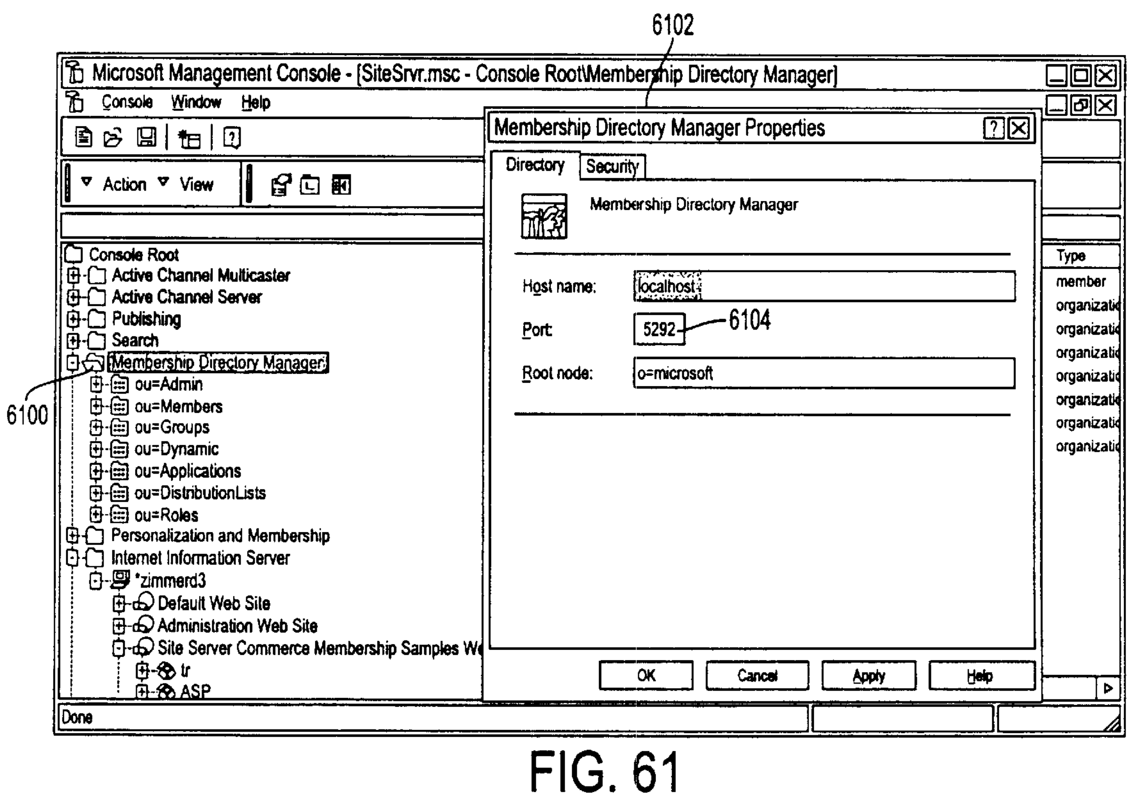
FIG. 61 illustrates a Membership Directory Manager Properties Dialog according to an embodiment of the present invention.

FIG. 61 illustrates a Membership Directory Manager Properties Dialog 6102. Make sure the Port number 6104 here matches the one from step #4.

Site Server Commerce Sample Site Setup Instructions

To setup sample commerce site perform the following steps.

Right click on Default Web Site 6200 in Internet Information Server 6202, select Task 6204 Membership Server Mapping 6206 . . .

Figure 62:
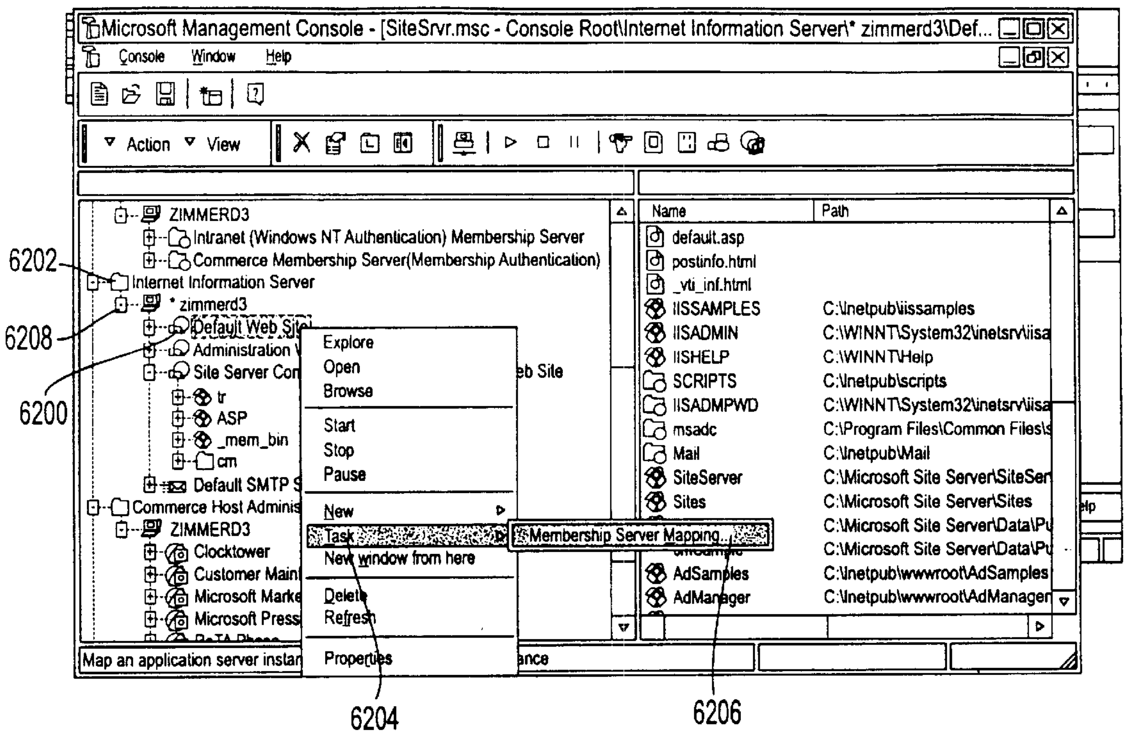
FIG. 62 is an illustration of a Membership Server Mapping Property according to an embodiment of the present invention.

FIG. 62 is an illustration of a Membership Server Mapping Property.

Select Intranet [Windows NT Authentication] Membership option.

Next create the sample site.

Right click on the "Computer name" under the Commerce Host Administration folder (Refer to FIG. 62—Computer Name is "ZIMMERD3" 6208).

Select New—Commerce Site Foundation.

Figure 63:
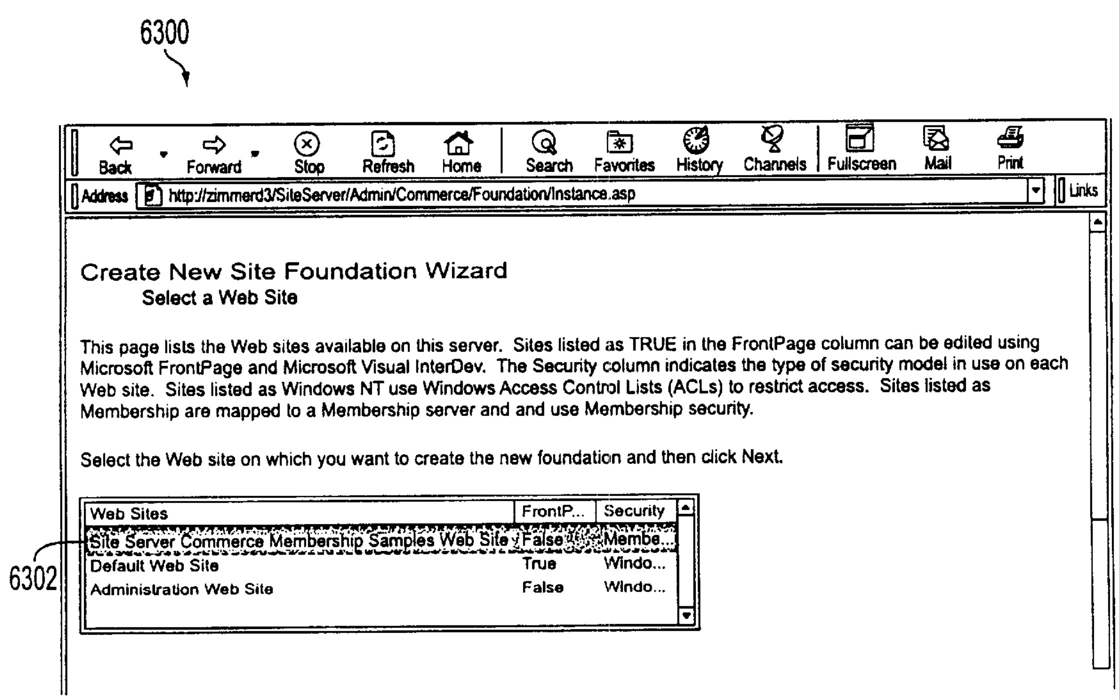
FIG. 63 is an illustration of a Create New Site Foundation Wizard according to an embodiment of the present invention.

Create New Site Foundation Wizard 6300 appears. FIG. 63 is an illustration of a Create New Site Foundation Wizard. Select to create site on "Site Server Commerce Membership Samples Web Site" option 6302.

Follow steps in the wizard.

After Site has been created, right click on Default Web Site in Internet Information Server, select Task—Membership Server Mapping . . .

Change the Membership Server Mapping back to "Commerce Membership Server".

Site Server Commerce Site Sample—Setup

We may create the ReTA Application site under the "Member" directory in Windows Explorer (this may enable the use of the HTML Forms login that uses the Personalization and Membership Services to verify authentication to the site), this may be the site that was created through the Wizard.

For example we created a site and the shortname was "cm" 6400. Therefore our web application started under the "Member" directory 6402 of "cm".

Figure 64:
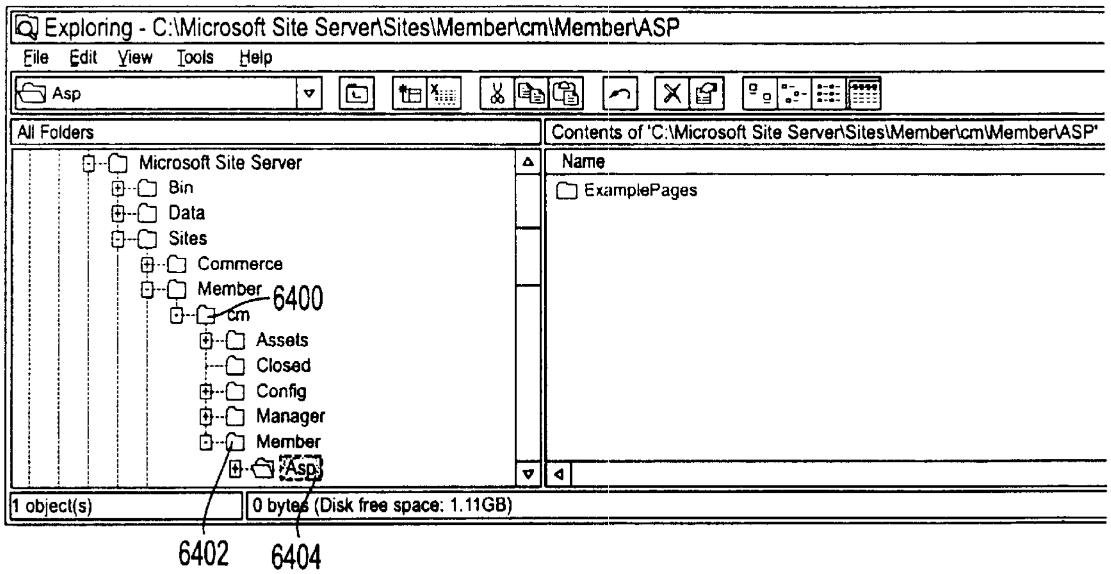
FIG. 64 illustrates the web application being placed under the "Member" directory of "cm" in Windows Explorer according to an embodiment of the present invention.

FIG. 64 illustrates the web application 6404 being placed under the "Member" directory of "cm" in Windows Explorer.

Place the Formslogin.asp, vernfpwd.asp, and welcome__new.asp pages at the same level as the global.asa file. (These files one can copy from the Sample Site called "Trey Research").

Starting up ReTA Framework Components Properly

We do not want to start the ReTA Framework components unless the user has authenticated properly.

```
strUsername=Request("Username")
strPassword=Request("Password")
On Error Resume Next
y=x.VerifyCredentials(strUsemame, strPassword, strUrl)
checkPassword=x.VerifyPassword(strUsername,
   strPassword)
```

This line of code may verify that the user has authenticated with a proper username and password.

```
On Error Resume Next
ChkMemUserGUID=ChkUserObject.Get("GULD")
if Err.Number < >0 then
  IsError=True
else
  IsError=False
end if
if checkpassword=1 then
  REM
  'Create Event Handler that may be used in this function
     and in the Session__Stop function
  Set myEventCollection=Server.CreateObject
     ("EventHandler.AFEventCollection")
  Set Session("AFEventCollection")=myEventCollec-
     tion
  theCurrentPage=Request.ServerVariables("SCRIPT__
     NAME")
  'Create the ReTA AFSession Component
  Set Session("AFSession")=Server.CreateObject
     ("Session.AFSession")
  'create ReTA AFUser object—either the UserSS or
     UserDB Component
  SiteServer=true 'change this to true for the SiteServer
     version
  if (SiteServer=true) then
    Set user=Server.CreateObject("UserSS. AFUserSS")
  else
    Set user=Server.CreateObject("UserDB.
      AFUserDB")
  end if
  theError=user.init( )
  'Start the Session
  theError=Session("AFSession").start
    (myEventCollection)
  'Add the User component to the Session.
  theError=Session("AFSession").setAFUser(user)
  'get The EventHandler Component from the Session
    and add it to the ASP session so that other pages can
    reference it.
  Set Session("AFEventHandler")=Session
    ("AFSession").getEventHandler
    (myEventCollection)
  'Process any errors on this page. The return code is the
    severity of the Error
theSeverity=Session("AFEventHandler").process
  (theCurrentPage,myEventCollection)
  'if the Severity is greater than 1 then redirect to the
    Error Page
  if (theSeverity >1) then
response. Redirect("/asp/ExamplePages/asp/frameworks/
  ErrorHandler. asp")
  end if
  'test if we are starting the application at the correct
    point. If not it is probably because
  'the Session timed-out and so display the timeout
    message
  if theCurrentPage="/asp/verifpwd.asp" then
    'do nothing
  else
    response. Redirect("/asp/ExamplePages/
      timeout.htm")
  end if
end if
```

Here are some of the basic technologies utilized by Site Server Membership, including directory services, Lightweight Directory Access Protocol (LDAP), and Active Directory Service Interfaces (ADSI). A general knowledge of these technologies is important as one builds your Membership site.

Directory Services and the Membership Directory

A directory service is a database that stores organizational data and is highly optimized for database lookups (reads). Directory services provide an index of users and network resources. Site Server 3.0 contains Microsoft's most recent directory service, the Membership Directory. It is the central repository for user data, including member accounts, permissions, and site resources. All directory services use LDAP as their communicating protocol. In the future Microsoft Windows® 2000 Server may implement the much-talked-about Active Directory, which may take the Membership Directory to the next level. The Active Directory may also be responsible for storing all the information needed for the Windows NT domain architecture.

Lightweight Directory Access Protocol

Lightweight Directory Access Protocol (LDAP) is the underlying protocol used by Site Server Membership to communicate with the Membership Directory. LDAP was designed to be the standard Internet protocol for accessing directory services. LDAP runs on TCP/LP networks and is independent of platform, allowing directory-based information to be shared across operating systems. Site Server Membership implements an LDAP service for reading and writing information to the Membership Directory database.

Active Directory Service Interfaces

As stated previously, the Membership Directory must be accessed using the LDAP protocol. Rather than making raw LDAP calls to the Membership Directory, Site Server Membership uses Active Directory Service Interfaces, better known as ADSI. ADSI provides a common standard interface to multiple directory services (through ADSI providers) and communicates with the directory services using LDAP. ADSI makes life easier by allowing the developer to write code to one API while working with multiple directory services.

Active User Object

Site Server provides the Active User Object (AUO) as a single component that aggregates all of a user's attributes from multiple Active Directory Service (ADS) providers. The primary provider is always the Membership Directory. The AUO is a COM object called membership.userobjects. It uses ADSI to retrieve a user's information from the Membership Directory and greatly simplifies the code a developer writes by automatically binding to the current user's information in the Membership Directory. The binding occurs when the component is created, but requires that the Web site be mapped to a Membership Server and that the user is authenticated.

Membership Directory Authentication

Authentication Choices

When one sets up a Membership Directory for a Web site, one must choose the type of authentication to be used. Membership may be set up to use Windows NT accounts (Windows NT Authentication) or accounts that reside solely in the Membership Directory database (Membership Authentication). Windows NT Authentication is most useful for intranet sites where one wish to leverage existing accounts and use the Windows NT Security Accounts Manager (SAM) for authentication. However, Membership Authentication is a good choice for Internet sites, especially sites in which the number of users may increase dramatically over time. As your user base grows, it is much easier to administer your accounts and privileges using Membership Authentication.

Since Integrated Direct Channel (IDC) uses Membership Authentication for the purposes mentioned above, further detail into that authentication method is discussed below:

Membership Server Mapping

It is important to note that Membership Authentication maps Membership groups to proxy Windows NT group accounts to determine a member's security permissions. One still has the benefit of the strong security of Windows NT and can administer security permissions for a Membership group by assigning permissions (ACLs) to the proxy account. For every group in the Membership Directory, Membership creates a corresponding Windows NT group called Site_directoryname_groupname, where directoryname is the name of the Membership Directory and groupname is the name of the Membership group.

Membership Authentication Configuration Options

Under Membership Authentication, there are also several options for configuration. There are four Security Support Providers available: 1) Automatic Cookie Authentication, 2) HTML Forms Authentication, 3) Distributed Password Authentication (DPA), and 4) Clear Text/Basic Authentication. At all four of these levels, there is an Allow Anonymous option, which allows unrecognized users to access the site as a generic account called IUSR_[server_name].

1. Automatic Cookie Authentication

This method provides us with a quiet and discreet authentication method for both anonymous users and registered members. :Cookie authentication issues two cookies—SITESERVER and MEMUSER—to store information on the user's computer. When this option is selected, the ISAPI (Internet Server Application Program Interface) filter (which was installed by the mapping of the Membership Server) parses the headers of the client and looks for the two cookies. There are three possibilities. If the cookies exist then the information found therein is used to authenticate and bind to a member. If the cookies are invalid then the member is redirected to an ASP page in the_mem_bin virtual directory. If the cookies don't exist then the ISAPI filter creates and binds to a new member in the Membership Directory, in the ou=AnonymousUsers container. Once bound to this user, two cookies are written to the browser. These two new cookies SITESERVER and MEMUSER may be used in future sessions to identify the member uniquely.

2. HTML Forms Authentication

To provide a more secure (but equally simple) form of authentication, we can use HTML Forms Authentication. This method of authentication uses HTTP's POST method to send the user's credentials to an ASP page, which handles the submission. The ASP page then makes use of a special COM object—the VeriUsr object—to verify the user's credentials. HTML Forms Authentication also makes use of the ISAPI Membership Authentication filter. When a user makes a call to a page that uses HTML Forms Authentication, ISAPI traps that call and redirects to a special ASP page called FormsLogin.asp. This page is provided in the_mem_user virtual directory of the web application. Formslogin.asp is nothing more than an asp page with form elements for user login name and password. Upon submission, the page redirects with the form elements to verifpwd.asp, which contains the script to verify a user's credentials. If the user is authenticated, the user is taken to the page s/he was trying to access and issues a FormsAuth cookie in addition to the SITESERVER and MEMUSER cookies.

3. Distributed Password Authentication (DPA)

DPA works for Membership authentication in much the same way as Challenge/Response works for Windows NT Authentication. For DPA, users are authenticated against the Membership Directory (rather than the Windows NT SAM database). Moreover, since the username and password are never sent across the wire, DPA is very secure. Unfortunately, it's only possible for Windows Internet Explorer clients to use DPA where usernames and passwords are hashed with a challenge sent by the server.

4. Clear Text/Basic Authentication

When we select Basic Authentication, we authenticate any user that requests a resource against the credentials stored in the Membership Directory. We can specify. extra information with the user, from which to authenticate users. But here lies a difference between Basic Authentication under Windows NT authentication and Basic Authentication under Membership Authentication: in the former case this extra information is in the form of a domain, and in the latter case the information represents sub-containers in the directory. The Clear Text/Basic Authentication method is supported by a number of applications, including Netscape, and most clients should be able to use it.

Other Considerations

DPA and Clear Text/Basic Authentication can be selected simultaneously. In this case, the server may first attempt to issue a DPA authentication challenge. If (and only if) the client cannot interpret the challenge, the server may offer the Clear Text/Basic Authentication request.

IDC and Membership Authentication

The Integrated Direct team used HTML Forms Authentication with anonymous support under certain circumstances for a few reasons. First of all, this authentication method provides an html interface as opposed to a pop up dialog box. This gives the application a more consistent look and feel since the FormLogin.asp page is customizable with graphics and layout. HTML Forms Authentication is also has no compatibility issues that DPA or Clear Text/Basic Authentication methods may have. It is simply an html page, which posts form elements to another asp page, which contains authentication methods. Finally, HTML Forms Authentication issues one session essential cookie, the FormsAuth cookie. The use of one cookie makes user administration issues, such as session time and logout, simpler.

Developers Workstation Installation Process

Description

This portion of the description provides the steps necessary to configure a workstation for use doing application or architecture development on a ReTA engagement.

Assumptions

This portion of the present description assumes:

That the target hardware configuration for the workstation meets the specified requirements for the software being installed.

Embodiments mentioned within this portion of the present description may not current as of the time of this reading. Care should be taken to ensure that the latest embodiments are used and that individual installation processes are reviewed to ensure that any changes are followed.

Individuals performing this installation have experience in Microsoft platforms and tools, and are familiar within web-based application development.

Development Environment

Figure 65:
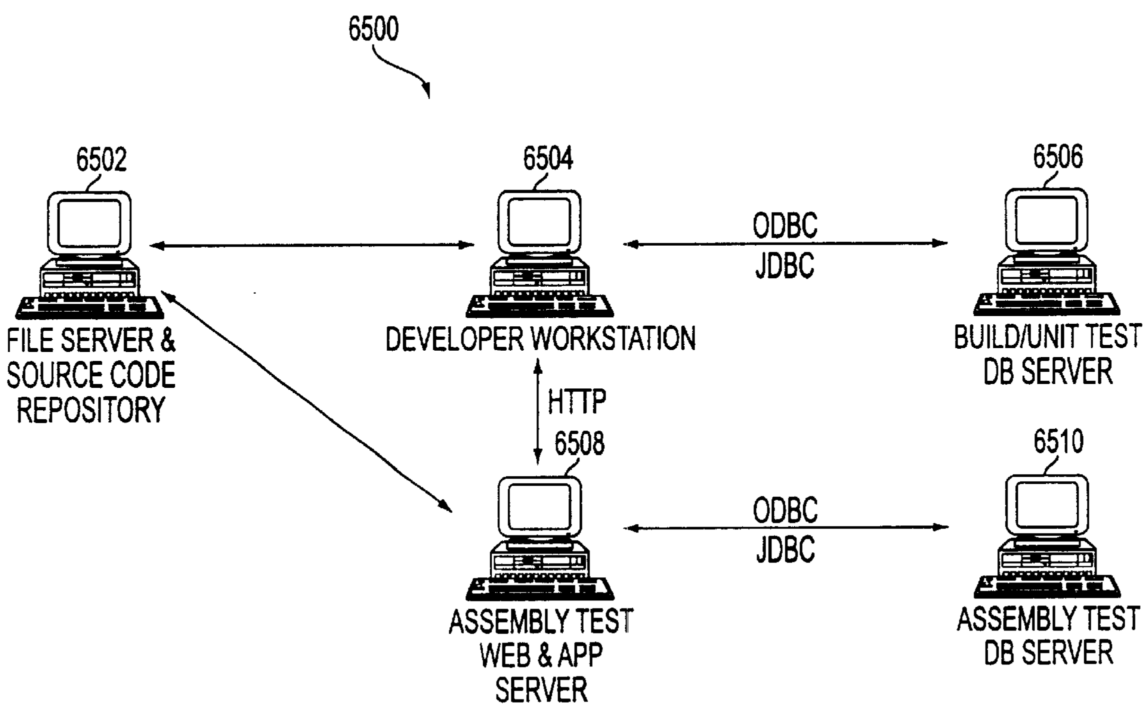
FIG. 65 depicts a typical ReTA engagement development environment according to an embodiment of the present invention.

FIG. 65 depicts a typical ReTA engagement development environment 6500, including a file server 6502, developer workstation 6504, a build and unit test DB server 6506, an assembly test web and application server 6508, and an assembly test DB server 6510.

Installation Process

This is the script for the preparation of the run-time environment for the application and web server. It is applicable to a computer running Windows NT Workstation 4.0.

Install/Configure Web and Application Server Components

| Step | Step Description | Notes |
|---|---|---|
| 1 | Install Windows NT Workstation v 4.0.<br>Run install for Windows NT Workstation 4.0 from boot disks. | It may be necessary to reboot the computer after the installation. |
| 2 | Install Service Pack 4.0 for NT 4.0<br>Run install for Service Pack 4.0 (available from the Microsoft Website). Ignore any warnings issued later in the installation process that are related to the use of Service Pack 4.0. | It may be necessary to reboot the computer after the installation. |
| 3 | Install Internet Explorer 4.01 Service Pack 1.<br>It is not important whether the desktop shell update is installed or not. This step also installs the Java virtual machine used by the application. It may be necessary to reboot the computer after the installation. | This step installs the Java virtual machine used by the application. Reboot if prompted. |
| 4 | Set up the Web and Application Server.<br>Install the NT Option pack from the supplied media. This may not be possible unless the previous step has been completed correctly.<br>Choose to install the "custom set-up" of the option pack.<br>Double click on the Personal Web Server component.<br>Check the box for the Internet Service Manager component<br>Click OK.<br>Double Click Transaction Server.<br>Check box for Transaction Server Development.<br>Accept default location for WWW Service install, Click Next<br>Accept default for Transaction Server (should be Administration->local).<br>Application may begin to install. | Installs IIS 4.0 and MTS 2.0. Reboot when prompted. |

Install/Configure Database Connectivity

| Step | Description | Notes |
| --- | --- | --- |
| 5 | Install Oracle 8 Client.<br>Install Oracle Client Software R 8.0 from the CD<br>Accept default home location.<br>Choose Custom Installation.<br>Select Oracle 8 Client Application User Products.<br>Click Install.<br>De-Select Oracle Objects for OLE.<br>Click OK<br>Click Exit when finished. | Oracle 8 Client installed. |
| 6 | Configure Oracle Networking<br>Use the Oracle Net8 Easy Config Utility to define a local service name. To perform this operation one may need to know the name of the Oracle instance (default is 'ORCL'), the hostname of the server that Oracle resides on, and the port that the Oracle database listener is on (default is 1521).<br>Refer to the help portion of the present description installed in step 5 for assistance. | Net8 provides the networking component of Oracle 8. |
| 7 | Update MTS Settings for Oracle 8 client compatibility<br>Open REGEDIT and within the LOCAL_MACHINEßOFTWARE key modify the Microsoft\Transaction Server\Local Computer\My Computer entries:<br>Change the OracleSqlLib to "sqllib80.dll"<br>Change the OracleXaLib to "xa80.dll" | Currently, MTS v2.0 installation is based on using Oracle 7.3 for Oracle connectivity. |
| 8 | Install Microsoft Data Access Components<br>Run install from NT Server 4.0 SP 4.0 disk (Caution, do not install NT Service Pack 4.0 at this time)<br>Select Custom Install.<br>De-select everything except for ODBC Components, OLE DB components, Microsoft's Remote Data Services and ODBC driver for Oracle databases. | Microsoft ODBC for Oracle driver (MSORCL32.DLL v 2.573.292700) installed Reboot if prompted. |
| 9 | Run MTS/Oracle Configuration Test Utility<br>Copy the Oracle 8.0 version of TestOraclexaConfig.exe (from the Tools project within VSS) to your C:\Program Files\Mts folder.<br>Copy over the existing .exe (version 7.3 compatible).<br>Run the TestOraclexaConfig.exe from the command line; i.e. TestOraclexaConfig.exe -U<username>-P<password>-S<Net8 Service><br>Ex. TestOraclexaConfig.exe -URetaUser -PRetaUser -SReta1 | Use this test to ensure your oracle client connection is transactional. MTS installs Oracle 7.3 compatible utility by default. |
| 10 | Create Architecture and Application DSN's (Data Source Names).<br>Run the 32Bit Administrator in the Control Panel. Make sure that the tab for System DSN is selected.<br>Select Add, then Microsoft ODBC for Oracle<br>The Data Source Name is AFUser, and the Server "reta1" for the above example)<br>Repeat the above two steps to add DSN's for the data sources AFPersistence, AFEvent, AFSession and AFOrder | This process sets up an ODBC connection from the developers' machine to the Database Server. |
| 11 | Test the DSN's defined<br>Test the connections established above using the 32 Bit ODBC Test utility in the Oracle for NT folder off the Start menu.<br>Select Connect, then Machine Data Sources, then one of the connections established above. | |

Configure Java Run time Components

| Step | Description | Notes |
| --- | --- | --- |
| 13 | Apply Software Updates<br>Install the updated latest Java Virtual Machine (Downloaded from Microsoft) | Reboot when prompted. |
| 14 | Update the Runtime Java Classes<br>Using the WinntJava.Zip file provided within the Tools project of SourceSafe:<br>Extract all files (use folder names) to C:\WinNT\Java. | |
| 15 | Create System Environment Variables<br>Define the following Environment Variable;<br>CLASSPATH<br>C:\ReTA\Architecture;C:\ReTA\Application;C:\winnt\java\classes | These variables are used by the Java Virtual Machine to find |

-continued

| Step | Description | Notes |
| --- | --- | --- |
| | ;C:\winnt\java\packages;c:\winnt\java\trustlib<br>INCLUDE<br>INCLUDE; add<br>C:\ReTA\Architecture;C:\ReTA\Application;C:\Program Files\Microsoft Visual Studio\VC98\Include;c:\Program Files\MTS<br>PATH<br>-PATH; add C:\orant\bin;C:\Program Files\Mts;C:\Program Files\Microsoft Visual Studio\Common\Tools\;C:\Program Files\Microsoft Visual Studio\VC98\bin;C:\Program Files\Microsoft Visual Studio\VJ98 | Java runtime classes and by the development tools for application and architecture builds. |

Install and Configure Development Software

| Step | Description | Notes |
| --- | --- | --- |
| 16 | Install Microsoft VisualJ++<br>If install detects an out of date version of IE 4.0 then accept the version offered by visual J++6.0.<br>Reboot Computer, leave CD in drive.<br>Start install for Visual J++ v 6.0, select Install Visual J++6.0 option.<br>Select Custom install:<br>Click Data Access, click Change Option button, click Microsoft ODBC Drivers and click Change Option button, -De-Select Microsoft SQL Server ODBC Driver and Microsoft Oracle ODBC Driver, Click OK twice, Click Continue button. | Restart if prompted. |
| 17 | Install Microsoft visual Studio 6.0 Components.<br>Select Custom install:<br>De-select everything except for Microsoft Visual SourceSafe 6.0 and Microsoft Visual C++6.0.. Ignore warning message when deselecting the Data Access check box.<br>Click on Microsoft Visual C++6.0<br>Click Change Option.<br>De-select everything except for VC++Build Tools.<br>Click OK button.<br>Click Continue.<br>Click OK on register environment variables.<br>Click YES on Visual SourceSafe Database Format dialog. | Restart if prompted. |
| 18 | Apply Software Updates<br>In the event that updates are available for either Visual J++ or Visual C++, apply them now. | |
| 19 | Install Service Pack 4.0 for NT<br>Run install for Service Pack 4.0. | |
| 20 | Configure Web Server<br>Start the Internet Service Manager<br>Add a virtual directory where the application may start.<br>On the virtual directory enable Server Side ASP script debugging and Client Side script debugging.<br>On the virtual directory, set directory security for Basic Authentication only. | |
| 21 | Configure encrypted database access information<br>Open Command prompt in C:\ReTA\Architecture<br>Type 'jview Session.DatabaseUser.class'<br>When Prompted for the Architecture user id and password enter: (Userid: RetaUser, Password: RetaUser)<br>When Prompted for the Application user id and password enter: (Userid: RetaUser, Password: RetaUser) | This step creates an encrypted file located at the C:\ that contains the database connectivity information |

Web & Application Server Environment

Overview

Description

This portion of the description provides the steps necessary to configure a Microsoft Internet Information Server (IIS) web server and an application using Microsoft Transaction Server for use on a ReTA engagement.

Assumptions

This portion of the present description assumes:

That the target hardware configuration for both the web and application server meets the specified requirements for the software being installed.

Embodiments mentioned within this portion of the present description may not be current as of the time of this reading. Care should be taken to ensure that the latest embodiments are used and that individual installation processes are reviewed to ensure that any changes are followed.

Individuals performing this installation have experience in Microsoft platforms and tools, and are familiar within web-based application development.

Physical Configuration

Figure 66:
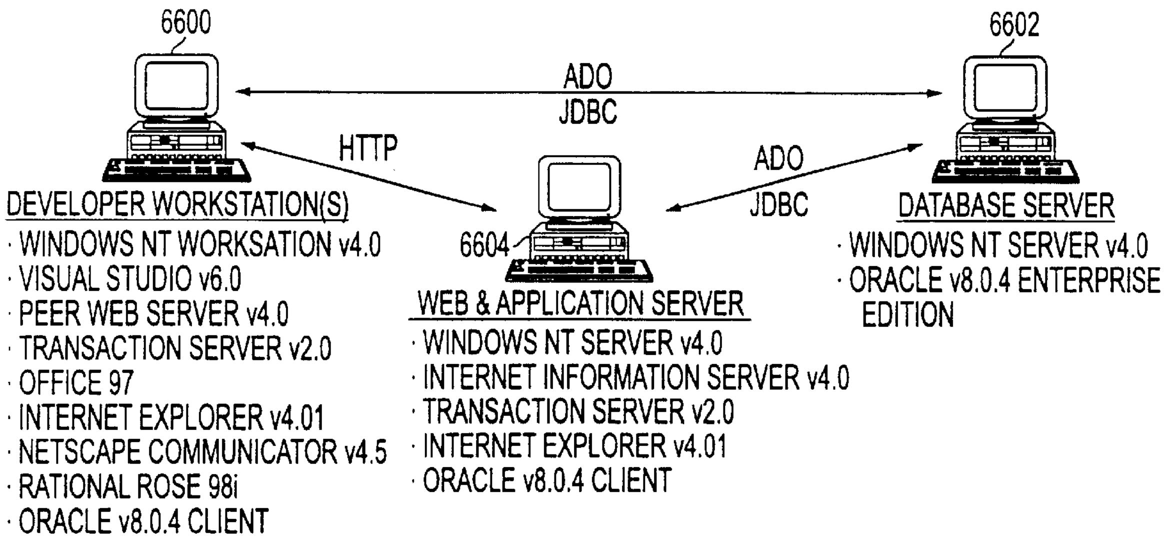
FIG. 66 illustrates the development environment configuration for a ReTA Phase 1 engagement according to an embodiment of the present invention.

FIG. 66 illustrates the development environment configuration for a ReTA Phase 1 engagement. A developer workstation 6600, a database server 6602, and a web and application server 6604 are connected together.

Installation Process

This is the script for the preparation of the run-time environment for the application and web server. It is applicable to a computer running Windows NT Server 4.0 Enterprise Edition.

Install/Configure Web and Application Server Components

| Step | Step Description | Notes |
|---|---|---|
| 1 | Install Windows NT Server v 4.0 Enterprise Edition.<br>Run install for Windows NT Server 4.0 from boot disks. | It may be necessary to reboot the computer after the installation. |
| 2 | Install Service Pack 4.0 for Windows NT 4.0<br>Run install for Service Pack 4.0 (available from the Microsoft Website). Ignore any warning messages during the later steps of the installation process related to the use of the Service Pack. | It may be necessary to reboot the computer after the installation. |
| 3 | Install Internet Explorer 4.01 Service Pack 1.<br>It is not important whether the desktop shell update is installed or not. This step also installs the Java virtual machine used by the application. It may be necessary to reboot the computer after the installation. | This step installs the Java virtual machine used by the application. Reboot if prompted. |
| 4 | Set up the Web and Application Server.<br>Install the NT Option pack from the supplied media. This may not be possible unless the previous step has been completed correctly.<br>Choose to install the "custom set-up" of the option pack.<br>Double click on the Personal Web Server component.<br>Check the box for the Internet Service Manager component<br>Click OK.<br>Double Click Transaction Server.<br>Check box for Transaction Server Development.<br>Accept default location for WWW Service install, Click Next<br>Accept default for Transaction Server (should be Administration->local).<br>Application may begin to install. | Installs IIS 4.0 and MTS 2.0. Reboot when prompted. |

Install/Configure Database Connectivity

| Step | Description | Notes |
|---|---|---|
| 5 | Install Oracle 8 Client.<br>Install Oracle Client Software R 8.0 from the CD<br>Accept default home location.<br>Choose Custom Installation.<br>Select Oracle 8 Client Application User Products.<br>Click Install.<br>De-Select Oracle Objects for OLE.<br>Click OK<br>Click Exit when finished. | Oracle 8 Client installed. |
| 6 | Configure Oracle Networking<br>Use the Oracle Net8 Easy Config Utility to define a local service name. To perform this operation one may need to know the name of the Oracle instance (default is 'ORCL'), the hostname of the server that Oracle resides on, and the port that the Oracle database listener is on (default is 1521).<br>Refer to the help portion of the present description installed in step 5 for assistance. | Net8 provides the networking component of Oracle8. |
| 7 | Update MTS Settings for Oracle 8 client compatibility<br>Open REGEDIT and within the LOCAL_MACHINE\SOFTWARE key modify the Microsoft\Transaction Server\Local Computer\My Computer entries:<br>Change the OracleSqlLib to "sqllib80.dll"<br>Change the OracleXaLib to "xa80.dll" | Currently, MTS v2.0 installation is based on using Oracle 7.3 for Oracle connectivity. |

-continued

| Step | Description | Notes |
|---|---|---|
| 8 | Install Microsoft Data Access Components<br>Run install from NT Server 4.0 SP 4.0 disk (Caution, do not install NT Service Pack 4.0 at this time)<br>Select Custom Install.<br>De-select everything except for ODBC Components, OLE DB components, Microsoft Remote Data Services and ODBC driver for Oracle databases. | Microsoft ODBC for Oracle driver (MSORCL32.DLL v 2.573.292700) installed<br>Reboot if prompted. |
| 9 | Run MTS/Oracle Configuration Test Utility<br>Copy the Oracle 8.0 version of TestOraclexaConfig.exe (from the Tools project within VSS) to your C:\Program Files\Mts folder.<br>Copy over the existing .exe (version 7.3 compatible).<br>Run the TestOraclexaConfig.exe from the command line; i.e.<br>TestOraclexaConfig.exe -U<username>-P<password>-S<Net8 Service><br>Ex. TestOraclexaConfig.exe -URetaUser -PRetaUser -SReta1 | Use this test to ensure your oracle client connection is transactional. MTS installs Oracle 7.3 compatible utility by default. |
| 10 | Create Architecture and Application DSN's (Data Source Names).<br>Run the 32Bit Administrator in the Control Panel. Make sure that the tab for System DSN is selected.<br>Select Add, then Microsoft ODBC for Oracle<br>The Data Source Name is AFUser, and the Server "reta1" for the above example)<br>Repeat the above two steps to add DSN's for the data sources AFPersistence, AFEvent, AFSession and AFOrder | This process sets up an ODBC connection from the developers' machine to the Database Server. |
| 11 | Test the DSN's defined<br>Test the connections established above using the 32 Bit ODBC Test utility in the Oracle for NT folder off the Start menu.<br>Select Connect, then Machine Data Sources, then one of the connections established above. | |

Configure Java Runtime Components

| Step | Description | Notes |
|---|---|---|
| 13 | Apply Software Updates<br>Install the updated latest Java Virtual Machine (Downloaded from Microsoft) | Reboot when prompted. |
| 14 | Update the Runtime Java Classes<br>Using the WinntJava.Zip file provided within the Tools project of SourceSafe:<br>Extract all files (use folder names) to C:\WinNT\Java. | |
| 15 | Create System Environment Variables<br>Define the following Environment Variable;<br>CLASSPATH<br>C:\ReTA\Architecture;C:\ReTA\Application;C:\winnt\java\classes;C:\winnt\java\packages;c:\winnt\java\trustlib<br>IF using this machine for development, Add the following:<br>INCLUDE<br>INCLUDE; add<br>C:\ReTA\Architecture;C:\ReTA\Application;C:\Program Files\Microsoft Visual Studio\VC98\Include;c:\Program Files\MTS<br>PATH<br>-PATH; add C:\orant\bin;C:\Program Files\Mts;C:\Program Files\Microsoft Visual Studio\Common\Tools\;C:\Program Files\Microsoft Visual Studio\VC98\bin;C:\Program Files\Microsoft Visual Studio\VJ98 | This variable is used by the Java Virtual Machine to find Java runtime classes.<br>These variables are used by the development tools for application and architecture builds. |
| 16 | Install Service Pack 4.0 for NT<br>Run install for Service Pack 4.0. | Reboot when prompted |

IF Using this Machine for Development: Install and Configure Development Software

| Step | Step Description | Notes |
|---|---|---|
| 16 | Install Microsoft Visual J++<br>If install detects an out of date version of IE 4.0 then accept the | Restart if prompted. |

-continued

| Step | Step Description | Notes |
|---|---|---|
| | version offered by VisualJ++6.0.<br>Reboot Computer, leave CD in drive.<br>Start install for Visual J++ v 6.0, select Install Visual J++6.0 option.<br>Select Custom install:<br>Click Data Access, click Change Option button, click Microsoft ODBC Drivers and click Change Option button, -De-Select Microsoft SQL Server ODBC Driver and Microsoft Oracle ODBC Driver, Click OK twice, Click Continue button. | |
| 17 | Install Microsoft Visual Studio 6.0 Components.<br>Select Custom install:<br>De-select everything except for Microsoft Visual SourceSafe 6.0 and Microsoft Visual C++6.0. Ignore warning message when deselecting the Data Access check box.<br>Click on Microsoft Visual C++6.0<br>Click Change Option.<br>De-select everything except for VC++Build Tools.<br>Click OK button.<br>Click Continue.<br>Click OK on register environment variables.<br>Click YES on Visual SourceSafe Database Format dialog. | Restart if prompted. |
| 18 | Apply Software Updates<br>In the event that updates are available for either Visual J++ or Visual C++, apply them now. | |
| 19 | Install Service Pack 4.0 for NT<br>Run install for Service Pack 4.0. | |
| 20 | Configure Web Server<br>Start the Internet Service Manager<br>Add a virtual directory where the application may start.<br>On the virtual directory enable Server Side ASP script debugging and Client Side script debugging.<br>On the virtual directory, set directory security for Basic Authentication only. | |
| 21 | Configure encrypted database access information<br>Open Command prompt in C\ReTA\Architecture<br>Type 'jview Session.DatabaseUser.class'<br>When Prompted for the Architecture user id and password enter: (Userid: RetaUser, Password: RetaUser)<br>When Prompted for the Application user id and password enter: (Userid: RetaUser, Password: RetaUser) | This step creates an encrypted file located at the C:\ that contains the database connectivity information. |

Standards

Objectives

Purpose

The purpose of this guide is to provide a reasonable set of coding standards and recommendations for producing structured, reliable and maintainable portion of the present descriptions in the HyperText Markup Language (HTML) on the World Wide Web.

This guide is intended for programmers who are at least familiar with the basics of the HTML. Accordingly, no attempt is made to explain HTML concepts such as frames and tables.

Scope

These standards are intended to be independent of any particular hardware, operating system, or development tool. Due to the nature of the Internet, platform independent code is imperative.

This guide covers standards for HTML 2.0: and does not cover standards for HTML 3.2. This embodiment can be assumed to be "safe" for all Web browsers. However, HTML 3.0 and 3.0+ offer an extensive array of non-standard elements which enhances the presentation of a Web page. This guide may include tables and frames which are not fully supported by all browsers. Thus, when implementing tables or frames, it is important to consider your target audience and the type of browsers they may be using to surf the Internet.

There are a variety of tools to aid the authoring process of HTML. A HTML editing tool like WebEdit or a HTML template like Internet Assistant may not be consistent with our standards and guidelines. Projects using these HTML editors and converters are subject to the proprietary standards of their respective software applications. Convention In this guide, standards are presented as follows:

* Text for rule or standard here.

The statement of one or more standards is usually followed by a discussion of the standard(s). Such a discussion may include justifications for using the particular rule, common alternatives, other supplementary information, or even situations where the standard may not apply.

Program Organization

Source Code

Organize source code as follows:

file comment block
<HTML>
<HEAD>
<TITLE>
</TITLE>
</HEAD>

<BODY>
insert body text
</BODY>
</HTML>

Defining a standard source file layout makes it easier to understand and maintain code written by other programmers.

File Names

HTML files adhere to the same naming and directory standards set forth by the Internet Center of Excellence (ICE). For more information, refer to the ICE portion of the present description on file naming and directory standards.

Programming Styles

HTML Tags

* All HTML tags and attributes should be capitalized. HTML is not case sensitive, however, to preserve readability, it is important to adhere to uppercase lettering for HTML tags.

However, some HTML editors, such as Microsoft FrontPage, generate lower-case HTML tages. Since more HTML editing may probably be done through similar tools, it does not make sense to have to go back through the code and make any changes. For this situation, simply adopt the format that your HTML tool generates, and make it consistent throughout your project.

* All open tags must be terminated by an end tag.

Excluding tags such as <LI>, <HR>, <BR>, <IMG>, <META>, <BASE> and <P>, it is important to close a HTML tag with a </(tag name)>. For example, an open HTML tag is <HTML> and a closed HTML tag is </HTML>. Failure to close a HTML tag may cause undefined behavior with the appearance of the HTML page.

* Do not skip levels of headings.

Headings should be not more than one level below the preceding heading level. For example, <H3> should not follow <H1>.

* Use underline for hypertext links only.

Adhere to this standard to eliminate any confusion between a hypertext link and a text underlined for emphasis. To emphasize text, use the following tabs: <EM> for emphasis in italics, <STRONG> for text emphasis, <B> for bold and <I> for italics.

* Employ the logical styles rather than physical styles.

Not all browsers are capable of displaying italics <I> or the boldface <B> tag. Physical styles indicate the specific appearance of individual words or sentences and include such tags as <B> for bold text, <I> for italic text, and <TT> typewriter text, e.g., fixed-width font. The following is a list of logical styles tags:

<CITE> for citation (e.g., HTML Coding Standards). Typically displayed in italics.

<CODE> for computer code (e.g., Enter <stdio.h> header file). Typically displayed in a fixed-width font.

<DFN> for definition (e.g., Guru means god-like). Typically displayed in italics.

<EM> for emphasis (e.g., It is advisable that one uses this than typing italics within a tag). Typically displayed in italics.

<KBD> for user keyboard entry (e.g., Enter passwd). Typically displayed in a fixed-width font.

<SAMP> for a sequence of literal characters (e.g., Segmentation fault: Core dumped). Typically displayed in a fixed-width font.

<STRONG> for strong emphasis (e.g., NOTE: This is a reminder). Typically displayed in bold.

<VAR> for a variable (e.g., rm filename deletes the file). Typically displayed in italics.

* The use of <P> should be avoided directly before any other element which already implies a paragraph break.

The <P> element should not be placed before the headings, HR, ADDRESS, BLOCKQUOTE, or PRE.

It should also not be placed immediately before a list element of any stripe. That is, a <P> should not be used to mark the end-of-text for <LI>, <DT>or <DD>. These elements already imply paragraph breaks.

* Investigate the possibility for using server-side includes for repeated blocks of HTML, such as footers and headers.

The server-side include tag allows one to keep one copy of a footer or header. Updating this one copy may update all portion of the present descriptions that reference it.

Investigate the Client's use of the <META> tag, which is used to help with searches and portion of the present description information.

The <META> tag provides a way to store information about the portion of the present description that is not available elsewhere in the portion of the present description. For example, the META tag can contain catalog, author, or index information that various search engines can use.

An example might be:

<HEAD>

<META NAME="keywords" CONTENT="HTML portion of the present description reference Netscape">

</HEAD>

This portion of the present description is indexed under the terms "HTML", "portion of the present description", "reference", and "Netscape".

HTML Tag Parameters

* Include HEIGHT and WIDTH attributes in all IMG tags.

Adhering to this standard may eliminate the problem when using JavaScript code in HTML portion of the present descriptions with IMG tags. Without the HEIGHT and WIDTH parameters in IMG tags, JavaScript event handlers are ignored on subsequent form elements and also images are not displayed on screen. As good practice, it is recommended to include all parameters in their appropriate HTML tags.

* Include alternate text for images.

Some Web browsers cannot display images and some Web users may not want to use image loading even if their software can display images because they are have a slow connection. For these browsers and users, the ALT attribute specifies the text to be displayed instead of the image. For example, <IMG SRC="aclogo.gif" ALT="Andersen Consulting logo">. If a Web browser cannot display aclogo.gif or a Web user wishes not to view the logo, the text "Company Logo" may be displayed to screen instead.

* Indicate a specific font size rather than incrementing it with the ±.

Be careful when using the ± in the SIZE attribute in the FONT tags. Some Web users re-configure the font sizes in their Web browsers and the consequences of using the ± may have an adverse effect on the text.

* Always have <NO FRAMES> tags following the <FRAMESET> tag. Not all Web browsers are "frame-capable." Those "frame-capable" browsers may see the frames layout and others may view an alternate or a normal page without frames. The code for the page without frames is bounded by the open and closed NO FRAMES tag set and includes the open and closed BODY tags and all code therein. For example:

```
<FRAMESET COLS="80%,20%">
  <FRAME NAME="column1" SCROLLING="no" NORESIZE
SRC="col1.html">
  <FRAME NAME="column2" SCROLLING="yes" NORESIZE
SRC="col2.html">
</FRAMESET>
<NO FRAMES>
<BODY>
body text
</BODY>
</NO FRAMES>
```

Path Names

In general, use relative links when referencing internal files. There are exceptions to this standard and a, uniform scheme should be determined prior to HTML development.

In general, it is easier to move a group of portion of the present descriptions to another location because the relative path names may still be valid. Also, relative paths are more efficient to connect to the server. An example of a relative path to a file "california.html" located in the subdirectory "unitedstates" would be:

```
<A HREF="unitedstates/california.html">California</A>.
```

Absolute pathnames link to portion of the present descriptions that are not directly related and require the complete Uniform Resource Locator (URL) of the file. An example of an absolute path to a file "mteverest.html" in the subdirectory "nepal" on another server "Hiking Expeditions" would be:

```
<A HREF="www.hiking.com/nepal/mteverest.html">Trekking on Mt.Everest</A>.
```

When making a directory reference, it is important to make sure to have a trailing slash on the URL.

For example, <A HREF="http://www.ac.com/news/"></A> is correct, while <A HREF="http://www.ac.com/news"></A>is not.

Formatting

General

Consistent use of a suitable formatting style makes HTML portion of the present descriptions much easier to read, comprehend, and maintain. Choosing a reasonable style and using it consistently is more important than the details of the style itself.

Screen Resolution

* All HTML files should be designed to fit on a 640×480 screen. This standard is set forth for consideration of most display monitors, especially laptop users who have screen resolution of 640×480 only.

* Indent HTML tags when creating tables, frames, and lists. Consistent use of a suitable formatting style makes programs much easier to read, comprehend and maintain. An example of this is as follows:

```
<TABLE BORDER=0 CELLSPACING=0
  CELLPADDING=0>
  <TH>Sample Heading</TH>
    <TR>
<TD>Row 1 Column 1<TD>
<TD>Row 1 Column 2</TD>
<TD>Row 1 Column 3</TD>
       </TR>
    <TR>
<TD>Row 2 Column 1</TD>
<TD>Row 2 Column 2</TD>
<TD>Row 2 Column 3</TD>
       </TR>
</TABLE>
```

An example of formatting an unnumbered list is as follows:

```
<UL TYPE="square">
  <LI>Alligator
  <LI>Bear
  <LT>Cat
    <UL>
       <LI>Siamese Cats
       <LI>Persian Cats
       <LI>Tabby Cats
    </UL>
  <LI>Deer
</UL>
```

As one may notice, no closing LI tag is needed. The same format above would apply for numbered, i.e., <OL> and definition lists, i.e., <DL>.

Portion of the Present Description (Comments)

General

Include comments in code as it is being written and update them accordingly.

Remember that bad comments are worse than no comments at all!

Comments are also convenient for commenting out several adjacent lines of code for debugging purposes.

Inline Comments

* Insert portion of the present description information at the top of each HTML file in comment tags.

All HTML files should begin with the following information:

```
<!-- Portion of the present description name: -->
<!-- Description: -->
<!-- Author: -->
<!-- Date created: -->
<!-- Last modified on: -->
<!-- Any applicable copyright notices -->
```

* Comments should begin with <!-- and closed with -->.
* Include comments in places where the code is unclear and/or nonportable.
* Place comments above the appropriate tag/link.
* Indent inline block comments to the same level as the code they describe.
* Do not include comments for actions that can be stated in the language itself.

Good inline comments are brief and to the point; the author should assume that the reader is reasonably competent.

* Date Created and Date Modifications should be in the format of "January 10, 1996", not "01/10/96".

This is because, for some audiences, especially those from Europe, "01/10/96" means "October 01, 1996".

* Portion of the present description modifications in comment tags.

If we are maintaining portion of the present descriptions on a long-term basis, not just for development, the following standard should be used to maintain HTML source.

Add notation to portion of the present description header.

Initialize and date the beginning and ending of modification if multiple lines.

Example of this is:

<!-- January 10, 1996 STP: Begin modified table entries --> table . . .

<!-- January 10, 1996 STP: end of modification -->

If single line modification, only mark line above.

Common Mistakes

This portion of the description lists a few of the most common mistakes made by HTML designers, experienced as well as beginners. They are as follows:

Remember to close HTML tags.

Remember to close all attribute tags with a quote. For example, linking to Andersen Consulting's Web site may look like: <A HREF="http://www.ac.com">. However, people may inadvertently leave off the close quote and instead type: <A HREF="http://www.ac.com>.

Be sure all HTML files contain the main opening and closing tags in their respective order as follows:

```
<HTML>
  <HEAD>
    <TITLE>
    </TITLE>
  </HEAD>
  <BODY>
  </BODY>
</HTML>
```

Test all hyperlinks after completion of a HTML file. A character reference and an entity reference are ways to represent information that might otherwise be interpreted as a markup, tag. For example:

< represents <symbol;

> represents >symbol;

" represents "mark;

& represents & symbol.

The most common errors in the use of entity references are leaving off the trailing semicolon and adding unnecessary spaces before and/or after the entity/character reference.

Java Programming Standard

Introduction

This portion of the present description describes the Programming Standard for Java in the Telebank project. It covers typical programming standard material, including the following:

Program organization

Naming standards

Code layout

Comments

In addition, it covers the following material:

Coding priorities

Programming style

Error handling

Debugging and Testing

The purpose of this portion of the present description is to help ensure a uniformly high source code quality. The rules and guiding principles have been chosen to support this goal. In cases with more than one acceptable alternative, one alternative has been chosen (more or less arbitrarily) rather than leaving it up to the individual programmer. The purpose of this is to ensure consistency in the source code. Note: Some of the rules are beneficial only if applied consistently. Apply them!

Coding Priorities

This portion of the description defines coding (and, to some extent, design) priorities on the various platforms. The first table defines the meaning of each priority item; the second table specifies their ranking on the three platforms.

Use these tables as a guide for resolving design and implementation issues. In some cases, coding priorities are clearly opposed to one another. As an example, consider a choice of sorting algorithms. For simplicity and safety, there is nothing to beat the bubble sort—it is simple enough that one can code it from scratch each time one needs it and still be fairly confident that it works correctly the first time. The problem is, the bubble sort is slow. Just about any other sorting algorithm may be faster; it may also be complex enough that one may need to crack a book to implement it. In addition, one may have to test more thoroughly to be confident that the code works correctly.

In other cases, coding priorities work together. Small often equals fast, for example.

Definitions of Priority Items

| Item | Definition |
|---|---|
| Correctness | The code works correctly. This item might seem superfluous, but experience tells us differently. |
| Size | This does not refer to the number of source code lines, but to the total size of compiled code (the .class files). It also includes overhead imposed by non-functional data, e.g., strings used internally in the program. Traditionally, size also includes memory usage. In our case, the client/server network connection is the most important bottleneck; what counts is what goes over the wire. |

-continued

| Item | Definition |
|---|---|
| Speed | This includes both execution speed (as measured by CPU usage) and perceived responsiveness from the user's point of view. These are not necessarily the same thing.<br>A guideline is to make the code fast enough, but not to waste time making it faster than that. If one needs to sort 5 records, choose bubble sort. If one is sorting a million records, choose Quicksort.<br>Speed bottlenecks are rarely obvious. Before one decides that an operation or a subsystem needs optimization, try to get hard data on where the real bottleneck is. |
| Robustness | Tolerance towards erroneous input and other error conditions. This does not mean that a program or routine should accept garbage, but that is should handle it gracefully. |
| Safety | Choose the implementation that one is most likely to develop without any bugs. |
| Testability | Easy to test |
| Maintainability | Code that is easy to maintain typically has several characteristics:<br>It is easy to read and understand.<br>It is well encapsulated. This allows changes (updates or fixes) to be made with some confidence that it won't blow up something else.<br>Portion of the present description, including comments in the code, is in agreement with the code. |
| Simplicity | |
| Reusability | This can mean class or function reuse in the same project, or it can mean preparing for reuse on a later project Designing for reuse typically has an overhead of around 50%, split among additional design time (to find good generalizations), additional portion of the present description requirements and additional testing.<br>A good compromise is often just to choose a design that does not preclude reuse; the best tool for this is known as encapsulation. |
| Portability | The code is reusable across platforms. Coding for portability typically entails such things as:<br>Using a cross-platform library<br>Using a subset of a language or library that is common and consistent across platforms<br>Isolating platform dependencies<br>In the specific case of Java, we need to accommodate differences between Java VM implementations, differences between library implementations and differences between host GUIs.<br>Java as a totally portable programming environment is a myth. One consequence is that we must test on a number of platforms-different hardware platforms, different operating systems and different Web browsers. |

Priority Rankings

These rankings are specific to the Telebank project.

| Client | NT Server | Host |
|---|---|---|
| Correctness | Correctness | Correctness |
| Size | Robustness | Robustness |
| Testability | Safety | Safety |
| Portability | Testability | Speed |
| Robustness | Speed | Testability |
| Safety | Maintainability | Maintainability |
| Maintainability | Simplicity | Simplicity |
| Simplicity | Reusability | Reusability |
| Reusability | Portability | Portability |
| Speed | Size | Size |

Program Organization

Module Organization

The term module in this context refers to a-source file. A source file should contain one public class; it may contain additional non-public classes.

The elements of a module should be in the following order:

Package name

Import section

Class definition(s).

Class header

Constants (final class variables): public, protected, private

Public static inner classes

Protected inner classes, static or otherwise

Private inner classes, static or otherwise

Class variables (private only)

Fields (instance variables) (private only)

Constructors

Other methods.

When ordering methods, ignore visibility specifiers (public, protected, private) and follow these guidelines instead:

Keep related methods together

When overriding superclass functions, keep them in the same order as in the superclass, and preferably together.

The class should end with the unitTest, getExpectedResult and main methods.

Module Header

The module header consists of the package name and the import section. In addition, there should be a comment at the top with SourceSafe keywords. With these in place, we can see at a glance what this file is about:

```
/*
 * $Archive: $
 * $Revision: $
 * $Date: $
 * $Author: $
 */
```

In the import section, list each imported module explicitly.

Example

| Right | Wrong |
|---|---|
| IMPORT JAVA.AWT.FRAME; | import java.awt.*; |
| IMPOPT JAVA.AWT.GPAPHICS; | import java.awt.event.*; |
| IMPORT JAVA.AWT.EVENT.WINDOWADAPTER; | import java.applet.*; |
| IMPORT JAVA.AWT.EVENT.WINDOWEVENT; | |
| IMPORT JAVA.APPLET.APPLETCONTEXT; | |

Neither of these conventions is consistently maintainable, so don't put a lot of work into verifying that all listed modules are used. Likewise, don't spend time converting existing modules from one format to the other.

Code Layout

A good layout strategy should accurately and consistently represent the logical structure of the code, it should make the code readable, and it should be easy to maintain. The rules in this portion of the description are designed to meet those criteria.

Class Headers

Write class headers on a single line if there is room for it.

If not, break the line before extends and implements. Indent succeeding lines. If the class header is on a single line, put the opening brace at the end of that line. If the class header needs multiple lines, put the opening brace left aligned on a line by itself.

Method Headers

Write method headers on a single line if there is room for it.

If not, break the line immediately after the opening parenthesis. This leaves all the parameters on the same line.

If there still isn't enough room, put each parameter on its own line.

If the method header is on a single line, put the opening brace at the end of that line.

If the method header needs multiple lines, put the opening brace left aligned on a line by itself.

Indentation

Indentation is three (3) spaces. Actually, indentation is one tab, which should be set to display as three spaces.

Use tabs for indentation only. Any white space after the indentation level should be actual spaces, so that the formatting may be reasonable no matter how many spaces a tab equals.

White Space in the Code

Whitespacedoes,ingeneral,enhancereadability.

Add one space in the following places:

between operators after comma in method declarations and invocations after semicolons in f or-loops after opening parentheses before closing parentheses after opening square bracket (index operator)

before closing square bracket before and after the assignment operator

No space in the following places:

Between a method name and the opening parenthesis

Between opening and closing parentheses in a function declaration or invocation with an empty parameter list Between opening and closing square brackets in an array declaration where the number of elements is not specified This example illustrates the above rules:

```
IF (!MYCOMBOVALID) {
   myAccounts.removeAll( );
   for (int iAccount=0; iAccount<accountList.size( );
++iAccount ) {
      MYACCOUNTS.ADDITEM(ACCOUNTLIST.
         GET (IACCOUNT
).TOSTRING( ));
   }
   final String strAccount=ContextManager.query
      (SOME_ID
);
   int nIndex=getAccountIndex(strAccount);
   myAccounts.select(Math.max(0, nIndex));
   myComboValid=true;
}
. . .
private String myTitles[ ]=null; // array of strings
myClient.height=
   size.height-myInsets.top-myInsets.bottom-
myTitle.height;
. . .
public String getItem(int nRow, int nColumn) {
   return (String) myVlist[nColumn ].elementAt(nRow);
}
```

Use blank lines to separate "paragraphs" of related code lines.

Indentation hints for the Visual Studio Editor

Ctrl+Shift+8 toggles visibility of tabs and spaces.

To indent or outdent sections of code, select the code (at least one complete line) and use tab for indent, Shift-Tab for outdent.

To auto-format sections of code, select the code and hit Alt+F8.

Alt+Enter in the source window brings up:the source file property dialog, which allows one to set indentation levels on a file-by-file basis. This is useful for viewing sample code, which is often formatted weirdly.

To set the number of spaces displayed per tab, select the Editor tab on the dialog box served up by the Tools, Options command:

Braces and Line Breaks

Figure 67:
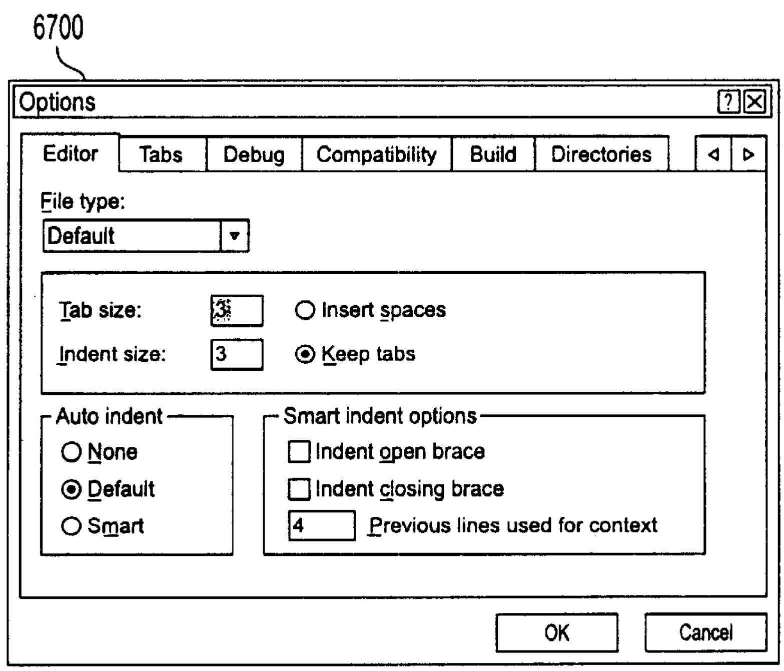
FIG. 67 illustrates an interface associated with the ability of inserting or removing statements within a block without worrying about adding or removing braces according to an embodiment of the present invention.

Always use (curly) braces, even for blocks with only one statement. This removes one common source of bugs and eases maintenance:

FIG. 67 illustrates an interface 6700 associated with the ability of inserting or removing statements within a block without worrying about adding or removing braces. One never has a problem matching else clauses to if clauses.

Example

| Right | Wrong |
|---|---|
| IF ( NBOTTOM < NINDEX ) {<br>  MYTOPROW = NINDEX − ROWS( ) + 1;<br>} ELSE IF ( NINDEX < MYTOPROW ) {<br>  MYTOPROW = NINDEX;<br>} | if ( nBottom < nIndex )<br>  myTopRow =<br>nIndex − rows( ) + 1;<br>else if ( nIndex <<br>  myTopRow )<br>myTopRow = nIndex; |

This rule applies to the following constructs:

for, while and do-while loops if-else statements try, catch and finally clauses synchronized blocks.

Note that the opening brace is at the end of the first line, even for class and method definitions. The only exception is if the expression needs to be broken; in that case, readability is best served by putting the opening brace on the next line.

Aligning Assignment Statements

Align the=of related assignment statements. This sets them off as a group and shows clearly that they are related.

Do not align the =of unrelated statements. Such alignment gives an erroneous impression of relatedness.

Example

| Right | Wrong |
|---|---|
| nPanelWidth = 90;<br>nPanelHeight = 30;<br><br>nSelectedIndex = 0;<br>nLastIndex = 12; | NPANELWIDTH = 90;<br>NPANELHEIGHT = 30;<br>NSELECTEDINDEX = 0;<br>NLASTINDEX = 12; |

Line Lengths and Line Breaks

One statement per line.

Try to keep line lengths below 80 characters. This rule is not absolute; it is better to have a 90-character line than to break a statement.

If one must break a line, indent the continuation line(s).

If one must break a line, make it obvious by ending the first line with something that needs a continuation:

Break assignments after the assignment operator.

Break arithmetic and logical expressions after an operator.

Break the line to emphasize major sub-expressions.

Break method invocations after the opening parenthesis. If the parameter list still won't fit, break between each parameter or between each logical group of parameters if this seems better.

Break method declarations the same way, and put the opening brace on the next line, unindented.

If one need to break conditional expressions (e.g., in if or while-statements), follow rules 1 and 2 above, and put the opening brace on the next line, unindented. Using extra variables top hold partial (intermediate) expressions can help one avoid line breaks and at the same time improve readability by making the code self-portion of the present descriptioning. This is a judgement call; the following example goes too far, perhaps, but does at least illustrate the point:

Original condition

```
IF ( LCLICKTIME − MYPREVIOUSCLK < DOUBLECLICK_TIME
&& MYSELECTION == NROWCLICKED )
{
. . .
}
```

Possible rewrite

```
FINAL LONG LCLICKINTERVAL = LCLICKTIME −
MYPREVIOUSCLK;
FINAL BOOLEAN BDOUBLECLICK = (LCLICKINTERVAL <
DOUBLECLICK_TIME);
FINAL BOOLEAN BCLICKSAMEROW = (MYSELECTION ==
NROWCLICKED);
IF ( BDOUBLECLICK && BCLICKSAMEROW ) {
. . .
}
```

Switch/case Layout

Align each cases with the switch. Additional indenting of the cases does not contribute measurably to display the logical structure of the program, and leads to excessive indentation. Indent the statements that belong to a switch, one statement to a line. In the case of large, repetitive lists of cases, it may be better to do a table layout as follows:

```
switch (some__value) {
case case1: bla__bla[0]=value1; break;
case case2: bla__bla[0]=value2; break;
case case3: bla__bla[0]=value3; break;
. . .
}
```

Consider, though: In cases where this looks good, perhaps a totally table-driven solution would be a better solution.

Anonymous Classes

An anonymous class is a particular form of inner classes; an innovation of Java 1.1. It is a curious enough construct that we supply two examples of how to format it. If one uses a class more than once, assign an instance to a variable:

```
ACTIONLISTENER ACTIONLISTENER=NEW
  ACTIONLISTENER ( ){
  public void processActionEvent(ActionEvent e){
    . . .
  }
};
myComboBox.addActionListener(actionListener);
myButton .addActionListener(actionListener);
```

More often than not, the anonymous class is a listener designed to handle events from one specific widget only. In this case,,define and instantiate the class directly in the code, as follows:

```
MYCOMBOBOX . ADDACTIONLISTENER(NEW
  ACTIONLISTENER( ){
  public void processActionEvent(ActionEvent e){
    . . .
  }
});
```

Naming Conventions

Package Names

Package names are always in lower case. To ensure global uniqueness, package names are prefixed with no. dnb. tb.

File Names

Path: The path follows the package name. If a file is part of the package no. dnb. tb. client, and one is using C:\Data\Telebank as your root directory, the path to the file is: C:\Data\Telebank\no\dnb\tb\client Note lower-case names of intermediate directories.

The name of the file must be the same as the name of the public class defined in the file (with exactly the same case), with the extension . java. Thus, the class Kontoutskrift in package no.dnb.tb.client. func resides here: C:\Data\Telebank\no\dnb\tb\client\func\Kontoutskrift.java Classes Use proper case for all class names, with first character upper case.

Separate multi-word class names using capitalization with no leading underscore. Architectural classes have English names; functional classes have Norwegian names (?)

Examples class FunctionPanel . . .

class Kontoutskrift . . .

A Note on Proper Case Identifiers

To create a proper case identifier, write down the identifier as normal words, e.g., "get customer name". Next, capitalize each word except possibly the first, which is only capitalized for classes: "get Customer Name". Finally, concatenate the words into a single word: getCustomerName.

Note that compound word usage differs across languages. If the above example were in Norwegian, the name should be hentKundenavn, not hentKundeNavn!

Methods

Method names are in proper case, with initial lower-case letter. If possible, construct method names that follow the action-object paradigm, i.e., getAccount, printAll. Prefer getSize( ) to size( ); this is consistent with changes to Java in JDK 1.1.

Method names do not use any hungarian prefixes to indicate return type. Return type can often be indicated by an object name in the method name, i.e., getAccountList.

Methods are called in the context of their class. Accordingly, it is not necessary to repeat the class name in method names. If the class Customer has a method to retrieve the customer's name, name this method getName rather than getCustomerName. When users of the class invoke this method, they write something like customer.getName ( ), which is preferable to customer.getCustomerName( ).

Fields

A field is a non-static member variable, sometimes called an instance variable.

All field names start with the characters "my", followed by a mixed-case identifier.

This is standard practice in Java programming, and reminiscent of the C++ convention of prefixing member variables with "m_".

Since the "my" convention is not easily combined with hungarian prefixes, try to make the type obvious in the variable name.

Examples private Dimension mySize;

private Account myAccount;

Class Variables

A class variable is a static member variable.

All class variables start with the characters "the", followed by a mixed-case identifier. Since this convention is not easily combined with hungarian prefixes, try to make the type obvious in the variable name.

Examples private static AccountList theAccountList;

Local Variables

Local variables use hungarian prefix conventions. The following prefixes are used:

| Prefix | Data type | Examples |
|---|---|---|
| Str | String | strServer, strTitle |
| N | Integer | nCustomers, nWidth |
| I | Integer used as an index in a for loop | iCustomer, i |
| A | Array (put this in front of other prefix) | astrTitles [ ] |
| Pnl | Panel | pnlMain |
| clr | Color | clrForeground, clrBackground |
| . . . | . . . | |

Although this table may get additional entries over time, most objects do not have defined prefixes and never may. A reasonable name is often the same as the class name, but with lower-case first character, e.g.:

Account account= getContext( ).getCustomer( ).getAccount( );

Constants

Constants are "static final" members of classes. Java has adopted the C convention for #defined constants and uses upper-case names.

Examples public static final int DEFAULT_COLOR=Color.black;

private static final String DEFAULT_SERVER="\\LF3DEV01";

Javadoc comments are required for public, protected and package constants.

Exceptions

Exception names follow class naming conventions, with the additional requirement that the name end in Exception.

Programing Style

This portion of the description covers layout conventions and coding principles.

Visibility (Scope)

As a general rule, scope should be as narrow as possible. All fields and class variables should be private.

If one absolutely needs outside access to such fields, use access methods, e.g.:

```
CLASS PERSON {
  private String myName;
  public void setName( Sring strName ) {
    MYNAME=STRNAME;
  }
  public String getName) {
    RETURN MYNAME;
  }
  . . .
}
```

Be aware, however, that a proliferation of access methods conflict with the principles of good object-oriented design. Even though access is controlled, the implementation (in particular the data type) is fairly exposed; this creates a coupling between object definition and object use that may be tighter than necessary.

Try to think of objects in terms of their behavior rather than the data fields they contain. In the example above, ask yourself what one would like that Person object to be able to do, and provide methods for that instead.

Code Granularity (Method Size)

A reasonable line count for a method depends on its complexity. A module that consists of sequential statements can be longer than a method containing complex conditials and loops. If the sequential code is repetitive, such as an index-by-index array initialization, the method may be as long as it takes. (One should, however, think twice about your design. Perhaps there are better ways of doing it?)

A method should preferably do one single thing, and the method name should reflect this accurately. If it does more, ensure that this is reflected in the method name. If this leads to an ugly method name, reconsider the structure of your code. If one had a function named initPanelManagerAndReadAccountList, the code would probably benefit from a split into methods named initPanelManager and readAccountList.

Variables

Use only one variable declaration per line. This increases readability and eases maintainability:

| Right | Wrong | |
|---|---|---|
| PRIVATE INT MYWIDTH = 150;<br>PRIVATE INT MYHEIGHT = 50; | private int | myWidth = 150,<br>myHeight = 50; |

All fields and class variables should be private.

Initialization

All variables, including fields and class variables, should be initialized at the point of declaration if possible. Even though all Java declarations have default initialization values (0, null, false), spell this out explicitly.

Java allows initialization of arrays using the same syntax as C and C++, by enclosing a comma-delimited set of values in braces. A comma after the final value is permissible: use this facility, as it makes for easier maintenance—it is easier to add additional values to or remove values from the end of the list.

Java 1.1 allows initializer blocks among the declarations. An initializer block is a section of code enclosed in braces. There are two kinds of initializer blocks: static and instance.

Static initializer blocks are executed the first time a class is instantiated. During static initialization (class initialization), things happen in the following order: Class initialization of the superclass is performed, unless it has been done earlier. Static variables are initialized and static initializer blocks are executed. This happens in the order they are listed, from top to bottom. Instance variables, instance initializer blocks and methods don't figure into this.

Note that static and instance initializer blocks are allowed in Java 1.1. Static initializer blocks are executed in order when the class is first instantiated; instance initializer blocks are executed in order after the superclass constructor runs, but before the class constructor runs.

Instance initializer blocks are executed whenever a class is instantiated. During object initialization (instance initialization), things happen in the following order: If this is the first time the class is instantiated, all the class (static) initialization takes place.

We enter a constructor. If we have not specified a constructor, a default constructor with no arguments is supplied automatically by the compiler.

The superclass constructor is called. If your constructor does not explicitly invoke a superclass constructor, the default (argument-less) superclass constructor is called anyway.

All instance variables are initialized and instance initializer blocks are executed. This happens in the order they are listed, from top to bottom. Class variables, class initializer blocks and methods don't figure into this.

Use initializer blocks to perform any initialization that can't be performed by direct variable initialization; put each initializer block immediately following the variable in question. In the examples below, note that the array can be initialized without using an initializer block, while the vector object requires one because of the calls to the addElement method.

Examples

```
private Vector myListofSomething=new Vectoro( );
{// Instance initializer block
  myListofSomething.addElement( someObject );
  myListofSomething.addElement( anotherobject );
}
private static int[] anMultipliers={
  5, 4, 3, 2, 7, 6, 5, 4, 3, 2,
};
private static MyClass theMyClass=new MyClass( );
static { // Static initializer block
  theMyClass.setvalue( somevalue );
}
```

Variable Usage

Always use a variable for a single purpose. At times it is tempting to reuse an existing variable; avoid this temptation:

```
int i;
. . .
for ( i = 0; i < myAccountList.size( ); ++i ) {
  . . .
}
. . .
```

-continued

```
// Swap elements:
i = someArray [ 0 ];
someArray [ 0 ] = someArray [ 1 ];
someArray [ 1 ] = i;
. . .
```

The two uses of i above have nothing to do with one another. Creating unique variables for each purpose makes your code more readable.

Straight-line Code

Straight-line code divides into two categories:

A Sequence of Statements that Must be in a Specific Order

In this case, there are dependencies between statements; one statement must be executed before another for the program logic to work correctly. Here are a few simple guidelines:

Organize the code so that the dependencies are obvious.

Name methods so that dependencies are obvious at their point of call.

Use method parameters or return values to make dependencies obvious.

Portion of the present description unclear dependencies.

A Sequence of Statements whose Order Doesn't Matter

In this case, the program may work correctly no matter what the order of statements.

Organize the statements so that readers need not skip around to find needed information:

Keep related statements together

Localize references to variables, i.e., declare and initialize variables as close as possible to where they are used.

Conditionals

Complex conditions can be hard to read and understand. One way to alleviate this is by using extra boolean variables. In the first fragment below, the meaning of the test is not obvious; in the second, it is crystal clear:

```
Murky
IF ( IELEMENT < 0 | | MAX_ELEMENTS < IELEMENT | |
    IELEMENT == ILASTELEMENT )
{
  . . .
}
Clear
FINAL BOOLEAN BFINISHED = IELEMENT < 0 | | MAX_ELE-
MENTS < IELEMENT;
FINAL BOOLEAN BREPEATEDENTRY = IELEMENT == ILASTELE-
MENT;
IF ( BFINISHED | | BREPEATEDENTRY ) {
  . . .
}
```

This approach both simplifies and portion of the present descriptions complex expressions, making them easier to program without errors and easier to maintain.

Never use > or >= in comparisons. Instead, switch the operators around and use < or <=. In this way the smaller number is always on the left-hand side, a practice that has been shown to be more readable when applied consistently.

If in doubt about operator precedence, don't look it up; use parentheses instead. They may not be needed, but they cost nothing, and save code readers from looking up the same thing.

If one codes a chain of if-then statements, code the most common cases first.

Strive to minimize the number of branches in your code. Whenever one finds himself or herself dealing with a special case, take a moment to consider if it is possible to handle the problem in a more general fashion. Linear code is far easier to test.

Make conditional blocks of code short enough to view all at once. Around 30 lines is enough.

Limit nesting to three levels.

Compare boolean values to true or false implicitly, not explicitly:

```
Right                  Wrong
IF ( BVALID) {         if ( bValid == true ) {
  . . .                  . . .
}                      }
if ( !bValid ) {       if ( bValid == false ) {
  . . .                  . . .
}                      }
```

Loops

Prefer a for loop whenever possible. The advantages of the for loop is that it collects the loop control in a single place, and that it allows one to declare a loop control variable that is not accessible outside the loop. Example:

```
for ( int i = 0; i < vector.size( ); ++i ) {
  . . .
}
```

Never modify the loop control variable inside the for loop. If this becomes necessary, use a while loop instead. Consider the example above: If the purpose of the loop were to delete selected items from the vector, a for loop would be inappropriate since one wouldn't increment the loop control variable consistently:

```
No
for ( int iItem = 0; iItem < vector.size( ); ++iItem ) {
  MyClass item = (MyClass) vector.elementAt( iItem );
  if ( item.isOldAndTired( ) ) {
    vector.removeElementAt( iItem );
    --iItem; // ☹ Loop control is off limits!☹
  }
}
Yes
INT IITEM = 0;
WHILE ( IITEM < VECTOR.SIZE( ) ) {
  MYCLASS ITEM = (MYCLASS) VECTOR.ELEMENTAT( IITEM );
```

-continued

```
IF ( ITEM.ISDELETABLE( ) ) {
   VECTOR.REMOVEELEMENTAT( IITEM );
} ELSE {
   ++IITEM;
  }
}
```

Prefer loops that test exit conditions at the top or the bottom. If this cannot be easily accomplished, rewrite the loop as a while ( true ) 'infinite' loop with a test in the middle.

If possible, use only a single break statement to exit the loop.

If possible, make loops short enough to view all at once. This is especially important if the loop body is complex. If the loop code grows beyond about 30 lines, consider restructuring the code.

Limit nesting to three levels.

Switches

Never let flow control "fall through" from one case label to the next by omitting the break statement. If you feel an urge to do this because of common code, consider factoring out the common code in a new helper method.

Exceptions

Type Conversions

Notes on Specific Keywords and Constructs

Final

The final keyword is a relative of the C++ keyword const (though not the same).

Apply it to classes, methods and all kinds of variables:

A final class may not be subclassed.

A final method may not be overridden.

A final variable may never be changed.

Using final on a class or method may have an optimization effect as well. The compiler may be able to perform inlining or compile-time linking instead of dynamic linking at run-time. For this reason, apply final to all classes and methods that are not intended to be subclassed or overridden. (This is not to say that all non-final classes or methods are subclassed or overridden.)

Likewise, all variables (including function parameters) that can be final should be final. In the case of constants, this may allow inlining by the compiler, and it is in any case an excellent portion of the present description tool.

Return

A method that returns a value should have a single return statement at the end of the method.

If compliance with rule 1 makes your code needlessly complex put your single return statement elsewhere.

If compliance with rule 2 makes your code needlessly complex use multiple return statements.

One is, in other words, free to do as one likes. The overall goal is readability.

If one breaks rule 1, make sure that:

the structure of your method is obvious, and that the return statements are clearly visible,. perhaps by setting them off with a blank line above and below, or an obscene end-line comment.

If one does feel an urge to break these rules, take a minute to consider if an alternative design might be possible, perhaps by offloading some of the methods work on helper methods.

Transient

This keyword is applied to data elements that should not be serialized. Consider the Customer class as an example: it has a private member of type Thread that is used for background downloading of the customer's account list. A thread is not serializable, so the Thread member is declared transient.

Constructors

There should normally be only one "main" constructor in a class. Additional convenience constructors may be defined,but they should be implemented in terms of the main constructor. The point of this is to avoid duplicate code:

```
"Main " Constructor

public MultiLineLabel( String strLabel,
     int    nMarginWidth,
     int    nMarginHeight,
     int    nTextAlignment,
     int    nFixedSize )
{
     breakLabel ( strLabel );
     myMarginWidth = nMarginWidth;
     myMarginHeight = nMarginHeight;
     myTextAlignment = nTextAlignment;
     myFixedWidth = nFixedSize;
}
Wrong convenience constructor (repeats code from above)

public MultiLineLabel( String strLabel )
{
     breakLabel ( strLabel );
     myMarginWidth = 0;
     myMarginHeight = 0;
     myTextAlignment = LEFT;
     myFixedWidth = 0;
}
Correct convenience constructor

PUBLIC MULTILINELABEL( STRING STRLABEL )
{
     THIS( STRLABEL, 0, 0, LEFT, 0 ) ;
}
```

Threads

Debugging and profiling can be made significantly more effective by naming all threads explicitly. Therefore, make sure always to use the Thread constructors that take a name parameter, e.g. use Thread (String name) instead of Thread( ).

Portion of the Present Description (Comments)

JavaDoc

Use javadoc comments for all classes, methods and constants.

As a general rule, member variables (fields) are private, and don't need javadoc comments. If public or protected fields are required for some particular reason, these must be javaportion of the present descriptioned.

Macros to insert skeleton comment blocks may be provided.

Class Headers

```
/**
 * class description
 *
 * @author          your name (your company)
 * @author          another name (his or her company)
 * @author          ...
 * @version         $Revision $
 * @see             some other class
 * @see             ...
 */
```

Use a short form of company name, such as AC or DnB.

Method Headers

```
/**
 * Validates user id and password; returns a Context
structure
 * This is a synchronous service.
 *
 * @param       strUserId        User id
 * @param       strPassword      Password
 * @return      A Context structure if logon succeeds, else
null
 * @see         no.dnb.tb.types.Context
 * @see         no.dnb.tb.interfaces.Isession
 * @exception   java.rmi.RemoteException if the connection
fails
 */
public Context getContext(
    String strUserId,
    String strPassword ) throws java.rmi.RemoteException
{
. . .
}
Note that the @exception tag requires an explanation after the exception
name!
```

SourceSafe Fields

The SourceSafe $Revision $ keyword is used in the @version field.

Comments in the Code

Use//-style comments rather than /* . . . * / comments in the code. This allows one to comment out large blocks of code using /* . . . */. (If comments nested this would not be a problem. They don't, however.)

Add a blank line before any stand-alone comment line. If the comment is extensive or important, add a blank line below as well.

Indent the comment with its corresponding code.

Comments should clarify the intent of the code, not repeat the code in a more verbose way. Aim for a higher level of abstraction than the code itself. Focus on the why rather than the how; the how should be obvious from the code.

```
Wrong

I = 0;                                  // SET I TO 0
WHILE ( I < VECTOR.SIZE( ) ) {          // LOOP OVER VECTOR
ELEMENTS
    CMBNAMES.ADD( VECTOR.ELE-           // ADD ELEMENT TO
```

-continued

```
    MENTAT( I ) );                      COMBOBOX
    ++I;                                // INCREMENT I
}
Better

// ADD ALL THE ELEMENTS TO THE COMBO BOX:
I = 0;
WHILE ( I < VECTOR.SIZE( ) ) {
    CMBNAMES ( VECTOR.ELEMENTAT( I ) );
    ++I;
}
```

If the code is not obvious, your first course of action should be to restructure the code to make it obvious. If this is not possible, portion of the present description the how, by all means.

End-line comments should apply to a single line only. Comments that apply to more than one line should be above the code.

Working comments

Insert comments containing the words TODO as a reminder to yourself or others that something remains to be done, or that there is an unresolved issue.

Error Handling

Java's method of choice for handling error conditions is exception handling. Exception handling allows one to keep the sequential flow of the functional code separate from the error handling. This leads to less complex code.

Error Handling on the Server

Signaling Errors to the Client

Whenever an error occurs in a remote method invocation, this may normally be signaled to the client by throwing an exception. Technical errors are always signaled by an exception; functional errors may be returned in the form of objects if that is more convenient.

Logging

Logging to the NT event log is done through the ErrorLog class.

Error Handling on the Client

Logging

The context manager allows logging from the client to the server. This is done through the ContextManager.safeLog* family of methods.

Reporting Errors

Error reporting on the client is done by publishing an ERROR, e.g.:

```
try {
  . . . something . . .
}
catch ( SomeException e ) {
  . . .
  ContextManager.publish( ContextManager.ERROR, e
    );
  . . .
}
```

The context manager may take care of informing the user, if necessary; a special message panel may be created for this purpose. Application code may not normally have to deal directly with error reporting.

When an error occurs on the server (during a remote method invocation), the server throws an exception. In the case of data downloads (Kontoutskrift, etc.) this is handled uniformly in the download threads. In the case of truly synchronous calls, the functional code must handle the exception as shown in the example above.

Debugging and Testing

This portion of the description describes how one can code to ease debugging and testing. The actual processes of debugging and testing are described elsewhere.

Debugging

Pure debug code can be enclosed in special comment delimiters that may be stripped off in a release build. A debug block starts with //{{DEBUG and ends with //}}DEBUG, the only difference being direction of the braces.

The class no. dnb. arch. util .Debug contains methods useful for debugging; in particular, it holds trace and assert methods.

Unit Testing

The main Method

Java allows any class to define a main function, even though the class may not be intended to be an application's entry point. This feature can be used for unit testing of classes. For example, the AccountNumber class might provide the following main function to exercise the class:

```
//{{UNITTEST
public static void main( String[] args ) {
AccountNumber account=new AccountNumber
  ("42600505380");
System.out.println("account=\""+account+
  "\"; isvalid="+account.isvalid( ) );
account=new AccountNumber("42600505381");
System.out.println("account=\""+account+
  "\"; isvalid="+account.isvalid( ) );
}
//}}UNITTEST
```

Note that the above method may never be called except in explicit unit testing. It does, however, bloat the code needlessly. To enable us to strip it out for a release build, pure unit test code should be enclosed in special comment delimiters. A unit test block starts with //{{UNITTEST and ends with //}}UNITTEST, the only difference being direction of the braces.

Specific Unit Testing Methods

In some cases, unit testing can be completely or partially automated. The requirement is that the test produces text, and that this text can be reliably compared to another text, the expected result.

To build automated unit testing into a class, define two static methods as follows:

public static void unitTest( PrintWriter ps);

This method exercises the class, printing its output on ps.

public static String getExpectedResult( );

This method should return a (hard-coded!) string.

The automated testing loops through all classes and compares the output from the unitTest method with the string returned from getExpectedResult. This setup is intended to simplify regression testing. There are limitations: this method cannot test interaction with widgets, for example, nor can it handle dynamic results. (An output such as today's date can't be hard-coded into getExpectedResults. Using method invocations in getExpectedResults would defeat the whole purpose of the test, as we might well be comparing garbage to identical garbage.)

The following example shows how this framework might be applied to the Account class. Note that the main function in this case merely invokes the unitTest function.

```
public class Account . . . {
  //{{UNITTEST
  public static void unitTest( PrintWriter ps) {
  try {
    Account account=
        new Account("42600505380", "Konrad Kunde",
          CHECKING );
      ps.println("account=\""+account+"\""
);
      // Next statement trows exception due to illegal
        account #:
      account=
        new Account("42600505381", "John Doe",
          CHECKING );
    }
    catch (java.text.ParseException e) {
      ps.println(e);
    }
  }
  public static String getExpectedResult( ) {
    return
      "account=\"4260.05.05380 (LØNN) Konrad
        Kunde\"\n"+
      "java.text.ParseException: Illegal account
        number\n";
  }
  public static void main( String args[]) {
    Debug.trace( Debug.unitTest(
"no.dnb.tb.types.Account") );
  }
  //}}UNITTEST
}
```

In addition to the possibilities for automating regression testing, this approach has the benefit that the code, the test conditions and the expected results are close together and easy to keep synchronized.

Further Reading

Core Java, Gary Cornell/Cay S. Horstmann [The SunSoft Press 1996]

Covers Java 1.02. Good introduction to Java.

Java in a Nutshell, David Flanagan [O'Reilly 1997]

Covers Java 1.1; includes examples. Strong coverage of inner classes.

Writing Solid Code, Steve Maguire [Microsoft Press 1993]

Debugging techniques and attitudes.

Code Complete, Steve McConnel [Microsoft Press 1993]

Detailed coverage of software construction techniques.

Design Patterns: Elements of Reusable Object-Oriented Software,

Gamma, Helm, Johnson, Vlissides [Addison-Wesley 1995]

Practical guide to object-oriented design and programming.

Project Standards

Application Development Standards and Procedures

The ReTA Application Development Standards and Procedures portion of the description consists of the standards, rules, and guidelines to be followed during the application development process for programming and portion of the present descriptioning programs. This portion of the present description is not meant to be a training manual. Rather, it is a reference for the standards set by the development architecture.

Use of Application Development Standards and Procedures to provide a consistent way of designing, portion of the present descriptioning, programming, etc. over the different areas of work, such as user interface design, and data design.

Build Process

Editing Source Code

To enter and edit source code for a ReTA Application, the standard tool is Microsoft Visual J++6.0. This Development Environment allows the user to edit and create Java source files, IDL source files, and Active Server Pages.

Editing Java source files are done by opening the Java project which contains the desired source file to be edited. Locate the Java source file in the project and enter the necessary changes. Once changes have been made the file must be saved.

Editing IDL (Interface Definition Language) files are opened up individually in the Microsoft Visual Studio J++6.0 Development Environment. The file is opened and changes are made, once changes are made the file is saved.

Editing ASP (Active Server Pages) files are done by opening up the file in Microsoft Visual Studio J++6.0 Development Environment. The file is opened and changes are made, once changes are made the file is saved.

Compiling VJ++ Projects/IDL

To compile the Microsoft Visual J++ Projects and build COM components in ReTA there are steps that must be followed.

Generate the Type Libraries.

Use the midl.exe command line tool is used to generate the type libraries.

Generate the stubs from the Type Libraries.

Use the javatlb.exe to generate the stubs from the .tlb files.

javatlb /d./p Activity /p:b- AFActivity.tlb

Use the javaguid.exe to generate the guid's for the stubs.

javaguid CodesTable\CAFCTRetrieval.class CodesTable\IAFCTRetrieval.class

Compile the Microsoft Visual J++ Project.

Figure 68:
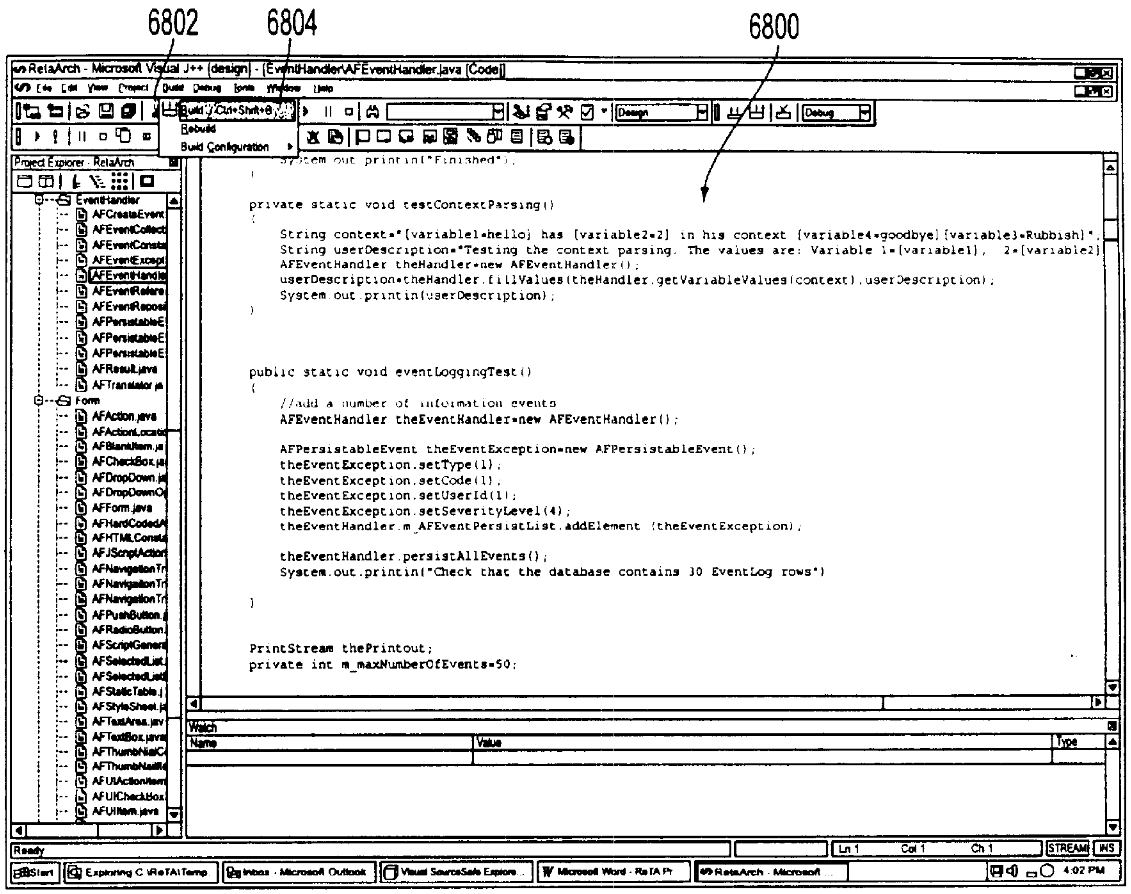
FIG. 68 shows a Visual J++ Build Environment according to an embodiment of the present invention.

FIG. 68 shows a Visual J++ Build Environment 6800. To begin a build, the Build button 6802 is selected and Build 6804 is selected from the corresponding menu.

Generate the DLL.'s.

Use the exegen.exe command line utility.

Source Code Debugging

ReTA developers have the ability to debug the Architecture files, Business Objects, Application files, and Active Server Pages.

Debugging Architecture or Application Files

To debug Architecture or Application Java source code, the developer may open up the Microsoft Visual J++6.0 project that contains that Java source file. Select the Debug menu and then the processes option, set a breakpoint where the code is suspect and attach to the "MTX" process. For help on how to attach to a process refer to the Microsoft Visual J++ help.

Figure 69:
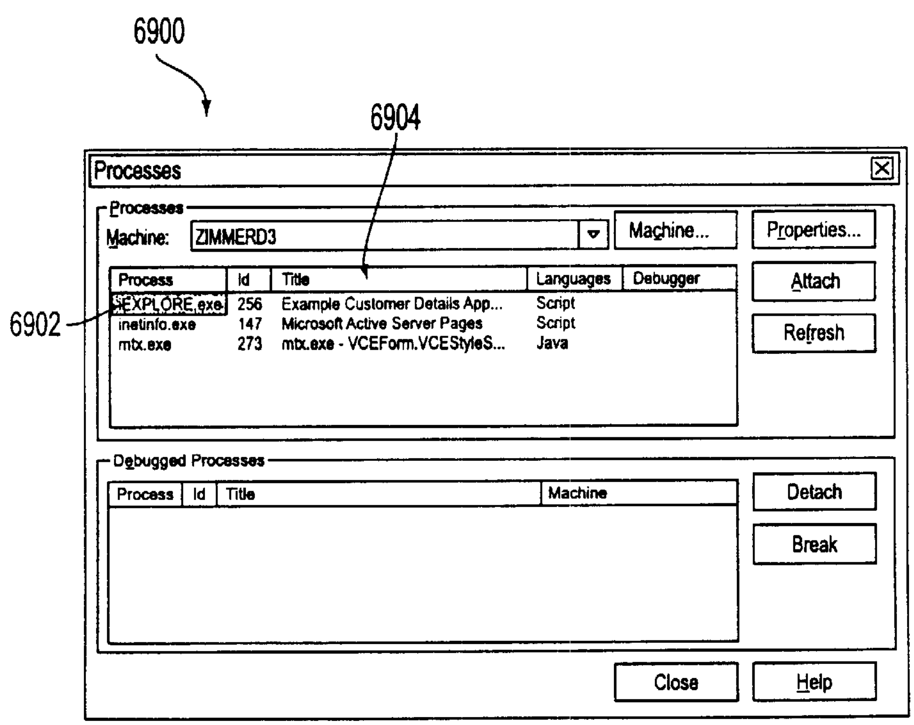
FIG. 69 shows an interface for attaching to the MTS Process for debugging according to an embodiment of the present invention.

FIG. 69 shows an interface 6900 for attaching to the MTS Process for debugging. Processes 6902 and their corresponding titles 6904 are shown.

Debugging Active Server Pages

To debug an Active Server Page (assuming the ASP page is written in VBScript) the developer may code in the key word "stop" where the developer would like to start the debugging. The developer can then step into the ASP code, this applies to the global.asa file as well. For more information regarding debugging Active Server Pages, refer to the Visual Studio online help.

Figure 70:
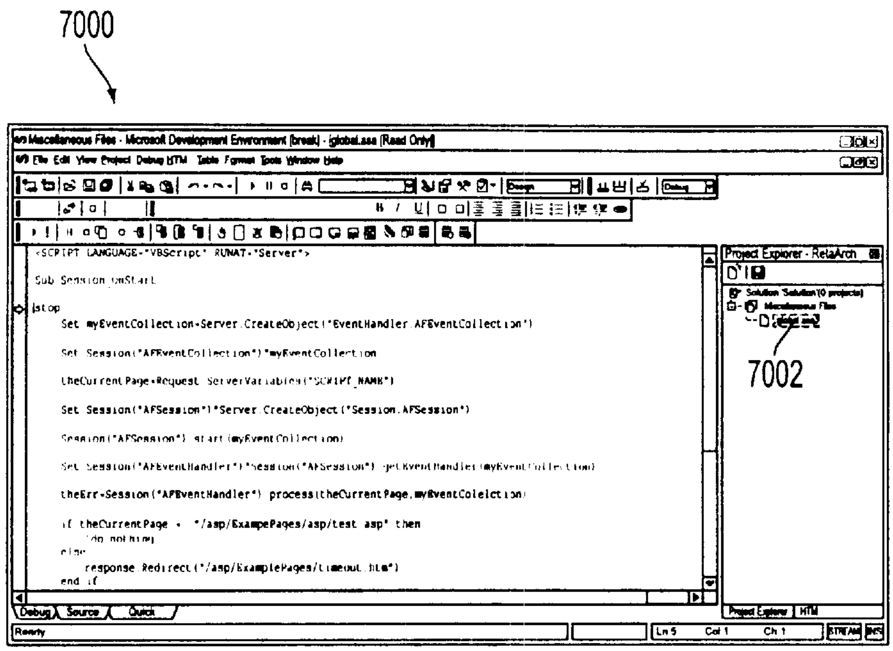
FIG. 70 shows an interface for debugging an Active Server Page (example global.asa file) according to an embodiment of the present invention.

FIG. 70 shows an interface 7000 for debugging an Active Server Page (example global.asa file 7002).

Unit Testing Business Objects

For a ReTA developer to perform a unit test on a Business Object, the developer may code a "main" method on the Java source file. This may allow the developer to call the various methods of the Business Object and inspect the results to ensure the object is working properly. The developer may invoke the main method from the command line using the Java command line utility "Jview.exe."

```
public static void main(String[] args)
{
if(args[0].equals("1")) {
  JUnitOfWork connection=null;
  try
  {
    //Create the Domain
    JDomain myDomain=new
JDomain(AFConstants.getAFProsisInterfaceDSNLabel(
  ),AFPersistableObj.getAppli
  cationDatabaseUsername(
  ),AFPersistableObj.getApplicationDatabasePassword(
  ));
    //Create a connection
    connection=(JUnitOfWork)
      myDomain.newConnection( );
    //create an extent for the class we wish to persist.
    JExtent extent=(JExtent)new JExtent
      ("BObjects.RetaCustomer");
    System.out.println ("Domain and Extent Created
      Success");
    // Create our Customer Object
    System.out.println ("Create Customer");
    RetaCustomer theObj=new, RetaCustomer( );
    theObj.setSsn(123456789);
    theObj.setName("Esch Raphael");
    theObj.setLevel("Partner");
    theObj.setAge(99);
```

```
System.out.println ("Going to update record");
extent.update(theObj,connection);
System.out.println ("Done OK.");
connection.close( );
. . .
```

Code Generation using Rational Rose

The Rational Rose modeling tool allows developers to define and communicate software architecture, resulting in:

Accelerated development, by improved communication among various team members

Improved quality, by mapping business processes to software architecture, and

Increased visibility and predictability, by making critical design decisions explicit visually.

Rational Rose has the ability to generate Java Class files and within these files javadoc comments are generated along with rose comments.

Figure 71:
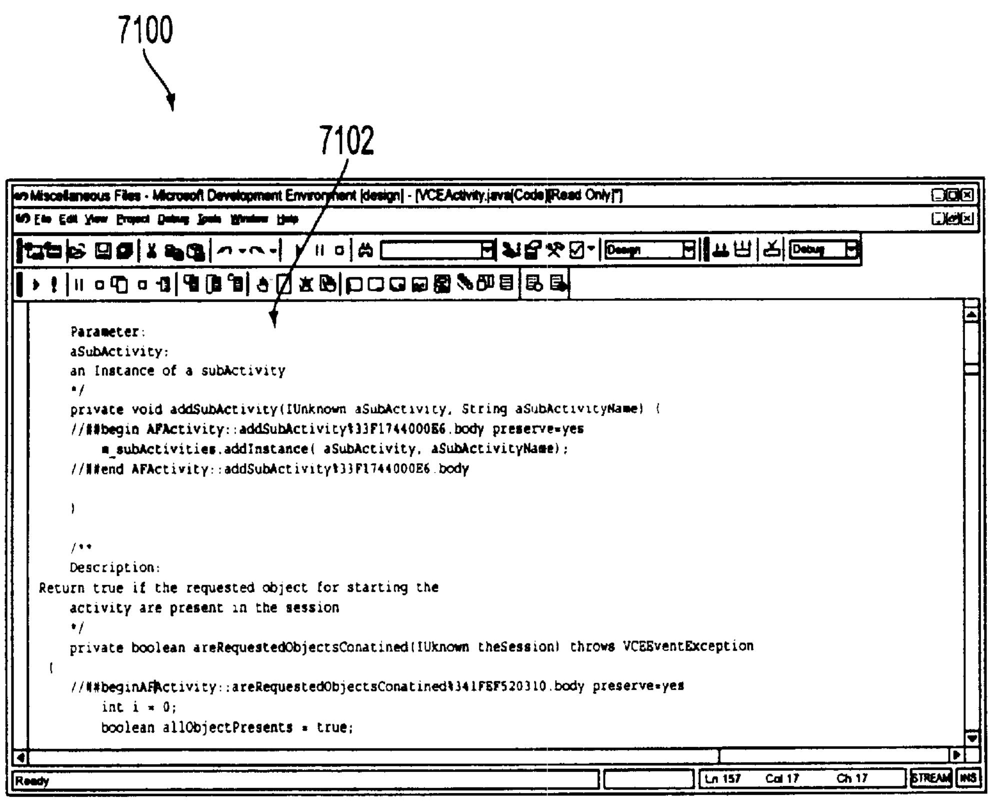
FIG. 71 illustrates an example of Rose generated java file and javadoc comments according to an embodiment of the present invention.

FIG. 71 illustrates an exemplary frame 7100 of Rose generated java file and javadoc comments 7102.

Standards

Naming Standards

Folder/Directory

Internet Information Server WWWRoot Folder

The naming standard for ReTA web-based applications.

C:\InetPub\wwwroot\ReTAApplication\XXXName

In IIS 4.0 a virtual directory is defined to point to the preceding path. The properties on the directory allow execute and basic authentication permissions. For each separate application there may be a global.asa file which may reside in the "root" folder of the application.

Files

Naming conventions used and recommended.

| File Type | Naming Standard | Comments |
|---|---|---|
| Business Object Java File | BO<business object name>.java | All business objects may start with a "BO" prefixed to their name. |
| Business Object Class Factory Java File | BO<business object name>Factory.java | All class factories may be prefixed with "BO" and suffixed with "Factory". |
| Activity Java File | AXX<activity name>.java | All activities may be prefixed with an "A" then a two-character initial for the activity, followed by the full name of the activity. |
| Sub-Activity Java File | SAXX<sub-activity name>.java | All sub-activities may be prefixed with SA, and then a two-character name initial that denotes which activity it belongs to ("XX"), followed by the sub-activity full name. |
| Business Object IDL File | BO<business object name>.idl | All business objects may start with a "BO" prefixed to their name |
| Activity IDL File | AXX<activity name>.idl | All activities may be prefixed with an "A" then a two-character initial for the activity, followed by the full name of the activity. |
| Sub-Activity IDL File | SAXX<sub-activity name>.java | All sub-activities may be prefixed with SA, and then a two-character name initial that denotes which activity it belongs to ("XX"), followed by the sub-activity full name. |
| Active Server Page File - Activity Page | <xxxname>index.asp | The Active Server Page may be a single mixed-case meaningful word that reflects the activity the ASP page belongs to suffixed with "index". Therefore the activity page for Customer would look like "CustomerIndex.asp". |
| Active Server Page File - SubActivity Page | <subactivityname>.asp | The Active Server Page may be a single mixed-case meaningful word that reflects the SubActivity the page performs. Therefore a SubActivity that reviews all customers in the "Customer" Activity would look like "ReviewAll Customers.asp" |
| Image Files | <activityInitial>name. jpg or <activityInitial> name gif | Images may be contained within an "images"directory for each application. For example an images directory for the "Billing" application would exist in the file system as "/Billing/images". All images may reside in this directory for that application. Therefore an image that belongs to the "CustomerLookup" activity in the "Billing" application would be named "CLWarning_icon. jpg". |

Application Files

Business Object

BORetaCustomer.java OR BORetaCustomer.idl

Business Object Class Factory

BOCustomerLookupFactoryjava

Activity

ACLCustomerLookup java OR ACLCustomerLookup.idl

Sub-Activity

SACLCustDetailCommitjava OR SACLCustDetailCommit.idl

Architecture Files

| File Type | Naming Standard | Comments |
|---|---|---|
| Architecture Java Files | AFXX<filename>.java | All java architecture files may be prefixed with "Arch", then two letter initial that identifies the package it belongs to. For example an architect- |
| ture file that is | | from the Session package would be named |
| "AFSEfilename.java". | | |
| Architecture IDL files | IAFXXfilename.idl AFXXfilename.idl | Interfaces for architecture components that do not include any "coclass" statements are prefixed with an "I". All java packages may have a corresponding IDL file. For example EventHandler may have an IDL with this name, within this IDL may be all the associated coclass's that make up the package. |

Proposed Coinvention

Interfaces for architecture components that do not include any "coclass" statements are prefixed with an "I".

IAFSEEventListener.idl

All architecture components may use the component name as the filename for the IDL. For example, if the component name is AFSESystemPreferences the IDL filename may be:

A FSESystemPreferences.idl

All Java packages may have a corresponding IDL file. For example EventHandler may have an HDL with this name, within this IDL may be all the associated coclass's that make up the package.

EventHandler.idl- <EventHandler—name of java package>

Example of-coclasses defined within "EventHandler.idl"

```
[
    uuid(F9205423-38B6-11d1-A328-0060080FBDF2),
    helpstring("XXEventHandler Class"),
    JAVACLASS("EventHandler.XXEventHandler"),
    PROGID("EventHandler. XXEventHandler"),
    TRANSACTION_SUPPORTED
  ]
  coclass CXXEventHandler
  {
    [default] interface IXXEventHandler;
  };
  [
    uuid(C82965A3-6A3B-11d1-A3A9-0060080-
      FBDF2),
    helpstring("AFEventCollection Class"),
    JAVACLASS("EventHandler.AFEventCollection"),
    PROGID("EventHandler.AFEventCollection"),
    TRANSACTION_SUPPORTED
  ]
  coclass CXXEventCollection
  {
    [default] interface IXXEventCollection;
  };
```

Version Control Process

Coding Standards

Active Server Pages

Delimiters

ASP delimiters (<%'s and %>'s) are placed in the very left hand margin, not in the middle of lines (unless 1. One uses the "<%=variable %>" format or unless 2. This way, all the code can be included on one line, in which case one still puts the "<%" on the left margin). This improved code readability and made it easier to determine where ASP code blocks began and HTML ended, and vice versa.

Option Explicit

If using VBScript within the Active Server Page, the keywords "Option Explicit" should appear at the beginning of every script block. Enabling Option Explicit may cause the scripting engine to fault when it encounters an undeclared variable (a variable is declared with the Dim statement). VBScript is not a compiled language, and the runtime interpreter does very little to catch your programming errors. Therefore using Option Explicit should be absolutely mandatory.

Variable Declaration

If using VBScript within the Active Server Page, put multiple Dims on a single line for faster execution (verified by Microsoft) i.e. do this:

Dim a, b, c

. . . instead of this:

Dim a

Dim b

Dim c

Error Handling

Currently, it is required to invoke the EventHandler.process method passing in the ReTA EventCollection after every application Activity or architecture Session call. In the event that an error did occur during the prior application call, the EventHandler may process the error information and issue a HTTP Redirect to direct the client browser to the error page.

Local Functions

Where Active Server Functions are embedded within a page they should be placed at the start of the page after the standard HTML header. Functions themselves should be written to the standard for the language in which they are written, VB Script or JavaScript within <% %> quotes.

ASP Architecture Header

On any Active Server Page using the ReTA Architecture there are some necessary statements needed at the beginning of each ASP page. Each page must include a "#Include" statement. This may bring in the architecture header file, which contains common variable definitions and architecture initialization statements.

To include the header file, add the following statement at the top of the Active Server Page.

```
<% Option Explicit %>
<!-- #include virtual ="/postTest/retaASPHeader.inc"     -->
<!--
*********************************************************_
->
<!--                                                     -->
<!-- All asp pages must include the Include file         -->
<!-- retaASPHeader.inc file.                             -->
<!--                                                     -->
<!--
*********************************************************_
->
```

Variable Naming Conventions

| | |
|---|---|
| g_Name | Any global variable (declared outside of a Sub or Function) |
| s_Name | a variable referencing a Session Variable |
| a_Name | a variable referencing an Application Variable |
| f_Name | a variable containing information from the Form collection |
| SName | Any string of characters |
| Iname | Any number |
| BName | a Boolean value of TRUE or FALSE |
| OName | an object |
| CoName | a collection of objects |
| XNameArray | An array, where 'x' may be 's' for string, 'b' for Boolean, etc. |

Control Naming Conventions

| | |
|---|---|
| BtnName | Button |
| TxtName | Text box or area |
| OptName | Option button (aka radio button) |
| ChkName | Check box |
| SelName | Combo box/drop down/SELECT control |

Create Server Side Variable Sparingly

Developers should ensure that variables declared in the Active Server Page are reused if at all possible to try and reduce the memory demands on the web server. An example would be the use of an 'err' variable to capture the return code from all MTS component calls.

Comments

While the use of comments within an Active Server Page are useful for describing the logical flow of the application, overuse should be avoided as comments are evaluated during execution and can hinder overall performance. Comments should be used sparingly and only to describe code that is difficult to understand or follow otherwise.

HTML

HTML guidelines are necessary so each HTML programmer on the project can share in a common effort to establish best practice across the whole of the project. By moving beyond the HTML 2.0 Specification, the application can support Java, frames, and tables, among other added features.

File names may be composed of a single lower-case meaningful word that reflects the file's contents ( i.e. financial.htm). Since different platforms handle capitalization differently, we may avoid capital letters to avoid any possible conflicts. All file names should end with ".htm". The ".html" ending leads to problems when porting to a machine that only recognizes three character file identifiers. Most importantly, files should be saved within the appropriate folder upon creation (i.e. financial/financial.htm). Names should easily convey the functionality or dialog that it belongs to.

Page Title

It is crucial that users recognize that they are on a ReTA page, especially if they have accessed the site via a search engine (in this case, they would not have the "natural or the normal entry page" introduction to the site). The user would need to access the welcome page to the application. The title of the page should reflect the application name "/" activity name.

Data Validation Header File

Every static HTML page or every top frame page must include the ReTA Data Validation JavaScript file if they are going to create Form elements that utilize the UI Framework client-side validation functions. Adding the following code after the <HEAD> tag may include this file and bring it down to the browser level. Note that this only needs to done once in the event of a HTML Frame based application.

```
<Script Src="/ReTAScripts/retaDataValidation js" Type="Text/JavaScript">
```

Image File Names

Image file names may be composed of a single lower-case word that consists of a two letter initial that stands for the activity they belong to ( i.e. clwarning_icon.gif). Since different platforms handle capitalization differently, we may avoid capital letters to avoid any possible conflicts. Most importantly, files should be saved within the appropriate folder upon creation (i.e. financial/images/txdollarsign.gif).

Image ALT Tag

Always use the ALT tag with images, in case the site is accessed by a browser with limited support for browsers (or a user who stops the page download before it is complete).

```
<IMG SRC="/App/Images/imgStart.gif" ALT="[ReTA Start Application]">
```

META Tag Name

The <META> tag provides a way to store information about the portion of the present description that is not available elsewhere in the portion of the present description. For example, the META tag can contain catalog, author, or index information that various search engines can use.

This example illustrates a portion of the present description that is indexed under the terms "ReTA", the activity of the page is "ACLCustomerLookup", and the subactivity is "SAReviewAllCustomers".

```
<HEAD>
<META NAME="keywords" CONTENT="ReTA ACLCustomerLookup SAReviewAllCustomers">
</HEAD>
```

Alternate text for images

Some Web browsers cannot display images and some Web users may not want to use image loading even if their software can display images because they are have a slow connection. For these browsers and users, the ALT attribute specifies the text to be displayed instead of the image. For example, <IMG SRC="aclogo.gif" ALT="Andersen Consulting logo">. If a Web browser cannot not display aclogo.gif or a Web user wishes not to view the logo, the text "Company logo" may be displayed to screen instead.

Comments

While the use of comments within an HTML portion of the present description are useful for describing the logical flow of the application, overuse should be avoided as comments are evaluated during execution and can hinder overall performance. Comments should be sparingly used and only to describe code that is difficult to understand or follow otherwise.

Comments for HTML code should conform to the following guidelines:

Introduce code with the following comments:

| | |
|---|---|
| <!--Filepath: | /Application/html/appStart.htm |
| <!--Created By: | Jane Doe |
| <!--Modified By: | John Doe |
| <!--Modification Date: | 1/1/99 |
| <!--Revision #: | 1.1 |

Limit comments for describing complex statements that are not easily followed. Eliminate all comments promoting the HTML code generating application (i.e. <--! This page generated by Front Page -->).

Screen Resolution

All HTML files should be viewable at resolutions of 800×600 and above. This standard allows for a range of screen resolutions to ensure that all users may be able to view the pages. However pages should be tested at screen resolutions of 640×480 and 1024×768 pixels in order to ensure that layout and presentation do not deteriorate at different resolutions. At 640×480 the appearance of scroll bars is acceptable, as this resolution is not directly supported by the applications being developed.

Graphics Sizes

Explicitly define the height and width of images used in pages. When this definition does not take place, browsers size the images themselves, which slows down the painting process. Browsers that do not have support for the WIDTH and HEIGHT attributes to the IMG tag may simply ignore them and lay out the portion of the present description normally.

<IMG SRC="iso-ne.gif" WIDTH=413 HEIGHT=356>

JavaScript

JavaScript provides a powerful tool for the creation of client side functionality. It suffers however from limited error handling capabilities and problems of compatibility between web browsers. JavaScript should be used only where the required client side functionality cannot be implemented in HTML and should be kept as simple and concise as possible. Completed JavaScript should be tested in as wide a variety of browsers as possible, especially Internet Explorer. (V4+) and Netscape Navigator (4+) as scripts which function cleanly in one browser may throw exceptions in another.

Variable Declaration

When declaring variables in JavaScript, one may declare multiple variables on a single line or one may declare variables on a separate line. One may also initialize a variable to a value in your declaration.

```
var a, b, c, d, e;
var sum;
var message="hello";
```

Variable Naming Conventions

| | |
|---|---|
| returnCode | Local variables are written in mixed case starting with lower case |

Constants were not defined (DV_NONE) as this caused problems when attempting to stay compatible for both browsers (IE 4.0 and Netscape Navigator 4.0). When attempting to use constants such as "DV_NONE" Netscape failed and MS IE did not. Thus we used the corresponding numbers and added comments for the constants.

```
// DV_TYPE_ISNUMERIC—data type must be
   numeric case 1:
   . . .
```

Local Functions

Local functions in JavaScript should be in mixed case, starting with lower case, mixing with upper case.

```
function retaDataValidation( )
```

Error Handling

Currently there is no error handling in JavaScript. In JavaScript 1.3 both Microsoft Internet Explorer and Netscape Navigator may support the try/catch statement. The try/catch may be similar to the try/catch used in Java. It may be our recommendation to use the try/catch statement in the next release of JavaScript.

Coding Conventions

In JavaScript, constructs' may always use the curly brace ("{") to format following lines of code, even if there is only one line of code that follows the construct.

Example

```
If(testvar==inputvar)
{
  statement(s) . . . ;
}
while(!fs.EOF)
{
  statement1 . . . ;
  statement2 . . . ;
}
if(testvar !=inputvar)
{
  statement1 . . . ;
}
else
{
  statement2 . . . ;
```

```
    statement3 . . . ;
  }
```

The above example demonstrates how to use the formatting that was described above. This enables the developer when debugging/developing pieces of code to better read and understand what is in progress in the code. The learning curve may be reduced if the developer does not have poorly formatted code to read (especially when dealing with complex code). This promotes easy code maintenance.

Commenting

JavaScript ignores comments; therefore comments may be detailed if necessary without effecting performance. Any comments that may be contained on a single line may use the "//" comment style. This treats any comments after the "//" to the end of the line as a comment.

//this is an example of a single line comment in JavaScript'

Comments that explain a complex block of code which require more that on sentence of explanation may use the "/** . . . */" comment style. We use the javadoc style of commenting for multiple line comments.

```
/**
 * This is another example of comments in JavaScript.
 * It has multiple lines.
*/
```

ReTA architecture makes use of a JavaScript "js" file. This file resides on the Web Server and assists in performing client side validation. Commenting in this file is detailed, as this may not be visible to the client. The beginning of the file has a comment block that describes the purpose. of the file and lists the author and any modification made to the file.

```
/***********************************************************
******
**      RETA Distributed Component Architecture JavaScript File
**
** FILENAME       : retaDataValidation.js
**
** DESCRIPTION      : Data validation functions
**
**          retaDataValidation( )
**          retaValidateDateFormat( )
**          retaIsLeapYear( )
**          retapadDateSegment( )
**          retapadDateSegment( )
**
** AUTHOR          :MEVANS
**
** DATE CREATED    :01/19/99
**
** REVISION HISTORY:
**
** DATE    REVISED BY SIR # DESCRIPTION OF CHANGE
**
** 01/19/99 MEVANS       Original code.
**
************************************************************
********/
```

The "js" file contains a detailed comment block describing each function. This comment block should precede each function in the JavaScript source file.

```
/***********************************************************
*
**      Distributed Component Architecture JavaScript Function
**
** FUNCTION       : retaParseDateSegment
**
** DESCRIPTION    : This function returns requested date segment.
**          Date segments: month, day, year
**          Date segment delimiters: "/", "-", "\"
**
** INPUTS       : inputDate
**
**          dateSegmentIndex
**
** OUTPUTS       : dateSegment
**          - returns " " if segment not found
**
** CALLED FUNCTIONS:
**
** AUTHOR       : MEVANS
**
** DATE CREATED       : 01/19/99
**
** REVISION HISTORY:
**
** DATE    REVISED BY SIR # DESCRIPTION OF CHANGE
**
** 01/19/99 MEVANS       Original code.
***********************************************************
*/
```

For multi-line comments required within the function itself, use the multi-line comment style.

Java

JAVA guidelines are necessary so each JAVA programmer on the project can share in a common effort to establish best practice across the whole of the project.

Variable Declaration

When declaring local member variables in a java source file an declare them as private.

```
private String m_name=new String( );
```

Temporary variables to be used within a method may be declared in lowercase and at the beginning of the method, ensure a meaningful name is used.

```
public void functionName( )
{
String valuetotest="";
Int position=0;
. . .
}
```

Constants may be declared in a constant java file and may be in upper case. Make all constants public members, as this may provide direct access to the variable. If a change is made to the variable one must re-compile the java file and re-build the DLL's.

```
public class ReTAHTMLConstants
{
  public final static int
DV_RANGE_LESSTHANEQUAL_
  GREATERTHANEQUAL=8;
}
```

Variable Naming Conventions

| | |
|---|---|
| m__1 returnCode | Local variables are written in mixed case starting with lower case |
| DV_NONE | Constants are declared in all uppercase |

Coding Conventions

In Java, constructs may always use the curly brace ("{") to format following lines of code, even if there is only one line of code that follows the construct.

Example

```
If(testvar==inputvar)
{
  statement(s) . . .
}
while(!fs.EOF)
{
  statement(s) . . .
}
if(testvar !=inputvar)
{
  statement1 . . .
}
else
{
  statement2 . . .
}
```

The above example demonstrates how to use the formatting that was described above. This enables the developer when debugging/developing pieces of code to better read and understand what is in progress in the code. The learning curve may be reduced if the developer does not have poorly formatted code to read (especially when dealing with complex code). This promotes easy code maintenance.

Method Names

Method names in java use mixed case, starting with lower case. public String generateJavaSrc( ). . . .

Method Comments

For comments use the javadoc commenting style. This style provides useful portion of the present description (in HTML format) that may be generated by the javadoc.exe utility. Comments begin with a slash and two asterisks. The first sentence should be concise and describe the purpose of the method or class is. "@" parameters can be added, each may generate different comments in the html output from the javadoc.exe utility.

```
/** ReTA Component Architecture Java Method
*
* METHOD :generateJavaSrc
*
* DESCRIPTION :This function generates the necessary html to include the script
* tag that specifies the js file for client side validation.
* INPUTS :
*
* OUTPUTS :outputVal;
*—this returns the formatted html string.
* CALLED FUNCTIONS :
*
* AUTHOR :DZIMMER
*
* DATECREATED :01/19/99
*
* REVISION HISTORY :
*
* DATE REVISED BY SIR # DESCRIPTION OF CHANGE
* ------ ------ ------ ------
* 01/19/99 DZEMMER Original code.
*
* @ author DZIMMER
* @ return This method returns the string which may make up the html code that
* contains the JavaScript source file.
*/
```

Java Class Comments

For comments use the javadoc commenting style. This style provides useful portion of the present description (in HTML format) that may be generated by the javadoc.exe utility. Comments begin with a slash and two asterisks. The first sentence should be concise and describe the purpose of the method or class is. "@" parameters can be added, each may generate different comments in the html output from the javadoc.exe utility.

```
/**
 * RETA Distributed Component Architecture Java File
 *
 * FILENAME :RETAHTMLConstantsjava
 *
 * DESCRIPTION :HTML Constants
 *
 * AUTHOR :DZEMMER
 *
 * DATE CREATED :01/22/99
 *
 * REVISION HISTORY :
 * DATE REVISED BY SIR # DESCRIPTION OF CHANGE
 * ------ ------ ------ ------
 * 01/22/99 DZIMMER Added UI Validation constants.
 *
 * @author DZIMMER
 *
 */
```

Error Handling

Any statement that can throw an exception may use the try/catch block to handle errors. This is necessary in order to evaluate what has been thrown and to determine what to send back to the user.

```
IVCEEventCollection anEventCollection=null;
try
{
anEventCollection=(IAFEventCollection) inEventCollection;
  outputBuffer=outputBuffer.append ( m__alignment__start);
```

```
}
catch (Exception e)
{
  // a AFEventException has been thrown. Add it to the collection
  e.addToCollection((IAFEventCollection) anEventCollection);
}
```

Application Naming Conventions

Activities

The capital letter "A" to indicate and "activity" followed by a two-character activity name initial (in capital letters) "XX", followed by the full activity name.

ACLCustomerLookup

This name may be the name of the Java file and the java Class name defined in the Java source file i.e.

public class ACLCustomerLookup—class definition in java file.

ACLCustomerLookupjava—java file name.

Sub-Activities

Sub-Activities should start with a two character prefix "SA", followed by the sub-activity name initial, followed by the sub-activity name.

SASFSaveFeedback

This name may be the name of the Java file and the Class name defined in the Java source file, i.e.

public class SASFSaveFeedback—class definition in java file.

SASFSaveFeedback java—java file name.

Business Objects

Business Objects naming should start with a prefix of two capital letters "BO", followed by the business object name, e.g. "BOCustomerLookup".

This name may be the name of the Java file and the Class name defined in the Java source file, i.e.

public class BOCustomerLookup—class definition in java file.

BOCustomerLookup.java—java file name.

Business Object's Class Factory

Class Factories naming should start with a prefix of two capital letters "BO", followed by the business object name, followed by the term "Factory".

BOCustomerLookupFactory

This name may be the name of the Java file and the Class name defined in the Java source file i.e.

public class BOCustomerLookupFactory—class definition in java file.

BOCustomerLookupFactory—java file name.

Architecture Java Naming Conventions

ReTA architecture files should all be prefixed with the 'AF' standard, e.g."AF<filename>java".

4.4.5 IDL

IDL (Interface definition Language) files define the interface of a COM component.

ReTA makes use of the following naming conventions.

Look with the Platform SDK or MIDL portion of the present description found within MSDN.

Application IDL Conventions

Business Object

All business objects should include the following statements in the #include section of the idl file.

```
#include <Persistence\IAFPersistable.idl>
#include <Activity\IAFEditable.idl>
```

Within the IDL for the Business Object the interface statement requires an "I" in front of the business object name.

```
. . .
// Description: Interface to the BORetaCustomer Component
#include <MtxAttr.h>
#include <JavaAttr.h>
#include <Persistence\IAFPersistable.idl>
#include <Activity\IAFEditable.idl>
[
  object,
  uuid(8B59B041-99CF-11d2-8F88-00805F29842D),
  dual,
  helpstring("IBORetaCustomer Interface"),
  pointer_default(unique)
]
interface IBORetaCustomer : IDispatch
{
  import "oaidl.idl";
  HRESULT getSsn([out, retval] long*ssn);
. . .
};
. . .
```

The business object IDL also defines the type library and the coclass. The type library may take on the name of the business object with "lib" appended to the end of the business object name. The coclass (Com class) may take on the name of the business object but may be prefixed with a "C". The following IDL shows the changes to be made.

```
[
  uuid(8B59B042-99CF-11d2-8F88-00805F29842D),
  version(1.0),
  helpstring("RetaCustomer component")
]
library BORetaCustomerLib
{
  importlib("stdole2.tib");
  [
    uuid (8B59B043-99CF-11d2-8F88-00805F29842D),
    helpstring("BORetaCustomer Class"),
    JAVACLASS("BObjects.BORetaCustomer"),
    PROGID("BObjects.BORetaCustomer"),
    TRANSACTION_SUPPORTED
  ]
  coclass CBORetaCustomer
  {
    [default] interface IBORetaCustomer;
    interface IAFEditable;
    interface IAFPersistable;
  }; . . .
```

Activity

All activities should include the following statements in the #include section of the idl file.

#include <Activity\IAFActivity.idl>

#include <Session\IAFEventListener.idl>

Within the IDL file the type library should follow the name of the activity and the coclass should also follow the naming convention described in the preceding portion of the description. An example below shows one in bold the changes to be made.

```
#Include <MtxAttr.h>
#include <JavaAttr.h>
#include <Activity\IAFActivity.idl>
#include <Session\IAFEventListener.idl>
[
  uuid(299AC8A0-A40C-11d2-8F8F-00805F29842D),
  version(1.0),
  helpstring("ACLCustomerLookup component")
]
library ACLCustomerLookupLib
{
  importlib("stdole2.tlb");
  [
    uuid(299AC8A1-A40C-11d2-8F8F-
      00805F29842D),
    helpstring("ARETACustomerLookup Class"),
    JAVACLASS
      ("CustomerLookup.ARETACustomerLookup"),
    PROGID
      ("CustomerLookup.ARETACustomerLookup"),
    TRANSACTION_SUPPORTED
  ]
  coclass CACLCustomerLookup
  {
    [default] interface IAFActivity;
    interface IAFEventListener;
  };
};
```

Sub-Activities

All sub-activities should include the following statement in the include section of the idl file.

#include <Activity\IAFSubActivity.idl>

In the IDL file for a sub-activity one must define the type library name and the coclass must also be provided. A code example that follows highlighted in bold shows the changes to be made to a sub-activity IDL.

```
#include <MtxAttr.h>
#include <JavaAttr.h>
#include <Activity\IAFSubActivity.idl>
[
  uuid(92E1A341-A64B-11d2-8F60-00805F53568F),
  version(1.0),
  helpstring("SACLCustDetailsCommit component")
]
library SACLCustDetailsCommitLib
{
  importlib("stdole2.tlb");
  [
    uuid(4910B881-A664-11d2-8F61-00805F53568F),
    helpstring("SACLCustDetailsCommit Class"),
    JAVACLASS
      ("CustomerLookup.SACLCustDetailsCommit"),
    PROGID
      ("CustomerLookup.SACLCustDetailsCommit"),
    TRANSACTION_SUPPORTED
  ]
  coclass CSACLCustDetailsCommit
  {
    [default] interface IAFSubActivity;
  };
};
```

Architecture IDL Conventions

Interfaces for architecture components that do not include any "coclass" statements may be prefixed with an "I", e.g. "IAFSEEventListener.idl".

All architecture components may use the component name as the filename for the IDL. For example, if the component name is AFSESystemPreferences the IDL filename may be, e.g."AFSESystemPreferences.idl".

All java packages may have a corresponding IDL file. For example EventHandler may have an IDL with this name, within this IDL may be all the associated coclass's that make up the package.

EventHandler.idl- <EventHandler—name of java package>

Example of—coclasses defined within "EventHandler.idl"

```
[
  uuid(F9205423-38B6-11d1-A328-0060080FBDF2),
  helpstring("XXEventHandler Class"),
  JAVACLASS("EventHandler.XXEventHandler"),
  PROGID("EventHandler.XXEventHandler"),
  TRANSACTION_SUPPORTED
]
coclass CXXEventHandler
{
  [default] interface IXXEventHandler;
};
[
  uuid(C82965A3-6A3B-11d1-A3A9-
    0060080FBDF2),
  helpstring("AFEventCollection Class"),
  JAVACLASS("EventHandler.AFEventCollection"),
  PROGID("EventHandler.AFEventCollection"),
  TRANSACTION_SUPPORTED
]
coclass CXXEventCollection
{
  [default] interface IXXEventCollection;
};
```

Testing

Figure 72A:
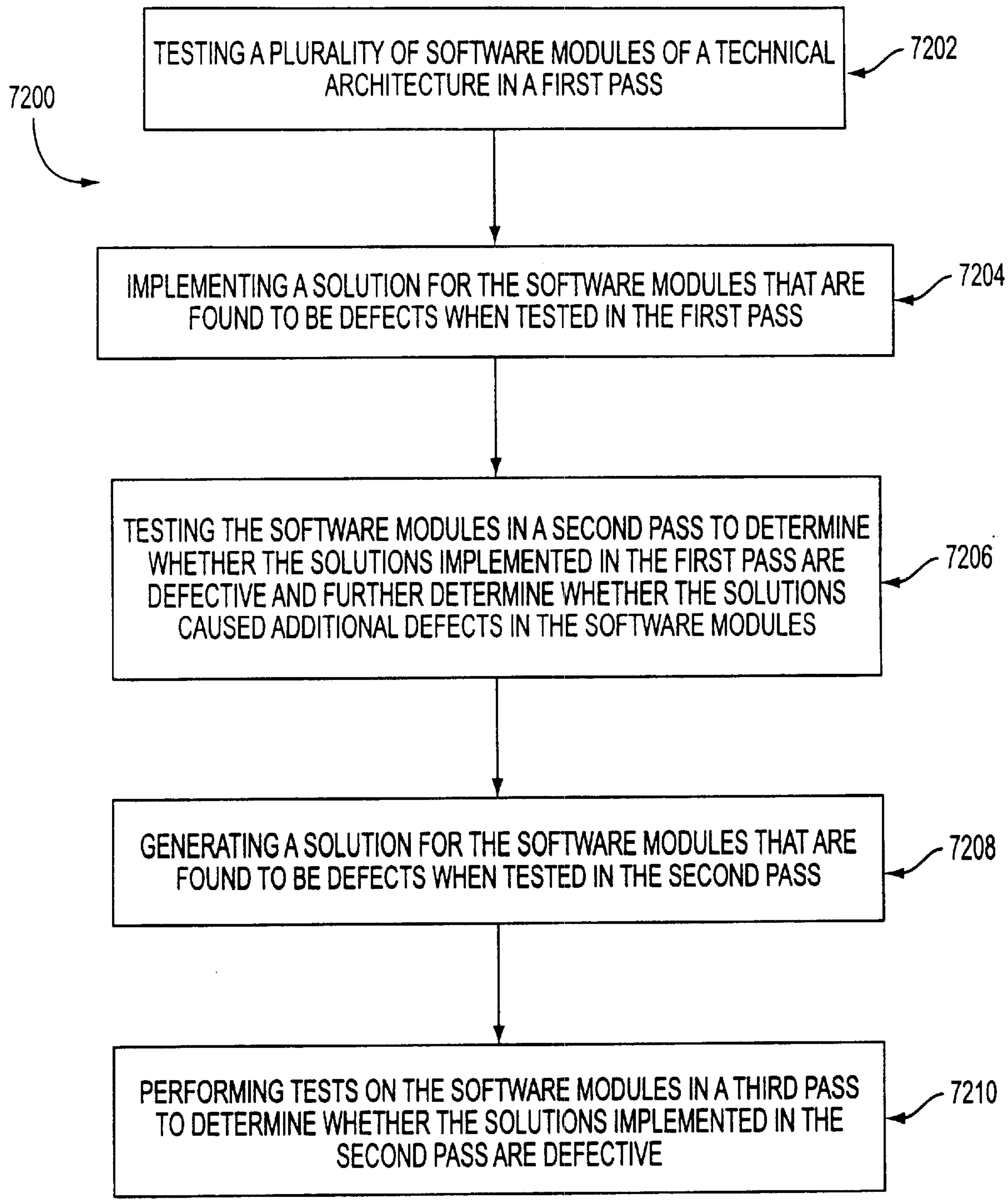
FIG. 72 is a flowchart illustrating a method for testing a technical architecture.
Figure 72B:
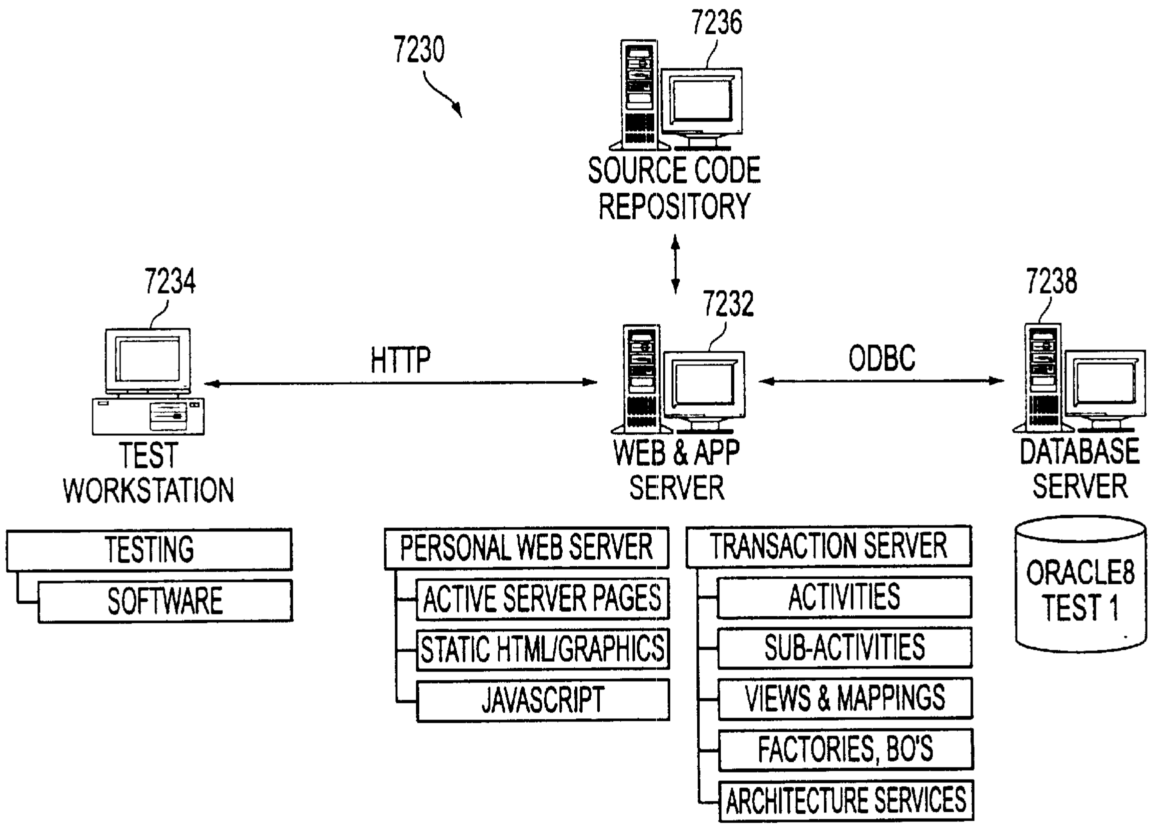

FIG. 72 illustrates a method 7200 for testing a technical architecture. In operation 7202, a plurality of software modules of a technical architecture are tested in a first pass. Next, a solution is implemented in operation 7204 for the software modules that are found to be defects when tested in the first pass. Subsequent to the first pass, in operation 7206, the software modules are tested in a second pass to determine whether the solutions implemented in the first pass are defective and further determine whether the solutions caused additional defects in the software modules. In operation 7208, a solution is generated for the software modules that are found to be defects when tested in the second pass. In operation 7210, further tests are preformed on the software modules in a third pass to determine whether the solutions implemented in the second pass are defective.

The technical architecture may include execution architecture, development architecture, and operations architecture. Further, after the third pass, the generating of solutions for software modules found to be defective and the performance of subsequent tests on the implemented solutions may be repeated until no defects are detected.

Optionally, the tests may be regression tests. Additionally, testing may be performed only on those software modules of the most frequent paths. In yet another aspect, the software modules of all legal paths may be tested. Optionally, only the software modules related to error and exception handling logic may be tested. The following material provides a more detailed description of the above-described method.

The purpose of the Assembly Test Approach Deliverable is to outline the detailed approach that may be used to plan and execute the Assembly Test for Phase 1 of the Resources eCommerce Technical Architecture (ReTA) initiative.

Test Objectives and Scope

Objectives

The Assembly Test Approach deliverable outlines the approach that may be used to execute the Assembly Test. The Assembly Test ensures related components (programs) function properly when assembled into dialogs or batch processes and to verify that the interfaces have appropriately implemented the system design.

The Assembly Test Approach outlines the following information:

Test Objectives and Scope

Regression Testing Approach

Test Environment (Includes test tools)

Metrics

The Assembly Test Approach may provide the overall guidelines that may be adhered to when planning and executing the Assembly Test.

Scope

The scope of this Assembly Test Approach portion of the present description is limited to the Phase 1 enhancements to the ReTA architecture.

Execution Architecture

The Execution Architecture comprises all the components required to support an application during run-time. The Netcentric Architecture Framework (NCAF) identifies those common, run-time services required when an application executes in a Netcentric environment. The services can be broken down into logical areas: Presentation Services, Information Services, Communication Services, Communication Fabric Services, Transaction Services, Environment Services, Base Services and Business Logic.

Execution architecture services typically provide either an interface between the application and some system component, or an interface connecting application components (for example a distribution service that allows client applications to execute server application transactions). The technology architecture assembly test focuses on testing the end-to-end function and quality of these execution architecture services.

The execution architecture components considered for Assembly test are:

Environment Services—Application Services

Codes Table services: static data code-decode implementation

Common services: creation of ASP header file to provide common architecture constants and functions within application Active Server Pages Information Services—Database Services Access: ADO Persistence layer Presentation Services—Web Browser Form: UI Controls Client-side field validation (JavaScript)

Client architecture file to provide common JavaScript functions (field validation, date validation, message boxes, etc.). This may provide a single point of maintenance and functionality for client architecture services. Grouping attributes into single method call Dropdown listbox UI Control integration with CodesTable service.

Development Architecture

The development architecture is built upon an integrated set of tools and components, each supporting a specific task or set of tasks in the development process. The purpose of the development architecture is to support the tasks involved in the analysis, design, construction, and maintenance of business systems, as well as the associated management processes.

The development architecture components considered for Assembly test are:

System Building Services—Construction

Application developer coding templates for Active Server Pages, Activity, Sub-Activity, View, Mapping, Factory and Business Object.

Standards and Procedures

Operations Architecture

The Operations Architecture is a combination of tools, support services, procedures, and controls required to maintain a production system and keep it running efficiently. Unlike the Execution and Development Architectures, its primary users are the system administrators and the production support personnel.

The operations architecture components considered for Assembly test are:

Physical Environment Services—Implementing

Initial server installation (core software only)

Web server

Application server

Database server

Initial workstation installation (core software only)

Architecture installation process

Workstation

Architecture required java files

Architecture frameworks

Build tools

Architecture make file

Visual Studio 95 build tools

Server

Architecture required database tables

Other

The components considered for Assembly test are:

Code cleanup

Component name changes (prefix): Removal of all application references within the architecture Application of naming and coding standards.

Consolidation of UI control attributes into single method calls.

Renaming and cleanup of framework constants.

Test Cycles

The assembly test conditions may be defined as follows:

Reuse the component test conditions.

Add test conditions as necessary to obtain 100% message path coverage.

The test cycles may be organized as follows, for each assembly:

Cycle 1: test conditions that exercise the most frequent paths

Cycle 2: test conditions that exercise all other legal paths

Cycle 3: test conditions that exercise the error and exception handling logic

All cycles may be independent to minimize the overall calendar time required to test. In addition, each cycle may be run three times (i.e., three passes):

The objective of pass 1 is to get through the test as quickly as possible, finding as many defects as possible and implementing workarounds where needed.

The objective of pass 2 is to regression test the defects fixed from pass 1, and determine if the pass 1 workarounds caused any more defects.

The objective of pass 3 is to regression test defects fixed from pass 2; no defects should be found.

By planning three passes, regression tests can be built in to ensure that defects are completely fixed and the fixes did not break anything else.

It is important to note that the Technology Architecture Assembly Test Approach applies to both testing after normal construction and testing during "fix-it" or "debug" mode. Technology architecture assembly testing for normal development may cover all interactions between the technology architecture components, while an assembly test in "fix-it" mode may cover only the interactions which apply to the fix [fixes] being implemented.

Risks

The risks and risk management approach for the Assembly Test stage are outlined below:

Concurrent Development and Configuration Management

During the phase 1, there may be several simultaneous enhancement efforts. It may be essential to follow strict configuration management procedures in order to prevent version overwriting.

Mitigation Plan

All components to be modified should be checked out of the version control tool (Visual Source Safe) with a detailed label stating the change description and the developer's name. If separate enhancement efforts require the same file, developers should coordinate file control so not to overwrite the other's work.

Contingency Plan

Defects may be tracked during the Assembly Test. If a large number of defects are attributed to version mismatch or overwriting, the configuration management approach for development may be reevaluated. Additional resources may need to be added to the build and Assembly Test effort.

Scope of Test Effort

Since almost every module may be modified (due to name changes), there may need to be extensive assembly testing to ensure no functionality is broken.

Mitigation Plan

This Assembly Test approach relies on automation and reuse. There may be an effort to automate all Assembly Testing, so that it is easy to both execute the test and verify the expected results.

Contingency Plan

Defects may be tracked during the Assembly Test. If a large number of defects are found for modules, the approach to coding and component testing the modules may be reevaluated.

Regression Testing Approach

After a fix is put into the system, the fix is tested to ensure that it is correct. Other functions are "regression" tested in order to ensure that they were not adversely affected (broken) by the fix; this is regression testing. In general, the regression test should include all functions either directly or indirectly impacted by the fix and be executed during each pass.

At the end of each test stage, a clean test pass for that stage may be conducted. If non-critical errors do remain at the end of a test stage, the team leader for that stage must sign-off on their portion of the present description. The time required to execute the last test pass ought to be minimal, since the cycles should execute correctly.

The three pass approach for technology architecture assembly test may facilitate regression testing of defects found in the current test. In addition, the entire technology architecture assembly test model may be portion of the present descriptioned, repeatable and automated (where possible) in order to be easily re-executed for each pass.

For each code fix, a complete Assembly Test may be re-executed. Any new conditions created as result of fix implementation may be added to the existing test plan (conditions, scripts, etc.).

Test Environment Requirements

Technical Configuration

The technology architecture assembly test may occur in the technology architecture development environment. It is separated from the technology architecture, assembly test environment.

FIG. 72.1 illustrates the application & architecture configuration for a typical ReTA Build environment 7230. In this model, the testing workstation is configured to provide presentation services by way of an HTML 3.2 & JavaScript 1.2 compatible web browser. The web/application server 7232 is configured with the current assembly test versions of ReTA application and architecture components and is connected to a test workstation 7234, a source code repository 7236, and a database server 7238.

The following table provides a complete listing of the hardware and software configuration of the assembly test environment.

| Name | CPU | RAM | Operating System | Software |
|---|---|---|---|---|
| RETADEV 4 | P 300 | 128 MB | Windows NT 4.0 (SP4) | Microsoft Visual SourceSafe Client 6.0<br>Microsoft Visual J++ 6.0<br>Microsoft Visual C++ 6.0 -Tools Only<br>Microsoft Internet Explorer 4.01<br>ReTA Issues Tracker<br>ReTA SIR Workbench |
| RETASRV2 | P-166 | 60 MB | Windows NT 4.0 (SP4) | Microsoft Visual SourceSafe Server 6.0<br>HP OmniBack II Client |
| STPFS1011 | P-400 (4x) | 2 GB | Windows NT Enterprise Server 4.0 | Microsoft Internet Explorer 4.01<br>Microsoft IIS 4.0<br>Microsoft Transaction Server 2.0<br>Microsoft Active Data Objects 2.0<br>Oracle8 (Client only)<br>HP OmniBack II Client |

External Interfaces

None

Test Data Management

The common test data may be copied to the technology architecture assembly test environment and modified as needed by the development cell to satisfy all the technology architecture assembly test conditions.

After each successful execution of a cycle, the test executor may make a database backup. This backup may serve two purposes. It can be used as evidence of a successful execution of the cycle. It can also be used to restart a test execution after a certain sequence of upstream cycles. The details of backup procedures in using the backup utility may be provided by the Database Architecture Team prior to the start of the technology architecture assembly test execution.

Source Environment

Figure 73:
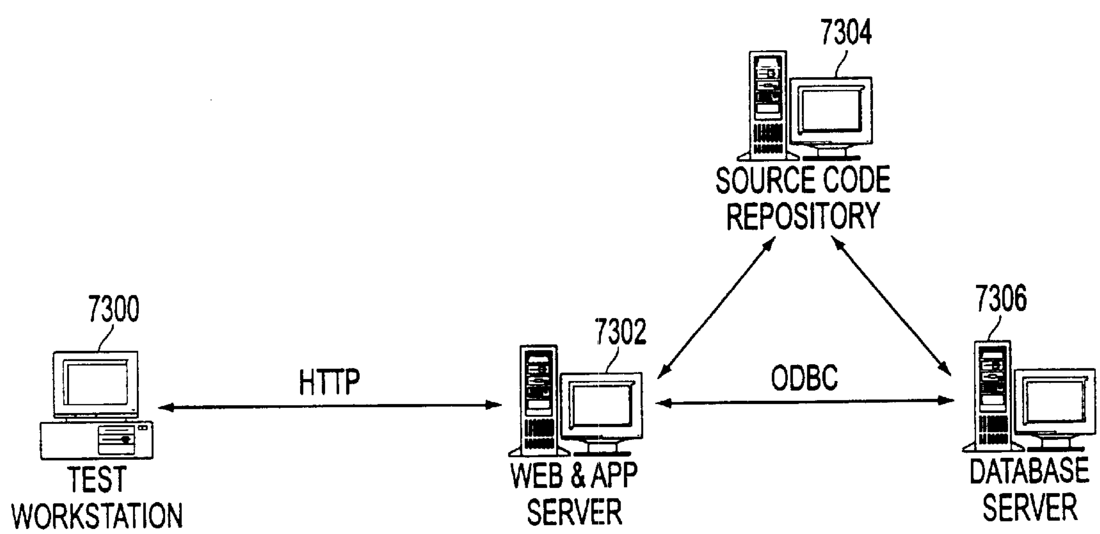
FIG. 73 illustrates that the code for technology architecture assembly test may be migrated from the technology architecture component test environment as defined in the migration procedures according to an embodiment of the present invention.

During the Assembly Test phase of a ReTA engagement, the Source Control Administrator may be responsible for the mass checkout and build of the entire application or architecture. FIG. 73 illustrates that the code for technology architecture assembly test may be migrated from the technology architecture component test environment as defined in the migration procedures. As shown, the test workstation 7300 is only connected to the web and application server 7302. The web and application server is connected to the source code repository 7304 and the database server 7306.

Automation

Test Execution—Custom scripts may be created and used by the developer to automate the execution of individual Assembly Tests.

Debugging—Visual Studio Source Code Debugger may be used.

Problem Management—a System Investigation Requests (SIR) Database for entering and managing the problem resolution process may be used to track all issues detected during assembly test.

Environment Cleanup

The developer is responsible for cleaning up the databases and other environment information after each pass of the test execution.

Security

As part of Assembly test, the following security roles may be created:

Source Control administrator—responsible for monitoring code migration

Web/Application server administrator—responsible for installation, configuration, maintenance and tuning on the server Database administrator—responsible for test database installation, maintenance and tuning Metrics The following metrics may be collected and evaluated throughout technology architecture component test:

Metric Name

Definition

Target

Frequency of collection and evaluation

Refer to the Testing Metrics Job Aid in the Business Integration Methodology for more information.

Entry and Exit Criteria

The entry and exit criteria for the different activities in Assembly Testing may ensure the quality of each deliverable from the testing process. Below are the entry and exit criteria for assembly test.

| | | | | |
|---|---|---|---|---|
| Stage: | Assembly Test | Exit Sign-off Details<br>Name:<br>Date:<br>Cell Leader: | ____________<br>____________<br>____________ | |
| Test Activity | Entry/Exit Criteria | | Signed off by . . . | Date |
| Develop Assembly Test Approach | Entry Criteria:<br>Capability Release Evaluation Approach Completed<br>At least 50% of the code completed before any Assembly Testing started.<br>Exit Criteria:<br>A configuration audit must have been completed on the source code and Assembly Test information after all test cycles run successfully. | | | |

Test Resources and Workplan

Resources

The assembly test team may be responsible for creating the technology architecture Assembly Test conditions. The component test conditions developed during the design phase may be leveraged in assembly test as well. The Work Cell Leads may approve all test conditions and expected results.

The Assembly Test scripts may be developed and executed by Assembly test team. The Work Cell Leads may supervise the effort. The Test Manager may sign off on the deliverables. The Project Manager may approve the final report.

Workplan

See the activities Architecture Design—Assembly Test: Prepare Assembly Test Approach and Prepare Assembly Test Plan within the ReTA workplan.

Technology Architecture Component Test Approach

ReTA

| Revision Number | Date | Prepared By |
|---|---|---|

Overview

The purpose of the Component Test Approach Deliverable is to outline the detailed approach that may be used to plan and execute the Component Test for Phase 1 of the Resources eCommerce Technical Architecture (ReTA) initiative.

Test Objectives and Scope

Objectives

The objective of the Component Test is to ensure that each program in the application or architecture has implemented the functional, quality and technical specifications and should test all lines of code and branches of logic. At the end of component test, all lines of code should have been exercised and proven to meet the specified functional and quality requirements.

This objective is met through the following steps:

Develop the Component Test Approach

Plan Component Test

Prepare Component Test

Establish Component Test Environment

Execute Component Test

Component testing addresses the initial stages of testing. Generally, testing at the component stage tests code. The test data prepared by the programmer tests how the component or module handles both valid and exception conditions. All logic paths are tested. Utility modules or any modules with complex logic should be tested in isolation before being integrated with other components.

Successful completion of the component test for the technology architecture components ensures that they meet their specifications. Interactions with other Technology architecture components are not part of this test. The operations required of other components (e.g., data access) by the components under test are replaced by stubs.

Scope

The scope of this Component Test Approach portion of the present description is limited to the Phase 1 enhancements to the ReTA architecture. These enhancements include:

Execution Architecture

Environment Services—Application Services

Codes Table services: static data code-decode implementation

Common services: creation of ASP header file to provide common architecture constants and functions within application Active Server Pages Information Services—Database Services Access: ADO Persistence layer Presentation Services—Web Browser Form: UI Controls Client-side field validation (JavaScript)

Client architecture file to provide common JavaScript functions (field validation, date validation, message boxes, etc.). This may provide a single point of maintenance and functionality for client architecture services. Grouping attributes into single method call Dropdown listbox UI Control integration with CodesTable service.

Development Architecture

System Building Services—Construction

Application developer coding templates for Active Server Pages, Activity, Sub-Activity, View, Mapping, Factory and Business Object.

Other

Code cleanup

Component name changes (prefix): Removal of all application references within the architecture Application of naming and coding standards.

Consolidation of UI control attributes into single method calls.

Renaming and cleanup of framework constants.

Test Cycles

The test cycles, for each technology architecture component, may be organized as follows:

Cycle 1: test conditions that exercise the most frequent input, preconditions, and paths Cycle 2: test conditions that exercise all other legal input, preconditions, and paths Cycle 3: test conditions that exercise the error and exception handling logic All cycles may be independent to minimize the overall calendar time required to test. In addition, each cycle may be run three times (i.e., three passes) to meet the objectives outlined below:

The objective of pass 1 is to get through the test as quickly as possible, finding as many defects as possible and implementing workarounds where needed.

The objective of pass 2 is to regression test the defects fixed from pass 1, and determine if the pass 1 workarounds caused any more defects.

The objective of pass 3 is to regression test defects fixed from pass 2; no defects should be found.

By planning three passes, regression tests are built in to ensure defects are fixed and did not break anything else.

It is important to note, the Technology architecture Component Test Approach applies to both testing after normal construction and testing during "fix-it" or "debug" mode.

Risks

The risks and risk management approach for the component test stage are outlined below:

Concurrent Development and Configuration Management

During the phase 1, there may be several simultaneous enhancement efforts. It may be essential to follow strict configuration management procedures in order to prevent version overwriting.

Mitigation Plan

All components to be modified should be checked out of the version control tool (Visual Source Safe) with a detailed label stating the change description and the developer's name. If separate enhancement efforts require the same file, developers should coordinate file control so not to overwrite the other's work.

Contingency Plan

Defects may be tracked during the component test. If a large number of defects are attributed to version mismatch or overwriting, the configuration management approach for development may be reevaluated. Additional resources may need to be added to the build and component test effort.

Scope of Test Effort

Since almost every module may be modified (due to name changes), there may need to be extensive component and assembly testing to ensure no functionality is broken. Mitigation Plan This component test approach relies on automation and reuse. There may be an effort to automate all component testing, so that it is easy to both execute the test and verify the expected results.

Contingency Plan

Defects may be tracked during the component test. If a large number of defects are found for modules, the approach to coding and testing the modules may be reevaluated.

Regression Testing Approach

After a fix is put into the system, the fix is tested to ensure that it is correct. Other functions are "regression" tested in order to ensure that they were not adversely affected (broken) by the fix; this is regression testing. In general, the regression test should include all functions either directly or indirectly impacted by the fix and be executed during each pass.

At the end of each test stage, a clean test pass for that stage may be conducted. If non-critical errors do remain at the end of a test stage, the team leader for that stage must sign-off on their portion of the present description. The time required to execute the last test pass ought to be minimal, since the cycles should execute correctly.

The three pass approach for technology architecture component test may facilitate regression testing of defects found in the current test. In addition, the entire technology architecture component test model may be portion of the present descriptioned, repeatable and automated (where possible) in order to be easily re-executed for each pass.

For each code fix, a complete component test may be re-executed. Any new conditions created as result of fix implementation may be added to the existing test plan (conditions, scripts, etc.).

Test Environment Requirements

Technical Configuration

The technology architecture component test may occur in the technology architecture development environment. It is separated from the technology architecture, assembly test environment.

Figure 74:
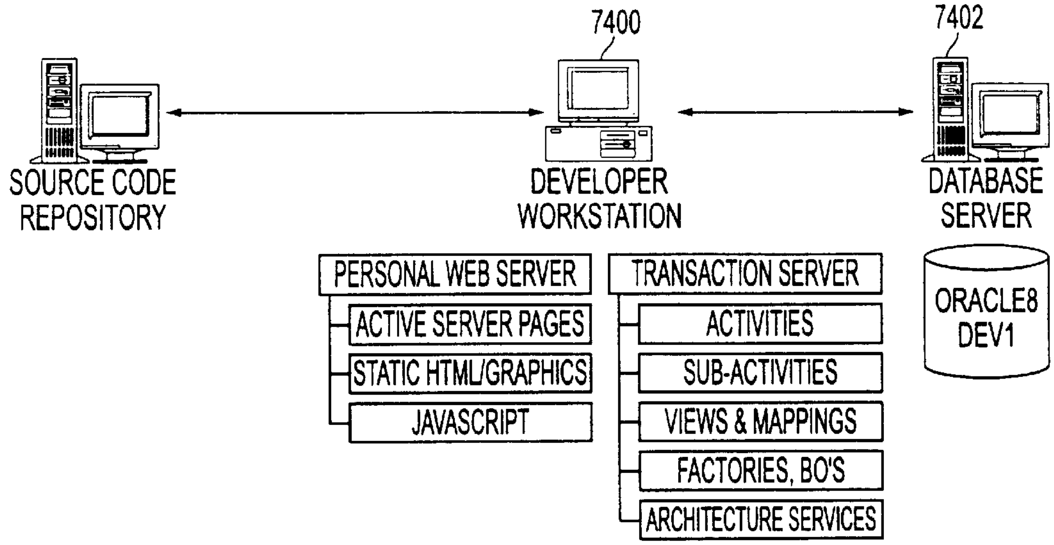
FIG. 74 illustrates the application & architecture configuration for a typical ReTA Build environment according to an embodiment of the present invention.

FIG. 74 illustrates the application & architecture configuration for a typical ReTA Build environment. In this model, the testing workstation 7400 is configured to provide presentation services by way of a HTML 3.2 and JavaScript 1.2 compatible web browser. The web/application server 7402 is configured with the current assembly test versions of ReTA application and architecture components.

External Interfaces

None

Test Data Management

The master set of common test data may reside in the central database. Each developer may access the data from their local workstation. When necessary, the data may be modified to satisfy all the test conditions for the tested components. The master test data should be exported so that the database tables can be restored to their original state once the test cycle is complete.

Source Environment

The components under test and their technology architecture modules/classes are managed within the Source Control tool, Visual Source Safe. They are to be locked for the duration of the test; the developer receives exclusive access.

Automation

Test Execution—Custom scripts may be created and used by the developer to automate the execution of individual component tests.

Debugging—Visual Studio Source Code Debugger may be used.

Problem Management—a System Investigation Requests (SIR) Database for entering and managing the problem resolution process may be used to track all issues detected during assembly test.

Environment Cleanup

The developer is responsible for cleaning up the databases and other environment information after each pass of the test execution.

Security

The developer is in charge of configuration management (version control and migration control) of the components under their responsibility. When the component has successfully completed component test and code review, the developer should promote the code to the appropriate, staged location in the version control repository.

Metrics

The following metrics may be collected and evaluated throughout technology architecture component test:

Metric Name

Definition

Target

Frequency of collection and evaluation

Refer to the Testing Metrics Job Aid in the Business Integration Methodology for more information.

Entry and Exit Criteria

The entry and exit criteria for the different activities in component testing may ensure the quality of each deliverable from the testing process. Below are the entry and exit criteria for assembly test.

Test Resources and Workplan

Resources

The developer responsible for the component build may create the technology architecture component test conditions. The creation of the test conditions may happen concurrently with the detail design of the component. The Work Cell Leads may approve all test conditions and expected results.

The component test scripts may be developed and executed by dedicated developers within the work cells. In addition, test drivers and stubs to simulate other components may be the responsibility of the developer. The Work Cell Leads may supervise the effort. The Test Manager may sign off on the deliverables. The Project Manager may approve the final report.

Workplan

See the activities Architecture Design—Component Test: Prepare Component Test Approach and Prepare Component Test Plan within the ReTA workplan.

Performance Test Approach

Overview

The purpose of the Performance Test Approach Deliverable is to outline the detailed approach that may be used to plan and execute the Performance Test for the Resources eCommerce Technical Architecture (ReTA) initiative.

Performance and Stress Test simulates high production data volumes and ensures that system response time and communication links are adequate. Potential bottlenecks are identified and analysis of how the system can perform internally and with other systems at maximum processing loads is performed. Various members from the ReTA Technical Architecture team may perform this test.

Test Objectives & Scope

Objectives

Performance testing closely emulates the actual workload that an application generates and utilizes all environmental components for its test: network, server, clients, databases. Performance testing may also allow one to determine how effectively the application may function in. the current environment and to gauge how scaleable it may be should the usage increase.

The ReTA Phase 2 Performance Tests may focus on five primary objectives: To measure the response time performance of ReTA framework services in an environment that reasonably simulates an expected production environment.

To identify potential performance risks that need to be addressed in order to meet the foreseeable application response time requirements.

To work together with the development teams to analyse issues, identify root causes, and develop alternatives for performance enhancement.

To portion of the present description performance improvement ideas and suggestions that should be considered for the medium- to long-term.

To determine baseline hardware and network recommendations for use during requirement analysis phases of an engagement.

Scope

The Performance Test Team may:

Develop a simulated production-like environment for the purpose of performance testing;

Measure online user response times of the reference application under variable user load scenarios;

Recommend possible alternatives for performance enhancement; and,

Publish final reports describing the results of the Performance Test.

Risks

The following table identifies external risks to be managed by the Performance Testing Team.

| | |
|---|---|
| Performance Testing environment negatively impacted by SolutionWorks network traffic usage. | Test cycle execution should be done during periods of low network usage (lunch periods, after normal business hours, etc.) |
| Tuning measures recommended by the Performance Testing Team must be implemented prior to the beginning of the next testing cycle. | ReTA Architecture team to notify Performance Testing Team in the case that tuning measures cannot be implemented within an agreed-upon time window. |
| Other risks being determined . . . | Performance Team to regularly and proactively keep project management appraised of new risks and issues. |

Performance Testing Approach

Approach Description

The performance testing approach centers on using an automated performance/load testing application to assist in the test script creation and execution. Three different tests (load, stress, and performance) may be executed to accurately determine the performance picture of the ReTA Phase 2 architecture. Each test and its accompanying test cycles may be designed to simulate varying user volumes.

Key Differences between Load, Stress and Performance Testing

For the purpose of this portion of the present description, Load, Stress and Performance Testing may be distinguished. It is important to understand the subtle differences amongst the three types of testing.

Load Testing

Load testing is used to subject a server to the load conditions that may be realized in a live production environment. This should enable the tester to make a more predictable assessment of the performance of a production system and thus eliminate much of the uncertainty. Load testing focuses on the number of users accessing the server, the combination of business transactions that are executed on the server, and the impact of the combination of users and transactions on different environment components.

Stress Testing

Stress testing extends the focus of the load test. Whereas load testing stresses the server to normal production levels to determine performance, stress testing focuses on locating the point at which server performance breaks down. This is achieved by steadily increasing the number of simulated users that execute a given transaction until a breaking point is reached. In addition, a variation of this test would be to execute a single transaction repeatedly for an extended period of time.

Performance Testing

Performance testing focuses on measuring performance for a specific transaction. The performance of a server should be measured under different user load conditions. For ReTA Phase 3 testing, cycles may be executed against both Oracle 8 Enterprise and Microsoft SQL Server 7.0 databases.

Testing Process

For each of the performance tests, the following process may be used to plan, execute, and evaluate the results of the tests:

Plan the Scenario

Determine the goal of the test such as the number of simulated users, the transactions to be performed and the transactions to be timed.

Record Web Scripts

Record the steps a user may take to complete a transaction with the application. The majority of automated testing tools available on the market offer recording capabilities for the tester to capture the various actions that make up a single transaction as the tester navigates through the application.

Define the Scenario

A list of virtual users has to be defined in each workstation that is used for testing. The number of virtual users and the scripts to be used by each virtual user have to be set up before the scenario can be run.

Run the Scenario

Since the execution script is pre-recorded, simply clicking a button can run it. The testing tool may automatically launch all the virtual users and keep track of their test status. it should also record and measure the server response time as well as other statistics.

Analysis of Performance Graphs and Reports

After the scenario has completed its run, the performance graphs may be generated and shown to the tester automatically. The tester can then analyze the graphs and reports available. Graphs should be available that provide individual page averages, complete scenario execution times, and high/low response times.

Testing Application

The application to be used during the ReTA Phase 2 Performance Tests provides three simple business and operational function.

| | |
|---|---|
| Review/Submit Feedback | This set of dialogs provides functionality for inputting and reviewing feedback. From a testing perspective, this provides database insert and volume retrieval functionality. |
| Review Events | This operational dialog provides custom queries and retrieval against the architecture event log. For testing purposes, this dialog provides volume data retrieval. Customer Maintenance. This simulated business activity provides customer retrieval, update and deletion functionality. For testing purposes, these dialogs provide multi-window, transactional functionality. |

The testing script for both the Load and Stress tests consists of the following activities:

- Application login
- Customer Maintenance (create new)
- Customer Maintenance (modify customer created in step 2)
- Customer Maintenance (lookup existing customer)
- Customer Maintenance (delete customer created in step 2)
- Submit feedback
- Review feedback
- Review events
- Application logout During the database performance test cycles, the following script may be followed:

- Application login
- Customer Maintenance (create new)
- Customer Maintenance (modify customer created in step 2)
- Customer Maintenance (lookup existing customer)
- Customer Maintenance (delete customer created in step 2)
- Application logout

Performance Test Cycles

The performance tests may be organized to reuse the component and assembly test conditions and scripts. In addition, testing functionality may leverage the reference application components developed in early phases of the ReTA initiative. A mix of various transactions may be used to ensure that the testing clients, web/application server, and database server are sufficiently stressed.

Load Test

The ReTA Phase 2 Load Test is comprised of the following cycles:

- Cycle 1: 25 concurrent users (various transactions)
- Cycle 2: 50 concurrent users (various transactions)
- Cycle 3: 75 concurrent users (various transactions)
- Cycle 4: 100 concurrent users (various transactions)

Stress Test

The ReTA Phase 2 Stress Test may be comprised of the following test cycles:

- Cycle 1: 50 concurrent users (various transactions for 2 hours)

Cycle 2: 100 concurrent users (various transactions for 2 hours)

Cycle 3: 200 concurrent users (various transactions for 2 hours)

Performance Test

The ReTA Phase 2 Performance Test may be comprised of the following test cycles:

Cycle 1: 50 concurrent users (Customer Lookup2l3pdate, Oracle 8.04 Database)

Cycle 2: 100 concurrent users (Customer Lookup2Update, Oracle 8.04 Database)

Cycle 3: 50 concurrent users (Customer Lookup/Update, SQL Server 7.0 Database)

Cycle 4: 100 concurrent users (Customer Lookup/Update, SQL Server 7.0 Database)

Test Environment Requirements

Physical Configuration

Figure 75:
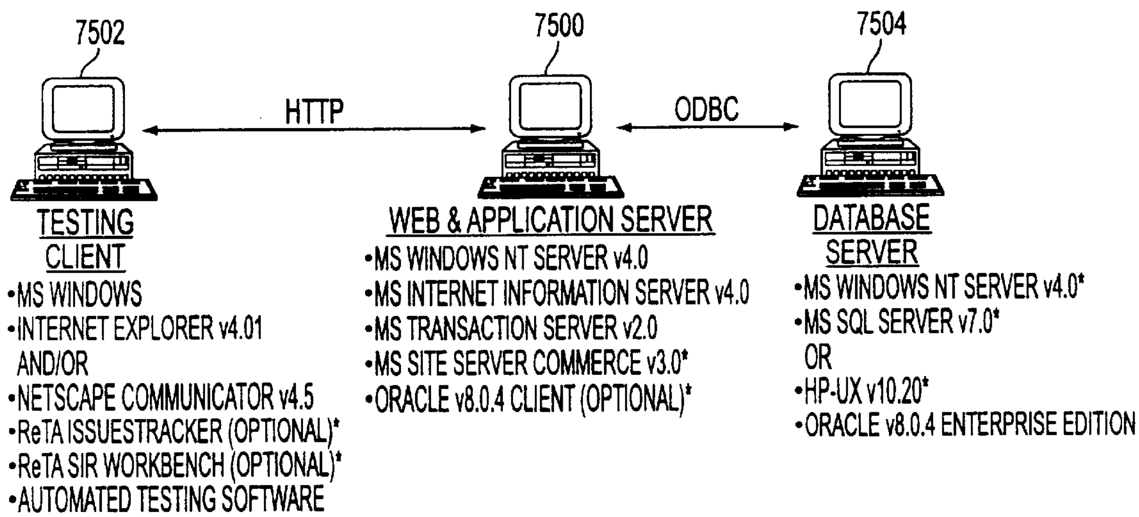
FIG. 75 illustrates the physical characteristics of the testing environment to be utilized during the Performance Testing Phases according to an embodiment of the present invention.

FIG. 75 illustrates the physical characteristics of the testing environment to be utilized during the Performance Testing Phases. In particular, a web and application server 7500 is connected to a testing client 7502 and a database server 7504.

Hardware/Software Configuration

The following table provides a complete listing of the hardware and software configuration of the performance test environment.

| Name | CPU | RAM | Operating System | Software |
|---|---|---|---|---|
| RETADEV 4 | P-300 | 128 MB | Windows NT Workstation 4.0 (SP4) | RSW eTest & eLoad<br>Microsoft Internet Explorer 4.01<br>ReTA Issues Tracker<br>ReTA SIR Workbench |
| STPFS1011 | P-400 (4x) | 2 GB | Windows NT Enterprise Server 4.0 | Microsoft Internet Explorer 4.01<br>Microsoft IIS 4.0<br>Microsoft Transaction Server 2.0<br>Microsoft Active Data Objects 2.0<br>Oracle8 (Client only)<br>HP OmniBack II Client |
| RETADB2 | P-300 | 128 MB | Windows NT Server 4.0 (SP4) | Microsoft Internet Explorer 4.01<br>Microsoft SQL Server 7.0<br>HP OmniBack II Client |
| AS88232 | HP K570 | 3.75 GB | HP-UX v10.20 | Oracle Enterprise Edition 8.04<br>HP OmniBack II Client |

External Interfaces

None

Test Data Management

The performance test data may be created using an Active Server Page created during Phase 2 for the purposes of populating and restoring test data. After each successful execution of a cycle, the test executor may refresh the database by re-executing the data population Active Server Page.

Automation

An automated web-based testing application may be utilized for test script recording and playback. The testing application should have the ability to simulate multiple web clients.

Debugging—Visual Studio Source Code Debugger may be used.

Problem Management—a System Investigation Requests (SIR) Database for entering and managing the problem resolution process may be used to track all issues detected during performance tests.

Environment Cleanup

The developer is responsible for cleaning up the databases and other environment information after each pass of the test execution.

Security

As part of performance test, the following security roles may be created:

Source Control administrator—responsible for monitoring code migration

Web/Application server administrator—responsible for installation, configuration, maintenance and tuning on the server Database administrator—responsible for test database installation, maintenance and tuning SIRs/Change Requests The Performance Testing Team may, as a result of Performance Tuning analysis, create SIRs and/or Change Requests, as appropriate. These portion of the present descriptions may describe recommendations for performance enhancements to be undertaken by the architecture development team. Project management may hold responsibility for prioritizing and scheduling SIRs and/or Change Requests for the immediate-, medium-, and long-term.

Metrics

The following metrics may be collected and the ReTA Phase 2 performance tests:

End-to-end response times for individual transactions.

Measurement summary of transaction performance

Performance summary of all transactions

Detailed measurement of transaction performance

Simulated user statistical report

CPU utilization of Web/Application and database servers.

Database connection pooling statistics

Test Resources and Workplan

Resources

The performance test team may be responsible for creating the technology architecture Performance Test data and scripts. The component test conditions developed during the design phase may be leveraged in performance test as well. The Work Cell Leads may approve all test conditions and expected results.

The Performance Test scripts may be developed and executed by Performance testing team. The Work Cell Leads may supervise the effort. The Test Manager may sign off on the deliverables. The Project Manager may approve the final report.

Workplan

The workplan for the ReTA Phase 2 Performance Tests can be found within ReTA Performance Test Workplan.

The high level tasks within the workplan are as follows:

Develop testing scenarios (transactional mix)

Establish testing environment

Develop data generation, population, and refresh approach

Develop load generation approach

Get first cut of architecture/application code

Record and modify automated testing scripts

Execute test cycles

Analyze, report, SIRs, change recommendations, etc.

Code changes per performance management review

Re-execute or get second cut of code.

Change Tracker Database Usage

Figure 76A:
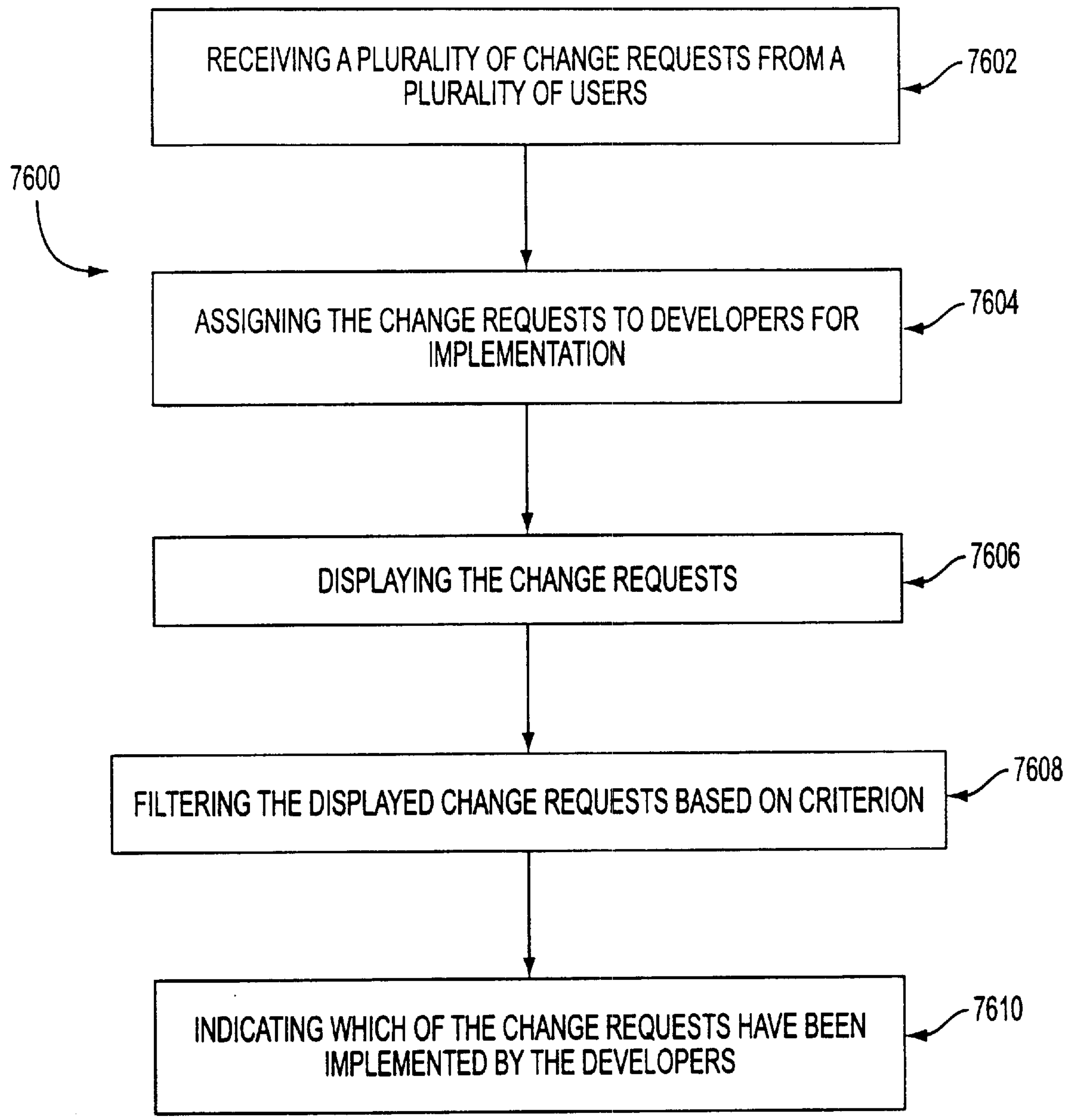
FIG. 76 is a flow chart depicting a method for managing change requests in an e-commerce environment.
Figure 76B:
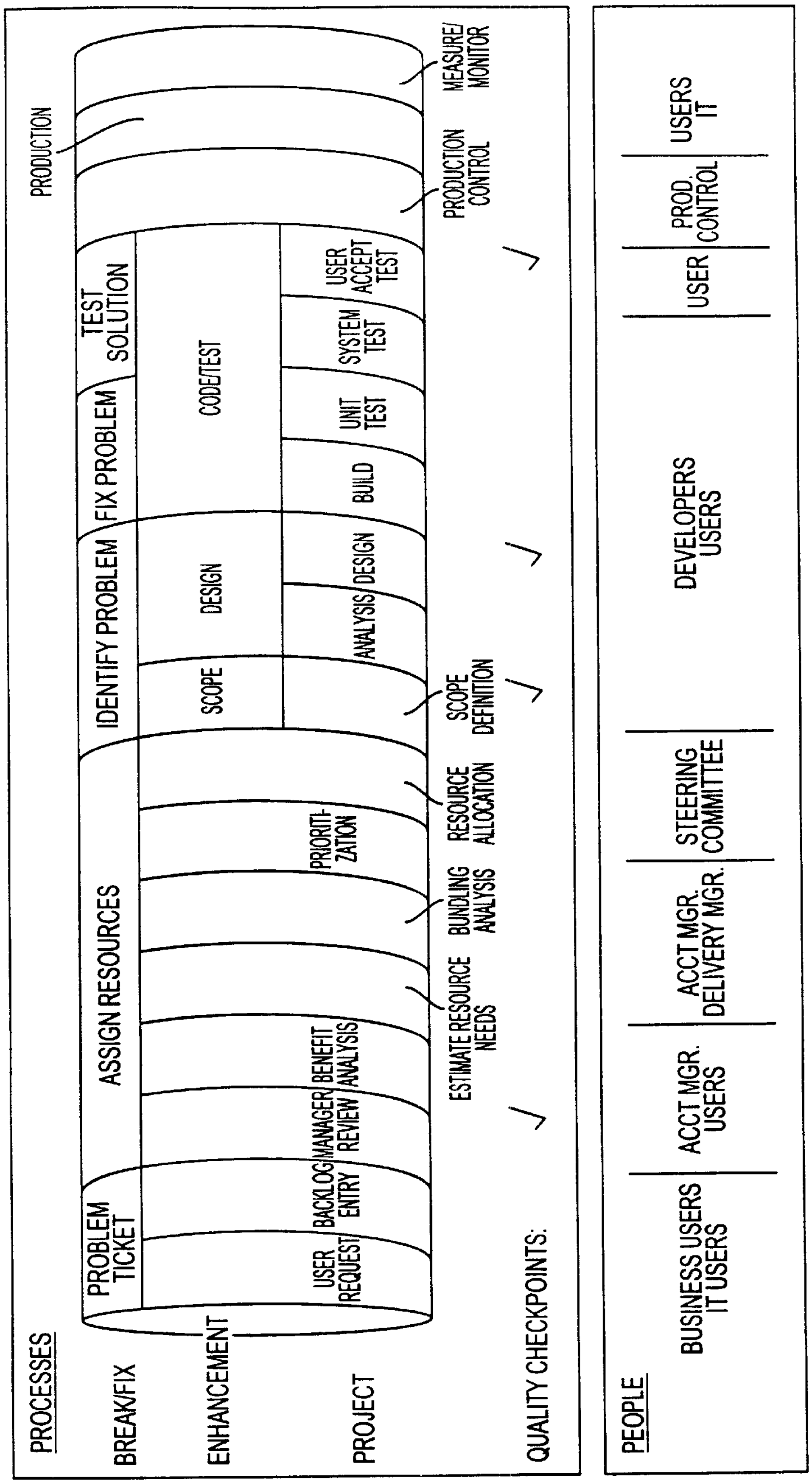

FIG. 76 illustrates a method 7600 for managing change requests in an e-commerce environment. A plurality of change requests are received from a plurality of users in operation 7602. In operation 7604, the change requests are assigned to developers for implementation. The change requests are displayed in operation 7606. The displayed change requests are filtered in operation 7608 based on criterion. Indication is provided in operation 7610 for those change requests which have been implemented by the developers.

As an option, an indication from one of the developers may be received indicating that one of the change requests has been implemented while additionally displaying a time when the indication was received.

The criterion may be a predetermined group of criterion for reporting purposes. Optionally, the user may select the criterion.

The users may further be allowed to edit the change requests. In such an embodiment, the users may be allowed to edit the change requests via a display having fields such as a date each change request was entered, the user that requested each change request, an application affected by each change request, a status of each change request, and a priority of each change request, a description of each change request, the developer responsible for implementing each change request, a category of each change request, and a target date for implementation of each change request. Additionally, the fields may also include the target date so that a time may be indicated when the target date was last edited. The following material provides a more detailed description of the above-described method.

The following discussion provides an overview of the Change Tracker Database (CTD) for use on a ReTA engagement. The CTD tracks a change request from the time the request is entered to the time the request is closed, after completing an evaluation of the change in production. In addition, the CTD has been designed to communicate important information regarding the existence, status, and resolution of the change request.

During the lifecycle of a change request, inquiries may arise. Due to the large number of people involved in the change control process, there needs to be a mechanism to centralize important information regarding the requests. The CTD allows the various people involved in the change control process to be fully informed of the status of the requests at any time. The process may lead to efficiency gains and better communication between process participants.

To install the tool, refer to the instructions that are provided within the Change Tracker Setup portion of the present description.

Change Lifecycle

A change request is submitted by a business user or IT personnel

The Change Control Committee may review the change request.

The change may be assigned to a developer and the status in the CTD may reflect the current status of the request.

Once the change request is code/tested, it may be migrated into production.

If it passes the monitor period its status may be closed. Otherwise, the change is re-opened and submitted through the process again.

Tracker Overview

FIG. 76.1 illustrates a framework 7630 associated with the change tracker. See FIG. 23 for more detail.

Main Window

Figure 77:
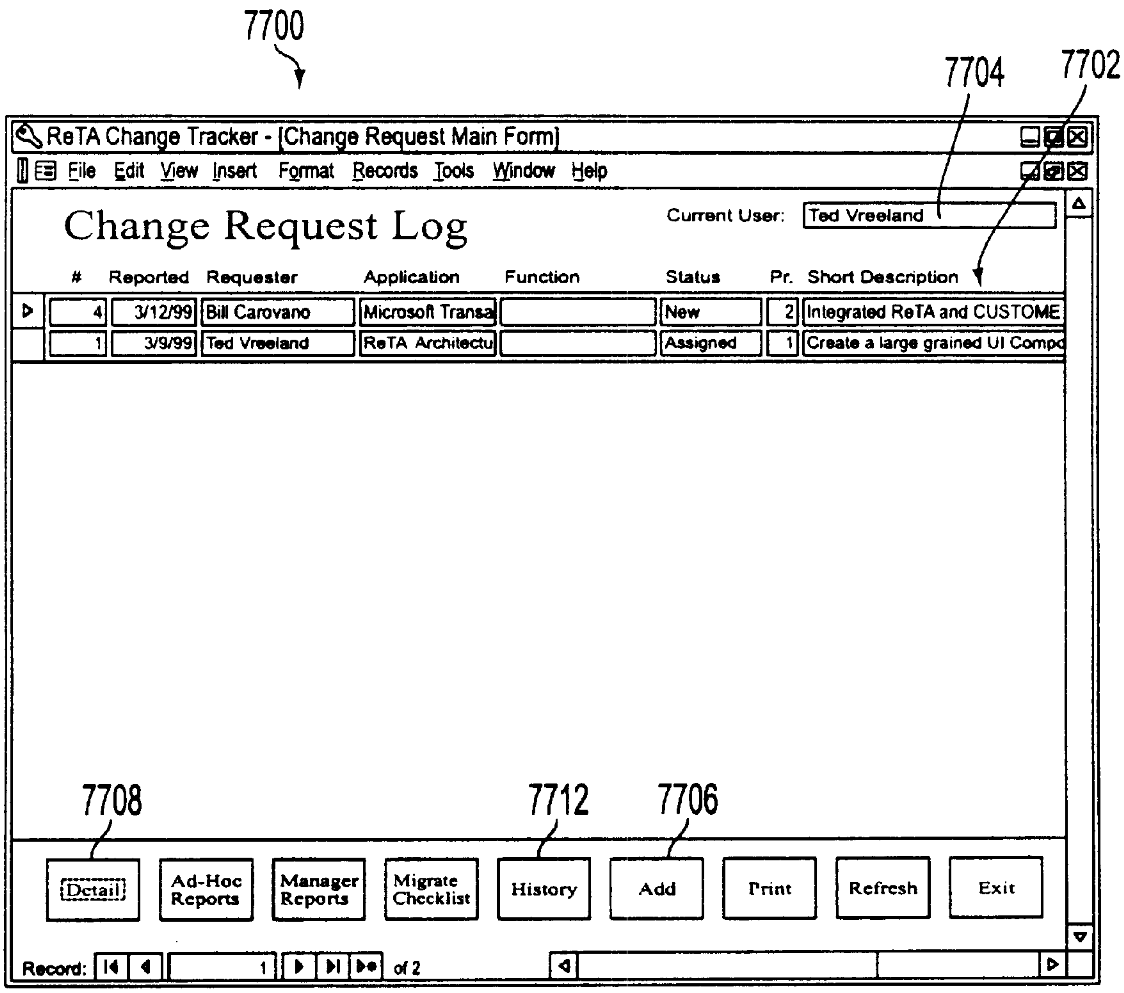
FIG. 77 illustrates the Change Tracker Main Window according to an embodiment of the present invention.

FIG. 77 illustrates the Change Tracker Main Window 7700. This form serves two main purposes. First, it gives the user a quick summary of the change requests 7702. Second, this form serves as the driver of the CTD. From this form the user can add and view change requests as well as view and print reports. The Current user field 7704 is populated using the users local Windows NT/95 login Id and the Change Tracker's User.

Window Fields

| Field Name | Field Description |
|---|---|
| # | Unique numeric identifier of the Change Request |
| Reported | Date the change request was entered |
| Requester | The person who requested the change request |
| Application | The application area affected by the change request (i.e. Marketing, LIS, Vision) |
| Function | The function which the change request affects |
| Status | The status of the change request. |
| Priority | The priority of a change request<br>1 (High)<br>2 (Medium)<br>3 (Low)<br>4 (Cosmetic) |
| Short Description | A short (75 chars max) and concise description of the change request. |
| Assigned To | The developer who is responsible to code & test the change request. |
| Category | The classification of the change request (Project, Enhancement or Emergency) |

Change Request Detail Window

Figure 78:
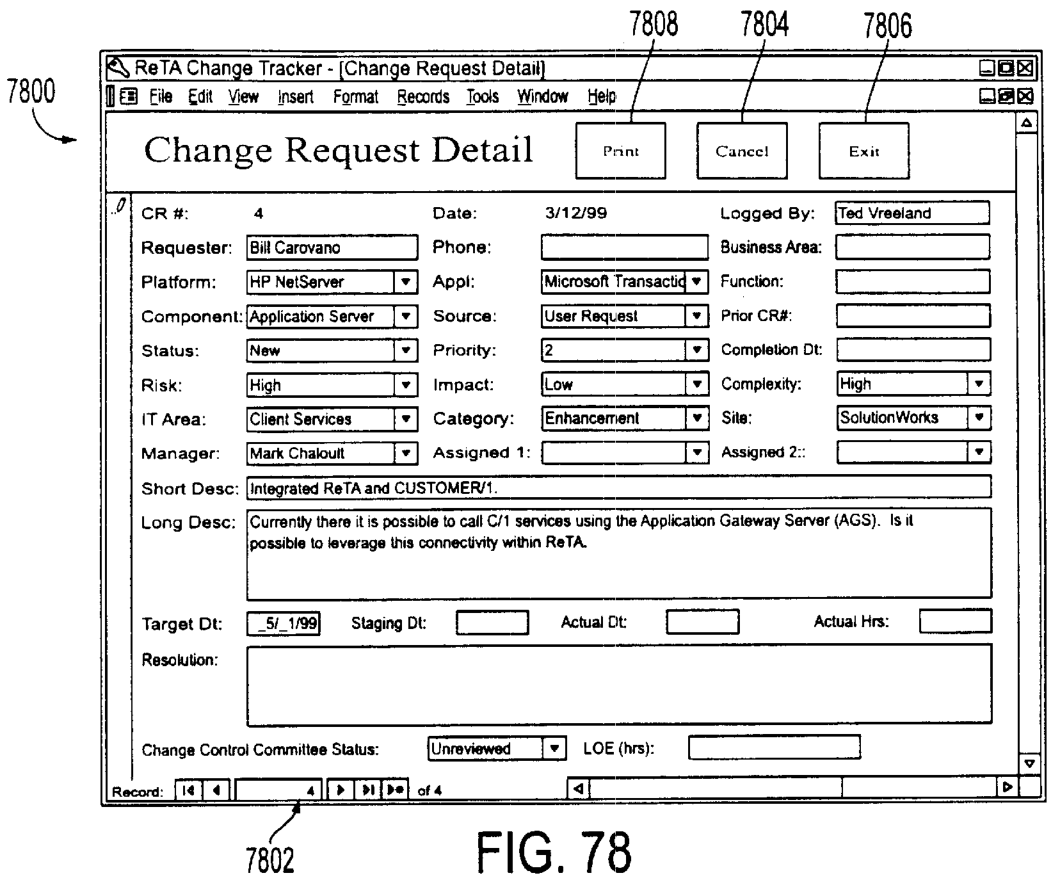
FIG. 78 illustrates the Change Request Detail Screen according to an embodiment of the present invention.

From the Main Window of the Change Tracker Main Window 7700, select the Add or Detail buttons 7706, 7708. The Change Request Detail window may be displayed. FIG. 78 illustrates the Change Request Detail Screen 7800. To look at other requests, scroll through the record numbers 7802 (located in the bottom, left-hand corner). To exit without saving—Click on the Cancel button 7804. Save change request and exit window—Click on the Exit button 7806. To print the request—Click on Print button 7808.

Window Fields

| Field Name | Field Description |
|---|---|
| CR# | Automatically assigned when a new change request is entered. |
| Date | Date the change request was entered. This date defaults to the date of the change request entry. |
| Logged By | Portion of the present descriptions who entered the change request into the CTT |
| Requester | The person who requested the change request. |
| Phone Number | Phone number of the requester. |
| Business Area | Business area of the requester. |
| Platform | The hardware platform of the system affected by the change request. |
| Appl. | The application affected by the change request. |
| Function | The function affected by the change request. |
| Component | The component affected by the change request. |
| Source | Source of the problem:<br>ABEND (Abnormal Program Termination)<br>Other<br>Performance<br>Prior Change<br>Regulatory |
| Prior CR# | Change request number of a previous request that caused this current request or is related to the current request. |
| Status | The status of the change request. A change request can have a status of:<br>New<br>Assigned<br>Development<br>Testing<br>Migrate<br>Production<br>Closed<br>Rejected<br>Deferred<br>Re-Opened |
| Priority | The priority of a change request:<br>1 (High) - Change request is necessary for application functionality and is an integral component that keeps the system running properly.<br>2 (Medium) - Change request is severely needed for proper application functionality.<br>3 (Low) - Change request can be circumvented but needs to be resolved in the near future.<br>4 (Cosmetic) - Change Request does not affect production but should be fixed. |
| Completion Date | Requester's estimated date for the change request to be completed. |
| Risk | The risk of the change request: High, Medium, Low |
| Impact | The impact of the change request: High, Medium, Low |
| Complexity | The complexity of the change request: High, Medium, Low |
| IT Area* | Project or Area assigned to complete the change request:<br>Account Management<br>Client Services<br>Delivery Systems<br>Insurance/Corporate Systems<br>Network Services<br>Production Services<br>Technical Services |
| Category* | The classification of the change request:<br>Project<br>A major change to the production environment, including application code, system software, hardware, and networks.<br>Generally requires more than 160 hours of work.<br>Generally tend to have high impact, risk, and complexity.<br>Enhancement<br>A minor change to the production environment, including application code, system software, hardware, and networks.<br>Generally requires less than 160 hours of work.<br>Generally tend to have low impact, risk, and |

-continued

| Field Name | Field Description |
|---|---|
| | complexity Emergency<br>The application is out of service and there is no work around A security system can be or has been comprised Data loss/corruption<br>Hardware failure that needs to be replaced immediately |
| Site | The site of the change request. |
| Manager | Manager responsible for change request. |
| Assigned 1 | Primary person assigned to complete the change request. |
| Assigned 2 | Second person assigned to complete the change request. |
| Short Description | A short (75 chars max) and concise description of the change request. |
| Long Description | A detailed description of the change request. |
| Target Date | Date by which change should be ready to be migrated. |
| Staging Date | Date by which change should be ready to be migrated. |
| Actual Date | Actual date change is moved into production. |
| Actual Hours | Actual number of hours it took to complete the change request. |
| Resolution | The resolution to the change request. Developers should include a brief description of the changes made to the code. Explanations should be given for changes that are rejected. |
| Change Control Committee Status | The status of the change with a respect to the Change Control Committee:<br>Un-reviewed<br>Reviewed<br>Follow-Up |
| LOE (hrs) | The estimated Level of Effort (LOE) to complete the change request. |
| Migrate Metric | Success of migrating code to production: (Pass/Fail) Associated with this checkbox is the Assignee's ID & Date fields. These may be filled automatically with the ID of the current user and the current date when the checkbox is checked or unchecked. |
| Problem Explanation | Explanation of the problems caused by the change request. |
| Lessons Learned | Explanation of the successful and unsuccessful tactics used during the lifecycle of the change request. |
| Closed By | Person who closed the change request. This field may be filled automatically with the current user's ID when the status is changed to "Closed", "Rejected" or "Duplicate". |
| Date Closed | Date the change request is no longer being monitored in production. This field may be filled automatically with the current date when the status is changed to "Closed", "Rejected" or "Duplicate". |

History Detail Window

Figure 79:
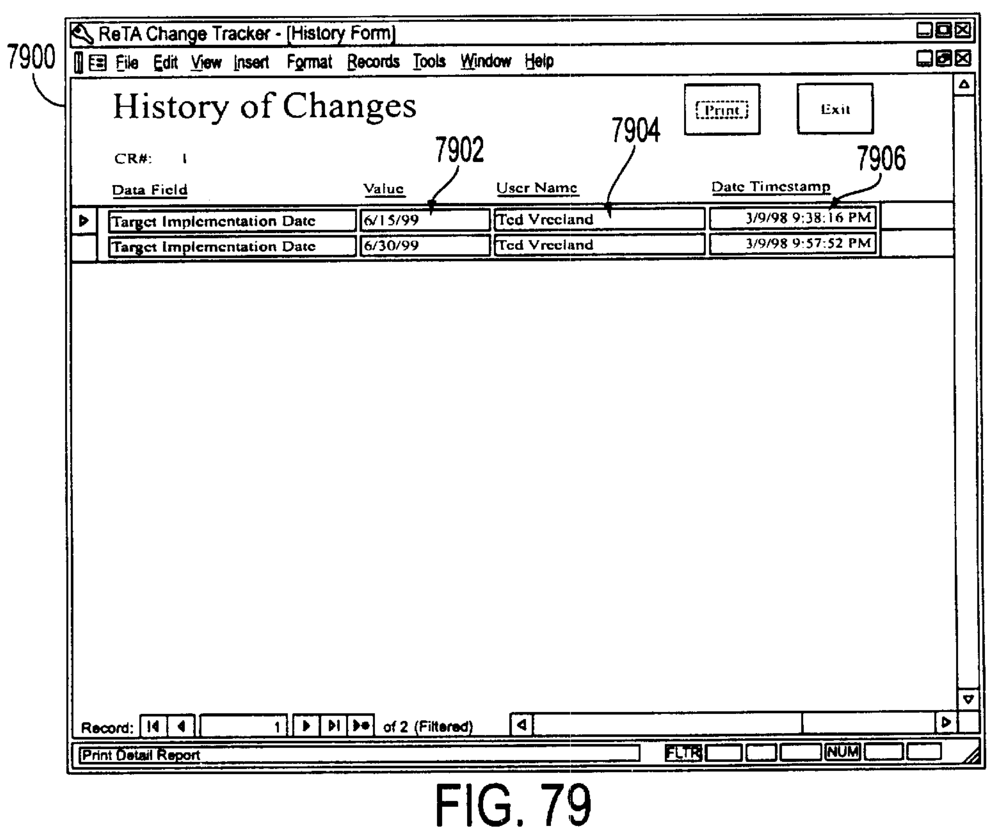
FIG. 79 illustrates a History of Changes Window according to an embodiment of the present invention.

From the main window, select the History button 7712 of the Change Tracker Main Window 7700. This window allows the user to view the history of changes that have been made to the Target Implementation Date field. FIG. 79 illustrates a History of Changes Window 7900. Whenever the Target Implementation Date 7902 is changed, the new value of the Target Implementation Date, the current user ID 7904 and the current date timestamp 7906 is logged. This form is for display only.

Note that when a new change request is added to the Change Tracking tool, a record may be created for the first Target Implementation Date addition.

Window Fields

| Field Name | Field Description |
|---|---|
| CR# | Change Request # of the history displayed. |
| Data Field | The name of the field being tracked. In this case, may be "Target Implementation Date". |
| Value | The new Target Implementation Date the field was changed to. |
| User Name | The person who changed the Target Implementation Date. |
| Date Timestamp | The date and time the Target implementation Date was changed. |

Ad-Hoc Reporting Window

Figure 80:
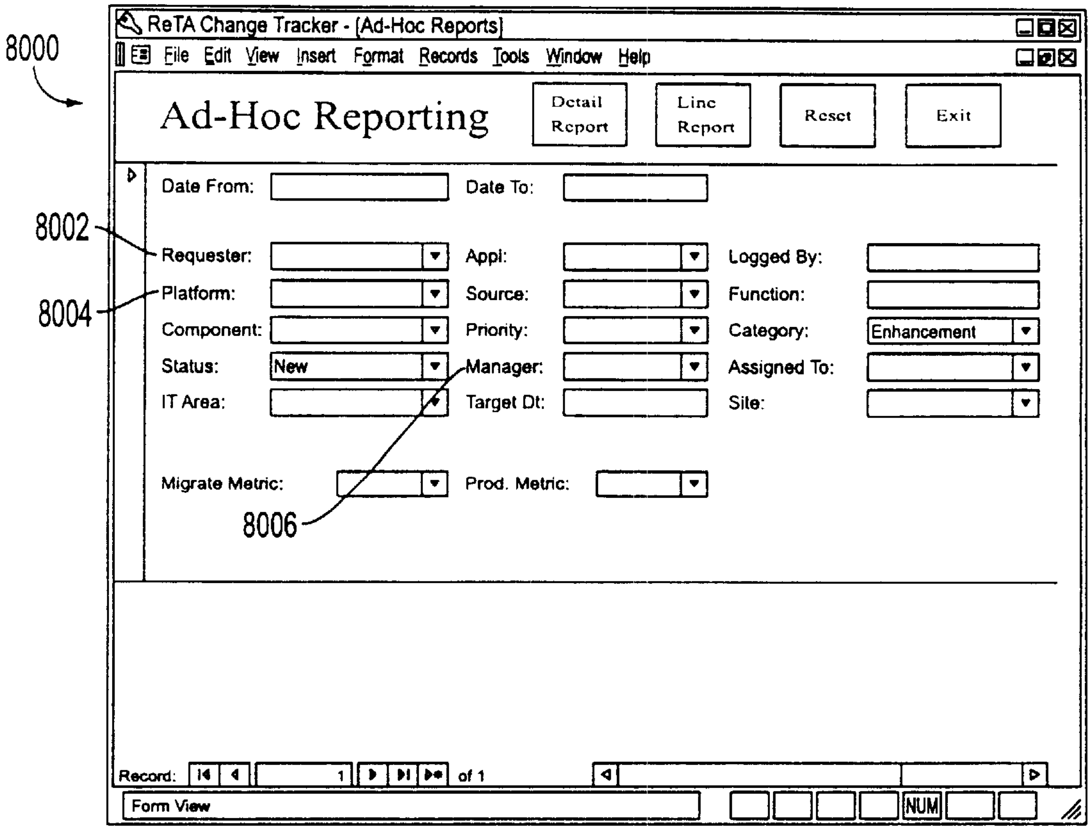
FIG. 80 illustrates the Ad-Hoc Reporting Window according to an embodiment of the present invention.

FIG. 80 illustrates the Ad-Hoc Reporting Window 8000. This form is where all filtering for reporting takes place. Filtering is the process of viewing change requests based on specified criteria. For instance, if developers wanted to see what new change request entries have been assigned to them, they can choose to filter the entire database with their name and a status of Assigned. All change request entries assigned to that developer may then appear on a report. A user can filter the database with one field or up to 17 fields depending on how specific they want to get. The fields shown include requester 8002, platform 8004, manager 8006, etc. In addition, they can filter all change requests within the context of a date range. Thus, in the below example, the developer could see what new enhancement changes have been requested.

Window Fields

| Field Name | Field Description |
|---|---|
| Date From | The starting date of the date range. If this field is entered, the To Date must be entered. |
| To Date | The ending date of the date range. |
| Requester | The person who requested the change request |
| Appl. | The application area affected by the change request (i.e. Marketing, LIS, Vision) |
| Logged By | Portion of the present descriptions who entered the change request into the system. |
| Platform | The hardware platform of the system affected by the change request. |
| Source | Source of the problem (i.e. Regulatory, ABENDS, Performance, etc.). |
| Function | The function affected by the change request. |
| Component | What component may the change request affect (i.e. Application Code, Hardware, etc.). |
| Priority | The priority of a change request. |
| Category | The classification of the change request. |
| Status | The status of the change request. A change request can have a status of: New, Assigned, Design, Testing, etc.) |
| Manager | Manager of assigned IT Area |
| Assigned To | Developer assigned to change request. Both the Assigned 1 and Assigned 2 fields may be queried. |
| IT Area | Area assigned to complete the change request (Prod. App. Services, Tech. Services, Client Services, etc.). |
| Target Date | Date scheduled to move change into production. |
| Site | The site of the change request. |
| Migrate Metric | Success of migrating code to production. |
| Prod. Metric | Success of code in production. |

Manager Reporting Window

Figure 81:
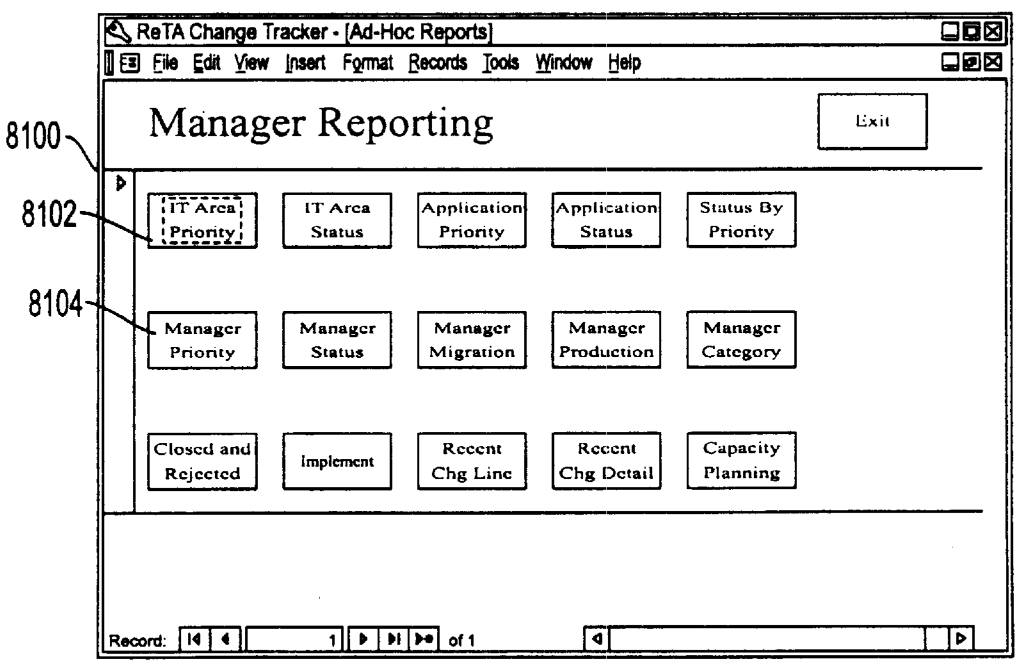
FIG. 81 illustrates the Manager Reporting Window according to an embodiment of the present invention.

FIG. 81 illustrates the Manager Reporting Window 8100. This form allows the user to select a variety of summary reports, such as IT Area Priority 8102, Manager Priority 8104, etc.

Window Fields

| Button Name | Button Description |
|---|---|
| IT Area Priority | Opens the IT Area by Priority Report. |
| IT Area Status | Opens the IT Area by Status Report. |
| Application Priority | Opens the Application by Priority Report. |
| Application Status | Opens the Application by Status Report. |
| Status by Priority | Opens the Status by Priority Report. |
| Manager Priority | Opens the Manager by Priority Report. |
| Manager Status | Opens the Manager by Status Report. |
| Manager Migration | Opens the Manager Migration Report. |
| Manager Production | Opens the Manager Production Report. |
| Manager Category | Opens the Manager by Category Report. |
| Closed and Rejected | Opens the Closed and Rejected Report. |
| Implement | Opens the Implementation Report. |
| Recent Chg. Line | Opens the Recent Change Line Report. |
| Recent Chg. Detail | Opens the Recent Change Detail Reports. |
| Capacity Planning | Opens the Capacity Planning Report. |
| Exit | Returns the user to the Change Request Log Form. |

Migrating Window

Figure 82:
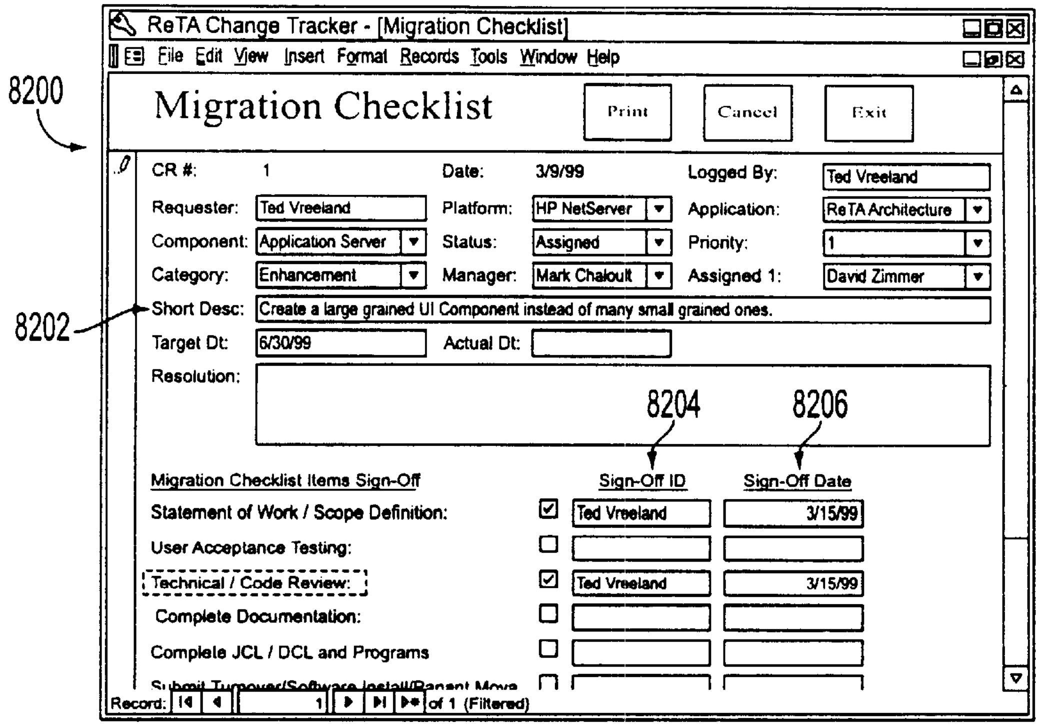
FIG. 82 illustrates the Migration Checklist Window according to an embodiment of the present invention.

FIG. 82 illustrates the Migration Checklist Window 8200. This form allows the user to view general information 8202 about the change request and lists what sign-offs are needed in order for the change to be migrated to production. When a Migration Checklist item is checked or unchecked, the Sign-Off ID 8204 & Sign-Off Date 8206 may be filled in automatically with the current user's ID and the current date. Only the Capacity Planner should check the Capacity Planning Sign-Off checkbox.

Window Fields

| Field Name | Field Description |
|---|---|
| CR# | Automatically assigned when a new change request is entered. |
| Date | Date the change request was entered. This date defaults to the date of the change request entry. |
| Logged By | Portion of the present descriptions who entered the change request into the CTT. |
| Requester | The person who requested the change request |
| Platform | The hardware platform of the system affected by the change request. |
| Appl. | The application area affected by the change request. |
| Component | What components may the change request affect (i.e. Application Code, Hardware, etc.). |
| Status | The status of the change request. A change request can have a status of: New, Assigned, Design, Testing, etc.) |
| Priority | The priority of a change request. |
| Category | The classification of the change request. |
| Manager | Manager of assigned IT Area |
| Assigned To | Developer assigned to change request |
| Target Date | Date scheduled to move change into production. |
| Actual Date | Actual date change is moved into production. |
| Short Description | A short (75 chars max) and concise description of the change request. |
| Resolution | The resolution to the change request. Developers should include a brief description of the changes made to the code. Explanations should be given for changes that are rejected. |
| Statement of Work/Scope Definition Checkbox | Indicates whether the Statement of Work or Scope Definition has been signed off |
| User Acceptance Testing Checkbox | Indicates whether the User Acceptance Testing has been signed off. |

-continued

| Field Name | Field Description |
|---|---|
| Technical/Code Review Checkbox | Indicates whether the Technical/Code Review has occurred. |
| Complete Portion of the present description Checkbox | Indicates whether the Complete Portion of the present description has been provided. |
| Complete JCL/DCL and Programs Checkbox | Indicates whether the Complete JCL/DCL and Programs has been provided. |
| Submit Turnover/Software Install/Panapt Move | Indicates whether the Turnover/Software Install/Panapt Move has been submitted. |
| Distribution List Requirements Checkbox | Indicates whether Distribution List Requirements has been provided. (i.e. TCPIP, Special Forms, Microfiche, Electronic Files) |
| Identify Impacted Systems Checkbox | Indicates whether Impacted Systems has been identified. |
| Capacity Planning Checkbox | Indicates whether Capacity Planning has signed off. |
| Ready to Migrate Checkbox | Indicates whether the change request is ready to be migrated to production. |

Use this job aid to assist in completing and maintaining the Project Configuration Management. It relates the portion of the descriptions in the Project Configuration Management Plan to the processes defined in the Software Configuration Management Policy.

| Key: | |
|---|---|
| SCMP | Software Configuration Management Policy |
| SCMP | Section numbers from the Software Configuration Management |
| Tasks | Policy that give more detailed process information |
| AT | Assembly Test (a.k.a. String Test); where several modules are tested in succession |
| CM | Configuration Management |
| CMM | Capability Maturity Model |
| CT | Component Test (a.k.a. Unit Test); where a single module is tested |
| ORT | Operational Readiness Test; where the production infrastructure is verified |
| PM | Project Manager |
| PT | Product Test; where the entire system is tested as a whole |
| References | Other sources of information that may give one more information on the process |

Project Configuration Management Plan Walkthrough

Project Configuration Management Plan templates for each platform have been created, and sample Project Configuration Management Plans are also available.

The owner of the Configuration Management Plan (responsibilities include monitoring, reviewing, enforcing) is the Project Manager.

| Tab: CM PLAN - Proj | Project Information for Configuration Management Plan |
|---|---|
| Definition | Project information - lists key contacts on the project, Project Configuration Management Board members, and items to be placed under Configuration Management and managed by this plan |
| Purpose | Capture project-specific contact information, configuration type information, and Project Configuration Management Board information. It is important to portion of the present description the contacts and responsibilities early in the project so there are no misunderstandings, and everyone is in agreement on how Configuration Management may be handled on the project. |
| Required Fields | All |
| Project/Version information | Responsibility: Project Manager<br>Enter project-specific information for this Configuration Management Plan:<br>Platform: the platform that the project may run on. Should match a delivery vehicle, list as "operating system - database system - language". (e.g. VMS - Oracle - C, Fortran)<br>Project: the project/application name.<br>Version: the version of the application. (e.g. 2.0)<br>Production Date: the date that the application is due in production. (e.g. Jan 5, 1998)<br>Configuration Management Plan Owner: the person who may manage and enforce the responsibilities portion of the present descriptioned in the Configuration Management Plan. |
| "Project Contacts" | Responsibility: Project Manager<br>Enter names for the project contacts playing the listed roles. These names may automatically populate in subsequent worksheets in the Configuration Management Plan according to the Program Methodology and CMM requirements. If a role does not apply for your project, enter a space in place of the name. If more than one person plays a primary role, one can enter both names in the field. If a role is not listed, then add it; however, it may not auto-populate into the subsequent worksheets. These contacts should be the people most involved in the project, who one would consider "key contacts" involved in the migration process. |
| "To be placed under Configuration Management" | Primary Responsibility: Functional Lead<br>For each category shown, list the configuration types that may be covered in the Project Configuration Management Plan. The types already listed on the template cover most project needs; verify that they cover the specifics of your particular project. These are the types that may be migrating through the different environments, are subject to review, follow the same approval/migration process, etc.; and may populate on to the subsequent Configuration Management worksheets. The types should cover the "normal" situation (think of the 80% of the 80/20 rule); "exception" situations should be noted separately.<br>Examples for the types:<br>Portion of the present description = design, test, data, support, etc.<br>Database = tables, indices, views, aliases/synonyms, stored procedures, etc.<br>Architecture = application requested architecture extensions<br>Application = code, reports, screens, menus, etc.<br>SCMP tasks: 1.6.1 Identify configuration types |
| "Project Configuration Management Board" | Primiary Responsibility: Project Manager<br>Confirm the names of the people who may act as the Project Configuration Management Board (the names automatically populate with contact names listed on the same sheet: Configuration Management Plan Owner, Development Lead, Test Lead, Tech Lead, Development DBA, Implementation Lead, Operations. The makeup of the CM Board can change, if the project deems necessary.<br>The CM Board is responsible for portion of the present |

-continued

| | |
|---|---|
| | descriptioning the detailed processes on the different tabs and for signing off on the Project Configuration Management Plan developed. They are also responsible for enforcing processes on their teams, and meeting with project management after each major project phase to ensure that changes are completed according to the portion of the present descriptioned Plan.<br>SCMP tasks: 3.6.1 Define control groups; 3.6.2 Approve/disapprove change requests; 3.6.3 Track/implement change request; 4.6.2 Generate/distribute status reports |
| "Meeting Dates" and "Meeting Minutes Location" | Primary Responsibility: Project Manager<br>Once the Project Configuration Management Plan has been established and signed off during Design, Project Configuration Management Board meetings may be held. They should be held at the end of AT, PT, and Implementation phases - these dates should be taken from the project plan.<br>These meeting dates should be listed in the "Meeting Dates" column. The Project CM Board may meet on the listed dates to review progress made on implementing change requests according to the CM Plan and on action items ensuring CM compliance. The Project Configuration Management Status Agenda ("Status Agenda" tab in the Project Configuration Management Plan) can be used to guide meeting discussions. Minutes from these meetings may be portion of the present descriptioned, and the location of these portion of the present descriptions should be entered in the "Meeting Minutes Location" column. The PS should communicate the meeting dates early in the project to ensure that the meetings may be held on the date noted.<br>References: Project Configuration Management Status Agenda ("Status Agenda" tab in the CM Plan)<br>SCMP tasks: 4.6.1 Maintain records; 4.6.2 Generate/distribute status reports; 4.6.3 Schedule CI reviews; 4.6.4 Perform audits; 5.6.1 Verify security practices |

| Tab: CM* | * = Emer, Doc, DB, Arch, Appl |
|---|---|
| Definition | Project Configuration Management Plan for the<br>Emer = emergency maintenance (responsibility = Development)<br>Doc = portion of the present description (responsibility = Development, Test),<br>DB = database objects (responsibility = Tech Support),<br>Arch = architecture extensions (responsibility = Tech Support, Architecture),<br>Appl = application objects (responsibility = Development, Test, Tech, Impl, Operations) created for the project. |
| Purpose | Identify the objects to be placed under CM and the stages which they may go through, identify the repository and version control tool, identify the change request tool that may be used, and portion of the present description the roles/responsibilities for migrations to the different environments.<br>It is important to portion of the present description these responsibilities so that it is known who needs to sign off on what tests, who should have authority to write where, and who is responsible for migrations. This may help to ensure that object migrations are not missed due to misunderstandings. The green WHO columns may automatically populate from the "Project Contacts" listed on the CMPLAN-Proj tab according to the program methodology and CMM requirements.<br>A new project team member should be able to tell exactly what steps to take and who should be involved/notified in order to migrate changes from one environment to the next. |
| Required Fields | All<br>SCMP tasks: 2.6.2 Define promotion and migration procedures. |
| "Objects Included" | Primary Responsibility:<br>Portion of the present description tab - Development,<br>Database tab - Tech Support,<br>Architecture tab - Tech Support,<br>Application tab - Development<br>However, Test, Implementation, and Information Delivery may input into each tab, also.<br>This field is pulled from the "Objects Included" field on the CMPLAN-Proj tab. Verify that the list includes all objects that may migrate through the environments, follow the same naming standard, use the same version control tool, follow the same migration procedures, and use the same change request tool. This should be the 80% of the 80/20 rule. The exceptions should be listed in the "Exceptions" filed later in the sheet. Corrections to this field should be made in the "Objects Included" field on the CMPLAN-Proj tab.<br>Any other objects (the 20%) that do not follow the Naming standard, use the Migration/version control tool, or use the Change request tool listed at the top, but do migrate through the development environment should be listed in the "Exceptions" section of the sheet. The migration path and other information should be filled out for the exceptions, also.<br>SCMP tasks: 1.6.2 Identify project baselines; 1.6.4 Identify configuration units. |
| "Naming Standard" | Primary Responsibility: (see "Objects Included")<br>List the location(s) of the naming standard(s) used for the objects listed. The default Alliance Methodology naming standard is listed; any project-specific naming standard should also be listed. This should be the 80% of the 80/20 rule. The exceptions (or 20%) should be listed in the "Exceptions" portion of the description later in the sheet, with that naming standard portion of the present descriptioned.<br>SCMP tasks: 1.6.3 Define naming standards for types |
| "Migration/Version Control Tool" | Primary Responsibility: (see "Objects Included")<br>List the migration and version control tool(s) used. If the tool is only used for one of the functions, indicate that as so. If multiple tools are used to perform these tasks, indicate this, also. Again, this is the 80% of the 80/20 rule. The exceptions (or 20%) should be listed in the "Exceptions" portion of the description later in the sheet, with that migration/version control tool portion of the present descriptioned.<br>SCMP tasks: 2.6.1 Establish platform repositories; 2.6.2 Establish backup/recovery scheme |
| "Change Request Tool" | Primary Responsibility: (see "Objects Included")<br>Enter the change request tool used for tracking changes. If multiple tools are used, indicate this and when each tool is used. Again, this is the 80% of the 80/20 rule. The exceptions (or 20%) should be listed in the "Exceptions" portion of the description later in the sheet, with that change request tool portion of the present descriptioned.<br>SCMP tasks: 3.6.1 Define control groups |
| "CM Unit/Environment" | The phases listed under the gray heading are the standard test phases; and the columns to the right apply to the types listed in the "Objects Included" field. Exceptions to that should be listed separately in the "Exceptions" portion of the description, with phases listed below and processes listed to the right. These headings can be changed to better fit the project's terminology (e.g. "Unit Test" instead of CT).<br>Each cell to the right of the listed phase has guidelines for the process to be followed on the project. The green WHO fields automatically populate from the "Project Contacts" on the CM Proj tab, according to program methodology and CMM guidelines. However, these fields may be modified to fit your particular project. |

| Tab: CM Emer | Emergency Fixes |
|---|---|
| | Primary Responsibility: Development, Tech Support<br>Emergency (EM) fixes are fixes that were discovered in production, and need to be fixed in production right away. Most of the time, EM fixes go through brief testing (due to time constraints), and are not migrated through all environments.<br>"Production Support" represents the environment where these fixes are made and tested - it is usually separate from the development environment. |
| Prod Support → Production | Promotion/migration for all objects resulting from an emergency fix in production:<br>Production Support (EM) to Production<br>Production Support (EM) to Component Test |
| Prod Support → | (project should follow migration process defined in "CM Appl" from this point) |

-continued

| | |
|---|---|
| CT (manual move) | |
| Tab: CM Doc | Portion of the present description |
| | Responsibility: Development, Test<br>Portion of the present description applies to any/all portion of the present description produced/updated for the project. For example, designs, test conditions and scripts, test data, support procedures, etc. |
| WIP → Final | Promotion/migration for all portion of the present descriptions for the project:<br>Work in Progress → Final |
| Tab: CM DB, Appl | Database objects, Application objects |
| | Responsibility: (Database objects) Tech Support; (Application objects) Development, Test, Operations<br>Database objects include anything related to the storage of data and database objects and functions: tables, views, roles, stored procedures, etc. Application objects include anything developed specifically for the application: screens, windows, programs (online, batch), libraries, etc. |
| *indicates base migration level | Promotion/migration for database objects and application objects to environments: |
| CT → AT* | Component Test to Assembly Test |
| AT → PT* | Assembly Test to Product Test |
| PT → ORT | Product Test to Operational Readiness Test |
| PT → Training | Product Test to Training |
| ORT → Production* | Operational Readiness Test to Production |
| Production → Prod Support | Production to Production Support |
| Tab. CM Arch | Architecture extensions |
| | Architecture extensions are application-specific additions to the existing application architecture that are done by the Tech Support team. This does not include common code developed by the project team - that should be included in the CM Appl tab.<br>Promotion/migration for architecture objects to environments |
| Architecture - owned | (owned by Architecture Team) |
| CT → AT/PT | Component Test to Assembly/Product Test |
| AT/PT → QA | Assembly/Product Test to Quality Assurance |
| AT/PT → Pilot | Assembly/Product Test to Pilot |
| AT/PT → Production | Assembly/Product Test to Production (platform development) |
| Platform - owned | (owned by platform development teams) |
| CT → AT | Component Test to Assembly Test |
| AT → PT | Assembly Test to Product Test |
| PT → ORT | Product Test to Operational Readiness Test |
| PT → Training | Product Test to Training |
| ORT → Production | Operational Readiness Test to Production |
| Production → | Production to Production Support |

-continued

| | | |
|---|---|---|
| Prod Support | | |
| Tab: Status Agenda | | Configuration Management Status Meeting Agenda |
| | Definition | Template agenda to guide discussion during a Project Configuration Management status meeting |
| | Purpose | A Project Configuration Management Status Meeting should be held at the end of Assembly Test, Product Test, and Implementation. The primary goal is to ensure that the Project Configuration Management Plan is being followed for all changes, and also to give the project a chance to identify areas for improvement and act upon them during the project.<br>SCMP tasks: 3.6.1 Define control groups |
| Tab: Compliance Chk | | Configuration Management Compliance Checklist |
| | Definition | A checklist for projects to use to complete an internal audit on their Configuration Management tasks |
| | Purpose | Responsibility: all project teams<br>Teams should perform internal audits periodically during the project lifecycle to ensure that processes are being followed, and that Configuration Management tasks have been completed according to SCM Policy. This may also help the team to prepare for external audits. Recommended checkpoints: after Assembly Test, after Product Test.<br>SCMP tasks: 3.6.1 Define control groups |
| Tab: Change Log | | Configuration Management Plan Change Log |
| | Definition | Change log/audit trail for the Project Configuration Management Plan itself. |
| | Purpose | Responsibility: all project teams<br>Provide an audit trail for changes made to the Project Configuration Management Plan after it has been signed off. |

Issues Tracker Database

Figure 83B:
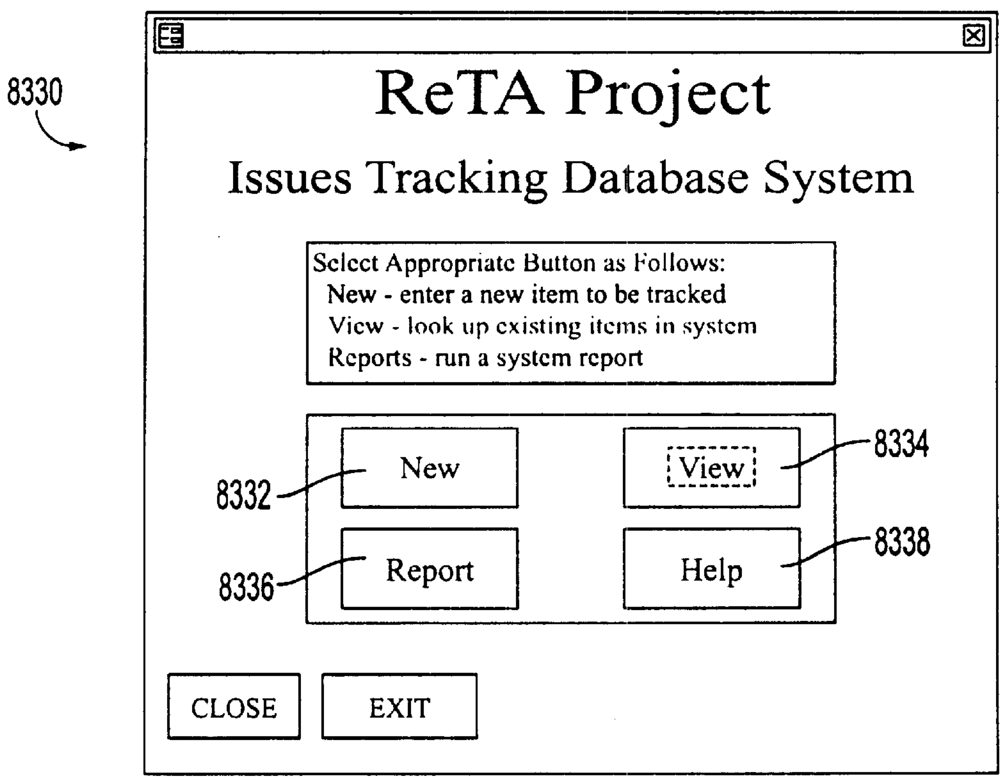
FIG. 83 is a flow chart illustrating a method for managing issues in an e-commerce environment.
Figure 83A:
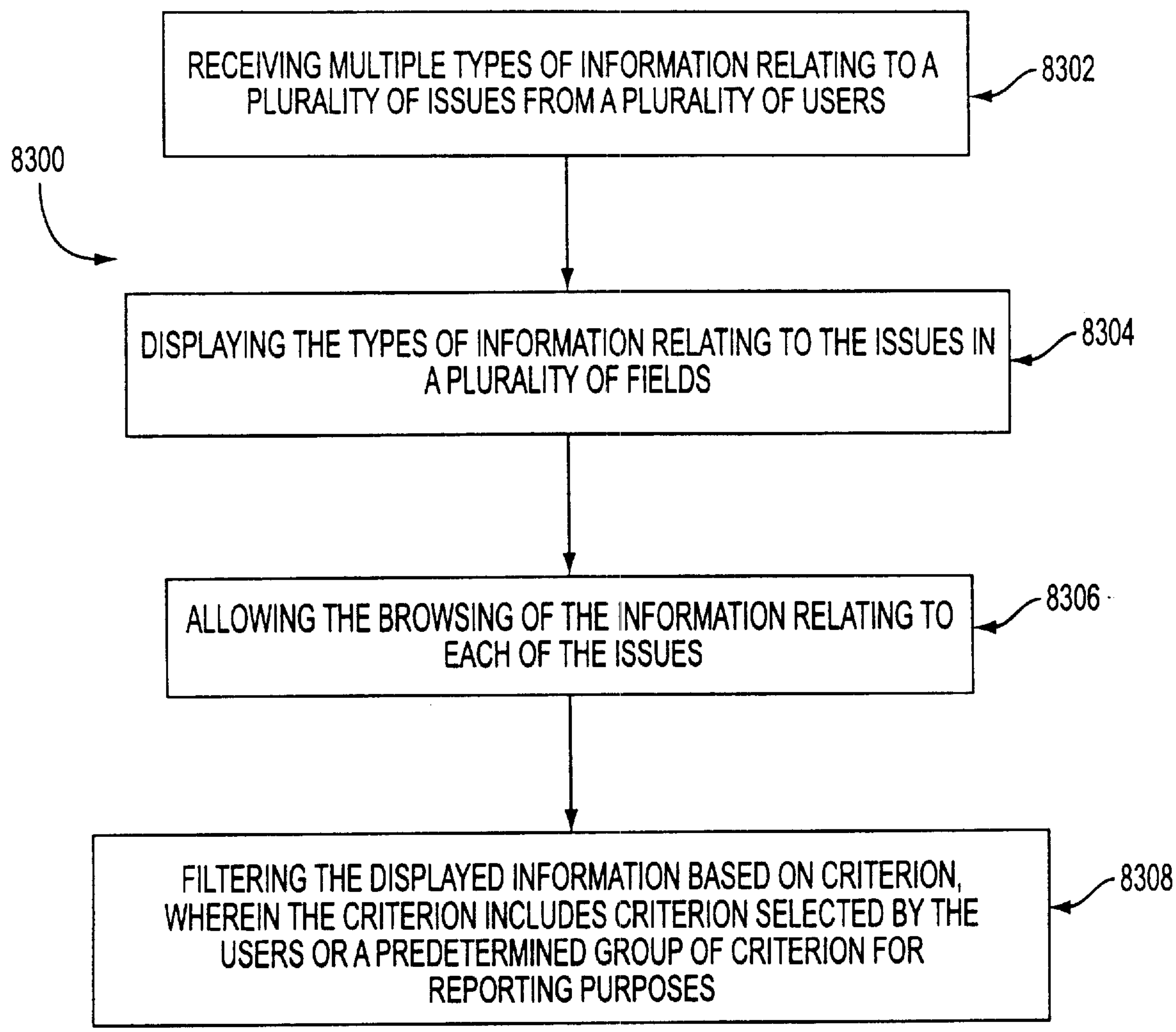

FIG. 83 illustrates a method 8300 for managing issues in an e-commerce environment. In operation 8302, multiple types of information are received relating to a plurality of issues from a plurality of users. In operation 8304, the types of information relating to the issues are displayed in a plurality of fields. Browsing of the information relating to each of the issues is allowed in operation 8306. The displayed information is filtered in operation 8308 based on criterion which includes criterion selected by the users or a predetermined group of criterion for reporting purposes.

Optionally, the criterion may include the predetermined group of criterion for reporting purposes. Also, the fields may include a date each issue was created, the user that requested each issue, a status of each issue, a priority of each issue, a description of each issue, a person responsible for resolving each issue, a target date for resolving of each issue, and/or a date when each issue was resolved.

As an option, editing of the information relating to the issues may be allowed. As a further option, a first type of the information separate from a second type of the information may be displayed with editing of the second type of information only allowed upon authentication of an identity of an authorized user. As another option, the filtered, displayed material also may be printed. The following material provides a more detailed description of the above-described method.

The following discussion provides an overview of the Issues Tracker Database for use on a ReTA engagement. The Issues Tracker is be used to report development, testing, architecture, and infrastructure problem and provide a means for team leaders and project managers to manage the issue resolution process.

Issue Lifecycle

1) New issues are created as they are encountered.
2) The project issue resolution administrator reviews issues and determines course of action.
3) Project management periodically review open issues and approve/reject additional investigation and resource requests.
4) Issues are either completed as either being closed or deferred for later action.

Issue Responsibilities by Role

| Role | Responsibilities | Tool Section |
|---|---|---|
| Team member | Create a new Issue | New Issue |
| Project Lead | Review new issues and assign accordingly<br>Review status of opened issues<br>Issues that require change control are forwarded into the Change Control Process. | Issue Maintenance |
| Issue Tracker Admini-strator | Tool Support | Makes updates/ changes to Issue Tracker Database |

Tracker Overview

Main Window

FIG. 83.1 illustrates the Issue Tracker Main Screen 8330. This screen provides navigation buttons such as a button 8332 for adding new SIRs, a button 8334 for viewing existing SIRs, a button 8336 for viewing/printing existing reports and a help button 8338.

Creating a New Issue

Figure 84:
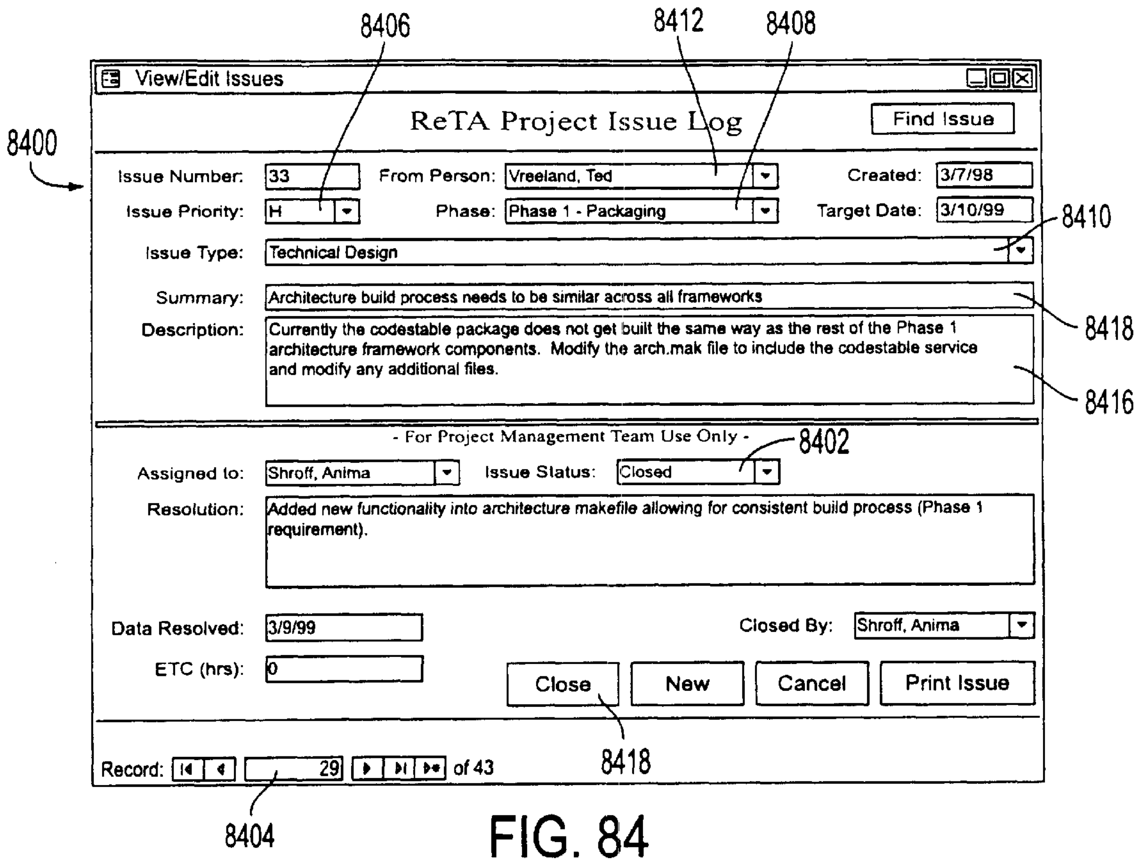
FIG. 84 illustrates the New Issue Screen according to an embodiment of the present invention.

From the Main Window 8330, select the New button 8332. The New Issue screen may be displayed. FIG. 84 illustrates the New Issue Screen 8400. All issue requests with status of New can be reviewed. The status is shown in the Issue Status field 8402. To look at other newly submitted issues, scroll through the record numbers 8404 (located in the bottom, left-hand corner).

To complete the form, do the following:

Select the appropriate Priority 8406, Phase 8408, Type 8410 and Originator 8412 from the list boxes.

Enter a title for the issue within the Summary entry field 8414.

Enter a detailed description of the problem within the Description entry field 8416.

Select the Close button 8418 to return to the main window.

Reviewing and Modifying Existing Issues

Figure 85:
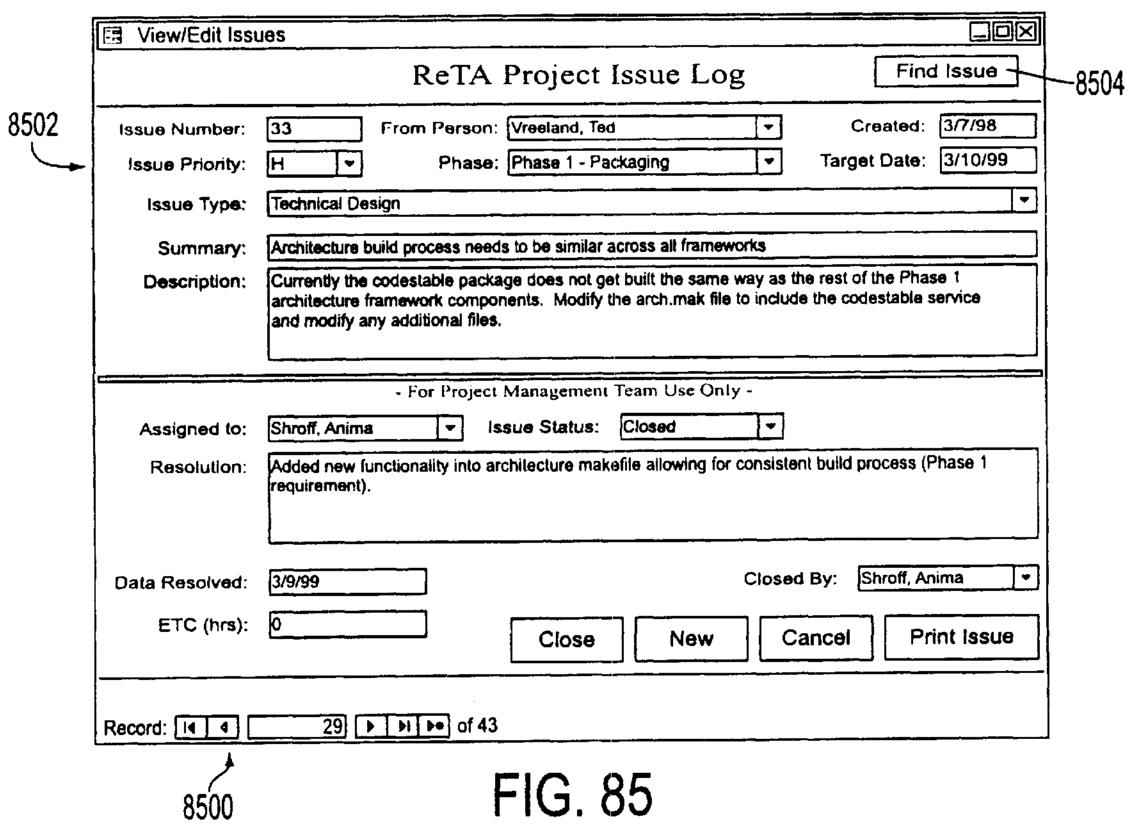
FIG. 85 illustrates the Modify Issue Screen according to an embodiment of the present invention.

From the main window, select the View button 8334 of the Main Window 8330 shown in FIG. 83.1. This may display a window similar to the New Issue screen, however it is possible to scroll through all existing Issues using the Record control 8500 located in the lower left portion of the window. FIG. 85 illustrates this Modify Issue Screen 8502.

To search for a specific Issue, click on the field containing the data to search by and then click on the Find Issue button 8504. Enter your search criteria when the prompted. The resulting Issues should comply with the search criteria. Advance through the retrieved records using the Record control.

Team & Project Lead Administration

Typically it may be the Team Lead's responsibility to review and assign Issues to individual developers. To do this, simply type within the desired fields or select the appropriate options from the list boxes. Pressing the Close button or advancing to another Issue may commit the changes. Pressing the Escape button may cancel changes.

Printing Reports

Figure 86:
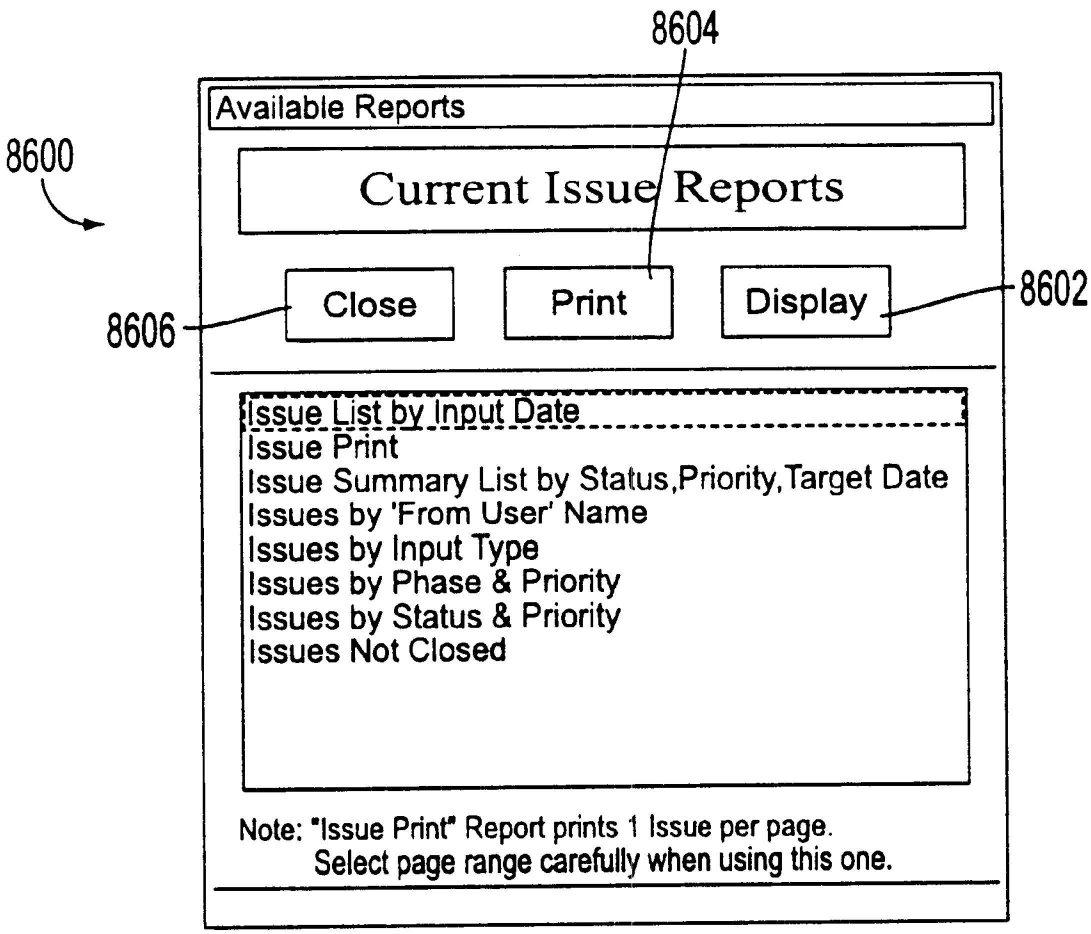
FIG. 86 illustrates the Report Selection Screen according to an embodiment of the present invention.

From the main window, select the Report button 8336 of the Main Window 8330 shown in FIG. 83.1. This may display the Report Selection Screen. FIG. 86 illustrates the Report Selection Screen 8600.

Select the appropriate criteria for the desired reports and select the Display button 8602. This may provide a view of the report from which it is possible to create printed copies of. To print a report, select the Print button 8604. To return to the main window select the Close button 8606.

Performance Modeling

Figure 87B:
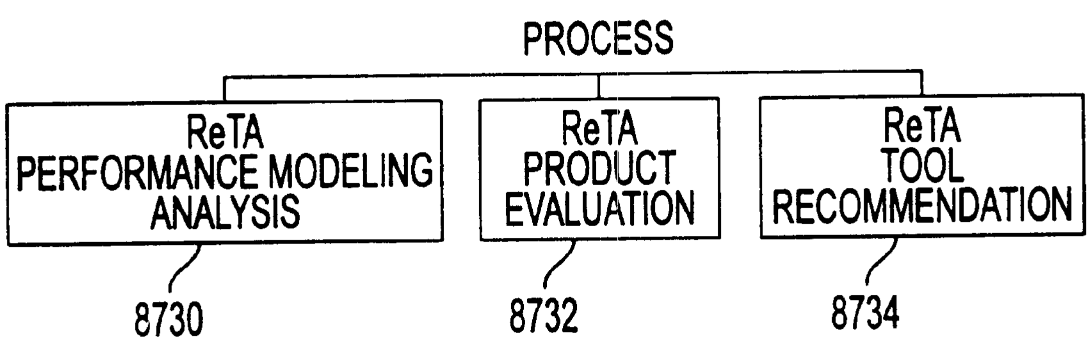
FIG. 87 is a flow chart depicting a method for network performance modeling.
Figure 87A:
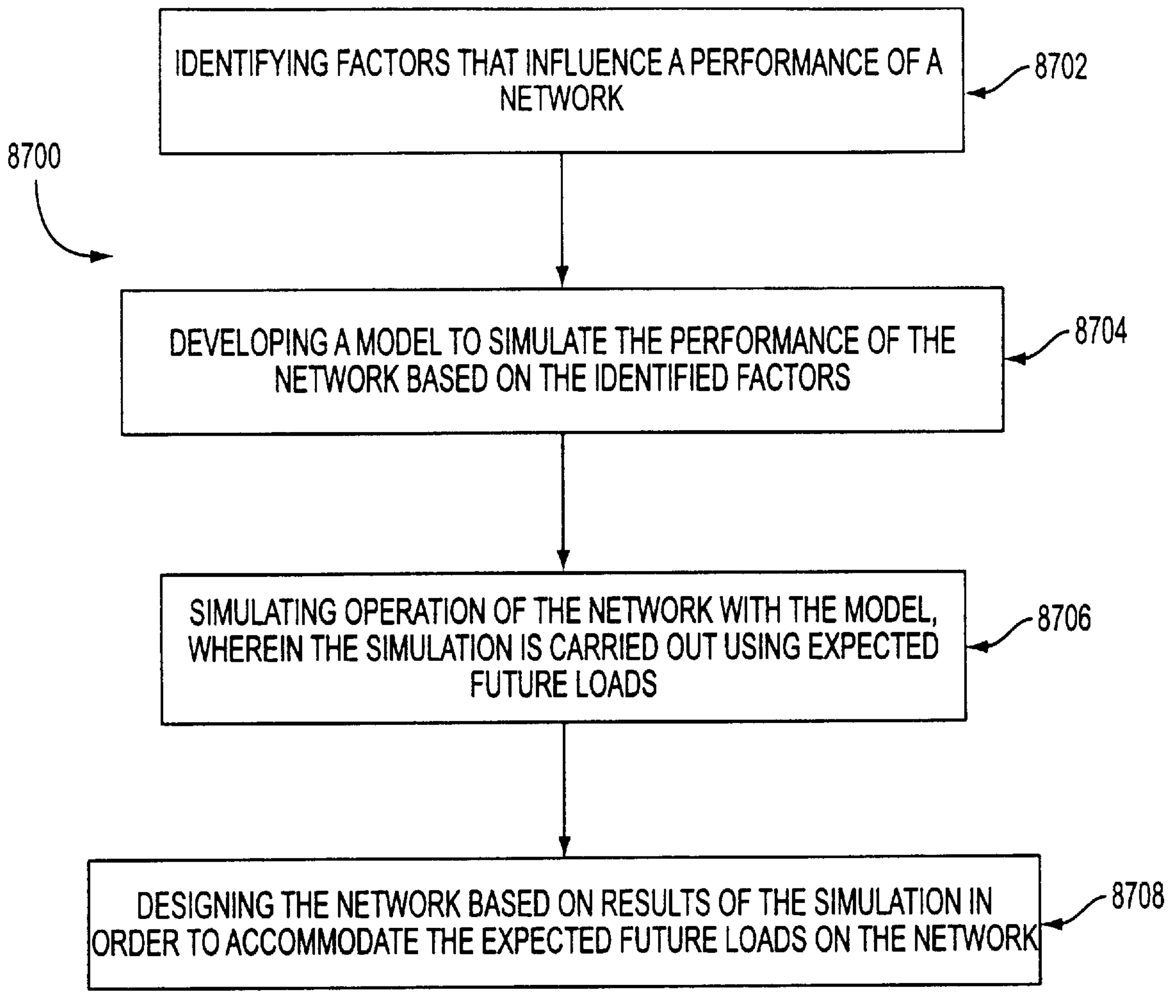

FIG. 87 illustrates a method 8700 for network performance modeling. Factors that influence a performance of a network are first identified in operation 8702. In operation 8704, a model is developed to simulate the performance of the network based on the identified factors. Operation of the network is simulated with the model in operation 8706 with the simulation being carried out using expected future loads. The network is then designed in operation 8708 based on results of the simulation in order to accommodate the expected future loads on the network.

The factors may include such things as transaction load, network load, network utilization, error rate, network usage profile, maximum utilization, peak transmission rate, peak transmission time, quantum, utilization spike, and/or benchmark. The factors may also include bottlenecking. Optionally, applications of the network may be designed to accommodate the expected future loads. Similarly, the simulation of the operation of the network with the model may include identifying initial response time estimates based on the expected future loads.

Further, the network may be a local area network (LAN). Network drivers, a network interface card, an Ethernet hub, an Ethernet bridge, a switching hub, a router, and a token ring hub of the network would be designed to accommodate the expected future loads. Alternatively, the network may be a wide area network (WAN) in which a router, a frame relay public data network, a gateway, and a front end processor of the network are designed to accommodate the expected future loads. The following material provides a more detailed description of the above-described method.

The ReTA Performance Modeling portion of the present description outlines the evaluation process and Analysis of a performance modeling infrastructure. It may discuss the selection approach, the product requirements, and the evaluation of the products, in order to obtain a final recommendation. FIG. 87.1 illustrates the end to end process associated with Performance Modeling. Components include Performance Modeling Analysis 8730, Product Evaluation 8732, and Tool Recommendation 8734.

Net-Centric and other advanced computing paradigms have brought about an entirely new generation of advanced business applications. These distributed applications place tremendous demands on the network. Corporate computing networks must endure the effects of increased usage, multiple protocols, heterogeneous networking hardware and software, a variety of application performance profiles, and a distributed user base. Designing and implementing high performance applications on distributed networks today can be challenging. This is especially true in regions that are characterised by limited WAN bandwidth, generally poor communication infrastructures, and distributed environments, such as EMEAI.

Moreover, end-user performance expectations are becoming increasingly more demanding, requiring the network to be designed, sized, and managed with performance in mind. New networking technologies are claiming confusing performance characteristics. Technology industry benchmarks provide only minimal insight into true effective performance. Performance measurement standards are currently in a state of flux. And performance management tools themselves may provide only limited assistance in predicting and monitoring network performance.

The result is a complicated situation for approaching, understanding, predicting, and analysing network performance in network intensive applications and computing infrastructures. This portion of the present description may identify the elements of network performance management, presents a network performance product evaluation, and outlines necessary network performance activities, strategies, and design considerations in order to produce a high level recommendation and implementation strategy.

Performance Management Principles

Basic Concepts

The term network performance management broadly covers many different concepts that are used to evaluate and improve the capabilities and utilization of network resources. This portion of the description provides a foundation for understanding network performance management concepts. Understanding and implementing these concepts promotes effective network performance management. Benefits of effective network performance management include:

Response time improvement

Reduction of telecommunications costs due to optimized line utilization

More flexibility in the application architecture

In order to achieve these benefits, effective network performance management requires the right application performance design, the right resources and technologies, and the right plans and approaches.

Figure 88:
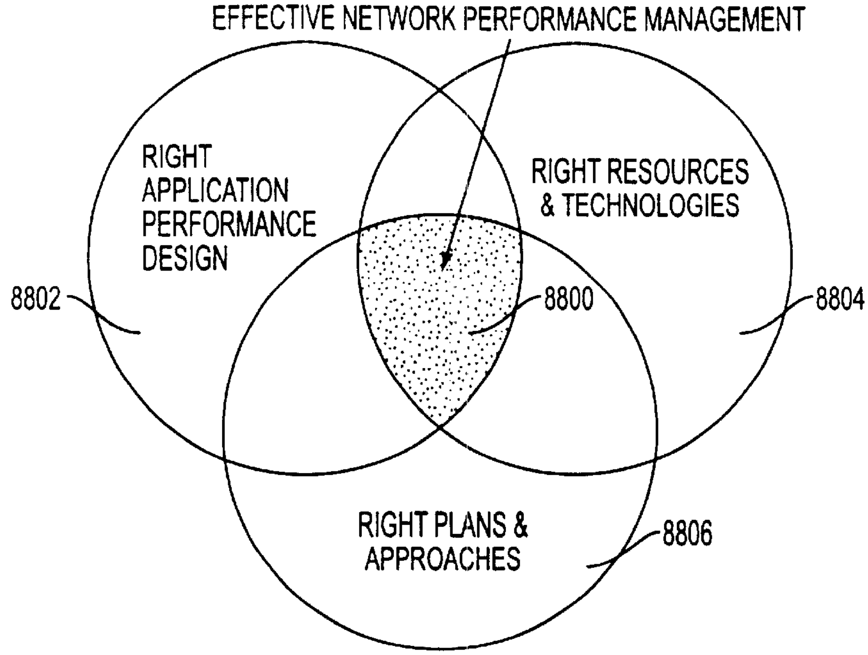
FIG. 88 illustrates the Effective Network Performance Management according to an embodiment of the present invention.

Network Performance Management involves several activities. These activities cover stages in the planning, designing, monitoring, analyzing, and tuning of networks. FIG. 88 illustrates the area 8800 of Effective Network Performance Management that occurs where the right application performance design 8802, the right resources and technologies 8804, and the right plans and approaches 8806 overlap. Effective network performance management requires people, processes, tools and knowledge. Effective network performance management yields the optimal performance of network resources in order to meet the business needs.

Network Performance Management Tools are designed to simulate, test, monitor, and analyze the different elements of network performance. Tool functions, categories, limitations, and numerous products are discussed in detail later in this portion of the present description. Note that tools at best provide only a component to successful network performance management.

Performance Measurement involves the determination of network performance based on metrics, such as those defined later in this portion of the description. Performance measurements are often needed to verify performance level agreements are met and to analyze bottlenecks in the network operation. Note that no single tool today can provide comprehensive end-to-end measurement of all components in distributed client/server networks. As there are a large number of components involved in today's corporate networks, detailed performance measurement can be both complicated as well as time consuming. This should be considered when defining performance agreements. Aids to performance measurement include software and hardware monitors.

A generic network performance analysis is presented towards the end of this portion of the description. This highlights the complexity involved in performance measuring.

Terms and Definitions

These terms describe network performance from a user perspective. A Bottleneck is the point in a system where capacity is lower than at surrounding points. In data communications networks there are normally multiple bottlenecks. A system or network is limited by the performance of the slowest bottleneck.

Price/Performance Index is a general term used to define the performance characteristics of a component relative to the cost. Generally, performance is considered directly proportional to price, the better the performance the higher the price. With the range of WAN service alternatives and advanced technologies today, it could be beneficial to investigate this index in detail. When analyzing price/performance indexes, it is important to have a clear definition of what performance is required. Often, performance increases more rapidly than price, thus a high performance ATM network may cost much less per megabit than a 64 Kbps X.25 connection. However, if only 64 Kbps of bandwidth is required, then the X.25 option may be much less expensive. For a given set of requirements there may normally be numerous options. The price of these options often varies widely depending on such factors as region and carrier strategy.

Response Time is the time from when the user presses a key to perform a function until the response appears on the screen. It is the cumulative result of all the individual response times of each of the network components, as well as the application and other components. Several network components are involved in aggregate response times. A response time analysis example below reveals the various factors of influence in a large client/server banking application.

The following table illustrates an Engagement Response Time Analysis.

| Start-up of an OS/2 Session | Load program from disk | APPC ACK delay (from CICS to gate-way) | Service execution and message transport time | APPC ACK delay (from gateway to CICS) | Processing of the response at the LAN and worksta-tion Level | GUI display |
|---|---|---|---|---|---|---|
| 9% | 26% | 7% | 30% | 7% | 12% | 9% |

Reliability refers to the probability that a system may not fail during a given time. It is often expressed as Mean Time Between Failures (MTBF).

Serviceability is the length of time that is required to repair a network component. It is often expressed as Mean Time To Repair (MTTR).

Availability is the percentage of time that the system is available to users. It can be expressed in terms of the reliability and serviceability:

$$\text{Availability} = \frac{MTBF}{MTBF + MTTR}$$

However, this formula does not account for two important aspects of availability:

Scheduled unavailability

Number of users affected

The impact of unscheduled outages can be significant. Likewise scheduled outages of shared network resources can also be significant. On any network, it is difficult to notify all users of all scheduled outages. Thus, for these users scheduled downtime is effectively unscheduled downtime. Also, many users or applications may not be willing or able to alter their schedules to that of the network. Therefore, availability should be analyzed in terms of both the unscheduled unavailability as well as the scheduled unavailability.

The number of users affected and the business impact of affecting those users should also be considered. If the area of impact is limited to a single workgroup, then outages may be more acceptable than for an entire office.

Network Terms

These terms describe the performance qualities of various network components.

Bandwidth is the rated speed of communications lines or links, normally expressed in bits per second (bps). This is typically the first factor that is considered in network performance management. A lack of adequate bandwidth decreases response times. Bandwidth is also referred to as line speed or, as a general term, the capacity of the system.

The following table outlines the bandwidth of common WAN links:

| Class | Bandwidth in Bits per Second (bps) | Bandwidth in Bytes per Second (Bps) |
|---|---|---|
| T1 | 1.544 M | 193 K |
| E1 | 2.048 M | 256 K |

In the table Mbps refers to one million bits per second and KBps refers to one thousand bytes per second. Performance analysis generally first requires converting bandwidths between bits and bytes to analyze application data throughput.

Latency is typically the second most important quality considered after bandwidth in performance analysis. Latency is the time delay from delivery of the first bit of the packet to the network until the receipt of the last bit of the packet at the destination. A satellite link may have a line speed of 512 Kbps, but a latency of half a second. This means that it takes half a second for a signal to travel from the sender to the satellite and then to the receiver. From a performance standpoint, latency may add a delay in the response time of all applications. Latency is particularly important to consider in interactive applications. In batch applications the latency may not be as critical. If a packet crosses the network in a relatively short period of time, it is said to have low latency. High latency occurs when packets take long periods to cross a network. Latency is also referred to as propagation delay and network response.

Latency is often dependent on the type of data that is being transmitted. Data can be broken up into two types: isochronous and plesiochronous. Isochronous data has a Constant Bit Rate (CBR) and must be transmitted through regular discreet intervals such as voice and video. Plesiochronous data is not constant; it has a Variable Bit Rate (VBR). Examples of this type include file transfers and most types of LAN traffic. Note that although a voice transmission requires minimal bandwidth, it has a constant bit rate requiring low latency.

Serialization is a network quality that reveals the degree to which low bandwidth can cause high latency. When a network device, such as a switch or a router receives a packet, it reads in the whole packet then processes and forwards it. Low speed links may cause a delay, as the network device has to read in the packet in serial, process it, and then send it out in serial. In higher speed links, devices may be able to process packets faster, with less of a delay. Small packet sizes may also decrease the time it takes to read in a packet. This serialization is the delay that is caused while reading and sending the packet.

The following equation outlines the serialization time for a single link $$ST = \frac{8\ \text{bits/Byte} \times \text{Number of Bytes/Packet}}{BW}$$

$ST$ = Serialization Time $BW$ = Bandwidth in bits per second

For example, the serialization time for a 512 byte packet is:

| Bandwidth | Serialization Time (ST) | ST in seconds |
|---|---|---|
| 9600 bps | 427 milliseconds | .4 seconds |
| 64 Kbps | 62.5 milliseconds | .06 seconds |
| 1.544 Mbps | 2.65 milliseconds | .003 seconds |

Serialization delay is more notable when a packet travels through multiple network devices (routers) to reach its destination. Each "hop" may have a serialization delay associated with it. The equation below represents the total serialization delay for a network:

$$\text{Total serialisation delay} = \left[\left(\frac{p}{b}\right)(n+1)\right] + \left(\frac{r}{b}\right)$$

p=packet size n=number of nodes b=bandwidth of the line r=remaining number of bits to be delivered in message For example, if a 200 Kbit (25 KByte) file is transmitted through four nodes of an X.25 network composed of 56 Kbps trunks, using 1024 bit (128 Byte) packet sizes, the serialization delay would be:

$$3.64 \text{ seconds} = \left[\left(\frac{1024}{56000}\right)(4+1)\right] + \left(\frac{198976}{56000}\right)$$

p=1024 bits (128 bytes)

n=4 nodes b=56000 bits per second r=198976 bits=200000–1024

However, if a packet size of 200 Kbit (25 KByte) is used, the packet must be processed in entirely by each switch before it can be sent to the next switch, this causes a delay of:

$$17.86 \text{ seconds} = \left[\left(\frac{200000}{56000}\right)(4+1)\right] + \left(\frac{0}{56000}\right)$$

p=200000 bits (25 bytes)

n=4 nodes b=56000 bits per second r=0 bits=200000–200000

Since line speeds are generally much slower than processor speeds, the serialization delay at each node is a major component of network latency. Fragmenting user data into small packets introduces pipelining if packets pass through several nodes.

Pipelining is when multiple devices are each working on a part of the transfer. For example, multiple switches are simultaneously working on a different packet in the file transfer. This improves end-to-end response time, because the switches are working in parallel.

The calculations above assume that the time for the switch to process the packet is effectively zero. Although the line speeds are typically much less than the processing speeds, this assumption may not be valid for some environments. The processing time is normally different for different packet sizes. It takes longer to process larger packets.

Serialization delay can be a significant factor in designing large internetworks.

There are different ways of decreasing serialization delays:

Decrease packet size

Increase bandwidth between switches

Increase bandwidth between customer equipment and switch

Decrease number of "hops"

Note that serialization can occur in switches as well as in any other devices that processes packets, such as routers or gateways. Serialization delays should be considered early in the network design phase.

Packet, Frame, Cell, Message, and Protocol Data Unit (PDU) all define a "fragment" of data. When applications send data across the network, the data is broken up into manageable pieces. Each of these terms describe these fragments. Technically, each term has a slightly different meaning, depending on its context. Unless otherwise noted, the term packet may be used generically to mean a "fragment" of data.

Overhead. Each of the data packets must contain addressing and other control information. From a performance perspective, this additional information is generally referred to as overhead. Overhead is generated at each of the different protocol layers that a packet passes through. Some of these layers correspond to the OSI Model. There may be other overhead associated with middleware that does not occupy a discreet OSI layer.

For example, a synchronous data connection uses 8 bits for each byte. An asynchronous connection also uses 8 bits for each byte as well as a start and a stop bit. An asynchronous connection therefore has 20% overhead before analyzing any of the upper layer protocols:

$$\frac{8 \text{ bits of data}}{8 \text{ bits of data} + 2 \text{ bits overhead}} = 80\% \text{ Throughput}$$

$$\frac{2 \text{ bits of overhead}}{8 \text{ bits of data} + 2 \text{ bits overhead}} = 20\% \text{ Overhead}$$

Figure 89:
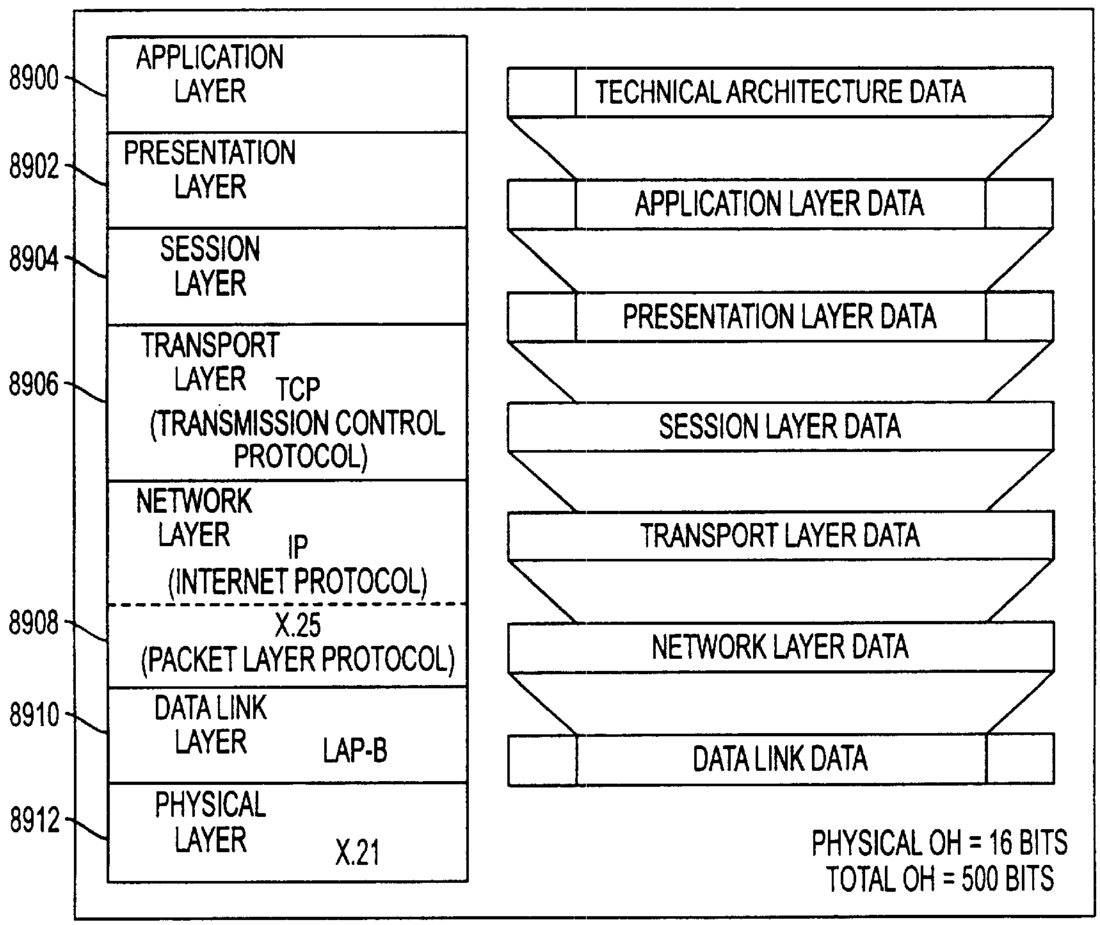
FIG. 89 illustrates an example of overhead introduced at lower layers according to an embodiment of the present invention.

Each of the layers through which a packet passes adds another component of overhead to the packet. As shown below this can result in a significant amount of overhead. Each layer adds a header and possibly a trailer that contains information for the corresponding layer at the destination. FIG. 89 illustrates an example of overhead introduced at lower layers. Such layers include an application layer 8900, a presentation layer 8902, a session layer 8904, a transport layer 8906, a network layer 8908, a data link layer 8910, and a physical layer 8912.

Inter-packet Gap is the time lapse between the sending of packets on the network. When data is packaged and overhead addressing and control data added, it is possible to send packets independently of other packets. The delay between sending packets is referred to as the inter-packet gap. Some protocols mandate delays between packets. From a performance perspective, this delay is considered negative.

For example, Ethernet requires that after a packet is transmitted by any station on the network, every station must wait a random amount of time before it can transmit. If there are many stations on the network and two stations wait the same amount of time, a collision may occur when they both try to transmit. The collision may force all stations to wait again, thus degrading performance. The effective throughput of Ethernet is therefore much less than its rated bandwidth of 10 Mbps.

Traffic Profile refers to the combination of protocols and applications that a network supports. The traffic profile has significant effects on network performance. For example, batch file transfers typically do not perform well when mixed with voice over the network. Large batch file transfers tend to require much of the available bandwidth. Voice communication only requires a small portion of the bandwidth, but continuously. If a file transfer is delayed by a second, the effect is negligible. However, if a voice communication has even short delays, it is disconcerting to the users. Traffic profile is also referred to as traffic mix.

Packet Size is the length of each packet. Generally, it is a configurable parameter. This includes both a data portion and an overhead portion. Overhead is generally a fixed size for each packet, thus larger packets have a lower proportion of overhead. Packet size also has other performance effects.

To lower the overhead proportion, the largest packet size should be used. However, there are several reasons for using a smaller packet size, such as to decrease the serialization delay. There are many other factors influencing the optimal packet size.

Message Size is the length of messages sent by the applications. For example, an interactive terminal application normally sends relatively short messages, each consisting of a single keystroke, whereas a client/server file transfer application might send larger messages each consisting of a portion of the file. Ideally, from a performance perspective, message size should be configured to fit within the data area of the packet size or integer multiples of the size of the data area.

The message size has a direct affect on performance and response time. It is normally a configurable parameter within the application accessing the network. Identifying the optimal message size for an application and network is a key activity in performance management. The example below illustrates the effect message size and number of users has on response time.

Effective Throughput is the "true" bandwidth that is available to an application after all the overhead, inter-packet gaps, and other factors are considered. The effective throughput can be used to identify the performance of different components. For example, the effective throughput of an Ethernet LAN is different from the effective throughput of a file transfer over an Ethernet LAN. Effective throughput is always much lower than the rated bandwidth. The effective throughput of Ethernet and FDDI are much lower than their rated bandwidth as illustrated in the table below. Note that the effective throughput is dependent on the network configuration, however, these numbers represent an average. The following table illustrates Effective Throughput.

| Transmission Media | Effective Throughput |
|---|---|
| Ethernet | 300 KBps |
| FDDI | 2 MBps |

These are the effective throughputs of the lower level media services, the effective throughput of the applications using these services may be much less, because of additional higher layer overhead, inter-packet gaps, and other delays discussed above. For example, one test of an FTP file transfer over a shared Ethernet provided only 15% effective throughput versus rated bandwidth.

When discussing bandwidth and other performance related terms it is important to clearly define them and obtain agreement between project members and client. For example, it should be determined if the client is referring to absolute bandwidth, the effective throughput of the media service, the effective throughput of the application, or something else.

The "absolute" bandwidth of FDDI is 250 Mbps. Theoretically, this is accurate, because the actual clock speed of FDDI is 125 MHz. Each of the two FDDI rings can be used simultaneously, making it possible to send 250 Mbps. However, FDDI is commonly said to have a bandwidth of 100 Mbps. This is because only one ring is used in practice to transfer data and 25% of that is overhead. FDDI uses a 4/5 signaling scheme, it takes five bits to represent four bits of data, a 25% signaling overhead.

Network Metrics

These are common terms used when measuring the network performance.

Transaction Load is the number of bytes of data that are required to process a business transaction, including all associated overhead. The load includes both the number of bytes sent in a request as well as the number of bytes sent in response. In order to determine the transaction load, the request frequency must be determined over several time periods. The transaction load is a function of the number of bits per time period. The following equation offers a mathematical representation of a transaction load.

$$TL = \sum_{n=1}^{x} S_n f_{n(t)}$$

x=Total number transactions

Sn=Size of transaction (n)

Fn=Number of transactions of type (n) at time (t)

For example, the transaction load generated by transaction T during time period P is:

$$TL = \text{Sizeof}(T) * \text{Number of } T\text{'s during } P$$

The sum of all the transaction loads for a given period is the total transaction load. Each transaction for each application must be analyzed to determine its size and the number of times it occurs during each period. This estimate is a valuable input into the capacity planning and performance planning activities.

Network Load is a function of the total transaction load. It can be expressed with the following equation.

$$NL = TL/\text{Period}$$

The network load is a function directly proportional to transaction load for a specific period. The following example considers loads during the time period between 8:00 am and 9:00 pm:

| Transaction | Size in bits | No. Of Transactions | TL |
|---|---|---|---|
| Login | 100000 | 100 | 10,000,000 |
| Query | 100000 | 100 | 10,000,000 |
| Response | 400000 | 100 | 40,000,000 |
| Total Transaction Load (in bits) | | | 60,000,000 |

Based on the above data, network load would then be:

16,667 bps=60,000,000 bits/3600 seconds per hour

Network Utilization is a function of network load. It represents the percent utilization of the network. It is expressed mathematically as:

NU=NL/Bandwidth

Using the example above for a 64 Kbps link, the network utilization would be:

26%=16,667 bps/64,000 bps

Error Rate measures the effective accuracy of the network transmission. This rate is directly dependent on the WAN service and LAN infrastructure. In addition, each country's telecommunications infrastructure influences error rates. Error rates normally vary with time of day.

Figure 90:
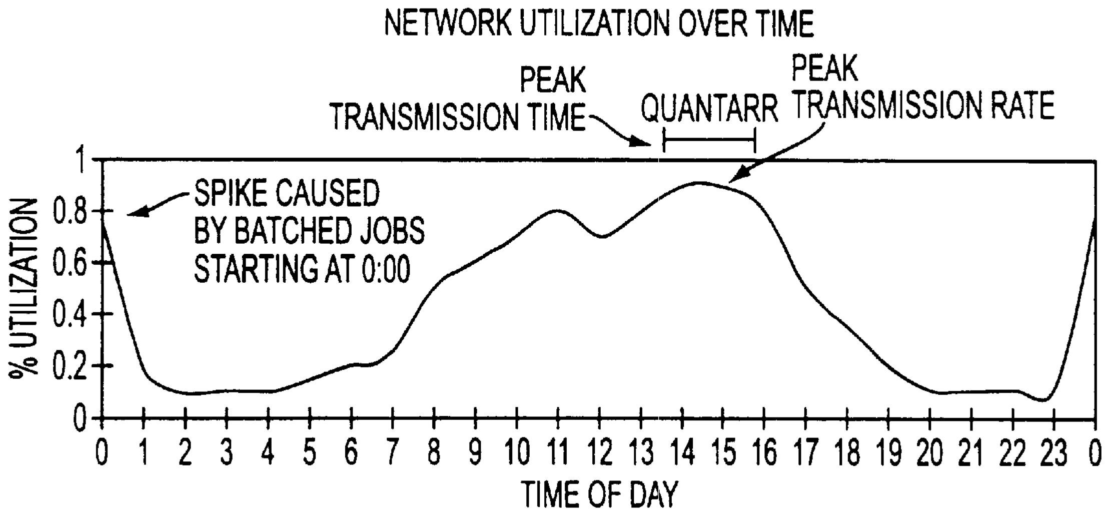
FIG. 90 illustrates a graph depicting a Network Usage Profile according to an embodiment of the present invention.

A Network Usage Profile can be represented graphically by network utilization versus time. FIG. 90 is a graph depicting a Network Usage Profile showing a percent utilization at times of the day. Developing and analyzing a network utilization graph can help assess network performance. Comparing network utilization graphs over time highlights the traffic growth. This can be used to predict future network performance and identify problem areas.

Maximum Utilization is the maximum network utilization that a network can effectively provide. Network services provide a maximum utilization that is less than the rated bandwidth. For example, the maximum utilization of Ethernet may be 30% for some network configurations.

Peak Transmission Rate is the highest network utilization level.

Peak Transmission Time is the time that has the highest network utilization. The network peak transmission time and the peak network utilization must be considered when sizing the network.

Quantum is the length of the peak transmission time. It is commonly referred to as "peak periods". It is also valuable to determine these periods for network sizing. In applications where there are "bursts" of traffic it may be necessary to consider a smaller quantum to reflect true network requirements.

A Utilization Spike can occur when network usage increases dramatically within a short period of time. For example, one cause of this occurs when multiple batch jobs are all set to run at midnight. This may cause a spike when all the jobs attempt to begin operation and transmit data across the network. LANs can experience spikes in the morning hours when users typically log on. Applications such as NFS also are common causes of network spikes, specifically referred to as NFS spikes.

Benchmark refers to an actual performance level experienced in a business environment. Benchmarking is a common activity in the design, analysis, and installation phases. It assists in understanding the anticipated performance levels before production rollout.

Performance Analysis

Figure 91:
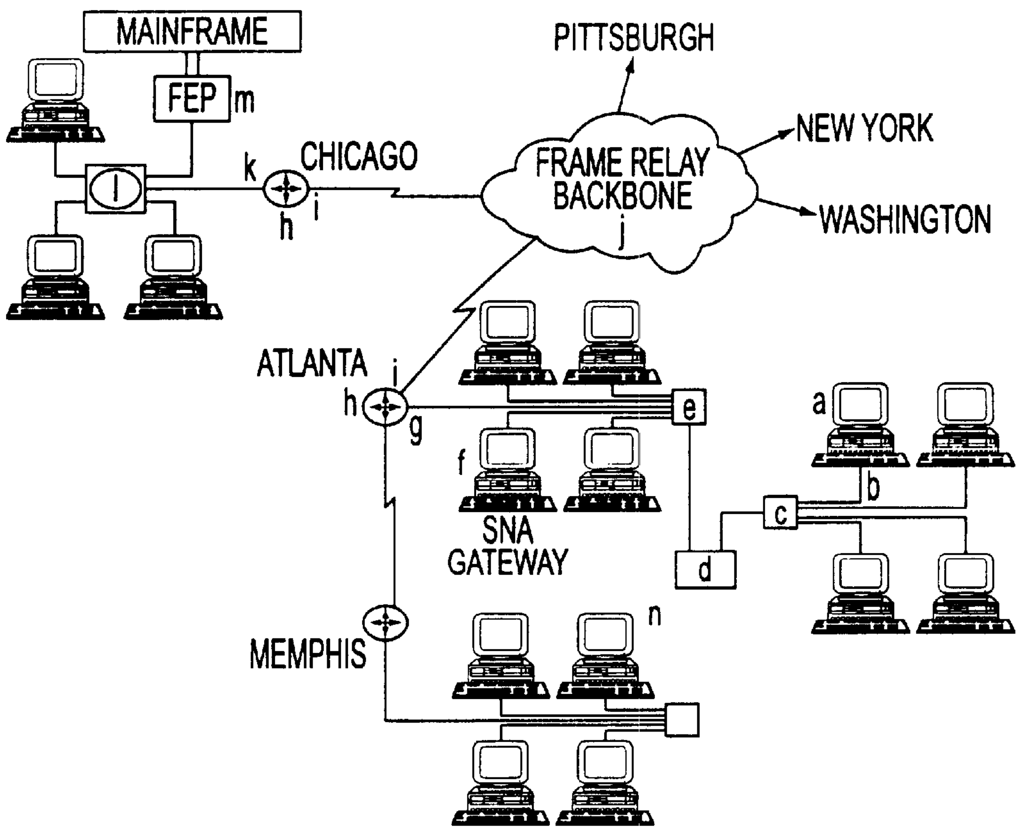
FIG. 91 illustrates a Network Layout according to an embodiment of the present invention.

FIG. 91 illustrates a Network Layout with several network components labeled (a, b, c, etc. and corresponding to the example below). The following example illustrates the first step in network performance analysis, identifying the factors influencing performance. A full network performance analysis requires the following procedures:

- Identifying factors that may influence the performance of a system
- Developing a model to simulate a network's performance characteristics
- Modeling the network based on expected loads
- Extracting model results in order to plan and design network and applications This example identifies only some network components and performance elements. However, it is intended to highlight the complexity involved in network performance analysis.

LAN Components

A. Network drivers—This is software within the workstation that controls network access.

B. Network Interface Card (NIC)—This provides physical access to the network. It consists of a hardware card and software drivers.

C. Ethernet hub—This is a central point or concentrator of network connections. This Ethernet LAN is physically configured in a star topology and logically configured as a bus topology.

D. Ethernet bridge—This segments traffic based on the Ethernet address.

E. Switching hub—This is configured in a star topology.

G. Router—Ethernet interface.

K. Router—Token Ring interface.

L. Token Ring hub—This is also known as a Media Access Unit (MAU). The Token Ring is physically configured in a star topology, but logically configured as a ring.

O Ethernet—This is configured physically and logically in a bus topology.

WAN Components

H. Router—CPU.

I. Router—Frame Relay interface.

J. A Frame Relay Public Data Network (PDN)—This provides the WAN service to connect one location to another. A service provider supplies the PDN. Examples of service providers are: the national PTT (for example, France Telecom), British Telecom, AT&T, Sprint, or the local RBOC. In this network the Frame Relay PDN forms the backbone and the WAN link (n) is a link to a branch office.

N. Another form of wide area link—This is a dedicated circuit.

Other Components

F. This is a gateway that connects the routed internetwork to the SNA-based mainframe.

M. This is the Front End Processor (FEP)—This handles communications for the network.

Performance Example

Measuring network performance can be difficult even in the simple network described here. For example, consider a user in Atlanta entering an order request from their workstation to the Chicago mainframe order fulfillment database.

The action s described here are meant to be representative user actions. For the sake of simplicity, some actions have been omitted.

| Action | Component | Performance Implication |
|---|---|---|
| User A presses <enter> on their 3270 terminal emulation program to send the order request to the mainframe. | User | |
| The terminal emulation program sends a message with the screen data to the network software running on the workstation. | Network drivers (a) | Latency |
| Message is inserted into a packet with header and control information addressed to the SNA Gateway. | Network Drivers (a) | Latency, Overhead |
| This packet is then placed into a packet with an Ethernet header. | Network Drivers, NIC (a, b) | Latency |
| This Ethernet packet is then sent over the 10 Mbps Ethernet LAN to the SNA Gateway. | NIC, LAN (b, c) | Latency, Bandwidth |
| The Ethernet bridge receives the packet, determines that it needs to be forwarded on and sends it to the Ethernet switch. | Bridge (d) | Latency |
| The Ethernet switch receives the packet, determines which device it is destined for and sends the packet directly to the SNA Gateway. | Ethernet Switch (e) | Latency, Bandwidth |
| The SNA Gateway receives the Ethernet packet and strips the Ethernet headers. | Gateway (f) | Latency |
| The SNA Gateway determines the message is destined for the mainframe and places the message in a TCP/IP packet directed to the Mainframe. | Gateway (f) | Latency |
| SNA Gateway network software sends packet to Atlanta router via the Ethernet switch. | Gateway NIC, LAN (f, e) | Latency, Bandwidth |
| Router Ethernet interface receives packet, strips Ethernet header, and sends to router CPU for processing. | Router Ethernet Interface (g) | Latency, Bandwidth |
| The packet's TCP/IP address is compared to a routing table that the router maintains. Router CPU decides to send the packet out via Frame Relay interface. | Router CPU (h) | Latency, Bandwidth |
| The TCP/IP packet is packaged into a Frame Relay packet with the appropriate Frame Relay address. | Router Frame Relay Interface (i) | Latency, Bandwidth |
| The packet is then switched through the Frame Relay network and delivered to the Chicago router. | Frame Relay Network (i) | Latency, Bandwidth |
| The Chicago router Frame Relay interface strips the Frame Relay header information and sends TCP/IP packet to the router CPU. | Router Frame Relay Interface (i) | Latency, Bandwidth |
| Chicago router CPU refers to its routing tables and determines that the packet is destined for its Token Ring interface. | Router CPU (h) | Latency, Bandwidth |
| Chicago router's Token Ring interface adds a Token Ring header and sends the packet to the FEP. | Router Token Ring interface (k) | Latency, Bandwidth |
| Packet crosses the Token Ring MAU to get to the FEP. | MAU/LAN (1) | Latency, Bandwidth |
| The FEP receives the packet, strips the TCP/IP or LU6.2 header information and forwards the message to the mainframe. | FEP (m) | Latency, Bandwidth |
| The mainframe processes the message and sends the response back to user A reversing all the steps above. | All | All |

This simple action of updating a screen illustrates that there are numerous network components that can affect performance. For example, if there is a collision on one of the Ethernets, the network driver software must pause and try again. The routers have to process the packet and may be slow to forward it. The Frame Relay network has much lower bandwidth than the Ethernets and it may take longer to send the packet. If the Frame Relay becomes congested it may drop the packet entirely and then it would have to be retransmitted. The gateway or the FEP may be slow and may be processing other packets.

The goal in a network performance analysis is to:

Identify factors of influence

Identify the bottlenecks

Develop initial response time estimates based on expected load

Applications

The business needs of the applications should drive the network performance level requirements. The applications should be considered when analyzing network performance requirements. Applications can be designed to make optimal use of the network. This chapter offers unique application considerations for several network intensive applications.

Effective throughput of the applications, user response time, and availability are key factors in analyzing network performance. These factors determine how the business user views the performance of the network. Most other performance characteristics may be attributes of these factors.

Observations

The following general observations should be considered about performance management.

- Effective network performance management can be a complicated process. Networks using the same technologies, the same standards, and the same designs can have three different performance profiles. Each client therefore has a unique situation to address performance.
- A key success criteria is to mutually understand the terms, concepts, and issues. Network performance is often defined by many different terms and benchmarks. These terms and benchmarks are often defined by vendors attempting to differentiate their products. Likewise, the performance issues can be complicated and it is valuable to have client awareness.
- Network performance management is an iterative process. The optimal network configuration may change as the applications, network usage, technologies, and procedures change. Network performance management must be ongoing before, during, and after installation. Any change to network applications or usage can greatly influence network performance.
- Identifying "bottlenecks" is a key to obtaining maximum network performance.
- The OSI Reference Model can be used to understand how each of the layers adds another level of overhead.
- Client awareness of potential performance issues early in the engagement is key to providing effective network performance management.

ReTA Product Evaluation

Network performance management tools provide various performance planning, designing and managing capabilities. These tools range from extremely complex to rudimentary in functions and operations. Tools from all network performance management categories and complexity levels are presented in this portion of the description.

State of the Market

Legacy systems performance management tools are relatively well developed and provide a robust set of tools that manage all aspects of mainframe systems and communication networks. However, these existing legacy tools do not provide the same capabilities today for distributed networks supporting client/server and multimedia applications. It is important to understand the tool market before selecting an NPM tool. The state of the tool market can be summarized as follows:

- The client/server tools do not provide the mature and robust functionality of the legacy systems tools.
- Distributed systems are generally based on multiple vendor products and thus require management tools from a variety of vendors for full network performance management. Over the next few years, this situation may change as vendors cooperate and standardize through such associations as the Universal Measurement Architecture (UMA).
- The major legacy system management vendors are migrating their current products onto client/server platforms or developing new products to provide comprehensive tools that meet the different client/server and distributed environment needs.
- A number of different tools must be used to perform the full suite of network performance management functions in modern corporate networks. These include measuring, testing, monitoring, and simulating tools.
- Tools provide only limited and questionable information to network performance management personnel.
- It is difficult to classify tools into categories, as features and categories overlap.

Tool Categories

Figure 92:
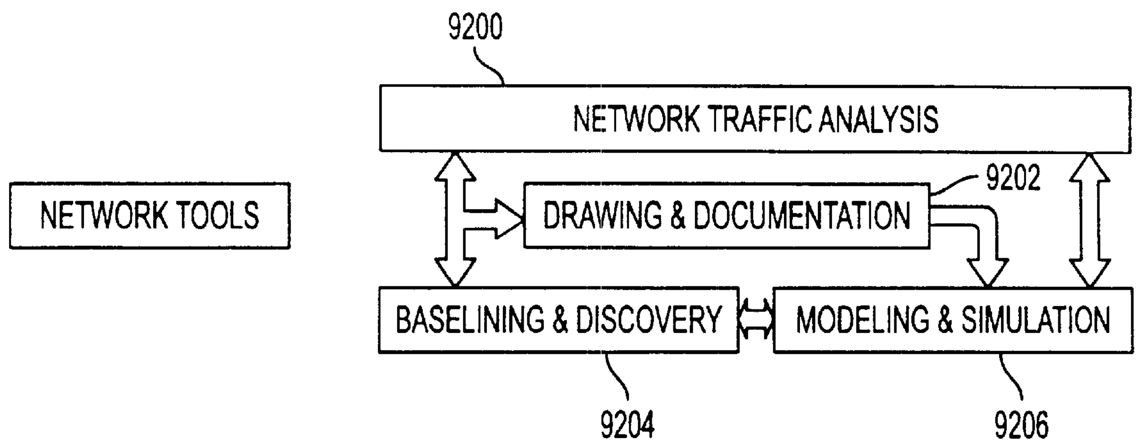
FIG. 92 illustrates how the four tool categories relate to each other according to an embodiment of the present invention.

There are several network performance management related tools on the market today. The top four tool categories are: network traffic analysis 9200, drawing and documentation 9202, baseline and discovery 9204, and modeling and simulation 9206. FIG. 92 illustrates how the four tool categories relate to each other.

Network Traffic Analysis

A traffic analysis tool provides insight into the traffic patterns on a data network. It collects data, analyzes it, decodes the information and summarizes information in graphical and/or report format.

Recommendation

A protocol analyzer is the most versatile type of network analysis tool. It is a key tool for network baselining, testing, troubleshooting, and monitoring. Every Network Solutions analyst and consultant should be familiar with and have access to this type of tool. Software based protocol analyzers do not require any specialized hardware and therefore are economical enough for a wide distribution within the global Network Solutions practice.

Sniffer Basic from Network Associates is the best software based protocol analyzer evaluated for this project. It provides a full range of features and had the most detailed decode and filtering features of the tools tested. Its user interface is both user friendly and elegant. The same user interface may be used for the next release of Network Associates' high-end protocol analyzer Sniffer Pro, which is the most widely used protocol analyzer. Personnel may be able to build protocol analysis skills while using Sniffer Basic, which may be directly transferable to Sniffer Pro, the analyzer they are most likely to encounter at a client site. In addition Network Associates offers upgrade protection for Sniffer Basic so that in those situations where a higher-end tool is required, it can be upgraded to Sniffer Pro without sacrificing the investment in Sniffer Basic. Sniffer Basic should be purchased in quantities so that a copy can be loaned to Network Solutions projects that request a copy.

Tivoli from IBM is the first real enterprise security solution allowing the consistent definition, implementation and enforcement of security policy across the entire network computing environment—from data center to the desktop. In all the tools tested, Tivoli takes the most hands-off approach to native operating system security however, customization is required based on the size of one's infrastructure. Tivoli from IBM offers a full range of product that gather control over system resources (files, directories and system processes) in adds them into a common database, which is abstracted from the host operating system.

Optimal's Application Expert is a unique product that can significantly increase the speed at which application benchmark and performance testing can be accomplished. It can be used to quickly capture all of the application data needed for network capacity and performance analysis. It also provides a simple analytical response time prediction and "what-if" features. Application Expert is a focused tool that would only be used during the testing phase of a project.

Baselining and Discovery

Baselining and discovery tools are used to get information about the current state of an existing network for a network baseline. Baseline analysis is starting point for all types of network analysis. It can be used to determine the "normal" state of the network, as a benchmark to analyze troubleshooting data against, a reference point for historical trend analysis and a source of network portion of the present. description. Baselining tools generally collect network traffic statistics and produce reports which can be used for network portion of the present description, troubleshooting, simulation and management. Discovery tools generally collect network topology and inventory information in the form of graphical, textual, or mathematical representations of the network. They are used to populate network drawings, create network models for simulation and generate inventory data. Baselining and discovery tools collect data about the status of network from varying sources including remote monitoring agents, traffic analysis tools, network management platforms, inventory tools and directly from the network.

Recommendation

Because most of these tools are tied to specific tools in other tool categories, the recommendation in this category is driven by the recommendations in the other categories. Comnet Baseliner and Optimal Surveyor are both associated with simulation tools. They promise help to create more accurate network models in less time, which would justify their purchase with the associated simulation tool. However, since a simulation tool has not been recommended for the networking tool kit these tools can not be recommended at this time either. NetSuite Professional Audit is a very competent discovery tool but due to its price and the lack of versatility of its associated drawing tool it is not recommended for the networking tool kit.

Modeling and Simulation

Modeling and simulation tools create a mathematical model of a network from models of network components. A simulation engine then uses statistical representations of workload as inputs to the model and performs calculations to simulate the network over a period of time. These tools are used to test the viability of new network designs, troubleshoot existing networks and predict the effects of changes to existing networks.

Network modeling and simulation is a very important function that allows network designers to analyze the performance of applications running on a network before networking hardware or application software is purchased or implemented. It decreases the risk for implementation of new network applications by giving designers and decision makers accurate information about how new applications or design changes may effect the performance of the network. As the demand for business critical client/server and intranet. applications grows, so may the demand for network simulation. It is important to develop the skills and processes needed for cost effective network simulation so that it is ready to meet the demand of clients as they grow.

Consulting firms are in a unique position to leverage these expensive network simulation tools and the skilled employees required to use them across many client IT projects thus driving the cost of these services down to a level that allows simulation to become viable for a wide range of IT projects.

The recommendation in this tool category is dependent on how the tool is used and what type of distribution is planned for it. The first alternative is to use the tool to supplement and speed the capacity analysis that is already being done on most projects. This type of use would dictate a wide distribution to a large number of analysts and consultants. The key characteristics of a tool for this use would be versatility, ease of use, laptop compatibility and economical price. Analytical modeling tools come close to this description but none of the tools evaluated would be well suited to this type of distribution due to high price and limited network and traffic modeling functionality. A second alternative is to use the tool to build deep simulation skills within the practice and provide new simulation and modeling services to our client services profile. This type of usage would dictate the use of a robust discrete events simulation tool for accuracy and detailed results. Due to the complexity of the discrete events simulation tool distribution, a core group of skilled users would be required to provide these services. The most important characteristics for a tool under this scenario would be accuracy, size of the component model library and capability to import network data from other tools.

The most benefit can be derived from the second alternative expanding the service offerings of Network Solutions to include Network Simulation. This approach would lend it self to the selection of a discrete events simulation tool that is accurate and capable of modeling a wide range of networks like Comnet III or Opnet Planner. However to successfully leverage this type of tool, deep skills in simulation, which take time to grow, would be necessary. It is not cost effective to buy an expensive tool of this type up front. To bridge the knowledge gap, relationships should be built and leveraged with one or more tool vendors to provide simulation services and experience for project teams while the deep skills necessary for effective use of these tools are developed internally. These tools can then be reevaluated from a skilled user's perspective within the framework of client services offerings.

Development of a core skills group to develop deep simulation skills, processes and client services would be an appropriate step. Group members would be responsible for the selection and maintenance of tools to provide simulation services. As well as developing modeling and simulation processes and methodologies. Formalization of a simulation skill group would enable greater communication between team members for sharing of experience and techniques which would lead to the development of deeper skills. It would also provide a formal channel for assessment of simulation skills. The focus of the skills team would diminish the need for ease of use and hardware compatibility allowing the team to choose an industrial strength simulation tool.

ReTA Tool Summary

For performance-modeling and network management purposes, one wants to be able to produce meaningful reports that describe how a metric is trending relative to a baseline, as discussed earlier on in this portion of the present description. For the most critical services elements one may examine such report every day or once a week. Time may not allow one to verify every measured element with such frequency, so one needs some mechanism by which one is alerted when a particular metric has changed in a significant manner. This is achieved by means of thresholds and alarms. A threshold is a baseline set to a level of the metrics at which one wants to become aware of trends in the metric.

When a threshold is exceeded, one wants to be notified by means of an alarm, e-mail, page or other "pushed" indicators. SNMP has the capability to send traps from devices in a network to a network management system. This is normally used to notify when a line is down or a specific device is not responding, however is can also send alerts when a certain device is not responding.

Other mission critical functions when selecting proper performance tools for any given infrastructure are:

Easy to use/easy to deploy

Report Generating

Proactive Management

Remote Management

Traffic Monitoring

Node Monitoring

Server Management

Scalability

Focus was given to the top two performance modeling products.

The products selected above are recognized as the best currently available. While there are some sixty performance products on the market, only a small handful has been reviewed by the major technical journals. Russell Schnurr of the Gartner Groups recognizes the aforementioned products as being best of bread based on market share and interoperability.

PVCS Description & Usage

Figure 93B:
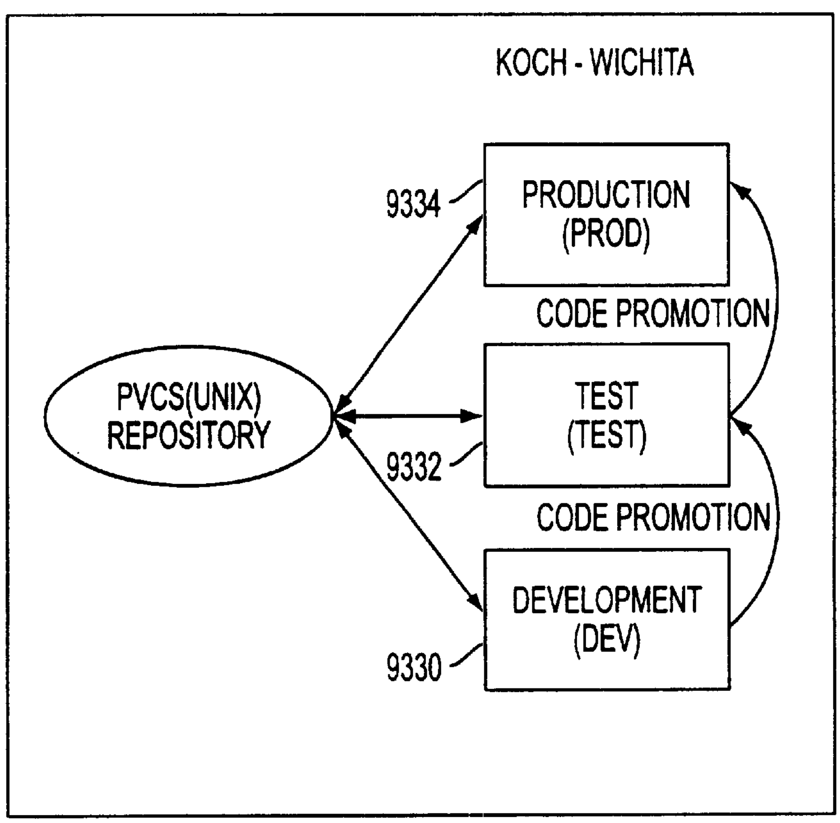
FIG. 93 is a flow chart depicting a method for managing software modules during development.
Figure 93A:
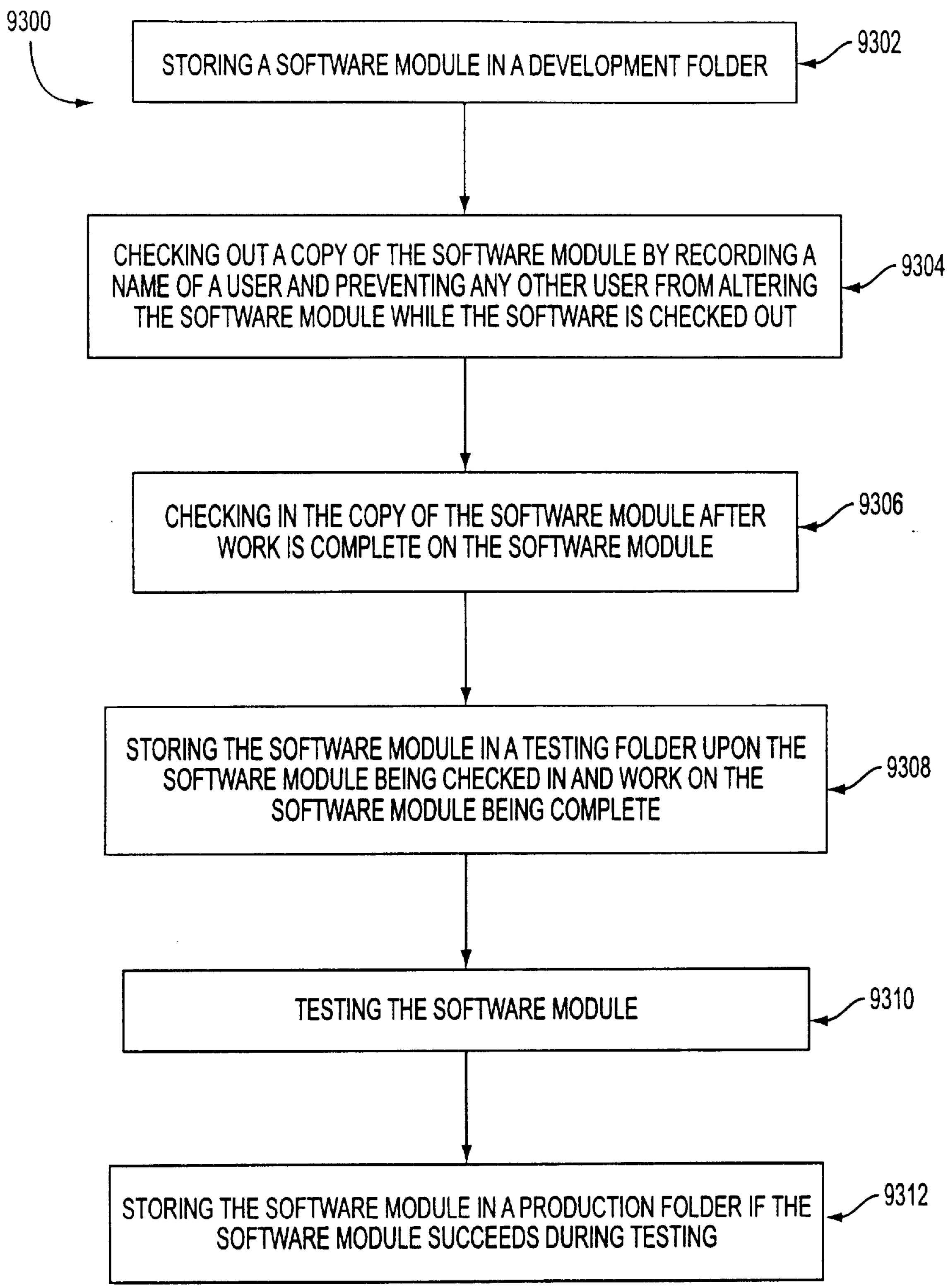

FIG. 93 illustrates a method 9300 for managing software modules during development. A software module is stored in a development folder in operation 9302. A copy of the software module is checked out in operation 9304 by recording a name of a user and preventing any other user from altering the software module while the software is checked out. The copy of the software module is then checked in operation 9306 after work is complete on the software module. In operation 9308, the software module is stored in a testing folder upon the software module being checked in and work on the software module being complete. The software module is tested in operation 9310 and stored in a production folder in operation 9312 if the software module succeeds during testing.

A copy of the software module may be archived prior to storing the software module in the testing folder. Also, the software module may be locked prior to testing.

Optionally, the software module may be stored in the development folder if the software module fails during testing. Also, the present invention may ensure that the testing folder and the production folder include a latest version of the software module. Further, user actions relating to the software module may be tracked so that a history of the user actions may be reported. The following material provides a more detailed description of the above-described method.

Description

This portion of the present description details the use of PVCS for migration control within a project environment. The main objective of migration control is to manage the modules developed for a project. The migration process manages the development effort of multiple PVCS Users, by controlling the versions of source code as it moves from development to production.

The purpose of this portion of the present description is to satisfy the following criteria:

Describe the migration control process for the development effort

Define PVCS roles and responsibilities

Portion of the present description the PVCS configurations for the UNIX and NT environments Explain the promotion model for the UNIX and NT environments Highlight the features and functionality of the PVCS migration control tool Detailed Migration Control Process Migration Control Environment The Development Architecture team designs the PVCS environment to manage the development effort. All modules under development (including database schema and object scripts; static HTML and images; Active Server Pages; JavaScript and style sheets; Interface Definition Language; Java source code; Rose Models; designs and supporting portion of the present description) should be version controlled and migrated using the PVCS migration process.

The PVCS repository can be located on any UNIX server available to the development effort. This repository may contain the latest embodiments of all developed code for both applications and architecture.

Detailed Migration Control Process Flow

FIG. 93.1 illustrates the PVCS Migration Flow, i.e., depicts the Migration Control process flow for the development environment. This diagram also shows a typical promotion model for the process. The three levels in the promotion model are development (DEV) 9330, test (TEST) 9332, and production (PROD) 9334. The following discussion is organized by promotion level.

Development Level—DEV

When a PVCS User creates or modifies a module, he/she uses the PVCS client application to check out the module from the repository. The PVCS User works on the module in the specified working directory on the UNIX server.

During the development cycle, the PVCS User has privileges to check the code in and out of the repository as necessary. It is the responsibility of the PVCS Lead to ensure that the PVCS tool is used properly by the PVCS Users.

The first step in making a module update is to use PVCS and check out a "writable with a lock" copy of the module. This option ensures that only the user who checked out the module can make modifications. When the file is checked out, PVCS moves a copy of the file into the development, working directory.

When the development work is completed and the module passes unit tests, the PVCS User checks the modified code back into the repository. The PVCS User asks the PVCS lead to promote the module to the test environment (TEST). The promotion process archives the latest version of the file and places the module in the test-working directory. A promotion from a development level is not allowed until the module is checked into the repository.

The PVCS Lead tracks modules ready for promotion. The PVCS Lead checks out and locks the modules that need to be migrated. A trial migration is performed to ensure that everything works as expected. Once this is complete, the modules are promoted from Development (DEV) to the Test (TEST) promotion level.

In summary, the roles within the DEV promotion level are:

| Role | Actions |
|---|---|
| PVCS User | Checks out module into DEV<br>Checks in module to the repository when work is completed<br>Conducts unit testing on modules<br>If passed, requests PVCS Lead to promote |
| PVCS Lead | Promotes DEV modules to TEST |
| PVCS Administrator | None |

Testing Level—TEST

During the string and beyond testing, the tester or the PVCS User uses PVCS to check out the modules. The PVCS User works on the module either on their local workstation or in a designated location on a shared network server.

To execute a successful test, the latest versions of the modules must be located in the test directory. It is the responsibility of the PVCS Lead to ensure that the test directory contains the latest versions of the modules.

If the tests are successful, the PVCS Lead is notified to promote the module to the PROD promotion level. The PVCS Lead checks out and locks the modules that need to be migrated. A trial migration is performed to ensure that everything works as expected. Once this is complete, the modules are promoted from the test directory to the production directory.

If the test is not successful, the modules requiring additional modifications must be demoted to the DEV level. A demotion of the module places it into directory. The PVCS User checks out the module in order to make the required changes. Once the developer completes the modifications, it is checked back in and the PVCS Lead is notified that the module is ready for promotion. The PVCS Lead can then promote the module to the TEST promotion level.

In summary, the roles within the TEST promotion level are:

| Role | Actions |
|---|---|
| PVCS User | Performs tests<br>Notifies the PVCS Lead for promote<br>Notifies the PVCS Lead for demote |
| PVCS Lead | Ensures the latest versions are in TEST<br>Notifies all PVCS Users to perform tests<br>if passed, promote to PROD<br>if failed, demote to DEV |
| PVCS Administrator | None |

Production Level—PROD

The production promotion level (PROD) is the highest promotional level. This level contains modules that are thoroughly tested and ready to be moved into the production environment. When files are migrated to the PROD level, they are placed in the specified working directory a network server.

When a module gets promoted to this level, it is the responsibility of the PVCS Lead to ensure that the production directory contains the latest versions of the modules. If a change is required to a module in PROD, this module must be demoted to the DEV level for further modifications.

In summary, the roles within the PROD promotion level are:

| Role | Actions |
|---|---|
| PVCS User | None |
| PVCS Lead | If change required, demote to DEV<br>Ensures the latest versions in PROD |
| PVCS Administrator | None |

Migration Control Process Roles and Responsibilities

The Development Architecture team identified the three roles for the Migration Control process. These roles are PVCS User, PVCS Lead, and PVCS Administrator. This portion of the description defines each of the roles in relation to the Migration Control process.

PVCS User

Description

The PVCS Users are all of the developers currently assigned to the project. In addition, persons involved in the application design effort should also be considered users as they may be potentially modifying design deliverables and related portion of the present description.

Responsibilities

- Understand the working directories for the Build environment
- Inform PVCS Lead when modules need to be checked in, checked out or promoted
- Communicate issues with the PVCS Lead and PVCS Administrator to ensure that all problems are promptly addressed
- Understand how PVCS controls the development lifecycle.

PVCS Lead

Description

The PVCS Lead is a designated developer who coordinates the migration of modules from development to test and from test to production. The PVCS Lead works with each Cell Lead (lead developer) to determine when the modules are ready to be promoted.

Responsibilities

- Understand the working directories for the Build environment
- Communicate issues with the PVCS Users and PVCS Administrators to ensure that all problems are promptly addressed
- Ensure all modules are controlled by PVCS
- Portion of the present description all unsuccessful migration attempts
- Perform check in, check out, promote and demote functions Describe changes with version labels Ensure modules are compiled as expected PVCS Administrator Description The PVCS Administrator works with the PVCS Lead to ensure that the migration process works as designed. This person is responsible for the installation, configuration, maintenance, and troubleshooting of the PVCS application. The PVCS Administrator portion of the present descriptions the above activities.

Responsibilities

Train PVCS Users and PVCS Leads on the tool

Communicate with the PVCS Users and PVCS Leads to ensure that all problems are promptly addressed Authorize, supervise, coordinate, and implement the actual migration design Test the configuration of the tool Work with the PVCS Leads to portion of the present description all unsuccessful migrations Portion of the present description all practices/lessons learned from the process Be aware of time schedules for critical times (e.g. server maintenance)

Grant appropriate access to PVCS Users and PVCS Leads

PVCS Migration Control Tool Description

PVCS Overview

Intersolv's PVCS Version Manager can be used to implement the migration control process. This product may be referred to as PVCS throughout this portion of the present description. PVCS structures the development environment by providing the ability to access previous versions of the modules, create different releases of development code, and produce reports to track development effort. This portion of the description may highlight key features of the software and specify the software configuration for the UNIX and NT environments.

PVCS Key Features

The main features of PVCS are

Project Organization: PVCS allows project teams to organize files by project.

Logical Views: PVCS provides a facility to create different views of project files without having multiple copies of physical files.

Reverse Delta Management: PVCS keeps one copy of the current file and then stores changes to the files in previous revisions. If an older revision is needed, PVCS backs out changes starting with the current one.

Version Reconstruction: PVCS allows users to assign version labels so that one can identify which revision was used in which release.

Multilevel Security: PVCS allows security by user, group and archive.

Flexible Promotion Models: PVCS enables projects to specify the state that a revision is in within the system lifecycle.

Automatic Audit Trail: PVCS keeps track of the actions that a user performs, and there are numerous reports that can be generated to review this information.

Migration Control Procedures

User Procedures

This portion of the description details the procedures for using the PVCS software. This portion of the description may be used as a reference guide for PVCS Users on the development team.

Definitions

Archive: An archive is the baseline copy of a module. The archive contains all revisions to the module, the names of the authors, the dates of the changes, and the description of the changes.

Project: A project is a logically related set of files under version control. The files all relate to a given system or subsystem.

Workfile: A checked out version of an archive file is a workfile. All modifications are made to workfiles.

Creating Archive Files

An archive file is created in order to track changes to a module or source file.

To create a new archive:

1) Select Project|Open Project
2) Select the files for which one wants to create archives from the files list
3) Choose Actions|Create Archive
4) Choose Options, and select Check In After Creation and Update Project Folder
5) Choose OK To create a new archive file upon check in:

1) Select the files one wants to check in from the Folders or Files list.
2) Select Actions|Check In and click OK
3) When the Create New Archive window appears, select OK to ALL Making Changes to Archive Files Checking a file out of an archive gives the developer access to the file for browsing, editing or testing. If the file is checked out with a lock, PVCS VM may create a new version of the file when it is checked back in. This prevents users from overwriting each other's changes.

To check out a file:

1) Select the folders, files or revisions to be checked out
2) Select Actions|Check Out
3) Select one of the following options, Read only, Writable with Lock, or Writable (recommend Writable with Lock)
4) Choose Options to set additional options for checking out files
5) Choose OK Files are checked in after they have been changed. The file checked out of an archive is called a workfile. Each time it is checked in, it becomes a new revision,. When a file is checked in, the user can also create a version label.

To check in a file:

1) Select the files to be checked in
2) Select Actions|Check In
3) Enter a description of the changes made in the Change Description field 4) Choose Options to set other options for checking in files 5) Choose OK Complete lists of archive and PVCS menu privileges are listed in this portion of the specification. This portion of the specification also describes the archive privileges for PVCS Users and PVCS leads. The archive privilege list shows which users have been granted access to each of the possible activities (e.g. delete revisions, change owners, assign version labels, etc.) The ALL column refers to both PVCS Users and PVCS Leads. If this column contains a "Y", both PVCS Users and PVCS Leads are granted this privilege. If this column contains a "N", both PVCS Users and PVCS Leads are denied this privilege. If the ALL column is blank, then the explicit privileges are noted in the PVCS User or PVCS Lead column.

This portion of the description also describes the menu privileges for the PVCS Users and PVCS Leads. The menu privilege list is similar to the archive privilege list, except that setting up this table in the PVCS configuration controls the actual menu options that are available to all of the PVCS Users. The ALL column refers to PVCS Users, PVCS Leads and guest users. If there is an "N" in the ALL column, none of the listed users have the menu privilege. If there is a "Y" in the ALL column, all listed users have the privilege. An "N" in either the PVCS User, PVCS Lead or guest column indicates the menu privilege is denied (the menu option may not even show up in the list). This portion of the specification summarizes all archive (#A) and menu (#M) privileges for all PVCS Users.

PVCS Privileges

Archive Privileges

Note: default state of all archive privileges is disabled; PVCS Administrator must select a privilege to enable it.

| Base Privilege | Description | All | PVCS User | PVCS Lead |
|---|---|---|---|---|
| AddGroup | Define promotion groups | DO NOT ALLOW/SELECT | | |
| AddVersion | Assign version labels | | Y | Y |
| BreakLock | Unlock someone else's revisions | | | Y |
| ChangeAccessList | Change archive access list | | | Y |
| ChangeComment Delimiter | Change comment prefixes for keywords | DO NOT ALLOW/SELECT | | |
| ChangeOwner | Change archive owners | DO NOT ALLOW/SELECT | | |
| ChangeProtection | Change archive attributes | DO NOT ALLOW/SELECT | | |
| ChangeWorkfileName | Change workfile names | DO NOT ALLOW/SELECT | | |
| DeleteGroup | Delete promotion groups | | | Y |
| DeleteRevNonTip | Delete revisions | DO NOT ALLOW/SELECT | | |
| DeleteRevTip | Delete tip revisions | DO NOT ALLOW/SELECT | | |
| DeleteVersion | Delete version labels | | | Y |
| GetNonTip | Check out non-tip revisions | Y | | |
| GetTip | Check out tip revisions | Y | | |
| InitArchive | Create archives | | | Y |
| LockNonTip | Lock non-tip revisions | | Y | Y |
| LockProject | Lock projects | DO NOT ALLOW/SELECT | | |
| LockTip | Lock tip revisions | | Y | Y |
| ModifyChangeDescriptio n | Modify change descriptions | | Y | Y |
| ModifyGroup | Modify promotion groups | DO NOT ALLOW/SELECT | | |
| ModifyVersion | Modify version labels | Y | | |
| ModifyWorkfileDescripti on | Modify workfile descriptions | | Y | Y |
| Promote | Promote revision | | | Y |
| PutBranch | Check in branch revisions | | Y | Y |
| PutTrunk | Check in trunk revisions | | Y | Y |
| StartBranch | Start branches | | Y | Y |
| Unlock | Remove locks | | | Y |
| ViewAccessDB | View the access control database | Y | | |
| ViewArchiveHeader | View archive header information | Y | | |
| ViewArchiveRev | View delta information | Y | | |

Menu Privileges

Note: default state of all menu privileges is enabled; PVCS Administrator must select a privilege to disable it.

| Menu Item Privileges | All | PVCS User | PVCS Lead |
|---|---|---|---|
| NoActionsArchiveReport | | | |
| NoActionsChangeAttributes | X | | |
| NoActionsCheckIn | | | |
| NoActionsCheckOut | | | |
| NoActionsCreateArchive | | | |
| NoActionsDeleteRevision | | X | |
| NoActionsDifferenceReport | | | |
| NoActionsEdit | | | |
| NoActionsJournalReport | | | |
| NoActionsLock | | X | |
| NoActionsMerge | | X | |
| NoActionsPromotionGroup | | X | |
| NoActionsSQLExport | X | | |
| NoActionsUnlock | | X | |
| NoActionsVersionLabel | | | |
| NoFileCopy | | | |
| NoFileCreateDirectory | | | |
| NoFileDelete | | | |
| NoFileExit | | | |
| NoFileMoveRename | | | |
| NoFolderChangeFolder | X | | |

-continued

| Menu Item Privileges | All | PVCS User | PVCS Lead |
|---|---|---|---|
| NoFolderChangeFolderMembers | | | |
| NoFolderChangeWorkfileDir | X | | |
| NoFolderCopyFolderMembers | | | |
| NoFolderDeleteFolder | X | | |
| NoFolderNewFolder | X | | |
| NoFolderUpdateProjectFolder | | | |
| NoHelpAboutVersionManager | | | |
| NoHelpContents | | | |
| NoHelpGuidedTour | | | |
| NoHelpNew | | | |
| NoHelpSampleProject | | | |
| NoHelpSearch | | | |
| NoHelpUsingHelp | | | |
| NoOptionsAssignPrivileges | X | | |
| NoOptionsDataFileLocations | X | | |
| NoOptionsDefinePrivileges | X | | |
| NoOptionsDifferenceDisplay | | | |
| NoOptionsEditor | X | | |
| NoOptionsGroups | X | | |
| NoOptionsLogin | X | | |
| NoOptionsPreferences | | | |
| NoOptionsSecurity | X | | |
| NoOptionsToolbar | | | |
| NoOptionsUsers | X | | |
| NoProjectCloseProject | | | |
| NoProjectConfigureProject | X | | |
| NoProjectCopyProject | X | | |
| NoProjectDeleteProject | X | | |
| NoProjectLockProject | X | | |
| NoProjectNewProject | X | | |
| NoProjectOpenProject | | | |
| NoProjectUnlockProject | X | | |
| NoViewFileDetails | | | |
| NoViewFolderDetails | | | |
| NoViewLockedFiles | | | |
| NoViewModifiedFiles | | | |
| NoViewRefresh | | | |
| NoViewSortFilesBy | | | |
| NoWindowNewWindow | N | | |

User Privileges

| User Name | Privileges |
|---|---|
| PVCS User | #A_ALL, #A_DEV, #M_ALL, #M_DEV |
| PVCS Lead | #A_ALL, #A_LEAD, #M_ALL, #M_LEAD |

Summary

Software Configuration Management (SCM) is the process of identifying and maintaining work products throughout the entire life cycle of a project. SCM key objectives are to coordinate and record decisions, actions, and approvals to ensure the following:

Changes to software products are controlled and traceable Changes to software products are communicated to the affected groups Current status of any given software product or unit is readily available Configuration management is achieved through the identification, control, and audit of all project work products. The Program direction is for all projects to create and implement Software Configuration Management plans early in the project life cycle (e.g. during Project Study) and revisit them periodically during the development effort. At a minimum, the following work products should be under SCM control on every project:

design and test portion of the present description standards and procedures database components architecture components application components The value of establishing a solid configuration management plan may be visible in the many areas it may impact. These areas include: increased accuracy of project delivery dates, improved product quality, reduced time to market, project performance visibility, and increased ease of project transitions.

This portion of the present description may detail the steps required to implement an effective, best practice approach for managing the configuration of a project.

Configuration Management Purpose and Objectives

The purpose of Configuration Management (CM) is to establish and maintain the integrity of the components of an application throughout the project's life cycle. This includes:

Comprehensively assessing and evaluating changes to a system after requirements have been agreed upon and commitments established.

Ensuring that approved changes are communicated, updated, verified and implemented properly.

Coordinate the project's day-to-day activities and avoid conflicting actions by controlling access to code and repositories.

Who is involved with Configuration Management

Configuration Management process interfaces extensively with all phases of the project life cycle, and as a result, project teams may participate in CM activities.

CM Responsibilities

| | |
|---|---|
| Support Center/Operations | maintain system baselines |
| | approve and implement changes to that baseline |
| Technicnal Support | establish the version repositories |
| | define packaging and installation procedures |
| | assist in migration activities |
| | maintain inventory lists |
| Architecture | maintain architecture baselines |
| | approve and implement changes to that baseline |
| Development | migrate components on all platforms |
| | maintain inventory lists |

-continued

| | |
|---|---|
| Test | migrate components on all platforms<br>maintain inventory lists |
| Implementation | migrate components on all platforms<br>maintain inventory lists |
| Program Management | periodically review CM activities and identify CM improvements<br>periodically review individual projects for compliance with program CM process<br>periodically review and recommend improvements to the program CM process |
| Team Leads | ensure that CM activities are being performed<br>adhere to CM guidelines |
| Functional Lead | move deliverables to the final folder<br>adhere to CM guidelines |
| Project Manager | ensure that CM Plans are created for each project |

Linking CM to a Software Life Cycle

How and when CM is performed may vary depending on the development life cycle and methodology selected for the project. During the Design Phase of the life cycle, a Project (CM) plan is created. This plan may be revisited and renewed at each subsequent phase of the life cycle. This Project CM plan may also include support activities detailing procedures for maintenance of the system until the next release.

Project Configuration Management (SCM) Plan

Once requirements and commitments are established for a project, all changes need to be formally processed and controlled. Upon turnover of the system to production, the support procedures defined in the Project CM plan may be followed.

A project's CM Plan formally portion of the present descriptions all sub processes of CM which include the following:

The baselines from which changes are controlled and communicated to all parties involved; and a listing of the units to be placed under configuration management.

A plan for establishing and controlling project repositories.

A change control process to track modifications to the baselines.

A security profile for each role on the project to control access.

Status reporting and continuous improvement activities.

Training plans to ensure all parties are prepared to perform their SCM tasks.

Process Flow

Figure 94:
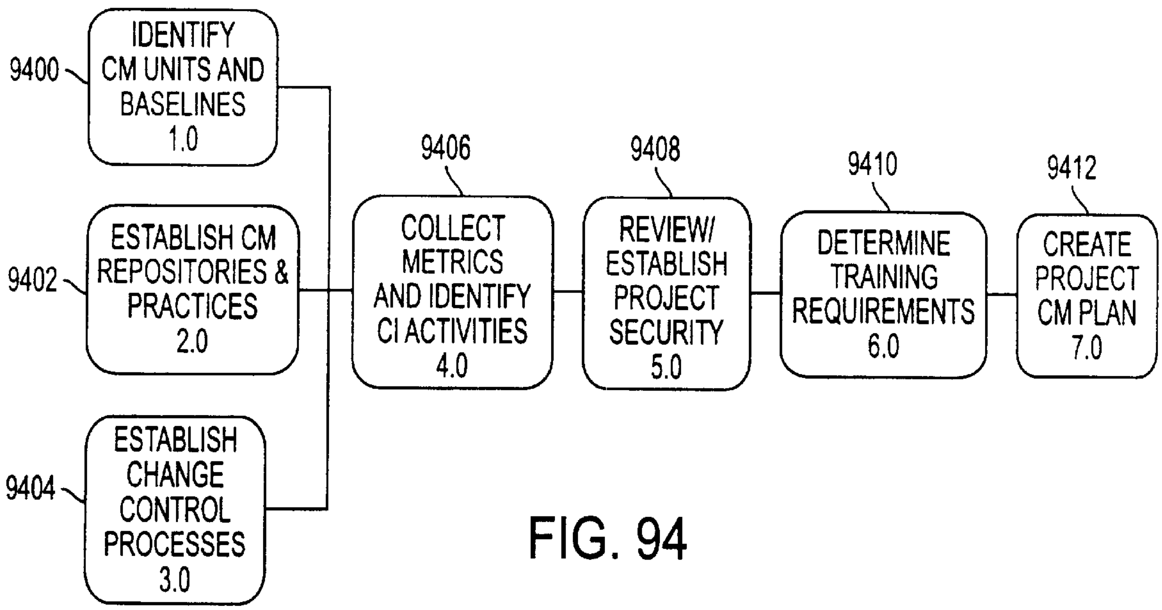
FIG. 94 illustrates SCM Planning, according to an embodiment of the present invention.

FIG. 94 illustrates SCM Planning.

Major Sub-Processes of Configuration Management

Identify CM Units & Baselines 9400

The first step is to identify the CM units that may be put under CM and their baselines, then a project can determine the amount of control to be placed on the project environment. All identified units may be formally reviewed, utilized for enhancements, and changed only through the established CM process.

Establish CM Repositories & Practices 9402

Establish version repositories and mechanisms for controlling development and production work products such as code and portion of the present description.

Identify Change Control 9404

Define the process for evaluating, approving, coordinating, and implementing change requests.

Collect Metrics & Identify Continuous Improvement Activities 9406

Track and report the status of changes and versions. It also defines the internal project review processes for identifying continuous improvement efforts and for maintaining the integrity of the work products.

Review/Establish Project Security 9408

CM does not specify security requirements; however, it does require that portion of the present descriptioned practices exist for controlling changes. For more complex environments, security principles may need to be more rigorous than just portion of the present descriptioned procedures.

Determine Training Requirements 9410

Identify the training needs for individuals performing CM tasks, as well as individuals involved in defining the CM processes.

Create Project CM Plan 9412

The Project CM plan is a guide for performing Configuration Management activities throughout the life cycle of a project.

Identify CM Units & Baselines

Purpose

"Identify Configuration Management (CM) Units and Baselines" defines the activities for turning functional requirements into individual components of the system. The output of "Identify CM Units & Baselines" is to establish the baselines from which all new software products may be created and to identify all new software products along with its components or configuration units. These activities ensure that all project team members have the same perspective on the project starting point.

Process Flow

Figure 95:
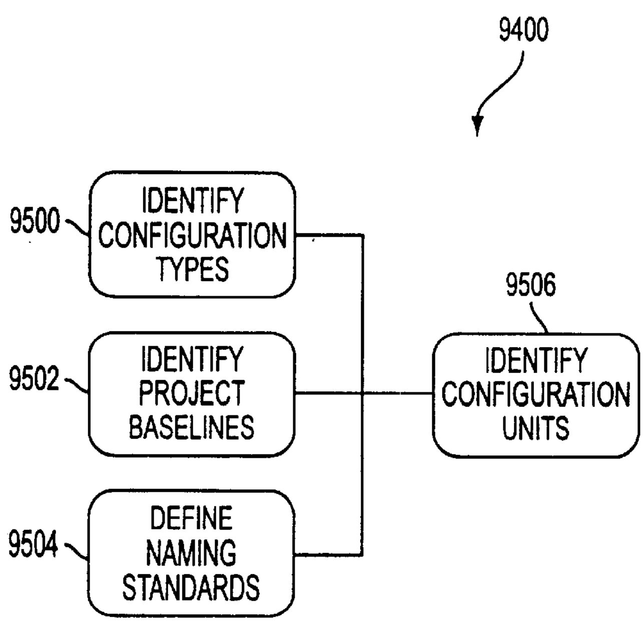
FIG. 95 illustrates an Identify CM U nits & Baselines Process Flow according to an embodiment of the present invention.

FIG. 95 illustrates an Identify CM Units & Baselines Process Flow

Entry Criteria

"Identify CM Items and Baselines" 9400 (see FIG. 94) requires that:

System requirements have been defined (e.g. platform, technologies, etc.).

The project life cycle has been defined (e.g. test phases: AT, PT, etc.).

The project plan has been developed and project milestones established

A conceptual design that defines the system has been or is being developed.

Exit Criteria

Completion of "Identify CM Units & Baselines" is accomplished when all CM types and units have been identified and signed off.

Roles and Responsibilities

The Development team has primary responsibility of identifying the CM units and baselines. The Technical Support and Architecture teams can be consulted to ensure the list is complete.

Task Description

Identifying Configuration Types 9500

"Identify CM Units & Baselines" lists each component of the project that may be created, deleted, or otherwise modified. Along with identifying the configuration units, each unit type needs to have an associated promotion and migration procedure. At a minimum, the following types must be addressed on each project: design and test portion of the present description, database components, architecture components, and application components.

A configuration unit is any object that is subject to reviews, deadlines, and/or utilized by multiple teams. These units should be classified by "type". For example, a set of batch programs could have 2 different "types": C programs and header files. Configuration types need to be defined in detail allowing changes to be planned, recorded, and verified. The CM plan should detail the review and migration process for each configuration type.

Identify Baselines 9502

The baseline is the foundation for configuration management. It provides the official standard on which subsequent work is based and to which authorized changes are made. After an initial baseline is established and frozen, every subsequent change is recorded as a change until the next baseline is set. This program has defined its baselines to be the testing environments used on the project.

Procedure

The initial establishment of each baseline represents the first point where those units may be formally brought under CM. A baseline is an agreed upon point of departure usually established at the end of a major project phase (i.e., after design), after which all changes must be controlled. Formal baselines should be planned and subsequently established for the end of each major project phase. This point should be selected as appropriate for each project and its development life cycle.

For a development project, the following baselines should be established. Establishing each baseline is a progressive process that should not overlap. On occasion, a prior baseline may need to be updated, but not without updating the remaining baselines.

The definition baseline—the software requirements portion of the present description ("Scope").

The tech and detailed design baseline—the completed software design.

The system software component baseline—the delivered system software

Software component baselines are established following each stage:

The code and component test baseline—the software components that have completed coding and component test on which assembly testing may be conducted.

The assembly test baseline—the software system that has been verified through assembly test and is ready for client acceptance test.

The implementation/production baseline—the delivered software to which modification, correction and enhancements are made.

* This program has defined baselines to be the different testing environments used in development projects: Component Test (CT), Assembly Test (AT), Product Test (PT), Training (TR), Production (PR), and Production Support (Supp). These stages also correspond with the program deliverables, and are portion of the present descriptioned in the project plan.

Baseline Portion of the Present Description

Each baseline established by a project may be formally portion of the present descriptioned. Additionally, all baseline portion of the present descriptions may be formally controlled at the point at which the baseline is implemented.

A baseline portion of the present description contains a listing of the CM units. The portion of the present description may be prepared as a written portion of the present description or as a byproduct of a tool.

Establish Configuration Type Naming Standards 9504

All CM units should be uniquely identifiable. Individual projects may define a project identifier to be used for all project defined naming standards. Naming standards allow multiple development efforts to coexist in a shared development environment. Each project may use naming standards for each type of configuration unit to be placed in a repository. If the predefined naming standards are not applicable to a particular project, then specific naming standards need to be portion of the present descriptioned in the Project CM Plan.

Identifying Configuration Units 9506

Configuration units should be identified when creating the Project CM Plan. A conceptual design of the system that defines the major system elements (hardware, software, database, etc.) is used to determine what units may be identified. All units following the CM processes need to be added to the Installation Kit Inventory deliverable. Any object that is modified due to a change request is considered a configuration unit, and should be tracked in the Installation Kit Inventory.

The configuration unit's definition may allow adequate assessment and portion of the present description of impact prior to implementation or update of the baseline. Each configuration unit should have the following characteristics:

A Unique Name

Modification Log

Release Affiliation

Critical Success Factors

Appropriate baselines are identified and scheduled.

A complete list of CM types and units is produced

Deliverables

Defined Software Configuration Units

Installation Kit Inventory

CM Measures

CM Types per Platform

CM Units per Project

Establish CM Repositories & Practices 9402 (FIG. 94)

Purpose

"Establish CM Repositories & Practices" involves the creation and management of repositories used to store and control objects. The primary purpose for establishing and managing multiple CM repositories is to enable a project team to be at different stages of the life cycle. Controlling these repositories ensures that data, code and portion of the present description are not inadvertently changed or moved.

Process Flow

Figure 96:
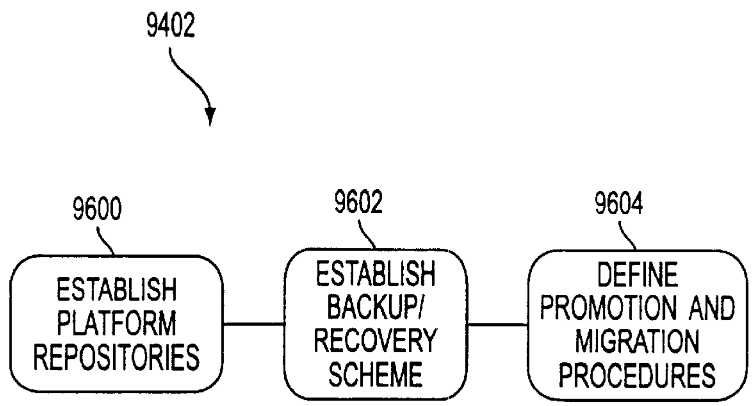
FIG. 96 illustrates a manner in which CM Repositories and Practices Process Flow are established according to an embodiment of the present invention.

FIG. 96 illustrates a manner in which CM Repositories and Practices Process Flow are established.

Entry Criteria

"Establish CM Repositories & Practices" begins after baselines have been established and before the first objects have been created or modified. This is done in accordance to the project plan and schedule.

Exit Criteria

"Establish CM Repositories & Practices" is performed throughout the project's life-cycle.

Roles and Responsibilities

The Architecture team has primary responsibility of establishing the standard set of development tools for a given platform—which includes repository software and version control tools.

The Technical Support team ensures that the project teams' development environment has been set up correctly, defines migration/promotion processes and resolves problems related to that, creates database environment for the project, and performs tests to ensure that the tools are functioning properly in the environment.

The Development team is responsible for making changes to the repository using the version control tools provided and processes defined by the Tech Support team.

The Test and Implementation teams are responsible for understanding the repository structure and migration processes defined by Tech Support. In addition, the Implementation team is responsible for creating the release notice.

All teams are responsible for ensuring that team members are trained on the processes and tools used for version control.

Task Description

Establish Repository Structure 9600 (FIG. 96)

A repository is used to store and control the access to units while maintaining their integrity. A project should be able to retrieve any configuration unit upon demand in order to verify its contents. Additionally, repository security mechanisms should be enacted to avoid unauthorized changes.

Procedure

Repositories must be established for each project to control all baseline configuration units. The repository structure for a project shall be portion of the present descriptioned in its respective Project CM Plan. At a minimum, the repositories shall have these features:

The system chosen for the repository should have a security mechanism to control access to objects.

The system must permit each configuration unit to be individually identified, and controlled.

The system should control and track changes made to individual units.

The system should retain information allowing historical reports to be generated The system should be able to produce a listing of all units contained in the repository CM Repository Backups 9602

Repository backups provide safeguards against hardware failures and provides an option of last resort for the retrevial of lost or corrupted objects. The frequency of backups should be determined during SCM Planning.

Defects or faults found in the production environment need to be corrected as quickly as possible. In some cases the problem found in production requires production to be reverted back to a prior release(wholly or in part). When determining which scheme is best for your project, the following characteristics should be considered:

size of the application
cost of space
criticality of application
complexity of application
platform technical capabilities
existing backup schedule
release schedule
number of interfaces Define Promotion and Migration Procedures 9604

Procedure

Since most projects may contain multiple environments, it is important to understand how software products are moved from one environment to another within that project. It is critical for the Project CM Plan to portion of the present description the standard flow of configuration units through the project environments. The procedures need to be specifically defined and roles and responsibilities need to be clearly stated. The following terms may define the different steps involved in moving objects from one environment to the next:

Promotion—A promotion is defined as the movement of objects from one phase to the next, it may only signify movement within the repository Migration—The physical movement of a kit/package from one environment to another Kit Build—The process of packaging the CM units so that they can be migrated to another environment.

Kit Installation—The process of unpackaging the CM units and establishing required environment settings.

Versioning of Configuration Units

Through out the development life cycle, multiple versions of each Configuration unit may be created. Taking this into consideration, it is necessary to portion of the present description in the Project CM Plan, the version control used for the project. Multiple versions of CM Units can result from:

Multiple Projects modifying code.

Shared Services supported across all projects.

Different testing and production environments.

Standard Migration Paths

The V-Model testing approach defines several testing environments. Based on this testing model, the program has defined the following standard migration paths.

Component Test→Assembly Test*

Assembly Test→Product Test*

Product Test→Operational Readiness Test

Product Test or ORT→Production*

Production→Production Support

Less complex systems, as well as extremely large systems, may not utilize all levels of testing. Projects should utilize at least the three base migration levels: Assembly Test, Product Test, and Production.

Notification

When software products are moved from one environment to another it is important that the impacted parties receive sufficient notification. The vehicle used to deliver notification may vary across projects so it is necessary to portion of the present description in the Project CM plan how notification may occur. A release represents a move to another phase, such as a group of changes migrating to production. A release notice should be used for any modifications to configuration units or for the creation of new configuration units. The release notice should include a list of all identified problems and change requests that are being closed (i.e. changes being delivered) as part of this release; and should be created prior to migration to production.

Critical Success Factors

Appropriate repositories defined for size of project.

CM units can be versioned and adequately controlled.

Standard Control Process is used on the project.

Access is controlled to appropriate repositories.

Authorizer for creating a baseline is identified.

The process for packaging, migrating, and installing is defined and portion of the present descriptioned.

Deliverables

Repository Structure, Migration and Promotion Procedures, Packaging Procedures.

Measures

Repeat promotions per environment

Versions per Configuration Unit

Establish Change Control Process 9404 (FIG. 94)

Purpose

"Establish Change Control Process" is the activity for reaching decisions on requested changes, and implementing the changes in production. The purpose of this sub process is to create a group of representatives from within the project to review and accept changes. This ensures that all views are considered in making decisions that may impact many areas.

Process Flow

Figure 97:
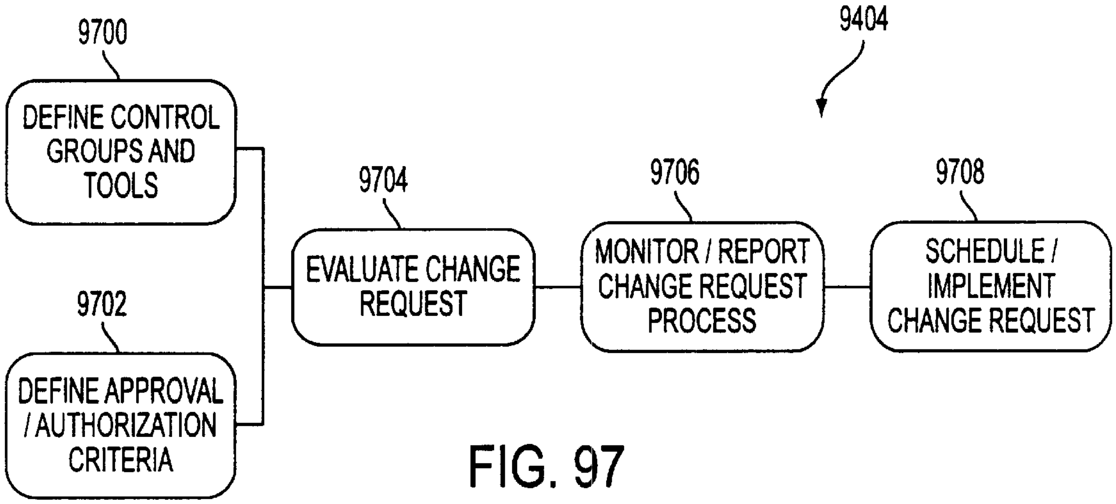
FIG. 97 illustrates the Establish Change Control Process according to an embodiment of the present invention.

FIG. 97 illustrates the Establish Change Control Process.

Entry Criteria

"Establish Change Control Process" begins when the CM Unit portion of the Project Plan has been created and approved, the first formal baseline is established, and the configuration units and components have been identified.

Exit Criteria

"Establish Change Control Process" is performed throughout the life cycle of a project.

Roles and Responsibilities

Incidents defined as change requests can be reported from any environment and require the review and approval of project and business partners. Changes include specifications/design errors, enhancement requests, change baseline and schedule, etc.

The established control group may be responsible for recovery and authorizing change request, monitoring and reporting progress, and ensuring the change is implemented in all affected environment.

Task Description

Define Control Groups 9700 (FIG. 97)

Procedure

A Control Group has the authority to approve/disapprove all change actions. The Control Group meets to discuss and decide upon changes affecting system capability, cost, schedule, resources, and interfaces. This group should be involved in scheduling installation dates.

Participants

The members of the Control Group could include representatives from each group, organization, or function affected by the project. The membership may vary depending on the project and the configuration units.

Control Configuration Group's members can include membership representatives from:

Program Management

Team Leads

Functional Leads

Users

SME's(Subject Matter Experts)

Participant Duties

Members shall attend meetings, review change request, and perform follow-up activities as necessary. The members shall review and approve changes including specification/design errors, enhancement requests, change baseline and schedule, etc.

Meetings and Agendas 9702

During a Change Request evaluation meeting the following topics should be addressed by the Change Control group:

Reason for the change

Impact Analysis of Change Request.

Alternative Solutions.

Estimated cost

Perceived value

Approve/Disapprove Change Requests 9704

Procedure

Once the change request has been analyzed, a decision must be reached by the Control Group to approve, defer, or disapprove the work involved. All decisions shall be reached by consensus.

Track and Implement Change Request

Track Change Request 9706

Change requests should be recorded and tracked from initiation through closure. Change requests may remain "active" until it is closed by being implemented in all environments or due to being disapproved and withdrawn. Recording the change request along with key information may enable the project team to keep track of the request, and help the project team to determine improvement areas to the overall change request process.

For each change request, the following information should be maintained:

unique change request
change request initiator
change request responsible person
number request open date
change request description
request closed date Implement Change Request 9708

Once a change request has been approved, the project team may develop a plan for implementation. Depending on the scope and current phase of the project, the change may be integrated into current development activities or be added to the project schedule of upcoming enhancements.

Approved changes, whether to a development or production system, should undergo the following:

The change implementation must be planned, scheduled/rescheduled, and the workplan updated.

The change is assigned to one ore more individuals.

New requirements are updated in existing requirements portion of the present description.

Design modifications are portion of the present descriptioned.

Inventory lists are updated.

Critical Success Factors

The necessary information to make decision is available during the change request's evaluation.

Control Groups are formally established for each project.

The Control Group assigns actionable items with due dates.

Communication channels to other Control Groups are established.

Control Groups are trained in the process and their roles.

Meetings are held frequently during the development phase of the project.

Deliverables

Define Control Group, Define frequency of review meetings

Measures

Numbers of change request opened, closed, rejected

Time to close each change request

Collect Metrics & Identify Continuous Improvement Activities

Purpose

"Collect Metrics & Identify Continuous Improvement (CI) Activities" are the activities for tracking and reporting CM status The purpose is to communicate to all project management the timely status of CM activities and change requests, and to ensure the integrity of the configuration.

Process Flow

Figure 98:
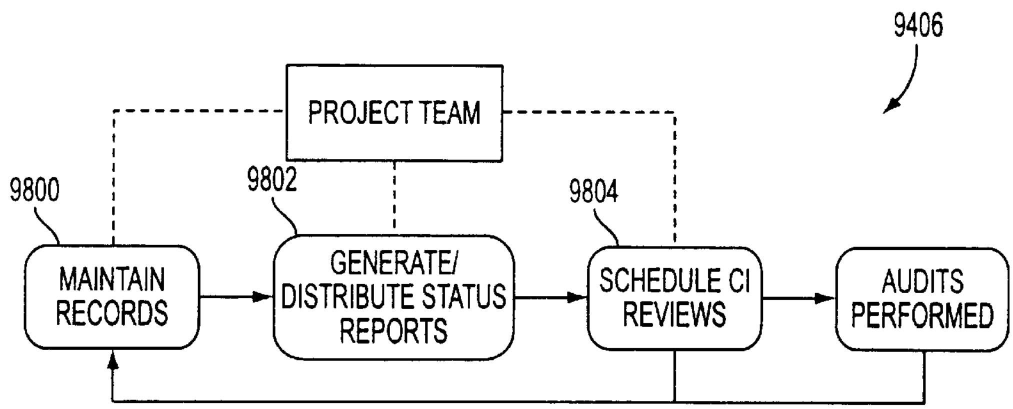
FIG. 98 illustrates Collect Metrics and Identify CI Activities according to an embodiment of the present invention.

FIG. 98 illustrates Collect Metrics and Identify CI Activities 9406

Entry Criteria

"Collect Metrics & Identify CI Activities" begins when the initial baseline configuration is established—which is usually at the completion of the requirements definition.

Exit Criteria

"Collect Metrics & Identify CI Activities" is performed throughout the system's life cycle.

Role and Responsibilities

Project Management may work with the other projects'teams to gather statistics in order to create and provide status reports. The reports should supply statistical information in order to identify potential areas for improvement.

Task Description

Maintain Records 9800

Procedure

The project teams may collect metrics on the activities of each project. These metrics may be available to process leaders to track status on each project, and to ensure compliance with Configuration Management processes. Compliance may be ensured through independent or self directed audits.

Generate and Distribute Status Reports 9802

Procedure

CI Review may be scheduled on a regular basis as part of the Project CM Plan. The Program Manager may lead and facilitate the review meetings to assist the project team in gathering historical data to help assess the rate, causes and impact of changes. The content and format should be outlined in the Project CM Plan for the project. At a minimum, reports should be generated at the completion of each base migration level.

Reports should contain the following types of information:

Summary report of Change Requests by status and description.

Specific Change Requests contained in each software version.

Change history review of each configuration unit.

A description of each configuration unit defined by its current release version.

Change logs that show the history of releases and changes made to source files.

Number of defects due to migration errors

Continuous Improvement Review 9804

Procedure

A Continuous Improvement Review is an inspection conducted by the project team to verify the completeness, consistency and interdependencies of products. The reviews are a means by which the organization can ensure that the development has been completed in ways that satisfies all client expectations, and should be performed after a final release has been delivered to identify improvement areas prior to beginning work on the next release. The reviews can vary in form and formality.

The review should include the following:

All closed change requests have been incorporated in portion of the present description and objects.

Change requests or problem reports that remain open are clearly identified so they can be closed during the next phase.

Metrics reviews in order to identify other areas for improvement.

General conversation about the flow of the project (e.g. procedures and problems encountered)

Critical Success Factors

Change Request log is current.

Frequency of status reports is established.

Appropriate individuals receive status reports.

Status reports are current and accurate.

Periodic Continuous Improvement Reviews are scheduled

Deliverables

Status Reports, Metrics, CI Review Results, Scheduled CI Reviews

Measures

Number of defects for project

Number of defects for project due to migration errors

Number open, closed, deferred, rejected change request

Review/Establish Project Security 9408 (FIG. 94)

Purpose

"Review/Establish Project Security" is an activity to ensure that CM progress does not interfere or counteract established security and audit policies. CM requires control of configuration units. This does not require security controls to be placed on all configuration units, but does require the existence of procedures to govern the access to these units.

Process Flow

Figure 99:
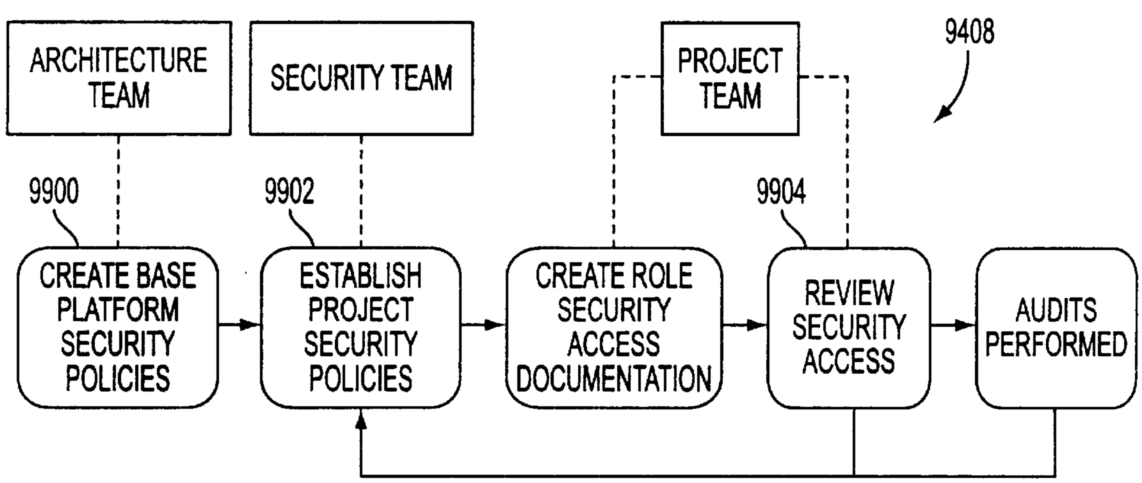
FIG. 99 illustrates the Review/Establish Project Security according to an embodiment of the present invention.

FIG. 99 illustrates the Review/Establish Project Security.

Entry Criteria

"Review/Establish Project Security" begins when the initial baseline configuration is established, which is usually at the completion of the requirements definition.

Exit Criteria

"Review/Establish Project Security" is performed throughout the system's life.

Role and Responsibilities

The primary responsibility for establishing configuration unit security may be the responsibility of the Security and Technical Support teams. During the initial set up of a technical platform 9900, the Architecture team should establish the initial security and access procedures and practices. Once the base platform is established, the Security and Technical Support teams may further define the security rules 9902 in conjunction with the individual project/application requirements and company policies.

Task Description

Verify Security Practices

Procedure

Each application team should maintain security portion of the present description listing access required per each team role. This portion of the present description should be reviewed 9904 periodically with the Security team to ensure security policies are consistent with the current business practices. This security portion of the present description should be utilized for establishing all new accounts. As part of this review, project applications and systems should be checked to verify that current security access is granted only for team members whose business functions require it.

Critical Success Factors

Business rules governing security access are portion of the present description.

Company policies are followed.

Deliverables

Role Access Requirements, Scheduled security reviews, Project CM Plan

Measures

Unauthorized changes due to inadequate policies or security

Lost time due to access problems

Number of defects due to access problems

Security change requests per project

Determine Training Requirements 9410 (FIG. 94)

Purpose

"Determine Training Requirements" is the activity to determine the skills that may be required by project team members throughout the project. Once the skills have been identified, training needs can be addressed. By identifying training needs ahead of time, the project team can schedule required training at the optimal time for the project.

Process Flow

Figure 100:
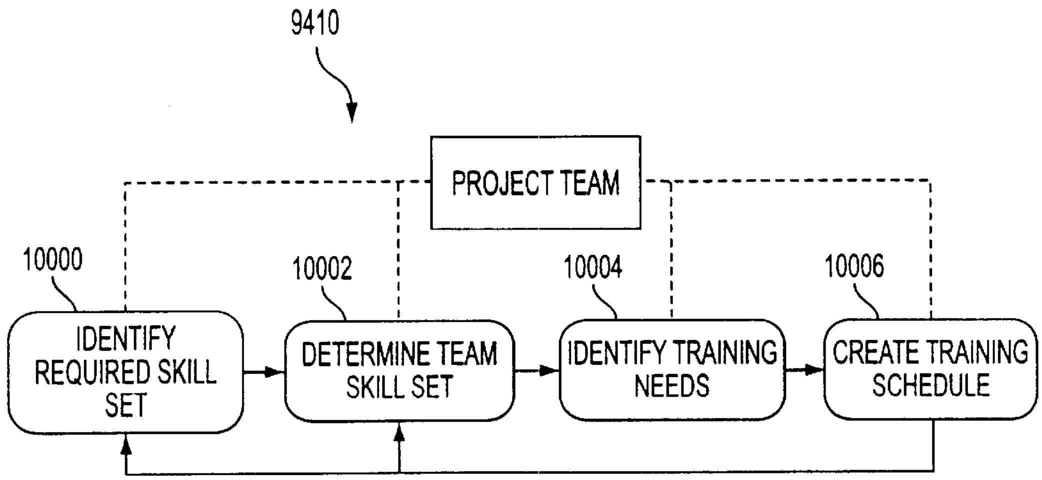
FIG. 100 illustrates the Determine Training Requirements according to an embodiment of the present invention.

FIG. 100 illustrates the Determine Training Requirements.

Entry Criteria

"Determine Training, Requirements" should initially be performed in conjunction with the project plan. cl Exit Criteria "Determine Training Requirements" may be an activity that is performed throughout the project life-cycle.

Roles and Responsibilities

The project team leads may be responsible for defining required skill sets 10000,10002 as well as project training needs 10004 and making sure that team members are scheduled for training appropriately 10006.

Task Description

The task of "Determine Training Requirements" is an activity performed by each of the project team leaders. They may be responsible for defining the gaps between current team skills and the skills required given the upcoming project.

Critical Success Factors

Training needs are consistent with project tasks

Training needs are identified

Deliverables

Project Team Training Plan

CM Measures

Total training hours

Create Project CM Plan 9412 (FIG. 94)

Purpose

"Create Project CM Plan" is the activity that ties all of the CM activities together. The Project CM plan is a procedure guideline for performing CM activities throughout the life-cycle of a project.

Process Flow

Figure 101:
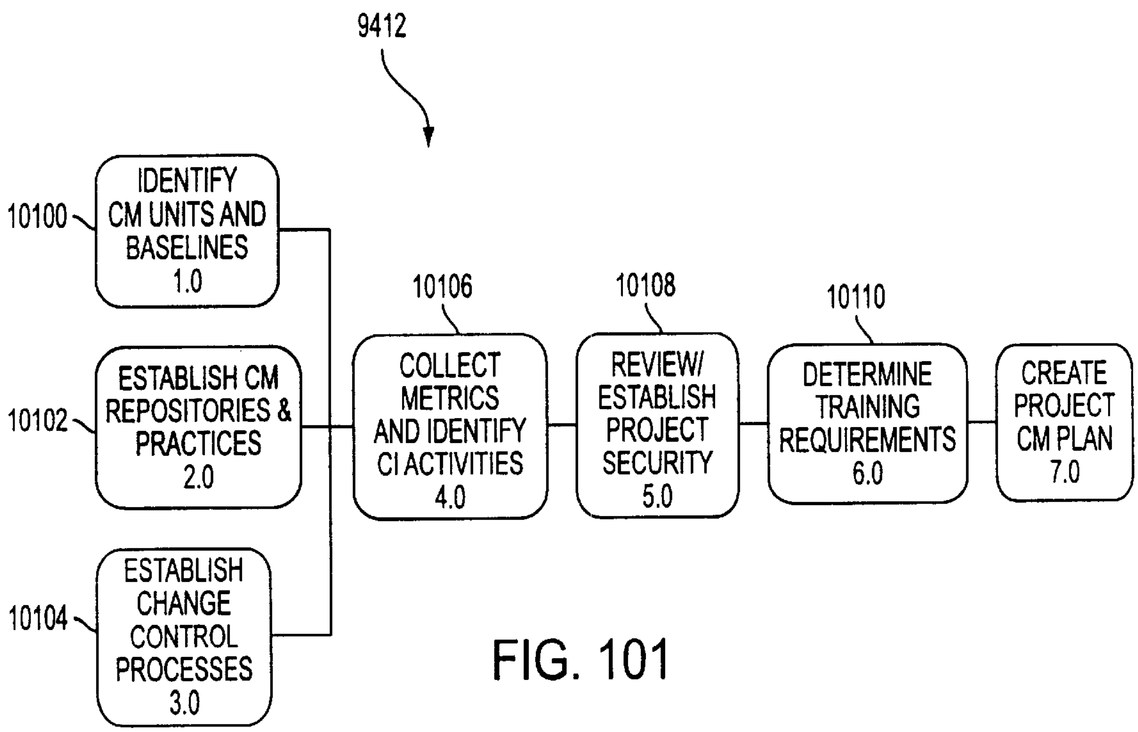
FIG. 101 illustrates the Create Project CM Plan according to an embodiment of the present invention.

FIG. 101 illustrates the Create Project CM Plan.

Entry Criteria

"Create Project CM Plan" can not be performed until the previous six steps have been completed.

Exit Criteria

Completion of "Create Project CM Plan" is accomplished when the Project CM plan is delivered to the project management personnel, and signed off by all affected teams.

Roles and Responsibilities

All project teams should actively participate in creating the Project CM Plan. Each team should review and approve the Project CM Plan prior to beginning the next methodology phase.

Task Description

The task of "Create Project CM Plan" is an activity of utilizing the Project CM Plan template in the Program Methodology and tailoring to produce a CM Plan for that project's application. A Project CM Plan contains the details on how CM activities may be performed for the duration of the project. The creation of the Project CM Plan is a joint effort between all project teams, with management responsibilities falling to the Project Manager.

Generate Project CM Plan

Procedure

Generating the Project CM Plan involves performing the activities defined in the following sub-processes:

Identify CM Units & Baselines 10100

Establish CM Repositories & Practices 10102

Establish Change Control Processes 10104

Collect Metrics & Identify CI Activities 10106

Review/Establish Project Security 10108

Determine Training Requirements 10110

These activities may assist in formally portion of the present descriptioning the project's CM practices. The Project CM Plan is then reviewed by the Project Management team. Once the Project CM Plan has been signed off, it becomes a part of the overall project plan.

At a minimum, a Project CM Plan should contain information on the following:

Definition of Configuration Units Types

Baselines that may be established

Unit unique naming standards

Method for processing Change Requests

Both System and Application repositories to be established and how they may be controlled CM related roles, responsibilities, and resources Definition of how objects are promoted/migrated between different environments Checkpoint meetings for project status and continuous improvement Critical Success Factors The Project CM Plan should be written in terms familiar with its users.

All roles and responsibilities defined in the Project CM Plan shall be assigned.

All activities defined shall have resources identified to accomplish the activities.

Project members understand and are trained to perform their CM role.

Deliverables

Project Configuration Management (CM) Plan

CM Measures

Actual vs. Estimated time to create the Project CM Plan

Number of CM Plans created vs. Number of projects

Naming Standard Requirement

Each Unit should follow a portion of the present descriptioned naming standard.

This standard should maintain a unique name for each configuration unit and should enable operations personnel to determine the project the unit is associated with as well as the responsible personnel for production problems.

Modification Log

Each unit must have a modification log. The log must contain at a minimum the last change description, who made the change and when the change was made.

* Note—this does apply to all deliverables defined by the program and includes portion of the present description.

Release Affiliation

Each unit should identify the release under which it was created. As modifications are made for new releases, the release should be changed and noted in the modification log.

A repository is a physical or logical space that contains a group of objects. These object may be referred to as units, a units is any portion of the present description, program, report, or deliverable that follows the Project Configuration Management Plan. Repositories in general have similar characteristics. This portion of the present descriptions details the program requirements for all software repositories.

Unit Controls

Unit History

Reporting

Unit Control

| Unit Control | |
|---|---|
| Unit Security | A software repository should have some level of security to prevent non-authorized users from changing units. |
| Check-Out | A software repository should allow units to be checked-out, once a unit is checked-out, the unit should be flagged so that other users may know who is currently working on the unit. |
| Check-In | A software repository should allow units to be entered into the library, either for the first time, or as updates are made to the unit. For each "check-in" the repository should maintain information on who checked the unit in, when they checked it in, and allow for a description identifying the reason for updating or inserting into the library. |
| Repository Security | A software repository should have security to prevent anyone from changing units without following the "check-out" and "check-in" procedures. |
| Versioning | A software repository should maintain the last three versions of any unit. |
| History | A software repository should maintain the change history for the last?? months. This history needs to minimally contain the description of the change, who made the change and when the change was made. |

Reporting

| Reporting | |
|---|---|
| Unit Report | A software repository should be able to create a report listing the unit history for given period of time. The report should contain the description of the change, who made the change and when the change was made. |
| Repository Report | A software repository should be able to create a report listing all units contained in the repository and their current status. The status of an element would include, the latest version, either by number and/or date, and a description of the last change. |

Option 1—Mirrored Production Environment

Figure 102:
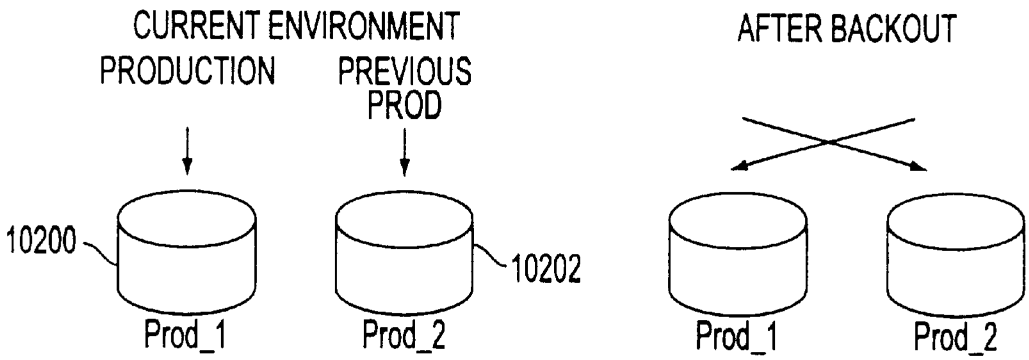
FIG. 102 shows the Manage CM Repository Process Flow according to an embodiment of the present invention.

| Permanent Staging/Backout Environment | |
|---|---|
| Description | FIG. 102 shows the Manage CM Repository Process Flow. Option 1 requires 2 production environments. One enviromnent 10200 would be set to production while the other 10202 would be the previous production environment. When backout is required, the previous production is set to current production and the other environment is then available for the next release to stage. |
| Where Applicable | Option 1 makes performing a backout very quick and easy. However, it is also costly from a space and time perspective. Double the space is required since virtually two production environments are maintained. Option 1 requires more organization so that the status of each environment is known. This solution is encouraged for project with the following characteristics.<br>24 × 7 supported applications<br>large/complex applications<br>applications with a frequent release schedule<br>applications with numerous interfaces |

Option 2—Copy of the Production Environment

| Maintain Temporary Copy of Previous Production Environment | |
|---|---|
| Description | Option 2 maintains a copy of the previous production environment for a specified period of time. This solution is similar to Option 1, with the exception that the copy does not have to be physically located on the production server and can be compressed or formatted differently to minimize space requirements as long as it can be restored back into the production environment. Prior to installing a release into production, a backup of the production environment is created. The backup may or may not be stored on the production machine. When a backout is required, the current copy of production is replaced with the backup copy. |
| Where Applicable | Option 2 is a less costly solution in comparison to Option 1. It may require more time to recover from the backup. This solution would be sufficient for applications with the following characteristics:<br>non 24 × 7 supported applications<br>systems with few interfaces<br>systems with an infrequent release schedule |

Option 3—Maintain Prior Release Copies

| Maintaining Old Releases | |
|---|---|
| Description | Option 3 requires the system to keep copies of prior releases. More complex systems with more frequent releases should keep copies of multiple releases, simple systems may only require one. When a backout is required, the prior version is installed into production, thus overwriting the corrupted release's changes.<br>Caution must be taken for new additions to the environment, if the environment is not cleaned prior to "reinstalling" new modules may need to be deleted. |
| Where Applicable | Option 3 is the very time intensive. This solution is a less costly solution in comparison to Option 1. It may require more time to recover from the backup. This solution would be sufficient for applications with the following characteristics:<br>non 24 × 7 supported applications<br>simple systems<br>complex systems with simple and discrete subsystems<br>systems where release are a complete subsystem replacement |

New Development/New Release Migration Process

| | |
|---|---|
| Platform Information | |
| Platform Type | All |
| Description | Migration from Component Test to Assembly Test occurs when the Development team successfully completes the Component Test exit criteria. The timing of the migration should be coordinated between all members of the Development project group. If the project involves more than one platform, the cross platform migration should also be coordinated to be sure that units reach the next phase at the appropriate time. For each platform the migration "kit" should include all units required for the project along with any instructional units. The kit should be created and sent to a staging area until approval for installation in the Assembly Test environment is given. |
| Migration to Stage Information | |
| Approval to Stage (1) | Development Team Member (the approval must be tracked) |
| Exit/Approval Criteria | CT Exit Criteria |
| Kit Creation/Trigger Performed by (2) & (3) | If the Kit creation is automated the trigger should come from the approver to stage as listed above. If the Kit creation is not automated, then the Development or TS team should create the kit based upon a portion of the present descriptioned set of procedures. |
| Pre-Migration Location | The pre-migration location for each unit of the migration kit should be in an approved library/repository that conforms to the CM repository requirements |
| Post-Migration Location | The post-migration location can be a physically separate directory with the appropriate level or security, allowing write access for the kit creation process and read access for the moving of the kits. The post migration location can also be a logical location, where units are tagged with the AT level. |
| Packaging Information Manual/Automated Package? Tool? | Migration can either be manual or automated. In either case the process needs to be portion of the present descriptioned and must meet the CM requirements for tracking and recovery. |
| Brief Package Description | Packaging of the CM units should involve a grouping of all required units; this grouping should be maintained throughout the entire migration process. This may prevent units from being lost or added during migrations. If multiple units are combined to create a derived product, the creation of the product should be automated by combining like tagged units within the repository (example: a.h, a__sub.pc, a__main.pc, should all be tagged at the CT level). This may prevent the derived product from becoming out of sync with its sub-components in the repository. Only the final product needs to be migrated. |
| Package Verification | |
| Verification Check | A simple procedure should be defined to allow for verification of a successful migration. |
| Verified by | The verification should be performed by a Development Project team member, prior to the beginning of Assembly Test, this venfication can be tracked. |
| Internal/External Notification | |
| Internal | The following teams should be notified upon successful completion of a migration: Development Project Team |
| External | At this stage no outside communication is required except for project status purposes. This task should be incorporated into the project status meeting in order to notify business partners and other project teams. |
| Migration from Stage Information | |
| Approval from Stage (4) | Development Member (the approval must be tracked) |
| Entrance/Approval Criteria | AT Entrance Criteria |
| Kit Move Perf by (5) | Moving the kit from the staging environment to the installation area can be performed by any person from one of the following teams: Development, Operations, or TS. Movers need to be certain that the appropriate approval has been given prior to moving the kit. |
| Kit Install Perf by (6) | Installation of the kit into the new environment can also be performed by multiple groups. Consideration sbould be given to the level of system security access required to perform the |

-continued

| | |
|---|---|
| | installation. Whenever a significant level of access is required, the installation process should be limited to either the TS team or Operations. |
| Pre-Migration Location | The pre-migration location should match the post migration location listed above for the Migration to Stage |
| Post-Migration Location | The post-migration location should be a physically separate environment from the CT environment whenever feasible and cost effective. This location should mirror the production environment as closely as possible. |
| Un-Packaging/Installation Information | |
| Manual/Automated Package? Tool? | For complex systems and installations requiring a significant level of access the process should be automated. Manual processes may require explicit directions and a more rigorous verification process. |
| Brief Package Description | Whether the installation process is manual or automated, the process should be clearly portion of the present descriptioned. All units should have a specific location on the destination server. |
| Migration from Stage Information | |
| | The installation process should take into account factors such as space, currently running executables, overwriting existing units, and ?? |
| Install Verification | |
| Verification Check | A simple procedure should be defined to allow for verification of a successful migration. For manual process the verification should be more extensive |
| Verified by | The verification should be performed by a Development Project team member, prior to the beginning of Assembly Test. This verification can be tracked. |
| Internal/External Notification | |
| Internal | The following teams should be notified upon successful completion of a migration: Development Project Team |
| External | At this stage no outside communication is required except for project status purposes. This task should be incorporated into the project status meeting in order to notify business partners and other project teams. |

Program AT ->PT Promotion and Migration Guidelines

| | |
|---|---|
| Platform Information | |
| Platform Type | All |
| Description | Migration frorn Assembly Test to Product Test occurs when the Development team has successfully completed the Assembly Test exit criteria. The timing of the migration should be coordinated between Development and Test. If the project involves more than one platform, the cross platform migration should also be coordinated to be sure that units reach the next phase at the appropriate time. For each platform the migration "kit" should include all units required for the project along with any instructional units. The kit should be created and sent to a staging area until approval for installation in the Product Test environment is given. |
| Migration to Stage Information | |
| Approval to Stage (1) | Development Team Member (this approval must be tracked) |
| Exit/Approval Criteria | AT Exit Criteria |
| Kit Creation/Trigger Performed by (2) & (3) | If the Kit creation is automated the trigger should come from the approver to stage as listed above. If the Kit creation is not automated, then the Development or TS team should created the kit based upon a portion of the present descriptioned set of procedures. |
| Pre-Migration Location | The pre-migration location can be a physically separate directory with the appropriate level of security or it can be a logical environment in which the units are tagged with the appropriate migration level. |
| Post-Migration | The staging environment can be a physically separate directory |

-continued

| | |
|---|---|
| Location | with the appropriate level of security or it can be a logically separate environment in which the units are tagged with the appropriate migration level. |
| Packaging Information | |
| Manual/Automated Package? Tool? | Migration can either be manual or automated. In either case the process needs to be portion of the present descriptioned and must meet the CM requirements for tracking and recovery. |
| Brief Package Description | Packaging of the CM units should involve utilizing the same grouping as the migration from CT to AT, this may prevent the introduction of new units or the loss of required units. |
| Migration to Stage Information | |
| | If multiple units are combined to create a derived product then only the derived product needs to be migrated. Some environments may require the product to be created differently for each destination environment, in this case the sub-components need to be migrated as well. |
| Package Verification | |
| Verification Check | A simple procedure should be defined to allow for verification of a successful migration. This procedure may require an extra step during the actual packaging to create an audit log identifying the status of the migration. |
| Verified by | The verification should be performed by a Development Project team member, prior to notifying Test. |
| Internal/External Notification | |
| Internal | The following teams should be notified upon successful completion of a migration: Test Team |
| External | At this stage no outside communication is required except for project status purposes. This task should be incorporated into the project status meeting in order to notify business partners and other project teams. |
| Migration from Stage Information | |
| Approval from Stage (4) | Development Member (this approval must to be tracked) |
| Entrance/Approval Criteria | PT Entrance Criteria |
| Kit Move Perf by (5) | Moving the kit ftom the staging environment to the installation area can be performed by any person from one of the following teams: Development, Operations, or TS. Movers need to be certain that the appropriate approval has been given prior to moving the kit. |
| Kit Install Perf by (6) | Installation of the kit into the new environment can also be performed by multiple groups. Consideration should be given to the level of system security access required to perform the installation. Whenever a significant level of access is required, the installation process should be limited to either the TS team or Operations. |
| Pre-Migration Location | The pre-migration location should match the post migration location listed above for the Migration to Stage |
| Post-Migration Location | The post-migration location should be a physically separate environment from the CT environment whenever feasible and cost effective. This location should mirror the production environment as closely as possible. |
| Un-Packaging/Installation Information | |
| Manual/Automated Package? Tool? | For complex systems and installations requiring a significant level of access the process should be automated. Manual process may require explicit directions and a more rigorous verification process. |
| Brief Package Description | Whether the installation process is manual or automated, the process should be clearly portion of the present descriptioned. All units should have a specific location on the destination server.<br>The installation process should take into account factors such as space, currently running executables, overwriting existing units, and?? |
| Install Verification | |
| Verification Check | A simple procedure should be defined to allow for verification of a successful migration. This procedure may require an extra step during the actual packaging to create an audit log identifying the status of the migration. |
| Migration from Stage Information | |
| | For manual processes the verification should be more extensive |

-continued

| | |
|---|---|
| Verified by | The verification should be performed by an Test member, prior to the beginning of Product Test. |
| Internal/External Notification | |
| Internal | The following teams should be notified upon successful completion of the migration: Test |
| External | At this stage no outside communication is required except for project status purposes. This task should be incorporated into the project status meeting in order to notify business partners and other project teams. |

Sir Workbench Usage

FIG. 103 illustrates a method 10300 for providing a system investigation report workbench. First, in operation 10302, multiple types of information are received relating to a plurality of system investigation reports from a plurality of users. The types of information relating to the system -investigation reports are displayed in a plurality of fields in operation 10304. Browsing of the information relating to each of the system investigation reports is allowed in operation 10306. Change requests relating to the system investigation reports are initiated upon a predetermined user action in operation 10308. These the change requests are managed in operation 10310 by displaying the change requests, allowing the users to edit the change requests, and indicating which of the change requests have been implemented.

Optionally, the displayed information may be filtered based on criterion including criterion selected by the users or a predetermined group of criterion for reporting purposes. As a further option, the filtered, displayed material may also be printed.

Editing of the information relating to the system investigation reports may be allowed. In such an embodiment, a first type of the information may be displayed separate from a second type of the information with editing of the second type of information allowed only upon authentication of an identity of an authorized user.

As an option, the fields may include a date each system investigation report was created, the user that created each system investigation report, a status of each system investigation report, a priority of each system investigation report, a description of each system investigation report, a person responsible for resolving each system investigation report, a target date for resolving of each system investigation report, and/or a date when each system investigation report was resolved. The following material provides a more detailed description of the above-described method.

The following description provides an overview of the System Investigation Report (SIR) Workbench for use on a ReTA engagement. The SIR Workbench is be used to report development, testing, architecture, and infrastructure problems and desired enhancements. It also provides a means for project managers to control the Change Management Process.

SIR Lifecycle

New SIRs are created during testing as errors are found.

After a SIR has been created, a team lead may assign the SIR to a developer.

The assigned developer may review and fix the SIR.

The project lead is responsible for closing, deferring, and rejecting SIRs.

SIR Responsibilities by Role

| Role | Responsibilities | Tool Section |
|---|---|---|
| Tester | Create a new SIR | New SIR |
| Team lead | Assign the SIR<br>Fill in SIR details (e.g. difficulty, est. hours) | SIR Maintenance |
| Developer | Fix the SIR<br>Update the SIR (e.g. actual hours, comments) | SIR Maintenance |
| Project lead | Close, Defer, or Reject the SIR<br>Change Control administration | SIR Maintenance<br>Print Reports |
| SIR Workbench Administrator | Tool Support<br>Workbench | Makes updates/changes to SIR |

Workbench Overview

Main Window

As shown in FIG. 103.1, the SIR Workbench Main Window screen 10330 provides navigation buttons for adding new SIRs 10332, viewing existing SIRs 10334, viewing/printing existing reports 10336 and help 10338.

Creating a New SIR

From the Main Window, select the New button 10332. The New SIR window 10400 may be displayed which is illustrated in FIG. 104. All SIR requests with status of New (in the Status field 10402 ) can be reviewed. To look at other newly submitted SIRs, scroll through the record numbers 10334 (located in the bottom, left-hand corner).

To complete the form, do the following:

Select the appropriate Originator 10336, Project Phase 10338 and Component 10310 from the list boxes.

Enter a short description of the problem within the SIR Title field 10312.

Enter a detailed description of the problem within the Detailed Description field 10314.

Select the Close button 10316 to return to the main window 10330 (FIG. 103.1).

Reviewing and Modifying Existing SIRs

From the main window 10330, select the View button 10334. As illustrated in FIG. 105, this may display a window 10500 similar to the New SIR window, however it is possible to scroll through existing SIRs using the Record control 10502 located in the lower left portion of the window.

To search for a specific SIRs, click on the field containing the data to search by and then click on the Find SIR button 10504. Enter your search criteria when the prompted. The resulting SIRs should comply with the search criteria. Advance through the retrieved records using the Record control.

Team Lead Administration

Typically it may be the Team Lead's responsibility to review and assign SIRs to individual developers. To do this, simply type within the desired fields or select the appropriate options from the list boxes. Pressing the Close button or advancing to another SIR may commit the changes. Pressing the Escape button may cancel changes.

Change Control Administration

Using the Change Request Detail button 10506 (FIG. 105) located on this window, the Team Lead or the Project Manager has the ability to initiate and update the status of the current SIR within the Change Control process. See FIG. 106, which illustrates the Change Control Details Window 10600. Various fields may be updated and changed, such as the Investigation Description field 10602 and the Value Description field 10604.

Printing Reports

From the main window, select the Report button 10336 (FIG. 103. 1 ). This may display the Report Selection Screen 10700, which is illustrated in FIG. 107.

Select the appropriate criteria for the desired reports and select the Preview button 10702. This may provide a view of the report from which it is possible to create ! printed copies. To return to the main window select the Close button 10704.

Source Control

This paper provides an overview of the configuration and use of Microsoft's Visual SourceSafe™ (VSS) on the ReTA Phase 1 engagement. This portion of the present description may assume that a VSS installation has already been performed on a Windows NT workstation or server and is visible to the development network. It also assumes that developer workstations have performed the network installation and can access the shared SourceSafe folder.

SourceSafe Administration

User Administration

Using the VSS Administrator 10800, create the user accounts 10802 for individual team members. See FIG. 108. Ensure that appropriate access rights 10804 are given appropriately. Some team members may require full access, while others may only need to read from the repository. For assistance in this process refer to the SourceSafe online help.

Repository Administration

Project Hierarchy

Within the Visual SourceSafe Explorer, configure the project tree 10900 as shown in FIG. 109 and 109.1 so as to logically separate source code 10902, tools 10904, and documentation 10906 for ease of use and administration. The structure should be designed to allow developers to quickly locate and retrieve desired projects and/or files while allowing for quick and easy administration.

Management

It is the job of the Source Control Administrator to manage the source code repository. This includes analyzing the repository for signs of database corruption, archiving the database when it becomes too large and cleaning the Temporary folders routinely. The online help within the VSS Administrator tool provides step-by-step descriptions of performing these and other administrative tasks.

Performance

VSS is not a true client/server system. All the VSS software runs on the client. No software component runs on the server, so in that respect, VSS can be treated as a file server. With that in mind, it may be useful to ask the local network and server administrators to provide assistance in tuning the server.

Additionally, the following steps should be done periodically to ensure better performance:

Run the supplied Analyze.exe utility to search for and fix any corruption or errors Use a disk de-fragmentation application to maintain disk integrity Export old versions of source code and store in another location (tape, CD-ROM, etc.)

SourceSafe Usage

Check Out

Application checkout can be performed at any project or file level using the VSS Explorer. It is possible to check out 11000: the entire application 11002, individual packages, or individual files. FIG. 110 illustrates the user getting the latest of the server-side application code from VSS. During the build phase the developer would typically performing the following:

Get a latest version of the entire application by right clicking on the application and selecting Get Latest Version 11004. Note that this operation does not 'check out' any code, it merely creates a local copy of the latest version of code.

Next, when the window 11100 in FIG. 111 appears, select the Recursive checkbox 11102 to copy any sub-projects. Also, check the Build Tree checkbox 11104 if one has not performed this operation before. Upon completion one should have a complete set of application folders and sub-folders within your local working directory.

At some times it may be desirable to get an earlier 'Labeled' version of the source code. An example would be if one wished to retrieve the last version of code that passed Assembly Test. Selecting the 'Show History' menu item 11006 (see FIG. 110) from the right-mouse popup window displays the History window 11200, which is illustrated in FIG. 112. Earlier versions may be selected from there based on the entry in the Date column 11202.

After getting the desired version of the entire application, one may then check out the individual project or files that are going to be updated. The check out process may put a lock on the files within VSS as well as copy the latest version of the files to the local working directory.

Upon completion the VSS Explorer may reflect the status of the checked out files for other developers to see. At this point one can open the local project or files and make any desired changes. Referring to FIG. 113, select files 11300 and right click on the files to bring up the popup window 11302. Select the Check Out menu option 11304. Open the desired files and make changes.

If the developer decides that they are not going to make any changes or for some other reason, no longer wants to have the files checked out in their name, the developer can select the 'Undo Check Out' menu option 11306 from the right-mouse click popup window. This may reset the state of the files within VSS.

Check In

After successfully making modifications to the local copy of the source code, the developer should check the new version of the code into VSS. This is accomplished by the following tasks.

From within the VSS Explorer, select the files that one wishes to check back in to VSS. Right mouse click on the files and select the 'Check In' menu item 11400 as illustrated in FIG. 114.

When prompted for the Check In details at the Check In Screen 11500, which is illustrated in FIG. 115, make sure that each developer provides details of what modifications took place in the Comment field 11502. This can be useful for reviewing the history of stored versions.

Version Labels

VSS uses version numbers to keep track of every change one makes to your files and projects. This gives one the ability to retrieve any version of a file or project. VSS keeps track of old versions in 3 ways—by internal version number, by date, and by user-defined labels.

Version Number

The internal version number is assigned and maintained by VSS. VSS gives every version of a file and project a version number, and displays it in the History of File or History of Project Details dialog box. This version number is always a whole number.

Version Label

Far more useful, however, are user-defined labels. See FIG. 116, which illustrates a label creation dialog box 11600. The label is entered in the Label field 11602. Comments may also be entered/updated in the Comment field 11604. One can associate a label with any version of any file or project. A label can be a string of up to 31 characters. Any of the following are valid labels: "1.0", "2.01b", "Final Beta", and "Approved for QA". After one applies these labels, one can retrieve files associated with a particular state of your project from the History dialog box, which is accessed from the Show History command on the Tools menu. When one labels a project with a descriptive text string, all the files in that project and sub-project inherit the label.

Consider the following when one uses the Label command:

When one uses the Label command, one creates a new version in History of the selected project or file, however, the file or project itself remains the same.

If one assigns a label to a version that already has a label, one overwrites the old label. VSS issues a warning before removing the old label.

When one edits a label in the History Details dialog box, you do not create a new version of the file or project, you merely assign a new label to an existing version.

If you add a label to a version of a file or project in which the label already existed on another version, you may be prompted to remove the old label.

History Reporting

As illustrated in FIG. 117, the History of Project dialog box 11700 displays the history of a selected project in the Action column 11702, including all significant events, such as the deletion of files or subprojects, addition of files or subprojects, labeling and renaming of items, and check ins. For each significant event, the dialog box shows the affected file or subproject in the Name column 11704, the user who performed the action in the User column 11706, the date and time of the event in the Date column 11708, and the description of the event in the Action column. Events are listed with the most current event at the top of the display.

From this window it is possible to view the details of the change by selecting the Details button 11710. This may bring up the History Details dialog box 11800, which is depicted in FIG. 118. This box includes both general Comment and Label comment fields 11802,11804. It is also possible to print the history details using the Report button 11712 of FIG. 117.

Impact Analysis

Use the Find In Files command to display a list of all occurrences of a character string in the VSS files you specify. You can use the command on a single file or on an entire project. This is useful when searching for files that make use of a particular component, interface or method.

Firewall Recommendation

The main purpose of deploying a firewall is to protect the confidentiality and integrity of the organization's data, detect any attempted intrusions, minimize the risk zone exposed to the public network, support secure connections to remote users and business partners, and manage the traffic to and from the public network.

This portion of the present description outlines the evaluation process and Analysis of an Internet firewall for ReTA. It may discuss the selection approach, the product requirements, and the evaluation of the products, in order to obtain a final recommendation. The end to end process is illustrated in FIG. 119:

Approach

The first step in the firewall evaluation process was the development of a selection criteria matrix, and the specification of requirements by ReTA in a Firewall Analysis phase 11930. During the Product Evaluation phase 11932, a number of key technical and non-technical areas were evaluated, such as security model employed, interfaces supported, performance, reporting, monitoring, SNMP support, third party support, market position, cost, and vendor support. A high level evaluation was conducted to determine six vendor candidates. After an in-depth study, two remaining products were selected during the Final Recommendation phase 11934.

What follows may illustrate the selection criteria and evaluation information obtained in order to eventually select one firewall vendor for the final recommendation.

Product Analysis

Many Internet Firewall products exist on the market to date, ensuring a secure enterprise wide solution from a variety of security threats. Jude O'Reilly, an analyst at the Gardner Group Stamford Conn. Predicts that by the year 2000 there may be roughly five firewall suppliers from which to choose from: Check Point Software Inc., Redwood City Calif.; Cisco; Cyberguard, Fort Lauderdale, Fla.; Raptor Systems Inc., Waltham, Mass., and TIS.

Focus was given to the top six firewall products. A short list of the leading products on the market was developed based on industry expertise, technical reviews, and research group reports. These products include:

Check Point FireWall-1 for NT

Secure Computing BorderWare Ver. 5.0

Raptor Firewall 5.0 for NT

CyberGuard Firewall Version 3.0

Microsoft Proxy Server Ver. 2.0

Trusted Information Gauntlet Ver 3.2

The products selected above are recognized as the best currently available. While there are many firewall products on the market, only a small handful has been reviewed by the major technical journals in 1998. This short list includes the six products that were reviewed and highly rated by most of the journals. Specifically, the following articles were utilized:

ICSA, Information Computer Security Association, "Firewall Industry Guide, 1998

LanTimes, August, 1998, "Product Comparison: Firewalls"

Data Communications, April, 1998, "NT Firewalls: Tough Enough"

TechWeb, Mar. 17, 1998, "Beef up External Security"

Network Computing, November, 1998, "Seven Firewalls fit for your Enterprise"

Federal Computer Week, Sep. 14, 1998, "FCW's Hacker Challenge"

The information for each product was normalized to facilitate product comparison. Each product was evaluated and rated against ReTA's requirements.

The provision of firewalls has become a commodity business. For most enterprises, any of the firewall software on the Firewall Products Chart 12000 illustrated in FIG. 120 may provide adequate security. Feature and ease-of-use differences have blurred between firewall vendors. As each vendor delivers new features, its competitors quickly match and raise the ante.

The next challenge was to determine what the best fit would be for ReTA. After careful consideration, two firewall vendors were selected for the product evaluation stage. FIG. 121 illustrates the selected products: Check Point Firewall for NT 12100 and Microsoft Proxy Server Version 2.0 12102.

Check Point's Firewall for NT: Maintaining a high presents in the market place, Check Point is the leader in firewall security with it's 35 to 40% of the market share. Stateful inspection is the new generation of firewall technology, providing the highest possible level of security, invented and patented by Check Point Software Technologies.

Stateful Inspection packet inspection at all 7 layers of the OSI Model.

INSPECT maintaining a high level of performance.

Versatility of various OS platforms, Windows NT, Unix.

OPSEC (Open Platform for Secure Enterprise Connectivity) manages all aspects of network security.

Microsoft Proxy 2.0: Provides fast access to customer and partner business information on the Web, while at the same time providing a secure private infrastructure from the Internet. Microsoft Proxy 2.0 is relatively new to the market place, cost, dynamic packet filtering (DPF) and reverse proxy are some if its main features. Proxy 2.0 feature overview:

Socks 4.3 Proxy basic sockets support for non-Windows.

Winsock Proxy supports most Winsock 1.1 applet.

Web Proxy supports any CERN web browser.

Packet Filter/Firewall Static and Dynamic filtering

Requirements

Firewall products have matured rapidly over the past few years. Most products today support a variety of firewall designs including packet filter, application proxy, and stateful inspection. Many also support most of the popular Internet protocols now in use. The majority also support network address translation in one form or another. Some of the newer products now support content screening—they can inspect files for viruses and ActiveX components or Java applets for potential problems. Reporting, ease of configuration, and performance are the real areas of differentiation between these products since they all offer excellent security.

Keeping this in mind, each product has been considered from a number of different perspectives.

Support network address translation

Traffic control by source/destination address, application, etc.

Alert generation for breaches

Encryption support

Authentication support

Centralized administration of multiple firewalls

Easy to use event logging

Content screening

MS Windows NT-based operating platform

Intuitive administration interface

Support a wide range of services

Excellent performance

Certified by Internet Security Assurances Services (ISCA Inc.)

Withstand various forms of denial of service attacks

Market acceptance and support

The ICSA Inc. is an independent industry organization that certifies commercial firewall products against a standard set of functional and security requirements. Functional requirements include services provided to internal and external users, and management capability. Security requirements include port scanning, penetration testing, as well as the use of ISS (Internet Security System) Security Scanner. The products reported here (either an earlier version or the current version) are certified by ICSA Inc.

ICSA's testing is quite thorough. Its certification program is devoted to ensuring that firewalls meet minimum requirements for reliable protection. The agency scans each firewall it considers to make sure the firewall performs as advertised. The agency also verifies that common Internet applications continue to function as expected.

Product Evaluation

The relative strengths and weaknesses between the products were considered. The main evaluation criteria were rated subjectively based on available information. A weighted summary was calculated for each product according to four categories: business (15%), technical (30%), application (30%), and management/operational (25%). The results of this analysis are presented in the following Table.

of the description, all six of these products have very similar features in general. However, there are important differences when the features are compared in detail.

A Gartner Group report on firewall vendors from October 1997 placed Check Point, Trusted Information Systems, and Raptor Systems in its upper right "quadrant". Vendors in this quadrant have more complete vision and better ability to execute. Furthermore, Gartner stated that any firewalls on their positioning chart would provide adequate security. Feature differences across products are quickly copied and no longer offer competitive differentiation.

The technical press often did not compare all products consistently. They also may not have reviewed the same version of the product as currently available. These two factors, as well as the different evaluation criteria and weighting used, partially contributed to the differences among reviews.

While a rich feature set is important for a firewall, ease of use and configurability are equally important because most security breaches result from improper firewall configuration. All of these products also support configuration checking to ensure all the rules are consistent and that common

| | Secure Computi ng | Check Point FireWall-1 | Cyber-Guard | Raptor Eagle | Microsoft Proxy | TIS Gauntley |
|---|---|---|---|---|---|---|
| Business | | | | | | |
| Pricing | 4 | 4 | 3 | 4 | 4 | 5 |
| Support | 4 | 5 | 4 | 4 | 4 | 4 |
| Market | 3 | 5 | 2 | 3 | 2 | 4 |
| Education | 4 | 5 | 4 | 4 | 4 | 4 |
| Technical | | | | | | |
| Firewall design | 3 | 5 | 5 | 3 | 3 | 3 |
| Operating plat. | 4 | 5 | 3 | 5 | 3 | 5 |
| Performance | 3 | 5 | 4 | 3 | 3 | 3 |
| Network | 5 | 5 | 4 | 5 | 3 | 5 |
| Content screen | 4 | 4 | 4 | 2 | 2 | 3 |
| Auth./encryption | 4 | 4 | 4 | 4 | 4 | 4 |
| Application | | | | | | |
| Ftp | 5 | 5 | 5 | 5 | 5 | 5 |
| http | 5 | 5 | 5 | 5 | 5 | 5 |
| https | 3 | 4 | 2 | 5 | 2 | 5 |
| Smtp | 2 | 5 | 5 | 5 | 2 | 5 |
| Ssl | 5 | 4 | 5 | 2 | 2 | 5 |
| SQL*Net | 2 | 4 | 2 | 2 | 2 | 5 |
| Proxy service | 4 | 4 | 4 | 4 | 5 | 4 |
| Mgmt/Op | | | | | | |
| Console | 3 | 5 | 3 | 5 | 2 | 4 |
| Logging/alerts | 3 | 4 | 5 | 4 | 3 | 4 |
| Reporting | 4 | 3 | 4 | 3 | 5 | 4 |
| Attacks handling | 4 | 3 | 5 | 3 | 5 | 3 |
| Summary | | | | | | |
| Business (15%) | 3.8 | 4.8 | 3.3 | 3.8 | 3.5 | 4.3 |
| Technical (30%) | 4.0 | 4.7 | 4.0 | 3.7 | 3.0 | 3.8 |
| Application (30%) | 4.0 | 4.4 | 4.0 | 4.0 | 3.3 | 4.9 |
| Mgmt/Op (25%) | 4.0 | 3.8 | 4.3 | 3.8 | 3.8 | 3.8 |
| Total (weighted) | 3.9 | 4.4 | 4.0 | 3.8 | 3.3 | 4.2 |

As mentioned, all six of the products analyzed here are best of breed. They differ minimally in functioning as a basic firewall with good performance and solid security. As can be seen from the features summary table in the previous portion mistakes are not made. They also support centrally managing multiple firewalls from one console.

In the Data Communications review, they rated the ease of performing certain tasks using each product. These tasks include configuring alert notification, remote shutdown, denying access from a given subnet, log blocked access attempts, and various common rules. All the firewalls were rated as easy to use by the review—although not all types of attacks were logged by every product. All of these products support notification of an attack by pager and/or e-mail.

The base-operating platform of each product is an important consideration for ReTA. All of the firewall products selected can run under MS Windows NT. In addition to running on standard commercial OS platforms, FireWall-1 also stands out with third party vendor support. All of the remaining products performed at the 10 to 20 Mbps range. There are a number of factors contributing to FireWall-1's strong showing, as packet filtering firewalls in general have better performance because they perform "less work."

Industry support and market share is also in Check Point's favor. With some 40 percent of the firewall market in 1997, no other product approaches FireWall-1's dominance. It is no wonder that Check Point has such broad support in the security products industry through its OPSEC (Open Platform for Secure Enterprise Connectivity) Alliance. The goal of the Alliance (currently with some two dozen member companies) is to guarantee interoperability between various security applications that may be present in the enterprise. Check Point also has alliances with Bay Networks, Hewlett-Packard, Xylan and U.S. Robotics to build software directly into their routers.

Finally, most application gateway firewalls only provide proxy service for the most common Internet protocols—such as ftp, http, https, etc. Generic proxy service is offered to support other protocols. However, generic proxies do not provide the enhanced security that specific proxies provide, thus defeating the whole purpose of application gateways. For this reason, application gateway-only firewalls are rated lower than those that support both application gateway and packet filtering.

Due to ReTA's unknown protocol requirements for future generation of Internet applications, gateways may not be able to efficiently and securely support those applications. In addition to being a stateful packet filter that can support any protocol, FireWall-1 has a powerful scripting language. This capability allows an experienced administrator to add sophisticated support for custom services.

Detailed Comparison

Check Point Firewall-1 for NT

Pros:

excellent performance rich and simple GUI stateful inspection gives safe transport to virtually any application highly scaleable centralized management capable of supporting multiple installations load balancing and fail over high market acceptance extensive third party support Cons:

rule editor not so intuitive less-than-perfect configuration tools turns off logging on disk/log full error—bad for auditing and security possible corruption of stateful inspection tables leaves network vulnerable (although there is no indication that such corruption is likely)

stateful inspection cannot make application-level decisions packets are forwarded rather than reconstructed anew (makes it possible for out-of-band attack)

lack of information regarding the layer that each protocol is examined by default

Secure Computing BorderWare

Pros:

good tools for massaging of log data 17 standard predefined reports warns managers about potentially disastrous configuration choices very comprehensive filtering separate TCP/IP stack for send and receive - to eliminate chance of a fault in the stack causing a security vulnerability shuts-down on disk full error, and rotates logs on log full error—good for security and auditing automatically gather information on possible intruders up to four interfaces with separate TCP/IP stack—no access across interfaces vendor supplies hardened OS OS does not provide super-user capability to gain total system control proxy runs in its own security domain—exposure in one proxy does not affect others Cons:

application proxy only runs on BSDI operating system only does not have firewall load balancing/fault tolerance option no default proxy for https no default proxy for SQL*Net central console cannot operate multiple firewalls does not support Token Ring interface

CyberGuard Firewall

Pros:

virtually flawless security shuts down access when log files fill—good for security and auditing.

centralized management load balancing good performance large number of options strong administration GUI vendor supplies hardened OS communication blocked between network and OS log many different types of attacks Cons:

requires experienced UNIX administrator runs on SCO UnixWare no default proxy for https no default proxy for SQL*Net currently does not support Token Ring

Raptor Eagle

Pros:

integration with Windows NT event viewer integration with Windows NT performance monitor integration with Windows NT domain has default proxy for https Cons:

application proxy only does not support load balancing/fault tolerance setup of firewall turns off logging on disk/log full error—bad for auditing and security no default proxy for SQL*Net poor performance Trusted Information Systems Gauntlet Pros:

extensive logging source code can be inspected by customer respectable market share supports firewall load balancing/fail over has default proxy for https has default proxy for SQL*Net Cons:

stops logging when disk full—bad for auditing purposes application proxy with basic packet filtering Firewall Design Depending on who you ask, there are three or four types of common firewall designs—packet filter, circuit proxy, application gateway, and stateful packet filter. These may be briefly described in the portion of the descriptions below. The two most common firewall designs in use today—application gateways and stateful packet filters.

Packet Filters

Packet filtering is the most basic form of firewall protection and consists of selectively routing packets between internal and external hosts by either the type of packet, the originating host address, the target host address, or the services requested. In reality, this is no different from filtering provided by regular routers. In a firewall environment, though, the filtering rules are generally more stringent. And the firewall software may be optimized to perform route filtering.

Packet filters are good because they are fast, but they lack the complete state and context of a conversation. Therefore, they are rather vulnerable to spoofing and other exploits. While OSI layers 2 and 3 information is important, information in high layers is significant as well in a security context.

Circuit Proxy

A circuit proxy regulates connections between clients on the internal network and servers on the public network (and, if security policy permits, vice versa) by forcing both client and server to address their packets only to the proxy running on the firewall bastion host. These connections are established in accordance with the same types of rules as those governing packet filters and are based on the IP addresses and port numbers of client and server.

Unlike a packet filter, circuit proxy funnels all traffic through a single EP port (usually 1080) instead of using a different port number for each application. If a client on the public network opens a session with a server on the internal network, the client has no way to learn the actual IP address of the server at the other end of the connection, since the circuit proxy intercepts all the packets.

Like packet filters, circuit proxies operate at OSI layers 2 and 3 and lack complete information about a network conversation. Furthermore, circuit proxies are not transparent and may require modifications to the usage of the client and server. For this reason, circuit proxies are typically not used today.

Application Gateway/Proxy

Unlike packet filters and circuit proxies, application gateways (AG) inspect the data portion of the packets and make security decisions based on the nature of the application. Operating at the top of the TCP/IP protocol stack, application gateways take users' requests for Internet services (such as FTP and Telnet) and forward them, as appropriate, according to security policy, to the actual services.

Application gateways have the opposite problem of packet filters. These proxies operate at the upper layers of the OSI model. While there is important information in the data portion of the packet, lower layer information is still significant. The proxies typically track state information in the session layer. This is also the reason why application proxies do not work for stateless (or connectionless) protocols.

Application gateways typically rely on the underlying TCP/IP stack to securely handle packets. This is the reason why many application gateway-based firewalls (like Secure Computing's BoderWare and Sidewinder) are packaged with a hardened operating system.

An application gateway can, for example, restrict an internal user from accessing certain Web sites by name or by the time of day. Or for FTP service, the gateway can control whether files can be downloaded from the outside or be sent from the inside. In addition, the application gateway can be set up to log certain commands that packet filters simply have no knowledge of. Because these gateways have more knowledge of the protocol and examine more information, they are generally considered to be more secure. The consequence of this is that application gateways generally have lower performance.

Stateful Packet Filter

Stateful packet filtering (SPF) was invented and patented by Check Point (maker of FireWall-1). SPF maintains the state of all communications layer—OSI layers 2 through 7. Thus it has the necessary context data to determine whether to accept or reject a packet. This determination may rely on the packet information, but can also depend on previous packets that have been exchanged (the context) that the current packet is a part of.

For example, FireWall-1's stateful inspection starts at layer 2, and works all the way through layer 7, extracting key information from each layer, in order to determine the nature of the session. The inspection engine is capable of identifying information at any location in a packet (regardless of the OSI layer of that information) and using that information to decide the disposition of a packet, and/or store that information for future use in the security analysis process.

Stateful packet filters are less granular than application gateways because SPFs do not have application-level knowledge. They have no knowledge of the different commands in the application protocol, for example. On the other hand, SPFs generally have better performance.

Comparison

Most firewall products today are divided between application gateway (Raptor Eagle, TIS Gauntlet, CyberGuard) and stateful packet filtering (Check Point FireWall-1, Cisco PIX, Sun SunScreen). As:such, the following table is generated to compare these two technologies.

In addition, while application gateways are generally considered to be more secure, that security results from the ability to filter commands and data at the session and application layer. Proxies have been primarily used to control outbound traffic. It is uncertain the kind of protection they offer for inbound traffic. For example, a HTTP proxy can control users from accessing certain Web sites at certain hours. However, these controls generally do not apply to inbound traffic. The following table details a Traffic Matrix.

| | Application Gateways | Stateful Packet Filter |
|---|---|---|
| Security - Outbound | ✓ More - Finer control over the application service; can filter on actual commands within the protocol | x Less - Less granular control over service |
| Security - Inbound | -- Slightly more - Constructs new packet; not susceptible to out of band attacks | -- Slightly less - Packets forwarded instead of reconstructed; susceptible to out of band attacks |
| Performance | x Lower - Examines more information deep in the upper layer of OSI | ✓ Higher - Examines each packet to varying level of depth |

Final Recommendation

Check Point Firewall-1 was selected as the firewall of choice. With security and a great management interface, Check Point's Firewall-1 breezed through all the test. The Stateful-inspection firewall sets up access rules for virtually any condition. From a performance standpoint, Check Point Firewall-1 matched most if it's competitors however, performance is far less important than security or management, and Firewall-1 excelled in both.

Implementing VB Within ReTA

This portion of the description provides information on how to implement an eCommerce application based on the ReTA architecture using the Visual Basic programming language (VB). The ReTA architecture defines a set of COM (Microsoft's Component Object Model) Interface standards for creating application components. This portion of the description describes how an application can be created by writing Activity, SubActivity and Business Object components to the ReTA interfaces. It describes the VB implementation of COM objects, the process for creating each type of component and gives examples of a VB implementation of an Activity, SubActivity and Business Object component.

FIG. 122 is a diagram of the Activity Framework classes with the VBActivityWrapper 12200.

VB Implementation of COM Objects

Implementing Components Based on Existing COM Interfaces

The COM component model allows components to be created in any supported language. To implement a ReTA application in VB, one has to create Business Objects, SubActivities and Activity components that implement the ReTA COM Interfaces. The ReTA Interfaces are defined in Interface Definition Language (IDL) files which are then compiled into machine readable Type Libraries. To implement an interface in VB you must reference the Type Library in the Visual Basic project. You then create a VB Class module. The first line of the class module describes that the class implements a COM interface:

Implements Interface Name

Once this line is added, the VB compiler may force you to provide an implementation for every method defined in the interface. The method name must be prefixed by the interface name followed by an underscore. For example the IRETAEditable interface has a method setValue. You must provide an implementation for this interface using the method name METAEditable_setValue.

Tip: Use the class browser to view the methods required in the interface. The browser provides a VB description of the method signature.

In and out Parameters in a Method Signature

The IDL for a method describes all the parameters for that method and the return type. For each parameter it defines whether the parameter is an In (input), Out (output) parameter, or a combination of both. For In parameters this corresponds to a ByVal parameter in Visual Basic. For In/Out parameters this corresponds to a ByRef parameter (the default). VB does not support Out only parameters.

You must ensure that the implementation exactly matches the interface specification, including the ByRef keyword if necessary, or the VB compiler may return the error:

Compile Error: Procedure declaration does not match description of event or procedure having the same name.

COM Object references in a method signature

If a method signature has a COM Interface then you must add a reference to the Type Library of that Interface to the VB Project.

COM IUnknown Interfaces in a method signature

You cannot implement an interface in VB id if that interface has an IUnknown reference.

Custom Interfaces Verses Automation Interfaces

To implement the Automation interface that is used to late bind to the component it is necessary to provide Public methods for each interface method. These Public methods have exactly the same name as the Interface method. These public methods simply call the custom interface methods defined above.

Creating ReTA Business Objects, SubActivities and Activities

Business Objects

Business Objects must implement the IRETAEditable interface that allows the ReTA architecture to get and set attributes of the object using string labels.

SubActivities

SubActivities must implement the IRETASubActivity interface. The table describes what implementation must be provided for each method.

| Method Name | Required Implementation |
|---|---|
| initialize | Implement any initialization code for the SubActivity including storing a reference to the parent Activity passed as a parameter |
| abort | This is called when the Activity is aborted. Implement any code necessary to clean up, if any. |
| commit | This is called when the Activity or SubActivity is committed. Call the Microsoft Transaction SetComplete method. See the example SubActivity |
| getActivity | This should return a reference to the parent Activity stored in the initialize method. |
| getName | This should return the name of the SubActivity |
| checkRequestedObjects | This should check that all the Business Objects required for the execute method are available in the Activity context and return 0 for success or -1 for error. |
| precondition | Implement any code necessary as a precondition for the execute method, if any. |
| execute | This is where the business logic for the SubActivity goes. |
| postcondition | Implement any code necessary to clean up after the execute method. |

Activities

This portion of the description is split into two sub-portions of the description, the first describing the design of the VB Activity wrapper mechanism and the second describing the steps required to implement an Activity in VB.

FIG. 123 illustrates interface relationships. Activity components 12300 are called by the Java VB Activity wrapper component 12302. The Java VB Activity wrapper component provides the default implementation for an Activity. One has to implement a IVBActivity interface which defines a subset of the IAFActivity interface.

IRETAActivity, IRETAContext, IRETAEventListener—As existing interfaces

IVBActivity 12304—Methods that developers needs to implement in their VB Activity components IRETAVBActivityWrapper 12306—Method to give a reference of the VB Activity component to the Wrapper

Views

The views map the UI widgets to attributes of business objects. The Java activities can build views from a set of predefined Java classes. The VB activities build views from a set of predefined VB Classes.

Example Customer Lookup Application

Business Object

```
'ReTA demonstration VB Business Object
'Lester Thomas January 1999
'All ReTA business objects must implement the IRETAEditable COM interface
'The IRETAEditable type library must be referenced by the VB Project
Implements IRETAEditable
Private ssn As Integer
Private name As String
Private Age As Integer
Private Level As String
Const retFalse=0
Const retTrue=1
Const retError=-1
Const s_SSN_LABEL="ssnwidget"
Const s_NAME_LABEL="namewidget"
Const s_AGE_LABEL="agewidget"
Const S_LEVEL_LABEL="levelwidget"
Private Sub Class_Initialize( )
ssn=10
name="default name"
Age=21
Level="2"
End Sub
'To implement a Interface method, the method name must be prefixed by the interface name.
'All interface methods should be marked private so that they are not visible except through the interface
Private Function IRETAEditable_setValue(ByVal attrib As String, ByVal val As String) As Long
  IRETAEditable_setValue=retError
  If attrib=s_SSN_LABEL Then
    ssn=val
    IRETAEditable_setValue=retFalse
  End If
  If attrib=s_NAME_LABEL Then
    name=val
    IRETAEditable_setValue=retFalse
  End If
  If attrib=s_AGE_LABEL Then
    Age=val
    RETAEditable_setValue=retFalse
  End If
  If attrib=s_LEVEL_LABEL Then
    Level=val
    IRETAEditable_setValue=retFalse
  End If
End Function
'To implement an Interface method, the method name must be prefixed by the interface name.
'All interface methods should be marked private so that they are not visible except through the interface
Private Function IRETAEditable_getValue(ByVal attrib As String, val As String) As Long
  IRETAEditable_getValue=retError
  If attrib=s_SSN_LABEL Then
    val=ssn
    RETAEditable_getValue=retFalse
  End If
  If attrib=s_NAME_LABEL Then
    val=name
    IRETAEditable_getValue=retFalse
```

```
    End If
    If attrib=s__AGE__LABEL Then
        val=Age
        IRETAEditable__getValue=retFalse
    End If
    If attrib=s__LEVEL__LABEL Then
        val=Level
        IRETAEditable__getValue=retFalse
    End If
End Function
```

For the dispatch interface, VB just exposes the public functions.

```
'Therefore we must provide the dispatch interface public methods manually
Public Function setValue(ByVal attrib As String, ByVal val As String) As Long
    setValue=IkETAEditable__setValue(attrib, val)
End Function
Public Function getValue(ByVal attrib As String, val As String) As Long
    getValue=IRETAEditable__getValue(attrib, val)
End Function
```

SubActivity

```
'ReTA demonstration VB SubActivity Object
'Lester Thomas January 1999
'All ReTA SubActivity objects must implement the IRETA-SubActivity COM interface
'The IRETASubActivity type library must be referenced by the VB Project
Implements IRETASubActivity
Private m__name As String
Private m__IRETAActivity As IRETAActivity
Const retFalse=0
Const retTrue=1
Const retError=-1
'The SubActivity abort transaction mechanism needs to be validated
Private Function IRETASubActivity__abort(ByVal eventCollectionIn As
IRETAEventCollection) As IRETAEventCollection
    'insert any additional code needed for the abort
    Set IRETASubActivity__abort=eventCollectionIn
End Function
'this method checks that all the objects required for the execute are present in the
'Activity context. It returns retFalse or retError.
Private Function IRETASubActivity__checkRequestedObjects(ByVal eventCollectionIn As IRETAEventCollection) As Long
    Dim ActivityContext As IRETAContext
    Set ActivityContext=m__IRETAActivity
    Dim label As String
    label="lurkingCustomerKey"
    IRETASubActivity__checkRequestedObjects=
ActivityContext.containsKey(label)
End Function
'The SubActivity commit transaction mechanism needs to be validated
Private Function IRETASubActivity commit(ByVal eventCollectionIn As
IRETAEventCollection) As IRETAEventCollection
    'Get the object's ObjectContext.
    Dim ctxObject As ObjectContext
    Set ctxObject=GetObjectContext( )
    'call SetComplete.
    ctxobject.SetComplete
    Set ctxObject=Nothing
End Function
Private Function IRETASubActivity__execute(ByVal resultIn As IRETAResult,
ByVal eventCollectionIn As IRETAEventCollection) As IRETAResult
    'get the Customer Object from the Activity Context and add the default values
    'for this example we may not get the values from the database
    'We need to use the IRETAContext interface of the Activity component
    Dim ActivityContext As IRETAContext
    Set ActivityContext=m__IRETAActivity
    'this is the label for retrieving the Business Object from the Activity Context
    Dim label As String
    label="lurkingCustomerKey"
    'We need the event collection as an IUnknown and so use the VB Automation (or dispatch) interface
    Dim ecdispatch As Object
    Set ecdispatch=eventCollectionIn
    Dim customerObjectdisp As Object
    Set customerObjectdisp ActivityContext.GetObject(label, ecdispatch)
    'We want the IRETAEditable interface of the Customer Business Object
    Dim customerObject As IRETAEditable
    Set customerObject=customerObjectdisp
    'set some values for the names based on the ssn
    'This would normally be a database lookup
    Dim ssn As String
    Dim name As String
    Dim Age As String
    Dim Level As String
    Dim Error As Long
    Error=customerObject.getValue("ssnwidget", ssn)
    If ssn="10" Then
        name="Lester Thomas"
        Age="29"
        Level="2"
    End If
    If ssn="20" Then
        name="Fred Bloggs"
        Age="23"
        Level="1"
    End If
    Error=customerObject.setValue("namewidget", name)
    Error=customerObject.setValue("agewidget", Age)
    Error=customerObject.setValue("levelwidget", Level)
    label="realCustomerKey"
    Error=ActivityContext.addObject(label, customerObjectdisp)
    Dim resultObject As Object
    Set resultObject=resultIn
    'add the Customer Business Object to the Result
    Error=resultObject.addResult(customerObject)
    Set IRETASubActivity__execute=resultIn
```

```
End Function
'This returns the reference to the Activity object
Private Function IRETASubActivity_getActivity( ) As IRETAActivity
  Set IRETASubActivity_getActivity=m_IRTAActivity
End Function
'This returns the name of the SubActivity
Private Function IRETASubActivity_getName( ) As String
  IRETASubActivity_getName=m_name
End Function
'This initializes the SubActivity and sets the reference to the parent Activity
Private Function IRETASubActivity_initialize(ByVal activity As IRETAActivity,
ByVal eventCollectionIn As IRETAEventCollection) As IRETAEventCollection
  m_name=
    "CustomerLookup.SARETACustDetailsRetrieve"
  Set m_IRETAActivity=activity
  Set IRETASubActivity_initialize=eventCollectionIn
End Function
'This executes any preconditions required to execute SubActivity
Private Function IRETASubActivity_precondition(ByVal eventCollectionIn As
IRETAEventCollection) As IRETAEventCollection
  Set IRETASubActivity_precondition=eventCollectionIn
End Function
'This executes any postconditions required to clean up after SubActivity
Private Function IRETASubActivity_postcondition(ByVal eventCollectionIn As
IRETAEventCollection) As IRETAEventCollection
  Set IRETASubActivity_postcondition=
    eventCollectionIn
End Function
'Dispatch interface. These methods simply call the Custom interface methods above
Public Function abort(ByVal eventCollectionIn As IRETAEventCollection) As
IRETAEventCollection
  Set abort=IRETASubActivity_abort(eventCollectionIn)
End Function
Public Function checkRequestedObjects(ByVal eventCollectionIn As
IRETAEventCollection) As Long
  checkRequestedObjects=
IRETASubActivity_checkRequestedObjects
(eventCollectionIn)
End Function
Public Function commit(ByVal eventCollectionIn As IRETAEventCollection) As
IRETAEventCollection
  Set commit=IRETASubActivity_commit
    (eventCollectionIn)
End Function
Public Function execute(ByVal resultIn As IRETAResult, ByVal eventCollectionIn
As IRETAEventCollection) As IRETAResult
  Set execute=IRETASubActivity_execute(resultIn,
    eventCollectionIn)
End Function
Public Function getActivity( ) As IRETAActivity
  Set getActivity=IRETASubActivity_getActivity( )
End Function
Public Function getName( ) As String
  getName=IRETASubActivity_getName( )
End Function
Public Function initialize(ByVal activity As IRETAActivity, ByVal
eventCollectionIn As IRETAEventCollection) As IRETAEventCollection
  Set initialize=IRETASubActivity_initialize(activity,
    eventCollectionIn)
End Function
Public Function precondition(ByVal eventCollectionIn As IRETAEventCollection)
As IRETAEventCollection
  Set precondition=IRETASubActivity_precondition
    (eventCollectionIn)
End Function
Public Function postcondition(ByVal eventCollectionIn As IRETAEventCollection)
As IRETAEventCollection
  Set postcondition=IRETASubActivity_postcondition
    (eventCollectionIn)
End Function
```

Activity

```
Implements IAFVBActivity
Implements IAFEventListener
Const COMFalse=0
Const COMTrue=1
Const COMError=-1
"SubActivity and BO Labels
Const s_REAL_CUSTOMERLOOKUP_BONAME=
"realCustomerKey"
Const s_SARETACUST_DETAILS_RETRIEVE=
"VBApp.SARETACustDetailsRetrieve"
Const s_SARETACUST_DETAILS_COMMIT=
"CustomerLookup.SARETACustDetailsCommit"
"Page information for View Mapping
Const S_CUSTOMERLOOKUP_STARTPAGE=
"/ASP/EXAMPLEPAGES/ASP/
VBCUSTOMERLOOKUP/INDEX.ASP"
Const s_CUSTOMERLOOKUP_FORMNAME=
"customerLookupForm"
Const S_CUSTOMERLOOKUP_TEXTBOX=
"ssnTextBox"
Const S_CUSTOMERLOOKUP_BONAME=
"lurkingCustomerKey"
Const S_CUSTOMERLOOKUP_LOOKUPPAGE=
"/AS P/EXAMPLEPAGES/ASP/
VBCUSTOMERLOOKUP/LOOKUP.ASP"
Const s_CUSTOMERLOOKUP_
LOOKUPFORMNAME="customerMaintForm"
Const s_CUSTOMERLOOKUP_NAME_TEXTBOX=
"nameTextBox"
Const s_CUSTOMERLOOKUP_AGE_TEXTBOX=
"ageTextBox"
Const s_CUSTOMERLOOKUP_LEVEL_
DROPDOWN="levelDropDown"
Const s_SSN_LABEL="ssnwidget"
Const s_NAME_LABEL="namewidget"
Const s_AGE_LABEL="agewidget"
Const s_LEVEL LABEL="levelwidget"
Dim m_id As String
Private Declare Function CoCreateGuid Lib "OLE32.DLL"
(pGuid As GUID) As Long
Private Const S_OK=0 'Return value from CoCreateGuid
Private Type GUID
```

```
    Data1 As Long
    Data2 As Integer
    Data3 As Integer
    Data4 (7) As Byte
    End Type
Private Sub Class_Initialize( )
    Dim 1Result As String p1 1Result=GetGUIDString
    m_id="AFVBACustomerLookup" & 1Result '& add the result of the
CoCreateGuid Function
End Sub
Public Function GetGUIDString( ) As Variant
    Dim 1Result As Long
    Dim 1Guid As GUID
    Dim strGuid As String
    Dim strTemp As String
    Dim intCtr As Integer
    1Result=CoCreateGuid(1Guid)
    If 1Result=S_OK Then
        strTemp=Hex(1Guid.Data1)
        strGuid=String(8-Len(strTemp), "0") & strTemp
        strTemp=Hex(1Guid.Data2)
        strGuid=strGuid & "-" & String(4-Len(strTemp), "0") & strTemp
        strTemp=Hex(1Guid.Data3)
        strGuid=strGuid & "-" & String(4-Len(strTemp), "0") & strTemp
        strTemp=Hex(1Guid.Data4(0))
        strGuid=strGuid & "-" & String(2-Len(strTemp), "0") & strTemp
        strTemp=Hex(1Guid.Data4(1))
        strGuid=strGuid & String(2-Len(strTemp), "0") & str-Temp & "-"
        For intCtr=2 To 7
            strTemp=Hex(IGuid.Data4(intCtr))
            strGuid=strGuid & String(2-Len(strTemp), "0") & strTemp
        Next
        GetGUIDString=strGuid
    End If
End Function
'*************************************************************************************
**************************
'*********** Members of the IAFVBActivity Interface ***************************
'*************************************************************************************
**************************
'this procedure captures the value entered on this page of the activity
Function IAFVBActivity_capture(ByVal activity As IAFContext, ByVal
eventcollection As IAFEventCollection) As Long
Dim ecdispatch As Object
Set ecdispatch=eventCollection
Dim i As Integer
Dim page As String
Dim Customer As IAFEditable
Dim Error As Long
"Capture all the view changes for the previous page
'Get the object's ObjectContext.
Dim ctxObject As ObjectContext
Set ctxObject=GetObjectContext( )
Dim sessionObj As Session
Set sessionObj=ctxObject("Session")
Dim res As Request
Set res=ctxObject("Request")
'Get the last page
Dim theSession As IAFSession
Set theSession=sessionObj.Contents("AFSession")
page=theSession.getLastPage( )
"AFUtility theRequestUtility=new AFUtility( );
If page=" " Then
    "Can not retrieve the last page
    IAFVBActivity_capture=COMError
    Exit Function
End If
"Retrieve the views for the current page
    "**** THERE ARE NO VIEWS YET, SO ILL JUST MAP THE VALUES HERE ******
    Dim formValue As String
    If UCase(page)=s_CUSTOMERLOOKUP_STARTPAGE Then
        "get the Business object to map the values too
        Set Customer=activity.GetObject(s_CUSTOMERLOOKUP_BONAME, ecdispatch)
        "capture mapping to SSN textbox
        formValue=res.QueryString(s_CUSTOMERLOOKUP_TEXTBOX)
        Error=Customer.setValue(s_SSN_LABEL, formValue)
    End If
    If UCase(page)=s_CUSTOMERLOOKUP_LOOKUPPAGE Then
        "get the Business object to map the values too
        Set Customer=
activity.GetObject(s_REAL_CUSTOMERLOOKUP_BONAME, ecdispatch)
        capture mapping to name textbox
        formValue=res.QueryString(s_CUSTOMERLOOKUP_NAME_TEXTBOX)
        Error=Customer.setValue(s_NAME_LABEL, formValue)
        "capture mapping to age textbox
        formValue=res.QueryString(s_CUSTOMERLOOKUP_AGE_TEXTBOX)
        Error=Customer.setValue(s_AGE_LABEL, formValue)
        "capture mapping to level textbox
    formValue=
res.QueryString(s_CUSTOMERLOOKUP_LEVEL_DROPDOWN)
    Error=Customer.setValue(s_LEVEL_LABEL, formValue)
End If
    IAFVBActivity_capture=COMFalse
End Function
Function IAFVBActivity_createSubActivity(ByVal subActivityName As String,
ByVal eventCollection As IAFEventCollection) As IAFSubActivity
    Dim subActivity As IAFSubActivity
    Set subActivity=CreateObject(subActivityName)
    Set IAFVBActivity_createSubActivity=subActivity
End Function
Function IAFVBActivity_getRequestedObjects(ByVal inSession As LAFContext,
ByVal inActivity As IAFContext) As Long
    IAFVBActivity_getRequestedObjects=COMFalse
```

```
End Function
Function IAFVBActivity__getUIFieldValue(ByVal inActivity As IAFContext, ByVal
page As String, ByVal formName As String, ByVal fieldName As String, ByVal
eventCollection As IAFEventCollection) As String
  "Use the View Mechanism to get the values from the BObjects
  Dim ecdispatch As Object
  Set ecdispatch=eventCollection
  Dim AttributeValue As String
  Dim Error As Long
  Dim Customer As IAFEditable
  Dim label As String
  If page=" "Then
    "Can not retrieve the last page
    IAFVBActivity__getUIFieldValue=COMError
    Exit Function
  End If
  "**** THERE ARE NO VIEWS YET, SO ILL JUST MAP THE VALUES HERE ******
  If UCase(page)=s__CUSTOMERLOOKUP__STARTPAGE Then
    "get the Business object to map the values too
    Set Customer inActivity.GetObject(s__CUSTOMERLOOKUP__BONAME, ecdispatch)
    label=s__SSN__LABEL
    "capture mapping to SSN textbox
    Error=Customer.getValue(s__SSN__LABEL, (AttributeValue))
    IAFVBActivity__getUIFieldValue=AttributeValue
  End If
  If UCase(page)=s__CUSTOMERLOOKUP__LOOKUPPAGE Then
    "get the Business object to map the values too
    Set Customer=
inActivity.GetObject(s__REAL__CUSTOMERLOOKUP__BONAME, ecdispatch)
    "capture mapping to name textbox
    Error=Customer.getValue(s__NAME__LABEL, (AttributeValue))
    IAFVBActivity__getUIFieldValue=AttributeValue
    "capture mapping to age textbox
    Error=Customer.getValue(s__A(GE__LABEL, (AttributeValue))
    IAFVBActivity__getUIFieldValue=AttributeValue
    "capture mapping to level textbox
    Error=Customer.getValue(s__LEVEL__LABEL, (AttributeValue))
    IAFVBActivity__getUIFieldValue=AttributeValue
  End If
  IAFVBActivity__getUIFieldValue=COMFalse
End Function
Function INFVBActivity__postcondition(ByVal eventcollection As
IAFEventCollection) As Long
  IAFVBActivity__postcondition=COMTrue
End Function
Function IAFVBActivity__precondition(ByVal eventcollection As
IAFEventCollection) As Long
  IAFVBActivity __recondition=COMTrue
End Function
Function IAFVBActivity__getPageParameter( ) As String
  'this returns the UI fields we require for this page
  Dim parameters As String
  'get the page we are on
  Dim objContext As ObjectContext
  Set objContext=GetObjectContext( )
  Dim page As String
  Dim res As Request
  Set res=objContext("Request")
  page=res.ServerVariables("SCRIPT__NAME")
  parameters=" "
  If UCase(page)=s__CUSTOMERLOOKUP__STARTPAGE Then.
  parameters="+portion of the present.
description.customerLookupForm.ssnTextBox.name+'='+escape(portion of the present description.customerLookupForm.ssnTextBox.value)"
  End If
  If UCase(page)=s__CUSTOMERLOOKUP__LOOKUPPAGE Then
  parameters="+portion of the present
description.customerMaintForm.nameTextBox.name+'='+escape(portion of the present description.customerMaintForm.nameTextBox.value)+'&'+portion of the present description.customerMaintForm.ageTextBox.name+'='+escape(portion of the present description.customerMaintForm.ageTextBox.value)+'&'+portion of the present description.customerMaintForm.levelDropDown.name+'='+escape(portion of the present description.
customerMaintForm.levelDropDown.selectedIndex)"
  End If
  IAFVBActivity__getPageParameter=parameters
End Function
'***********************************************************************
************************
'*********** Members of the IAFEventListener Interface
*********************************************
'***********************************************************************
************************
'this method returns a unique string ID for this component
Function IAFEventListener__getId( ) As String
  IAFEventListener__getId=m__id
End Function
Function IAFEventListener__receiveEvent(ByVal theEvent As Long, ByVal
eventCollection As IAFEventCollection) As Long
  IAFEventListener __receiveEvent=COMFalse
End Function
```

Internetworking Gateways

FIG. 124 illustrates a method 12400 for providing a global internetworking gateway architecture in an e-commerce environment. In operation 12402, an Internet is provided. A plurality of gateways each situated in a distinct geographic location are coupled to the Internet in operation 12404. A wide area network, separate from the Internet, is coupled to each of the gateways in operation 12406 for providing communication between the wide area network and the Internet. In operation 12408, a central database is coupled to the wide area network for providing a central storage for data used in e-commerce carried out over the Internet.

Optionally, the gateways may be intercontinental. For providing fault and performance management, a central management station may also be coupled to the wide area network.

Preferably, one of the gateways includes a screening router coupled to the Internet via an Internet service provider, a firewall connected to the screening router, and a choke router coupled between the wide area network and the firewall. In one optional version of this embodiment, a pair of gateways may be provided along with a pair of screening routers, a pair of firewalls, and a pair of choke routers. In another optional version of this embodiment, a plurality of servers may be coupled to the firewall for storing the data. As a further option, a second wide area network may be connected to the firewall via a screening router. The following material provides a more detailed description of the above-described method.

Summary

Today's internetwoking environment requires connections from the corporate network to a variety of resources. These include clients and partners, vendors and suppliers, the Internet and remote users, just to name a few. This interconnectivity leads to complex security issues that need to be addressed.

The problems associated with connecting the network to the vast Internet are widely published. Hackers abound, and new methods for compromising networks are published almost daily. However, what about connecting the network to a partner for project collaboration, or perhaps a supplier for automatic inventory control? One might trust their supplier, however, does one really know how well their network is secured? Contracts and Service Levels can and should deal with many of these issues, however, technology can also be used to enforce security policies.

This is what a flexible Internetworking Gateway is designed to do: interconnect resources while maintaining an acceptable level of security and functionality.

Introduction

The purpose of this portion of the description is to demonstrate a secure way to interconnect external resources and the corporate Wide Area Network (WAN). There is an underlying assumption that by the time one is reading this, several tasks have been accomplished, and one is ready to start architecting a solution. These tasks include a definition of security policy and philosophy, and a definition of requirements. While citing specific solutions, this paper provides a framework for architecting an Internetworking Gateway based on "middle of the road" assumptions on security levels and requirements. These assumptions are outlined below.

Requirements

The underlying requirements of the Internetworking Gateway are fairly simple:

Extranet: Fast, dedicated links to partners, clients, vendors, suppliers, and remote users via an Extranet.

Internet: Connect the WAN to the Internet for WAN users to access the Internet, all Internet users to access public company resources via a web server, and remote users on the Internet to access resources on the WAN.

Policy

The security policy states a company's acceptable level of risk, and what the gateway is protecting. This could range anywhere from proprietary information, customer records, personal reputation, and may depend on the company. The following "5 A's" are typical foundations defined in a security policy that are important to keep in mind:

Authentication: Identification and authentication that the user is who he says he is. Company X may solve and promote strong authentication by providing a global authentication service via mirrored and replicating authentication servers.

Access Control: Company X may require a baseline set of access control rules on all gateways, and may maintain and update the policy that drives this "generic ruleset". In addition, access control rules specific to new sites, and changes to site requirements, may drive additional access controls on top of these baseline rules.

Alarming: Alarms may be sent to local and central administrators in the event of an Alarm condition. An example would be multiple failed attempts by an outside user to intrude through the gateway.

Auditing and Logging: Auditing and Logging may be provided by the gateways to record major events for security and management purposes.

Availability: Often referred to as Performance Management, certain processes and periodic jobs may run to log and transmit performance data to ensure availability of networking and systems capabilities. The Service Provider may also provide reports to local and central management. Administrators may work to compare performance metrics with baselines and provide proactive capacity planning.

Philosophy

The security philosophy includes the following concepts:

Least Privilege—Any entity should only have the access required to perform its tasks.

Defense in Depth—The use of multiple security measures to ensure that failure of one system or process does not result in total compromise.

Choke Point—Forcing attackers to use centralized and known attack points to allow Access Control and Monitoring.

Fail-Safe Stance—Security systems that do fail should close (like a circuit breaker) access points instead of leaving them open. The cost of this stance is that Fail-Safe may yield a temporary system outage to both illicit and legitimate users due to the failure.

Default Deny—By default, that which is not expressly permitted is denied.

Universal Participation—The idea that some users may not choose to circumvent security systems and mechanisms (e.g. by alternate paths)

Diversity of Defense—To the greatest extent possible, a variety of types of systems may be leveraged as security devices to protect the environment.

Simplicity—Security mechanisms should be as simple as possible to facilitate understanding of the mechanisms and to avoid errors in configuration due to unnecessary complexity.

Separation of Duties—Administration and Security functions should be separated at all times. It is unreasonable to expect effective security and effective systems administration when these functions are performed by a single organization or individual.

The Internetworking Gateway Architecture is the direct manifestation of the above requirements, the security policy standard and the security philosophy.

Simple Architecture High Level Internetworking Gateway Architecture

The typical components of a gateway may include routers, firewalls, hubs, switches and servers. Each one of these components may perform a different role to accomplish the goals described in the security policy, philosophy and requirements portion of the present descriptions. A simple high level internetworking gateway architecture is shown in FIG. 124.1. Each component of the architecture is described in detail below.

Firewall 12430

Until recently a typical discussion of firewalls would begin with: "there are three different types of firewalls: application gateways, circuit level gateways, and packet filters." However, most commercial firewall products available today combine features from all three types to provide security, performance and manageability. Each product has evolved from one of these three, but the major vendors incorporate all three technologies in one firewall product.

So what is a firewall? A firewall is typically a computer with a variation of the UNIX derived operating system (or it could run on a Windows NT platform) that has several Network Interface Cards (NIC's). Some firewalls are software based, and are installed on a variety of hardware platforms, while others come preinstalled on the vendor's platform. The firewall situates itself in-between networks and enforce most of the security policy, as well as provide for several points of the security philosophy. The primary roles of the Firewall are Access Control, Authentication, Auditing and Logging, and Alarming. In addition, any good firewall also conforms to the security philosophy by adhering to the failsafe stance, providing default deny, and providing simple management.

In other words, the firewall controls what network traffic is allowed to pass through the gateway based on who the user is, where. the user is, and what the user is trying to do. At the same time the firewall is logging all of the network traffic and actively monitoring the logs for suspicious activity. If anything suspicious is observed, the firewall may notify an operator of a problem and shut itself down if necessary.

Routers

An internetworking gateway architecture calls for a router on most interfaces of the firewall. These routers perform different roles depending on which interface of the firewall they are attached to. A "screening" router 12432,12434 is located on the Internet or Extranet side of the firewall, and a "choke" router 12436 is located on the corporate WAN side of the firewall.

The Internet screening router 12432, owned either by the company or the ISP, is well situated to provide a variety of security tasks. The screening router denies typical attacks caused by malicious manipulation of IP options flags in the IP header, such as source routing and fragmentation attacks. A screening router should also prevent all attempts at IP spoofing, including both external users spoofing internal addresses as well as internal users spoofing external addresses. In addition, it should block all ICMP packets to prevent many well know attacks like the Ping of Death. Finally, a screening router should mirror the firewall rulesets to provide defense in depth.

The Extranet screening router 12434 may perform similar functions as the Internet screening router by providing the first layer of defense against the users on the Extranet. In addition, there may generally be more than one connection into the Extranet screening router. For instance, there may be a Frame Relay connection into the screening router with virtual interfaces to several different partners and suppliers, or there may be several physical interfaces with leased line connections to partners and suppliers. It is imperative that the router not bridge different partner networks together unless there is an intent to do so. This may dictate strict access control lists on this router to prevent any cross communication between client networks. Some partners may require complete separation, which could be provisioned with a dedicated router.

However, the Internetworking Gateway's primary responsibility is to protect resources on the WAN, not the partner's WAN. The partner may presumably have a similar architecture on their side of the connection for that purpose. It is important when connecting to a partner to spell out what security is provided to them, and what is not.

The main function of the choke router is to maintain a level of security even if the firewall is compromised. This requires that the access control lists on the router mirror the firewall rulesets. As a result, it prevents an intruder from retrieving any useful information on the WAN prior to the intrusion being detected. In addition, the choke router should perform the same roles as the screening router on internal users. This functionality may depend on the security policy, and how trusted the internal users are considered.

The Public Server Segment ("DMZ")

The Public Server Segment, or "DMZ" 12438, is another network segment off of the firewall reserved for servers that are meant to be publicly accessible. This may include web servers, ftp servers, DNS servers, and mail relays. Often this network segment is shown on the Internet side of the firewall between the screening router and the firewall, or in-between two firewalls. There are pros and cons to both configurations; however, the majority of the architectures portray the DMZ "leg" off of a firewall.

When a web server is placed outside of the firewall, it is only protected by the screening router and the web server application. It is difficult to account for remote management—content, fault and performance—of the device and one can only rely on router filtering for protection. However, there is generally a much higher level of performance and reliability if the web server is placed outside of the firewall. This could be an important consideration for high volume sites.

Two firewall configurations provide a slightly higher level of security, especially if two different vendor's firewalls are used. However, the functionality is basically the same but the price is significantly greater.

Regardless of how this network is architected, the idea of a DMZ is similar for all three scenarios. First, only communication relevant to the server is allowed into the network (e.g. http traffic allowed to a web server) from the outside world. Second, management communication is allowed into the network from management stations (or users) on the internal WAN. Third, transaction based communication is permitted from the public server to necessary places. For example, Cybercash transactions would be allowed to the Cybercash servers or database access to back end systems might be required. Any access to internal systems should be to mirror servers, if at all possible, in order to prevent permanent destruction of data.

The most important thing to realize is that the DMZ network, although behind a firewall, contains machines that are publicly accessible to the Internet. Therefore, these machines should be considered extremely suspect, and required to be secured, actively monitored, and backed up as frequently as possible.

Other Important Network Components

Specialized Proxy/Cache Servers

Proxy servers and cache servers may play an integral role in the design of a successful Internetworking Gateway. Often these specialized servers may perform roles such as authentication, access control, accounting and logging, and provide for high availability for typically high volume resources. For instance, if the WAN contains a large user base that accesses the web frequently, a Web Proxy server can authenticate a user, control what sites are accessible or not, keep logs of all web sites accessed, and even cache web sites to improve bandwidth performance. This proxy server 12500 would typically sit between the firewall 12502 and the choke router 12504, as shown in FIG. 125. The firewall would also allow traffic from the proxy server to access the Internet without authentication (since the proxy server performs this function), as a result reducing the load on the firewall.

Authentication Servers

Authentication servers, although not a necessary part of the internetworking gateway, are an integral part of a company's overall security policy enforcement. Most firewalls may contain their own user database that can be used to enforce user level restrictions. However, an authentication server provides for a centralized place to store user's names, passwords, and access levels. This leads to great benefits in terms of simplicity of management and design.

There are many types of authentication standards in the industry, as this aspect of the gateway is still developing. Some of standards being pushed include RADIUS and LDAP. There are also proprietary authentication schemes such as TACACS+(Cisco Systems), the Novell NDS Tree (based on LDAP), and the Lotus Notes Name & Address Book (NAB).

Since not all Firewalls are compatible with a certain authentication standards, often-existing authentication schemes within a company may dictate which Firewall vendor to utilize.

DNS

Similar to Authentication Servers, additional internal DNS servers may not be required if name resolution and lookup is already available on the WAN. However, there is generally a good case to have an external DNS server on the DMZ. This DNS server may supply name resolution for Internet users attempting to access any public servers, as well as remote users accessing internal servers. Servers within the Internetworking Gateways generally require DNS ability as well, but in many cases the Service Provider may offer to either provide the service remotely, or install the service/component on behalf of the implementing site.

Case Studies

Now that the typical components of an Internetworking Gateway have been defined, some more detailed architectures, and the unique considerations that arise from each one, may be explored. The different examples include:

A high volume/high availability public web server

A remote dialup gateway

An Internet development gateway with partner connections

High Volume/High Availability Gateway

In order to provide a high volume web site to customers around the world, some requirements include:

The web servers need access to a central database containing pricing and availability information The web servers need access to Cybercash to authenticate credit card transactions Short response time High Availability These requirements lead immediately to several questions.

First, what is considered an acceptable level of up time? Is it 95% (down 72 minutes per day), or is it 99.9% (down one and a half minutes per day). The main difference between the two is cost. Although the high-level security architecture may be the same regardless, there may be more built in redundancy to achieve a 99.9% up time.

Second, what happens to the "user experience" if the gateway switches to a backup component. Does the user have to re-authenticate? Does the session hang? If not, is there a noticeable lag time or does it all happen seamlessly behind the scenes? "Seamlessly behind the scenes" is more difficult to architect and maintain.

Third, what happens if it's not a component that fails, but an entire facility? This could be the result of a natural disaster (Data Centers in earthquake country for instance), or a man made disaster such as the proverbial misguided backhoe. This may result in not only local fail-over, but remote or maybe even global fail-over as well.

Finally, what is going to be stored on the server? If transactions are being made, sensitive customer information may be on the web servers. Therefore, the web servers should be placed behind a firewall.

A possible global architecture 12600 is shown in FIG. 126. This Internetworking Gateway Architecture shows four initial facilities, labeled East Coast 12602, West Coast 12604, Europe 12606 and Asia 12608. Each gateway has a connection to the Internet 12610 and to the Corporate WAN 12612. The WAN connection provides access to the centralized database 12614 and to centralized management stations 12616. The management stations may provide fault and performance management via SNMP, as well as configuration management via machine specific protocols (e.g., telnet management of the routers, or ssh management of the firewall).

FIG. 127 shows the West Coast architecture 12700. ACME is headquartered on the West Coast, therefore, this facility may be the primary location. This location may have complete architectural fail-over using OSPF, as well as ISP fail-over and load balancing using BGP. The servers 12702 are connected into a fully redundant switch 12704 containing both routing and switch modules that is running a product equivalent to the Cisco Local Director®. The Local Director may automatically distribute load to all available servers.

Since a specific web page access control level may be required, the web server application may have to perform the user authentication and encryption via HTTP authentication and SSL. Therefore, the application must perform some fail-over functionality to maintain specific log on sessions.

Remote Access Solution

ACME Requirements

ACME needs to connect the WAN to an ISP for WAN based Internet Access

- Secure dialup access directly to the WAN for telecommuters
- Access via the Internet for traveling employees to POP3 mail servers, internal web servers, and an internal news server
- Dialup users may have Intranet and Internet access There are several considerations to make when designing a solution. First, since Intranet resources may be accessible from the Internet to authorized users, an encryption solution may need to be in place. For the web server, the solution could be SSL, however, this may not work for the POP3 mail server, nor for the news server. Therefore, a third party encryption solution may be required.

Second, there may be several different machines performing authentication here, including the firewall for access to and from the Internet and the dialup server for authenticating dialup users. Therefore, it may be beneficial to use a central authentication server. This can be achieved via a RADIUS server, since most dialup servers and firewalls are compatible with the RADIUS protocol.

FIG. 128 shows a typical Remote Access Internetworking Gateway architecture 12800 that meets these requirements. Depending on the firewall 12802, there are various different client encryption pieces (SecuRemote for Firewall-1, Eagle Remote for Eagle Raptor), as well as third party products (Alta Vista Tunnel). For this architecture, we have assumed that one of the former solutions was chosen. However, to use a third party product, one would only need to place a decrypting device inside of the firewall, next to the RADIUS server 12804. A user on the Internet 12806 attempting to reach a server 12808 on the WAN 12810 would step through the following process during a typical session:

The client machine realizes that the user is trying to access predefined servers on the Intranet, and initiates an encrypted session with the firewall.

In addition to a successful key exchange, the firewall requests that the user supply a user name and one-time password. This one-time password is generated by a token compatible with the RADIUS server.

Upon receipt of the user name and password, the firewall asks the RADIUS server if this is a valid user. If the RADIUS server validates the user, then the traffic is allowed from the Internet client to the internal server. Otherwise, the traffic is blocked by the firewall.

A dial up user would have a slightly different experience. First, when dialing into the dialup server, the user would supply a username and one-time password. This username and password are validated via RADIUS with the RADIUS server. If validated, the User can then access either the Internet or the Intranet. For Intranet access, an encrypted session is set up between the client machine and the firewall without authentication for basic services. However, if specific user level access is required, then the user should authenticate with the firewall as well.

A WAN based user would authenticate with the firewall when accessing the Internet. The firewall may validate the user via RADIUS, and either allow or deny the traffic based on the RADIUS server response.

Internet Development with Partner Collaboration

FIG. 129 illustrates an Internetworking Gateway with Partner collaboration on Internet Development. The ACME company 12900 is developing an Internet application in conjunction with one of its business partners 12902. Requirements:

- The business partner is supplying several software and systems programmers on-site to assist with the development.
- Developers may require unlimited access to the Internet, which is currently not allowed through the main Internet gateway.
- ACME developers need access to WAN resources
- Partner's developers may require access back to their own WAN via a direct leased line
- The business partner has agreed to allow ACME to control access into their own network as long as they have audit access to the security devices (router ACL's and firewall rules).

The first consideration to make may depend on corporate policy. Since the ACME corporation does not allow unlimited access to the Internet 12904 from the WAN 12906, the developers may have to be located on a development network that is separated from the WAN via a firewall 12908. Resources in this area may be considered "semi-trusted," in that it is expected that hackers on the Internet may be able to break into this network more easily than the WAN. Therefore, special consideration needs to be made in terms of backup and recovery schemes in the event of a security incident.

Access back to the respective WANs may be allowed after authentication. ACME users are authenticated via the central RADIUS infrastructure. Partner employee user names and ID's are stored on the firewall.

Management Issues

There are many issues with managing an Internetworking Gateway that should be decided up front. Who is in charge of fault management? Configuration and security management? Capacity and performance management? Are the gateways managed centrally or locally? Or is there some combination?

Fault Management

Fault management can often be grouped with existing management infrastructure, such as a network operations center. The addition of gateways, while possibly adding new types of hardware, may require many of the same skills in terms of monitoring and troubleshooting the network. In addition, this group should perform many of the following functions:

- Ensure that network circuits are active and available
- Configure routers
- Ensure integrity of router configurations
- Configure DNS systems
- Collect and analyze capacity and utilization statistics
- Maintain relationship and contacts with Internet Service Provider

Configuration Management

Configuration and security management should consist of the following responsibilities:

- Manage user ID process
- Administer the firewall policy database
- Create, evaluate and distribute reports of firewall activities
- Develop tools to collect and analyze firewall statistics for capacity planning
- Interface with vendor to resolve firewall software issues
- Install and test all software releases
- Perform analysis of firewall and DNS server logs
- Perform quality assurance and regression testing Security Management Confirm that firewall operations conform to security policy Develop tools to collect and analyze firewall statistics for intrusion detection Provide leadership in incident response situations Provide security expertise in analysis of service requests Perform analysis and approval for non-standard service requests Server Security This portion of the description lists recommended practices for a Windows NT server environment. The single most important element in ensuring a secure LAN server environment is the presence of a knowledgeable and conscientious LAN server security administrator. In recognition of the extremely important role of this administrator, this standard focuses on requirements for LAN server security administration. Key items include secure handling of accounts, file and directory protection, audit requirements, and physical and environmental security.

NT Security Standard

This standard is primarily oriented to Windows NT, It should also be noted that there are minimal security differences in a Windows NT workstation and a Windows NT server. The differences between the server and workstation are that the server can support a domain, contains domain accounts, contains the workstation listing for the domain, and has the ability to make global groups. The ability to set permissions on files, network shares, and create local accounts, local profiles, and local settings are exactly the same on the server as the workstation. This portion of the present description has attempted to acknowledge where certain standards apply just to servers or workstations.

File Systems

All Windows NT servers should run the NTFS filing system because it utilizes Window NT file and directory security features. NTFS also has a recoverability feature in case of disk fault or system failure.

If a Windows NT server does not completely run the NTFS filing system, the non-NTFS portion should not be shared over the network.

All workstations that can, may run the NTFS filing system. If a workstation cannot run NTFS, additional security measures should be taken according to the filing system Windows NT is running on. The standards set forth for that operating system should be used in addition to these standards.

Server Security

Passwords must expire once every sixty (60) days for all accounts except for the administrators' accounts, which should expire every thirty (30) days.

A generic printing group is allowed for use by those traveling and visiting an office location. Original ID's should still be created for each print user and those ID's should only be placed in the printing group. The account is only to be used for printing. All other file and directory access must be prevented through controls on the printing group. The account may be used in conjunction with a print server.

The Password Uniqueness field should be set to remember the last five (5) passwords of a user. The Minimum Password Age field should be set to Allow Changes in seven (7) Days. This may prevent the user from resetting their password for a week and may require them to have varying passwords.

The default for Account Lockout must be set to six (6) bad logon attempts. The Reset Count for lockouts should be set to 7200 minutes. The Lockout Duration should be set to Forever (until admin unlocks). The above selections may allow five (5) consecutive incorrect login attempts within a five-day period, before locking up the account. When a valid password is entered at any time within the five days, the bad logon count may be reset to zero (0). Administrator equivalent accounts should be set in the same manner. The default administrator id is never locked out and can always be used to unlock administrator equivalent accounts.

The Users must be logged on to change password check box must be selected.

All LAN administrators should have two separate accounts. One account may have administrator privileges, and should not be the Administrator account or an account with a name easily identifiable as a administrator level account (i.e., JSMITHSUP). The other account should have access as a domain user and be used for normal day-to-day work that does not require administrator privileges.

All administrator level access passwords must be changed when a person with administrator level access either leaves, or no longer has responsibility for security administration.

If groupware ID's are stored on the server, they must be kept in a directory accessible only by that individual user (e.g. Home or Personal directory as long as no other users can access it). Beware that those with administrative access may be able to access the groupware ID's stored on NT servers. Therefore, distribution of groupware ID's and/or passwords must be the responsibility of someone other than the NT administrator.

Web Server Security

Since the web server is the primary interface to the client for all interactions with eCommerce applications, an improperly configured web server may leave a business susceptible to a variety of security problems, such as disclosure of confidential information. The following are recommended practices to mitigate security threats.

Securing a Web Site

Select server and host technologies that match business's security, functionality, and performance requirements and has the least vulnerabilities.

Review the recommended practices that address the configuration and operation of the server technology. If possible, also note the sample implementation of those practices (e.g. complex, simple, inexpensive, or costly).

Determine the likelihood of particular kinds of incidents and the vulnerabilities of specific servers.

Estimate the differences in operating costs of competing technologies, including the business costs of potential security incidents.

To prevent external traffic from gaining access to the private network, the web server should be place on a sub-network, separate from the main internal network.

Use filters or a firewall to restrict traffic from the web server host to the internal network.

Turn off source routing at the router so that the web server host cannot be used to forward packets to hosts in the internal network.

The authoritative copy of your web site content should be stored on a separate network inside the network firewall (e.g. internal subnet) rather than on the web server host.

By providing the essential network services and operating system services on the server host machine, we reduce the number of attacks on host from other services and inefficiencies due to compromising software and hardware configurations to satisfy the different services. After installing the server software, create cryptographic checksums or other integrity-checking baseline information for your critical system software.

Change default configurations to enhance the web server security

Use either the Common Log Format or the Extended Common Log Format

Disable network services such as ftp, and file uploads form web clients that are not necessary to run essential services.

If one has to remotely administer the web server, be sure to use strong encryption to authenticate and transmit data. Also configure server to only allow administration from one particular host.

Limit files access such that:

Public web content files and directories are read-only. Files can be written to only by the processes that allow for web server administration.

Web server log files can be written to by the server processes, but they cannot be read. They are only readable only by administration processes.

Any temporary files created by Web server processes (such as those that might be needed in the creation of dynamic Web pages) are limited to a particular subdirectory.

Disable the server from serving the following to the client:

File directory listings, even if you intend them to be readable.

Files that are outside the specified file directory tree. (Do not use links in file directory tree that point to files elsewhere in the file system.)

Own log files or configuration files. (Try to store files outside the public data directory tree.)

After all configuration choices have been made, create and record cryptographic checksums or other integrity-checking baseline information for your server software.

If you determine that an auxiliary executable program is necessary, then:

Verify that the copy of the program is an authentic copy.

Review all material on security vulnerabilities of program and make sure that the program does not include any unnecessary functions.

Install the program on a test machine and test it to your own satisfaction.

After installing the program, create new checksums or other integrity-checking baseline information for you server software and check the server behavior and log files.

Administer the web server in a secure manner.

Instead of transmitting web material using a network connection through the firewall where your server may be temporarily disabled, transfer web content from the authoritative copy to the public server using a writable CD-ROM or diskette.

Also do not use a transfer method that mounts a file system from a host inside the firewall using NFS. The NFS protocol may make the internal network vulnerable.

When inspecting the server log files from a host other than the server, use a CD-ROM and file encryption.

After making any changes in server configuration or site content, create new cryptographic checksums or other integrity-checking baseline information for your server.

Look for unexpected changes to directories and files.

Review the content of the files and determine the significance and frequency with which they should be checked.

Maintain authoritative reference data of critical files and directories which details its location in file system, shortcuts, contents, size, date of last modification and access permission settings to it.

Verify the integrity and identity any changes in directories and files (especially those associated with execution privilege settings) by comparing them with your authoritative data. Be sure to access the authoritative information from a secure, read-only media.

Inspect System and Network Logs

Regularly inspect all log files. There are six types of logs—user activity, process activity, system activity, network connections, network traffic monitoring, and web server activity.

Portion of the present description and investigate any unusual entries that you discover (e.g. repeated failed login attempts, connections and processes that run at unexpected time, connections from unusual locations).

Report all confirmed evidences of intrusion to your organization's internal security point of contact.

Read security bulletins form trustworthy sources and other security publications regularly.

Additional Tips to Keep in Mind

Network users should never be able to execute arbitrary programs or shell commands on your servers—e.g. do not configure your web browser to automatically run spreadsheets or word processors. Because most spreadsheets and word processors these days have the ability to embed executable code within their files.

Configure web server so that all CGI scripts or programs must be placed in a single directory. Allow limited access to this directory and it's contents—local users cannot install, change, remove, or edit without review, even prevents them from being read.

The practice of allowing any file on web server with .cig extension to be run as CGI script is not recommended.

CGI scripts that run on your server must perform either the expected function or return an error message. Scripts should expect and be able to handle any maliciously tailored input.

Beware of suste( ), popen( ), pipes, backquotes, an perl's eval( ) function. Avoid spawning subprocesses in CGI scripts and programs. If you must spawn subprocesses, avoid any passing through any strings that are provided by the user. If you must pass strings from the user to the subprocess, be sure that it does not pass shell meta characters.

Use a program such as tripwire to monitor for unauthorized changes to the executables and configurations files on your system.

Remove the backup files that are automatically generated by your editor.

Do not NFS mount or export any web server directories.

- Delete all compilers on your web server and any utility programs that are not used during boot or by the web server.
- If possible, place your WWW server and all files in a separate directory structure. Then wrap the WWW server with a small program that does chroot( ) to the directory. Some WWW servers include this approach as an install-time option.
- If one uses directory level access control files, give them a different name other than the standard .htaccess
- It is important that the web server password file be inaccessible to normal users on the server and to users over the web.
- Do not configure the "helper" applications that are automatically run when files of a particular type are downloaded from the net, e.g. provides a way from outsiders to run programs on your computer without your explicit permission, e.g. a program could be embedded in a HTML page as an "included" image.
- Do not mix HTTP with anonymous FTP.
- Do not trust the user's browser. HTML includes the ability to display selection lists, limit the length of fields to a certain number of characters, embed hidden data within forms, and specify variables that should be provided to cgi scripts. However, you cannot make your requesting the script's URL; attackers do not need to go through your form or use the interface that you provide.
- Maintain a good relationship with hardware and software vendors. Monitor vendor communications frequently for discoveries of new bugs or security patches to their software or hardware configurations.
- If users do not have experience in writing secure programs, it is likely that locally written system. Do not allow users to place scripts or programs on your server unless a qualified application security professional has personally read through the scripts and programs and assured you of their safety.
- The server's SUID should never be specific as root. If it does, every script that our web server executes may be run as root. However, most servers are designed to be started by the root user, so that it can listen to requests on the standard http TCP/IP port.
- Do not write SUID root shell scripts or programs on your web server.
- Server log files record considerable information about each request. Be careful as to how large they grow and check that they automatically trimmed. If they are not monitored for size, log files can file computer's hard disk and result in loss of service.
- You can learn a lot about the persons who are using the web server. From this information one can get a comprehensive picture of the people who are accessing the Web, the information that they are viewing, and where they have previously been. Use these logs to monitory the activity occurring on your system.

Performance Management

Each group may have a role in performance management. The Fault management group collects statistics, and generates reports on Key Performance Indicators (KPI's). Therefore, this group may be best situated to determine if existing levels are reaching a point when upgrades need to be made or traffic rerouted. The configuration management group manages the user ID process, so they have a good idea on the number of users, which may usually have a direct effect on the amount of use. Therefore, this group may have KPI's on the number of users and may be able to allow for changes to this number. Finally, since the security management group approves new services, this group may know if and when a new service is going to be allowed that may effect performance in the gateway.

Once it is known that a gateway needs to be upgraded, there are several possibilities. First, hardware upgrades are often the least-cost mechanism since rulesets, alarming, and other configurations can then effectively remain on one device and are unaffected by the change. If hardware upgrades are not possible (due to Operating System or application limitations), additional devices can be installed "in parallel". Protocol, Interface, and Addresses, or combinations of these factors can split traffic. For example, a site exceeding capacity can direct all WWW traffic through one Firewall if analysis proves that this traffic is a degrading factor. Further to this example, a locally installed WWW Cache server can alleviate traffic through devices such as Firewalls, delaying or preventing the need for an upgrade.

In most cases, Firewall hardware and software capacity/capability may exceed the needs of most Distributed Firewall installations. The industry is also continually "raising the bar" of Firewall performance bottleneck points, and in many cases WAN links are more constraining than Firewall Input/Output performance ceilings. Coordination and open communications with network engineers and Firewall vendors may help ensure that Caching, Ruleset, and Load Distribution strategies are based on industry Best Practices, and are not counter-productive. For example, at some point over-installation of Caching servers' limits effectiveness since large numbers of users "benefit" from each other's recently cached portion of the present descriptions and traffic.

Conclusions

Flexible Internetworking Gateways allow companies to securely connect their networks to the vast amounts of resources available today. They allow for rapidly changing business models and requirements by providing a modular approach to the security architecture. As seen in the above case studies, the Internetworking Gateway has the ability to scale from the smallest "simple" Internet connection, to a global web server with mission critical applications. These qualities may make the Internetworking Gateway Architecture a critical component of every company WAN.

Glossary

| | |
|---|---|
| ACME | A fictitious company used for example architectures |
| BGP | Border Gateway Protocol. A network routing protocol typically used to exchange routes between different networks |
| Cybercash | An Internet service for provided credit card authorizations |
| DMZ | "Demilitarized Zone" A network segment used to provide extemal users (Internet, Extranet) access to specific resources, like web pages and email |
| DNS | Domain Name System - Used for resolving easy to remember names into LP addresses (1.2.3.4) |
| Firewall | A server which controls access between different networks |
| HTTP | Hyper Text Transfer Protocol The primary protocol for the World Wide Web |

-continued

| | |
|---|---|
| ICMP | Internet Control Messaging Protocol |
| ID | User ID, or identification used to uniquely identify a user on a system |
| IP | Internet Protocol |
| KPI | Key Performance Indicator. A metric used to evaluate the operation of a system |
| LAN | Local Area Network |
| LDAP | Lightweight Directory Access Protocol |
| NAB | Lotus Notes Name and Address Book |
| NDS | Novell Directory Services |
| NIC | Network Interface Card |
| OSPF | A common network routing protocol |
| POP3 | A popular email protocol |
| RADIUS | An authentication protocol |
| Security Policy | A portion of the present description which outlines high level security requirements for a given company |
| Security Philosophy | A high level approach to security within a company |
| SNMP | Simple Network Management Protocol. Common protocol used to manage IP devices |
| Ssh | Secure shell. Provides encrypted session for remote management of servers |
| SSL | Secure Sockets Layer - used for encrypted transmission of data |
| TACACS | Terminal Access Control Access Controller System. An authentication protocol |
| Telnet | Simple, insecure remote access to servers. |
| UNIX | Operating system developed originally by AT & T that has been pervasive on the Internet to date |
| WAN | Wide Area Network |
| Windows NT | Operating system developed by Microsoft for servers |

Low Overhead Persistence Using ADO

This portion of the description provides specifics regarding the implementation of a low overhead Persistence model using ADO (ActiveX Data Object). This persistence framework is a similar in design to the Eagle Persistence model, but without implementing those features provided by Microsoft Transaction Server (Connection Pooling, Transaction Management).

The Persistence component is used to interact with databases to create, retrieve, update and delete a particular class of object.

Description

Architecture

In order to use ADO interacting with databases, the following two classes are provided under the Persistence package.

Persistence.RetaExtent

Persistence.RetaPersistableObj

Persistence.RetaExtent

This class replaces the Eagle current Persistence.JExtent class. It should cover all functionality in Persistence.JExtent class. The methods of this class may be referenced from business object factory classes to create, retrieve, update and delete a particular object using ADO.

Main Methods public Vector select(String className, String criteria, String connString, int locking) throws VCEEventException This method selects and returns a vector of objects that meet the criteria supplied.

@param className: the name of the business class

@param criteria: this is an expression of the search criteria

@param connString : connection string to the database.

@param locking the level of object store locking desired - read-lock, update-lock, etc.

@return a vector of selected objects public void update(RetaPersistableObj inObject, String connString) throws VCEEventException This method updates an object in the database @param inObject: the object to be updated @param connString: connection string to the database.

public void add(RetaPersistableObj inObject, String connString) throws VCEEventException This method adds an object in the database @param inObject: the object to be updated @param connstring: connection string to the database.

public void delete(RetaPersistableObj inObject, String connString) throws VCEEventException This method deletes an object in the database @param inObject: the object to be updated @param connString: connection string to the database.

Sample Code

```
public Vector select(String className, String aValue, String
connString, int
locking) throws VCEEventException
{
  Connection adoConn=null;
  try
  {
    //Create business object
    Class businessClass=Class.forName(className);
    RetaPersistableObj theObj=(RetaPersistableObj)
.businessClass.newInstance( );
    //create query statement
    String query=
          "SELECT"+
          theObj.columnList( )+
          "FROM"+
          theObj.getTableName( )+
          "where"+
          aValue;
    //open ADO connection
    adoConn=new Connection( );
    adoConn .open(connString);
    //Execute select query
    Recordset rs=new Recordset( );
    rs=adoConn.execute(query);
    //convert ADO record sets to business objects
    Vector result=new Vector( );
    if (rs.getEOF( ))
    {
      rs.close( );
      adoConn.close( );
      result.addElement(null);
    }
    else
    {
      while (!rs.getEOF( ))
      {
        //fill business object attributes using record set
          values
        RetaPersistableObj o=
```

```
((RetaPersistableObj)businessClass.newInstance(
)).newFrom(rs);
            //add object to result vector
            result.addElement(o);
            //move to the next record
            rs.moveNext( );
        }
        //close connection
        rs.close( );
        adoconn.close( );
    return result;
  }
  catch (AdoException e)
  {
    try
    {
    adoConn.close( );
    }
    catch (Exception ex)
    {
    }
    throw VCECreateEvent handlePersistException(e);
  }
  catch(Exception e)
  {
    try
    {
    adoConn.close( );
    }
    catch (Exception ex)
    {
    }
    throw VCECreateEvent.handleUnknownException(e);
  }
}
```

Persistence. RetaPersistableObj

This class may replaces Eagle's Persistence.JVCEPersistableObj class. It should cover all functionality in Persistence.JVCEPersistableObj class. All persistable business objects should extend this class.

Methods

This class should include all methods in Persistence.JVCEPersistableObj and it's super class Persistence.JObjectModeler. For those methods related to database result sets, ADO record set should replace Java result set.

Application

Business Object

With reference to FIG. 130, each persistable business object 13000 should extend to a RetaPersistableObj 13002. This abstract class defines a number of methods that need to be implemented in each business object. See the following sample code in RetaCustomer class.

Sample Code

```
public RetaPersistableObj newFrom(Recordset adoRs)
throws AdoException
  {
    try
    {
      RetaCustomer theObj=new RetaCustomer( );
      super.newFrom(theObj,adors);
      theObj.ssn=new
Integer(adoRs.getField(ATTRIBUTE_SSN).getInt( ));
      theObj.name=
adoRs.getField(ATTRIBUTE_NAME).getString( );
      theObj.age=new Integer(rs adoRs
getField(ATTRIBUTE_AGE).getInt( ));
      theObj.level=
adoRs.getField(ATTRfBUTE_LEVEL).getString( );
      return theObj;
    catch (AdoException e)
    {
      return null;
    }
```

Factory Class

Each Business Object should have a factory class. This class provides all method to create new COM instances of Business Object and fetch and persist these ones in the databases. To use ADO instead of JDBC to interact with databases, the factory class should reference the methods in the Persistence.RetaExtent. The database connection string (s_CONNECT_STRING) should be added in the Session.VCELTConstants class. See the following sample code in RetaCustomerFactory class Sample Code

```
public static IUnknown getBySsn(Integer inSsn) throws
VCEEventException
{
    IRetaCustomer theRetaCustomer=null;
    try
    {
      RetaCustomer theObj=new RetaCustomer( );
      String[]              theColumnLabels
        theObj.getColumnNames( );
      String theIdColumnLabel=
theColumnLabels[theObj.ATTRIBUTE_SSN];
      Vector theObjects=
RetaExtent.select("BObjects.RetaCustomer",
          theIdColumnLabel+"="+inSsn,
          VCELTConstants.s_CONNECT_STRING, 1);
    TheObj=(RetaCustomer)theObjects.elementAt(0);
    if (theObj==null)
    {
      return null;
    }
    //create a COM component and fill using values
    theRetaCustomer=
(IRetaCustomer)MTx.GetObjectContext( ).CreateInstance(
          CRetaCustomer.clsid,IRetaCustomer.iid);
    theRetaCustomer.setSsn(theObj.getSsn( ));
    theRetaCustomer.setName(theObj.getName( ));
    theRetaCustomer.setAge(theObj.getAge( ));
    theRetaCustomer.setLevel(theObj.getLevel( ));
  }
  catch (AdoException e)
  {
    throw VCECreateEvent.handlePersistException(e);
  }
  catch(Exception e)
  {
    throw VCECreateEvent.handleUnknownException(e);
  }
  return theRetaCustomer;
}
```

MTS Shared Property Manager

This portion of the description provides specifics regarding the MTS Shared Property Manager (SPM).

At its most basic level, the SPM can be thought of as a global storage container provided to objects registered in MTS. Using a series of methods, objects can create new properties and retrieve existing properties.

Description

SPM Layers

FIG. 131 illustrates layers of a shared property group manager. MTS provides several layers to the storage container. At the highest (root) level, is the 'Shared Property Group Manager' 13100. You must create an instance of the group manager to gain access to the underlying shared properties. The group manager does not provide any useful method except for 'CreatePropertyGroup' and 'getGroup'. These methods return a reference to the next layer—'Shared Property Group' 13102.

Shared Property Group(s)

The 'Shared Property Group' container is used to logically group and store the underlying shared properties. It is this interface that exposes the 'CreateProperty' and 'getProperty' methods used to manipulate shared properties. For example, there could be a 'HardwareConfigGrp' shared property group that would group together one or more 'HardwareConfig' properties.

Shared Property

A 'Shared Property' 13104 is a variable that is available to all objects in the same server process. The value of the property can be any type that can be represented by a variant. Continuing the above example; the 'HardwareConfig' property could contain a string describing the hardware, or contain an array that lists out all of the hardware attributes.

Settings

LockMode

ReleaseMode

SPM Notes

It's also important for components sharing properties to have the same activation attribute. If two components in the same package have different activation attributes, they generally won't be able to share properties. For example, if one component is configured to run in a client's process and the other is configured to run in a server process, their objects may usually run in different processes, even though they're in the same package.

Only objects running in the same process can share shared properties. If one wants instances of different components to share properties, one has to install the components in the same MTS package.

You should always instantiate the SharedPropertyGroupManager, SharedPropertyGroup, and SharedProperty objects from MTS objects rather than from a base client. If a base client creates shared property groups and properties, the shared properties are inside the base client's process, not in a server process.

Java Packages com.ms.mtx.IsharedPropertyGroupManager com.ms.mtx.ISharedPropertyGroup com.ms.mtx.ISharedProperty This portion of the description provides specifics regarding the implementation of the Shared Memory Manager (SMM).

Objects can gain access to the global memory area by using the SMM. The SMM itself does not implement or administer the memory area, but instead, leverages other interfaces that do.

Description

The SMM was designed to provide a simple interface into a global memory area. As stated above, this global memory area is not implemented by the SMM. Instead, the SMM relies on the 'Shared Property Group Manager' provided by MTS to implement the actual storage and maintenance of the global memory.

The 'Shared Property Group Manager' was chosen as the storage medium primarily because of its availability and ease of use. As new technologies are release, the SMM could be modified to leverage them without any additional impact. In fact, no native memory management routines should be called for this very reason.

Methods

The SMM provides two methods, 'getSharedMem' and 'setSharedMem' to interface with 'MTS Shared Property Manager':

public void setSharedMem( String strMemNameGrp, String strMemName, Variant varMemItem)

The 'setSharedMem' method is used to update or add an item to the shared memory area. The strMemNameGrp corresponds to an MTS 'Shared Group Name', the strMemName corresponds to an MTS 'Shared Property', and varMemItem corresponds to the 'Shared Property's value'.

public Variant getSharedMem(String strMemNameGrp, String strMemName)

The 'getSharedMem' method is used to retrieve a 'Shared Property' from the 'MTS Shared Property Manager'. The strMemNameGrp corresponds to an MTS 'Shared Group Name', the strMemName corresponds to an MTS 'Shared Property', and return value corresponds to the 'Shared Property's value'.

Issues Tracker Setup

FIG. 132 depicts a method 13200 for initializing a database used with an issue tracker. The issue tracker receives information relating to a plurality of issues from a plurality of users, displays the information relating to the issues, and allows the browsing of the information relating to each of the issues. To initialize the database, the information relating to the issues is stored in a first database in operation 13202. A second database is provided in operation 13204. The second database stores tables including a plurality of user interfaces and/or application logic for accessing the information in the first database. The tables of the second database are reconfigured in operation 13206 upon migrating the first database from a first folder to a second folder.

As an option, a copy of the tables may be stored after being reconfigured. As another option, changing of a title of the first database may also be allowed upon migration from the first folder to the second folder. Additionally, the information relating to the issues may also be allowed to be edited.

The displayed information may also be filtered based on criterion. The criterion may be selected by the user or be a predetermined group of criterion for reporting purposes. The following material provides a more detailed description of the above-described method.

This portion of the present description provides a description of the installation and configuration of the Issues Tracker Database for use on a ReTA engagement. The Issues Tracker is be used to report development, testing, architecture, and infrastructure problem and provide a means for team leaders and project managers to manage the issue resolution process.

Tool Installation

The Issue Tracker tool is comprised of two Microsoft Access databases. ReTA Issues DB—Client.mdb, which provides the user interfaces and supporting application logic and ReTA Issues DB.mdb, which contains the actual Issue Tracking data. To access the issue data the client database contains linked Access tables that actually reside in the second database. In order to function correctly these tables must be reconfigured so that the location references are correct. This step needs to be done every time the databases are moved to a difference file system folder.

To configure the tool for normal operation the following steps must be completed.

Both files must reside within the same file system folder.

Referring to FIG. 132.1, open the ReTA Issues DB—Client.mdb file 13230 by clicking on the Open button 13232 while holding down the <Shift> key. This may prevent the tool from actually launching. This should result in Microsoft Access starting with the database file open.

Remove the linked tables within the database (indicated by an arrow 13300 pointing to the right). This is done by selecting a table and striking the <Delete> key. As shown in FIG. 133, when prompted to confirm the deletion select the 'Yes' button 13302 to continue. This should be done for all of the linked tables within the client database.

Select the 'New' button 13304 to insert a new table. This may result in the 'New Table' dialog window 13400 being displayed as shown in FIG. 134. Select the Link Table option 13402 and select the OK button 13404.

With reference to FIG. 135, locate the database file 13500, select it and press the Link button 13502 to continue.

When prompted by Access for which tables to link select the Select All button 13600. See FIG. 136. Click the OK button 13602 to continue.

When completed the database file should again have linked tables with the correct path stored internally. Close the client database and create a backup copy before using.

Using the Tool

To launch the Issue Tracker, open the ReTA Issues DB—Client.mdb Access database file by either double clicking on the file within the Windows Explorer. Alternatively, create a Windows Shortcut to the client database and distribute the shortcut to all project team members.

Customizing the Tool

To customize the tools windows and report pages follow the following steps.

Form and Report Labels

Open the ReTA Issues DB—Client.mdb file by clicking on the Open button while holding down the <Shift> key. This may prevent the tool from actually launching. This should result in Microsoft Access starting with the database file open as illustrated in FIG. 137.

Select the 'Welcome Form' 13700 and select the Design button.

Double click on the FormLabel label 13800 at the top of the form 13802. See FIG. 138. At that point it is possible to modify the label with the appropriate project name. Upon completion, close the window and save any changes.

Select the 'Issue Form' 13702 of FIG. 137 and select the Design button.

Modify the FormLabel label 13800 of FIG. 138. Close and save any changes.

To modify the available reports within the Issue tool select the desired report 13900 as best illustrated in FIG. 139. Click the Design button 13902 to edit the report.

As shown in FIG. 140, modify the desired report elements 14000,14002 to the new project name. Close and save any changes.

Project Location, Team Members and Project Phases

With reference to FIG. 141, double click on the 'Team Codes' table 14100. Add and delete project locations as desired. Close and save the changes.

With reference to FIG. 142, double click on the 'Team Membership Table' 14200. Make changes and save as necessary.

With reference to FIG. 143, double click on the 'Project Phases' table 14300. Make changes and save as necessary.

Database Title

To change the title of the database to that of the current project open the client database while holding the <shift>key. With the client database open, select the Tools|Startup menu item. In the Startup dialog box 14400 as illustrated in FIG. 144, make any changes and select the OK button 14402 to save the changes.

Designing Business Components

FIG. 145 illustrates a method 14500 for generating software based on business components. A plurality of business components in a business are defined in operation 14502 with each business component having a plurality of capabilities. In operation 14504, functional interrelationships are identified between the business components. Code modules are generated in operation 14506 to carry out the capabilities of the business components and the functional interrelationships between the business components, while ensuring the capabilities that are carried out by each code module are essentially unique to the business component associated with the code module. In operations 14508 and 14510, the functional aspects of the code modules and the functional relationships of the code modules are tested. The code modules are subsequently deployed in an e-commerce environment in operation 14512.

The business components may include customers, products, orders, inventory, pricing, credit check, billing, and fraud analysis. Further, a portion of the business components may be entity-centric. Alternatively, a portion of the business components may be process-centric. In such an embodiment, a portion of the business components that are entity-centric may be governed by the business components that are process-centric. As an option, the business components that are process-centric may also be user-controlled. The following material provides a more detailed description of the above-described method.

Over the past five years, component-based development has become an important, but often-misunderstood concept in the IT world. Components in themselves don't guarantee successful business applications, but coupled with a proven methodology and continuous technological advancements, they make it possible to realize a number of important benefits such as flexibility, adaptability, maintainability, reusability, integration readiness, interoperability, and scalability.

Components have been around for a long time. The wheels on an ancient Roman chariot were certainly components. When the local chariot maker invented a new wheel (one that promised greater speeds and improved reliability on a wider variety of terrain), chariot owners would replace their worn-out, inefficient, and out-dated wheels with the new ones, but only if the new ones offered, at a minimum, the same function (i.e., rolling) through the same interface (i.e., the connection between the wheel and the chariot).

Today components are used to build everything from cars to computers. In electronics, for example, they have led to the proliferation of product features, disposability, miniaturization, product selection, price reduction, and standard interfaces—all good for the consumer. This example also draws attention to some of the challenges that accompany components: setting standards, determining the right components, the need to change standard interfaces based on new requirements, and the legal and commercial structure for selling components.

Throughout the industry the word "component" is used broadly and often loosely. Components come in a wide variety of shapes and sizes. For example: JavaBeans, ActiveX controls, and COM objects. And more generically: application, architecture, development, engineering, Web, server, and business components.

Many industry experts have attempted to define "component." Unfortunately, many of these definitions are too abstract, too academic, or too specialized to be useful. Yet below the surface of these definitions is some real business value for organizations.

Experience has shown that it's quite common for people to view components from different perspectives. Some of them—typically designers—take a logical perspective. They view components as a means for modeling real-world concepts in the business domain. These are Business Components. Others—typically developers—take a physical perspective. They view components as independent pieces of software, or application building blocks, that implement those real-world business concepts. These are Partitioned Business Components. Developers also emphasize that Partitioned Business Components can be built from other independent pieces of software that provide functionality that is generally useful across a wide range of applications. These are Engineering Components.

To use an analogy, the designer of a PC workstation would initially think in terms of logical components such as Disk Storage, Memory, Display, etc. These are analogous to Business Components. At some point in the design process, however, this thinking must become more precise. For example, Disk Storage might become a Hard Disk Drive and Disk Controller Card. These are analogous to Partitioned Business Components. And finally, the designer might use generic parts in the design of the Disk Controller Card, such as Memory Chips for cache, Bus Adapters, etc. These are analogous to Engineering Components.

Establishing one definition to satisfy all of these perspectives is certainly not required to be successful with components. What's more important is to recognize the different perspectives and to understand when it's appropriate to talk about a particular type of component. Hence, multiple definitions, one for each type of component:

Business Components represent real-world concepts in the business domain. They encapsulate everything about those concepts including name, purpose, knowledge, behavior, and all other intelligence. Examples include: Customer, Product, Order, Inventory, Pricing, Credit Check, Billing, and Fraud Analysis. One might think of a Business Component as a depiction or portrait of a particular business concept, and as a whole, the Business Component Model is a depiction or portrait of the entire business. It's also important to note that although this begins the process of defining the application architecture for a set of desired business capabilities, the applicability of the Business Component Model extends beyond application building.

Whereas Business Components model real-world concepts in the business domain, Partitioned Business Components implement those concepts in a particular environment. They are the physical building blocks used in the assembly of applications. As independent pieces of software, they encapsulate business data and operations, and they fulfill distinct business services through well-defined interfaces. Business Components are transformed into Partitioned Business Components based on the realities of the technical environment: distribution requirements, legacy integration, performance constraints, existing components, and more. For example, a project team might design an Order Business Component to represent customer demand for one or more products, but when. it's time to implement this concept in a particular client/server environment, it may be necessary to partition the Order Business Component into the Order Entry component on the client and the Order Management component on the server. These are Partitioned Business Components.

Engineering Components are independent pieces of software that provide functionality that is generally useful across a range of applications. They come in all shapes and sizes, and they are typically packaged as black box capabilities with well-defined interfaces. They are the physical building blocks used in the assembly of Partitioned Business Components. Examples include: a workflow engine, a JavaBean that encapsulates a reusable concept like address or monetary unit, a complex widget that allows users to edit a list of order lines, a group of objects responsible for persistence, a JavaBean that sorts a collection of objects, and a simple list box coded as an ActiveX control.

Components are useful throughout the development process. As a design artifact, early in the process, Business Components provide an underlying logical framework for ensuring flexibility, adaptability, maintainability, and reusability. They serve to break down large, complex problems into smaller, coherent elements. They also model the business in terms of the real-world concepts that make up the domain (e.g., entities, business processes, roles, etc.). Thus they provide the application with conceptual integrity. That is, the logical Business Components serve as the direct link between the real-world business domain and the physical application. An important goal is to build an application that is closely aligned with the business domain. Later in the process, Partitioned Business Components and Engineering Components provide a means for implementing, packaging, and deploying the application. They also open the door to improved integration, interoperability, and scalability.

FIG. 145.1 shows a relationship between business components 14530 and partitioned business components 14532.

Business Components are an integral part of the previously discussed Framework Designs. Business Components represent real-world concepts in the business domain. They encapsulate everything about those concepts including name, purpose, knowledge, behavior, and all other intelligence.

In the Business Architecture stage 14534, a project team begins to define the application architecture for an organization's business capabilities using Business Components. Business Components model real-world concepts in the business domain (e.g., customers, products, orders, inventory, pricing, credit check, billing, and fraud analysis). This is not the same as data modeling because Business Components encapsulate both information and behavior. At this point in the process, an inventory of Business Components is sufficient, along with a definition, list of entities, and list of responsibilities for each Business Component.

In Capability Analysis 14536 and the first part of Capability Release Design 14538, the project team designs Business Components in more detail, making sure they satisfy the application requirements. The team builds upon its previous work by providing a formal definition for each Business Component, including the services being offered. Another name for these services is "Business Component Interfaces." The team also models the interactions between Business Components.

Throughout the remainder of Capability Release Design and into Capability Release Build and Test 14540, Business Components are transformed into Partitioned Business Components based on the realities of the technical environment. These constraints include distribution requirements, legacy integration, performance constraints, existing components, and more. Furthermore, to ensure the conceptual integrity of the Business Component model, a given Partitioned Business Component should descend from one and only one Business Component. In other words, it should never break the encapsulation already defined at the Business Component level. Also at this time, the project team designs the internal workings of each Partitioned Business Component. This could mean the Engineering Components that make up the Partitioned Business Component, the "wrapper" for a legacy or packaged system, and other code.

In Capability Release Build and Test, Partitioned Business Components are built and tested. The build process varies depending upon the technology chosen to build the internal workings of each Partitioned Business Component. Among the many tests that are performed during this stage, the component, assembly, and performance tests are impacted the most by this style of development. A component test addresses a Partitioned Business Component as a single unit by testing its interfaces and its internal workings, while an assembly test addresses the interactions between Partitioned Business Components by testing broader scenarios. The performance test is impacted primarily by the techniques one would use to resolve the various performance issues. For example, it's common to run multiple copies of a Partitioned Business Component across multiple servers to handle a greater transaction volume.

In Deployment 14542, the Partitioned Business Components are packaged and deployed as part of the application into the production environment. The application parameters and the manner in which the Partitioned Business Components are distributed are tweaked based on how well the application performs.

Well designed Business Components are anthropomorphic. That is, they take on characteristics and abilities as if they were alive. This means that Business Components should reflect directly the characteristics and abilities (i.e., the information and behavior) of the business concepts they represent. Therefore, only by examining the various types of business concepts will one discover an acceptable way to classify Business Components.

Business concepts come in a wide variety. For example, a product represents something of value that is up for sale, while a credit check represents the work that needs to be done to determine if a customer's credit is good. The former is centered around an entity—the product—while the latter is centered around a process—credit check.

This line of thinking leads to two types of Business Components: entity-centric and process-centric. Unfortunately, what commonly results from this paradigm is an argument over whether or not a particular Business Component is entity-centric or process-centric. In reality, Business Components are always a blend of both information and behavior, although one or the other tends to carry more influence. An appropriate mental model is a spectrum of Business Components.

Business Components on the entity-centric side of the spectrum tend to represent significant entities in the business domain. Not only do they encapsulate information, but also the behaviors and rules that are associated with those entities. Examples include: Customer, Product, Order, and Inventory. A Customer Business Component would encapsulate everything an organization needs to know about its customers, including customer information (e.g., name, address, and telephone number), how to add new customers, a customer's buying habits (although this might belong in a Customer Account component), and rules for determining if a customer is preferred.

Business Components on the process-centric side of the spectrum tend to represent significant business processes or some other kind of work that needs to be done. Not only do they encapsulate behaviors and rules, but also the information that is associated with those processes. Examples include: Pricing, Credit Check, Billing, and Fraud Analysis. A Pricing Business Component would encapsulate everything an organization needs to know about how to calculate the price of a product, including the product's base price (although this might belong in a Product component), discounts and rules for when they apply, and the calculation itself.

One might argue that the Pricing component is more entity-centric than process-centric. After all, it's centered around the concept of price, which is an entity. In reality, though, it depends on the business requirements, but again, whether or not a given Business Component is entity-centric or process-centric is not important yet. What is important is how well the Business Component represents its corresponding real-world business concept. The fact that most business concepts are a blend of information and behavior means that most Business Components should also be a blend of information and behavior. Otherwise applications would be much like they are today with a distinct separation of data and process.

Another way to think about the process-centric side of the spectrum is by asking, "What role performs the process?" For example, it's the picker-packer who picks inventory and packs it into a shipment. This might lead to the Picker-packer component. Another example is a Shopping Agent component that knows someone's buying preferences, shops for the best deals, and either reports back to the user or makes the purchase.

A pattern emerges when one examines the way these Business Components interact with each other. Process-centric Business Components are "in control," while entity-centric Business Components do what they're told. To be more explicit, a process-centric Business Component controls the flow of a business process by requesting services in a specific sequence according to specific business rules (i.e., conditional statements). The services being requested are generally offered by entity-centric Business Components, but not always. Sometimes process-centric Business Components trigger other process-centric Business Components.

FIG. 146 shows how a Billing Business Component 14600 may create an invoice. The control logic 14602 (i.e., the sequence of steps and business rules) associated with the billing process is encapsulated within the Billing component itself. The Billing component requests services from several entity-centric Business Components, but it also triggers Fraud Analysis 14604, a process-centric Business Component, if a specific business rule is satisfied. Note also that "Step 6" is performed within the Billing component itself. Perhaps this is where the invoice is created, reflecting the design team's decision to encapsulate the invoice within the Billing component. This is one valid approach. Another is to model a separate entity-centric Invoice component that encapsulates the concept of invoice. This would effectively decouple the invoice from the billing process which might be a good thing depending on the requirements.

It would be logical to conclude that the two types of Business Components translate to two types of Partitioned Business Components, but a small adjustment is required. Entity-centric Business Components translate directly to Business Entity Components, but a closer look at the ways in which a business process can be implemented in an application reveals two possibilities for process-centric Business Components. A business process can be: 1) automated, like a billing process, or 2) controlled by a user, like an order entry process. The former results in a Business Process Component, while the latter results in a User Interface Component.

FIG. 147 illustrates the relationship between the spectrum of Business Components 14700 and the types of Partitioned Business Components 14702. Business Entity Components 14704 and Business Process Components 14706 are straightforward. The former is the physical implementation of an entity-centric Business Component (e.g., Customer), while the latter is the physical implementation of an automated process-centric Business Component (e.g., Billing). User Interface Components 14708, on the other hand, require further explanation.

As mentioned above, a User Interface Component is the implementation of a business process that is user controlled, but more explicitly it is a set of functionally related windows that supports the process(es) performed by one type of user. Examples include: Customer Service Desktop, Shipping Desktop, and Claim Desktop. These are not to be confused with low-level user interface controls (e.g., Active X controls), rather User Interface Components are usually built from low-level user interface controls. The reason for the dashed arrow in the diagram above is a subtle one. It points to the fact that earlier in the development process User Interface Components are generally not modeled as process-centric Business Components. Instead, they typically originate from the workflow, dialog flow, and/or user interface designs. See FIG. 148, which illustrates the flow of workflow, dialog flow, and/or user interface designs 14800, 14802,14804 to a User Interface Component 14806. This makes complete sense given their direct tie to user controlled business processes.

FIG. 149 is a diagram of the Eagle Application Model which illustrates how the different types of Partitioned Business Components might interact with each other. Business Entity Components 14900 and Business Process Components 14902 typically reside on a server, while User Interface Components 14904 typically reside on a client.

FIG. 150 illustrates what makes up a Partitioned Business Component 15000. As long as a component does what it's suppose to do, it doesn't matter what kind of code is used to build the component's internal workings. It could be anything from COBOL to Java. This is a key benefit of encapsulation. Classifying this code is a different matter. Some code 15002 is specific to the Partitioned Business Component. Other code is more widely reusable, both functionally and technically; this is where we find Engineering Components 15004. Another possibility is to "wrap" existing code 15006 from legacy and packaged systems. Finally, it's important to note that patterns and frameworks are frequently used as starting points for designing and building this code.

Engineering Components are physical building blocks used in the assembly of Partitioned Business Components. They are independent pieces of software that provide functionality that is generally useful across a range of applications, and they are usually packaged as black box capabilities with well-defined interfaces.

Engineering Components can be bought or built, and they come in a wide variety. Examples include: a workflow engine, a JavaBean that encapsulates a reusable concept like address or monetary value, a complex user interface control that allows users to edit a list of order lines, a group of objects responsible for persistence, a JavaBean that sorts a collection of objects, and a list box coded as an ActiveX control.

A pattern is "an idea that has been useful in one practical context and will probably be useful in others." Think of them as blueprints, or designs for proven solutions to known problems. Having found the right pattern for a given problem, a developer must then apply it. Examples of patterns include: an analysis pattern for hierarchical relationships between organizations and/or people, a design pattern for maintaining an audit trail, a design pattern for applying different levels of security to different user types, and a design pattern for composite relationships between objects.

A framework is a template for the implementation of a particular function (similar to a shell program). It usually embodies a known pattern (or group of patterns) in a specific technical environment. Frameworks are available from a number of third-party vendors, and they are also developed on projects. Developers are typically expected to customize and extend frameworks to meet their specific requirements, but this involves a tradeoff. Customizing and extending a framework may optimize its use, but the resulting framework tends to be less abstract, and therefore less reusable in other contexts. Examples of frameworks include: a framework for displaying an object and its properties in Smalltalk, a Java-specific framework for persisting data, and a messaging and publish/subscribe framework for DCOM.

FIG. 151 illustrates the role of patterns and frameworks. More specifically, it introduces the Eagle Architecture Specification 15100 and the Component Solutions Handbook 15102, both of which are groups of patterns. Eagle also offers technology-specific starter kits 15104, which include frameworks for various environments.

The pace of change in today's business world is increasing faster than ever before. Meanwhile, advances in information technology have enabled businesses to better understand their customers, provide greater value, and create new markets. However, as technology becomes more complex, applications have become more difficult and time-consuming to build and maintain. Looking forward, applications must be dramatically more responsive to change. They must be more:

| | In theory . . . | In practice . . . |
|---|---|---|
| Flexible | Making it possible to quickly satisfy new business requirements by replacing or modifying certain components with minimal impact to others. | Making it possible to accommodate a new product line solely by updating the Product component. |
| Adaptable | Making it easy to deliver an application to a variety ofuser types through a variety of delivery channels with minimal impact to the core application. | Making it easy to provide in-home access to customer account information by developing only a new user interface while reusing existing components. |
| Maintainable | Making it easy to update an application by reducing the area of impact for most changes. | Making it easy to add a new customer attribute by isolating the change to one component-the Customer component. |
| Reusable | Making it possible to quickly assemble unique and dynamic solutions from existing components. | Making it possible to assemble an application at a fraction of the cost because eight of the twelve components that are needed already exist. |
| Integration Ready | Making it possible to reuse the functionality within existing systems by wrapping them as components within new applications. | Making it possible to absorb newly acquired divisions by "wrapping" their systems and "plugging" them into the enterprise infrastructure. |
| Interoperable | Making it possible to request services across platforms. | Making it possible to integrate two applications built on different platforms. |
| Scalable | Making is easy to distribute and reconfigure components to satisfy various transaction volumes. | Making it easy to accommodate the holiday crunch by running multiple copies of the Order component across multiple servers. |

Components will help an IT organization achieve these quality attributes. Through encapsulation they make it possible to develop applications that are more responsive to change. We can make this claim with confidence because a component that is well encapsulated (i.e., an independent, black box component with predictable, well defined interfaces) can be used in any situation, as long as it's used for its intended purpose. It knows how to perform its services without regard to what's happening outside of its boundaries (e.g., the actions that precede or follow it).

Another key to embracing change is the predictability and conceptual integrity of the parts that make up an application. Fred Brooks, author of *The Mythical Man-Month,* writes, ". . . conceptual integrity is the most important consideration in system design." Therefore, components must be conceptually whole, and they must perform functions that are aligned with their purpose and within their sphere of knowledge. If they accurately reflect the real world, they are much easier to develop and maintain. If the real world changes, so must the corresponding component.

Given a design with these characteristics, the opportunity for reuse is significantly enhanced, and the time it takes to upgrade the system is dramatically reduced. The Gartner Group agrees that component-based development will be a dominant method of application development in the years to come. They say that "by 2001, at least 60 percent of all new applications development will be based on assemblies of componentware, increasing speed to market and the ability to cope with change (0.7 probability)."

Business Components and Partitioned Business Components represent a major improvement in design capability—some might argue the first major change in design thinking since structured design. There are several reasons for this breakthrough:

Business Components model entities and processes at the enterprise level, and they evolve into Partitioned Business Components that are integrated into applications that operate over a network. Consequently, they serve as an excellent first step in the development of scalable, distributed enterprise applications that map closely to the business enterprise itself (i.e., the way it operates and the information that defines it).

Business Components model the business, and thus they enable applications to more completely satisfy the business needs. They also provide a business-oriented view of the domain and consequently a good way to scope the solution space. This results in a good context for making process and application decisions. Finally, Business Components provide a common vocabulary for the project team. They educate the team in what's important to the business.

When modeled correctly, entity-centric Business Components represent the most stable elements of the business, while process-centric Business Components represent the most volatile. Encapsulating and separating these elements contributes to the application's overall maintainability.

To manage the complexity of a large problem, it must be divided into smaller, coherent parts. Partitioned Business Components provide an excellent way to divide and conquer in a way that ties the application to the business domain. They provide the ability to "package software capabilities into more manageable (and useful) chunks." By contrast, traditional modules are too cumbersome to be reusable in multiple contexts. On the other end of the spectrum, objects are too small to effectively divide and conquer; there are simply too many of them.

Partitioned Business Components provide a greater emphasis on application layering—a well known, but often neglected concept in application development.

Partitioned Business Components are application building blocks. As an application modeling tool, they depict how various elements of an application fit together. As an application building tool, they provide a means for systems delivery.

Proven processes, patterns, and frameworks offer a higher level of reuse. This is one of the key advantages because it means greater agility. These mechanisms make it possible for hundreds of developers to do things consistently and to benefit from previously captured, reusable knowledge capital.

Business Components model the business. It sounds straightforward, but even with experience it's a challenge to identify the right components and to design them for flexibility and reuse. Flexibility and reuse are certainly more achievable with Business Components, but they are not inherent to Business Components. To accomplish these goals, as the previous examples suggest, one must understand what's happening within the enterprise and across the industry. One must work with business experts who understand the factors that will influence the current and future evolution of the business domain. This will improve one's ability to anticipate the range of possible change (i.e., to anticipate the future). The Business Component Model will be more flexible and reusable if it is challenged by scenarios that are likely to take place in the future.

Reuse becomes a reality more quickly if one plans for it. And it endures if one manages it over time. However, both of these things are difficult to do, especially for large projects and large enterprises. First of all, it's easy for communication across one or more projects to break down. It's also common for individual projects to pay more attention to their requirements and deadlines than to project-wide or enterprise-wide reuse. After all, their most important objective is to deliver value to their customers. Reuse must be engrained into the culture. This could mean teams responsible for project-wide and enterprise-wide reuse, but no matter how it's done, reuse must be one of the most important technology objectives.

Too much focus on low-level (i.e., code) reuse can be a trap. To draw an analogy, take a look at the auto industry ten years ago. Some auto makers were focused on interchangeable parts and low-level standardization. For example, they decided to use the same body style for all of their cars. Unfortunately, when the industry began to move away from the boxy body style, they were not well prepared, nor were they agile enough to react in a timely fashion. They had invested too much in low-level standardization. Conversely, other auto makers were focused on quality processes and frameworks (i.e., high-level reuse). As a result, they were able to respond more quickly to the changing requirements. Engagement experience has shown that the same thing can happen with components and objects (e.g., too much emphasis on low-level inheritance). That's why it's important to focus appropriately on the high-level reuse enabled by processes, patterns, and frameworks.

Although Business Components and Partitioned Business Components represent a significant breakthrough in design capability, the architectural frameworks to support this breakthrough are still maturing. Standards come to mind first: Will it be COM, JavaBeans, or CORBA? It's still not clear. Likewise with languages: Will it be Visual Basic, Java? Tools and repositories offer another challenge. Clear winners have yet to emerge, and newcomers are constantly popping up with promising products. Finally, the legal and commercial market for buying and selling components is not mature. The market for high-level common business objects is just emerging, while the market for low-level components is still chaotic.

One of the most important challenges is teaching a new application development style. Although components and objects have been around for a while, they are new to most people. Furthermore, component-based development requires a change in the way one thinks about designing and building applications. Engagement experience has shown that it takes a couple of months to feel comfortable with this paradigm—and longer for those pursuing deeper technical skills. But this challenge is certainly not impossible to overcome. A combination of training and mentoring has proven to be the best way to teach these concepts, and the more rigorous approach that results from this education is well worth the journey.

The following tips and techniques provide an introduction to some of the issues surrounding the design of Business Components. For more information, see the ODM.

What is the Right Slumber of Business Components? How Big Should they Be?

The granularity of Business Components is a frequent topic of discussion. A fairly common misconception is that Business Components are the same as applications, but in fact, applications are assembled from Business Components (or Partitioned Business Components to be more accurate). A typical application might have ten to twenty Business Components. On the other end of the spectrum, Business Components are larger than business objects. In fact, some people refer to Business Components as large-grained business objects.

So What is the Right Size for a Business Component?

Business Components should encapsulate concepts that are significant to the business domain. Of course, this is subjective, and it certainly varies by business domain. In fact, business domain experts, with help from component modelers, are in the best position to make this judgment.

Bigger Business Components hide more complexity, which in general is a good thing. However, too much complexity in a component can lead to many of the problems that preceded component-based development. For example, embedding too much policy information can lead to a Business Component that is more difficult to maintain and customize. Another advantage is the fact that the coupling between bigger components tends to be weaker. On the other hand, bigger components are generally less cohesive and consequently less flexible. For example, assume that the concepts of warehouse and inventory have been combined into one Business Component. This could be problematic if a future application needs warehouse information, but not inventory information.

Smaller Business Component tends to be more flexible. It's also easier to reuse them in future applications. Unfortunately, smaller components typically result in a higher degree of coupling. One will find significantly more interactions between smaller components. This could also lead to performance problems. If two or three small components send each other a lot of messages, it might make sense to combine them into one. Smaller components may also be more difficult to manage, simply because more of them exist.

It's important to strike a balance, and keep in mind that the ideal size depends on the domain. If there's a question in one's mind, it makes sense to lean toward smaller components. It's easier to combine them than to break them up.

What's the Best Way to Identify Business Components?

During the Business Architecture stage, the project team defines its business capabilities. At this point in the process, one can begin to search the business domain for Business Components. Then again later, during Capability Release Design, when the project team documents scenarios and workflows, one can perform a second iteration through the identification process.

The following steps describe one technique for identifying Business Components. FIG. 152 illustrates this Business Component Identifying Methodology 15200 including both Planning and Delivering stages 15202,15204:

1. Start with entity-centric Business Components. For example, the customer is a significant entity in most business domains, therefore a Customer component is quite common. A Customer Business Component would encapsulate everything an organization needs to know about its customers, including customer information (e.g., name, address, and telephone number), how to add new customers, a customer's buying habits (although this might belong in a Customer Account component), and rules for determining if a customer is preferred. Entities themselves can be physical or conceptual. For example, customers and products are physical—you can touch them. Orders, on the other hand, are conceptual. An order represents a specific customer's demand for a product. You cannot touch that demand.
2. Look for process-centric Business Components next. Generally speaking, a process-centric Business Component controls the flow of a business process. For example, in the utility industry, a Billing component would process customer, product, pricing, and usage information into a bill. Sometimes one will find an entity associated with the process—in this case, a bill or invoice—but another option is to model this entity as a separate, entity-centric Business Component, thus decoupling it from the process.

What's the Best Way to Identify the Responsibilities of a Business Component?

Review the business capabilities, business processes, business practices, scenarios, workflows, and other requirements. Look for behaviors that will be supported by the application. In other words, what are the business functions that will be performed by the system? Assign them as responsibilities to the most appropriate component. If components were people and computers didn't exist, one might ask, "Who is responsible for this task?" In fact, sometimes it's helpful to assign component owners who speak up when they encounter a responsibility that should belong to their components—"Hey, I should be responsible for that!"

This section addresses several frequently asked questions that more broadly apply to the physical implementation of component- and object-based solutions. The answers are intended to increase the awareness of the reader. Most of them only scratch the surface of issues that are somewhat controversial within the component and object community.

What is the Role of Components in Net-centric Computing?

Physical components play a critical role in net-centric computing because they can be distributed, as encapsulated units of executable software, throughout a heterogeneous environment such as the Internet. They have the ability to make the Web more than a toy for retrieving and downloading information. Robert Orfali, Dan Harkey, and Jeri Edwards, well-known experts in the field of component- and object-based development, wrote the following about distributed objects (same as "distributed components" for the purpose of this discussion):

The next-generation Web—in its Internet, intranet, and extranet incarnations—must be able to deal with the complex requirements of multi-step business-to-business and consumer-to-business transactions. To do this, the Web must evolve into a full-blown client/server medium that can run your line-of-business applications (i.e., a delivery vehicle for business transaction processing). . . To move to the next step, the Web needs distributed objects.

What's the Difference Between Components and Objects?

From a logical perspective, components and objects are the same. They both model concepts from a particular domain, and they both encapsulate information and behavior. On this level, good component models and good object models share the same characteristics: high cohesion, low coupling, reusability, well defined services, and more. One might argue that granularity is a key difference. After all, for an object-oriented design, components are made up of objects. This may be true, but in reality both of them come in all sizes, thus making this difference rather insignificant.

From a physical perspective, components and objects are similar, but different. The key difference relates to the different ways in which they are implemented. As long as a component's interfaces comply with an accepted standard like COM, JavaBeans, or CORBA, its internal workings can be implemented using any technology (e.g., Java, Visual Basic, Smalltalk, C, or even COBOL). The internal workings of an object, on the other hand, can only be implemented using object technology. For the same reason (i.e., standard interfaces), it is possible to request a component's services from any platform. That's not true of objects, unless they are wrapped with interfaces that comply with the accepted standards, which would make them distributed objects (i.e., components) instead.

Robert Orfali, Dan Harkey, and Jeri Edwards also wrote the book *The Essential Distributed Objects Survival Guide* (1996). Chapter 2, "From Distributed Objects to Smart Component," is an excellent source of information about objects, components, and the differences between them. They say the following about physical components:

A component is an object that's not bound to a particular program, computer language, or implementation . . . . They are the optimal building blocks for creating the next generation of distributed systems . . . . Components are standalone objects that can plug-and-play across networks, applications, languages, tools, and operating systems. Distributed objects are, by definition, components . . . . Unlike traditional objects, components can interoperate across languages, tools, operating systems, and networks. But components are also object-like in the sense that they support encapsulation, inheritance, and polymorphism.

What is a Component Model?

This is a common point of confusion. From a logical perspective, the term "component model" is frequently used to refer to a Business Component Model in the same way that "object model" is used to refer to a business object model.

From a physical perspective, a component model (or a component object model) defines a set of conventions that provides a standard way to develop and use physical components, including how to define properties, events, behaviors, etc. It also includes the standard structure of a component's interfaces, the mechanism by which a component interacts with other components, patterns for asking a component about its features, a means for browsing active components, and more. Some of the existing component models are COM, JavaBeans, and CORBA.

Example: A Grocery Store

A grocery store chain is creating an enterprise-wide Business Component model. Currently the individual stores do not record specific customer information.

Consequently, a model based on today's requirements would not retain customer information.

However, they are looking into preferred customer cards. Furthermore, while analyzing the industry, the project team reads about a competitor with a pharmacy and video rental service. In both cases, customer information becomes critical. So the project team creates scenarios describing how they would use customer information to support these requirements. They create one Business Component Model that supports both today's and tomorrow's view of the customer.

In the near future, when the chain adopts preferred customer cards, and in the more distant future, if they decide to add a pharmacy or video rental service, the Business Component design for their current application will provide a solid foundation for the future requirement of tracking customer information. If they weren't using Business Components, they would not have a model that maps to their business domain, and introducing new requirements would require more abrupt changes.

Example: Inventory Management

A telecommunications company in the paging business sells and leases pagers and services. One part of the company is installing an inventory management system for tracking pagers, while another part of the company is trying to determine how to track the frequencies that are owned and leased by the company. What does this company mean by inventory? Does it simply mean knowing what items are in a warehouse?

When the company thinks abstractly about the concept of inventory, they discover that it's all about managing anything of value. When they look at what they have in inventory, they discover that it is countable, reservable, and has a cost associated with it. Inventory does not require specific knowledge of the use of an item in inventory; that knowledge can be put into another component, such as Item. If inventory does not need to know the specifics about its use, then it could apply its ability to count, reserve, and value anything it is associated with. Inventory could be used to manage a variety of things: conference rooms, fixed assets, work in process, finished goods, and leased frequencies.

So one can start out building an inventory management application and then build the ready-to-reuse Inventory component which, without modification, can support many other uses. In this way one can unload the concept of inventory so that it can be reused outside the context it was initially planned for.

Illustrative Embodiments

Any portion or portions of an exemplary embodiment described above may be used in any combination with any other portion or portions of any other exemplary embodiment or embodiments. The following examples illustrate various exemplary embodiments of such combinations:

EXAMPLE 1

FIG. 153 illustrates a method 15300 for providing an exemplary embodiment of a resources e-commerce technical architecture. In operation 15302, a system is provided which includes a plurality of sub-activities. Each sub-activity includes sub-activity logic adapted to generate an output based on an input received from a user upon execution. Each sub-activity also includes a plurality of activities which each execute the sub-activities upon being selected for accomplishing a goal associated with the activity. The business objects employed by the sub-activities are managed in operation 15304, and information used by the sub-activities is persisted in operation 15306 during the execution of the sub-activities. In operation 15308, items such as issues, change requests, and/or service investigation reports relating to the system are reported. Software modules which support the sub-activities are tested in operation 15310.

EXAMPLE 2

FIG. 154 illustrates a second exemplary embodiment of a method 15400 for maintaining data in an e-commerce based technical architecture. In operation 15402, an interface is provided between a first server and a second server with a proxy component situated between the first and second servers to manage business components used by the sub-activities. Information used by the sub-activities is persisted during the execution of the sub-activities in operation 15404. In operation 15406, application consistency is maintained by referencing text phrases through a short codes framework. Additionally, software modules which support the sub-activities are also tested in operation 15408.

EXAMPLE 3

FIG. 155 also illustrates an exemplary embodiment of a method 15500 for providing a resources e-commerce technical architecture where in operation 15502 context objects are shared among a plurality of components executed on a transaction server. In operation 15504, services are also accessed within the server without a need for knowledge of an application program interface of the server. Application consistency is maintained in operation 15506 by referencing text phrases through a short codes framework. Additionally, a graphical user interface is also generated for the resources e-commerce technical architecture in operation 15508.

EXAMPLE 4

FIG. 156 illustrates another exemplary embodiment of a method 15600 for providing a resources e-commerce technical architecture. In this embodiment of the present invention, in operation 15602 network performance modeling is performed on a network. In operation 15604, context objects are shared among a plurality of components executed on a transaction server on the network. Application consistency is maintained in operation 15606 by referencing text phrases through a short codes framework. Further, software modules are managed during development of the architecture in operation 15608.

EXAMPLE 5

FIG. 157 illustrates an additional exemplary embodiment of a method 15700 for providing a resources e-commerce technical architecture. In operation 15702 issues in the technical architecture are managed for the purpose of resolution. A database used while managing the issues is initialized when migrated in operation 15704. Further, application consistency is maintained in operation 15706 by referencing text phrases through a short codes framework. In operation 15708, a plurality of software modules are generated in order to execute the technical architecture. Such software modules are based on business components.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for interfacing a first server and a second server with a proxy component situated therebetween comprising:

(a) identifying a request for a business object by an application on the first server;

(b) connecting the first server with the second server via the proxy component, the Internet and an e-commerce computer architecture;

(c) transmitting selection criteria from the first server to the second server via the Internet;

(d) receiving a first recordset and a second recordset from the second server in response to the selection criteria, wherein the first recordset includes business data and the second recordset includes result codes;

(e) mapping the first and second recordsets to the business object; and (f) sending the business object to the application on the first server.

2. A method as recited in claim 1, and further comprising the step of receiving a third recordset from the second server in response to the selection criteria, wherein the third recordset includes errors and references to an error table on the first server for allowing processing of the errors.

3. A method as recited in claim 1, wherein the recordsets are ActiveX data objects (ADO) recordsets.

4. A method as recited in claim 1, and further comprising the step of preventing changes to the proxy component from affecting the application on the first server.

5. A method as recited in claim 1, and further comprising the step of allowing generation of a plurality of the proxy components by a user.

6. A method as recited in claim 1, wherein the first and second recordsets are mapped to the business object using a utility conversion function.

7. A computer program embodied on a computer readable medium for interfacing a first server and a second server with a proxy component situated therebetween comprising:

(a) a code segment that identifies a request for a business object by an application on the first server;

(b) a code segment that connects,the first server with the second server via the proxy component, the Internet and an e-commerce computer architecture;

(c) a code segment that transmits selection criteria from the first server to the second server via the Internet;

(d) a code segment that receives a first recordset and a second recordset from the second server in response to the selection criteria, wherein the first recordset includes business data and the second recordset includes result codes;

(e) a code segment that maps the first and second recordsets to the business object; and (f) a code segment that sends the business object to the application on the first server.

8. A computer program as recited in claim 7, and further comprising a code segment that receives a third recordset from the second server in response to the selection criteria, wherein the third recordset includes errors and references to an error table on the first server for allowing processing of the errors.

9. A computer program as recited in claim 7, wherein the recordsets are ActiveX data objects (ADO) recordsets.

10. A computer program as recited in claim 7, and further comprising a code segment that prevents changes to the proxy component from affecting the application on the first server.

11. A computer program as recited in claim 7, and further comprising a code segment that allows generation of a plurality of the proxy components by a user.

12. A computer program as recited in claim 7, wherein the first and second recordsets are mapped to the business object using a utility conversion function.

13. A system for interfacing a first server and a second server with a proxy component situated therebetween comprising:

(a) logic that identifies a request for a business object by an application on the first server;

(b) logic that connects the first server with the second server via the proxy component, the Internet and an e-commerce computer architecture;

(c) logic that transmits selection criteria from the first server to the second server via the Internet;

(d) logic that receives a first recordset and a second recordset from the second server in response to the selection criteria, wherein the first recordset includes business data and the second recordset includes result codes;

(e) logic that maps the first and second recordsets to the business object; and (f) logic that sends the business object to the application on the first server.

14. A system as recited in claim 13, and further comprising logic that receives a third recordset from the second server in response to the selection criteria, wherein the third recordset includes errors and references to an error table on the first server for allowing processing of the errors.

15. A system as recited in claim 13, wherein the recordsets are ActiveX data objects (ADO) recordsets.

16. A system as recited in claim 13, and further comprising logic that prevents changes to the proxy component from affecting the application on the first server.

17. A system as recited in claim 13, and further comprising logic that allows generation of a plurality of the proxy components by a user.

18. A system as recited in claim 13, wherein the first and second recordsets are mapped to the business object using a utility conversion function.

* * * * *

UNITED STATES PATENT AND TRADEMARK OFFICE

CERTIFICATE OF CORRECTION

PATENT NO. : 6,523,027 B1
DATED : February 18, 2003
INVENTOR(S) : Roy Aaron Underwood It is certified that error appears in the above-identified patent and that said Letters Patent is hereby corrected as shown below:

Title page,
Item [57], ABSTRACT,
Lines 1-2, delete "system,"; delete "and article"; delete "manufacture are provided for"
Lines 9-11, delete all occurrences of "recordset" and insert -- record set --

Column 2,
Line 7, delete "system"; delete "and article of manufacture provide" and insert --of providing --
Lines 14, 15, 16, 21 and 23, delete "recordset" and insert -- record set --
Lines 17, delete "recordsets" and insert -- record sets --; delete "recordsets" and insert -- record sets --
Lines 27 and 28-29, delete "recordset" and insert -- record set --
Line 41, insert "A" after "FIG. 1"
Line 43, delete "1.1" and insert -- 1B --
Line 47, delete "1.2" and insert -- 1C --
Line 50, delete "1.3" and insert -- 1D --
Line 53, delete "1.4" and insert -- 1E --

Column 3,
Line 9, insert -- A -- after "8"
Line 11, delete "8.1" and insert -- 8B --
Line 13, insert -- A -- after "9"
Line 16, delete "9.1" and insert -- 9B --
Line 34, insert -- A -- after "15"
Line 36, delete "15.1" and insert -- 15B --
Line 40, insert -- A -- after "16"
Line 42, delete "16.1" and insert -- 16B --
Line 45, insert -- A -- after "17"
Line 53, delete "17.1" and insert -- 17B --
Line 57, insert -- A -- after "18"
Line 59, delete "18.1" and insert -- 18B --
Line 66, insert -- A -- after "20"

Column 4,
Line 1, delete "20.1" and insert -- 20B --

Column 6,
Line 37, insert -- A -- after "76"
Line 39, delete "76.1" and insert -- 76B --
Line 55, insert -- A -- after "83"
Line 57, delete "83.1" and insert -- 83B --
Line 66, insert -- A -- after "87"

UNITED STATES PATENT AND TRADEMARK OFFICE

CERTIFICATE OF CORRECTION

PATENT NO. : 6,523,027 B1
DATED : February 18, 2003
INVENTOR(S) : Roy Aaron Underwood It is certified that error appears in the above-identified patent and that said Letters Patent is hereby corrected as shown below:

Column 7,
Line 1, delete "87.1" and insert -- 87B --
Line 18, insert -- A -- after "93"
Line 20, delete "93.1" and insert -- 93B --
Line 43, insert -- A -- after "103"
Line 45, delete "103.1" and insert -- 103B --
Line 65, insert -- A -- after "109"

Column 8,
Line 1, delete "109.1" and insert -- 109B --
Line 46, insert -- A -- after "124"
Line 49, delete "124.1" and insert -- 124B --

Column 9,
Line 7, insert -- A -- after "132"
Line 9, delete "132.1" and insert -- 132B --
Line 47, insert -- A -- after "145"
Line 49, delete "145.1" and insert -- 145B --

Column 11,
Line 18, insert -- A -- after "1"
Line 22, insert--A-- after "FIG. 1"

Column 17,
Line 25, delete "1.1" and insert -- 1B --

Column 19,
Line 29, delete "1.2" and insert -- 1C --

Column 20,
Line 34, delete "1.3" and insert -- 1D --
Line 36, delete "1.3" and insert -- 1D --

Column 22,
Line 13, delete "1.4" and insert -- 1E --

Column 29,
Line 19, insert -- A -- after "FIG. 8 "
Line 65, delete "8.1" and insert -- 8B --

Column 43,
Line 47, insert -- A -- after "FIG 9"

UNITED STATES PATENT AND TRADEMARK OFFICE

CERTIFICATE OF CORRECTION

PATENT NO. : 6,523,027 B1
DATED : February 18, 2003
INVENTOR(S) : Roy Aaron Underwood It is certified that error appears in the above-identified patent and that said Letters Patent is hereby corrected as shown below:

Column 44,
Line 16, delete "9.1" and insert -- 9B --

Column 46,
Line 2, insert -- A -- after "FIG 15"

Column 47,
Line 17, delete "15.1" and insert -- 15B --

Column 52,
Line 46, insert -- A -- after "FIG. 16"

Column 53,
Line 36, delete "16.1" and insert -- 16B --

Column 55,
Line 16, insert -- A -- after "FIG 17"

Column 58,
Line 66, insert -- A -- after "FIG. 18"

Column 59,
Line 56, delete "18.1" and insert -- 18B --

Column 64,
Line 56, insert -- A -- after "FIG. 20"

Column 65,
Line 27, delete "20.1" and insert -- 20B --

Column 76,
Line 58, insert -- A -- after "FIG. 21 "

Column 77,
Line 35, delete "21.1" and insert -- 21B --

Column 204,
Line 51, insert -- A -- after "FIG. 72 "

UNITED STATES PATENT AND TRADEMARK OFFICE

CERTIFICATE OF CORRECTION

PATENT NO. : 6,523,027 B1
DATED : February 18, 2003
INVENTOR(S) : Roy Aaron Underwood It is certified that error appears in the above-identified patent and that said Letters Patent is hereby corrected as shown below:

Column 208,
Line 56, delete "72.1" and insert -- 72B --

Column 221,
Line 20, insert -- A -- after "FIG. 76"

Column 222,
Line 21, insert "76.1" and insert -- 76B --

Column 232,
Line 40, insert -- A -- after "83"

Column 233,
Lines 38 and 65, delete "83.1" and insert -- 83B --

Column 234,
Line 32, insert -- A -- after "FIG.87"
Line 67, delete "87.1" and insert -- 87B --

Column 251,
Line 37, insert -- A -- after "FIG. 93"

Column 252,
Line 36, delete "93.1" and insert -- 93B --

Column 283,
Line 16, insert -- A -- after "FIG.103"

Column 284,
Line 64, delete "103.1" and insert -- 103B --

Column 285,
Line 17, delete "103.1" and insert -- 103B --
Line 56, delete "103.1" and insert -- 103B --

Column 308,
Line 57, insert -- A -- after "FIG.124"

UNITED STATES PATENT AND TRADEMARK OFFICE

CERTIFICATE OF CORRECTION

PATENT NO. : 6,523,027 B1
DATED : February 18, 2003
INVENTOR(S) : Roy Aaron Underwood It is certified that error appears in the above-identified patent and that said Letters Patent is hereby corrected as shown below:

Column 311,
Line 10, delete "124.1" and insert -- 124B --

Column 328,
Line 47, insert -- A -- after "FIG.132"

Column 329,
Line 27, delete "132.1" and insert -- 132B --

Column 330,
Line 41, insert -- A -- after "145"

Signed and Sealed this

Twenty-fourth Day of August, 2004

JON W. DUDAS
*Director of the United States Patent and Trademark Office*